US005216619A

United States Patent [19]

Dunbar, Jr. et al.

[11] Patent Number: 5,216,619

[45] Date of Patent: Jun. 1, 1993

[54] PATH MANAGEMENT FOR A PROCESS SYSTEM

[75] Inventors: M. James Dunbar, Jr., North Scituate, R.I.; Anton G. Hofland, London, England; Arno A. Molenaar, Apeldoorn; Peter W. J. Vreeswijk, Edam, both of Netherlands

[73] Assignee: The Foxboro Company, Foxboro, Mass.

[21] Appl. No.: 421,498

[22] Filed: Oct. 13, 1989

[51] Int. Cl.[5] .............................. G06F 15/46

[52] U.S. Cl. .............................. 364/478; 364/468; 364/474.11

[58] Field of Search .......... 364/468, 469, 478, 474.11, 364/51.3

[56] References Cited

U.S. PATENT DOCUMENTS

| | | | |
|---|---|---|---|
| 4,472,783 | 9/1984 | Johnstone et al. | 364/468 |
| 4,580,207 | 4/1986 | Arai et al. | 364/468 |
| 4,646,238 | 2/1987 | Carlson et al. | 364/468 |
| 4,698,766 | 10/1987 | Entwistle et al. | 364/132 |
| 4,796,194 | 1/1989 | Atherton | 364/478 |
| 4,807,108 | 2/1989 | Ben-Arich et al. | 364/148 |
| 4,852,001 | 7/1989 | Tsushima et al. | 364/468 |
| 4,866,628 | 9/1989 | Natarajan | 364/468 |
| 4,887,218 | 12/1989 | Natarajan | 364/468 |
| 4,896,269 | 1/1990 | Tong | 364/468 |
| 4,901,242 | 2/1990 | Kotan | 364/468 |
| 4,956,784 | 9/1990 | Hadavi et al. | 364/468 |
| 5,050,088 | 9/1991 | Buckler et al. | 364/474.11 |

*Primary Examiner*—Jerry Smith
*Assistant Examiner*—Jim Trammell
*Attorney, Agent, or Firm*—Hamilton, Brook, Smith & Reynolds

[57] ABSTRACT

The present invention relates to a path management system for regulating equipment resources which moves process material through a process system. The process system includes a control procedure for implementing a specific process application. The path management system includes a path editor for building different path specifications, each of which defines an equipment set and sequences of equipment operations for a specific process application. A database is interconnected to the path editor for storing the plurality of path specifications built by the path editor. The path management system further includes a path selector for selecting a single path specification for the specific process application from a plurality of path specifications stored in the database. The path selector then validates the availability of equipment resources identified by the selected single path specification at a particular instant in time. The path management system also includes a path actuator which is initiated by the control procedures for regulating the equipment resources, based on the validated path specification, to coordinate the sequence of the equipment resource operations for the selected path specification.

7 Claims, 2 Drawing Sheets

PATH MANAGEMENT FOR A PROCESS SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Process flow material (ores, fluids, gases, discrete parts, electrical power, and/or information) through process equipment by various and changing routes. This meaning of route, as a specific equipment set, is hereafter termed a path.

The particular path that is exercised in any given instance can depend on many factors: product type, equipment availability, equipment contents, transfer volume, process operations in progress, etc. Often a given transfer/movement may exercise one route on one occasion, and a different one at another time.

The most preferable way for a process operator (for purposes of this document "operator" and "control procedure" are synonymous) to select a transfer path is to tell the control system the nature of a path, for example the origin and the destination of the transfer, then let the control system determine the particular equipment resources which can, and are available to, effect the transfer. Subsequently the operator would prefer to operate the selected path as an entity by simple invocations, provoking the control system to perform the appropriate sequence of equipment operations (valving, switching, etc.).

While this is a preferable operating scenario, it is not simply done. The details of just selecting a path may consist of a very simple decision rule or a very complicated one. Performing the array of coordinated equipment operations of a path is equally complex.

SUMMARY OF THE INVENTION

The present invention provides a path management system for regulating equipment resources which moves process material through a process system. Said process system includes a control procedure for implementing a specific process application.

The present invention path management system comprises:

(a) a path editor means;
(b) at least one database;
(c) path selector means; and
(d) path actuator means.

The path editor means builds a database of path specifications. Each path specification defines an equipment set (i.e., a set of equipment resources) and sequences of equipment operations for a specific process application. The database is interconnected to the path editor means for storing the plurality of path specifications.

The path selector means selects a single path specification for the specific process application from the path specifications stored in the database. The path selector means also validates the availability of equipment resources identified by the selected single path specification at a particular instance in time.

The path actuator means is initiated by the control procedure of the process system and regulates the equipment resources based on the validated selected single path specification. In turn, this coordinates the sequence of equipment resource operations for the specific type of path specification.

In accordance with one aspect of the present invention the path selector means includes means for selecting an alternate single path specification from the plurality of path specifications stored in the database if the selected single path specification is unavailable for the particular instance in time.

BRIEF DESCRIPTION OF THE DRAWINGS

The foregoing and other objects, features and advantages of the invention will be apparent from the following more particular description of a preferred embodiment of the present invention, as illustrated in the accompanying drawings in which like reference characters refer to the same parts throughout the different views.

DETAILED DESCRIPTION OF THE INVENTION

Appendix

Computer program listings are included in the attached Appendix. The listing is source code for implementing path management of equipment that moves materials through a process system.

Figure 1:
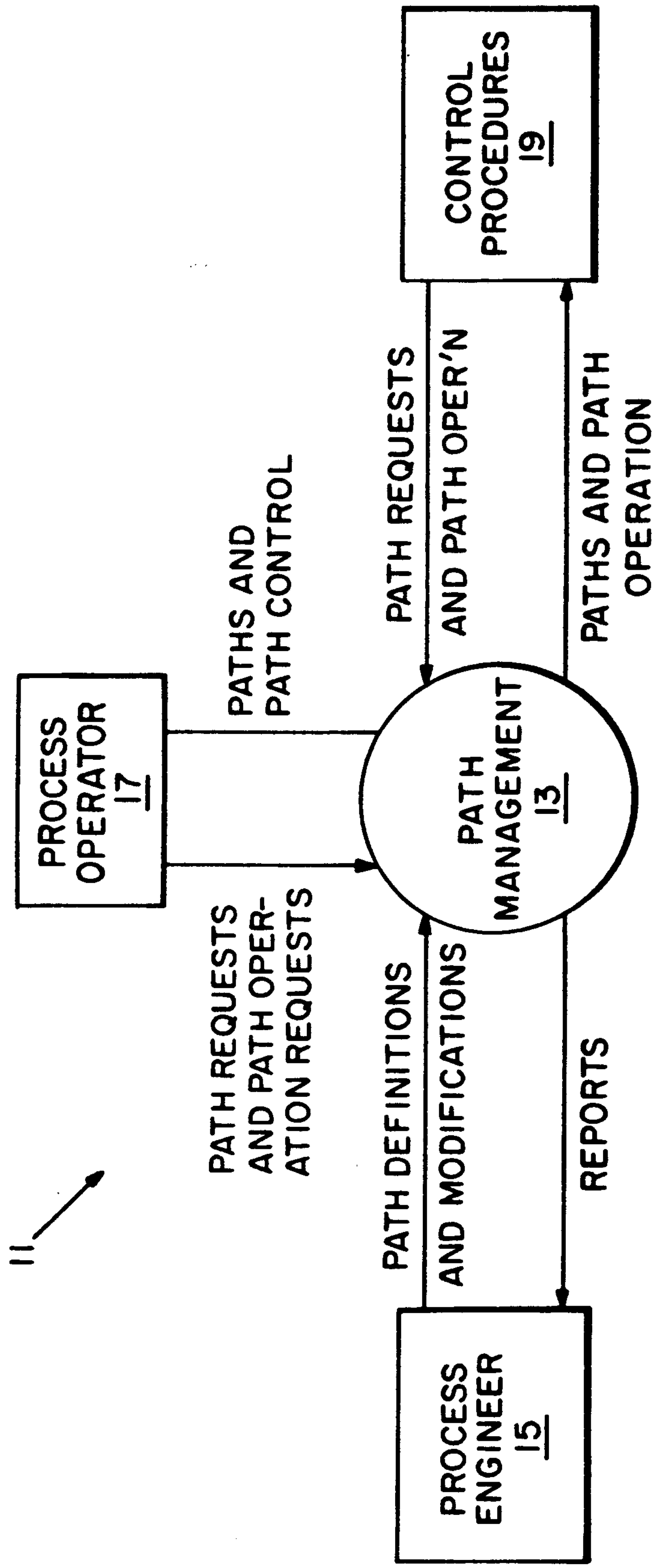
FIG. 1 a block diagram of a process system employing the present invention.
Figure 2:
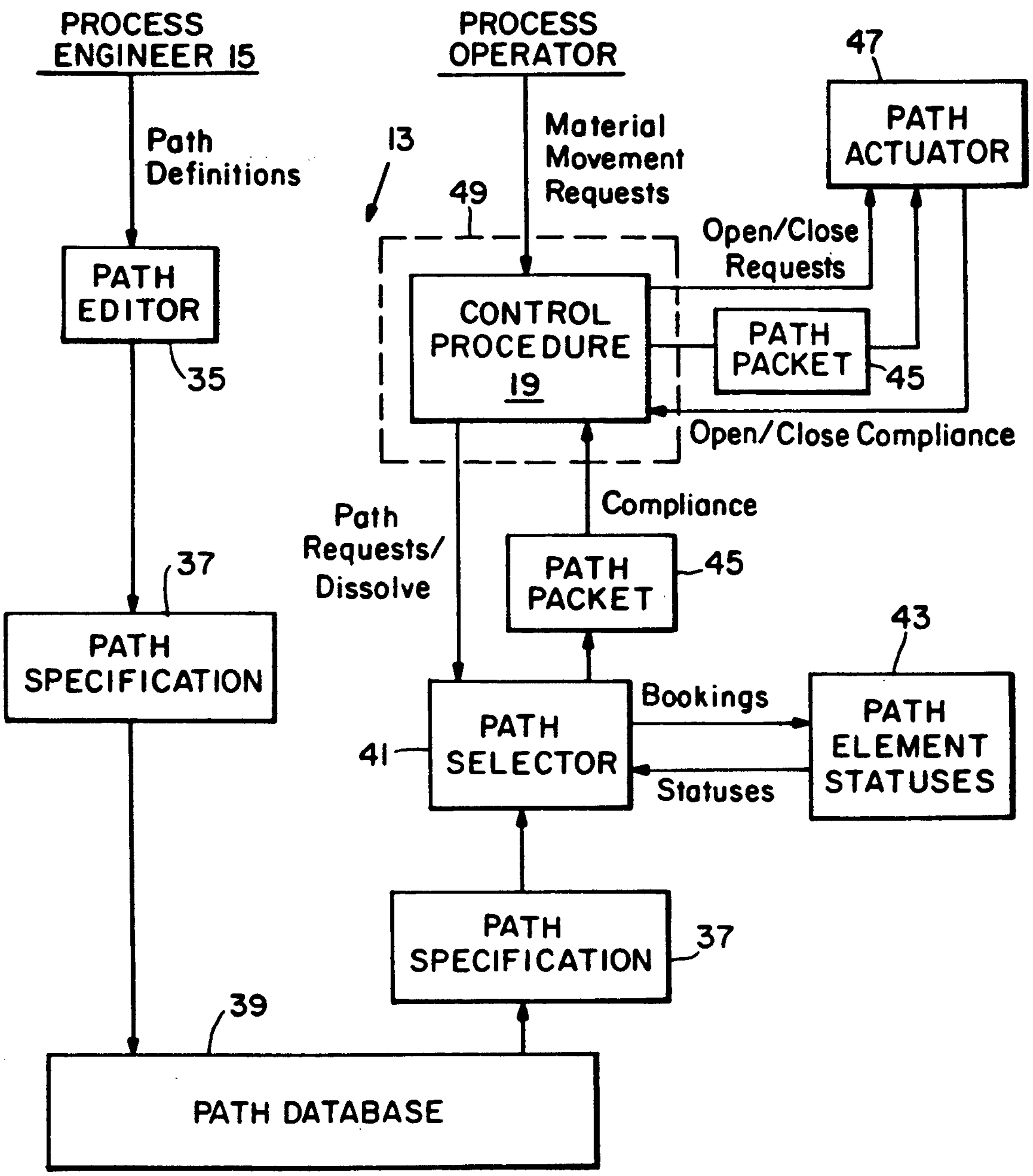
FIG. 2 is a block and data flow diagram of an embodiment of the present invention as employed in the process system of FIG. 1.

This specification defines the conceptual functionality of a path management technique to address the problems of the prior art. FIG. 1 is a context diagram for this technique while FIG. 2 is a combined block and data flow diagram of an implementation of this technique.

Functional Requirements of a Solution.

Proper path management must accomplish the following:

Must offload process operators of the requirement to know the equipment content of the paths they exercise. Instead, control procedures should ignore the details of path formation and path equipment, and should restrict their path considerations to (1) when a path must be formed, and subsequently (2) when to operate the path.

Must relieve process operators of the necessity to define transfer paths, by providing the operator a menu of predefined paths, and by automatically selecting a path from a database of predefined paths.

Must allow process operators to select paths by type, meaning selection is based on combinations of an assortment of selection criteria.

Must provide Process Engineers as easy to use means for defining paths into the path database and for maintaining the path database.

Must handle paths as simple as a single valve, pump, switch, or data structure, and paths as complex as a great many elements that must be conditionally operated.

Must make paths wield-able as entities—little different than valves, switches, and the like to operators and control procedures alike, reducing path operation (externally) to simple commands, like open, close, shutdown, clean, etc.

Solutions providing this functionality fall into four general categories.

Solutions.

In the first solution—the least complex—the control system human interface provides a means for the process operator to pick (perhaps via a graphic display) the valves which constitute a path. This is actually manual path selection since the control system suggests nothing and remembers nothing beyond each such path formation.

Sophistications of this approach might make it easier for the operator to select a path, but this is not automatic path selection. And even if the control system remembered (into a library) the operator's path selections, there is still no provision for operating the paths in complex, coordinated ways as single entities.

The second solution entails a program whose logic embodies the decision rules (path algorithms) which the operator uses. The program is a sort of expert, and indeed might be implemented using an expert shell. The program accepts selection criteria as input and determines a path of equipment based on rules it knows.

This solution is obviously superior to the first—in that it provides automatic path selection. However, this solution has the shortcoming that it is bound to a given plant configuration. Even for the plant instance, the addition, deletion, or repositioning of a single equipment can have severe consequences on the validity of the program.

Solution three is a relational-database approach augmented with computer programs for database building, path selecting, and path operating. It emphasizes user configuration work, as against user programming. The database is a library of accepted, predefined paths. Its database tuples are herein termed path specifications.

Each path specification establishes criteria for selecting it, a list of the equipment which constitute the path, a list of conditions for validating the real-time availability of the path, and specifications of the operations which may be performed with the path.

This solution is obviously more flexible. It is quickly understood by its users. Its configuration emphasis makes it superior to the first two solutions. It is highly reusable; only the database—not the computer programs—need change when the process environment evolves. Maintenance of the database is made easy by an editor program.

The fourth solution is perhaps the most elegant, but also the most complex.

This solution conceives/maps the process as a graph of nodes and arcs. The graph is more than a topological model; true, each node depicts an equipment, but the arcs signify deep relations between equipment.

This solution provides the most automatic form of path selection. No library of paths—as in solution three—is necessary. This solution computes possible paths based on the process graph.

The difficulty with this solution is firstly, the difficulty of developing it—an effective implementation requires special skills and probably a long development time; secondly, it is not intuitively obvious how to incorporate the operation of paths as entities.

Since the first solution does not properly satisfy our requirements for automatic path selection, it is not a solution at all. The second solution does not provide a general-purpose solution and is therefore unacceptable.

In view of its cost-effectiveness and simplicity to understand and use, and in view of the uncertainties in the fourth approach, this document prefers solution three.

PATH CONCEPTS.

A transfer path is a route through a matrix of elements (pipes, valves, pumps, conveyors, etc.). Applications which vary transfer paths for the same operation have these basic needs:

Must be able to find different transfer paths at different times for the same selection criteria, for example the same origin and destination pair.

Must be able to evolve a path, adding and deleting path elements as the operation progresses.

Must be able to exclusively appropriate some path elements.

Must be able to share some path elements with concurrent operations.

Path Elements.

The above requirements suggest a path composed of path segments (or recursively, a path of paths). A path segment in turn is composed of path elements (valves, pumps, etc.). The complete definition of a path includes (1) not only those elements in the direct line of the path, but (2) also those which border the path and insure, by their proper state, the integrity of the path.

A means is required for describing paths in this manner. A path description using the following assignable statuses for path elements (in-line and bordering) is such a means:

Not in use, meaning the element is not a member of any designated path at the moment.

Locked, meaning the element is currently owned but can be designated to more than one path—as long as both paths lock the element to the same state. Indeed, any owner (path) who locks an element makes a promise to the environment that the control state of the element will remain the same for as long as it is selected. An element so locked may not be unlocked until all paths which locked it are dissolved. The locked status is an express provision to facilitate equipment-sharing.

Secured, meaning the element is reserved for the exclusive use of a single path. Path elements which will be operated during the interval while the path is selected must be assigned this status.

Out of Service, meaning the element is unusable either because it has failed or because it is being maintained. An element with this state cannot be designated to any path.

Paths themselves have states. An operator or engineer may have reason to query the status of a path, and the management of paths requires they have interrogatable statuses. Paths have at least the following states: In-use, meaning the path has been selected by an operator. The path remains in-use until it is dissolved by the path/agent who invoked it.

Dissolved, meaning the path is not in use.

Since a path is operated as a entity (e.g., OPEN PATH, CLOSE PATH, CLEAN, FAIL PATH), just like one equipment, an effective design will allow a path to assume the same attributes as any path element.

HUMAN INTERFACE.

Referring to FIGS. 1 and 2, there are two human interfaces 17, 15: one for Process Operators, and one for Process Engineers.

Process Operator Interface 17.

This interface allows an operator to (1) select a path from a menu of predefined paths, (2) invoke a display of the path's equipment, (3) operate the path as an entity, and (4) dissolve (release) the path.

Process Engineer Interface 15.

This interface is provided for path designers who identify and specify paths, and who must maintain the Path Database 39. A Path Editor 35 accepts Path Specifications 37 from an engineer, and commits them to the Path Database 39.

Specifically, the Path Editor 35 allows for adding, modifying, deleting, and reporting Path Specifications 37. When adding, the Path Editor 35 provides a copy facility to make the definition task easier. (The copy becomes the basis for defining the new Path.) When reporting, the Path Editor 35 provides display and hardcopy presentations, according to user-selected sortkeys.

Path Specification.

A path specification 37 (FIG. 2) is a database 39 tuple which completely describes one path.

When the process engineer defines a path, a series of four computer generated screen views prompt for a complete path specification, comprising four categories of information:

Selection Attributes
Validation criteria
Declaration of Path Elements
Path Operation specifications These categories are detailed in the following subsections.

Selection Attributes.

These are the features of a path which establish its selectability, e.g., where the path begins, where it goes to, the type of path it is, etc. The particular attributes of a path depend on the nature of the application; the combinations required for a given selection are optional.

The following are given as examples:

General Origin

In order for the package (computer apparatus or digital processor apparatus) 13 of the present invention to honor a request to select a path from among a set of paths, each member of the set must have a common origin and destination. These common origin and destination are identified in General Origin and General Destination attributes.

General Destination

See General Origin above.

Specific Origin

This attribute identifies the specific path element of origin.

Specific Destination

This attribute identifies the specific path element that is the destination (inclusive).

Control Procedure Attribute

This attribute identifies the control procedure 19, or family of procedures, for which the path is appropriate.

Length/Capacity

This optional attribute quantifies the length of the path or its capacity. This attribute supports path searches for "shortest path", "greatest volume", etc.

Rank

This attribute establishes the preferential rank of the path, relative to other paths having the same general origin and destination, and control procedure. This attribute may be referenced alphabetically (e.g., primary, secondary, etc.) or numerically by integers. Numeric references are interpreted as a scale of preference, "1"representing first choice. Alphabetic references will only support a search for a match.

Display

This optional attribute identifies a display, probably a graphic, to be associated with the path. The value of the attribute is a string variable assumed to be a display name.

Validation Criteria.

A path is "acquired" in real time, exercised for a time interval, then "dissolved".

The selection attributes of a path make it possible to distinguish an appropriate path. The Validation Criteria are the means of determining the usability of a path at the moment we wish to acquire it. That is, the elements, or perhaps only some of the elements, of the path may be in use by another path; or path elements may be failed and out of service. The Validation Criteria are just a list of the path elements which constitute the path and its border, and their acceptable states.

The acceptable state of an element depends on how the path we are defining will be exercised by the Process Operator 17 or the Control Procedure 19. A border valve, for example, is likely to be locked closed in any case. More complexly, however, if the path will be opened and closed during operation then obviously no sharing of in-line elements is possible. But if we know that the path will be opened or closed, and left that way for the duration of the procedure, then we might want to lock some element states to afford simultaneous use.

Validation Criteria are specified in two fields, (1) Elements, and (2) Acceptable States. The first field is to contain the system ID of each element. The latter field describes acceptable states of each element as one of these three:

Not in use
Locked open,
Locked closed,

Declaration of Path Elements.

A six-columned screen view of a Path Specification is (computer generated and) displayed for the process engineer. This screen view both identifies the specific elements of the path, and assigns states to those elements. In general, this list comprises the same elements as the Validation Criteria.

Important: The order of this list becomes the order of operation when the path is exercised.

Column one, Order, allows either of two values: Serial or Parallel. Serial indicates that the element to the right of the column must be confirmed as operating properly before any succeeding elements can be operated. Parallel indicates that succeeding elements may be operated without confirming operation of the element at the right. A blank Order line defaults to Serial.

The second column, Type, identifies the element type. There are four element types: analog, bi-state, manual, and procedure. Analog elements are devices which operate over some continuous range. Bi-state elements are on/off devices. Manual elements require operator notification to operate, and operator confirmation that the element is correctly operating/positioned. Procedure elements may be computer programs or sequence blocks.

The third column, Elements, contains the system IDs of the path elements.

The fourth column, Assigned States, specifies the states which the Elements will assume for the duration of the path. (Refer to Section 2.0 for state descriptions.) Columns 5 and 6, Parameters, apply only to analog and procedure types. For analog types these two parameters are a setpoint and a ramp rate. For procedure types these are two values that, if present, will be passed to the computer program or sequence block.

Path Operation Specifications.

A screen view corresponding to this category of information to be provided by the process engineer addresses four important operating scenarios:

Path Initialization (optional)

Opening the path (optional)

Closing the path (optional)

Failing the path (optional)

This section is provided for complex paths. Simple paths will not be initialized, will be operated as indicated on the Declaration of Path Elements screen view, and either will not require failure handling, or will handle failures in some other way. The data entries to this screen view are the names of Sequence Blocks dedicated to the Path and the particular path function (open, close, fail, initialize).

FUNCTIONAL PARTS

FIG. 2 illustrates this path management package, i.e., computer apparatus or digital processor apparatus of the present invention 13 at a conceptual level. The shaded objects are components of the computer apparatus or digital processor apparatus (software package) 13. The Control Procedure(s) 19 is an application-specific component which uses the present invention software package 13. The shadowed boxes represent data structures.

Path management consists of three functional components built around a path database 39: Path Editor 35, Path Selector 41, and Path Actuator 47. In brief, the process engineer 15 will design paths and will commit them to a Path Database 39 via a Path Editor 35. Thereafter, control procedures 19 and/or the process operator 17 will obtain transfer paths through a Path Selector 41; in turn, an obtained path will be actuated (opened/closed) via a Path Actuator 47.

The Path Database 39.

This database is the repository of all path specifications submitted to the Path Editor 35 by the process engineer 15. In a preferred embodiment this is an Informix-managed database. Currently Applicants are unaware that the database record would contain anything other than just the information supplied on the Path Specification 37.

Path Editor 35.

This editor will provide capabilities for adding, deleting, modifying, and reporting paths and path sets. In its simplest form the Editor 35 is Informix, an interactive structured query language.

The Path Selector 41.

This component serves several purposes.

First, it provides Control Procedures 19 friendly access to the Path Database 39. Calls like FIND PATH and DISSOLVE PATH eliminate any need for the Control Procedures 19 to understand either the Path Database 39 or even the formatting of a Path Specification record.

Secondly, the Path Selector 41 validates the path it finds. It accomplishes this by comparing the validation criteria from the Path Specification 37 corresponding to the path with a real-time database 43. This latter database 43 is one maintained by the Path Selector 41 as it allocates paths and path elements to specific Control Procedures 19.

Finally, the Path Selector 41 forwards a Path Packet 45 to the Control Procedure 19. This packet 45 is a truncated version of the Path Specification 37, omitting the path selection attributes and validation criteria.

The Path Actuator 47.

The Control Procedure 19 (usually a Sequence Block in some Control or host/digital Processor 49 shown in broken lines) will determine when to acquire a path, and when to operate it. The Path Actuator 47 will handle the specific I/O operations. This module understands the specific format and content of a Path Packet 45, and provides friendly Calls for a Control Procedure 19 to OPEN PATH and CLOSE PATH.

These calls pass the Path Packet 45 and a Notify variable to the Actuator 47. The Notify variable is an export variable of the caller's digital processor 49. The Actuator 47 uses the Notify variable to inform the Control Procedure 19 of the following:

operation in-process operation complete path failure (equipment failure)

path failure (path encroaches on an existing path)

Path Types and Elements.

Path management must accommodate paths having at least the following path elements:

on/off valves modulating valves single speed pumps variable speed pumps on/off switches (for conveyors, etc.)

Paths are as simple as a single valve. At the other end of the scale are complex paths perhaps covering long distances and composed of many path elements. But complex paths must also be procedurally operated, observing strict order and timing of device operation. It is necessary therefore that Path Specifications 37 not only differentiate among analog, digital, and manual elements, but also procedures.

```
/*************************************************************************
* @(#)pac_com.c       1.3  New System, Foxboro Co.  8/17/89
*************************************************************************
*
* (C)Copyright by Foxboro Company  1988
*
* All rights reserved:  Foxboro Company  1988
*
*************************************************************************
*
* FILE ID              : PAC_COM.C
*
* PART NUMBER          :
*
* FUNCTION             : Path controller communication functions
*
* FUNCTIONS CONTAINED :
*
*       - PPi_wtevent           Initialize PAC for external events
*       - PPe_wtevent           Clean up for exit
*       - PPwt_event            Wait for IPC and/or OM event
*       - PPreply               Send reply on IPC message
*       - PPsend                Send IPC message
*       - PPc_rcv               Check for IPC "receive done" event
*       - PPc_send              Check for IPC "send done" event
*       - PPc_om_event          Check for OM event
*       - PPget_efn             Get IPC event flag
*
* DATA STRUCTURES      :
*
* COMPONENT HISTORY    :
*************************************************************************/

static char SCCS_ID[] = "@(#)pac_com.c  1.3\t(89/08/17)";

#include "pac.h"

#include <fox/hiio.h>
#include <fox/hierrors.h>

/*FF*/
/********************************************************************
*
* (C) Copyright by Foxboro Company 1988
*
* All rights reserved: Foxboro Company 1988
*
********************************************************************
*
* NAME                : PPi_wtevent
*
* FUNCTION            : Initialize PAC for communication
*
* INPUT PARAMETERS    : none
*
* IN/OUT PARAMETERS   : Event database
*
* OUTPUT PARAMETERS   : none
*
* RETURN CODES        : - PAM_OK
*                       - P_FATAL_ERROR
*
* SYNOPSIS            : PPi_wtevent(&evdb)
*
* PRECONDITIONS       : - to be called only once at startup
*                       - ev->cmd_apname and ev_log_apname are
*                         filled in by caller.
*
* ERRORS/EXCEPTIONS   :
*     - Cannot create shared variable PROCESS name (P_FATAL_ERROR)
*     - Cannot register for IPC                    (P_FATAL_ERROR)
*     - Cannot activate IPC                        (P_FATAL_ERROR)
*     - Cannot initialize HI library               (P_FATAL_ERROR)
*     - Cannot initialize HI console               (P_FATAL_ERROR)
*
* FUNCTIONS CALLED    : - PPget_efn
*                       - PPerr_rpt
*
* DETAILED DESIGN     :
*   initialise event database
*   retrieve process ID of Path Controller
*   create OM process name object
*   register for IPC
*   activate IPC
*   initialise HI library for HIwtevent
```

```
*
* REMARKS              :
*
* COMPONENT HISTORY  :
*   08 NOV 88 WC integrate with PAN error reporter
*   09 JAN 89 RD event numbering started at 3
*   02 AUG 89 RD event numbering started at 1
*************************************************************************/
#ifdef unix
extern int fd_station;
#endif

int PPi_wtevent(ev)
EVENT_DESC *ev;
        {
        int result;
        char err_str[LINE_LENGTH];

/*   initialise ev */

        memset(ev->efn, 0, sizeof(EFN_DBLK) * (MAX_EFN + 1));
        ev->next_efn = 1;

        ev->buf_size = IPC_BUF_SIZE;
        ev->max_val_list_size = SIZE_VAL_LIST;
        ev->rcv_efn = PPget_efn(ev, INUSE_RCV);
        ev->event_type = EV_RCV;        /* force PPwtevent to do clreceive */

#ifdef unix
        ev->pid = getpid();             /* retrieve process ID */
#endif

/* setup for IPC */

        result = obj_create(ev->cmd_apname, PROCESS, 0, 0);
        if (result != OM_SUCCESS)
                {
                sprintf(err_str, "obj_create %d", result);
                PPerr_rpt(PAN, PE_INIT, ev->cmd_apname, err_str);
                return P_FATAL_ERROR;
                }

        result = cs_reg_exit(ev->cmd_apname, 0, NULLP(char *), CDT, 1, 1);
        if (result != CALL_COMPLETE)
                {
                obj_delete(ev->cmd_apname, PROCESS);
                sprintf(err_str, "cs_reg_exit  %d", result);
                PPerr_rpt(PAN, PE_INIT, ev->cmd_apname, err_str);
                return P_FATAL_ERROR;
                }

        result = cs_activate(ev->cmd_apname, CDT);
        if (result != CALL_COMPLETE)
                {
                obj_delete(ev->cmd_apname, PROCESS);
                sprintf(err_str, "cs_activate  %d", result);
                PPerr_rpt(PAN, PE_INIT, ev->cmd_apname, err_str);
                return P_FATAL_ERROR;
                }

/* initialise for HIwtevent */

#ifdef unix
        result = HIizhi_library();
        if (result != OK )
                {
                sprintf(err_str, "HIiz_library  %d", result);
                PPerr_rpt(PAN, PE_HIINIT, ev->cmd_apname, err_str);
                return P_FATAL_ERROR;
                }

        fd_station = 100;

#endif

        return PAN_OK;
        }
/*FF*/
/*************************************************************************
*
* (C) Copyright by Foxboro Company 1988
*
```

```
 * All rights reserved: Foxboro Company 1988
 *
 ******************************************************************
 *
 * NAME                : PPe_wtevent
 *
 * FUNCTION            : Cancel IPC events (if any) and delete process
 *                       name from object directory
 *
 * INPUT PARAMETERS    : none
 *
 * IN/OUT PARAMETERS   : Event database
 *
 * OUTPUT PARAMETERS   : none
 *
 * RETURN CODES        : none
 *
 * SYNOPSIS            : PPe_wtevent(&evdb)
 *
 * PRECONDITIONS       : none
 *
 * ERRORS/EXCEPTIONS   : none
 *
 * FUNCTIONS CALLED    : none
 *
 * DETAILED DESIGN     :
 *   cancel outstanding IPC requests
 *   undo IPC register
 *   delete process name object
 *
 * REMARKS             :
 *
 * COMPONENT HISTORY   :
 *
 ******************************************************************/

void PPe_wtevent(ev)
EVENT_DESC *ev;
        {
        cl_cancel(ev->cmd_apname);
        cs_unregister(ev->cmd_apname, CDT);
        obj_delete(ev->cmd_apname, PROCESS);

#ifdef DEBUG
#ifdef unix
        printf("PAC: Goodbye !\n");
#endif
#endif
        }

/*FF*/
/******************************************************************
 *
 * (C) Copyright by Foxboro Company 1988
 *
 * All rights reserved: Foxboro Company 1988
 *
 ******************************************************************
 *
 * NAME                : PPreply
 *
 * FUNCTION            : send reply on IPC message
 *
 * INPUT PARAMETERS    : - reply destination
 *                       - message reference
 *                       - reply type
 *                       - error code
 *                       - additional reply data
 *
 * IN/OUT PARAMETERS     - event database
 *
 * OUTPUT PARAMETERS   : none
 *
 * RETURN CODES        : none
 *
 * SYNOPSIS            : PPreply(ev, dest, ref, type, err, reply_body)
 *
 * PRECONDITIONS       : none
 *
 * ERRORS/EXCEPTIONS   :
 *     - no event flags available
 *
 * FUNCTIONS CALLED    :  - PPget_efn
 *                        - PPerr_rpt
 *                        - PPc_send
 *
```

```
 * DETAILED DESIGN     :
 *   format input data to reply body
 *   make a work copy of reply dest struct
 *   get destination from reply dest struct
 *   get an IPC event flag for usage = SEND
 *   if not available
 *     log the error on PAM error reporter
 *     return
 *   else
 *     send msg using copy of reply dest
 *     if cl_send returned an invalid message id
 *       release event flag
 *     else
 *       save message id in event database.efn
 *       perform check_io
 *
 * REMARKS             :
 *
 * COMPONENT HISTORY  : Aug 26 '88 WC initial setup
 *
 ******************************************************************/

void PPreply(ev, reply_dest, ref, type, error_code, reply_body)
EVENT_DESC *ev;
RPY_DEST *reply_dest;
char *ref;
int type;
int error_code;
char *reply_body;
        {
        char xmit_buf[LINE_LENGTH];
        int msg_id;
        struct event_spec event;
        RPY_DEST dup_dest;
        char err_str[LINE_LENGTH];

        sprintf(xmit_buf, "%s:%d:%d:%s", ref, type, error_code, reply_body);

        memcpy(&dup_dest, reply_dest, sizeof(RPY_DEST));
        event.efn = PPget_efn(ev, INUSE_SND);
        if (event.efn == 0)
                {
                PPerr_rpt(PAM, PE_SEND, ev->cmd_apname, "PPreply: no event flags available");
                return;
                }

        msg_id = cl_send( dup_dest.o_name, &dup_dest,
             ( long ) ( strlen( xmit_buf ) + 1 ), xmit_buf, &event );
        if (msg_id < 0)
                {
                ev->efn[event.efn].usage = NOT_IN_USE;
                sprintf(err_str, "cl_send in PPreply  %d", msg_id);
                PPerr_rpt(PAM, PE_SEND, ev->cmd_apname, err_str);
                }
        else
                {
                ev->efn[event.efn].msg_id = msg_id;
                PPc_send(ev, event.efn);
                }
        }

/*FF*/
/*******************************************************************
 *
 * (C) Copyright by Foxboro Company 1988
 *
 * All rights reserved: Foxboro Company 1988
 *
 *******************************************************************
 *
 * NAME                :  PPsend
 *
 * FUNCTION            :  Send IPC message
 *
 * INPUT PARAMETERS    :  - ap_name of destination process
 *                        - transmit data buffer
 *                        - size of transmit data buffer
 *
 * IN/OUT PARAMETERS   :  event database
 *
 * OUTPUT PARAMETERS   :  none
 *
```

```
* RETURN CODES         :  none
*
* SYNOPSIS             :  PPsend(&ap_name, &msg, size, &evdb)
*
* PRECONDITIONS        :  none
*
* ERRORS/EXCEPTIONS    :  no event flag available
*
* FUNCTIONS CALLED     :  - PPget_efn
*                         - PPerr_rpt
*                         - PPc_send
*
* DETAILED DESIGN      :
*   get an IPC event flag for usage = SEND
*   if not available
*     log the error on PAM error reporter
*     return
*   else
*     send msg using apname for destination
*     if cl_send returned an invalid message id
*       release event flag
*     else
*       save message id in event database.efn
*       perform check_io
*
* REMARKS              :
*
* COMPONENT HISTORY    :
*
*****************************************************************/

void PPsend(ap_name, msg, size, ev)
char *ap_name;
char *msg;
int size;
EVENT_DESC *ev;
        {
        int snd_id;
        struct event_spec event;
        struct chk_clinfo info;
        char err_str[LINE_LENGTH];

        event.efn = PPget_efn(ev, INUSE_SND);
        if (event.efn == 0)
                {
                PPerr_rpt(PAM, PE_SEND, ev->cmd_apname, "PPsend: no event flags available");
                return;
                }

        memset(&info, 0, sizeof(struct chk_clinfo));
        snd_id = cl_send(ap_name, &info, (long) size, msg, &event);
        if (snd_id < 0)
                {
                ev->efn[event.efn].usage = NOT_IN_USE;
                sprintf(err_str, "PPsend id = %d", snd_id);
                PPerr_rpt(PAM, PE_SEND, ev->cmd_apname, err_str);
                }
        else
                {
                ev->efn[event.efn].msg_id = snd_id;
                PPc_send(ev, event.efn);
                }
        }

/*FF*/
/*****************************************************************
*
* (C) Copyright by Foxboro Company 1988
*
* All rights reserved: Foxboro Company 1988
*
******************************************************************
*
* NAME                 :  PPwt_event
*
* FUNCTION             :  Wait for IPC and/or OM event
*
* INPUT PARAMETERS     :  - suspend flag, 0 = do not suspend
*                                  else suspend
*
* IN/OUT PARAMETERS    :  event database
*
* RETURN CODES         :  none
*
* SYNOPSIS             :  PPwt_event(suspend, &evdb)
*
```

```
* PRECONDITIONS      :  none
*
* ERRORS/EXCEPTIONS  :
*      - clreceive returns an error
*      - Hlwtevent returns an invalid event number
*
* FUNCTIONS CALLED   :  - PPc_om_event
*                        - PPc_rcv
*                        - PPc_send
*                        - PPerr_rpt
*
* DETAILED DESIGN    :
*    if previous event was IPC receive then
*       setup for new receive
*    if suspend flag is not set then
*      check but don't wait for OM event
*      if dqchange happened then
*        fill in OM id, value list, size of list in event db
*        return
*      else
*        check for received IPC message
*        if msg received then
*          fill in msg, size and ipc chk data in event db
*          return
*        else
*          set event type to NO_EVENT
*          return
*    else
*      wait for event using Hlwtevent (no time out)
*      if event number is between 1 and 32 then
*        check usage field in IPC data block
*        if usage is RCV then
*          handle receive event
*          if msg received then
*            fill in msg, size and ipc chk data in event db
*            return
*        else
*          if usage is SEND then
*            handle send event
*      else
*        if event is OM event then
*          handle OM event
*          if dqchange happened then
*            fill in OM id, value list, size of list in event db
*            return
*
* REMARKS            :
*
* COMPONENT HISTORY  :
*
*****************************************************************/

#define NO_TIMEOUT 0L
#define ALL_EVENTS 0xFFFFFFFFL

void PPwt_event(suspend, ev)
int suspend;
EVENT_DESC *ev;
        {
        EDM_TYPE event_data;
        int rcv_id;
        int efn;
        struct event_spec event;
        char err_str[LINE_LENGTH];
/*
#ifdef DEBUG
#ifdef unix
        printf("PAC: Check or wait for event, suspend = %d\n", suspend);
#endif
#endif
*/
/* if previous event was a receive then set up for new receive */

        if (ev->event_type == EV_RCV)
                {
                event.efn = ev->rcv_efn;
                memset(&ev->data.msg.reply_dest, 0, sizeof(RPY_DEST));
                rcv_id = cl_receive(ev->cmd_apname, (long) ev->buf_size,
                &ev->data.msg.reply_dest, ev->data.msg.buf, &event);
                if (rcv_id < 0)
                        {
                        sprintf(err_str, "cl_receive in PPwtevent  %d", rcv_id);
                        PPerr_rpt(PAN, PE_RECEIVE, ev->cmd_apname, err_str);
```

```
                        }
                else
                        ev->efn[event.efn].msg_id = rcv_id;
                }

        ev->event_type = EV_NOP;

        if (suspend == 0)
                {
                PPc_om_event(ev);
                if (ev->event_type == EV_OM)
                        return;

                PPc_rcv(ev);
                return;
                }

        while (1)
                {
                efn = HIwtevent(ALL_EVENTS, &event_data, NO_TIMEOUT);

                if(efn >= 1 && efn <= MAX_EFN)
                        switch (ev->efn[efn].usage)
                                {
                        case INUSE_SND:
                                PPc_send(ev, efn);
                                break;

                        case INUSE_RCV:
                                PPc_rcv(ev);
                                if (ev->event_type == EV_RCV)
                                        return;
                                }

                else if (efn == OM_EVENT)
                        {
                        PPc_om_event(ev);
                        if (ev->event_type == EV_OM)
                                return;
                        }

                else
                        {
                        sprintf(err_str, "efn = %d", efn);
                        PPerr_rpt(PAM, PE_HIWAIT, ev->cmd_apname, err_str);
                        }
                }                               /* end while; no event */
        }

/*FF*/
/*****************************************************************
*
* (C) Copyright by Foxboro Company 1988
*
* All rights reserved: Foxboro Company 1988
*
******************************************************************
*
* NAME                 :  PPc_rcv
*
* FUNCTION             :  Check for receive IPC done event
*
* INPUT PARAMETERS     :  none
*
* IN/OUT PARAMETERS    :  event database
*
* OUTPUT PARAMETERS    :  none
*
* RETURN CODES         :  none
*
* SYNOPSIS             :  PPc_rcv(&evdb)
*
* PRECONDITIONS        :  none
*
* ERRORS/EXCEPTIONS    :
*     - cl_chkio returns an invalid result
*
* FUNCTIONS CALLED     :  - PPerr_rpt
*
* DETAILED DESIGN      :
*   get message id from event database
*   do cl_chkio
*   if cl_chlio returned msg id then
*     fill in msg. size and chk data in event db
*     return
```

```
*   else
*     if cl_chkio did not return IN PROGRESS then
*       log the error on PAM error reporter
*
* REMARKS             :
*
* COMPONENT HISTORY   :
*
*****************************************************************/

void PPc_rcv(ev)
EVENT_DESC *ev;
        {
        int rcv_id, result;
        char err_str[LINE_LENGTH];

        rcv_id = ev->efn[ev->rcv_efn].msg_id;
        result = cl_chkio(rcv_id, CLRECEIVE, &ev->data.msg.reply_dest, ev->data.msg.buf);
        if (result == rcv_id)
                {
                ev->data.msg.buf[ev->data.msg.reply_dest.r_size] = NULLC;
                ev->event_type = EV_RCV;
                }

        else if (result != IN_PROGRESS)
                {
                sprintf(err_str, "cl_chkio in PPc_rcv  %d", result);
                PPerr_rpt(PAM, PE_RECEIVE, ev->cmd_apname, err_str);
                }
        }

/*FF*/
/*****************************************************************
*
* (C) Copyright by Foxboro Company 1988
*
* All rights reserved: Foxboro Company 1988
*
******************************************************************
*
* NAME                : PPc_send
*
* FUNCTION            : Check for send IPC done event
*
* INPUT PARAMETERS    : event number
*
* IN/OUT PARAMETERS   : event database
*
* OUTPUT PARAMETERS   : none
*
* RETURN CODES        : none
*
* SYNOPSIS            : PPc_send(&evdb, efn)
*
* PRECONDITIONS       : none
*
* ERRORS/EXCEPTIONS   :
*     - cl_chkio returns an invalid result
*
* FUNCTIONS CALLED    : - PPerr_rpt
*
* DETAILED DESIGN     :
*   get message id from event database
*   do cl_chkio
*   if cl_chlio returned msg id then
*     release event flag
*   else
*     if cl_chkio did not return IN PROGRESS then
*       log the error on PAM error reporter
*
* REMARKS             :
*
* COMPONENT HISTORY   :
*
*****************************************************************/

void PPc_send(ev, efn)
EVENT_DESC *ev;
int efn;
        {
        int result, snd_id;
        struct chk_clinfo info;
        char err_str[LINE_LENGTH];
```

```
        snd_id = ev->efn[efn].msg_id;
        result = cl_chkio(snd_id, CLSEND, &info, NULLP(char));

        if (result == snd_id)
                ev->efn[efn].usage = NOT_IN_USE;

        else if (result != IN_PROGRESS)
                {
                sprintf(err_str, "cl_chkio in PPc_send  %d", result);
                PPerr_rpt(PAM, PE_SEND, ev->cmd_apname, err_str);
                }
        }

/*FF*/
/*****************************************************************
*
* (C) Copyright by Foxboro Company 1988
*
* All rights reserved: Foxboro Company 1988
*
******************************************************************
*
* NAME                 :  PPc_om_event
*
* FUNCTION             :  Check for OM event
*
* INPUT PARAMETERS     :  none
*
* IN/OUT PARAMETERS    :  event database
*
* OUTPUT PARAMETERS    :  none
*
* RETURN CODES         :  none
*
* SYNOPSIS             :  PPc_om_event(&evdb)
*
* PRECONDITIONS        :  none
*
* ERRORS/EXCEPTIONS    :
*     - dqchange returns an error
*
* FUNCTIONS CALLED     :  - PPerr_rpt
*
* DETAILED DESIGN      :
*   do dqchange
*   check result
*   if SUCCESS or NOTEMPTY then
*     save om id, value list and its size in event db
*     return
*   else
*     if ESECURE or EOPENED or ECONBAD
*     log the error on PAM error reporter
*
* REMARKS              :
*
* COMPONENT HISTORY    :  ?? ??? 1988 - WC - Initial Setup
*                         07 FEB 1989 - RD - No error report for ENOTOPENED
*                         01 AUG 1989 - RD - Error report for ENOTOPENED
*                         14 AUG 1989 - RD - No error report for ENOTOPENED
*                                            This error is caused by updates
*                                            for lists which have already been
*                                            closed.
*
*****************************************************************/

#define NOSUSPEND 0

void PPc_om_event( ev )
EVENT_DESC       *ev;
{
    int          result;
    char         err_str[LINE_LENGTH];

#ifdef DEBUG
#ifdef unix
    printf( "PAC: Check OM DQCHANGE\n ");
#endif
#endif

    result = dqchange( ev->pid, NOSUSPEND, &ev->data.dqch.om_id,
        ev->max_val_list_size, ev->data.dqch.val_list, &ev->data.dqch.size );

#ifdef DEBUG
#ifdef unix
    printf( "DQCHANGE: result = %d, size = %d, om_id = %d\n", result,
        ev->data.dqch.size, ev->data.dqch.om_id );
```

```
#endif
#endif

    switch (result)
    {
    case OM_SUCCESS:
    case EQNOTEMPTY:
        ev->event_type = EV_OM;
        break;

    case EQEMPTY:
    case ENOTOPENED:
        break;

    default:
        sprintf( err_str, "Error %d, ignored", result );
        PPerr_rpt( PAM, PE_DQCHANGE, ev->cmd_apname, err_str );
        break;

    } /* End of switch */

} /* End of PPc_om_event */

/*****************************************************************
*
* (C) Copyright by Foxboro Company 1988
*
* All rights reserved: Foxboro Company 1988
*
******************************************************************
*
* NAME                  :  PPget_efn
*
* FUNCTION              :  Get event number
*
* INPUT PARAMETERS      :  usage of the block (RECEIVE or SEND)
*
* OUTPUT PARAMETERS     :  none
*
* RETURN CODES          :  Id of new IPC data block.
*
* SYNOPSIS              :  id = PPget_ipc_dblk(ev, usage)
*
* PRECONDITIONS         :  none
*
* ERRORS/EXCEPTIONS     :  no event flag available
*
* FUNCTIONS CALLED      :  none
*
* DETAILED DESIGN       :
*    find free IPC data block
*    set usage to specified usage
*    cleanup contents of block
*    return block identifier
*
* REMARKS               :
*
* COMPONENT HISTORY     :
*
*****************************************************************/

int PPget_efn(ev, use)
EVENT_DESC *ev;
int use;
        {
        int i, efn;

        for (i = 1;  i <= MAX_EFN;  i++)
                {
                efn = (ev->next_efn)++;
                if (ev->next_efn > MAX_EFN)
                        ev->next_efn = 1;

                if (ev->efn[efn].usage == NOT_IN_USE)
                        {
                        ev->efn[efn].usage = use;
                        return efn;
                        }
                }

        return 0;
```

```
/*****************************************************************************
* @(#)pac_db.c 1.2  New System, Foxboro Co.  8/17/89
******************************************************************************
*
* (C)Copyright by Foxboro Company  1988
*
* All rights reserved:  Foxboro Company  1988
*
******************************************************************************
*
* FILE ID             : PAC_DB
*
* PART NUMBER         :
*
* FUNCTION            : P.A.M. Path controller database access functions
*
* FUNCTIONS CONTAINED :
*   PPa_pth         create new path database
*   PPd_pth         delete path database
*   PPal_mem_blk    allocate memory block
*   PPfm_mem_blk    free chain of memory blocks
*   PPalloc         allocate memory for storage of pat, step, name
*                   in memory block.
*   PPf_pth         find path if name is given
*   PPf_pat         find pattern if name is given
*   PPf_step        find step if step_no is given
*   PPa_pat         add pat to path
*   PPa_step        add step to pat
*   PPa_alarm       add alarm to database
*   PPa_name        add name to database
*   PPat_name       add name of type SHVNAME, CIONAME or DEVNAME to db
*   PPsort          sort names
*   PPg_name        get name from database
*   PPi_om_list     initialise object manager variables list
*   PPa_om_list     add 1 variable to object manager list
*   PPbld_alrm      build OM alarm list
*   PPa_sync_list   add item to Object manager list for sync vars
*   PPrm_sync_list  remove item from list
*   PPsetbit        set bit in bit array
*   PPclrbit        clear bit in bit array
*   PPzerobits      test all bits for zero
*   PPvtomnem       convert value to mnemonic
*   PPmnemtov       convert mnemonic to value
*
* DATA STRUCTURES     :
*   PPDfailsafe     auto failsafe switch  value / mnemonic translation table
*   PPDmode         pattern operation mode value / mnemonic translation table
*   PPDpattype      pattern type value / mnemonic translation table
*   PPDrelation     boolean relation value / mnemonic translation table
*   PPDstepstate    pattern step state value / mnemonic translation table
*   PPDvartype      action variable type value / mnemonic translation table
*
* COMPONENT HISTORY   : Dec  8, 1988 MVS PPa_pth() and PPd_pth modified
*                       Dec 15, 1988 MVS Add mnem tables PPDpattype, vartype
*                       Jan  4, 1989 RRD Changed NO_EXCEP into D_NO_EXCEP
*                       Jun 30, 1989 RRD Changed order of PPDrelation[]
*                                        Changed delta from 0.0 to 0.1
*                       Jul 13, 1989 RRD Increased some sizes from
*                                        VAR_NAME_SIZE to VAR_NAME_SIZE+2
*
*****************************************************************************/

static char SCCS_ID[] = "@(#)pac_db.c   1.2\t(89/08/17)";


#include "pac.h"

mnem_tbl PPDfailsafe[] = {
        0, "N",
        1, "Y",
        -1, "",
        };

mnem_tbl PPDmode[] = {
        PAC_MANUAL,  "M",
        PAC_AUTO,    "A",
        -1, "",
        };

mnem_tbl PPDpattype[] = {
        NO_PAT   , "N",
        NORM_PAT, "P",
        INIT_PAT, "I",
        FAIL_PAT, "F",
        -1       , "",
        };
```

```
mnem_tbl PPDrelation[] = {
        LE,  "<=",
        GE,  ">=",
        EQ,  "==",
        NE,  "!=",
        NE,  "<>",
        LT,  "<",
        GT,  ">",
        EQ,  "=",
        -1,  "",
        };

mnem_tbl PPDstepstate[] = {
        READY_FOR_STEP,    "R",
        WAITING_FOR_STEP, "S",
        WAITING_FOR_SYNC, "W",
        -1, "",
        };

mnem_tbl PPDvartype[] = {
        CHARACTER  , "C",
        INTEGER    , "I",
        FLOAT      , "F",
        STRING     , "S",
        BOOLEAN    , "B",
        OM_LNG_INT , "L",
        -1         , "",
        };

/*FF*/
/*****************************************************************
*
* (C) Copyright by Foxboro Company 1988
*
* All rights reserved: Foxboro Company 1988
*
******************************************************************
*
* NAME                : PPa_pth
*
* FUNCTION            : create path database and add it to list of
*                       path databases
*
* INPUT PARAMETERS    : name of path
*
* IN/OUT PARAMETERS   : - system pointer to list of path databases
*                       - event database
*
* OUTPUT PARAMETERS   : pointer to newly created path database
*                       NULL in case of errors
*
* RETURN CODES        : none
*
* SYNOPSIS            : new_path = PPa_pth(&db_list);
*
* PRECONDITIONS       : none
*
* ERRORS/EXCEPTIONS   : memory allocation errors
*
* FUNCTIONS CALLED    : PPal_mem_blk
*
* DETAILED DESIGN     :
*    Initialise state variables
*    Initialise defaults
*    allocate memory for path configuration
*
* REMARKS             :
*
* COMPONENT HISTORY   : Aug 30, 1988 WC  Initial setup
*                       Dec  8, 1988 MVS Locate ppdb in 1K blocks
*
*****************************************************************/

PATH_DB *PPa_pth(p_ppdb, name, ev)
PATH_DB **p_ppdb;
char *name;
EVENT_DESC *ev;
        {
        PATH_DB *ppdb, *p;
        MEM_BLK *mblk;

/* allocate new path database */

        mblk = PPal_mem_blk();
        if (mblk == NULLP(MEM_BLK))
                return NULLP(PATH_DB);
```

```
        ppdb = (PATH_DB *) PPalloc(mblk, sizeof(PATH_DB));
        if (ppdb == NULLP(PATH_DB))
                return NULLP(PATH_DB);

        ppdb->mem_blk = mblk;

/* add it to chain of path databases */

        if (*p_ppdb == NULLP(PATH_DB))
                *p_ppdb = ppdb;
        else
                {
                for(p = *p_ppdb; p->next != NULLP(PATH_DB); p = p->next);
                p->next = ppdb;
                }

        ppdb->next = NULLP(PATH_DB);

/* fill in name and key of path */

        strncpy(ppdb->path_name, name, PATH_NAME_SIZE);
        strncpy(ppdb->key, ev->cmd_apname, PATH_KEY_SIZE);

/* Initialise state variables */

        ppdb->pat_type = NO_PAT;
        ppdb->prev_type = NO_PAT;
        ppdb->prev_cc = PAM_OK;

        ppdb->cfg_state = CFG_IN_PROGRESS;

/* Initialise defaults */

        ppdb->default_pat_mode = PAC_AUTO;

        ppdb->excep_proc.type = D_NO_EXCEP;

/* allocate memory for path configuration */

        /* name sorting table */
        if ((ppdb->sort_blk = PPal_mem_blk()) == NULLP(MEM_BLK))
                {
                PPfm_mem_blk(ppdb->mem_blk);
                return NULLP(PATH_DB);
                }

        /* temporary alarm variables table */
        if ((ppdb->alrm_blk = PPal_mem_blk()) == NULLP(MEM_BLK))
                {
                PPfm_mem_blk(ppdb->mem_blk);
                PPfm_mem_blk(ppdb->sort_blk);
                return NULLP(PATH_DB);
                }

        return ppdb;
        }
/*FF*/
/*******************************************************************
*
* (C) Copyright by Foxboro Company 1988
*
* All rights reserved: Foxboro Company 1988
*
********************************************************************
*
* NAME                  : PPd_pth
*
* FUNCTION              : delete path database
*
* INPUT PARAMETERS      : - path database
*
* IN/OUT PARAMETERS     : - system pointer to list of path databases
*                         - event database
*
* OUTPUT PARAMETERS     : none
*
* RETURN CODES          : none
*
* SYNOPSIS              : PPd_pth(p_ppdb, &eventdb, &pathdb);
*
* PRECONDITIONS         : none
*
* ERRORS/EXCEPTIONS     : error on omclose of alarm or sync list
*
```

```
* FUNCTIONS CALLED    : PPfm_mem_blk
*                       PPerr_rpt
*
* DETAILED DESIGN     :
*  if alarm list opened then close it
*  if sync rule in execution then remove it
*  return memory of path to OS
*  update list of path databases
*
* REMARKS             :
*
* COMPONENT HISTORY   : Sep 28, 1988 WC  initial setup
*                       Dec  8, 1988 NVS To delete ppdb from 1K blocks
*
*****************************************************************/

void PPd_pth(p_ppdb, ev, ppdb)
PATH_DB **p_ppdb;
EVENT_DESC *ev;
PATH_DB *ppdb;
        {
        PATH_DB *p;

        int status;
        char err_str[LINE_LENGTH];

/* close OM lists */

        if (ppdb->alrm_open != 0)
                {
                status = omclose(ppdb->om_id_alrm, &ppdb->alrm_header,
                                ppdb->alrm_header.open_list_ptr, NULLP(struct net_adr));
#ifdef DEBUG
        printf( "ALRM-CLOSE: result = %d, om_id = %d\n", status,
            ppdb->om_id_alrm );
#endif

                if (status != OM_SUCCESS)
                        {
                        sprintf(err_str, "alarm list  %d", status);
                        PPerr_rpt(PAM, PE_OMCLOSE, ev->cmd_apname, err_str);
                        }
                }

        PPrm_sync_list(ppdb, ev);

/* return memory to OS */

        if (ppdb->alrm_header.open_list_ptr != NULLP(OM_VAR_LIST))
                free(ppdb->alrm_header.open_list_ptr);

        PPfm_mem_blk(ppdb->sort_blk);
        PPfm_mem_blk(ppdb->alrm_blk);

/* delete path database */

        if (*p_ppdb == ppdb)
                *p_ppdb = ppdb->next;
        else
                {
                for (p = *p_ppdb; p->next != ppdb; p = p->next);

                p->next = ppdb->next;
                }

        PPfm_mem_blk(ppdb->mem_blk);
        }

/*FF*/
/*****************************************************************
*
* (C) Copyright by Foxboro Company 1988
*
* All rights reserved: Foxboro Company 1988
*
******************************************************************
*
* NAME                : PPal_mem_blk
*
* FUNCTION            : Allocate new memory block
*
* INPUT PARAMETERS    : none
*
* IN\OUT PARAMETERS   : none
*
```

```
 * OUTPUT PARAMETERS  : pointer to new memory block
 *                      NULL in case of errors
 *
 * RETURN CODES       : none
 *
 * SYNOPSIS           : mem_blk_ptr = PPal_mem_blk()
 *
 * PRECONDITIONS      : none
 *
 * ERRORS/EXCEPTIONS  : memory allocation errors
 *
 * FUNCTIONS CALLED   : none
 *
 * DETAILED DESIGN    :
 *   allocate memory block
 *   if not available return NULL
 *   fill out defaults values for MEM_BLK fields
 *
 * REMARKS            :
 *
 * COMPONENT HISTORY  : 30 Aug '88 WC initial setup
 *
 ****************************************************************/

MEM_BLK *PPal_mem_blk()
        {
        MEM_BLK *blk;

        if ((blk = (MEM_BLK *) malloc(MEM_BLK_SIZE)) == NULLP(MEM_BLK))
                return NULLP(MEM_BLK);

        memset(blk, 0, MEM_BLK_SIZE);

        blk->next = NULLP(MEM_BLK);
        blk->free = 0;
        return blk;
        }

/*FF*/
/*****************************************************************
 *
 * (C) Copyright by Foxboro Company 1988
 *
 * All rights reserved: Foxboro Company 1988
 *
 *****************************************************************
 *
 * NAME               : PPfm_mem_blk
 *
 * FUNCTION           : Free chain of memory blocks
 *
 * INPUT PARAMETERS   : first block in chain
 *
 * OUTPUT PARAMETERS  : none
 *
 * RETURN CODES       : none
 *
 * SYNOPSIS           : PPfm_mem_blk(&first_blk)
 *
 * PRECONDITIONS      : none
 *
 * ERRORS/EXCEPTIONS  : none
 *
 * FUNCTIONS CALLED   : none
 *
 * DETAILED DESIGN    :
 *   for each block in the chain
 *     release block
 *
 * REMARKS            :
 *
 * COMPONENT HISTORY  : 30 Aug '88 WC initial setup
 *
 ****************************************************************/

void PPfm_mem_blk(mblk)
MEM_BLK *mblk;
        {
        MEM_BLK *prev_mblk;

        while (mblk != NULLP(MEM_BLK))
                {
                prev_mblk = mblk;
                mblk = mblk->next;
                free(prev_mblk);
                }
        }
```

```
/*FF*/
/*****************************************************************
*
* (C) Copyright by Foxboro Company 1988
*
* All rights reserved: Foxboro Company 1988
*
*****************************************************************
*
* NAME                 : PPalloc
*
* FUNCTION             : allocate memory for item in memory block
*
* INPUT PARAMETERS     : chain of memory blocks
*                        size of item
*
* OUTPUT PARAMETERS    : pointer to allocated space
*                        NULL in case of errors
*
* RETURN CODES         : none
*
* SYNOPSIS             : ptr = PPalloc(chain, sizeof(something))
*
* PRECONDITIONS        : none
*
* ERRORS/EXCEPTIONS    : memory allocation problems
*
* FUNCTIONS CALLED     : PPal_mem_blk
*
* DETAILED DESIGN      :
*   search for memory block with sufficient space
*   if none then allocate new memory block and add it to chain
*   subtract required space from free space of memory block
*
* REMARKS              :
*
* COMPONENT HISTORY    : 30 Aug '88 MC initial setup
*
*****************************************************************

char *PPalloc(mblk, length)
MEM_BLK *mblk;
int length;
        {
        MEM_BLK *new_blk;
        int old_free;

        if (length > MEM_BUF_SIZE)
                return NULLP(char);

/* go to last memory block in chain */

        while (mblk->next != NULLP(MEM_BLK))
                mblk = mblk->next;

/* check for enough room in buffer */

        if (mblk->free + length > MEM_BUF_SIZE)
                {
                if ((new_blk = PPal_mem_blk()) == NULLP(MEM_BLK))
                        return NULLP(char);

                mblk->next = new_blk;
                mblk = new_blk;
                }

/* reserve requested space */

        old_free = mblk->free;
        mblk->free = old_free + length;

/* tell requestor where requested space is located */

        return &mblk->buf[old_free];

        }

/*FF*/
/*****************************************************************
*
* (C) Copyright by Foxboro Company 1988
*
* All rights reserved: Foxboro Company 1988
*
*****************************************************************
```

```
*
* NAME                : PPf_pth
*
* FUNCTION            : Find path if its name is given
*
* INPUT PARAMETERS    : - chain of path databases
*                       - name
*
* OUTPUT PARAMETERS   : pointer to path
*                       NULL if not found
*
* RETURN CODES        : none
*
* SYNOPSIS            : PPf_path(ppdb, "PATHNAME");
*
* PRECONDITIONS       : none
*
* ERRORS/EXCEPTIONS   : none
*
* FUNCTIONS CALLED    : none
*
* DETAILED DESIGN     :
*   for each path in chain till found
*     compare its name with search name
*
* REMARKS             :
*
* COMPONENT HISTORY   :  28 Sep 1988 WC initial setup
*
******************************************************************/

PATH_DB *PPf_pth(ppdb, name)
PATH_DB *ppdb;
char *name;
        {

/* search for path name in chain of path databases */

        while (ppdb != NULLP(PATH_DB))
                {
                if (strncmp(ppdb->path_name, name, PATH_NAME_SIZE) == 0)
                        break;

                ppdb = ppdb->next;
                }
        return ppdb;
        }


/*FF*/
/*****************************************************************
*
* (C) Copyright by Foxboro Company 1988
*
* All rights reserved: Foxboro Company 1988
*
******************************************************************
*
* NAME                : PPf_pat
*
* FUNCTION            : Find pattern if its name is given
*
* INPUT PARAMETERS    : - chain of patterns
*                       - name
*
* OUTPUT PARAMETERS   : pointer to pattern
*                       NULL if not found
*
* RETURN CODES        : none
*
* SYNOPSIS            : PPf_pat(ppdb->pat, "PATNAME");
*
* PRECONDITIONS       : none
*
* ERRORS/EXCEPTIONS   : none
*
* FUNCTIONS CALLED    : none
*
* DETAILED DESIGN     :
*   for each pattern in chain till found
*     compare its name with search name
*
* REMARKS             :
*
* COMPONENT HISTORY   :  1 Sep 1988 WC initial setup
*
```

```
*****************************************************************/

PAT *PPf_pat(pat, name)
PAT *pat;
char *name;
        {
        while (pat != NULLP(PAT))
                {
                if (strncmp(pat->pat_name, name, PATTERN_NAME_SIZE) == 0)
                        break;
                pat = pat->next;
                }
        return pat;
        }
/*FF*/
/*****************************************************************
*
* (C) Copyright by Foxboro Company 1988
*
* All rights reserved: Foxboro Company 1988
*
******************************************************************
*
* NAME                  : PPf_step
*
* FUNCTION              : Find step is step number is given
*
* INPUT PARAMETERS      : - chain of steps
*                         - step number
*
* OUTPUT PARAMETERS     : pointer to step
*                         NULL if not found
*
* RETURN CODES          : none
*
* SYNOPSIS              : PPf_step(pat->step, 25);
*
* PRECONDITIONS         : none
*
* ERRORS/EXCEPTIONS     : none
*
* FUNCTIONS CALLED      : none
*
* DETAILED DESIGN       :
*    for each step in chain till found
*      compare its step number with search step number
*
* REMARKS               :
*
* COMPONENT HISTORY     :  1 Sep 1988 WC initial setup
*
*****************************************************************/

STEP *PPf_step(step, stepno)
STEP *step;
int stepno;
        {
        while (step != NULLP(STEP))
                {
                if (stepno == step->step_no)
                        break;
                step = step->next;
                }
        return step;
        }

/*FF*/
/*****************************************************************
*
* (C) Copyright by Foxboro Company 1988
*
* All rights reserved: Foxboro Company 1988
*
******************************************************************
*
* NAME                  : PPa_pat
*
* FUNCTION              : Add pattern to path database
*
* INPUT PARAMETERS      : pattern name
*
* IN/OUT PARAMETERS     : path database
*
* OUTPUT PARAMETERS     : none
*
```

```
 * RETURN CODES        : PAM_OK
 *                       P_FORMAT_ERROR
 *                       P_MALLOC
 *
 * SYNOPSIS            : PPa_pat(&db, name);
 *
 * PRECONDITIONS       : none
 *
 * ERRORS/EXCEPTIONS   : - memory allocation problem
 *                       - specified pattern does already exist
 *
 * FUNCTIONS CALLED    : PPalloc
 *
 * DETAILED DESIGN     :
 *   verify that pattern does not already exist
 *   allocate pattern node and link it into pattern chain
 *   fill out all fields of pattern node
 *   update pathdb current pattern and current step fields
 *
 * REMARKS             :
 *
 * COMPONENT HISTORY   : 30 Aug '88 WC initial setup
 *
 ******************************************************************/

int PPa_pat(ppdb, pat_name)
PATH_DB *ppdb;
char *pat_name;
        {
        PAT *pat;

/* Verify that pattern does not already exist */

        if ((pat = ppdb->pat) != NULLP(PAT) &&
                PPf_pat(pat, pat_name) != NULLP(PAT))
                return P_FORMAT_ERROR;

/* create new node */

        if ((pat = (PAT *) PPalloc(ppdb->mem_blk, sizeof(PAT))) ==
                NULLP(PAT))
                return P_MALLOC;

        pat->next = NULLP(PAT);
        pat->step = NULLP(STEP);
        strncpy(pat->pat_name, pat_name, PATTERN_NAME_SIZE);

/* link node in list and update path database */

        if (ppdb->pat == NULLP(PAT))
                ppdb->pat = ppdb->cur_pat = pat;
        else
                {
                ppdb->cur_pat->next = pat;
                ppdb->cur_pat = pat;
                }

        ppdb->cur_step = NULLP(STEP);
        return PAM_OK;
        }

/*FF*/
/******************************************************************
 *
 * (C) Copyright by Foxboro Company 1988
 *
 * All rights reserved: Foxboro Company 1988
 *
 ******************************************************************
 *
 * NAME                : PPa_step
 *
 * FUNCTION            : Add step to path database
 *
 * INPUT PARAMETERS    : step number
 *                       type of variable for set action
 *                       name of variable for set action
 *                       value for variable for set action
 *                       name of variable of sync rule
 *                       value for variable of sync rule
 *                       relation of sync rule
 *
 * IN/OUT PARAMETERS   : path database
 *
 * OUTPUT PARAMETERS   : none
```

```
 *
 * RETURN CODES       : PAM_OK
 *                      P_FORMAT_ERROR
 *                      P_MALLOC
 *
 * SYNOPSIS           :int PPa_step(ppdb, stepno, act_type, act_name,
 *                                  act_val, sync_name, sync_val,
 *                                  sync_rel)
 *
 * PRECONDITIONS      : none
 *
 * ERRORS/EXCEPTIONS  : - memory allocation problem
 *                      - specified step does already exist
 *
 * FUNCTIONS CALLED   : - PPalloc
 *                      - PPat_name
 *
 * DETAILED DESIGN    :
 *   verify that a pattern is in configuration
 *   verify that step does not already exist in current pattern
 *   alloc step node and link it into step chain of curr pattern
 *   if sync rule specified create sync rule descriptor
 *   if action specified create action descriptor
 *   fill out all fields of step node
 *   update path db current step field
 *
 * REMARKS            :
 *
 * COMPONENT HISTORY  : 30 Aug '88 WC initial setup
 *
 *****************************************************************/

int PPa_step(ppdb, stepno, act_type, act_name, act_val,
             sync_name, sync_val, sync_rel)
PATH_DB *ppdb;
int stepno;
int act_type;
char *act_name;
UVAL act_val;
char *sync_name;
char *sync_val;
int sync_rel;
        {
        PAT *pat;
        STEP *step, **astep;
        SYNC_DESC *sync;
        ACT_DESC *action;
        int err;
        int len;

/* check for selected pat */

        if ((pat = ppdb->cur_pat) == NULLP(PAT))
                return P_FORMAT_ERROR;

/* create new node */

        if ((step = (STEP *) PPalloc(ppdb->mem_blk, sizeof(STEP))) == NULLP(STEP))
                return P_MALLOC;

/* find place for node in list in list */

        for (astep = &pat->step;
                *astep != NULLP(STEP) && (*astep)->step_no < stepno;
                astep = &(*astep)->next)
                ;

/* Verify that step is unique)

        if ((*astep)->step_no == stepno)
                return P_FORMAT_ERROR;

/* init list and node */

        step->next = *astep;
        *astep = step;
        step->step_no = stepno;

/* create action descriptor */

        if (act_name == NULLP(char))
                step->act_desc = NULLP(ACT_DESC);

        else
                {
```

```
                action = (ACT_DESC *) PPalloc(ppdb->mem_blk, sizeof(ACT_DESC));
                if (action == NULLP(ACT_DESC))
                        return P_MALLOC;

                step->act_desc = action;
                action->type = act_type;
                if (act_type == STRING)
                        {
                        len = strlen(act_val.strp) + 1;
                        if ((action->val.strp = PPalloc(ppdb->mem_blk, (len + 1) & OxFFFE))
                                == NULLP(char))
                                return P_MALLOC;

                        memcpy(action->val.strp, act_val.strp, len);
                        }
                else
                        action->val = act_val;
/* add name of act var to database */

                err = PPat_name(ppdb->mem_blk, ppdb->sort_blk, act_name, &action->name);
                if (err != PAN_OK)
                        return P_MALLOC;
                }

/* create sync descriptor */

        if (sync_name == NULLP(char))
                step->sync_desc = NULLP(SYNC_DESC);

        else
                {
                sync = (SYNC_DESC *) PPalloc(ppdb->mem_blk, sizeof(SYNC_DESC));
                if (sync == NULLP(SYNC_DESC))
                        return P_MALLOC;

                step->sync_desc = sync;
                sync->relation = sync_rel;
/* add name of sync var to database */

                err = PPat_name(ppdb->mem_blk, ppdb->sort_blk, sync_name, &sync->name);
                if (err != PAN_OK)
                        return P_MALLOC;

/* add value to database in string format */

                sync->type = 0; /* type unkown yet */

                len = strlen(sync_val) + 1;
                sync->pval = PPalloc(ppdb->mem_blk, (len + 1) & OxFFFE);
                if (sync->pval == NULLP(char))
                        return P_MALLOC;

                memcpy(sync->pval, sync_val, len);
                }

        return PAN_OK;
        }

/*FF*/
/*****************************************************************
*
* (C) Copyright by Foxboro Company 1988
*
* All rights reserved: Foxboro Company 1988
*
******************************************************************
*
* NAME                : PPa_alrm
*
* FUNCTION            : add alarm to database
*
* INPUT PARAMETERS    : name of alarm variable
*
* IN/OUT PARAMETERS   : path database
*
* OUTPUT PARAMETERS   : pointer to node
*                       NULL in case of error
*
* RETURN CODES (err)  : none
*
* SYNOPSIS            : node = PPa_alarm(ppdb, "name");
*
* PRECONDITIONS       : none
*
```

```
* ERRORS/EXCEPTIONS  : memory allocation error
*
* FUNCTIONS CALLED   : - PPalloc
*                      - PPat_name
*
* DETAILED DESIGN    :
*   allocate alarm node and link it into alarm chain
*   save name of alarm var in name database
*   fill in alarm node
*
* REMARKS            :
*
* COMPONENT HISTORY  : 5 Sep '88 WC initial setup
*
*****************************************************************/

ALRM_DESC *PPa_alrm(ppdb, name)
PATH_DB *ppdb;
char *name;
        {
        ALRM_DESC *alrm;
        int err;

/* create new node */

        if ((alrm = (ALRM_DESC *) PPalloc(ppdb->alrm_blk, sizeof(ALRM_DESC)))
                == NULLP(ALRM_DESC))
                return NULLP(ALRM_DESC);

        alrm->next = NULLP(ALRM_DESC);

/* add node to list */

        if (ppdb->alrm == NULLP(ALRM_DESC))
                ppdb->alrm = ppdb->cur_alrm = alrm;
        else
                {
                ppdb->cur_alrm->next = alrm;
                ppdb->cur_alrm = alrm;
                }

/* add name of act var to database */

        err = PPat_name(ppdb->alrm_blk, ppdb->sort_blk, name, &alrm->name);
        if (err == PAM_OK)
                return alrm;
        else
                return NULLP(ALRM_DESC);
        }

/*FF*/
/*****************************************************************
*
* (C) Copyright by Foxboro Company 1988
*
* All rights reserved: Foxboro Company 1988
*
******************************************************************
*
* NAME               : PPat_name
*
* FUNCTION           : analyse name and save it according to its type
*                      in the database.
*                      A name descriptor is filled in accordingly
*
* INPUT PARAMETERS   : - name
*
* IN/OUT PARAMETER   : - name descriptor
*                      - name sort table
*                      - name database
*
* OUTPUT PARAMETERS  : none
*
* RETURN CODES       : PAM_OK
*                      P_MALLOC
*
* SYNOPSIS           : err = PPat_name(ppdb, name, &name_desc);
*
* PRECONDITIONS      : none
*
* ERRORS/EXCEPTIONS  : see return codes
*
* FUNCTIONS CALLED   : PPa_name
*
```

```
 * DETAILED DESIGN    :
 *   scan name for ":" and "."
 *   if none found then name has type Shared var
 *   if both found then name has type CIO var
 *   if only ":" is found name has type Device var (block var)
 *   split up name in 1, 2 or 3 parts according to name type
 *   save parts separately in name database
 *   update name descriptor with pointers to saved name parts
 *   update name descriptor with name type
 *
 * REMARKS            :
 *
 * COMPONENT HISTORY  : 30 Aug '88 WC initial setup
 *
 *******************************************************************/

int PPat_name(name_blk, sort_blk, name, name_struct)
MEM_BLK *name_blk, *sort_blk;
char *name;
NAME *name_struct;
        {
        char *block_name, *par_name = NULLP(char);

/* scan  name for ":" and "."
   if both are found it is a CIONAME
   if only ":" is found it is a block (Device) name
   otherwise it is a shared variable name
 */
        name_struct->name_type = SHVNAME;

        block_name = strchr(name, ':');
        if (block_name != NULLP(char))
                {
                name_struct->name_type = DEVNAME;
                *block_name++ = NULLC;
                par_name = strchr(block_name, '.');
                if (par_name != NULLP(char))
                        {
                        name_struct->name_type = CIONAME;
                        *par_name++ = NULLC;
                        }
                }

        if ((name_struct->name_ref[0] =
                PPa_name(name_blk, sort_blk, name)) == NULLP(char))
                return P_MALLOC;

        if (block_name != NULLP(char) && (name_struct->name_ref[1] =
                PPa_name(name_blk, sort_blk, block_name)) == NULLP(char))
                return P_MALLOC;

        if (par_name != NULLP(char) && (name_struct->name_ref[2] =
                PPa_name(name_blk, sort_blk, par_name)) == NULLP(char))
                return P_MALLOC;

        return PAM_OK;
        }

/*FF*/
/*******************************************************************
 *
 * (C) Copyright by Foxboro Company 1988
 *
 * All rights reserved: Foxboro Company 1988
 *
 *******************************************************************
 *
 * NAME               : PPa_name
 *
 * FUNCTION           : Add name (or part of name like compound name) to
 *                      database.
 *
 * INPUT PARAMETERS   : - name
 *
 * IN/OUT PARAMETER   : - name descriptor
 *                      - name sort table
 *                      - name database
 *
 * OUTPUT PARAMETERS  : pointer to storage location of name
 *                      NULL if name cannot be stored
 *
 * RETURN CODES       : none
 *
 * SYNOPSIS           : nameptr = PPa_name(&namedb, &sortdb, "name")
```

```
* PRECONDITIONS      : none
*
* ERRORS/EXCEPTIONS  : memory allocation errors
*
* FUNCTIONS CALLED   : PPsort
*                      PPalloc
*
* DETAILED DESIGN    :
*   search for name in database, perhaps it is stored already
*   if not then allocate room for name in database
*   copy name to database
*   tell sorting mechanisme where name is stored
*   tell caller where name is stored
*
* REMARKS            :
*
* COMPONENT HISTORY  : 30 Aug '88 WC initial setup
*
*******************************************************************/

char *PPa_name(name_blk, sort_blk, name)
MEM_BLK *name_blk, *sort_blk;
char *name;
        {
        char *name_ptr, **new_name;
        int length;

/* search through name tables, perhaps name is already there */

        name_ptr = PPsort(sort_blk, name, &new_name);
        if (name_ptr != NULLP(char))
                return name_ptr;        /* found! */

        if (new_name == NULLP(char*))
                return NULLP(char);     /* P_MALLOC occured in PPsort */

/* allocate memory for name */

        length = strlen(name) + 1;
        if ((name_ptr = PPalloc(name_blk, (length + 1) & 0xFFFE)) == NULLP(char))
                return NULLP(char);     /* P_MALLOC occured */

/* add name to database */

        memcpy(name_ptr, name, length);

/* add name to sort database */

        *new_name = name_ptr;
        return name_ptr;
        }

/*FF*/
/*******************************************************************
*
* (C) Copyright by Foxboro Company 1988
*
* All rights reserved: Foxboro Company 1988
*
********************************************************************
*
* NAME               : PPsort
*
* FUNCTION           : Search for a name in the name database.
*                      If not found create an entry for the new name
*                      in the SORT database.
*
* INPUT PARAMETERS   : - name
*
* IN/OUT PARAMETER   : - name descriptor
*                      - name sort table
*                      - name database
*
* OUTPUT PARAMETERS  : - ptr to where name is found
*                        NULL if not found
*                      - ptr to where new name is to be added
*
* RETURN CODES       : none
*
* SYNOPSIS           : name_ptr = PPsort(name, &new)
*
* PRECONDITIONS      : none
*
* ERRORS/EXCEPTIONS  : memory alloc problems
*
```

```
 * FUNCTIONS CALLED   : PPalloc
 *
 * DETAILED DESIGN    :
 *    do linear search trough sort database
 *    if found tell caller where
 *    else extend sort database with 1 entry
 *      tell caller where entry is located
 *
 * REMARKS            :
 *   Temporary solution: linear search is not
 *   fast enough for final product.
 *   A binary search is to be implemented
 *
 * COMPONENT HISTORY  :  1 Sep 1988 WC initial setup
 *
 *****************************************************************/

char *PPsort(sort_blk, name, new)
MEM_BLK *sort_blk;
char *name;
char **new;
        {
        MEM_BLK *tmp_blk;
        int index;
        char **name_ptr;

/* do a linear search */

        while (sort_blk != NULLP(MEM_BLK))
                {
                name_ptr = (char **) sort_blk->buf;
                for (index = 0;  index < sort_blk->free;  index += sizeof(char *))
                        if (strcmp(name, *name_ptr++) == 0)
                                return *--name_ptr;     /* found! */
                tmp_blk = sort_blk;
                sort_blk = sort_blk->next;
                }

/* not found. add new entry */

        *new = PPalloc(tmp_blk, sizeof(char *));
        return NULLP(char);
        }

/*FF*/
/*****************************************************************
 *
 * (C) Copyright by Foxboro Company 1988
 *
 * All rights reserved: Foxboro Company 1988
 *
 *****************************************************************
 *
 * NAME                : PPg_name
 *
 * FUNCTION            : Rebuild variable name from NAME descriptor.
 *
 * INPUT PARAMETERS    : - name descriptor
 *
 * OUTPUT PARAMETERS   : - name
 *
 * RETURN CODES        : none
 *
 * SYNOPSIS            : PPg_name(name_descr, name)
 *
 * PRECONDITIONS       : none
 *
 * ERRORS/EXCEPTIONS   : none
 *
 * FUNCTIONS CALLED    :
 *
 * DETAILED DESIGN     :
 *   if type is shared var the name is (NAME_DESC) ref[0]
 *   if type is device the name is ref[0]+":"+ref[1]
 *   if type is cio var the name is ref[0]+":"+ref[1]+"."+ref[2]
 *
 * REMARKS             :
 *   + means concatenation
 *
 * COMPONENT HISTORY   :  1 Sep 1988 WC initial setup
 *
 *****************************************************************/

void PPg_name(name_struct, var_name)
NAME *name_struct;
```

```
char *var_name;
        {
        int ntype = name_struct->name_type;

        strcpy(var_name, name_struct->name_ref[0]);
        if (ntype == SHVNAME)
                return;

        strcat(var_name, ":");
        strcat(var_name, name_struct->name_ref[1]);
        if (ntype == DEVNAME)
                return;

        strcat(var_name, ".");
        strcat(var_name, name_struct->name_ref[2]);
        return;
        }

/*FF*/
/*******************************************************************
*
* (C) Copyright by Foxboro Company 1988
*
* All rights reserved: Foxboro Company 1988
*
********************************************************************
*
* NAME                : PPi_om_list
*
* FUNCTION            : Initialise OM list
*
* INPUT PARAMETERS    : - open points list
*
* IN/OUT PARAMETERS   : - header node
*                       - size of variable list (# of vars)
*
* OUTPUT PARAMETERS   : none
*
* RETURN CODES        : none
*
* SYNOPSIS            : PPi_om_list(&header, &open_points_list, 25);
*
* PRECONDITIONS       : none
*
* ERRORS/EXCEPTIONS   : none
*
* FUNCTIONS CALLED    : none
*
* DETAILED DESIGN     :
*    initialise all fields of header node
*    cleanup open points list
*
* REMARKS             :
*
* COMPONENT HISTORY   :  1 Sep 1988 WC initial setup
*******************************************************************/

void PPi_om_list(om_header, open_points_list, size)
OM_HEADER *om_header;
OM_VAR_LIST *open_points_list;
int size;
        {
        om_header->net_adr_tbl_ptr = ((struct net_adr *) 0);
        om_header->size_net_adr_tbl = 0;
        om_header->size_open_list = 0;
        om_header->task_status = OM_R_ACCESS;
        om_header->open_list_ptr = open_points_list;
#ifndef GLD_OM
        om_header->scan_rate = 1;
#endif

/* clean up open points list */

        memset(open_points_list, 0, size * sizeof(OM_VAR_LIST));
        }

/*FF*/
/******************************************************************:
*
* (C) Copyright by Foxboro Company 1988
*
* All rights reserved: Foxboro Company 1988
*
*******************************************************************
```

```
*
* NAME                : PPa_om_list
*
* FUNCTION            : add variable to OM list
*
* INPUT PARAMETERS    : - name of var
*                       - delta for change driven access
*
* IN/OUT PARAMETERS   : - header node
*
* OUTPUT PARAMETERS   : none
*
* RETURN CODES        : none
*
* SYNOPSIS            : PPa_om_list(&header, "VARNAME", 0.1);
*
* PRECONDITIONS       : none
*
* ERRORS/EXCEPTIONS   : none
*
* FUNCTIONS CALLED    : none
*
* DETAILED DESIGN     :
*    increment size  open list field of header
*    copy name of var to open var list
*    copy delta of var to open var list
*
* REMARKS             :
*
* COMPONENT HISTORY   :  1 Sep 1988 WC initial setup
*
******************************************************************/
void PPa_om_list(om_header, var_name, delta)
OM_HEADER *om_header;
char *var_name;
float delta;
        {
        OM_VAR_LIST *list_elem;
        int i;

        list_elem = om_header->open_list_ptr;
        i = om_header->size_open_list++;

        strcpy(list_elem[i].name, var_name);
        list_elem[i].var_desc = EHNOTIFY;
        list_elem[i].delta = delta;
        }

/*FF*/
/*****************************************************************
*
* (C) Copyright by Foxboro Company 1988
*
* All rights reserved: Foxboro Company 1988
*
******************************************************************
*
* NAME                : PPbld_alrm
*
* FUNCTION            : Build OM alarm list.
*
* INPUT PARAMETERS    : none
*
* IN/OUT PARAMETERS   : - path database
*                       - event database
*
* OUTPUT PARAMETERS   : none
*
* RETURN CODES        : none
*
* SYNOPSIS            : PPbld_alrm(&pathdb, &eventdb)
*
* PRECONDITIONS       : is to be called at configuration time AFTER the last
*                       EAV key word and BEFORE the first PAT keyword
*
* ERRORS/EXCEPTIONS   : Memory allocation problems
*
* FUNCTIONS CALLED    : - PPalloc
*                       - PPerr_rpt
*                       - PPg_name
*                       - PPi_om_list
*                       - PPa_om_list
*                       - PPfm_mem_blk
*                       - PPal_mem_blk
*
```

```
* DETAILED DESIGN     :
*   count number of equipment alarm vars
*   fill in in path db
*   check that number of alarm vars does not exceed system max
*   allocate alarm map table
*   create OM header and open var list for alarm vars
*     (including path alarm)
*   copy names of alarm vars from path db and alarm chain to open var list
*   delete alarm chain
*   delete name sort chain
*   allocate new name sort chain
*
*
* REMARKS             :
*
* COMPONENT HISTORY   : 1 Sep 1988 WC initial setup
*
*****************************************************************/

int PPbld_alrm(ppdb, ev)
PATH_DB *ppdb;
EVENT_DESC *ev;
        {
        ALRM_DESC *alm;
        int n_alrms = 0;
        int size;
        float delta = 0.1;
        char var_name[VAR_NAME_SIZE+2];
        OM_VAR_LIST *om_var_list;

/* retrieve number of equipment alarm parameters */

        for (alm = ppdb->alrm, n_alrms = 0; alm != NULLP(ALRM_DESC); alm = alm->next)
                n_alrms++;

        ppdb->n_eqe_alrms = n_alrms;

/* check for max */

        if (n_alrms > MAX_EQE_ALRMS)
                {
                PPerr_rpt(PAM, PE_FATAL_ERROR, ev->cmd_apname, "MAX_EQE_ALARMS");
                return P_FORMAT_ERROR;
                }

/* allocate alarm map table */

        size = ((n_alrms + 15) / 16) * 2;  /* size of table in bytes */
        if (size > 0)
                {
                if ((ppdb->alrm_map = (int *) PPalloc(ppdb->mem_blk, size))
                        == NULLP(int))
                        return P_MALLOC;

                memset(ppdb->alrm_map, 0, size);
                }

/* init OM header + list for alarm vars */

        size = n_alrms + (ppdb->path_alrm[0] != NULLC);
        if (size > 0)
                {
                om_var_list = (OM_VAR_LIST *) malloc(size * sizeof(OM_VAR_LIST));
                if (om_var_list == NULLP(OM_VAR_LIST))
                        return P_MALLOC;

                PPi_om_list(&ppdb->alrm_header, om_var_list, size);

/* fill alarm list */

                if (ppdb->path_alrm[0] != NULLC)
                        PPa_om_list(&ppdb->alrm_header, ppdb->path_alrm, delta);

                for (alm = ppdb->alrm;  alm != NULLP(ALRM_DESC);  alm = alm->next)
                        {
                        PPg_name(&alm->name, var_name);
                        PPa_om_list(&ppdb->alrm_header, var_name, delta);
                        }
                }

/* cleanup sort tables and equipment alarm variable name tables */

        PPfm_mem_blk(ppdb->alrm_blk);
        ppdb->alrm_blk = NULLP(MEM_BLK);
```

```
        PPfm_mem_blk(ppdb->sort_blk);
        if ((ppdb->sort_blk = PPal_mem_blk()) == NULLP(MEM_BLK))
                return P_MALLOC;

        return PAM_OK;
        }
/*FF*/
/*****************************************************************
*
* (C) Copyright by Foxboro Company 1988
*
* All rights reserved: Foxboro Company 1988
*
******************************************************************
*
* NAME                  : PPa_sync_list
*
* FUNCTION              : add item to OM list for sync vars
*
* INPUT PARAMETERS      : none
*
* IN/OUT PARAMETERS     : - path database
*                         - event database
*
* OUTPUT PARAMETERS     : none
*
* RETURN CODES          : none
*
* SYNOPSIS              : err = PPa_sync_list(&pathdb, &eventdb)
*
* PRECONDITIONS         : none
*
* ERRORS/EXCEPTIONS     : omopen fails
*
* FUNCTIONS CALLED      : PPerr_rpt
*
* DETAILED DESIGN       :
*   get name of sync var from path database
*   initialise OM sync list for 1 var
*   add sync var to list
*   open list
*   if OK then
*     set open flag in path db to 1
*   else
*     report problem to PAM error reporter
*
* REMARKS               :
*
* COMPONENT HISTORY     : 12 Oct 88 WC initial setup
*                         30 Jun 89 RD changed delta from 0.0 to 0.1
*                         01 Aug 89 RD - function now returning int
*                                      - always close after error on open
*
*****************************************************************/

int PPa_sync_list( ppdb, ev )
PATH_DB         *ppdb;
EVENT_DESC      *ev;
{
    char        var_name[VAR_NAME_SIZE+2];
    float       delta = 0.1;
    int         status;
    char        err_str[LINE_LENGTH];

    PPg_name( &ppdb->cur_step->sync_desc->name, var_name );

    PPi_om_list( &ppdb->sync_header, &ppdb->sync_list, 1 );
    PPa_om_list( &ppdb->sync_header, var_name, delta );

    status = omopen( &ppdb->sync_header, &ppdb->om_id_sync );
#ifdef DEBUG
    printf( "SYNC-OPEN: result = %d, om_id = %d\n", status, ppdb->om_id_sync );
#endif
    if ( status != OM_SUCCESS )
    {
        sprintf( err_str, "Sync List - %d", status );
        PPerr_rpt( PAM, PE_OMOPEN, ev->cmd_apname, err_str );
        omclose( ppdb->om_id_sync, &ppdb->sync_header,
            ppdb->sync_header.open_list_ptr, NULLP( struct netadr ) );
        return( P_SYNC_OPEN );
    }
    else
    {
        ppdb->sync_open = 1;
        return( PAM_OK );
```

```
    }
}

/*******************************************************************
*
* (C) Copyright by Foxboro Company 1988
*
* All rights reserved: Foxboro Company 1988
*
********************************************************************
*
* NAME                : PPrm_sync_list
*
* FUNCTION            : remove item from OM list for sync vars
*
* INPUT PARAMETERS    : none
*
* IN/OUT PARAMETERS   : - path database
*                       - event database
*
* OUTPUT PARAMETERS   : none
*
* RETURN CODES        : none
*
* SYNOPSIS            : err = PPrm_sync_list(&pathdb, &eventdb)
*
* PRECONDITIONS       : none
*
* ERRORS/EXCEPTIONS   : omclose fails
*
* FUNCTIONS CALLED    : PPerr_rpt
*
* DETAILED DESIGN     :
*   if sync list is open then
*     close list
*     if OK then
*       set open flag in path db to 0
*     else
*       report problem to PAM error reporter
*
* REMARKS             :
*
* COMPONENT HISTORY   : 12 Oct 88 WC initial setup
*
*******************************************************************/

void PPrm_sync_list(ppdb, ev)
PATH_DB *ppdb;
EVENT_DESC *ev;
        {
        int status;
        char err_str[LINE_LENGTH];

        if (ppdb->sync_open)
                {
                status = omclose(ppdb->om_id_sync, &ppdb->sync_header,
                ppdb->sync_header.open_list_ptr, NULLP(struct net_adr));
#ifdef DEBUG
        printf( "SYNC-CLOSE: result = %d, om_id = %d\n", status,
            ppdb->om_id_sync );
#endif
                if (status != OM_SUCCESS)
                        {
                        sprintf(err_str, "sync list  %d", status);
                        PPerr_rpt(PAM, PE_OMCLOSE, ev->cmd_apname, err_str);
                        }
                ppdb->sync_open = 0;
                }
        }

/*FF*/
/*******************************************************************
*
* (C) Copyright by Foxboro Company 1988
*
* All rights reserved: Foxboro Company 1988
*
********************************************************************
*
* NAME                : PPsetbit
*
* FUNCTION            : set bit in bit array
*
* INPUT PARAMETERS    : bit no
*
```

```
* IN/OUT PARAMETERS  : bit array
*
* OUTPUT PARAMETERS  : none
*
* RETURN CODES       : none
*
* SYNOPSIS           : PPsetbit(array, 12)
*
* PRECONDITIONS      : none
*
* ERRORS/EXCEPTIONS  : none
*
* FUNCTIONS CALLED   : none
*
* DETAILED DESIGN    :
*   convert bit no in word index and bit mask
*   logical or mask with array[index]
*
* REMARKS            :
*
* COMPONENT HISTORY  : 12 Oct 88 WC initial setup
*
*****************************************************************/

void PPsetbit(bit_array, bit_no)
int bit_array[];
int bit_no;
        {
        int bit_in_byte = bit_no & 0xF;
        int word_no = bit_no >> 4;
        int bit_mask = 1 << bit_in_byte;
        bit_array[word_no] |= bit_mask;
        }

/*FF*/
/*****************************************************************
*
* (C) Copyright by Foxboro Company 1988
*
* All rights reserved: Foxboro Company 1988
*
******************************************************************
*
* NAME               : PPclrbit
*
* FUNCTION           : clear bit in bit array
*
* INPUT PARAMETERS   : bit no
*
* IN/OUT PARAMETERS  : bit array
*
* OUTPUT PARAMETERS  : none
*
* RETURN CODES       : none
*
* SYNOPSIS           : PPclrbit(array, 12)
*
* PRECONDITIONS      : none
*
* ERRORS/EXCEPTIONS  : none
*
* FUNCTIONS CALLED   : none
*
* DETAILED DESIGN    :
*   convert bit no in word index and bit mask
*   logical and inverted mask with array[index]
*
* REMARKS            :
*
* COMPONENT HISTORY  : 12 Oct 88 WC initial setup
*
*****************************************************************/

void PPclrbit(bit_array, bit_no)
int bit_array[];
int bit_no;
        {
        int bit_in_byte = bit_no & 0xF;
        int word_no = bit_no >> 4;
        int bit_mask = ~(1 << bit_in_byte);
        bit_array[word_no] &= bit_mask;
        }

/*FF*/
```

```
/*****************************************************************
*
* (C) Copyright by Foxboro Company 1988
*
* All rights reserved: Foxboro Company 1988
*
******************************************************************
*
* NAME                : PPzerobits
*
* FUNCTION            : test if all bits in array are zero
*
* INPUT PARAMETERS    : - bit array
*                       - size in bits
*
* IN/OUT PARAMETERS   : none
*
* OUTPUT PARAMETERS   : none
*
* RETURN CODES        : none
*
* SYNOPSIS            : alrm = PPzerobits(array)
*
* PRECONDITIONS       : if n is not a multiple of 16 then
*                       unused bits must be 0
*
* ERRORS/EXCEPTIONS   : none
*
* FUNCTIONS CALLED    : none
*
* DETAILED DESIGN     :
*    convert n to number of words
*    for all words in array
*      if not zero then return 1
*    return 0
*
* REMARKS             :
*
* COMPONENT HISTORY   : 12 Oct 88 WC initial setup
*
*****************************************************************/

int PPzerobits(bit_array, n)
int *bit_array;
int n;
        {
        int n_words = (n + 15) >> 4;

        while (n_words--)
                if (*bit_array++ != 0)
                        return 0;

        return 1;
        }
char *PPvtomnem(tbl, val)
mnem_tbl *tbl;
int val;
        {
        for (;  tbl->val != -1;  tbl++)
                if (tbl->val == val)
                        break;

        return tbl->mnem;
        }


int PPmnemtov(tbl, mnem)
mnem_tbl *tbl;
char *mnem;
        {
        for (;  tbl->val != -1;  tbl++)
                if (strcmp(tbl->mnem, mnem) == 0)
                        break;

        return tbl->val;
        }

/*****************************************************************
*  @(#)pac_main.c       1.2  New System, Foxboro Co.  8/17/89
******************************************************************
*
* (C)Copyright by Foxboro Company  1988
*
* All rights reserved:  Foxboro Company  1988
*
******************************************************************
```

```
 *
 * FILE ID              : PAC_MAIN.C
 *
 * PART NUMBER          :
 *
 * FUNCTION             : Main processing loop of Path Controller
 *
 * FUNCTIONS CONTAINED :
 *    main        Path controller startup entry (unix only)
 *    PPkill      Exit Path Controller on Unix signal KILL
 *    PPexit      Exit Path Controller on IPC command
 *    PPpac_main  Path controller top level routine
 *    PPcr_step   Check for steps in ready state
 *    PPc_wait    evalute wait for event conditions
 *    PPom_proc   Process OM event
 *    PPlog_pac  Send event to PAM event logger
 *
 * DATA STRUCTURES      :
 *
 * COMPONENT HISTORY    : 31 Aug 1988 WC initial setup
 *                        04 Jul 1989 RD added setbuf() in case of testing
 *                        04 Jul 1989 RD added include of <stdio.h>
 *                        13 Jul 1989 RD added code to clean up correctly
 *                                       after signal SIGUSR1
 *                        01 Aug 1989 RD added code for PPlog_pac
 ****************************************************************************/

static char SCCS_ID[] = "@(#)pac_main.c 1.2\t(89/08/17)";

#include <pac.h>
#include <stdio.h>
#include <fox/vv_err.h>
#include <sys/utsname.h>

/****************************************************************************
 *
 * (C) Copyright by Foxboro Company 1988
 *
 * All rights reserved: Foxboro Company 1988
 *
 ****************************************************************************
 *
 * NAME                 : main
 *
 * FUNCTION             : Path controller startup entry (unix only)
 *
 * INPUT PARAMETERS     : - AP name on which IPC messages are received
 *
 *                        - AP name of PAM event logger
 *
 * OUTPUT PARAMETERS    : none
 *
 * RETURN CODES         : none
 *
 * SYNOPSIS             : pac PAC_AP LOG_AP & (unix shell cmd)
 *
 * PRECONDITIONS        : none
 *
 * ERRORS/EXCEPTIONS    : Not enough ap names specified
 *
 * FUNCTIONS CALLED     : - PPpac_main
 *                        - PPerr_rpt
 *
 * DETAILED DESIGN      :
 *   create path database PDB
 *   if no ap names for command and PAM event interface specified then
 *     send error to PAM error reporter
 *     exit
 *   else
 *     allocate event database
 *     fill in both ap names
 *     invoke path controller with event database
 *
 * REMARKS              :
 *
 * COMPONENT HISTORY    : 31 Aug 1988 WC initial setup
 *                        04 Jan 1989 RD changed signal catching
 *                        04 Jul 1989 RD added setbuf() in case of testing
 *
 ****************************************************************************/

#ifdef unix

static EVENT_DESC event_desc;
static PATH_DB *ppathdb;
```

```
void main(argc, argv)
int argc;
char *argv[];
        {

#ifdef TESTING
   setbuf( stdout, 0 );
#endif

        if (argc < 3)
                PPerr_rpt(PAN, PE_INV_ARGUMENTS, "", "bad command line");
        else
                {
                event_desc.cmd_apname = argv[1];
                event_desc.log_apname = argv[2];

                signal(SIGINT, SIG_IGN);
                signal(SIGQUIT, SIG_IGN);
                signal(SIGUSR1, PPkill);
                PPpac_main(&event_desc);
                }
        }

/*FF*/
/*****************************************************************
*
* (C) Copyright by Foxboro Company 1988
*
* All rights reserved: Foxboro Company 1988
*
******************************************************************
*
* NAME                : PPkill
*
* FUNCTION            : Abort path on unix SIGNAL KILL
*
* INPUT PARAMETERS    : none
*
* OUTPUT PARAMETERS   : none
*
* RETURN CODES        : none
*
* SYNOPSIS            : PPkill()
*
* PRECONDITIONS       : none
*
* ERRORS/EXCEPTIONS   : none
*
* FUNCTIONS CALLED    : - PPe_wtevent
*
* DETAILED DESIGN     :
*   cleanup communication (IPC, OM)
*   stop execution of current task
*
* REMARKS             :
*
* COMPONENT HISTORY   : 1 Sep 1988 WC initial setup
*                       4 Jan 1989 RD Added error report
*                      13 Jul 1989 RD Added code to clean up correctly
*
*****************************************************************/

void PPkill()
        {
        while ( ppathdb != NULLP(PATH_DB) )
                {
                if (ppathdb->pat_type != NO_PAT)
                        {
                        PPstop_pat(ppathdb, &event_desc, P_FREED);
                        }

                PPd_pth(&ppathdb, &event_desc, ppathdb);
                }
        PPerr_rpt( PAN, PE_FATAL_ERROR, event_desc.cmd_apname,

                     "Aborted via signal SIGUSR1 (16)" );
        PPe_wtevent(&event_desc);
        exit(0);
        }
#endif

/*FF*/
```

```
/***************************************************************
 *
 * (C) Copyright by Foxboro Company 1988
 *
 * All rights reserved: Foxboro Company 1988
 *
 ***************************************************************
 *
 * NAME                : PPexit
 *
 * FUNCTION            : Abort path
 *
 * INPUT PARAMETERS    : none
 *
 * IN/OUT PARAMETERS   : - event database
 *
 * OUTPUT PARAMETERS   : none
 *
 * RETURN CODES        : none
 *
 * SYNOPSIS            : PPexit(&eventdb)
 *
 * PRECONDITIONS       : Caller is responsible for release of
 *                       allocated memory
 *
 * ERRORS/EXCEPTIONS   : none
 *
 * FUNCTIONS CALLED    : - PPe_wtevent
 *
 * DETAILED DESIGN     :
 *   cleanup communication (IPC, OM)
 *   stop execution of current task
 *
 * REMARKS             :
 *
 * COMPONENT HISTORY   : 1 Sep 1988 MC initial setup
 *
 ***************************************************************/

void PPexit(ev)
EVENT_DESC *ev;
        {
        PPe_wtevent(ev);

#ifdef unix
        exit(0);
#endif
        }
/*FF*/

/***************************************************************
 *
 * (C) Copyright by Foxboro Company 1988
 *
 * All rights reserved: Foxboro Company 1988
 *
 ***************************************************************
 *
 * NAME                : PPpac_main
 *
 * FUNCTION            : Path controller main routine
 *
 * INPUT PARAMETERS    : none
 *
 * IN/OUT PARAMETERS   : event database
 *
 * OUTPUT PARAMETERS   : none
 *
 * RETURN CODES        : none
 *
 * SYNOPSIS            : PPpac_main(cmd_apname, evlog_apname)
 *
 * PRECONDITIONS       : none
 *
 * ERRORS/EXCEPTIONS   : none
 *
 * FUNCTIONS CALLED    : - PPi_wtevent
 *                       - PPexit
 *                       - PPc_wait
 *                       - PPwt_event
 *                       - PPmsg_proc
 *                       - PPom_proc
 *                       - PPcr_step
 *
```

```
* DETAILED DESIGN    :
*    initialise communication software
*    loop forever
*       evaluate wait for event conditions: suspend & skip
*       if not skip
*          wait or check for IPC message or OM event
*          if IPC message received
*             invoke message processor
*          else if OM event
*             invoke OM event handler
*      execute pattern steps
*
* REMARKS             :
*
* COMPONENT HISTORY   : 31 Aug 1988 WC initial setup
**********************************************************************/

void PPpac_main(ev)
EVENT_DESC *ev;
        {
        int err;
        int suspend;
        int skip;
        int skip_count = 0;

/* init communication (IPC & OM) */

        err = PPi_wtevent(ev);
        if (err != 0)
                PPexit(ev);

/* Main processing loop */

        while (1)
                {
                PPc_wait(ppathdb, &suspend, &skip, &skip_count);
                *
                if (!skip)
                        {
                        PPwt_event(suspend, ev);
                        switch (ev->event_type)
                                {
                        case EV_NOP:
                                break;

                        case EV_RCV:
                                PPmsg_proc(&ppathdb, ev);
                                break;

                        case EV_OM:
                                PPom_proc(ppathdb, ev);
                                break;
                                }
                        }

                PPcr_step(ppathdb, ev, &skip_count);
                }
        }

/*FF*/
/*********************************************************************
*
* (C) Copyright by Foxboro Company 1988
*
* All rights reserved: Foxboro Company 1988
*
**********************************************************************
*
* NAME                : PPcr_step
*
* FUNCTION            : check for pattern steps in ready for step mode
*                       execute them if found
*
* INPUT PARAMETERS    : none
*
* IN/OUT PARAMETERS   : - list of path databases
*                       - event database
*                       - skip counter
*
* OUTPUT PARAMETERS   : none
*
* RETURN CODES        : none
*
* SYNOPSIS            : PPcr_step(ppdb)
*
```

```
 * PRECONDITIONS      : none
 *
 * ERRORS/EXCEPTIONS  : none
 *
 * FUNCTIONS CALLED   : PPe_step
 *
 * DETAILED DESIGN    :
 *   for all path databases do
 *     if step mode == ready for step
 *        execute current step
 *
 * REMARKS            :
 *
 * COMPONENT HISTORY  : 28 Sep 1988 MC initial setup
 *
 ******************************************************************/

void PPcr_step(ppdb, ev, skip_count)
PATH_DB *ppdb;
EVENT_DESC *ev;
int *skip_count;
        {
        while (ppdb != NULLP(PATH_DB))
                {
                if (ppdb->pat_type != NO_PAT &&
                        ppdb->step_state == READY_FOR_STEP)
                        {
                        PPe_step(ppdb, ev);
                        (*skip_count)++;
                        }
                ppdb = ppdb->next;
                }
        }

/*FF*/
/******************************************************************
 *
 * (C) Copyright by Foxboro Company 1988
 *
 * All rights reserved: Foxboro Company 1988
 *
 ******************************************************************
 *
 * NAME               : PPc_wait
 *
 * FUNCTION           : evaluate suspend and skip conditions
 *
 * INPUT PARAMETERS   : - list of path databases
 *                      - event database
 *
 * IN/OUT PARAMETERS  : skip count
 *
 * OUTPUT PARAMETERS  : - suspend flag
 *                      - skip flag
 *
 * RETURN CODES       : none
 *
 * SYNOPSIS           : PPc_wait(ppdb, &suspend, &skip, &skip_count)
 *
 * PRECONDITIONS      : none
 *
 * ERRORS/EXCEPTIONS  : none
 *
 * FUNCTIONS CALLED   : none
 *
 * DETAILED DESIGN    :
 *  suspend condition is:
 *    if at least one path in ready for step then don't suspend
 *
 *  skip condition is:
 *    if skip count in ready for step mode < 10 skip
 *
 * reset condition for skip count:
 *    if suspend == TRUE then reset
 *    if count > 10 reset
 *
 *  increment condition for skip count:
 *    inc when a step is ready
 *
 * REMARKS            :
 *
 * COMPONENT HISTORY  : 28 Sep 1988 MC initial setup
 *
 ******************************************************************/
```

```
#define SKIP_MAX 10

void PPc_wait(ppdb, suspend, skip, skip_count)
PATH_DB *ppdb;
int *suspend;
int *skip;
int *skip_count;
        {
        *suspend = 1;
        while (ppdb != NULLP(PATH_DB))
                {
                if (ppdb->pat_type != NO_PAT &&
                        ppdb->step_state == READY_FOR_STEP)
                        {
                        *suspend = 0;
                        break;
                        }

                ppdb = ppdb->next;
                }
        *skip = 0;
        if (!(*suspend) && *skip_count < SKIP_MAX)
                *skip = 1;
        else
                *skip_count = 0;
        }

/*FF*/
/*****************************************************************
*
* (C) Copyright by Foxboro Company 1988
*
* All rights reserved: Foxboro Company 1988
*
******************************************************************
*
* NAME                : PPom_proc
*
* FUNCTION            : Process Object Manager event
*
* INPUT PARAMETERS    : none
*
* IN/OUT PARAMETERS   : - list of path databases
*                       - event database
*
* OUTPUT PARAMETERS   : none
*
* RETURN CODES        : none
*
* SYNOPSIS            : PPom_proc(path_db_list, &event_db)
*
* PRECONDITIONS       : none
*
* ERRORS/EXCEPTIONS   : none
*
* FUNCTIONS CALLED    : - PPe_step
*                       - PPc_alrm
*
* DETAILED DESIGN     :
*  if OM id is id of alarm list then
*    invoke PPc_alrm
*  else
*    if OM id is id of sync list
*      execute pattern step
*
* REMARKS             :
*
* COMPONENT HISTORY   : 28 Sep 1988 WC initial setup
*
*****************************************************************/

void PPom_proc(ppdb, ev)
PATH_DB *ppdb;
EVENT_DESC *ev;
        {
        while (ppdb != NULLP(PATH_DB))
                {
                if (ppdb->alrm_open && ev->data.dqch.om_id == ppdb->om_id_alrm)
                        {
                        PPc_alrm(ppdb, ev);
                        return;
                        }
```

```
        else if (ppdb->sync_open && ev->data.dqch.om_id == ppdb->om_id_sync &&
                        ppdb->pat_type != NO_PAT &&
                        ppdb->step_state == WAITING_FOR_SYNC)
                {
                PPe_step(ppdb, ev);
                return;
                }

        ppdb = ppdb->next;
        }
    }

/*FF*/
/*****************************************************************
*
* (C) Copyright by Foxboro Company 1988
*
* All rights reserved: Foxboro Company 1988
*
******************************************************************
*
* NAME                : PPlog_pac
*
* FUNCTION            : Interface to PAM event logging subsystem
*
* INPUT PARAMETERS    : - event type
*                       - path environment
*                       - argument vector
*
* IN/OUT PARAMETERS   : - event database
*
* OUTPUT PARAMETERS   : none
*
* RETURN CODES        : none
*
* SYNOPSIS            : PPlog_pac(&eventdb, E_P_EXCEPT, "env", argv)
*
* PRECONDITIONS       : none
*
* ERRORS/EXCEPTIONS   : see PPsend
*
* FUNCTIONS CALLED    : - PPsend
*
* DETAILED DESIGN     :
*      build up IPC message body using type, env and argv
*      send message to eventdb->log_apname
*
* REMARKS             :
*
* COMPONENT HISTORY   : 26 Sep 1988 WC initial setup
*                       01 Aug 1989 RD definitive version
*
*****************************************************************/

void PPlog_pac( ev, type, env, params )
EVENT_DESC          *ev;
int                 type;
char                *env;
char                *params[];
{
    int                 i;
    int                 rc;

    char                letter_bug[8];
    char                time_stamp[20];
    int                 valid_flag;
    unsigned            mon_counter;

    struct utsname      name;
    struct fdtime       newtime;
    char                msg[BUFFER_SIZE];


    /*
     * Log event to screen.
     */

    printf( "*** PAM Event Logging ...\n" );
    printf( "    Event Type  : %d\n", type );
    printf( "    Environment : %s\n", env );
    for ( i = 0 ; params[i] != ( char * ) 0 ; i++ )
    {
        printf( "    Parameter_%d : %s\n", i, params[i] );
    }
```

```
    printf( "\n" );

    /*
     * Now send message to ELS.
     * First get date and time information.
     */

    if ( fget_dtime( &newtime, ISO ) != VVDONE )
    {
        /*
         * Fill in defaults.
         */

        strcpy( time_stamp, "???????????????????" );
        valid_flag  = 0;
        mon_counter = ( unsigned ) 0;
    }
    else
    {
        /*
         * Fill in values from structure.
         */

        strcpy( time_stamp, newtime.ftime );
        valid_flag  = newtime.valid_time;
        mon_counter = ( unsigned ) newtime.mono_count;
    }


    /*
     * Get letterbug.
     */

    if ( uname( &name ) == -1 )
    {
        /*
         * Fill in default value.
         */

        strcpy( letter_bug, "??????" );
    }
    else
    {
        /*
         * Fill in letterbug.
         */

        strcpy( letter_bug, name.nodename );
    }


    /*
     * Compose message and send it.
     */

    sprintf( msg, "%s;%d;%s;%s;%d;%u;%d;%s;", ev->cmd_apname, I_LOG_EVENT,
        letter_bug, time_stamp, valid_flag, mon_counter, type, env );

    for ( i = 0; params[i] != ( char * ) 0; i++ )
    {
        strcat( msg, params[i] );
        strcat( msg, ";" );
    }

    PPsend( ev->log_apname, msg, strlen( msg ) + 1, ev );

} /* End of PPlog_pac */

/*************************************************************************
*  @(#)pac_pat.c        1.7  New System, Foxboro Co.  9/21/89
**************************************************************************
*
* (C)Copyright by Foxboro Company  1988
*
* All rights reserved:  Foxboro Company  1988
*
**************************************************************************
*
* FILE ID              : PAC_PAT.C
*
* PART NUMBER          :
*
* FUNCTION             : Functions to execute patterns
*
```

```
* FUNCTIONS CONTAINED :
*   PPstrt_pat   Start execution of a pattern
*   PPstop_pat   Stop execution of a pattern
*   PPc_alrm     Check alarm variables
*   PPalrm       Process new alarm situation
*   PPhlbl_s     Start HLBL exception procedure
*   PPe_step     Execute first part of a pattern step
*   PPst_act     Execute action part of a pattern step
*   PPeval_sync  Check syncrule after dq change in OM sync list
*   PPstoval     Convert string to value
*
* DATA STRUCTURES     :
*
* COMPONENT HISTORY  : 16 Sep 88 WC initial setup
*                      30 Jun 89 RD - PPst_act()
*                                   - PPeval_sync()
*                      13 Jul 89 RD - Increased some sizes from
*                                     VAR_NAME_SIZE to VAR_NAME_SIZE+2
*                      01 Sep 89 RD - PPeval_sync()
*                      21 Sep 89 RD - PPe_step()
*********************************************************************/

static char SCCS_ID[] = "@(#)pac_pat.c  1.7\t(89/09/21)";

#include "pac.h"

/*FF*/
/*******************************************************************
*
* (C) Copyright by Foxboro Company 1988
*
* All rights reserved: Foxboro Company 1988
*
********************************************************************
*
* NAME               : PPstrt_pat
*
* FUNCTION           : Start execution of a pattern
*
* INPUT PARAMETERS   : - pattern
*                        execution mode for pattern
*                      - type of pattern
*                      - message type for completion reply
*
* IN/OUT PARAMETERS  : path database
*                      event database
*
* OUTPUT PARAMETERS  : none
*
* RETURN CODES       : none
*
* SYNOPSIS           : PPstrt_pat(ppdb, ev, pattern, PAC_AUTO, FAIL_PAT)
*
* PRECONDITIONS      : pattern does exist
*
* ERRORS/EXCEPTIONS  : none
*
* FUNCTIONS CALLED   : - PPstop_pat
*
* DETAILED DESIGN    :
*    save message type, reply dest and reference in path db
*    set current pattern to requested pattern
*    set pat_type to requested type
*    set operation mode to requested mode
*    set current step to first step of pattern
*    if operation mode is PAC_MANUAL
*      set step state to WAITING_FOR_STEP
*    else
*      set step state to READY_FOR_STEP
*    if pattern has no steps
*      stop pattern
*
* REMARKS            :
*
* COMPONENT HISTORY  : 16 Sep 88 WC initial setup
*
********************************************************************/

void PPstrt_pat(ppdb, ev, pat, mode, type, rpy)
PATH_DB *ppdb;
EVENT_DESC *ev;
PAT *pat;
int mode;
int type;
int rpy;
```

```
        {

#ifdef DEBUG
#ifdef unix
        printf("\nExec pattern: %s\n", pat->pat_name);
#endif
#endif

/* remember reply destination for completion message */
        ppdb->rpy_path = rpy;
        if (rpy)
                {
                memcpy(&ppdb->dest_path, &ev->data.msg.reply_dest, sizeof(RPY_DEST));
                strncpy(ppdb->path_ref, ev->data.msg.buf, REF_SIZE);
                }

/* setup path database for execution of pattern */

        ppdb->pat_type = type;
        ppdb->pat_mode = mode;
        ppdb->cur_pat = pat;
        ppdb->cur_step = pat->step;
        if (mode == PAC_MANUAL)
                {
                ppdb->step_state = WAITING_FOR_STEP;
                ppdb->no_of_steps = 0;
                }
        else
                ppdb->step_state = READY_FOR_STEP;

        if (pat->step == NULLP(STEP))
                PPstop_pat(ppdb, ev, PAM_OK);
        }

/*FF*/
/*****************************************************************
*
* (C) Copyright by Foxboro Company 1988
*
* All rights reserved: Foxboro Company 1988
*
******************************************************************
*
* NAME                 : PPstop_pat
*
* FUNCTION             : Stop execution of a pattern
*
* INPUT PARAMETERS     : - reason
*
* IN/OUT PARAMETERS    : - path database
*                        - event database
*
* OUTPUT PARAMETERS    : none
*
* RETURN CODES         : none
*
* SYNOPSIS             : PPstop_pat(ppdb, ev, P_ABORTED)
*
* PRECONDITIONS        : none
*
* ERRORS/EXCEPTIONS    : none
*
* FUNCTIONS CALLED     : - PPrm_sync
*                        - PPreply
*
* DETAILED DESIGN      :
*   if a pattern is currently active then
*     remove pattern step from sync administration
*     if "path", "iz_path" or "fs_path" command to be answered
*       send completion message using <reason> for error code
*     if "step" command to be answered
*       send completion message using <reason> for error code
*     save current pattern, its type, its mode  and the stop
*     reason (= completion code) in the path database
*     set pattern type to NOPAT
*
* REMARKS              :
*
* COMPONENT HISTORY    : 16 Sep 88 WC initial setup
*                        02 Aug 89 RD added reset of STEP_ALRM
*
*****************************************************************/
```

```
void PPstop_pat( ppdb, ev, reason )
PATH_DB         *ppdb;
EVENT_DESC      *ev;
int             reason;
{
    /*
     * Check for path in operation.
     */

    if ( ppdb->pat_type == NO_PAT )
    {
        return;
    }

    /*
     * Close OM sync list.
     */

    PPrm_sync_list( ppdb, ev );

    /*
     * Tell initiator of "path" and "step" what happened.
     */

    if ( ppdb->rpy_step )
    {
        PPreply( ev, &ppdb->dest_step, ppdb->step_ref, O_STEP_P, reason, "" );
        ppdb->rpy_step = 0;
    }

    if ( ppdb->rpy_path )
    {
        PPreply( ev, &ppdb->dest_path, ppdb->path_ref, ppdb->rpy_path, reason,
            "" );
        ppdb->rpy_path = 0;
    }

    /*
     * Remember last operation.
     */

    ppdb->prev_pat = ppdb->cur_pat;
    ppdb->prev_type = ppdb->pat_type;
    ppdb->prev_mode = ppdb->pat_mode;
    ppdb->prev_cc = reason;

    /*
     * Reset database.
     */

    ppdb->pat_type = NO_PAT;
    if ( ppdb->excep & STEP_ALRM )
    {
        PPalrm( ppdb, ev, CLR_EXCEP, STEP_ALRM, "" );
    }

} /* End of PPstop_pat */

/*******************************************************************
 *
 * (C) Copyright by Foxboro Company 1988
 *
 * All rights reserved: Foxboro Company 1988
 *
 *******************************************************************
 *
 * NAME               : PPc_alrm
 *
 * FUNCTION           : Check alarm variables
 *
 * INPUT PARAMETERS   : none
 *
 * IN/OUT PARAMETERS  : - path database
 *                      - event database
 *
 * OUTPUT PARAMETERS  : none
 *
 * RETURN CODES       : none
 *
 * SYNOPSIS           : PPc_alrm(ppdb, ev);
 *
 * PRECONDITIONS      : none
 *
 * ERRORS/EXCEPTIONS  :
 *
```

```
* FUNCTIONS CALLED    : - PPalrm
*                       - PPset_bit
*                       - PPclr_bit
*                       - PPzero_bits
*
* DETAILED DESIGN     :
*   if path alarm var exist and index in val list = 0 then
*     path alarm var changed
*     invoke alarm handler
*   if no path alarm or val list > 1 then
*     eqe alarm var(s) changed, so
*     - update alarm bit map using val list
*     - invoke alarm handler
*
* REMARKS             :
*
* COMPONENT HISTORY   : 31 Aug 1988 WC initial setup
*                        1 Aug 1989 RD use .letter in stead of .word
*
*********************************************************************/

void PPc_alrm(ppdb, ev)
PATH_DB *ppdb;
EVENT_DESC *ev;
        {
        OM_VALUE_LIST *val_list = ev->data.dqch.val_list;
        int size = ev->data.dqch.size;
        int alrmcode;
        int bit_no;
        int path_alrm_exist;

/* process path alarm variable */

        path_alrm_exist = ppdb->path_alrm[0] != NULLC;
        if (val_list->index == 0 && path_alrm_exist)
                {
                if ((val_list->status & OM_STAT) != BEING_SCANNED ||
                        val_list->uval.letter != '\0')
                        alrmcode = SET_EXCEP;
                else
                        alrmcode = CLR_EXCEP;

                PPalrm(ppdb, ev, alrmcode, PATH_ALRM, "");

                if (--size == 0)
                        return;

                val_list++;
                }

/* process equipment alarm updates */

        while (size--)
                {
                bit_no = val_list->index - path_alrm_exist;

                if ((val_list->status & OM_STAT) != BEING_SCANNED ||
                        val_list->uval.letter != '\0')
                        PPsetbit(ppdb->alrm_map, bit_no);
                else
                        PPclrbit(ppdb->alrm_map, bit_no);

                val_list++;
                }
        if (PPzerobits(ppdb->alrm_map, ppdb->n_eqe_alrms))
                alrmcode = CLR_EXCEP;
        else
                alrmcode = SET_EXCEP;

        PPalrm(ppdb, ev, alrmcode, EQE_ALRM, "");
        }

/*FF*/
/*********************************************************************
*
* (C) Copyright by Foxboro Company 1988
*
* All rights reserved: Foxboro Company 1988
*
**********************************************************************
*
* NAME                : PPalrm
*
* FUNCTION            : Path alarm handler
*
```

```
 * INPUT PARAMETERS   : operation code (SET, CLEAR)
 *                      alarm code  - PATH_ALRM
 *                                  - EQE_ALRM
 *                                  - PATH_EXCEP
 *                      requestor
 *
 * IN/OUT PARAMETERS  : - path database
 *                      - event database
 *
 * OUTPUT PARAMETERS  : none
 *
 * RETURN CODES       : none
 *
 * SYNOPSIS           : PPalrm(ppdb, ev, opcode, alarmcode, req)
 *
 * PRECONDITIONS      : none
 *
 * ERRORS/EXCEPTIONS  : none
 *
 * FUNCTIONS CALLED   : - PPreply
 *
 * DETAILED DESIGN    :
 *   remember current path_db.excep
 *   set or clear flags in path_db.excep according to op code
 *   if path_db.excep was zero and now one or more flags are set
 *     log event "exception raised"
 *     invoke exception procedure
 *     check path operation mode
 *     if not in FAILSAFE and auto_failsafe is TRUE and a
 *       failsafe pattern is specified then
 *         abort current pattern
 *         start failsafe pattern
 *   else
 *     if path_db.excep was not zero and now it is
 *       log event "return from excep"
 *
 * REMARKS            :
 *
 * COMPONENT HISTORY  : Aug 26 '88 WC initial setup
 *                      Jan 04 '89 RD changed HLBL_S into D_HLBL_EXCEP
 *                      Aug 02 '89 RD added exception type to logging
 *
 ********************************************************************/

void PPalrm( ppdb, ev, op_code, excep_code, requestor )
PATH_DB         *ppdb;
EVENT_DESC      *ev;
int             op_code;
int             excep_code;
char            *requestor;
{
    char        *argv[5];
    int         old_excep = ppdb->excep;

    switch ( op_code )
    {
    case SET_EXCEP:
        ppdb->excep |= excep_code;
        break;

    case CLR_EXCEP:
        ppdb->excep &= ~excep_code;
        break;
    }

    /*
     * Ready if nothing changed.
     */

    if ( ppdb->excep == old_excep )
    {
        return;
    }

    /*
     * Log event.
     */

    argv[0] = requestor;
    argv[1] = ppdb->path_name;
    argv[2] = "";
    switch ( excep_code )
    {
    case PATH_EXCEP:
        argv[3] = "PATH_EXCEP";
        break;
```

```
case PATH_ALRM:
    argv[3] = "PATH_ALRM";
    break;

case EQE_ALRM:
    argv[3] = "EQE_ALRM";
    break;

case STEP_ALRM:
    argv[3] = "STEP_ALRM";
    break;

default:
    argv[3] = NULLP( char );
}
argv[4] = NULLP( char );
if ( op_code == SET_EXCEP )
{
    if ( ppdb->pat_type != NO_PAT )
    {
        argv[2] = ppdb->cur_pat->pat_name;
    }

    PPlog_pac( ev, E_P_EXCEPT, ppdb->environment, argv );
}
else
{
    PPlog_pac( ev, E_RP_EXCEPT, ppdb->environment, argv );
}

/*
 * Ready if we don't have a transition from no alarm to alarm.
 */

if ( op_code == CLR_EXCEP || old_excep != 0 )
{
    return;
}

/*
 * Check if failsafe pattern is to be started.
 */

if ( ppdb->auto_failsafe && ppdb->fail_pat != NULLP( PAT ) &&
    ppdb->pat_type != FAIL_PAT )
{
    PPstop_pat( ppdb, ev, P_FAILSAFE );
    PPstrt_pat( ppdb, ev, ppdb->fail_pat, PAC_AUTO, FAIL_PAT, 0 );
}

/*
 * Invoke exception procedure.
 */

switch( ppdb->excep_proc.type )
{
case D_HLBL_EXCEP:
    PPhlbl_s( ppdb, ev );
    break;
    default:
        break;
    }

} /* End of PPalrm */

/*****************************************************************
 *
 * (C) Copyright by Foxboro Company 1988
 *
 * All rights reserved: Foxboro Company 1988
 *
 *****************************************************************
 *
 * NAME                : PPhlbl_s
 *
 * FUNCTION            : HLBL/start block in case of exception
 *
 * INPUT PARAMETERS    : none
 *
 * IN/OUT PARAMETERS   : - path database
 *                       - event database
 *
 * OUTPUT PARAMETERS   : value
 *
 * RETURN CODES        : none
 *
```

```
* SYNOPSIS            : PPhlbl_s(&path_db)
*
* PRECONDITIONS       : none
*
* ERRORS/EXCEPTIONS   : - OM getval returns an error
*                       - OM setval returns an error
*
* FUNCTIONS CALLED    : - PPerr_rpt
*                       - PPg_name
*
* DETAILED DESIGN     :
*   retrieve name of exception procedure
*   getval of excep_proc.status
*   if not ACTIVE then
*     setval excep_proc.SN001 to path name
*     setval excep_proc.SN002 to path owner
*     setval excep_proc.SN003 to path key
*     setval excep_proc.II001 to ACTIVE
*
* REMARKS             :
*
* COMPONENT HISTORY   : 17 Oct 88 WC initial setup
*                       04 Jan 89 RD solved setval bugs
*                       05 Jan 89 RD ACTIVE is BOOLEAN
*                       07 Feb 89 RD changed length of string settings
*                                    to strlen()+1 in stead of fixed length
*                       13 Mar 89 RD changed setval() to set_confirm()
*                       17 Jul 89 RD Corrected test to see if procedure is
*                                          already active
*
*****************************************************************/

void PPhlbl_s(ppdb, ev)
PATH_DB *ppdb;
EVENT_DESC *ev;
        {
        char blk_name[VAR_NAME_SIZE+2];
        char par_name[VAR_NAME_SIZE+2];
        UVAL val;
        int result;
        int status;
        int data_len = 2;
        int var_type;


/* test for HLBL block beeing active, if so do nothing */

        PPg_name(&ppdb->excep_proc.name, blk_name);

        sprintf(par_name, "%s.ACTIVE", blk_name);
        result = getval(par_name, VARIABLE, 0, &val, &status, &data_len);
        if (result != OM_SUCCESS)
                {
                PPerr_rpt(PAM, PE_GETVAL, ev->cmd_apname, par_name);
                return;
                }

        if (val.letter != '\0')
                return;


/* set path name parameter */

        sprintf(par_name, "%s.SN0001", blk_name);
        var_type = STRING;
#ifdef unix
#ifdef DEBUG
        result = PPsetval(par_name, VARIABLE, 0, ppdb->path_name,
                  &var_type, strlen( ppdb->path_name ) + 1);
#endif
#endif
        result = set_confirm(par_name, VARIABLE, 0, ppdb->path_name, &var_type,
                  strlen( ppdb->path_name ) + 1);
        if (result != OM_SUCCESS)
                PPerr_rpt(PAM, PE_SETVAL, ev->cmd_apname, par_name);


/* set path owner parameter */

        sprintf(par_name, "%s.SN0002", blk_name);
        var_type = STRING;
#ifdef unix
#ifdef DEBUG
        result = PPsetval(par_name, VARIABLE, 0, ppdb->owner, &var_type,
                  strlen( ppdb->owner) + 1);
```

```
#endif
#endif
        result = set_confirm(par_name, VARIABLE, 0, ppdb->owner, &var_type,
                 strlen( ppdb->owner) + 1);
        if (result != OM_SUCCESS)
                PPerr_rpt(PAM, PE_SETVAL, ev->cmd_apname, par_name);


/* set path key parameter */

        sprintf(par_name, "%s.SN0003", blk_name);
        var_type = STRING;
#ifdef unix
#ifdef DEBUG
        result = PPsetval(par_name, VARIABLE, 0, ppdb->key, &var_type, strlen( ppdb->key) + 1);
#endif
#endif
        result = set_confirm(par_name, VARIABLE, 0, ppdb->key, &var_type, strlen(ppdb->key) + 1);
        if (result != OM_SUCCESS)
                PPerr_rpt(PAM, PE_SETVAL, ev->cmd_apname, par_name);


/* set alarm parameter */

        sprintf(par_name, "%s.II0001", blk_name);
        var_type = OM_LNG_INT;
        val.longint = ( long ) ppdb->excep;
#ifdef unix
#ifdef DEBUG
        result = PPsetval(par_name, VARIABLE, 0, &val, &var_type, 0);
#endif
#endif
        result = set_confirm(par_name, VARIABLE, 0, &val, &var_type, 0);
        if (result != OM_SUCCESS)
                PPerr_rpt(PAM, PE_SETVAL, ev->cmd_apname, par_name);


/* activate HLBL block */

        sprintf(par_name, "%s.ACTIVE", blk_name);
        var_type = BOOLEAN;
        val.word = 1;
#ifdef unix
#ifdef DEBUG
        result = PPsetval(par_name, VARIABLE, 0, &val, &var_type, 1);
#endif
#endif
        result = set_confirm(par_name, VARIABLE, 0, &val, &var_type, 1);
        if (result != OM_SUCCESS)
                PPerr_rpt(PAM, PE_SETVAL, ev->cmd_apname, par_name);
        }

/*FF*/
/*****************************************************************
 *
 * (C) Copyright by Foxboro Company 1988
 *
 * All rights reserved: Foxboro Company 1988
 *
 *****************************************************************
 *
 * NAME                 : PPe_step
 *
 * FUNCTION             : Execute the first (sync rule) part of the current
 *                        step.
 *
 * INPUT PARAMETERS     : none
 *
 * IN/OUT PARAMETERS    : - path database
 *                        - event database
 *
 * OUTPUT PARAMETERS    : none
 *
 * RETURN CODES         : none
 *
 * SYNOPSIS             : PPe_step(&pathdb, &eventdb)
 *
 * PRECONDITIONS        : none
 *
 * ERRORS/EXCEPTIONS    : none
 *
 * FUNCTIONS CALLED     : - PPa_sync
 *                        - PPrm_sync
 *                        - PPst_act
 *                        - PPeval_sync
```

```
 *
 * DETAILED DESIGN     :
 *   case on step state
 *   READY_FOR_STEP:
 *     if sync rule specified then
 *       update sync var administration for new rule
 *       set step state to WAITING_FOR_SYNC
 *     else
 *       execute action part of step
 *     return;
 *
 *   WAIT FOR SYNC:
 *     evalute sync rule
 *     if syncrule is TRUE then
 *       delete rule from sync var administration
 *       execute action part of step
 *
 * REMARKS             :
 *
 * COMPONENT HISTORY   : Aug 26 '88 WC initial setup
 *                       Aug 01 '89 RD handle error returned by PPa_sync_list
 *                       Sep 21 '89 RD wait one second after PPrm_sync_list
 *
 *****************************************************************************/

void PPe_step( ppdb, ev )
PATH_DB         *ppdb;
EVENT_DESC      *ev;
{
    switch ( ppdb->step_state )
    {
    case READY_FOR_STEP:
        if ( ppdb->cur_step->sync_desc == NULLP( SYNC_DESC ) )
        {
            PPst_act( ppdb, ev );
        }
        else
        {
            if ( PPa_sync_list( ppdb, ev ) == PAM_OK )
            {
                ppdb->step_state = WAITING_FOR_SYNC;
#ifdef DEBUG
#ifdef unix
                printf( "Waiting for Sync Rule ...\n" );
#endif
#endif
            }
            else
            {
                /*
                 * Sync Rule list could not be opened.
                 */

                if ( ppdb->pat_type == FAIL_PAT )
                {
                    /*
                     * Ignore error; start action.
                     */

                    PPst_act( ppdb, ev );
                }
                else
                {
                    PPalrm( ppdb, ev, SET_EXCEP, STEP_ALRM, "" );
                }
            }
        }
        break;

    case WAITING_FOR_SYNC:
        if ( PPeval_sync( ppdb, ev ) )
        {
            PPrm_sync_list( ppdb, ev );
            PPst_act( ppdb, ev );
            sleep( 1 );
        }
        break;

    } /* End of switch */

} /* End of PPe_step */

/*****************************************************************************
 *
 * (C) Copyright by Foxboro Company 1988
```

```
 *
 * All rights reserved: Foxboro Company 1988
 *
 ******************************************************************
 *
 * NAME                 : PPst_act
 *
 * FUNCTION             : Execute action part of pattern step.
 *
 * INPUT PARAMETERS     : none
 *
 * IN/OUT PARAMETERS    : - path database
 *                          - event database
 *
 * OUTPUT PARAMETERS    : none
 *
 * RETURN CODES         : none
 *
 * SYNOPSIS             : PPst_act(&pathdb, &eventdb)
 *
 * PRECONDITIONS        : none
 *
 * ERRORS/EXCEPTIONS    :
 *     - OM setval returns an error
 *
 * CALLED BY            : - PPst_sync
 *
 * FUNCTIONS CALLED     : - PPreply
 *                          - PPg_name
 *                          - PPerr_rpt
 *                          - PPstop_pat
 *
 * DETAILED DESIGN      :
 *   retrieve name, type and value of action variable
 *   set action var to value using OM setval
 *   setup path database for next step
 *   if there is no next step
 *     stop execution of pattern
 *   else check if this was the last step of a manual step request
 *     if so then send completion message to requestor
 *
 * REMARKS              :
 *
 * COMPONENT HISTORY    : Aug 26 '88 WC initial setup
 *                          Feb 07 '89 RD add 1 to length of string to be set.
 *                          Mar 13 '89 RD changed setval to set_confirm()
 *                          Jun 30 '89 RD handle empty action correctly
 *                          Aug 01 '89 RD handle error in set_confirm
 *
 ******************************************************************/

void PPst_act( ppdb, ev )
PATH_DB         *ppdb;
EVENT_DESC      *ev;
{
    STEP        *step;
    char        var_name[VAR_NAME_SIZE+2];
    int         var_type;

    ACT_DESC    *action;
    int         status;

    step = ppdb->cur_step;
    action = step->act_desc;

    if ( action != NULLP( ACT_DESC ) )
    {
        /*
         * Get name of variable.
         */

        PPg_name( &action->name, var_name );
        var_type = action->type;

        /*
         * Sync Rule has become true, now complete action of step.
         */

#ifdef DEBUG
#ifdef unix
        PPsetval( var_name, VARIABLE, 0, &action->val, &var_type, 0 );
#endif
```

```
#endif
        if ( var_type == BOOLEAN )
        {
            status = set_confirm( var_name, VARIABLE, 0, &action->val,
                &var_type, 1 );
        }
        else if ( var_type == STRING )
        {
            status = set_confirm( var_name, VARIABLE, 0, action->val.strp,
                &var_type, strlen( action->val.strp ) + 1 );
        }
        else
        {
            status = set_confirm( var_name, VARIABLE, 0, &action->val,
                &var_type, 0 );
        }

        if ( status != OM_SUCCESS )
        {
            PPerr_rpt( PAM, PE_SETVAL, ev->cmd_apname, var_name );
            if ( ppdb->pat_type != FAIL_PAT )
            {
                PPalrm( ppdb, ev, SET_EXCEP, STEP_ALRM, "" );
                return;
            }
        }

    } /* End of if not empty action */

    /*
     * Setup next step.
     */
    ppdb->cur_step = step = step->next;
    ppdb->step_state = READY_FOR_STEP;

    /*
     * Check for completion of pattern and completion of step command.
     */

    if ( step == NULLP( STEP ) )
    {
        PPstop_pat( ppdb, ev, PAM_OK );
    }
    else if ( ppdb->pat_mode == PAC_MANUAL && --ppdb->no_of_steps == 0 )
    {
        ppdb->step_state = WAITING_FOR_STEP;
        PPreply( ev, &ppdb->dest_step, ppdb->step_ref, O_STEP_P, PAM_OK, "" );
        ppdb->rpy_step = 0;
    }
}

/*****************************************************************
 *
 * (C) Copyright by Foxboro Company 1988
 *
 * All rights reserved: Foxboro Company 1988
 *
 *****************************************************************
 *
 * NAME                : PPeval_sync
 *
 * FUNCTION            : evaluate sync rule after a dq change of the sync
 *                       variable.
 *
 * INPUT PARAMETERS    : none
 *
 * IN/OUT PARAMETERS   : - path database
 *                       - event database
 *
 * OUTPUT PARAMETERS   : none
 *
 * RETURN CODES        : sync rule is TRUE or FALSE
 *
 * SYNOPSIS            : result = PPeval_sync_rule(&pathdb, &eventdb)
 *
 * PRECONDITIONS       : none
 *
 * ERRORS/EXCEPTIONS   : none
 *
 * FUNCTIONS CALLED    : - PPstoval
 *
 * DETAILED DESIGN     :
 *   if status of OM value indicates that sync var cannot be reached
 *     return FALSE
 *   else
```

```
*     retrieve relation and constant of syncrule
*     retrieve value and data type of sync variable
*     compare value with constant using relation and data type
*     return result
*
* REMARKS              :
*
* COMPONENT HISTORY    : 31 Aug 1988 WC initial setup
*                        30 Jun 1989 RD added support for boolean and character
*                        01 Aug 1989 RD handle invalid status
*                        01 Sep 1989 RD correct copy of uval
*
******************************************************************/

int PPeval_sync( ppdb, ev )
PATH_DB          *ppdb;
EVENT_DESC       *ev;
{
    OM_VALUE_LIST        *om_val_list = ev->data.dqch.val_list;
    int                  err;
    int                  status;
    int                  relation;
    UVAL                 val, cval;
    float                delta = 0.0;
    SYNC_DESC            *sync;

    /*
     * Retrieve status of sync rule variable.
     */

    status = om_val_list[0].status & OM_STAT;
    if ( status != BEING_SCANNED )
    {
        if ( ppdb->pat_type == FAIL_PAT )
        {
            /*
             * Ignore sync rule.
             */

            return( 1 );
        }
        else
        {
            PPalrm( ppdb, ev, SET_EXCEP, STEP_ALRM, "" );
            return( 0 );
        }
    }

    /*
     * Retrieve value of sync rule variable.
     */

    memcpy( &val, &om_val_list[0].uval, sizeof( om_val_list[0].uval ) );
    /* val.fpoint = om_val_list[0].uval.fpoint; */

    /*
     * Retrieve relation.
     */
    sync = ppdb->cur_step->sync_desc;
    relation = sync->relation;

    /*
     * If type unknown then retrieve type of sync variable from value list.
     */

    if ( sync->type == 0 )
    {
        sync->type = om_val_list[0].status & 0x1F;
        err = PPstoval( sync->pval, sync->type, &sync->val );
        if ( err != PAM_OK )
        {
            PPerr_rpt( PAM, PE_CFG, ppdb->key,
                "Sync Rule value not convertable" );
            if ( ppdb->pat_type == FAIL_PAT )
            {
                /*
                 * Ignore sync rule.
                 */

                return( 1 );
            }
            else
            {
                PPalrm( ppdb, ev, SET_EXCEP, STEP_ALRM, "" );
                return( 0 );
```

```
        }
    }
}

/*
 * Evaluate logical expression.
 */

memcpy( &cval, &sync->val, sizeof( UVAL ) );
switch ( relation )
{
case LT:
    switch ( sync->type )
    {
    case CHARACTER:
    case BOOLEAN:
        return ( val.letter < cval.letter );

    case INTEGER:
        return ( val.word < cval.word );

    case FLOAT:
        return ( val.fpoint - delta < cval.fpoint );

    case OM_LNG_INT:
        return ( val.longint < cval.longint );
    }

case LE:
    switch ( sync->type )
    {
    case CHARACTER:
    case BOOLEAN:
        return ( val.letter <= cval.letter );

    case INTEGER:
        return ( val.word <= cval.word );

    case FLOAT:
        return ( val.fpoint - delta <= cval.fpoint );

    case OM_LNG_INT:
        return ( val.longint <= cval.longint );
    }

case GT:
    switch ( sync->type )
    {
    case CHARACTER:
    case BOOLEAN:
        return ( val.letter > cval.letter );

    case INTEGER:
        return ( val.word > cval.word );

    case FLOAT:
        return ( val.fpoint + delta > cval.fpoint );

    case OM_LNG_INT:
        return ( val.longint > cval.longint );
    }

case GE:
    switch ( sync->type )
    {
    case CHARACTER:
    case BOOLEAN:
        return ( val.letter >= cval.letter );

    case INTEGER:
        return ( val.word >= cval.word );

    case FLOAT:
        return ( val.fpoint + delta >= cval.fpoint );

    case OM_LNG_INT:
        return ( val.longint >= cval.longint );
    }

case EQ:
    switch ( sync->type )
    {
    case CHARACTER:
    case BOOLEAN:
        return ( val.letter == cval.letter );
```

```
        case INTEGER:
            return ( val.word == cval.word );

        case FLOAT:
            return ( val.fpoint >= cval.fpoint - delta &&
                val.fpoint <= cval.fpoint + delta );

        case OM_LNG_INT:
            return ( val.longint == cval.longint );
        }

    case NE:
        switch ( sync->type )
        {
        case CHARACTER:
        case BOOLEAN:
            return ( val.letter != cval.letter );

        case INTEGER:
            return ( val.word != cval.word );

        case FLOAT:
            return ( val.fpoint < cval.fpoint - delta ||
                val.fpoint > cval.fpoint + delta );

        case OM_LNG_INT:
            return ( val.longint != cval.longint );
        }
    }

    /*
     * This point can only be reached if an incorrect type has been found.
     * Generate an error report.
     */

    PPerr_rpt( PAM, PE_OMREAD, ev->cmd_apname, "" );
    if ( ppdb->pat_type == FAIL_PAT )
    {
        /*
         * Ignore this sync rule.
         */

        return( 1 );
    }
    else
    {
        PPalrm( ppdb, ev, SET_EXCEP, STEP_ALRM, "" );
        return( 0 );
    }
}
/***************************************************************
*
* (C) Copyright by Foxboro Company 1988
*
* All rights reserved: Foxboro Company 1988
*
****************************************************************
*
* NAME                : PPstoval
*
* FUNCTION            : convert string to value
*
* INPUT PARAMETERS    : string
*                       data type
*
* OUTPUT PARAMETERS   : value
*
* RETURN CODES        : - PAM_OK
*                       - P_FORMAT_ERROR
*
* SYNOPSIS            : err = PPstoval("6.7", FLOAT, &var_val)
*
* PRECONDITIONS       : none
*
* ERRORS/EXCEPTIONS   : string is not convertable
*
* FUNCTIONS CALLED    : none
*
* DETAILED DESIGN     : use sscanf
*
* REMARKS             :
*
* COMPONENT HISTORY   : 16 Sep 88 WC initial setup
*
***************************************************************/
```

```
int PPstoval(str, type, val)
char *str;
int type;
UVAL *val;
        {
        switch (type)
                {
        case BOOLEAN:
                if (sscanf(str, "%d", &val->word) != 1)
                        return P_FORMAT_ERROR;

                if (val->word != 0 && val->word != 1)
                        return P_FORMAT_ERROR;

                return PAM_OK;

        case CHARACTER:
                val->letter = str[0];
                return PAM_OK;

        case INTEGER:
                if (sscanf(str, "%d", &val->word) != 1)
                        return P_FORMAT_ERROR;

                return PAM_OK;

        case OM_LNG_INT:
                if (sscanf(str, "%ld", &val->longint) != 1)
                        return P_FORMAT_ERROR;

                return PAM_OK;

        case FLOAT:
                if (sscanf(str, "%f", &val->fpoint) != 1)
                        return P_FORMAT_ERROR;

                return PAM_OK;

        case STRING:
                val->strp = str;
                return PAM_OK;

        default:
                return P_FORMAT_ERROR;
                }
        }

/*************************************************************************
*  @(#)pac_tst.c        1.2  New System, Foxboro Co.  8/17/89
**************************************************************************
*
* (C)Copyright by Foxboro Company  1988
*
* All rights reserved:  Foxboro Company  1988
**************************************************************************
*
* FILE ID              : PAC_TST.C
*
* PART NUMBER          :
*
* FUNCTION             : Debug tools for path controller
*
* FUNCTIONS CONTAINED  :
*
* DATA STRUCTURES      :
*
* COMPONENT HISTORY    : 31 Aug 1988 WC initial setup
*                        13 Jul 1989 RD Increased some sizes from
*                                    VAR_NAME_SIZE to VAR_NAME_SIZE+2
*                        14 Jul 1989 RD Minor corrections
*                        17 Jul 1989 RD Show exception information in show_cfg()
*************************************************************************/

static char SCCS_ID[] = "@(#)pac_tst.c  1.2\t(89/08/17)";

#include "pac.h"

/* OM var type table */
```

```
char rsv_cio[] = "RESERVED_CIO";
char *typetbl[] = {
        "UNKNOWN  ",
        "CHARACTER",
        "INTEGER  ",
        "FLOAT    ",
        "STRING   ",
        "BOOLEAN  ",
        "LONG_INT ",
        rsv_cio,
        rsv_cio,
        rsv_cio,
        rsv_cio,
        rsv_cio,
        rsv_cio,
        rsv_cio,
        rsv_cio,
        rsv_cio,
        rsv_cio,
        };

int PPinfo(p_ppdb, ev, argc, argv, msg, ref, reply_dest)
PATH_DB **p_ppdb;
EVENT_DESC *ev;
int argc;
char *argv[];
char *msg;
char *ref;
int reply_dest;
        {
        PATH_DB *ppdb = *p_ppdb;

        if (argc < 2)
                {
                printf("Not enough arguments: use ref;1;path_name;code \n \
   code =  a s m p c\n\n \
   path names are:\n");

                for (ppdb = *p_ppdb; ppdb != NULLP(PATH_DB); ppdb = ppdb->next)
                        printf("      %s\n",ppdb->path_name);
                return 0;

                }

        ppdb = PPf_pth(*p_ppdb, argv[0]);
        if (ppdb == NULLP(PATH_DB))
                {
                printf("No such path defined!\n");
                return 0;
                }

        switch (argv[1][0])
                {
        case 'a':
                show_alrm(ppdb);
                break;

        case 's':
                show_sync(ppdb);
                break;

        case 'm':
                show_mem(ppdb);
                break;

        case 'p':
                show_status(ppdb);
                break;

        case 'c':
                show_cfg(ppdb);
                break;
                }
        }
/**************************
 *
 * print alarm variables
 * current state and value
 *
 **************************/
```

```
int show_alrm(ppdb)
PATH_DB *ppdb;
        {
        int i, j, n;
        int mask;

        if (ppdb->alrm_open == 0)
                {
                printf("No alarm list opened\n");
                return 0;
                }

        printf("Alarm variables: OM id = %d\n", ppdb->om_id_alrm);
        printf("------------------------------\n");

        list_open_var(&ppdb->alrm_header);

        printf("\nAlarm map:\n");
        for (i = 0, n = 0; i < (ppdb->n_eqe_alrms + 15) / 16; i++, printf("\n"))
                for (j = 0, mask = 1; j < 16 && n < ppdb->n_eqe_alrms; j++, mask = mask<<1, n++)
                                printf(" %d", (ppdb->alrm_map[i] & mask) != 0);
        }

/*************************
 *
 * print sync rule variables
 * current state and value
 *
 *************************/

int show_sync(ppdb)
PATH_DB *ppdb;
        {
        if (ppdb->sync_open == 0)
                {
                printf("No sync list opened\n");
                return 0;
                }

        printf("Sync rule: OM id = %d\n", ppdb->om_id_sync);
        printf("----------------------\n");

        list_open_var(&ppdb->sync_header);
        }


/*************************
 *
 * print arguments of OM setval
 *
 *************************/

int PPsetval(var_name, objtype, import, value, status, size)
char *var_name;
int objtype;
UVAL *value;
int *status;
int size;
        {
        printf("setval to %s, objtype: %d  ",
                var_name, objtype);

        if ( *status & 0x1F == STRING )
        {
                printf( "STRING     %s\n", value );
        }
        else
        {
                prival(*status & 0x1F, value);
        }

        return 0;
        }
/*************************
 *
 * print amount of memory in
 * use.
 *
 *************************/
```

```
int show_mem(ppdb)
PATH_DB *ppdb;
        {
        MEM_BLK *bp;
        int n;
        long size1, size2, size3, total;

        printf("\nMemory usage:\n");
        printf("-------------\n");

        for(bp=ppdb->mem_blk, n= 0; bp !=NULLP(MEM_BLK);bp = bp->next, ++n);

        size1 = n * sizeof(MEM_BLK);
        size2 = ppdb->alrm_header.size_open_list * sizeof(OM_VAR_LIST);
        size3 = ppdb->alrm_header.size_open_list * sizeof(OM_VALUE_LIST);

        total = size1 + size2 + size3;

        printf("Patterns and steps: %ld\n\
OM alarm list:      %ld\n\
OM value list:      %ld\n\n\
Total:              %ld\n",
                size1, size2, size3, total);
        }

/*************************
 *
 * show operational status of
 * path.
 *
 *************************/

int show_status(ppdb)
PATH_DB *ppdb:
        {
        printf("\nPath Status:\n");
        printf("-------------\n");

        printf("exception flag = %x\n", ppdb->excep);

        if (ppdb->pat_type == NO_PAT)
                {
                printf("No pattern in operation\n");
                if (ppdb->cur_pat == NULLP(PAT))
                        printf("No previous pattern\n");
                else
                        printf("Previous Patter was: %s\n",ppdb->cur_pat->pat_name);
                }
        else
                {
                printf("Current pattern is: %s\n", ppdb->cur_pat->pat_name):
                printf("operation_mode =    %d\n", ppdb->pat_mode);
                printf("current Step   =    %d\n", ppdb->cur_step->step_no);
                }
        }

/*************************
 *
 * print OM open points list
 *
 *************************/

int list_open_var(om_header)
OM_HEADER *om_header;
        {
        int i, type;
        OM_VAR_LIST *list_elem;

        printf("Open points list:\n");

        list_elem = om_header->open_list_ptr;

        printf("\n\nOpen var list: size =  %d\n\n", om_header->size_open_list);

        printf("      Name                desc   delta    status    type    value\n");
        for (i = 0;  i < om_header->size_open_list;  i++)
                {
                printf("%20s   %4x    %5f     %4x     ", list_elem[i].name,
```

```
                    list_elem[i].var_desc.
                    list_elem[i].delta,
                    list_elem[i].var_stat);

                type = list_elem[i].var_stat & 0x1F;
                prival(type, &list_elem[i].uval);

/*              dump_mem(&list_elem[i], 100); */
                }
        }

int dump_mem(p, n)
char *p;
int n;
        {
        int i;
        int c;

        for (i = 0;  i < n;  i++)
                {
                if (i % 8 == 0)
                        printf("\n%3x:", i);

                c = *p++;
                if (c >= ' ' & c <= '~')
                        printf(" %2x(%c)", c, c);
                else
                        printf(" %2x(?)", c);

                }
        }
/*************************
 *
 * print OM value list
 *
 *************************/

int list_value(val_list, size)
OM_VALUE_LIST *val_list;
int size;
        {
        int i, sts, type;

        printf("\n\n\nValue list\n\n");
        printf("index  status         type    value\n");
        for (i = 0;  i < size;  i++)
                {
                sts = val_list[i].status;
                type = sts & 0x1F;

                printf("  %d        %x        ", i, sts);
                prival(type, &val_list[i].uval);
                }
        }

/*************************
 *
 * print type and value of OM var
 *
 *************************/

int prival(type, value)
int type;
UVAL *value;
        {
        printf("%s  ", typetbl[type]);
        switch (type)
                {
        case CHARACTER:
                printf("%c\n", value->letter);
                break;

        case INTEGER:
                printf("%d\n", value->word);
                break;

        case OM_LNG_INT:
                printf("%ld\n", value->longint);
                break;

        case FLOAT:
                printf("%f\n", value->fpoint);
                break;
```

```
        case BOOLEAN:
                printf("%d\n", value->letter != '\0' );
                break;

        case STRING:
                printf("%s\n", value->strp);
                break;

        default:
                printf("%lx\n", value->longint);
                break;
                }
        }

/*************************
 *
 * show configuration database
 *
 *************************/

int show_cfg(ppdb)
PATH_DB *ppdb;
        {
        PAT *pat;
        STEP *step;
        ALRM_DESC *alm;

        char vname[VAR_NAME_SIZE+2];

        printf("\n\n");

        printf("init pat name  = %s\n", ppdb->name_init_pat);
        printf("fail pat name  = %s\n", ppdb->name_fail_pat);
        printf("path alarm     = %s\n", ppdb->path_alrm);
        PPg_name( &ppdb->excep_proc.name, vname );
        printf("exception type = %d\n", ppdb->excep_proc.type);
        printf("exception proc = %s\n", vname);

        printf("operation_mode = %d\n", ppdb->default_pat_mode);
        printf("auto_failsafe  = %d\n", ppdb->auto_failsafe);


        pat = ppdb->pat;
        while (pat != NULLP(PAT))
                {
                printf("\npat: %s\n", pat->pat_name);

                step = pat->step;
                while (step != NULLP(STEP))
                        {
                        printf("    stepno:    %d\n", step->step_no);
                        pri_sync(step->sync_desc);
                        pri_act(step->act_desc);
                        step = step->next;
                        }

                pat = pat->next;
                }

        printf("\n\n");
        }


int pri_act(a)
ACT_DESC *a;
        {
        NAME *n;
        char name[VAR_NAME_SIZE+2];
        int t;

        printf("    ACT DESC: ");
        if (a == NULLP(ACT_DESC))
                {
                printf("None\n");
                return 0;
                }

        n = &a->name;
        PPg_name(n, name);
```

```
        printf("name,  type and value:  %s   ", name);
        prival(a->type, &a->val);
        printf("\n");
        }


int pri_sync(s)
SYNC_DESC *s;
        {
        NAME *n;
        char name[VAR_NAME_SIZE+2];

        printf("  , SYN DESC: ");
        if (s == NULLP(SYNC_DESC))
                {
                printf("None\n");
                return 0;
                }

        n = &s->name;
        PPg_name(n, name);

        printf("%s %s %s     ", name, PPvtomnem(PPDrelation, s->relation), s->pval);
        prival(s->type, &s->val);
        }

/*************************************************************************
*  @(#)pam_rpt.h        1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&3**********************************************************************
*                                                                        *
*  FILE NAME          : pam_rpt.h                                        *
*                                                                        *
*  PART NUMBER        :                                                  *
*                                                                        *
*  FUNCTION           : Definitions for PPerr_rpt()                      *
*                                                                        *
*  COMPONENT HISTORY :                                                   *
*  -------------------------------------------------------------------   *
*  20 OCT 1988 - RD - Creation                                           *
*  10 NOV 1988 - WC - Modified PE_EOE_CFG to PE_CFG                      *
*                     Added PE_OMCLOSE                                   *
*  11 NOV 1988 - RD - Removed PE_CRIT_FAIL                               *
*  05 DEC 1988 - GM - ELS literals added                                 *
*  26 JUN 1989 - RD - Added PE_USAGE_CONDS                               *
*  11 AUG 1989 - RD - Added PE_STOP                                      *
*                                                                        *
*************************************************************************/


/**********************
* Function Declaration *
**********************/

extern  int     PPerr_rpt();


/**********************
* Subsystem Identifier *
**********************/

#define PAM                     -86


/************
* IPC Errors *
************/

#define PE_INIT                 1       /* Initialize failed            */
#define PE_RECEIVE              2       /* Receive failed               */
#define PE_SEND                 3       /* Send failed                  */


/***********
* OM Errors *
***********/

#define PE_GETVAL               10      /* Get value failed             */
#define PE_SETVAL               11      /* Set value failed             */
#define PE_OMOPEN               12      /* Open list failed             */
```

```
#define PE_OMREAD               13      /* Read list failed              */
#define PE_OMWRITE              14      /* Write list failed             */
#define PE_DQCHANGE             15      /* Change driven access failed   */
#define PE_OMCLOSE              16      /* Close list failed             */


/******************
* Path Management *
******************/

#define PE_INV_MESSAGE          20      /* Invalid message received      */
#define PE_INV_ARGUMENTS        21      /* Invalid arguments specified   */
#define PE_FATAL_ERROR          22      /* Fatal error                   */
#define PE_RESULT               23      /* Result of function could not
                                           be given to requestor         */
#define PE_OPEN_FAIL            24      /* Open file failure             */
#define PE_DBDIR_FAIL           25      /* Database directory failure    */
#define PE_STOP                 26      /* Program stopped               */


/******************
* Path Controller *
******************/

#define PE_HIWAIT               30      /* HI wait event failed          */
#define PE_HIINIT               31      /* HI initialize failed          */
#define PE_CFG                  33      /* configuration wrong           */

/**************************
* Event Logging Subsystem *
**************************/

#define PE_NO_EVENTS            40      /* no events are configured */
#define PE_NO_FORMATS           41      /* no message formats are configured */
#define PE_NO_DEVICES           42      /* no logging devices are configured */

/**************************************
* Path Selection and Release Subsystem *
**************************************/

#define PE_USAGE_CONDS          50      /* Too many element conditions of type
                                           usage */

/***************************************
* Path Information Retrieval Subsystem *
***************************************/

/*****************************
* Equipment Element Subsystem *
*****************************/

/***************************
* HLBL Communication Server *
***************************/


/**************************************************************************
*  @(#)psrs.h   1.2  I/A Series  Foxboro Company  89/08/17
***************************************************************************
*                                                                         *
*  Copyright by the Foxboro Company 1988                                  *
*                                                                         *
*  All rights reserved Foxboro Company 1988                               *
*                                                                         *
**&3***********************************************************************
*                                                                         *
*  FILE NAME          : psrs.h                                            *
*                                                                         *
*  PART NUMBER        :                                                   *
*                                                                         *
*  FUNCTION           : Standard header file for Path Selection & Release *
*                       Subsystem.                                        *
*                                                                         *
*  COMPONENT HISTORY :                                                    *
*  -------------------------------------------------------------          *
*  20 SEP 1988 - AAM - created                                            *
*  05 JAN 1989 - AAM - pep_type attribute added to COPAS_REC and consequently *
*                      NUM_RC_ATTR = 10                                   *
```

```
 *  26 JUN 1989 - RRD - Increased MAX_PATH_ELEM from 50 to 150              *
 *                                                                          *
 ****************************************************************************/
#include        <seldef.h>      /* Configuration dependant MAX_SC ( number */
                                /* of selectioncriteria ).                  */

#define PACKAGE_NO       1
/* PSRS errors. */

/* General classify macro's. */
#define bool            int
#define SUCCESS          0
#define FAILURE          1
#define ABORT            1
#define EQ       ( '=' << 8 )
#define NE       (( '<' << 8 ) + '>')
#define GT       ( '>' << 8 )
#define LS       ( '<' << 8 )
#define GE       (( '>' << 8 ) + '=')
#define LE       (( '<' << 8 ) + '=')


/* General size macro's. */
#define ST_FLD_SZ        12
#define MAX_VAL          IL_MAX_COL + 100
#define MX_Q_ENTRY        2
#define AL_Q_ENTRY        2
#define NUM_RC_ATTR      10  /* No of fields in REC_COPAS data type */
#define NUM_RP_ATTR       6  /* No of fields in REC_PAR_VALUE data type*/
#define MAX_SPEC_SC       6  /* Maximum no of requestable select.crit. */
#define MAX_PATH_ELEM   150 /* Maximum number of elements per path. */
#define COND_SZ          48  /* Size of a condition as in ELEM_COND. */
#define P_NAME_SZ   COND_SZ /* Size of parameter ( C&IO ) name. */
#define P_VALUE_SZ  COND_SZ /* Size of parameter ( C&IO ) value. */
#define SYNC_SZ          46  /* Size of sync rule specification. */


/* Structures & Type definitions */
typedef struct t_q_entry
{
   char source[UE_LEN +1];
   char ref[LINE_LENGTH +1];
   char *rq;
   struct t_q_entry *next;

} Q_ENTRY, *P_Q_ENTRY;

/* Number of fields in REC_COPAS is defined by NUM_RC_ATTR !! */
typedef struct t_rec_copas
{
   char path_name[ST_FLD_SZ +1],
        owner[ST_FLD_SZ +1],
        path_status[2],
        operation_mode[2],
        auto_failsafe[2],
        path_excep_proc[26],
        pep_type[2],
        init_pattern[ST_FLD_SZ +1],
        fail_pattern[ST_FLD_SZ +1],
        alarm_ref[32 +1];


} REC_COPAS, *P_REC_COPAS;

/* Number of fields in REC_PAR_VALUE is defined by NUM_RP_ATTR !! */
typedef struct t_rec_par_value
{
   char elem_name[ST_FLD_SZ +1],
        step_no[6],
        par_type[2],
        par_name[P_NAME_SZ +1],
        par_value[P_VALUE_SZ +1],
        sync_rule[SYNC_SZ +1];


} REC_PAR_VALUE, *P_REC_PAR_VALUE;

typedef struct sc_expr
{
   int  oper;
   char name[IL_MAX_COL +1];
   char val[MAX_VAL +1];

} SC_EXPR, *P_SC_EXPR;
```

```
typedef struct u_elm
{
   char elem_name[ST_FLD_SZ +1];
   char usage[2];
   bool assign;

} U_ELM, *P_U_ELM;

typedef union uval
{
   char b;
   char c;
   char s[ 255 +1 ];     /* Maximum length of STRING type shared var. */
   int i;
   long int l;
   float f;
   double d ;

} UVAL;

typedef struct sc_val
{
   int idx;
   int oper;
   UVAL val;

} SC_VAL, *P_SC_VAL;

typedef struct sc_spec
{
   char name[ IL_MAX_COL +1 ];
   int type;

} SC_SPEC, *P_SC_SPEC;

/************************************************************************
*  @(#)hpp.c    1.2  I/A Series  Foxboro Company  89/08/17
*************************************************************************
*                                                                       *
*  Copyright by the Foxboro Company 1988                                *
*                                                                       *
*  All rights reserved Foxboro Company 1988                             *
*                                                                       *
**$0*********************************************************************
*                                                                       *
*  FILE NAME           : hpp.c                                          *
*                                                                       *
*  PART NUMBER         :                                                *
*                                                                       *
*  FUNCTION            : Preprocess HLBL source files to make them suitable *
*                        for the R3 HLBL compiler.                      *
*                                                                       *
*  FUNCTIONS CONTAINED : main()                                         *
*                                                                       *
*  DATA STRUCTURES     :                                                *
*                                                                       *
*  COMPONENT HISTORY   :                                                *
*  ------------------------------------------------------------------   *
*  09 JAN 1989 - RD - Creation                                          *
*                                                                       *
************************************************************************/


#include <stdio.h>

#define FALSE   0
#define TRUE    1


main( argc, argv )
int     argc;
char    *argv[];
{
        int     rc;
        int     blank = TRUE;

        char    *ptr;

        char    tmp[80];
        char    string[128];
        char    line[256];

        FILE    *ifp;
        FILE    *ofp;
```

```
        if ( argc != 3 )
        {
                printf( "Format : %s ifile ofile\n", argv[0] );
                exit( -1 );
        }

        strcpy( tmp, "/usr/tmp/hppXXXXXX" );
        mktemp( tmp );

        sprintf( string, "/lib/cpp -P -DS80=S -DS12=S -DS6=S %s %s",
                 argv[1], tmp );

        rc = system( string );
        if ( rc != 0 )
        {
                printf( "Preprocessor failed (%d)\n", rc );
                exit( -2 );
        }

        ifp = fopen( tmp, "r" );
        ofp = fopen( argv[2], "w" );

        if ( ifp == NULL || ofp == NULL )
        {
                printf( "File open error\n" );
        }

        while ( fgets( line, sizeof( line ), ifp ) != NULL )
        {
                for ( ptr = line ; *ptr == ' ' || *ptr == '\t' ; ptr++ );

                if ( *ptr == '\n' )
                {
                        if ( !blank )
                        {
                                blank = TRUE;
                                putc( '\n', ofp );
                        }
                }
                else
                {
                        blank = FALSE;
                        fputs( line, ofp );
                }
        }

        fclose( ifp );
        fclose( ofp );

        unlink( tmp );
}

/*************************************************************************
* @(#)pfl.s    1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**************************************************************************
*                                                                        *
*  FILE NAME           : pfl.s                                           *
*                                                                        *
*  PART NUMBER         :                                                 *
*                                                                        *
*  FUNCTION            : PAM Function Library for HLBL                   *
*                                                                        *
*  FUNCTIONS CONTAINED :                                                 *
*                                                                        *
*  DATA STRUCTURES     :                                                 *
*                                                                        *
*  COMPONENT HISTORY   :                                                 *
*  -------------------------------------------------------------------  *
*  04 OCT 1988 - RD - Creation                                           *
*  14 NOV 1988 - RD - Switched arguments pat_name and path_key in path() *
*  03 JAN 1989 - RD - Added subroutine for gp_state()                    *
*  11 JAN 1989 - RD - Changed path of include files                      *
*  13 JAN 1989 - RD - Solved syntax error in gp_state()                  *
*                                                                        *
*************************************************************************/


/**********************
* Define Error Notices *
**********************/
```

```
#include <fox/pam_err.h>

/**********************
* Define Message Types *
**********************/

#include <fox/pam_msg.h>

{*************************
* Subroutine FAILSAFE_PATH *
*************************}

SUBROUTINE fs_path( IN requestor, path_name, path_key : S12 ;
                    INOUT error : I )

VARIABLES

STATEMENTS
        SN0005 := path_name;
        SN0006 := path_key;
        II0008 := -1;

        SENDMSG( I_FS_PATH, ";", requestor ) TO MSGGR4;
        WAIT UNTIL II0008 <> -1 AFTER 30 GOTO TIME_OUT;
        WAIT UNTIL II0008 <> P_IN_PROGRESS AFTER 2E9 GOTO TIME_OUT;

        error := II0008;

        GOTO END;

<<TIME_OUT>>
        error := P_TIME_OUT;

<<END>>;

ENDSUBROUTINE


{****************
* Subroutine PATH *
****************}

SUBROUTINE path( IN requestor, path_name, pat_name, path_key : S12 ;
                 INOUT error : I )

VARIABLES

STATEMENTS

        SN0005 := path_name;
        SN0006 := pat_name;
        SN0007 := path_key;
        II0008 := -1;

        SENDMSG( I_PATH, ";", requestor ) TO MSGGR4;
        WAIT UNTIL II0008 <> -1 AFTER 30 GOTO TIME_OUT;
        WAIT UNTIL II0008 <> P_IN_PROGRESS AFTER 2E9 GOTO TIME_OUT;

        error := II0008;

        GOTO END;

<<TIME_OUT>>
        error := P_TIME_OUT;

<<END>>;

ENDSUBROUTINE


{****************************
* Subroutine INITIALIZE_PATH *
****************************}

SUBROUTINE iz_path( IN requestor, path_name, path_key : S12 ;
                    INOUT error : I )

VARIABLES

STATEMENTS

        SN0005 := path_name;
        SN0006 := path_key;
        II0008 := -1;
```

```
        SENDMSG( I_IZ_PATH, ":", requestor ) TO MSGGR4;
        WAIT UNTIL II0008 <> -1 AFTER 30 GOTO TIME_OUT;
        WAIT UNTIL II0008 <> P_IN_PROGRESS AFTER 2E9 GOTO TIME_OUT;

        error := II0008;

        GOTO END;

<<TIME_OUT>>
        error := P_TIME_OUT;

<<END>>;

ENDSUBROUTINE


{**************************
* Subroutine GET_PATH_STATE *
***************************}

SUBROUTINE gp_state( IN path_name, path_key : S12 ;
                     INOUT cur_type, prv_type, prv_code : I ;
                     INOUT pat_name : S12 ;
                     INOUT alarm, cur_mode, def_mode : I ;
                     INOUT auto_fs, step_state, step_no : I ;
                     INOUT error : I )

VARIABLES

STATEMENTS

        SN0005 := path_key;
        II0008 := -1;

        SENDMSG( I_GP_STATE, ":", path_name ) TO MSGGR4;
        WAIT UNTIL II0008 <> -1 AFTER 60 GOTO TIME_OUT;

        error := II0008;

        IF error = PAM_OK THEN
                prv_code   := II0007;
                step_no    := II0006;
                pat_name   := SN0010;
                cur_type   := II0005 MOD 8;
                II0005     := II0005 DIV 8;
                prv_type   := II0005 MOD 8;
                II0005     := II0005 DIV 8;
                alarm      := II0005 MOD 16;
                II0005     := II0005 DIV 16;
                cur_mode   := II0005 MOD 8;
                II0005     := II0005 DIV 8;
                def_mode   := II0005 MOD 8;
                II0005     := II0005 DIV 8;
                auto_fs    := II0005 MOD 4;
                II0005     := II0005 DIV 4;
                step_state := II0005;
        ENDIF;

        GOTO END;

<<TIME_OUT>>
        error := P_TIME_OUT;

<<END>>;

ENDSUBROUTINE


{************************
* Subroutine RELEASE_PATH *
*************************}

SUBROUTINE release_p( IN requestor, path_name, path_key : S12 ;
                      INOUT error : I )

VARIABLES

STATEMENTS

        SN0005 := path_name;
        SN0006 := path_key;
        II0008 := -1;

        SENDMSG( I_RELEASE_P, ":", requestor ) TO MSGGR4;
        WAIT UNTIL II0008 <> -1 AFTER 120 GOTO TIME_OUT;
```

```
        error := II0008;

        GOTO END;

<<TIME_OUT>>
        error := P_TIME_OUT;

<<END>>;

ENDSUBROUTINE

{************************
* Subroutine SELECT_PATH *
************************}

SUBROUTINE select_p( IN requestor, environmt : S12 ;
                     IN criteria1, criteria2 : S80 ;
                     INOUT path_name, path_key : S12 ;
                     INOUT error : I )

VARIABLES

STATEMENTS

        SN0005 := environmt;
        SN0006 := criteria1;
        SN0007 := criteria2;
        II0008 := -1;

        SENDMSG( I_SELECT_P, ";", requestor ) TO MSGGR4;
        WAIT UNTIL II0008 <> -1 AFTER 60 GOTO TIME_OUT;
        WAIT UNTIL II0008 <> P_IN_PROGRESS AFTER 300 GOTO TIME_OUT;

        error := II0008;

        IF error = PAM_OK THEN
                path_name := SN0009;
                path_key  := SN0010;

                CALL iz_path( requestor, path_name, path_key, error );

                IF error = P_NO_INITIALIZE THEN
                        error := PAM_OK;
                ELSEIF error <> PAM_OK THEN
                        error := P_INIT_FAILED;
                ENDIF;
        ENDIF;

        GOTO END;

<<TIME_OUT>>
        error := P_TIME_OUT;

<<END>>;

ENDSUBROUTINE

{************************
* Subroutine GET_PATH_KEY *
************************}

SUBROUTINE gp_key( IN requestor, path_name : S12 ;
                   INOUT path_key : S12 ;
                   INOUT error : I )

VARIABLES

STATEMENTS
        SN0005 := path_name;
        II0008 := -1;

        SENDMSG( I_GP_KEY, ";", requestor ) TO MSGGR4;
        WAIT UNTIL II0008 <> -1 AFTER 60 GOTO TIME_OUT;

        error := II0008;

        IF error = PAM_OK THEN
                path_key := SN0010;
        ENDIF;

        GOTO END;

<<TIME_OUT>>
        error := P_TIME_OUT;
```

```
<<END>>;

ENDSUBROUTINE

{********************************
* Subroutine CHANGE_EQ_PARAMETER *
********************************}

SUBROUTINE ce_parameter( IN requestor, eq_name,
                            par_name, par_value : S12 ;
                         INOUT error : I )

VARIABLES

STATEMENTS

        SN0005 := eq_name;
        SN0006 := par_name;
        SN0007 := par_value;
        II0008 := -1;

        SENDMSG( I_CE_PARAMETER, ";", requestor ) TO MSGGR4;
        WAIT UNTIL II0008 <> -1 AFTER 60 GOTO TIME_OUT;

        error := II0008;

        GOTO END;

<<TIME_OUT>>
        error := P_TIME_OUT;

<<END>>;

ENDSUBROUTINE

{*************************
* Subroutine GET_EQ_STATUS *
*************************}

SUBROUTINE ge_status( IN eq_name : S12 ;
                      INOUT eq_status : S6 ;
                      INOUT error : I )

VARIABLES

STATEMENTS

        II0008 := -1;

        SENDMSG( I_GE_STATUS, ";", eq_name ) TO MSGGR4;
        WAIT UNTIL II0008 <> -1 AFTER 60 GOTO TIME_OUT;

        error := II0008;

        IF error = PAM_OK THEN
              eq_status := SN0010;
        ENDIF;

        GOTO END;

<<TIME_OUT>>
        error := P_TIME_OUT;

<<END>>;

ENDSUBROUTINE

{*************************
* Subroutine GET_EQ_USAGE *
*************************}

SUBROUTINE ge_usage( IN eq_name : S12 ;
                     INOUT eq_usage : S6 ;
                     INOUT error : I )

VARIABLES

STATEMENTS

        II0008 := -1;

        SENDMSG( I_GE_USAGE, ";", eq_name ) TO MSGGR4;
        WAIT UNTIL II0008 <> -1 AFTER 60 GOTO TIME_OUT;
```

```
        error := II0008;

        IF error = PAM_OK THEN
              eq_usage := SN0010;
        ENDIF;

        GOTO END;

<<TIME_OUT>>
         error := P_TIME_OUT;

<<END>>;

ENDSUBROUTINE


{*****************************
* Subroutine REGISTER_EQ_LOCKED *
*******************************}

SUBROUTINE re_locked( IN requestor, eq_name : S12 ;
                      INOUT error : I )

VARIABLES

STATEMENTS

        SN0005 := eq_name;
        II0008 := -1;

        SENDMSG( I_RE_LOCKED, ";", requestor ) TO MSGGR4;
        WAIT UNTIL II0008 <> -1 AFTER 60 GOTO TIME_OUT;

        error := II0008;

        GOTO END;

<<TIME_OUT>>
        error := P_TIME_OUT;

<<END>>;

ENDSUBROUTINE


{*****************************
* Subroutine REGISTER_EQ_SECURED *
*******************************}

SUBROUTINE re_secured( IN requestor, eq_name : S12 ;
                       INOUT error : I )

VARIABLES

STATEMENTS

        SN0005 := eq_name;
        II0008 := -1;

        SENDMSG( I_RE_SECURED, ";", requestor ) TO MSGGR4;
        WAIT UNTIL II0008 <> -1 AFTER 60 GOTO TIME_OUT;

        error := II0008;

        GOTO END;

<<TIME_OUT>>
        error := P_TIME_OUT;

<<END>>;

ENDSUBROUTINE


{*****************************
* Subroutine UNREGISTER_EQ_USE *
*******************************}

SUBROUTINE ue_use( IN requestor, eq_name : S12 ;
                   INOUT error : I )

VARIABLES

STATEMENTS
```

```
        SN0005 := eq_name;
        II0008 := -1;

        SENDMSG( I_UE_USE, ";", requestor ) TO MSGGR4;
        WAIT UNTIL II0008 <> -1 AFTER 60 GOTO TIME_OUT;

        error := II0008;

        GOTO END;

<<TIME_OUT>>
        error := P_TIME_OUT;

<<END>>;

ENDSUBROUTINE
```

```
#*******************************************************************************
#  @(#)hit.mk   1.3  I/A Series  Foxboro Company  89/08/17
#*******************************************************************************
#                                                                              *
#  Copyright by the Foxboro Company 1988                                       *
#                                                                              *
#  All rights reserved Foxboro Company 1988                                    *
#                                                                              *
#*&0****************************************************************************
#                                                                              *
#  FILE NAME            : makefile                                             *
#                                                                              *
#  PART NUMBER          :                                                      *
#                                                                              *
#  FUNCTION             : makefile for PAM Human Interface Toolbox             *
#                                                                              *
#  COMPONENT HISTORY    :                                                      *
#  --------------------------------------------------------------------       *
#  12 NOV 1988 - JVB - Creation                                                *
#  29 NOV 1988 - JVB - The programs 'release_p', 'select_p' and 'path' added. *
#  29 DEC 1988 - JVB - The programs 'gp_state'added.                           *
#  03 JUL 1989 - RRD - Changed ce_param to ce_parameter and gs_crit to        *
#                      gs_criterion.                                           *
#  11 AUG 1989 - RRD - Link CL                                                 *
#                                                                              *
#*******************************************************************************

PREFIX  =       /usr/pam

SRCDIR  =       $(PREFIX)/hit/source

OBJDIR  =       $(PREFIX)/hit/obj

BINDIR  =       $(PREFIX)/bin

HDRDIR  =       $(PREFIX)/header

LIBDIR  =       $(PREFIX)/lib

LIBPAM  =       $(LIBDIR)/libpam.a

LIBCOM  =       -lcom

LIBHIT  =       $(LIBDIR)/libhit.a

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_log.h\
                $(HDRDIR)/pam_rpt.h


HITBIN  =       $(BINDIR)/release_p\
                $(BINDIR)/select_p\
                $(BINDIR)/gp_display\
                $(BINDIR)/gs_criterion\
                $(BINDIR)/path\
                $(BINDIR)/gp_state\
                $(BINDIR)/ce_parameter\
                $(BINDIR)/ce_status\
                $(BINDIR)/ge_status\
                $(BINDIR)/ge_usage\
                $(BINDIR)/re_locked\
                $(BINDIR)/re_secured\
                $(BINDIR)/ue_use
```

```
HITOBJ  =       $(OBJDIR)/g_ap_name.o\
                $(OBJDIR)/parm_chk.o\
                $(OBJDIR)/cond_chk.o\
                $(OBJDIR)/set_ev.o\
                $(OBJDIR)/is_lbug.o

TARGET  =       $(LIBHIT) $(HITBIN)

CFLAGS  =       -c -I$(HDRDIR)


target:         $(TARGET)

$(LIBHIT):      $(HITOBJ)
                ar r $(LIBHIT) $(HITOBJ)
                ranlib $(LIBHIT)

$(OBJDIR)/g_ap_name.o:      $(SRCDIR)/g_ap_name.c $(HEADERS)
                            cc $(CFLAGS) $(SRCDIR)/g_ap_name.c
                            mv $(@F) $(OBJDIR)

$(OBJDIR)/parm_chk.o:       $(SRCDIR)/parm_chk.c $(HEADERS)
                            cc $(CFLAGS) $(SRCDIR)/parm_chk.c
                            mv $(@F) $(OBJDIR)

$(OBJDIR)/cond_chk.o:       $(SRCDIR)/cond_chk.c $(HEADERS)
                            cc $(CFLAGS) $(SRCDIR)/cond_chk.c
                            mv $(@F) $(OBJDIR)

$(OBJDIR)/set_ev.o:         $(SRCDIR)/set_ev.c $(HEADERS)
                            cc $(CFLAGS) $(SRCDIR)/set_ev.c
                            mv $(@F) $(OBJDIR)

$(OBJDIR)/is_lbug.o:        $(SRCDIR)/is_lbug.c $(HEADERS)
                            cc $(CFLAGS) $(SRCDIR)/is_lbug.c
                            mv $(@F) $(OBJDIR)

$(OBJDIR)/release_p.o:      $(SRCDIR)/release_p.c $(HEADERS)
                            cc $(CFLAGS) $(SRCDIR)/release_p.c
                            mv $(@F) $(OBJDIR)

$(OBJDIR)/select_p.o:       $(SRCDIR)/select_p.c $(HEADERS)
                            cc $(CFLAGS) $(SRCDIR)/select_p.c
                            mv $(@F) $(OBJDIR)

$(OBJDIR)/gp_display.o:     $(SRCDIR)/gp_display.c $(HEADERS)
                            cc $(CFLAGS) $(SRCDIR)/gp_display.c
                            mv $(@F) $(OBJDIR)

$(OBJDIR)/gs_crit.o:        $(SRCDIR)/gs_crit.c $(HEADERS)
                            cc $(CFLAGS) $(SRCDIR)/gs_crit.c
                            mv $(@F) $(OBJDIR)

$(OBJDIR)/path.o:           $(SRCDIR)/path.c $(HEADERS)
                            cc $(CFLAGS) $(SRCDIR)/path.c
                            mv $(@F) $(OBJDIR)

$(OBJDIR)/gp_state.o:       $(SRCDIR)/gp_state.c $(HEADERS)
                            cc $(CFLAGS) $(SRCDIR)/gp_state.c
                            mv $(@F) $(OBJDIR)

$(OBJDIR)/ce_param.o:       $(SRCDIR)/ce_param.c $(HEADERS)
                            cc $(CFLAGS) $(SRCDIR)/ce_param.c
                            mv $(@F) $(OBJDIR)

$(OBJDIR)/ce_status.o:      $(SRCDIR)/ce_status.c $(HEADERS)
                            cc $(CFLAGS) $(SRCDIR)/ce_status.c
                            mv $(@F) $(OBJDIR)

$(OBJDIR)/ge_status.o:      $(SRCDIR)/ge_status.c $(HEADERS)
                            cc $(CFLAGS) $(SRCDIR)/ge_status.c
                            mv $(@F) $(OBJDIR)

$(OBJDIR)/ge_usage.o:       $(SRCDIR)/ge_usage.c $(HEADERS)
                            cc $(CFLAGS) $(SRCDIR)/ge_usage.c
                            mv $(@F) $(OBJDIR)

$(OBJDIR)/re_locked.o:      $(SRCDIR)/re_locked.c $(HEADERS)
                            cc $(CFLAGS) $(SRCDIR)/re_locked.c
                            mv $(@F) $(OBJDIR)

$(OBJDIR)/re_secured.o:     $(SRCDIR)/re_secured.c $(HEADERS)
                            cc $(CFLAGS) $(SRCDIR)/re_secured.c
                            mv $(@F) $(OBJDIR)
```

```
$(OBJDIR)/ue_use.o:  •    $(SRCDIR)/ue_use.c $(HEADERS)
                          cc $(CFLAGS) $(SRCDIR)/ue_use.c
                          mv $(@F) $(OBJDIR)

$(BINDIR)/release_p:    $(OBJDIR)/release_p.o $(LIBPAM) $(LIBHIT)
                cc $(OBJDIR)/release_p.o $(LIBHIT) $(LIBPAM) $(LIBCOM) \
                        -z -i -lfox -o $@

$(BINDIR)/select_p:     $(OBJDIR)/select_p.o $(LIBPAM) $(LIBHIT)
                cc $(OBJDIR)/select_p.o $(LIBHIT) $(LIBPAM) $(LIBCOM) \
                        -z -i -lfox -o $@

$(BINDIR)/gp_display:   $(OBJDIR)/gp_display.o $(LIBPAM) $(LIBHIT)
                cc $(OBJDIR)/gp_display.o $(LIBHIT) $(LIBPAM) $(LIBCOM) \
                        -z -i -lfox -o $@

$(BINDIR)/gs_criterion: $(OBJDIR)/gs_crit.o $(LIBPAM) $(LIBHIT)
                cc $(OBJDIR)/gs_crit.o $(LIBHIT) $(LIBPAM) $(LIBCOM) \
                        -z -i -lfox -o $@

$(BINDIR)/path:         $(OBJDIR)/path.o $(LIBPAM) $(LIBHIT)
                cc $(OBJDIR)/path.o $(LIBHIT) $(LIBPAM) $(LIBCOM) \
                        -z -i -lfox -o $@

$(BINDIR)/gp_state:     $(OBJDIP)/gp_state.o $(LIBPAM) $(LIBHIT)
                cc $(OBJDIR)/gp_state.o $(LIBHIT) $(LIBPAM) $(LIBCOM) \
                        -z -i -lfox -o $@

$(BINDIR)/ce_parameter: $(OBJDIR)/ce_param.o $(LIBPAM) $(LIBHIT)
                cc $(OBJDIR)/ce_param.o $(LIBHIT) $(LIBPAM) $(LIBCOM) \
                        -z -i -lfox -o $@

$(BINDIR)/ce_status:    $(OBJDIR)/ce_status.o $(LIBPAM) $(LIBHIT)
                cc $(OBJDIR)/ce_status.o $(LIBHIT) $(LIBPAM) $(LIBCOM) \
                        -z -i -lfox -o $@

$(BINDIR)/ge_status:    $(OBJDIR)/ge_status.o $(LIBPAM) $(LIBHIT)
                cc $(OBJDIR)/ge_status.o $(LIBHIT) $(LIBPAM) $(LIBCOM) \
                        -z -i -lfox -o $@

$(BINDIR)/ge_usage:     $(OBJDIR)/ge_usage.o $(LIBPAM) $(LIBHIT)
                cc $(OBJDIR)/ge_usage.o $(LIBHIT) $(LIBPAM) $(LIBCOM) \
                        -z -i -lfox -o $@

$(BINDIR)/re_locked:    $(OBJDIR)/re_locked.o $(LIBPAM) $(LIBHIT)
                cc $(OBJDIR)/re_locked.o $(LIBHIT) $(LIBPAM) $(LIBCOM) \
                        -z -i -lfox -o $@

$(BINDIR)/re_secured:   $(OBJDIR)/re_secured.o $(LIBPAM) $(LIBHIT)
                cc $(OBJDIR)/re_secured.o $(LIBHIT) $(LIBPAM) $(LIBCOM) \
                        -z -i -lfox -o $@

$(BINDIR)/ue_use:       $(OBJDIR)/ue_use.o $(LIBPAM) $(LIBHIT)
                cc $(OBJDIR)/ue_use.o $(LIBHIT) $(LIBPAM) $(LIBCOM) \
                        -z -i -lfox -o $@

/*****************************************************************************
*  @(#)ce_param.c      1.2  I/A Series  Foxboro Company  89/08/17
******************************************************************************
*                                                                            *
*  Copyright by the Foxboro Company 1988                                     *
*                                                                            *
*  All rignts reserved Foxboro Company 1988                                  *
*                                                                            *
**%Q*************************************************************************
*                                                                            *
*  FILE NAME           : ce_parameter.c                                      *
*                                                                            *
*  PART NUMBER         :                                                     *
*                                                                            *
*  FUNCTION            : Change the current value of an equipment parameter. *
*                                                                            *
*  FUNCTIONS CONTAINED : main()                                              *
*                        set_ev(error_variable,value)                        *
*                        g_ap_name(ap_name)                                  *
*                        parm_chk(parameter)                                 *
*                                                                            *
*  DATA STRUCTURES     :                                                     *
*                                                                            *
*  COMPONENT HISTORY   :                                                     *
*  ----------------------------------------------------------------------    *
*  24 OCT 1988 - JVB - Creation                                              *
*  04 JAN 1989 - JVB - Call PPini_ipc() with FALSE                           *
*  06 JAN 1989 - JVB - Changed variable length for C&IO variables            *
*                                                                            *
*****************************************************************************/
```

```
#include <pam_com.h>
#define LONG_STR        32
#define SHORT_STR       12
#define GC_VAR_LENGTH   8    /* (length OM shared variable) - (length lbug) */
#define OM_VAR_LENGTH   32
#define MI_IN_PROGRESS  -1


/*********************
* External variables *
*********************/

extern  char    *optarg;
extern  int     optind, opterr;


main( argc, argv )
int     argc;
char    *argv[];
{
        int     rc;
        int     c;
        int     status;

        char    *rq  = NULL;    /* requestor */
        char    *en  = NULL;    /* equipment name */
        char    *pn  = NULL;    /* parameter name */
        char    *pv  = NULL;    /* parameter value */
        char    *ev  = NULL;    /* error variable */

        char    ap_name[IPC_NAME_LEN];


        opterr = 0;


        /*
         * Get options.
         */

        while ( ( c = getopt( argc, argv, "r:e:n:v:x:" ) ) != EOF )
        {
                switch ( c )
                {
                case 'r':
                        rq = optarg;
                        break;

                case 'e':
                        en = optarg;
                        break;

                case 'n':
                        pn = optarg;
                        break;

                case 'v':
                        pv = optarg;
                        break;

                case 'x':
                        ev = optarg;
                        break;

                default:
                        break;

                } /* End of switch */

        } /* End of while */


        /*
         * Check error_variable if specified
         */

        if ( ev != NULL )
        {
                if ( parm_chk(ev) != PAM_OK || strlen(ev) > OM_VAR_LENGTH )
                {
                        dprintf(( "ce_parm: Invalid error_variable \n" ));
                /*
                 * Exit program.
                 */

                PPstp_ipc( PAM_OK );

        } /* End of main() */
```

```
                PPstp_ipc( P_INV_VARIABLE );
            }
    }
    else
    {
            dprintf(( "ce_parm: No error_variable specified.\n" ));
    }

    /*
     * Check parameter: requestor [ required ]
     */

    if ( parm_chk( rq ) != PAM_OK || strlen( rq ) > SHORT_STR )
    {
            dprintf(( "ce_parm: Invalid requestor \n" ));
            set_ev( ev, ( long ) P_INV_REQUESTOR );
            PPstp_ipc( P_INV_REQUESTOR );
    }

    /*
     * Check parameter: eq_name [ required ]
     */

    if ( parm_chk( en ) != PAM_OK || strlen( en ) > SHORT_STR )
    {
            dprintf(( "ce_parm: Invalid eq_name \n" ));
            set_ev( ev, ( long ) P_INV_EQ_NAME );
            PPstp_ipc( P_INV_EQ_NAME );
    }

    /*
     * Check parameter: par_name [ required ]
     */

    if ( parm_chk( pn ) != PAM_OK || strlen( pn ) > LONG_STR )
    {
            dprintf(( "ce_parm: Invalid par_name \n" ));
            set_ev( ev, ( long ) P_INV_PAR_NAME );
            PPstp_ipc( P_INV_PAR_NAME );
    }

    /*
     * Check parameter: par_name [ required ]
     */

    if ( parm_chk( pv ) != PAM_OK || strlen( pv ) > SHORT_STR )
    {
            dprintf(( "ce_parm: Invalid par_value \n" ));
            set_ev( ev, ( long ) P_INV_PAR_VALUE );
            PPstp_ipc( P_INV_PAR_VALUE );
    }

    /*
     * Set error_variable to HI_IN_PROGRESS to indicate in progress.
     */

    dprintf(( "ce_parm: Setting error_var to <%d> \n", HI_IN_PROGRESS ));

    set_ev( ev, ( long ) HI_IN_PROGRESS );


    /*
     * Initialize IPC.
     */

    g_ap_name(ap_name);
    dprintf(( "ce_parm: Ap_name set to <%s>\n", ap_name ));

    rc = PPini_ipc( ap_name, FALSE, 1 );
    if ( rc != PAM_OK ) PPstp_ipc( rc );

    rc = PPget_cfg();
    if ( rc != PAM_OK ) PPstp_ipc( rc );

    /*
     * Execute actual function.
     */

    rc = ce_parameter( rq, en, pn, pv );
    if ( rc == PAM_OK )
    {
            dprintf(( "ce_parm: Function execution successfull\n"));
    }

    dprintf(( "ce_parm: Setting error_var to <%d> \n", rc ));
    set_ev( ev, ( long ) rc );
```

```
        /*
         * Exit program.
         */

        PPstp_ipc( PAM_OK );

} /* End of main() */

/***************************************************************************
 *  @(#)ce_status.c      1.2  I/A Series  Foxboro Company  89/08/17
 ***************************************************************************
 *                                                                         *
 *  Copyright by the Foxboro Company 1988                                  *
 *                                                                         *
 *  All rights reserved Foxboro Company 1988                               *
 *                                                                         *
 **$0***********************************************************************
 *                                                                         *
 *  FILE NAME           : ce_status.c                                      *
 *                                                                         *
 *  PART NUMBER         :                                                  *
 *                                                                         *
 *  FUNCTION            : Change the status of an equipment element.       *
 *                                                                         *
 *  FUNCTIONS CONTAINED : main()                                           *
 *                        set_ev(error_variable,value)                     *
 *                        g_ap_name(ap_name)                               *
 *                        parm_chk(parameter)                              *
 *                                                                         *
 *  DATA STRUCTURES     :                                                  *
 *                                                                         *
 *  COMPONENT HISTORY   :                                                  *
 *  ---------------------------------------------------------------------- *
 *  24 OCT 1988 - JVB - Creation                                           *
 *  04 JAN 1989 - JVB - Call PPini_ipc() with FALSE                        *
 *  06 JAN 1989 - JVB - Changed variable length for C&IO variables         *
 *                                                                         *
 ***************************************************************************/

#include <pam_com.h>
#define LONG_STR        32
#define SHORT_STR       12
#define GC_VAR_LENGTH   8    /* (length OM shared variable) - (length 1bug) */
#define OM_VAR_LENGTH   32
#define HI_IN_PROGRESS  -1

/*********************
 * External variables *
 *********************/

extern  char    *optarg;
extern  int     optind, opterr;


main( argc, argv )
int     argc;
char    *argv[];
{
        int     rc;
        int     c;
        int     status;

        char    *rq  = NULL;    /* requestor */
        char    *en  = NULL;    /* equipment name */
        char    ns   = NULL;    /* new status */
        char    *ev  = NULL;    /* error variable */

        char    ap_name[IPC_NAME_LEN];


        opterr = 0;


        /*
         * Get options.
         */

        while ( ( c = getopt( argc, argv, "r:e:n:x:" ) ) != EOF )
        {
                switch ( c )
                {
                case 'r':
                        rq = optarg;
                        break;
```

```
        case 'e':
                en = optarg;
                break;

        case 'n':
                ns = optarg[0];
                break;

        case 'x':
                ev = optarg;
                break;

        default:
                break;

        } /* End of switch */

} /* End of while */


/*
 * Check error_variable if specified
 */

if ( ev != NULL )
{
        if ( parm_chk(ev) != PAM_OK || strlen(ev) > ON_VAR_LENGTH )
        {
                dprintf(( "ce_stat: Invalid error_variable \n" ));
                PPstp_ipc( P_INV_VARIABLE );
        }
}
else
{
        dprintf(( "ce_stat: No error_variable specified.\n" ));
}

/*
 * Check parameter: requestor [ required ]
 */

if ( parm_chk( rq ) != PAM_OK || strlen( rq ) > SHORT_STR )
{
        dprintf(( "ce_stat: Invalid requestor \n" ));
        set_ev( ev, ( long ) P_INV_REQUESTOR );
        PPstp_ipc( P_INV_REQUESTOR );
}

/*
 * Check parameter: eq_name [ required ]
 */

if ( parm_chk( en ) != PAM_OK || strlen( en ) > SHORT_STR )
{
        dprintf(( "ce_stat: Invalid eq_name \n" ));
        set_ev( ev, ( long ) P_INV_EQ_NAME );
        PPstp_ipc( P_INV_EQ_NAME );
}

/*
 * Check parameter: new_status [ required ]
 */

if ( ns != 'n' && ns != 'N' && ns != 'u' && ns != 'U' )
{
        dprintf(( "ce_stat: Invalid new_status \n" ));
        set_ev( ev, ( long ) P_INV_STATUS );
        PPstp_ipc( P_INV_STATUS );
}

/*
 * Set error_variable to HI_IN_PROGRESS to indicate in progress.
 */

dprintf(( "ce_stat: Setting error_var to <%d>\n", HI_IN_PROGRESS ));

set_ev( ev, ( long ) HI_IN_PROGRESS );


/*
 * Initialize IPC.
 */

g_ap_name(ap_name);
dprintf(( "ce_stat: Ap_name set to <%s>\n", ap_name ));
```

```
        rc = PPini_ipc( ap_name, FALSE, 1 );
        if ( rc != PAM_OK ) PPstp_ipc( rc );

        rc = PPget_cfg();
        if ( rc != PAM_OK ) PPstp_ipc( rc );

        /*
         * Execute actual function.
         */

        rc = ce_status( rq, en, ns );
        if ( rc == PAM_OK )
        {
                dprintf(( "ce_stat: Function execution successfull\n"));
        }

        dprintf(( "ce_stat: Setting error_var to <%d> \n", rc ));
        set_ev( ev, ( long ) rc);


        /*
         * Exit program.
         */

        PPstp_ipc( PAM_OK );

} /* End of main() */

/**************************************************************************
 * @(#)cond_chk.c       1.2  I/A Series  Foxboro Company  89/08/17
 **************************************************************************
 *                                                                        *
 * Copyright by the Foxboro Company 1988                                  *
 *                                                                        *
 * All rights reserved Foxboro Company 1988                               *
 *                                                                        *
 **$0**********************************************************************
 *                                                                        *
 * FILE NAME           : cond_chk.c                                       *
 *                                                                        *
 * PART NUMBER         :                                                  *
 *                                                                        *
 * FUNCTION            : Check a criteria list to contain only valid      *
 *                       conditions and valid selection criterion names.  *
 *                       A condition is: "<crit_name><operator><value>".  *
 *                                                                        *
 * FUNCTIONS CONTAINED : cond_chk()                                       *
 *                                                                        *
 * DATA STRUCTURES     :                                                  *
 *                                                                        *
 * COMPONENT HISTORY   :                                                  *
 * ---------------------------------------------------------------------  *
 * 29 NOV 1988 - JVB - Creation                                           *
 *                                                                        *
 **************************************************************************/

#include <pam_com.h>
#include <isam.h>
#include <fox/pream.h>
#include <psrs.h>
#include <seldef.h>
#include <seltab.h>

int cond_chk( criteria, max_nam_len, max_val_len )

char *criteria;
int  max_nam_len,
     max_val_len;

{
    char name[ IL_MAX_COL +1 ],
         value[80 + 1 ],
         condition[ MAX_VAL +2 +1 ];
    int  num_sc,
         ci,
         ni,
         vi,
         i,
         result;

    num_sc = 0;
    criteria = PPget_fld( criteria, condition, MAX_VAL+2 );
    while ( criteria != (char *)NULL && num_sc < MAX_SPEC_SC )
    {
```

```
        ci = 0;
        ni = 0;
        while( condition[ci] != '=' &&
               condition[ci] != '<' &&
               condition[ci] != '>'     )
        {
            if ( ni == max_nam_len )
                return ( P_INV_CRIT_NAME );
            name[ni++] = condition[ci++];
        }
        if ( ni == 0 )
            return ( P_INV_CRIT_NAME );

        name[ni]='\0';
        result = !PAM_OK;
        for( i = 0; i < MAX_SC ; i++ )
        {
            if ( strcmp( name, sc_specs[i].name ) == 0 )
            {
                result = PAM_OK;
                break;
            }
        }
        if ( result != PAM_OK )
            return ( P_INV_CRIT_NAME );

        if ( condition[ci] == '=' ||
             condition[ci] == '>' )
            ci++;

        vi = 0;
        while ( condition[ci] != '\0' )
        {
        if ( vi == max_val_len )
            return ( P_INV_CRITERIA_LIST );
        ci++;
        vi++;
        }
        if ( vi == 0 )
            return ( P_INV_CRITERIA_LIST );

        criteria = PPget_fld( criteria, condition, MAX_VAL+2 );
    }   /*  end while valid criteria */

    return ( PAM_OK );

} /* end cond_chk() */

/**********************************************************************
 *  @(#)g_ap_name.c      1.2  I/A Series  Foxboro Company  89/08/17
 **********************************************************************
 *                                                                    *
 *  Copyright by the Foxboro Company 1988                             *
 *                                                                    *
 *  All rights reserved Foxboro Company 1988                          *
 *                                                                    *
 **&0*******************************************************************
 *                                                                    *
 *  FILE NAME           : g_ap_name.c                                 *
 *                                                                    *
 *  PART NUMBER         :                                             *
 *                                                                    *
 *  FUNCTION            : returns ap_name, which is letterbug + pid   *
 *                                                                    *
 *  FUNCTIONS CONTAINED : g_ap_name()                                 *
 *                                                                    *
 *  DATA STRUCTURES     :                                             *
 *                                                                    *
 *  COMPONENT HISTORY   :                                             *
 *  ---------------------------------------------------------------  *
 *  21 OCT 1988 - JVB - Creation                                      *
 *  05 JUL 1989 - RRD - Use fixed name in case of testing             *
 *                                                                    *
 **********************************************************************/

#include <sys/utsname.h>

g_ap_name(ap_name)

char *ap_name;

{
#ifndef TESTING
        struct utsname sysnames;
```

```
        uname(&sysnames);
        sprintf( ap_name,"%s%d", sysnames.nodename , getpid() );
#else
        strcpy( ap_name, "HIT" );
#endif

} /* End of function g_ap_name() */

/***********************************************************************
 * @(#)ge_status.c      1.2  I/A Series  Foxboro Company  89/08/17
 ***********************************************************************
 *                                                                     *
 *  Copyright by the Foxboro Company 1988                              *
 *                                                                     *
 *  All rights reserved Foxboro Company 1988                           *
 *                                                                     *
 **$0*******************************************************************
 *                                                                     *
 *  FILE NAME           : ge_status.c                                  *
 *                                                                     *
 *  PART NUMBER         :                                              *
 *                                                                     *
 *  FUNCTION            : Get the current status of an equipment element. *
 *                                                                     *
 *  FUNCTIONS CONTAINED : main()                                       *
 *                        set_ev(error_variable,value)                 *
 *                        g_ap_name(ap_name)                           *
 *                        parm_chk(parameter)                          *
 *                        is_lbug(letterbug)                           *
 *                                                                     *
 *  DATA STRUCTURES     :                                              *
 *                                                                     *
 *  COMPONENT HISTORY   :                                              *
 *  ----------------------------------------------------------------   *
 *  24 OCT 1988 - JVB - Creation                                       *
 *  04 JAN 1989 - JVB - Call PPini_ipc() with FALSE                    *
 *  06 JAN 1989 - JVB - Changed variable length for C&IO variables     *
 *                                                                     *
 ***********************************************************************/


#include <pam_com.h>
#define LONG_STR        32
#define SHORT_STR       12
#define GC_VAR_LENGTH   8     /* (length OM shared variable) - (length lbug) */
#define OM_VAR_LENGTH   32
#define LENGTH_LBUG     6
#define HI_IN_PROGRESS  -1


/********************
 * External variables *
 ********************/

extern  char    *optarg;
extern  int     optind, opterr;


main( argc, argv )
int     argc;
char    *argv[];
{
        int     rc;
        int     rc2;
        int     c;
        int     status;
        int     lenvar;

        char    *en  = NULL;    /* eq_name */
        char    *esv = NULL;    /* eq_status_variable */
        char    *ev  = NULL;    /* error_variable */
        char    *lb  = NULL;    /* letterbug */

        char    string[126];
        char    ap_name[IPC_NAME_LEN];


        opterr = 0;


        /*
         * Get options.
         */

        while ( ( c = getopt( argc, argv, "e:s:x:l:" ) ) != EOF )
        {
```

```
        switch ( c )
        {
        case 'e':
                en = optarg;
                break;

        case 's':
                esv = optarg;
                break;

        case 'x':
                ev = optarg;
                break;

        case 'l':
                lb = optarg;
                break;

        default:
                break;

        } /* End of switch */

} /* End of while */


/*
 * Check error_variable if specified
 */

if ( ev != NULL )
{
        if ( parm_chk(ev) != PAM_OK || strlen(ev) > OM_VAR_LENGTH )
        {
                dprintf(( "ge_stat: Invalid error_variable \n" ));
                PPstp_ipc( P_INV_VARIABLE );
        }
}
else
{
        dprintf(( "ge_stat: No error_variable specified.\n" ));
}

/*
 * Check parameter: letterbug [ optional ]
 */

if ( lb != NULL )
{
        if ( is_lbug( lb ) != PAM_OK || strlen( lb ) != LENGTH_LBUG )
        {
                dprintf(( "ge_stat: Invalid lbug \n" ));
                set_ev( ev, ( long ) P_INV_LBUG );
                PPstp_ipc( P_INV_LBUG );
        }
        lenvar = GC_VAR_LENGTH;
}
else
{
        dprintf(( "ge_stat: No lbug specified\n"));
        lenvar = OM_VAR_LENGTH;
}

/*
 * Check parameter: eq_name [ required ]
 */

if ( parm_chk( en ) != PAM_OK || strlen( en ) > SHORT_STR )
{
        dprintf(( "ge_stat: Invalid eq_name \n" ));
        set_ev( ev, ( long ) P_INV_EQ_NAME );
        PPstp_ipc( P_INV_EQ_NAME );
}

/*
 * Check parameter: eq_status_variable [ required ]
 */

if ( parm_chk( esv ) != PAM_OK || strlen( esv ) > lenvar )
{
        dprintf(( "ge_stat: Invalid eq_status_var \n" ));
        set_ev( ev, ( long ) P_INV_VARIABLE );
        PPstp_ipc( P_INV_VARIABLE );
}
```

```
        /*
         * Set error_variable to HI_IN_PROGRESS to indicate in progress.
         */
        dprintf(( "ge_stat: Setting error_var to <%d>\n", HI_IN_PROGRESS ));

        set_ev( ev, ( long ) HI_IN_PROGRESS );


        /*
         * Initialize IPC.
         */

        g_ap_name(ap_name);
        dprintf(( "ge_stat: Ap_name set to <%s>\n", ap_name ));

        rc = PPini_ipc( ap_name, FALSE, 1 );
        if ( rc != PAM_OK ) PPstp_ipc( rc );

        rc = PPget_cfg();
        if ( rc != PAM_OK ) PPstp_ipc( rc );

        /*
         * Execute actual function.
         */

        rc = ge_status( en, string );
        if ( rc == PAM_OK )
        {
                dprintf(( "ge_stat: Function execution successfull\n"));
                dprintf(( "ge_stat: Setting eq_status_var to <%s>\n", string ));
                if (lb != NULL)
                {
                        HIsegcglobal( esv, string, lb );
                }
                else
                {
                        status = STRING;
                        rc2 = set_confirm( esv, VARIABLE, 0, string, &status,
                                strlen( string ) + 1 );
                        if ( rc2 != OM_SUCCESS )
                        {
                                dprintf(( "ge_stat: Could not set <%s> to <%s> (%d) \n", esv,
                                string, rc2 ));
                                set_ev( ev, ( long ) P_VAR_NOT_SET );
                                PPstp_ipc( P_VAR_NOT_SET );
                        }
                        else
                        {
                                dprintf(( "ge_stat: Variabele <%s> set\n", esv));
                        }
                }
        }

        dprintf(( "ge_stat: Setting error_var to <%d>\n", rc ));
        set_ev( ev, ( long ) rc);


        /*
         * Exit program.
         */

        PPstp_ipc( PAM_OK );

} /* End of main() */

/*********************************************************************
 * @(#)ge_usage.c       1.2  I/A Series  Foxboro Company  89/08/17
 *********************************************************************
 *                                                                   *
 * Copyright by the Foxboro Company 1988                             *
 *                                                                   *
 * All rights reserved Foxboro Company 1988                          *
 *                                                                   *
 **&O*****************************************************************
 *                                                                   *
 * FILE NAME          : ge_usage.c                                   *
 *                                                                   *
 * PART NUMBER        :                                              *
 *                                                                   *
 * FUNCTION           : Get the current usage of an equipment element.*
 *                                                                   *
 * FUNCTIONS CONTAINED : main()                                      *
 *                      set_ev(error_variable,value)                 *
 *                      g_ap_name(ap_name)                           *
 *                      parm_chk(parameter)                          *
 *                                                                   *
```

```
*                       is_lbug(lbug)                                      *
*                                                                           *
*  DATA STRUCTURES      :                                                   *
*                                                                           *
*  COMPONENT HISTORY    :                                                   *
*  ----------------------------------------------------------------------   *
*  24 OCT 1988 - JVB - Creation                                             *
*  04 JAN 1989 - JVB - Call PPini_ipc() with FALSE                          *
*  06 JAN 1989 - JVB - Changed variable length for C&IO variables           *
*                                                                           *
*****************************************************************************/

#include <pam_com.h>
#define LONG_STR        32
#define SHORT_STR       12
#define GC_VAR_LENGTH   8    /* (length OM shared variable) - (length lbug) */
#define OM_VAR_LENGTH   32
#define LENGTH_LBUG     6
#define HI_IN_PROGRESS  -1

/********************
* External variables *
********************/

extern  char    *optarg;
extern  int     optind, opterr;

main( argc, argv )
int     argc;
char    *argv[];
{
        int     rc;
        int     rc2;
        int     c;
        int     status;
        int     lenvar;

        char    *en  = NULL;    /* eq_name */
        char    *euv = NULL;    /* eq_usage_variable */
        char    *ev  = NULL;    /* error_variable */
        char    *lb  = NULL;    /* letterbug */

        char    string[126];            /* eq_usage */
        char    ap_name[IPC_NAME_LEN];

        opterr = 0;

        /*
         * Get options.
         */

        while ( ( c = getopt( argc, argv, "e:u:x:l:" ) ) != EOF )
        {
                switch ( c )
                {
                case 'e':
                        en = optarg;
                        break;

                case 'u':
                        euv = optarg;
                        break;

                case 'x':
                        ev = optarg;
                        break;

                case 'l':
                        lb = optarg;
                        break;

                default:
                        break;

                } /* End of switch */

        } /* End of while */

        /*
```

```
 * Check error_variable if specified
 */

if ( ev != NULL )
{
        if ( parm_chk(ev) != PAM_OK || strlen(ev) > OM_VAR_LENGTH )
        {
                dprintf(( "ge_usa: Invalid error_variable \n" ));
                PPstp_ipc( P_INV_VARIABLE );
        }
}
else
{
        dprintf(( "ge_usa: No error_variable specified.\n" ));
}

/*
 * Check parameter: letterbug [ optional ]
 */

if ( lb != NULL )
{
        if ( is_lbug( lb ) != PAM_OK || strlen( lb ) != LENGTH_LBUG )
        {
                dprintf(( "ge_usa: Invalid lbug \n" ));
                set_ev( ev, ( long ) P_INV_LBUG );
                PPstp_ipc( P_INV_LBUG );
        }
        lenvar = GC_VAR_LENGTH;
}
else
{
        dprintf(( "ge_usa: No lbug specified\n"));
        lenvar = OM_VAR_LENGTH;
}

/*
 * Check parameter: eq_name [ required ]
 */

if ( parm_chk( en ) != PAM_OK || strlen( en ) > SHORT_STR  )
{
        dprintf(( "ge_usa: Invalid eq_name \n" ));
        set_ev( ev, ( long ) P_INV_EQ_NAME );
        PPstp_ipc( P_INV_EQ_NAME );
}

/*
 * Check parameter: eq_usage_variable [ required ]
 */

if ( parm_chk( euv ) != PAM_OK || strlen( euv ) > lenvar  )
{
        dprintf(( "ge_usa: Invalid eq_usage_var \n" ));
        set_ev( ev, ( long ) P_INV_VARIABLE );
        PPstp_ipc( P_INV_VARIABLE );
}


/*
 * Set error_variable to HI_IN_PROGRESS to indicate in progress.
 */
dprintf(( "ge_usa: Setting error_var to <%d>\n", HI_IN_PROGRESS ));

set_ev( ev, ( long ) HI_IN_PROGRESS );
dprintf(( "ge_usa: Set in progress done \n" ));


/*
 * Initialize IPC.
 */

g_ap_name(ap_name);
dprintf(( "ge_usa: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */
```

```
        rc = ge_usage(-en, string );
        if ( rc == PAM_OK )
        {
                dprintf(( "ge_usa: Function execution successfull\n"));
                dprintf(( "ge_usa: Setting <%s> to <%s>\n", euv, string ));
                if (lb != NULL)
                {
                        HIsegcglobal( euv, string, lb );
                }
                else
                {
                        status = STRING;
                        rc2 = set_confire( euv, VARIABLE, 0, string, &status,
                                strlen( string ) + 1 );
                        if ( rc2 != OM_SUCCESS )
                        {
                                dprintf(( "ge_usa: Could not set <%s> to <%s> (%d) \n", euv
                                string, rc2 ));

                                set_ev( ev, ( long ) P_VAR_NOT SET );
                                PPstp_ipc( P_VAR_NOT_SET );
                        }
                        else
                        {
                                dprintf(( "ge_usa: Variabele <%s> set\n", euv));
                        }
                }
        }

        dprintf(( "ge_usa: Setting error_var to <%d>\n", rc ));
        set_ev( ev, ( long ) rc);

        /*


/***********************************************************************
*  @(#)gp_display.c     1.2  I/A Series  Foxboro Company  89/08/17
************************************************************************
*                                                                      *
*  Copyright by the Foxboro Company 1988                               *
*                                                                      *
*  All rights reserved Foxboro Company 1988                            *
*                                                                      *
************************************************************************
*                                                                      *
*  FILE NAME           : gp_display.c                                  *
*                                                                      *
*  PART NUMBER         :                                               *
*                                                                      *
*  FUNCTION            : Get the full name of the display related to the *
*                        path.                                         *
*                                                                      *
*  FUNCTIONS CONTAINED : main()                                        *
*                        set_ev(error_variable,value)                  *
*                        g_ap_name(ap_name)                            *
*                        parm_chk(parameter)                           *
*                        is_lbug(letterbug)                            *
*                                                                      *
*  DATA STRUCTURES     :                                               *
*                                                                      *
*  COMPONENT HISTORY   :                                               *
*  -----------------------------------------------------------------   *
*  24 OCT 1988 - JVB - Creation                                        *
*  04 JAN 1989 - JVB - Call PPini_ipc() with FALSE                     *
*  06 JAN 1989 - JVB - Changed variable length for C&IO variables      *
*                                                                      *
***********************************************************************/


#include <pam_com.h>
#define LONG_STR        32
#define SHORT_STR       12
#define GC_VAR_LENGTH   8    /* (length OM shared variable) - (length lbug) */
#define OM_VAR_LENGTH   32
#define LENGTH_LBUG     6
#define HI_IN_PROGRESS  -1

/*********************
* External variables *
*********************/
```

```
extern  char    *optarg;
extern  int     optind, opterr;


main( argc, argv )
int     argc;
char    *argv[];
{
        int     rc;
        int     rc2;
        int     c;
        int     status;
        int     lenvar;

        char    *pn  = NULL;    /* path_name */
        char    *pdv = NULL;    /* path_disp_variable */
        char    *ev  = NULL;    /* error_variable */
        char    *lb  = NULL;    /* letterbug */

        char    string[126];
        char    ap_name[IPC_NAME_LEN];


        opterr = 0;


        /*
         * Get options.
         */

        while ( ( c = getopt( argc, argv, "p:d:x:l:" ) ) != EOF )
        {
                switch ( c )
                {
                case 'p':
                        pn = optarg;
                        break;

                case 'd':
                        pdv = optarg;
                        break;

                case 'x':
                        ev = optarg;
                        break;

                case 'l':
                        lb = optarg;
                        break;

                default:
                        break;

                } /* End of switch */

        } /* End of while */


        /*
         * Check error_variable if specified
         */

        if ( ev != NULL )
        {
                if ( parm_chk(ev) != PAM_OK || strlen(ev) > OM_VAR_LENGTH )
                {
                        dprintf(( "gp_disp: Invalid error_variable \n" ));
                        PPstp_ipc( P_INV_VARIABLE );
                }
        }
        else
        {
                dprintf(( "gp_disp: No error_variable specified.\n" ));
        }

        /*
         * Check parameter: letterbug [ optional ]
         */

        if ( lb != NULL )
        {
                if ( is_lbug( lb ) != PAM_OK || strlen( lb ) != LENGTH_LBUG )
                {
                        dprintf(( "gp_disp: Invalid lbug \n" ));
                        set_ev( ev, ( long ) P_INV_LBUG );
                        PPstp_ipc( P_INV_LBUG );
```

```
        }
        lenvar = GC_VAR_LENGTH;
}
else
{
        lenvar = ON_VAR_LENGTH;
        dprintf(( "gp_disp: No letterbug specified \n" ));
}

/*
 * Check parameter: path_name [ required ]
 */

if ( parm_chk( pn ) != PAM_OK || strlen( pn ) > SHORT_STR )
{
        dprintf(( "gp_disp: Invalid path_name \n" ));
        set_ev( ev, ( long ) P_INV_PATH_NAME );
        PPstp_ipc( P_INV_PATH_NAME );
}

/*
 * Check parameter: path_displ_variable [ required ]
 */

if ( parm_chk( pdv ) != PAM_OK || strlen( pdv ) > lenvar )
{
        dprintf(( "gp_disp: Invalid path_disp_var \n" ));
        set_ev( ev, ( long ) P_INV_VARIABLE );
        PPstp_ipc( P_INV_VARIABLE );
}

/*
 * Set error_variable to HI_IN_PROGRESS to indicate in progress.
 */

dprintf(( "gp_disp: Setting error_var to <%d>\n", HI_IN_PROGRESS ));
set_ev( ev, ( long ) HI_IN_PROGRESS );


/*
 * Initialize IPC.
 */

g_ap_name(ap_name);
dprintf(( "gp_disp: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */

rc = gp_display( pn, string );
if ( rc == PAM_OK )
{
        dprintf(( "gp_disp: Function execution successfull\n"));
        dprintf(( "gp_disp: Setting path_disp_var to <%s>\n", string ));
        if (lb != NULL)
        {
                HIsegcglobal( pdv, string, lb );
        }
        else
        {
                status = STRING;
                rc2 = set_confirm( pdv, VARIABLE, 0, string, &status,
                        strlen( string ) + 1 );
                if ( rc2 != OM_SUCCESS )
                {
                        dprintf(( "gp_disp: Could not set path_disp_var to <%s> (%d)
                        \n", string, rc2 ));

                        set_ev( ev, ( long ) P_VAR_NOT_SET );
                        PPstp_ipc( P_VAR_NOT_SET );
                }
                else
                {
                        dprintf(( "gp_disp: Path_disp_var set\n", pdv));
                }
        }
}
```

```
        dprintf(( "gp_disp: Setting error_var to <%d>\n", rc ));
        set_ev( ev, ( long ) rc);


        /*
         * Exit program.
         */
        PPstp_ipc( PAM_OK );

} /* End of main() */

/****************************************************************************
 *  @(#)gp_state.c       1.2  I/A Series  Foxboro Company  89/08/17
 ****************************************************************************
 *                                                                          *
 *  Copyright by the Foxboro Company 1988                                   *
 *                                                                          *
 *  All rights reserved Foxboro Company 1988                                *
 *                                                                          *
 **@C************************************************************************
 *                                                                          *
 *  FILE NAME           : gp_state.c                                        *
 *                                                                          *
 *  PART NUMBER         :                                                   *
 *                                                                          *
 *  FUNCTION            : Get the current state of the path.                *
 *                                                                          *
 *  FUNCTIONS CONTAINED : main()                                            *
 *                          set_ev(error_variable,value)                    *
 *                          g_ap_name(ap_name)                              *
 *                          parm_chk(parameter)                             *
 *                                                                          *
 *  DATA STRUCTURES     :                                                   *
 *                                                                          *
 *  COMPONENT HISTORY   :                                                   *
 *  ------------------------------------------------------------------     *
 *  14 DEC 1988 - JVB - Creation                                            *
 *  04 JAN 1989 - JVB - Call PPini_ipc() with FALSE                         *
 *  06 JAN 1989 - JVB - Changed variable length for C&IO variables          *
 *  27 APR 1989 - JVB - Changed value for set_confirm to long int           *
 *                                                                          *
 ***************************************************************************/

#include <pam_com.h>
#define LONG_STR         32
#define SHORT_STR        12
#define GC_VAR_LENGTH    8     /* (length OM shared variable) - (length lbug) */
#define OM_VAR_LENGTH    32
#define LENGTH_LBUS      6
#define MI_IN_PROGRESS   -1


/*********************
 * External variables *
 *********************/

extern  char    *optarg;
extern  int     optind, opterr;


main( argc, argv )
int     argc;
char    *argv[];
{
        int     rc;
        int     om_rc;
        int     c;
        int     int_status;
        int     str_status;
        int     pr_cd;
        int     alarm;
        int     stp_no;
        long    ldum;

        char    *path_name    = NULL;  /* path_name */
        char    *path_key     = NULL;  /* path_key */
        char    *cr_tp_var    = NULL;  /* cur_type_variable */
        char    *pr_tp_var    = NULL;  /* prv_type_variable */
        char    *pr_cd_var    = NULL;  /* prv_code_variable */
        char    *pat_nm_var   = NULL;  /* pat_name_variable */
        char    *alarm_var    = NULL;  /* alarm_variable */
        char    *cr_md_var    = NULL;  /* cur_mode_variable */
        char    *df_md_var    = NULL;  /* def_mode_variable */
        char    *auto_fs_var  = NULL;  /* auto_fs_variable */
        char    *stp_st_var   = NULL;  /* step_state_variable */
```

```
char    *stp_no_var   = NULL;  /* step_no_variable */
char    *error_var    = NULL;  /* error_variable */

char    cr_tp[2];
char    pr_tp[2];
char    cr_md[2];
char    df_md[2];
char    auto_fs[2];
char    stp_st[2];
char    pat_nm[12];
char    ap_name[IPC_NAME_LEN];

opterr = 0;

/*
 * Get options.
 */

while ( ( c = getopt( argc, argv,
          "p:k:t:s:c:n:a:m:d:f:e:o:x:" ) ) != EOF )
{
        switch ( c )
        {
        case 'p':
                path_name = optarg;
                break;

        case 'k':
                path_key = optarg;
                break;

        case 't':
                cr_tp_var = optarg;
                break;

        case 's':
                pr_tp_var = optarg;
                break;

        case 'c':
                pr_cd_var = optarg;
                break;

        case 'n':
                pat_nm_var = optarg;
                break;

        case 'a':
                alarm_var = optarg;
                break;

        case 'm':
                cr_md_var = optarg;
                break;

        case 'd':
                df_md_var = optarg;
                break;

        case 'f':
                auto_fs_var = optarg;
                break;

        case 'e':
                stp_st_var = optarg;
                break;

        case 'o':
                stp_no_var = optarg;
                break;

        case 'x':
                error_var = optarg;
                break;

        default:
                break;

        } /* End of switch */

} /* End of while */
```

```
/*
 * Check error_variable if specified
 */

if ( error_var != NULL )
{
    if ( para_chk(error_var) != PAN_OK ||
         strlen(error_var) > ON_VAR_LENGTH )
    {
            dprintf(( "gp_st: Invalid error_variable \n" ));
            PPstp_ipc( P_INV_VARIABLE );
    }
}
else
{
    dprintf(( "gp_st: No error_variable specified.\n" ));
}

/*
 * Check parameter: path_name [ required ]
 */

if ( para_chk( path_name ) != PAN_OK ||
     strlen( path_name ) > SHORT_STR )
{
    dprintf(( "gp_st: Invalid path_name \n" ));
    set_ev( error_var, ( long ) P_INV_PATH_NAME );
    PPstp_ipc( P_INV_PATH_NAME );
}

/*
 * Check parameter: path_key [ required ]
 */

if ( para_chk( path_key ) != PAN_OK ||
     strlen( path_key ) > SHORT_STR )
{
    dprintf(( "gp_st: Invalid path_key \n" ));
    set_ev( error_var, ( long ) P_INV_PATH_KEY );
    PPstp_ipc( P_INV_PATH_KEY );
}

/*
 * Check parameter: cur_type_variable [ optional ]
 */

if ( cr_tp_var != NULL )
{
    if ( para_chk( cr_tp_var ) != PAN_OK ||
         strlen( cr_tp_var ) > ON_VAR_LENGTH )
    {
        dprintf(( "gp_st: Invalid cur_type_variable \n" ));
        set_ev( error_var, ( long ) P_INV_VARIABLE );
        PPstp_ipc( P_INV_VARIABLE );
    }
}

/*
 * Check parameter: prv_type_variable [ optional ]
 */

if ( pr_tp_var != NULL )
{
    if ( para_chk( pr_tp_var ) != PAN_OK ||
         strlen( pr_tp_var ) > ON_VAR_LENGTH )
    {
        dprintf(( "gp_st: Invalid prv_type_variable \n" ));
        set_ev( error_var, ( long ) P_INV_VARIABLE );
        PPstp_ipc( P_INV_VARIABLE );
    }
}

/*
 * Check parameter: prv_code_variable [ optional ]
 */

if ( pr_cd_var != NULL )
{
    if ( para_chk( pr_cd_var ) != PAN_OK ||
         strlen( pr_cd_var ) > ON_VAR_LENGTH )
    {
        dprintf(( "gp_st: Invalid prv_code_variable \n" ));
        set_ev( error_var, ( long ) P_INV_VARIABLE );
        PPstp_ipc( P_INV_VARIABLE );
    }
```

```
}

/*
 * Check parameter: pat_name_variable [ optional ]
 */

if ( pat_nm_var != NULL )
{
    if ( parm_chk( pat_nm_var ) != PAN_OK ||
         strlen( pat_nm_var ) > ON_VAR_LENGTH )
    {
        dprintf(( "gp_st: Invalid pat_name_variable \n" ));
        set_ev( error_var, ( long ) P_INV_VARIABLE );
        PPstp_ipc( P_INV_VARIABLE );
    }
}

/*
 * Check parameter: alarm_variable [ optional ]
 */

if ( alarm_var != NULL )
{
    if ( parm_chk( alarm_var ) != PAN_OK ||
         strlen( alarm_var ) > ON_VAR_LENGTH )
    {
        dprintf(( "gp_st: Invalid alarm_variable \n" ));
        set_ev( error_var, ( long ) P_INV_VARIABLE );
        PPstp_ipc( P_INV_VARIABLE );
    }
}

/*
 * Check parameter: cur_mode_variable [ optional ]
 */

if ( cr_md_var != NULL )
{
    if ( parm_chk( cr_md_var ) != PAN_OK ||
         strlen( cr_md_var ) > ON_VAR_LENGTH )
    {
        dprintf(( "gp_st: Invalid cur_mode_variable \n" ));
        set_ev( error_var, ( long ) P_INV_VARIABLE );
        PPstp_ipc( P_INV_VARIABLE );
    }
}

/*
 * Check parameter: def_mode_variable [ optional ]
 */

if ( df_md_var != NULL )
{
    if ( parm_chk( df_md_var ) != PAN_OK ||
         strlen( df_md_var ) > ON_VAR_LENGTH )
    {
        dprintf(( "gp_st: Invalid def_mode_variable \n" ));
        set_ev( error_var, ( long ) P_INV_VARIABLE );
        PPstp_ipc( P_INV_VARIABLE );
    }
}

/*
 * Check parameter: auto_fs_variable [ optional ]
 */

if ( auto_fs_var != NULL )
{
    if ( parm_chk( auto_fs_var ) != PAN_OK ||
         strlen( auto_fs_var ) > ON_VAR_LENGTH )
    {
        dprintf(( "gp_st: Invalid auto_fs_variable \n" ));
        set_ev( error_var, ( long ) P_INV_VARIABLE );
        PPstp_ipc( P_INV_VARIABLE );
    }
}

/*
 * Check parameter: step_state_variable [ optional ]
 */

if ( stp_st_var != NULL )
{
    if ( parm_chk( stp_st_var ) != PAN_OK ||
         strlen( stp_st_var ) > ON_VAR_LENGTH )
```

```
    {
        dprintf(( "gp_st: Invalid step_state_variable \n" ));
        set_ev( error_var, ( long ) P_INV_VARIABLE );
        PPstp_ipc( P_INV_VARIABLE );
    }
}

/*
 * Check parameter: step_no_variable [ optional ]
 */

if ( stp_no_var != NULL )
{
    if ( para_chk( stp_no_var ) != PAM_OK ||
         strlen( stp_no_var ) > OM_VAR_LENGTH )
    {
        dprintf(( "gp_st: Invalid step_no_variable \n" ));
        set_ev( error_var, ( long ) P_INV_VARIABLE );
        PPstp_ipc( P_INV_VARIABLE );
    }
}

/*
 * Set error_variable to HI_IN_PROGRESS to indicate in progress.
 */

dprintf(( "gp_st: Setting error_var to <%d>\n", HI_IN_PROGRESS ));
set_ev( error_var, ( long ) HI_IN_PROGRESS );


/*
 * Initialize IPC.
 */

g_ap_name(ap_name);
dprintf(( "gp_st: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */

rc = gp_state( path_name, path_key, cr_tp, pr_tp,
          &pr_cd, pat_nm, &alarm, cr_md,
          df_md, auto_fs, stp_st, &stp_no );

dprintf(( "gp_st: Ret_code function = [%d]\n",rc ));
if ( rc == PAM_OK )
{
    str_status = STRING;
    int_status = OM_LNG_INT;

    if ( cr_tp_var != NULL )
    {
        om_rc = set_confirm( cr_tp_var, VARIABLE, 0,
                cr_tp, &str_status, strlen( cr_tp ) + 1 );
        if ( om_rc != OM_SUCCESS )
        {
            dprintf(( "gp_st: Could not set <%s> to <%s> (%d) \n",
                        cr_tp_var, cr_tp, om_rc ));
            set_ev( error_var, ( long ) P_VAR_NOT_SET );
            PPstp_ipc( P_VAR_NOT_SET );
        }
    }

    if ( pr_tp_var != NULL )
    {
        om_rc = set_confirm( pr_tp_var, VARIABLE, 0,
                pr_tp, &str_status, strlen( pr_tp ) + 1 );
        if ( om_rc != OM_SUCCESS )
        {
            dprintf(( "gp_st: Could not set <%s> to <%s> (%d) \n",
                        pr_tp_var, pr_tp, om_rc ));
            set_ev( error_var, ( long ) P_VAR_NOT_SET );
            PPstp_ipc( P_VAR_NOT_SET );
        }
    }

    if ( pr_cd_var != NULL )
    {
        ldum = pr_cd;
```

```
    om_rc = set_confirm( pr_cd_var, VARIABLE, 0,
            &ldum, &int_status, sizeof( ldum ) );
    if ( om_rc != OM_SUCCESS )
    {
        dprintf(( "gp_st: Could not set <%s> to <%d> (%d) \n",
                  pr_cd_var, pr_cd, om_rc ));
        set_ev( error_var, ( long ) P_VAR_NOT_SET );
        PPstp_ipc( P_VAR_NOT_SET );
    }
}

if ( pat_nm_var != NULL )
{
    om_rc = set_confirm( pat_nm_var, VARIABLE, 0,
            pat_nm, &str_status, strlen( pat_nm ) + 1 );
    if ( om_rc != OM_SUCCESS )
    {
        dprintf(( "gp_st: Could not set <%s> to <%s> (%d) \n",
                  pat_nm_var, pat_nm, om_rc ));
        set_ev( error_var, ( long ) P_VAR_NOT_SET );
        PPstp_ipc( P_VAR_NOT_SET );
    }
}

if ( alarm_var != NULL )
{
    ldum = alarm;
    om_rc = set_confirm( alarm_var, VARIABLE, 0,
            &ldum, &int_status, sizeof( ldum ) );
    if ( om_rc != OM_SUCCESS )
    {
        dprintf(( "gp_st: Could not set <%s> to <%d> (%d) \n",
                  alarm_var, alarm, om_rc ));
        set_ev( error_var, ( long ) P_VAR_NOT_SET );
        PPstp_ipc( P_VAR_NOT_SET );
    }
}

if ( cr_md_var != NULL )
{
    om_rc = set_confirm( cr_md_var, VARIABLE, 0,
            cr_md, &str_status, strlen( cr_md ) + 1 );
    if ( om_rc != OM_SUCCESS )
    {
        dprintf(( "gp_st: Could not set <%s> to <%s> (%d) \n",
                  cr_md_var, cr_md, om_rc ));
        set_ev( error_var, ( long ) P_VAR_NOT_SET );
        PPstp_ipc( P_VAR_NOT_SET );
    }
}

if ( df_md_var != NULL )
{
    om_rc = set_confirm( df_md_var, VARIABLE, 0,
            df_md, &str_status, strlen( df_md ) + 1 );
    if ( om_rc != OM_SUCCESS )
    {
        dprintf(( "gp_st: Could not set <%s> to <%s> (%d) \n",
                  df_md_var, df_md, om_rc ));
        set_ev( error_var, ( long ) P_VAR_NOT_SET );
        PPstp_ipc( P_VAR_NOT_SET );
    }
}

if ( auto_fs_var != NULL )
{
    om_rc = set_confirm( auto_fs_var, VARIABLE, 0,
            auto_fs, &str_status, strlen( auto_fs ) + 1 );
    if ( om_rc != OM_SUCCESS )
    {
        dprintf(( "gp_st: Could not set <%s> to <%s> (%d) \n",
                  auto_fs_var, auto_fs, om_rc ));
        set_ev( error_var, ( long ) P_VAR_NOT_SET );
        PPstp_ipc( P_VAR_NOT_SET );
    }
}

if ( stp_st_var != NULL )
{
    om_rc = set_confirm( stp_st_var, VARIABLE, 0,
            stp_st, &str_status, strlen( stp_st ) + 1 );
    if ( om_rc != OM_SUCCESS )
    {
        dprintf(( "gp_st: Could not set <%s> to <%s> (%d) \n",
```

```
                    stp_st_var, stp_st, om_rc ));
            set_ev( error_var, ( long ) P_VAR_NOT_SET );
            PPstp_ipc( P_VAR_NOT_SET );
        }
    }
    if ( stp_no_var != NULL )
    {
        ldum = stp_no;
        om_rc = set_confirm( stp_no_var, VARIABLE, 0,
              &ldum, &int_status, sizeof( ldum ) );
        if ( om_rc != OM_SUCCESS )
        {
            dprintf(( "gp_st: Could not set <%s> to <%d> (%d) \n",
                    stp_no_var, stp_no, om_rc ));
            set_ev( error_var, ( long ) P_VAR_NOT_SET );
            PPstp_ipc( P_VAR_NOT_SET );
        }
    }

}

dprintf(( "gp_st: Setting error_var to <%d>\n", rc ));
set_ev( error_var, ( long ) rc);


/*
 * Exit program.
 */

PPstp_ipc( PAM_OK );

} /* End of main() */

/*************************************************************************
*  @(#)gs_crit.c        1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&0**********************************************************************
*                                                                        *
*  FILE NAME           : gs_criterion.c                                  *
*                                                                        *
*  PART NUMBER         :                                                 *
*                                                                        *
*  FUNCTION            : Get the value of a selection criterion of a path.*
*                                                                        *
*  FUNCTIONS CONTAINED : main()                                          *
*                        set_ev(error_variable,value)                    *
*                        g_ap_name(ap_name)                              *
*                        param_chk(parameter)                            *
*                        is_lbug(letterbug)                              *
*                                                                        *
*  DATA STRUCTURES     :                                                 *
*                                                                        *
*  COMPONENT HISTORY   :                                                 *
*  ------------------------------------------------------------------    *
*  24 OCT 1988 - JVB - Creation                                          *
*  04 JAN 1989 - JVB - Call PPini_ipc() with FALSE                       *
*  06 JAN 1989 - JVB - Changed variable length for C&IO variables        *
*                                                                        *
*************************************************************************/

#include <pam_com.h>

#define LONG_STR        32
#define SHORT_STR       12
#define GC_VAR_LENGTH   8    /* (length OM shared variable) - (length lbug) */
#define OM_VAR_LENGTH   32
#define LENGTH_LBUG     6
#define MI_IN_PROGRESS -1


/********************
* External variables *
*********************/

extern  char    *optarg;
extern  int     optind, opterr;


main( argc, argv )
int     argc;
```

```
char    *argv[];
{
        int     rc;
        int     rc2;
        int     c;
        int     status;
        int     lenvar;

        char    *pn  = NULL;
        char    *cn  = NULL;
        char    *cvv = NULL;
        char    *ev  = NULL;
        char    *lb  = NULL;

        char    string[12];
        char    ap_name[IPC_NAME_LEN];

        opterr = 0;

        /*
         * Get options.
         */

        while ( ( c = getopt( argc, argv, "p:n:v:x:l:" ) ) != EOF )
        {
                switch ( c )
                {
                case 'p':
                        pn = optarg;
                        break;

                case 'n':
                        cn = optarg;
                        break;

                case 'v':
                        cvv = optarg;
                        break;

                case 'x':
                        ev = optarg;
                        break;

                case 'l':
                        lb = optarg;
                        break;

                default:
                        break;

                } /* End of switch */

        } /* End of while */

        /*
         * Check error_variable if specified
         */

        if ( ev != NULL )
        {
                if ( para_chk(ev) != PAM_OK || strlen(ev) > OM_VAR_LENGTH )
                {
                        dprintf(( "gs_crit: Invalid error_variable \n" ));
                        PPstp_ipc( P_INV_VARIABLE );
                }
        }
        else
        {
                dprintf(( " gs_crit: No error_variable specified.\n" ));
        }

        /*
         * Check parameter: letterbug [ optional ]
         */

        if ( lb != NULL )
        {
                if ( is_lbug( lb ) != PAM_OK || strlen( lb ) != LENGTH_LBUG )
                {
                        dprintf(( "gs_crit: Invalid lbug \n" ));
                        set_ev( ev, ( long ) P_INV_LBUG );
                        PPstp_ipc( P_INV_LBUG );
```

```
        }
        lenvar = GC_VAR_LENGTH;
}
else
{
        dprintf(( "gs_crit: No lbug specified\n"));
        lenvar = OM_VAR_LENGTH;
}

/*
 * Check parameter: path_name [ required ]
 */

if ( parm_chk( pn ) != PAM_OK || strlen( pn ) > SHORT_STR )
{
        dprintf(( "gs_crit: Invalid path_name \n" ));
        set_ev( ev, ( long ) P_INV_PATH_NAME );
        PPstp_ipc( P_INV_PATH_NAME );
}

/*
 * Check parameter: crit_name [ required ]
 */

if ( parm_chk( cn ) != PAM_OK || strlen( cn ) > SHORT_STR )
{
        dprintf(( "gs_crit: Invalid crit_name \n" ));
        set_ev( ev, ( long ) P_INV_CRIT_NAME );
        PPstp_ipc( P_INV_CRIT_NAME );
}
/*
 * Check parameter: crit_value_variable [ required ]
 */

if ( parm_chk( cvv ) != PAM_OK || strlen( cvv ) > lenvar )
{
        dprintf(( "gs_crit: Invalid crit_value_var \n" ));
        set_ev( ev, ( long ) P_INV_VARIABLE );
        PPstp_ipc( P_INV_VARIABLE );
}

/*
 * Set error_variable to HI_IN_PROGRESS to indicate in progress.
 */

dprintf(( "gs_crit: Setting error_var to <%d>\n", HI_IN_PROGRESS ));

set_ev( ev, ( long ) HI_IN_PROGRESS );


/*
 * Initialize IPC.
 */

g_ap_name(ap_name);
dprintf(( "gs_crit: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */

rc = gs_criterion( pn, cn, string );
if ( rc == PAM_OK )
{
        dprintf(( "gs_crit: Function execution successfull\n"));
        dprintf(( "gs_crit: Setting <%s> to <%s>\n", cvv, string ));
        if (lb != NULL)
        {
                HIsegcglobal( cvv, string, lb );
        }
        else
        {
                status = STRING;
                rc2 = set_confirm( cvv, VARIABLE, 0, string, &status,
                        strlen( string ) + 1 );
                if ( rc2 != OM_SUCCESS )
                {
                        dprintf(( "gs_crit: Could not set <%s> to <%s> (%d) \n", cvv,
                        string, rc2 ));
                        set_ev( ev, ( long ) P_VAR_NOT_SET );
```

```
                        PPstp_ipc( P_VAR_NOT_SET );
                }
                else
                {
                        dprintf(( "gs_crit: Variabele <%s> set\n", cvv));
                }
        }
    }

    dprintf(( "gs_crit: Setting error_var to <%d>\n", rc ));
    set_ev( ev, ( long ) rc);


    /*
     * Exit program.
     */

    PPstp_ipc( PAM_OK );

} /* End of main() */

/*****************************************************************************
 *  @(#)is_lbug.c        1.2  I/A Series  Foxboro Company  89/08/17
 *****************************************************************************
 *                                                                           *
 *  Copyright by the Foxboro Company 1988                                    *
 *                                                                           *
 *  All rights reserved Foxboro Company 1988                                 *
 *                                                                           *
 **%0*************************************************************************
 *                                                                           *
 *  FILE NAME            : is_lbug.c                                         *
 *                                                                           *
 *  PART NUMBER          :                                                   *
 *                                                                           *
 *  FUNCTION             : check the letterbug to contain only printable chars, *
 *                         to be non-empty and no longer then 6 chars.       *
 *  FUNCTIONS CONTAINED  : is_lbug()                                         *
 *                                                                           *
 *  DATA STRUCTURES      :                                                   *
 *                                                                           *
 *  COMPONENT HISTORY    :                                                   *
 *  ------------------------------------------------------------------------ *
 *  21 OCT 1988 - JVB - Creation                                             *
 *                                                                           *
 *****************************************************************************/

#include <pam_com.h>
#include <ctype.h>

is_lbug(lbug)

char *lbug;

{
int     i;

for( i=0 ; i <= ( strlen(lbug) - 1 ) ; i++)
        {
                if ( isprint(lbug[i]) == FALSE )
                {
                        return(P_INV_LBUG);
                }
        };
for( i=0 ; i <= ( strlen(lbug) - 1 ) ; i++)
        {
                if ( isgraph(lbug[i]) != FALSE )
                {
                        return(PAM_OK);
                }
        };

        return(P_INV_LBUG);

} /* End of function is_lbug() */

/*****************************************************************************
 *  @(#)para_chk.c       1.2  I/A Series  Foxboro Company  89/08/17
 *****************************************************************************
 *                                                                           *
 *  Copyright by the Foxboro Company 1988                                    *
 *                                                                           *
 *  All rights reserved Foxboro Company 1988                                 *
 *                                                                           *
```

```
**$0*************************************************************************
*                                                                           *
*  FILE NAME            : parm_chk.c                                        *
*                                                                           *
*  PART NUMBER          :                                                   *
*                                                                           *
*  FUNCTION             : check a string to contain only printable chars and *
*                         to be non-empty                                   *
*  FUNCTIONS CONTAINED : parm_chk()                                         *
*                                                                           *
*  DATA STRUCTURES      :                                                   *
*                                                                           *
*  COMPONENT HISTORY    :                                                   *
*  ----------------------------------------------------------------------   *
*  21 OCT 1988 - JVB - Creation                                             *
*                                                                           *
****************************************************************************/

#include <pam_com.h>
#include <ctype.h>


parm_chk(parm)

char *parm;

{
int     i;

for( i=0 ; i <= ( strlen(parm) - 1 ) ; i++)
        {
                if ( isprint(parm[i]) == FALSE )
                {
                        return(P_INV_VARIABLE);
                }
        };
for( i=0 ; i <= ( strlen(parm) - 1 ) ; i++)
        {
                if ( isgraph(parm[i]) != FALSE )
                {
                        return(PAM_OK);
                }
        };

        return(P_INV_VARIABLE);

} /* End of function parm_chk() */

/****************************************************************************
*  @(#)path.c   1.2  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**$0*************************************************************************
*                                                                           *
*  FILE NAME            : path.c                                            *
*                                                                           *
*  PART NUMBER          :                                                   *
*                                                                           *
*  FUNCTION             : Perform a normal operate path, setting it to one  *
*                         of its configured pattern.                        *
*                                                                           *
*  FUNCTIONS CONTAINED : main()                                             *
*                         set_ev(error_variable,value)                      *
*                         g_ap_name(ap_name)                                *
*                         parm_chk(parameter)                               *
*                                                                           *
*  DATA STRUCTURES      :                                                   *
*                                                                           *
*  COMPONENT HISTORY    :                                                   *
*  ----------------------------------------------------------------------   *
*  29 NOV 1988 - JVB - Creation                                             *
*  04 JAN 1989 - JVB - Call PPini_ipc() with FALSE                          *
*  06 JAN 1989 - JVB - Changed variable length for C&IO variables           *
*                                                                           *
****************************************************************************/

#include <pam_com.h>
#define LONG_STR        32
#define SHORT_STR       12
#define GC_VAR_LENGTH   8    /* (length OM shared variable) - (length lbug) */
#define OM_VAR_LENGTH   32
#define MI_IN_PROGRESS  -1
```

```
/********************
* External variables *
********************/

extern  char    *optarg;
extern  int     optind, opterr;


main( argc, argv )
int     argc;
char    *argv[];
{
        int     rc;
        int     c;
        int     status;
        char    *rq  = NULL;    /* requestor */
        char    *pn  = NULL;    /* path name */
        char    *nn  = NULL;    /* pattern name */
        char    *pk  = NULL;    /* path key */
        char    *ev  = NULL;    /* error variable */

        char    ap_name[IPC_NAME_LEN];


        opterr = 0;


        /*
         * Get options.
         */

        while ( ( c = getopt( argc, argv, "r:p:n:k:x:" ) ) != EOF )
        {
                switch ( c )
                {
                case 'r':
                        rq = optarg;
                        break;

                case 'p':
                        pn = optarg;
                        break;

                case 'n':
                        nn = optarg;
                        break;

                case 'k':
                        pk = optarg;
                        break;

                case 'x':
                        ev = optarg;
                        break;

                default:
                        break;

                } /* End of switch */

        } /* End of while */


        /*
         * Check error_variable if specified
         */

        if ( ev != NULL )
        {
                if ( parm_chk(ev) != PAM_OK || strlen(ev) > OM_VAR_LENGTH )
                {
                        dprintf(( "path: Invalid error_variable \n" ));
                        PPstp_ipc( P_INV_VARIABLE );
                }
        }
        else
        {
                dprintf(( "path: No error_variable specified.\n" ));
        }

        /*
         * Check parameter: requestor [ required ]
         */

        if ( parm_chk( rq ) != PAM_OK || strlen( rq ) > SHORT_STR )
```

```
{
        dprintf(( "path: Invalid requestor \n" ));
        set_ev( ev, ( long ) P_INV_REQUESTOR );
        PPstp_ipc( P_INV_REQUESTOR );
}

/*
 * Check parameter: path_name [ required ]
 */

if ( parm_chk( pn ) != PAM_OK || strlen( pn ) > SHORT_STR )
{
        dprintf(( "path: Invalid path_name \n" ));
        set_ev( ev, ( long ) P_INV_PATH_NAME );
        PPstp_ipc( P_INV_PATH_NAME );
}

/*
 * Check parameter: pattern_name [ required ]
 */

if ( parm_chk( nn ) != PAM_OK || strlen( nn ) > SHORT_STR )
{
        dprintf(( "path: Invalid pattern_name \n" ));
        set_ev( ev, ( long ) P_INV_PATTERN );
        PPstp_ipc( P_INV_PATTERN );
}

/*
 * Check parameter: path_key [ required ]
 */

if ( parm_chk( pk ) != PAM_OK || strlen( pk ) > SHORT_STR )
{
        dprintf(( "path: Invalid path_key \n" ));
        set_ev( ev, ( long ) P_INV_PATH_KEY );
        PPstp_ipc( P_INV_PATH_KEY );
}

/*
 * Set error_variable to HI_IN_PROGRESS to indicate in progress.
 */

dprintf(( "path: Setting error_var to <%d> \n", HI_IN_PROGRESS ));

set_ev( ev, ( long ) HI_IN_PROGRESS );


/*
 * Initialize IPC.
 */

g_ap_name(ap_name);
dprintf(( "path: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */

dprintf(( "path: IPC initialized, now function execution \n"));
rc = path( rq, pn, nn, pk );
if ( rc == PAM_OK )
{
        dprintf(( "path: Function execution successfull\n"));
}

dprintf(( "path: Setting error_var to <%d> \n", rc ));
set_ev( ev, ( long ) rc );


/*
 * Exit program.
 */

PPstp_ipc( PAM_OK );

} /* End of main() */
```

```
/*********************************************************************
* @(#)re_locked.c      1.2  I/A Series  Foxboro Company  89/08/17
**********************************************************************
*
* Copyright by the Foxboro Company 1988
*
* All rights reserved Foxboro Company 1988
*
**$0*******************************************************************
*
* FILE NAME           : re_locked.c
*
* PART NUMBER         :
*
* FUNCTION            : Lock an equipment_element for owner.
*
* FUNCTIONS CONTAINED : main()
*                       set_ev(error_variable,value)
*                       g_ap_name(ap_name)
*                       parm_chk(parameter)
*
* DATA STRUCTURES     :
*
* COMPONENT HISTORY   :
* ---------------------------------------------------------------------
* 24 OCT 1988 - JVB - Creation
* 04 JAN 1989 - JVB - Call PPini_ipc() with FALSE
* 06 JAN 1989 - JVB - Changed variable length for C&IO variables
*
**********************************************************************/

#include <pam_com.h>
#define LONG_STR          32
#define SHORT_STR         12
#define GC_VAR_LENGTH     8     /* (length OM shared variable) - (length lbug) */
#define OM_VAR_LENGTH     32
#define HI_IN_PROGRESS    -1

/********************
* External variables *
*********************/

extern  char    *optarg;
extern  int     optind, opterr;


main( argc, argv )
int     argc;
char    *argv[];
{
        int     rc;
        int     c;
        int     status;

        char    *rq  = NULL;    /* requestor */
        char    *en  = NULL;    /* equipment name */
        char    *ev  = NULL;    /* error variable */

        char    ap_name[IPC_NAME_LEN];


        opterr = 0;


        /*
         * Get options.
         */

        while ( ( c = getopt( argc, argv, "r:e:x:" ) ) != EOF )
        {
                switch ( c )
                {
                case 'r':
                        rq = optarg;
                        break;

                case 'e':
                        en = optarg;
                        break;

                case 'x':
                        ev = optarg;
                        break;
```

```
        default:
                break;

        } /* End of switch */

} /* End of while */

/*
 * Check error_variable if specified
 */

if ( ev != NULL )
{
        if ( parm_chk(ev) != PAM_OK || strlen(ev) > OM_VAR_LENGTH )
        {
                dprintf(( "re_lck: Invalid error_variable \n" ));
                PPstp_ipc( P_INV_VARIABLE );
        }
}
else
{
        dprintf(( "re_lck: No error_variable specified.\n" ));
}

/*
 * Check parameter: requestor [ required ]

 */

if ( parm_chk( rq ) != PAM_OK || strlen( rq ) > SHORT_STR )
{
        dprintf(( "re_lck: Invalid requestor \n" ));
        set_ev( ev, ( long ) P_INV_REQUESTOR );
        PPstp_ipc( P_INV_REQUESTOR );
}

/*
 * Check parameter: eq_name [ required ]
 */

if ( parm_chk( en ) != PAM_OK || strlen( en ) > SHORT_STR )
{
        dprintf(( "re_lck: Invalid eq_name \n" ));
        set_ev( ev, ( long ) P_INV_EQ_NAME );
        PPstp_ipc( P_INV_EQ_NAME );
}

/*
 * Set error_variable to HI_IN_PROGRESS to indicate in progress.
 */

dprintf(( "re_lck: Setting error_var to <%d>\n", HI_IN_PROGRESS ));

set_ev( ev, ( long ) HI_IN_PROGRESS );


/*
 * Initialize IPC.
 */

g_ap_name(ap_name);
dprintf(( "re_lck: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */

rc = re_locked( rq, en );
if ( rc == PAM_OK )
{
        dprintf(( "re_lck: Function execution successfull\n"));
}

dprintf(( "re_lck: Setting error_var to <%d>\n", rc ));
set_ev( ev, ( long ) rc);

/*
 * Exit program.
```

```
        */

        PPstp_ipc( PAM_OK );

} /* End of main() */

/****************************************************************************
 * @(#)re_secured.c     1.2  I/A Series  Foxboro Company  89/08/17
 ****************************************************************************
 *                                                                          *
 * Copyright by the Foxboro Company 1988                                    *
 *                                                                          *
 * All rights reserved Foxboro Company 1988                                 *
 *                                                                          *
 **&0************************************************************************
 *                                                                          *
 * FILE NAME            : re_secured.c                                      *
 *                                                                          *
 * PART NUMBER          :                                                   *
 *                                                                          *
 * FUNCTION             : Secure an equipment_element for owner.            *
 *                                                                          *
 * FUNCTIONS CONTAINED  : main()                                            *
 *                        set_ev(error_variable,value)                      *
 *                        g_ap_name(ap_name)                                *
 *                        parm_chk(parameter)                               *
 *                                                                          *
 * DATA STRUCTURES      :                                                   *
 *                                                                          *
 * COMPONENT HISTORY    :                                                   *
 * ------------------------------------------------------------------------ *
 * 24 OCT 1988 - JVB - Creation                                             *
 * 04 JAN 1989 - JVB - Call PPini_ipc() with FALSE                          *
 * 06 JAN 1989 - JVB - Changed variable length for C&IO variables           *
 *                                                                          *
 ****************************************************************************/

#include <pam_com.h>
#define LONG_STR        32
#define SHORT_STR       12
#define GC_VAR_LENGTH   8    /* (length OM shared variable) - (length lbug) */
#define OM_VAR_LENGTH   32
#define HI_IN_PROGRESS  -1


/********************
 * External variables *
 ********************/

extern  char    *optarg;
extern  int     optind, opterr;


main( argc, argv )
int     argc;
char    *argv[];
{
        int     rc;
        int     c;
        int     status;

        char    *rq  = NULL;    /* requestor */
        char    *en  = NULL;    /* equipment name */
        char    *ev  = NULL;    /* error variable */

        char    ap_name[IPC_NAME_LEN];


        opterr = 0;


        /*
         * Get options.
         */

        while ( ( c = getopt( argc, argv, "r:e:x:" ) ) != EOF )
        {
                switch ( c )
                {
                case 'r':
                        rq = optarg;
                        break;

                case 'e':
```

```
                        en = optarg;
                        break;

                case 'x':
                        ev = optarg;
                        break;

                default:
                        break;

                } /* End of switch */

        } /* End of while */


        /*
         * Check error_variable if specified
         */

        if ( ev != NULL )
        {
                if ( parm_chk(ev) != PAM_OK || strlen(ev) > OM_VAR_LENGTH )
                {
                        dprintf(( "re_sec: Invalid error_variable \n" ));
                        PPstp_ipc( P_INV_VARIABLE );
                }
        }
        else
        {
                dprintf(( "re_sec: No error_variable specified.\n" ));
        }

        /*
         * Check parameter: requestor [ required ]

         */

        if ( parm_chk( rq ) != PAM_OK || strlen( rq ) > SHORT_STR )
        {
                dprintf(( "re_sec: Invalid requestor \n" ));
                set_ev( ev, ( long ) P_INV_REQUESTOR );
                PPstp_ipc( P_INV_REQUESTOR );
        }

        /*
         * Check parameter: eq_name [ required ]
         */

        if ( parm_chk( en ) != PAM_OK || strlen( en ) > SHORT_STR )
        {
                dprintf(( "re_sec: Invalid eq_name \n" ));
                set_ev( ev, ( long ) P_INV_EQ_NAME );
                PPstp_ipc( P_INV_EQ_NAME );
        }

        /*
         * Set error_variable to HI_IN_PROGRESS to indicate in progress.
         */

        dprintf(( "re_sec: Setting error_variable to <%d>\n", HI_IN_PROGRESS ));

        set_ev( ev, ( long ) HI_IN_PROGRESS );


        /*
         * Initialize IPC.
         */

        g_ap_name(ap_name);
        dprintf(( "re_sec: Ap_name set to <%s>\n", ap_name ));

        rc = PPini_ipc( ap_name, FALSE, 1 );
        if ( rc != PAM_OK ) PPstp_ipc( rc );

        rc = PPget_cfg();
        if ( rc != PAM_OK ) PPstp_ipc( rc );

        /*
         * Execute actual function.
         */

        rc = re_secured( rq, en );
        if ( rc == PAM_OK )
        {
                dprintf(( "re_sec: Function execution successfull\n"));
        }
```

```
        dprintf(( "re_sec: Setting error_var to <%d>\n", rc ));
        set_ev( ev, ( long ) rc);

        /*
         * Exit program.
         */

        PPstp_ipc( PAM_OK );

} /* End of main() */

/******************************************************************************
 * @(#)release_p.c      1.2  I/A Series  Foxboro Company  89/06/17
 ******************************************************************************
 *                                                                            *
 *  Copyright by the Foxboro Company 1988                                     *
 *                                                                            *
 *  All rights reserved Foxboro Company 1988                                  *
 *                                                                            *
 **$0**************************************************************************
 *                                                                            *
 *  FILE NAME           : release_p.c                                         *
 *                                                                            *
 *  PART NUMBER         :                                                     *
 *                                                                            *
 *  FUNCTION            : Deselect a selected path and abort the current path *
 *                        operation.                                          *
 *                                                                            *
 *  FUNCTIONS CONTAINED : main()                                              *
 *                        set_ev(error_variable,value)                        *
 *                        g_ap_name(ap_name)                                  *
 *                        parm_chk(parameter)                                 *
 *                                                                            *
 *  DATA STRUCTURES     :                                                     *
 *                                                                            *
 *  COMPONENT HISTORY   :                                                     *
 *  --------------------------------------------------------------------      *
 *  29 NOV 1988 - JVB - Creation                                              *
 *  04 JAN 1989 - JVB - Call PPini_ipc() with FALSE                           *
 *  06 JAN 1989 - JVB - Changed variable length for C&IO variables            *
 *                                                                            *
 ******************************************************************************/

#include <pam_com.h>
#define LONG_STR        32
#define SHORT_STR       12
#define GC_VAR_LENGTH   8    /* (length OM shared variable) - (length lbug) */
#define OM_VAR_LENGTH   32
#define HI_IN_PROGRESS  -1

/*********************
 * External variables *
 *********************/

extern  char    *optarg;
extern  int     optind, opterr;


main( argc, argv )
int     argc;
char    *argv[];
{
        int     rc;
        int     c;
        int     status;

        char    *rq  = NULL;    /* requestor */
        char    *pn  = NULL;    /* path name */
        char    *pk  = NULL;    /* path key  */
        char    *ev  = NULL;    /* error variable */

        char    ap_name[IPC_NAME_LEN];

        opterr = 0;


        /*
         * Get options.
         */

        while ( ( c = getopt( argc, argv, "r:p:k:x:" ) ) != EOF )
        {
                switch ( c )
                {
```

```
        case 'r':
                rq = optarg;
                break;

        case 'p':
                pn = optarg;
                break;

        case 'k':
                pk = optarg;
                break;

        case 'x':
                ev = optarg;
                break;

        default:
                break;

        } /* End of switch */

} /* End of while */

/*
 * Check error_variable if specified
 */

if ( ev != NULL )
{
        if ( parm_chk(ev) != PAM_OK || strlen(ev) > OM_VAR_LENGTH )
        {
                dprintf(( "rel_p: Invalid error_variable \n" ));
                PPstp_ipc( P_INV_VARIABLE );
        }
}
else
{
        dprintf(( "rel_p: No error_variable specified.\n" ));
}

/*
 * Check parameter: requestor [ required ]
 */

if ( parm_chk( rq ) != PAM_OK || strlen( rq ) > SHORT_STR )
{
        dprintf(( "rel_p: Invalid requestor \n" ));
        set_ev( ev, ( long ) P_INV_REQUESTOR );
        PPstp_ipc( P_INV_REQUESTOR );
}

/*
 * Check parameter: path_name [ required ]
 */

if ( parm_chk( pn ) != PAM_OK || strlen( pn ) > SHORT_STR )
{
        dprintf(( "rel_p: Invalid path_name \n" ));
        set_ev( ev, ( long ) P_INV_PATH_NAME );
        PPstp_ipc( P_INV_PATH_NAME );
}

/*
 * Check parameter: path_key [ required ]
 */

if ( parm_chk( pk ) != PAM_OK || strlen( pk ) > SHORT_STR )
{
        dprintf(( "rel_p: Invalid path_key \n" ));
        set_ev( ev, ( long ) P_INV_PATH_KEY );
        PPstp_ipc( P_INV_PATH_KEY );
}

/*
 * Set error_variable to HI_IN_PROGRESS to indicate in progress.
 */

dprintf(( "rel_p: Setting error_var to <%d> \n", HI_IN_PROGRESS ));

set_ev( ev, ( long ) HI_IN_PROGRESS );

/*
 * Initialize IPC.
 */
```

```
        g_ap_name(ap_name);
        dprintf(( "rel_p: Ap_name set to <%s>\n", ap_name ));

        rc = PPini_ipc( ap_name, FALSE, 1 );
        if ( rc != PAM_OK ) PPstp_ipc( rc );

        rc = PPget_cfg();
        if ( rc != PAM_OK ) PPstp_ipc( rc );

        /*
         * Execute actual function.
         */

        rc = release_p( rq, pn, pk );
        if ( rc == PAM_OK )
        {
                dprintf(( "rel_p: Function execution successfull\n"));
        }

        dprintf(( "rel_p: Setting error_var to <%d> \n", rc ));
        set_ev( ev, ( long ) rc );


        /*
         * Exit program.
         */

        PPstp_ipc( PAM_OK );

} /* End of main() */

/*************************************************************************
 * @(#)select_p.c       1.2  I/A Series  Foxboro Company  89/08/17
 *************************************************************************
 *                                                                       *
 * Copyright by the Foxboro Company 1988                                 *
 *                                                                       *
 * All rights reserved Foxboro Company 1988                              *
 *                                                                       *
 **&D*********************************************************************
 *                                                                       *
 * FILE NAME           : select_p.c                                      *
 *                                                                       *
 * PART NUMBER         :                                                 *
 *                                                                       *
 * FUNCTION            : To acquire a path for exclusive operation.      *
 *                                                                       *
 * FUNCTIONS CONTAINED : main()                                          *
 *                       set_ev(error_variable,value)                    *
 *                       g_ap_name(ap_name)                              *
 *                       parm_chk(parameter)                             *
 *                       cond_chk(criteria,max_name_length,max_value_length) *
 *                       is_lbug(letterbug)                              *
 *                                                                       *
 * DATA STRUCTURES     :                                                 *
 *                                                                       *
 * COMPONENT HISTORY   :                                                 *
 * --------------------------------------------------------------------- *
 * 29 NOV 1988 - JVB - Creation                                          *
 * 29 DEC 1988 - JVB - Made the 'criteria' parameter optional.           *
 * 04 JAN 1989 - JVB - Call PPini_ipc() with FALSE                       *
 * 06 JAN 1989 - JVB - Changed variable length for C&IO variables        *
 *                                                                       *
 ************************************************************************/

#include <pam_com.h>
#include <isam.h>
#include <fox/pream.h>
#define LONG_STR        32
#define SHORT_STR       12
#define GC_VAR_LENGTH   8    /* (length OM shared variable) - (length lbug) */
#define OM_VAR_LENGTH   32
#define LENGTH_LBUG     6
#define MI_IN_PROGRESS  -1

/*********************
 * External variables *
 *********************/

extern  char    *optarg;
extern  int     optind, opterr;

main( argc, argv )
```

```
int     argc;
char    *argv[];

{
        int     rc;
        int     rc2;
        int     c;
        int     status;
        int     lenvar;

        char    *rq  = NULL;  /* requestor */
        char    *env = NULL;  /* environment */
        char    *cr  = NULL;  /* criteria */
        char    *pnv = NULL;  /* path_name variable */
        char    *pkv = NULL;  /* path_key variable */
        char    *ev  = NULL;  /* error_variable */
        char    *lb  = NULL;  /* letterbug */

        char    string1[12];
        char    string2[12];
        char    ap_name[IPC_NAME_LEN];

        opterr = 0;

        /*
         * Get options.
         */

        while ( ( c = getopt( argc, argv, "r:e:c:p:k:x:l:" ) ) != EOF )
        {
                switch ( c )
                {
                case 'r':
                        rq = optarg;
                        break;

                case 'e':
                        env = optarg;
                        break;

                case 'c':
                        cr = optarg;
                        break;

                case 'p':
                        pnv = optarg;
                        break;

                case 'k':
                        pkv = optarg;
                        break;

                case 'x':
                        ev = optarg;
                        break;

                case 'l':
                        lb = optarg;
                        break;

                default:
                        break;

                } /* End of switch */

        } /* End of while */


        /*
         * Check error_variable if specified
         */

        if ( ev != NULL )
        {
                if ( parm_chk(ev) != PAN_OK || strlen(ev) > OK_VAR_LENGTH )
                {
                        dprintf(( "sel_p: Invalid error_variable \n" ));
                        PPstp_ipc( P_INV_VARIABLE );
                }
        }
        else
        {
                dprintf(( " sel_p: No error_variable specified.\n" ));
```

```
}

/*
 * Check parameter: letterbug [ optional ]
 */

if ( lb != NULL )
{
        if ( is_lbug( lb ) != PAM_OK || strlen( lb ) != LENGTH_LBUG )
        {
                dprintf(( "sel_p: Invalid lbug \n" ));
                set_ev( ev, ( long ) P_INV_LBUG );
                PPstp_ipc( P_INV_LBUG );
        }
        lenvar = GC_VAR_LENGTH;
}
else
{
        lenvar = OM_VAR_LENGTH;
        dprintf(( "sel_p: No lbug specified\n"));
}

/*
 * Check parameter: requestor [ required ]
 */

if ( para_chk( rq ) != PAM_OK || strlen( rq ) > SHORT_STR )
{
        dprintf(( "sel_p: Invalid requestor \n" ));
        set_ev( ev, ( long ) P_INV_REQUESTOR );
        PPstp_ipc( P_INV_REQUESTOR );
}

/*
 * Check parameter: environment [ required ]
 */

if ( para_chk( env ) != PAM_OK || strlen( env ) > SHORT_STR )
{
        dprintf(( "sel_p: Invalid environment \n" ));
        set_ev( ev, ( long ) P_INV_ENVIRONMENT );
        PPstp_ipc( P_INV_ENVIRONMENT );
}

/*
 * Check parameter: criteria [ optional ]
 */

if ( cr != NULL )
{
    if ( para_chk( cr ) != PAM_OK )
    {
        dprintf(( "sel_p: Invalid criteria \n" ));
        set_ev( ev, ( long ) P_INV_CRITERIA_LIST );
        PPstp_ipc( P_INV_CRITERIA_LIST );
    }
    rc = cond_chk( cr, IL_MAX_COL, 80 );
    if ( rc != PAM_OK  )
    {
        dprintf(( "sel_p: Invalid criteria \n" ));
        set_ev( ev, ( long ) rc );
        PPstp_ipc( rc );
    }
}

/*
 * Check parameter: path_name_variable [ required ]
 */

if ( parm_chk( pnv ) != PAM_OK || strlen( pnv ) > lenvar )
{
        dprintf(( "sel_p: Invalid path_name_variable \n" ));
        set_ev( ev, ( long ) P_INV_VARIABLE );
        PPstp_ipc( P_INV_VARIABLE );
}

/*
 * Check parameter: path_key_variable [ required ]
 */

if ( parm_chk( pkv ) != PAM_OK || strlen( pkv ) > lenvar )
{
        dprintf(( "sel_p: Invalid path_key_variable \n" ));
        set_ev( ev, ( long ) P_INV_VARIABLE );
        PPstp_ipc( P_INV_VARIABLE );
}
```

```
/*
 * Set error_variable to HI_IN_PROGRESS to indicate in progress.
 */

dprintf(( "sel_p: Setting error_var to <%d>\n", HI_IN_PROGRESS ));

set_ev( ev, ( long ) HI_IN_PROGRESS );


/*
 * Initialize IPC.
 */

g_ap_name(ap_name);
dprintf(( "sel_p: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */

rc = select_p( rq, env, cr, string1, string2 );
dprintf(( "sel_p: Ret_code function = [%d]\n",rc ));
if ( rc == PAM_OK )
{
        dprintf(( "sel_p: Function execution successfull\n"));
        dprintf(( "sel_p: Setting <%s> to <%s>\n", pnv, string1 ));
        dprintf(( "sel_p: Setting <%s> to <%s>\n", pkv, string2 ));
        if (lb != NULL)
        {
                HIsegcglobal( pnv, string1, lb );
                HIsegcglobal( pkv, string2, lb );
        }
        else
        {
                status = STRING;
                rc2 = set_confirm( pnv, VARIABLE, 0, string1, &status,
                        strlen( string1 ) + 1 );
                if ( rc2 != ON_SUCCESS )
                {
                    dprintf(( "sel_p: Could not set <%s> to <%s> (%d) \n", pnv,
                    string1, rc2 ));

                        set_ev( ev, ( long ) P_VAR_NOT_SET );
                        PPstp_ipc( P_VAR_NOT_SET );
                }
                else
                {
                        dprintf(( "sel_p: Variabele <%s> set\n", pnv));
                }
                rc2 = set_confirm( pkv, VARIABLE, 0, string2, &status,
                        strlen( string2 ) + 1 );
                if ( rc2 != ON_SUCCESS )
                {
                    dprintf(( "sel_p: Could not set <%s> to <%s> (%d) \n", pkv,
                    string2, rc2 ));
                        set_ev( ev, ( long ) P_VAR_NOT_SET );
                        PPstp_ipc( P_VAR_NOT_SET );
                }
                else
                {
                        dprintf(( "sel_p: Variabele <%s> set\n", pkv));
                }
        }
}

dprintf(( "sel_p: Setting error_var to <%d>\n", rc ));
set_ev( ev, ( long ) rc);


/*
 * Exit program.
 */

PPstp_ipc( PAM_OK );

} /* End of main() */
```

```
/****************************************************************************
 * @(#)set_ev.c 1.2  I/A Series  Foxboro Company  89/08/17
 ****************************************************************************
 *
 * Copyright by the Foxboro Company 1988
 *
 * All rights reserved Foxboro Company 1988
 *
 **80************************************************************************
 *
 * FILE NAME           : set_ev.c
 *
 * PART NUMBER         :
 *
 * FUNCTION            : set error_variable if specified. If error_variable
 *                       could not be set, stop program.
 * FUNCTIONS CONTAINED : set_ev()
 *
 * DATA STRUCTURES     :
 *
 * COMPONENT HISTORY   :
 * -----------------------------------------------------------------------
 * 24 OCT 1988 - JVB - Creation
 * 05 DEC 1988 - JVB - Function now calls PPstp_ipc() with return code
 *                     P_VAR_NOT_SET.
 *
 ***************************************************************************/

#include <pam_com.h>

set_ev(ev,value)

char    *ev;
long    value;

{
    int     rc;
    int     status;

    status = OM_LNG_INT;
    if ( ev != NULL )
    {
       rc = set_confirm( ev, VARIABLE, 0, &value, &status, sizeof( value ) );
       if ( rc != OM_SUCCESS )
       {
          dprintf(( "set_ev: Could not set <%s> to <%ld> (%d)\n",
                    ev, value, rc ));
          PPstp_ipc( P_VAR_NOT_SET );
       }
    }

} /* End of function set_ev() */

/****************************************************************************
 * @(#)ue_use.c 1.2  I/A Series  Foxboro Company  89/08/17
 ****************************************************************************
 *
 * Copyright by the Foxboro Company 1988
 *
 * All rights reserved Foxboro Company 1988
 *
 **80************************************************************************
 *
 * FILE NAME           : ue_use.c
 *
 * PART NUMBER         :
 *
 * FUNCTION            : Unsecure or unlock an equipment_element.
 *
 * FUNCTIONS CONTAINED : main()
 *                       set_ev(error_variable,value)
 *                       g_ap_name(ap_name)
 *                       parm_chk(parameter)
 *
 * DATA STRUCTURES     :
 *
 * COMPONENT HISTORY   :
 * -----------------------------------------------------------------------
 * 24 OCT 1988 - JVB - Creation
 * 04 JAN 1989 - JVB - Call PPini_ipc() with FALSE
 * 06 JAN 1989 - JVB - Changed variable length for C&IO variables
 *
 ***************************************************************************/
```

```
#include <pam_com.h>
#define LONG_STR        32
#define SHORT_STR       12
#define GC_VAR_LENGTH   8    /* (length ON shared variable) - (length lbug) */
#define ON_VAR_LENGTH   32
#define HI_IN_PROGRESS  -1

/********************
* External variables *
********************/

extern  char    *optarg;
extern  int     optind, opterr;


main( argc, argv )
int     argc;
char    *argv[];
{
        int     rc;
        int     c;
        int     status;

        char    *rq  = NULL;    /* requestor */
        char    *en  = NULL;    /* equipment name */
        char    *ev  = NULL;    /* error variable */

        char    ap_name[IPC_NAME_LEN];

        opterr = 0;

        /*
         * Get obtions.
         */

        while ( ( c = getopt( argc, argv, "r:e:x:" ) ) != EOF )
        {
                switch ( c )
                {
                case 'r':
                        rq = optarg;
                        break;

                case 'e':
                        en = optarg;
                        break;

                case 'x':
                        ev = optarg;
                        break;

                default:
                        break;

                } /* End of switch */

        } /* End of while */


        /*
         * Check error_variable if specified
         */

        if ( ev != NULL )
        {
                if ( para_chk(ev) != PAM_OK || strlen(ev) > ON_VAR_LENGTH )
                {
                        dprintf(( "ue_use: Invalid error_variable \n" ));
                        PPstp_ipc( P_INV_VARIABLE );
                }
        }
        else
        {
                dprintf(( "ue_use: No error_variable specified.\n" ));
        }

        /*
         * Check parameter: requestor [ required ]

         */

        if ( para_chk( rq ) != PAM_OK || strlen( rq ) > SHORT_STR )
```

```
{
        dprintf(( "ue_use: Invalid requestor \n" ));
        set_ev( ev, ( long ) P_INV_REQUESTOR );
        PPstp_ipc( P_INV_REQUESTOR );
}

/*
 * Check parameter: eq_name [ required ]
 */

if ( parm_chk( en ) != PAM_OK || strlen( en ) > SHORT_STR )
{
        dprintf(( "ue_use: Invalid eq_name \n" ));
        set_ev( ev, ( long ) P_INV_EQ_NAME );
        PPstp_ipc( P_INV_EQ_NAME );
}

/*
 * Set error_variable to HI_IN_PROGRESS to indicate in progress.
 */

dprintf(( "ue_use: Setting error_var to <%d>\n", HI_IN_PROGRESS ));

set_ev( ev, ( long ) HI_IN_PROGRESS );


/*
 * Initialize IPC.
 */

g_ap_name(ap_name);
dprintf(( "ue_use: Ap_name set to <%s>\n", ap_name ));

rc = PPini_ipc( ap_name, FALSE, 1 );
if ( rc != PAM_OK ) PPstp_ipc( rc );

rc = PPget_cfg();
if ( rc != PAM_OK ) PPstp_ipc( rc );

/*
 * Execute actual function.
 */

rc = ue_use( rq, en );
if ( rc == PAM_OK )
{
        dprintf(( "ue_use: Function execution successfull\n"));
}

dprintf(( "ue_use: Setting error_var to <%d>\n", rc ));
set_ev( ev, ( long ) rc);

 * Exit program.
 */

PPstp_ipc( PAM_OK );

} /* End of main() */

EES
PIRS
CNG
SEL
ELS
@(#)cfg.dat     1.2  89/08/17

;*********************************************************************
;  @(#)n086.cms 1.1  I/A Series  Foxboro Company  89/08/18
;*********************************************************************
;                                                                    *
;  Copyright by the Foxboro Company 1988                             *
;                                                                    *
;  All rights reserved Foxboro Company 1988                          *
;                                                                    *
;*********************************************************************
;                                                                    *
;  FILE NAME          : n086.cms                                     *
;                                                                    *
;  PART NUMBER        :                                              *
;                                                                    *
;  FUNCTION           : CMS file for PAM error reports.              *
;                                                                    *
;  COMPONENT HISTORY :                                               *
;  -------------------------------------------------------------     *
```

```
;  03 JUL 1989 - RD - Creation                                          *
;  11 AUG 1989 - RD - Added PE_STOP                                     *
;                                                                       *
;************************************************************************

PAM     -86

1       PE_INIT                 IPC - Initialize failed
2       PE_RECEIVE              IPC - Receive failed
3       PE_SEND                 IPC - Send failed

10      PE_GETVAL               OM - Get value failed
11      PE_SETVAL               OM - Set value failed
12      PE_OMOPEN               OM - Open list failed
13      PE_OMREAD               OM - Read list failed
14      PE_OMWRITE              OM - Write list failed
15      PE_DQCHANGE             OM - Change driven access failed
16      PE_OMCLOSE              OM - Close list failed

20      PE_INV_MESSAGE          Invalid message received
21      PE_INV_ARGUMENTS        Invalid arguments specified
22      PE_FATAL_ERROR          Fatal error
23      PE_RESULT               Result of function could not be given to requestor
24      PE_OPEN_FAIL            Open file failure
25      PE_DBDIR_FAIL           Database directory failure
26      PE_STOP                 Program stopped

30      PE_HIWAIT               HI - Wait event failed
31      PE_HIINIT               HI - Initialize failed
33      PE_CFG                  PAC - Configuration error

40      PE_NO_EVENTS            No events are configured
41      PE_NO_FORMATS           No message formats are configured
42      PE_NO_DEVICES           No logging devices are configured

50      PE_USAGE_CONDS          Too many element conditions of type usage

#-------------------------------------------------------------------
#  @(#)p_init.PTMGM     1.6  I/A Series, Foxboro Company  9/14/89
#-------------------------------------------------------------------
#
#
#  PAM installation script
#
#  History:
#       12 SEP 89 - RD - Remove set -x
#                        Made /dev/err_rpt writable
#       16 AUG 89 - RD - Remove comment from pam_conf.per
#       29 JUN 89 - RD - PAM_VERSION set to 1.3
#       30 MAR 89 - GM - PAM_VERSION set to 1.2
#       15 FEB 89 - GM - Name of this script changed into p_init.PTMGM
#       17 JAN 89 - GM - Remove /tmp/p_tmp when finished
#                        libhit.a no longer part of installation
#       16 JAN 89 - GM - ALWAYS compile reports and perform screen.
#       13 JAN 89 - GM - ACE report compilation corrected
#                        Save pam_version file if this is not an
#                        initial installation
#       11 JAN 89 - GM - Set (G)TERM to for console? instead of console*
#                        Compile report specifications
#       09 JAN 89 - GM - Set TERM & GTERM in .profile
#                        Add /usr/pam/bin to PATH
#       04 JAN 89 - GM - Set PAMDIR to /usr/pam in .profile.
#       01 NOV 88 - GM - Created.
#

#
#  Before creating install diskette(s):
#     set PAM_VERSION to version/release level of this installation
#     set DB_VERSION to version/release level of databases
#     set PAM_SPECIAL to the full pathname of a script file, which
#     must be executed at the end of the package installation (e.g. to
#     change database contents), or to an empty string if no script
#     file is to be executed
#

PAM_VERSION=1.3
DB_VERSION=1.1
PAM_SPECIAL=""
PAM_UPD_DB=""

PAM_TABLES="copas \
               elem_alarm \
               pat \
               path_cond \
               elem_cond \
```

```
                par_value \
                eqe \
                eqr \
                event_def \
                format_def \
                pac \
                dev_conf \
                pac"

PAMUID=252      # standard pam user id
INFGID=101      # assumed informix group id (no standard yet)

myPAMUID=$PAMUID        # pam user id on this station
myINFGID=$INFGID        # informix group id on this station
export myPAMUID
export myINFGID

N_EXIST=100     # group informix does not exist
ID_USED=101     # pam uid already in use by other user
ID_WRONG=102    # user pam has wrong uid or is member of wrong group
NO_INST_DIR=103 # install directory not found

#  Check existence of install-tree, if not available exit

if test ! -d /usr/installpam
then
   echo "Install directory not found"
   exit $NO_INST_DIR
fi


#  Only edit /etc/passwd, /etc/group, /etc/dsamap and /etc/inittab
#  if this is an initial pam installation

if test ! -f /usr/pam/pam_version
then

#
#  Make sure user pam(PAMUID) of group informix(INFGID) is available.
#  If this user or group exists on this station with a
#  different id, store this id in resp. myPAMUID or myINFGID.
#

#  Group informix
#  If available read gid, if not exit.

myINFGID=`awk -F: 'BEGIN { i = 1 }
   $1 == "informix" { print $3; i = 0; exit }
   END { exit i }' /etc/group`
if test 0 -eq $?
then
   # group informix exists, gid read
   echo "Group 'informix' exists, gid $myINFGID"
else
   # group informix does not exist, exit

   echo "Group 'informix' not available"
   exit $N_EXIST
fi


#  User pam
#  If available and group correct --> read uid
#  If available and group not correct --> exit
#  If not available and PAMUID used by other user --> exit
#  If not available and PAMUID free --> create user 'pam' as a
#  member of group 'informix'

awk -F: "BEGIN { i = 1 }
   \$1 == \"pam\" && \$4 == $myINFGID { print \$3 > \"/tmp/p_tmp\"; i = 0; exit }
   END { exit i }" /etc/passwd
if test 0 -eq $?
then
   # user pam exists, read uid
   myPAMUID=`cat /tmp/p_tmp`
   echo "User 'pam' exists, uid $myPAMUID"
else
   # user pam not available or has wrong gid
   # if available, exit
   if awk -F: "BEGIN { i = 1 }
      \$1 == \"pam\" { i = 0; exit }
      END { exit i }" /etc/passwd
   then
      echo "Available user 'pam' is not of group 'informix'"
      exit $ID_WRONG
   fi
```

```
   # not available, create if PAMUID free, otherwise exit
   if awk -F: "BEGIN { i = 1 }
      \$3 == $PAMUID { i = 0; exit }
      END { exit i }" /etc/passwd
   then
      # PAMUID used by other user, exit
      echo "uid $PAMUID is used by a user other than 'pam'"
      exit $ID_USED
   else
      # PAMUID free, create user pam
      sed "\$a\\
pam::$PAMUID:$myINFGID::/usr/pam:" /etc/passwd > /tmp/p_tmp
      cp /tmp/p_tmp /etc/passwd

      # add user pam to group informix
      sed '/^informix::/s/$/,pam/
                        s/:,/:/' /etc/group > /tmp/p_tmp
      cp /tmp/p_tmp /etc/group
      echo "User 'pam' created, using uid $PAMUID"
      myPAMUID=$PAMUID
   fi
fi


#  Remove existing mapping for pam in /etc/dsamap

sed "/^u:...:$myPAMUID/d
     /^g:$myINFGID:$myINFGID/d" /etc/dsamap > /tmp/p_tmp

#  Add mapping for pam in /etc/dsamap

sed "/^:.*:/a\\
u:$PAMUID:$myPAMUID\\
g:$myINFGID:$myINFGID" /tmp/p_tmp > /etc/dsamap

echo "'/etc/dsamap' modified"


#  Add pam line to /etc/inittab (remove existing line)

sed '/^pa/d
   $a\
pa:2:off:/usr/pam/start_pam all </dev/null 1>/dev/null 2>&1' \
   /etc/inittab > /tmp/p_tmp
cp /tmp/p_tmp /etc/inittab

echo "pam line added to /etc/inittab"

fi  # initial installation



#  Only if there is something to install (i.e. not installed yet)
if test -d /usr/installpam/pam
then

   #  Chance dir to install-directory
   cd /usr/installpam

   #  Modify owner and group settings
   chown pam *; chgrp informix *
   for i in `find /usr/installpam -type d -print`
   do
      chown pam $i/*
      chgrp informix $i/*
   done
   echo "Owner and group settings of pam install-directory modified"

   # Save existing pam database
   if test -d /usr/pam/db
   then
      /etc/mvdir /usr/pam/db /usr/pamdb
   fi

   # Save version info file
   if test -f /usr/pam/pam_version
   then
      mv /usr/pam/pam_version /tmp/pam_version
   fi

   # Remove existing pam tree
   rm -rf /usr/pam
   echo "Existing pam tree removed"

   # Move Install directory (pam part) to /usr/pam
```

```
    /etc/mvdir /usr/installpam/pam /usr/pam
    echo "Install-directory moved to pam-directory"

    # Move back saved pam database
    if test -d /usr/pamdb
    then
       /etc/mvdir /usr/pamdb /usr/pam/db
    fi

    # Move back version info file
    if test -f /tmp/pam_version
    then
       mv /tmp/pam_version /usr/pam/pam_version
    fi

fi  # end "if something to install "


#  Create/update pam database directory
if test -d /usr/pam/db
then
   mv /usr/installpam/db/* /usr/pam/db
else
   /etc/mvdir /usr/installpam/db /usr/pam/db
fi

chown pam /usr/pam/db/*
chgrp informix /usr/pam/db/*


#  Create .profile for user pam

echo '# @(#).profile    1.1
# Prototype .profile: read on login to "sh"
echo "Hello, $LOGNAME."
PS1="$LOGNAME: "
# Set up EXINIT (used by vi)
EXINIT="set redraw"
export EXINIT
INFORMIXDIR=/usr/informix
export INFORMIXDIR
PATH=$PATH:$INFORMIXDIR/bin:/usr/pam/bin
export PATH
DBPATH=/usr/pam/db
export DBPATH
PAMDIR=/usr/pam
export PAMDIR

case `tty` in
/dev/vt100)       GTERM=foxvt100;
                  TERM=foxvt100;;
/dev/console?)    GTERM=vt100;
                  TERM=vt100;;
/dev/ptty?)       GTERM=vt100;
                  TERM=vt100;;
esac

' > /usr/pam/.profile
chown pam /usr/pam/.profile; chgrp informix /usr/pam/.profile
echo ".profile for user 'pam' created"


#  Create database
#  if this is an initial installation
if test ! -f /usr/pam/pam_version
then
   su - pam <<!
   cd db
   pam_db.ini
   evnt_def.ini
   fmt_def.ini
   dev_conf.ini
!
fi  # this is an initial installation

su - pam <<!
   cd db

   # Remove comment from form specification
   grep -v '^#' pam_conf.per > pam_conf.tmp
   mv pam_conf.tmp pam_conf.per

   # Compile form specification
   sformbld pam_conf
```

```
   # Compile report specifications
   for i in *.ace
   do
      saceprep \`basename \$i .ace\`
   done
!

# ranlib libraries
ranlib /usr/lib/libpam.a


#  If this is a version update with changed database(s),
#
#  if only the database release-LEVEL has changed (e.g. 1.1 --> 1.2)
#     run database update script (name is stored in $PAM_UPD_DB)
#
#  if the database RELEASE has changed (e.g. 1.1 --> 2.1)
#     1. unload tables and save subdirectories under the database
#        directories which do not belong to the informix databases
#     2. drop pam database
#     3. copy new init-scripts to /usr/pam/db
#     4. re-create pam database
#     5. load tables
#     6. re-install subdirectories saved (see point 1)

if test -f /usr/pam/pam_version
then
if awk -F: "BEGIN { i = 1 }
   (\$2 != $DB_VERSION) { i = 0; print \$2; exit}
   END { exit i}" /usr/pam/pam_version > /tmp/p_tmp

then

   DB_REL=`echo $DB_VERSION | awk -F. '{ print $1 }'`
   PREV_DB_REL=`awk -F. '{ print $1 }' /tmp/bp_tmp`

   if [ $DB_REL = $PREV_DB_REL ]
   then
      # only database LEVEL has changed, run update script
      $PAM_UPD_DB

   else
      # database release has changed, re-install PAM database

      # save 'non-informix' parts of the database
      mkdir /usr/pam/dbpam; chmod +w /usr/pam/dbpam

      cd /usr/pam/db/pam.dbs
      for i in `ls -p | sed -n '/.*\/$/p'`
      do
         /etc/mvdir $i /usr/pam/dbpam/$i
      done

      # unload tables

      echo 'database pam end
      output
         top margin 0
         bottom margin 0
         left margin 0
         report to "/usr/pam/dbpam/pam_rep"
      end

      select tabname from systables
         where tabname not matches "sys*"
      end

      format
         on every row
            print tabname
      end
      ' > /tmp/p_rep.ace

      su - pam <<!
         saceprep -o /tmp /tmp/p_rep
         sacego -q /tmp/p_rep      # list of pam database tables
!


      su - pam <<!
         cd db
         (echo database pam\; ;
         for i in \`cat /usr/pam/dbpam/pam_rep\`
         do
            echo unload to \"/usr/pam/dbpam/\$i.unl\" select \* from \$i\;
         done
         echo drop database pam) | isql - -
```

```
!

        # install and run new database scripts

        cp /usr/installpam/db/* /usr/pam/db
        chown pam /usr/pam/db/*
        chgrp informix /usr/pam/db/*

        rm /usr/pam/db/pam_conf.frm

        su - pam <<!
           cd db
           pam_db.ini
           evnt_def.ini
           fmt_def.ini
           dev_conf.ini

           sformbld pam_conf

           for i in *.ace
           do
              saceprep \`basename \$i .ace\`
           done
!

        # fill the database with their previous contents

        cd /usr/pam/dbpam
        for i in `ls -p | sed -n '/.*\/$/p'`
        do
           /etc/mvdir $i /usr/pam/db/pam.dbs/$i
        done


        # load tables

        su - pam <<!
           (echo database pam\; ;
           for i in \`cat /usr/pam/dbpam/pam_rep\`
           do
              echo load from \"/usr/pam/dbpam/\$i.unl\" insert into \$i\;
           done) | isql - -
!

    fi
fi  # database release or level changed
fi  # version file exists


# create/update version file
echo "$PAM_VERSION:$DB_VERSION" > /usr/pam/pam_version
chown pam /usr/pam/pam_version
chgrp informix /usr/pam/pam_version

#  Execute special initialization script if required

if test $PAM_SPECIAL
then
   $PAM_SPECIAL
fi


#  Clean up

cd /
rm -rf /usr/pam/dbpam /usr/installpam /tmp/p_tmp

# Make /dev/err_rpt writable

chmod +w /dev/err_rpt


#
#  SCCS-ID:      @(#)selc        1.2  8/17/89
#
#  Title:        PAth Management selection criteria script
#
#  Description:  It reads the selection criteria configuration file
#                and creates two C header files, one of
#                these files contains a constant define
#                for the number of selection criteria and the other
#                contains the selection criteria specification table.
#
#  Parameters:   1. PAMDIR directory
```

```
#                   Specifies the base path. If not specified,
#                   "/usr/pam" is assumed.
#
#  Preconditions:
#                 1. Directory PAMDIR/header already exists.
#
#                 2. The copas selection criteria configuration file has
#                    been installed in PAMDIR/db/copassel.cnf.
#
# History:
#        07 NOV 88, AAM, Created
#

PAMDIR=$1
PAMDIR=${PAMDIR:=/usr/pam}

awk '
BEGIN  { printf "SC_SPEC sc_specs[MAX_SC] =\n\t\t\t{" > "/tmp/atmp"
         nsc = 0 }
{
   if( NF != 0 )
   {
      if( NR != 1 )
         printf "," > "/tmp/atmp"
      printf "\n\t\t\t\t{ \"" $1 "\",\t" $(NF-1) " }" > "/tmp/atmp"
      ++nsc
   }
}
END    { printf "\n\t\t\t};\n" > "/tmp/atmp"
         printf "#define MAX_SC " nsc "\n" > "/tmp/btmp" }' $PAMDIR/db/copassel.cnf

mv /tmp/atmp $PAMDIR/header/seltab.h
mv /tmp/btmp $PAMDIR/header/seldef.h

#-----------------------------------------------------------------------
#  @(#)start_pam        1.2  I/A Series, Foxboro Company  89/08/17
#-----------------------------------------------------------------------
#
# Start script for PAM servers
#
# History:
#        03 JAN 89, JvB: Created.
#        04 JAN 89, JvB: Added nohup
#

HOST=`uname -n`
PCK_ID=PAM_1

case $# in
0)
cat <<!
Usage: $0, displays this message
       $0 [ees] [pirs] [chsrv] [selsrv] [els],
              starts selection of PAM servers
       $0 all, starts all PAM servers

PAM servers are started on host $HOST with
the PAM database $PAMDIR/db/pam.dbs .

!
exit 0
;;
1)  case $1 in
    all) set - ees pirs chsrv selsrv els
    esac
esac

for i in $*
do
case $i in
ees)
        nohup $PAMDIR/bin/ees $PAMDIR/db/pam.dbs >/dev/null 2>&1 &
        ;;
pirs)
        nohup $PAMDIR/bin/pirs $PAMDIR/db/pam.dbs >/dev/null 2>&1 &
        ;;
chsrv)
        nohup $PAMDIR/bin/chsrv $PAMDIR/db/pam.dbs >/dev/null 2>&1 &
        ;;
selsrv)
        nohup $PAMDIR/bin/selsrv $PAMDIR/db/pam.dbs $PAMDIR/bin >/dev/null 2>&1 &
        ;;
els)
        nohup $PAMDIR/bin/els $PAMDIR/db/pam.dbs $PCK_ID >/dev/null 2>&1 &
        ;;
```

```
*)
        echo $0: Bad argument, program terminates ; exit 1
esac
done


#-----------------------------------------------------------------------
#  @(#)stop_pam 1.2  I/A Series, Foxboro Company  89/08/17
#-----------------------------------------------------------------------
#
# Stop script for PAM servers
#
# History:
#       03 JAN 89, JvB: Created.
#

case $# in
0)
cat <<!
Usage: $0, displays this message
       $0 [ees] [pirs] [chsrv] [selsrv] [els],
                 stops selection of PAM servers
       $0 all, stops all PAM servers

The PAM servers are stopped by executing a kill -16 .

!
exit 0
;;
1)  case $1 in
    all) set - ees pirs chsrv selsrv els
    esac
esac

for i in $*
do
case $i in
ees)
        kill -16 `ps -e | awk '/ ees$/ {printf "%d", $1}'`
        ;;
pirs)
        kill -16 `ps -e | awk '/ pirs$/ {printf "%d", $1}'`
        ;;
chsrv)
        kill -16 `ps -e | awk '/ chsrv$/ {printf "%d", $1}'`
        ;;
selsrv)
        kill -16 `ps -e | awk '/ selsrv$/ {printf "%d", $1}'`
        ;;
els)
        kill -16 `ps -e | awk '/ els$/ {printf "%d", $1}'`
        ;;
*)
        echo $0: Bad argument, program terminates ; exit 2
esac
done


#***********************************************************************
#  @(#)pac.mk   1.3  I/A Series  Foxboro Company  89/08/17
#***********************************************************************
#                                                                      *
#  Copyright by the Foxboro Company 1988                               *
#                                                                      *
#  All rights reserved Foxboro Company 1988                            *
#                                                                      *
#*$0********************************************************************
#                                                                      *
#  FILE NAME          : pac.mk                                         *
#                                                                      *
#  PART NUMBER        :                                                *
#                                                                      *
#  FUNCTION           : Makefile for PAM Path controller Unix version  *
#                                                                      *
#  COMPONENT HISTORY  :                                                *
#  -------------------------------------------------------------------- *
#  2 Nov 1988 - WC - Creation                                          *
#  8 Nov 1988 - WC - PAM error reporter integrated                     *
#  7 Dec 1988 - RD - Loaded with -i to get more memory for paths       *
#  7 Dec 1988 - RD - Loaded with -z to save memory                     *
# 14 Jul 1989 - RD - Removed cm_pac from makefile                      *
#  2 Aug 1989 - RD - Integrated debug version of makefile              *
# 11 Aug 1989 - RD - Link CL                                           *
#                                                                      *
#***********************************************************************
```

```
PREFIX  =       /usr/pam

HDRDIR  =       $(PREFIX)/header

BINDIR  =       $(PREFIX)/bin

LIBDIR  =       $(PREFIX)/lib

OBJDIR  =       $(PREFIX)/pac/obj

SRCDIR  =       $(PREFIX)/pac/source

LIBPAM  =       $(LIBDIR)/libpam.a

LIBCOM  =       -lcom

HEADERS =       $(HDRDIR)/pam_gen.h \
                $(HDRDIR)/pam_err.h \
                $(HDRDIR)/pam_msg.h \
                $(HDRDIR)/pam_rpt.h \
                $(HDRDIR)/pam_log.h \
                $(HDRDIR)/pac.h

OBJECTS =       $(OBJDIR)/pac_main.o\
                $(OBJDIR)/pac_com.o\
                $(OBJDIR)/pac_cmd.o\
                $(OBJDIR)/pac_cfg.o\
                $(OBJDIR)/pac_db.o\
                $(OBJDIR)/pac_pat.o

PACTST  =

TARGET  =       $(BINDIR)/pac

CFLAGS  =       -I$(HDRDIR) -c

LFLAGS  =       -i -z


$(TARGET):      $(OBJECTS) $(PACTST) $(LIBPAM)
                cc $(LFLAGS) $(OBJECTS) $(PACTST) $(LIBPAM) $(LIBCOM) \
                        -lfox -o $(TARGET)

debug:
                $(MAKE) -f $(PREFIX)/pac/make/pac.mk \
                        PREFIX=$(PREFIX) PACTST=$(OBJDIR)/pac_tst.o \
                        CFLAGS="-I$(HDRDIR) -DDEBUG -DTESTING -c"

test:
                $(MAKE) -f $(PREFIX)/pac/make/pac.mk \
                        PREFIX=$(PREFIX) CFLAGS="-I$(HDRDIR) -DTESTING -c"

$(OBJDIR)/pac_main.o:   $(SRCDIR)/pac_main.c $(HEADERS)
                cc $(CFLAGS) $(SRCDIR)/pac_main.c
                mv pac_main.o $(OBJDIR)

$(OBJDIR)/pac_com.o:    $(SRCDIR)/pac_com.c $(HEADERS)
                cc $(CFLAGS) $(SRCDIR)/pac_com.c
                mv pac_com.o $(OBJDIR)

$(OBJDIR)/pac_cmd.o:    $(SRCDIR)/pac_cmd.c $(HEADERS)
                cc $(CFLAGS) $(SRCDIR)/pac_cmd.c
                mv pac_cmd.o $(OBJDIR)

$(OBJDIR)/pac_cfg.o:    $(SRCDIR)/pac_cfg.c $(HEADERS)
                cc $(CFLAGS) $(SRCDIR)/pac_cfg.c
                mv pac_cfg.o $(OBJDIR)

$(OBJDIR)/pac_db.o:     $(SRCDIR)/pac_db.c $(HEADERS)
                cc $(CFLAGS) $(SRCDIR)/pac_db.c
                mv pac_db.o $(OBJDIR)

$(OBJDIR)/pac_pat.o:    $(SRCDIR)/pac_pat.c $(HEADERS)
                cc $(CFLAGS) $(SRCDIR)/pac_pat.c
                mv pac_pat.o $(OBJDIR)

$(OBJDIR)/pac_tst.o:    $(SRCDIR)/pac_tst.c $(HEADERS)
                cc $(CFLAGS) $(SRCDIR)/pac_tst.c
                mv pac_tst.o $(OBJDIR)

/************************************************************************
*  @(#)pac_cfg.c        1.3  New System, Foxboro Co.  8/17/89
*************************************************************************
*
*  (C)Copyright by Foxboro Company  1988
```

```
*
* All rights reserved:  Foxboro Company  1988
*
*************************************************************************
*
* FILE ID             : PAC_CFG.C
*
* PART NUMBER         :
*
* FUNCTION            : PAM Path Controller Database configuration functions
*
* FUNCTIONS CONTAINED :
*    PPcfg          process database configuration message
*    PPpath_cfg     process path definition
*    PPeqe_cfg      process equipment alarm var definition
*    PPpat_cfg      process pattern definition
*    PPst_cfg       process step (par_value) definition
*    PPend_cfg      process end of cfg statement
*    PPsync_scan    Scan sync rule for name, relation and constant
*
* DATA STRUCTURES     :
*
* COMPONENT HISTORY   : Dec 16, 1988 NVS PPst_cfg modified to accept symbolic
*                                 values for act var type
*
*************************************************************************/

static char SCCS_ID[] = "@(#)pac_cfg.c  1.3\t(89/08/17)";

#include "pac.h"

/*FF*/
/************************************************************************
*
* (C) Copyright by Foxboro Company 1988
*
* All rights reserved: Foxboro Company 1988
*
*************************************************************************
*
* NAME                : PPcfg
*
* FUNCTION            : Process a database configuration message
*
* INPUT PARAMETERS    : - message argument count
*                       - message argument vector
*
* IN/OUT PARAMETERS   : - system pointer to list of path databases
*                       - event database
*
* OUTPUT PARAMETERS   : none
*
* RETURN CODES        : none
*
* SYNOPSIS            : PPcfg(&db, ev, argc, argv, msg)
*
* PRECONDITIONS       : none
*
* ERRORS/EXCEPTIONS   :
*       - message is not complete
*       - PAC is already configured (P_INV_PATH_NAME)
*       - keyword not recognized    (P_FORMAT_ERROR)
*       - memory allocation errors  (P_MALLOC)
*       the error code is passed as a part of the message reply
*
* FUNCTIONS CALLED    : - PPpath_cfg
*                       - PPeqe_cfg
*                       - PPpat_cfg
*                       - PPst_cfg
*                       - PPend_cfg
*                       - PPf_pth
*                       - PPa_pth
*                       - PPd_pth
*                       - PPerr_rpt
*                       - PPreply
*                       - PPmsg_scan
*                       - PPlookup
*                       - PPexit
*
* DETAILED DESIGN     :
*    Check number of arguments
*    If not enough then log error on PAM error reporter
*    Search for specified path name
*    If not found then
*      create new path database
```

```
*   else
*     Verify that path configuration state is CFG_IN_PROGRESS
*   if no errors found then error code = P_IN_PROGRESS
*   reply using error code
*   if errors found then return
*   repeat till end of message or configuration completed or error
*     get line from message
*     lookup keyword in cfg_tbl
*     if found invoke associated handler
*        pass remaining data of msg line
*   if configuration completed send PAN_OK reply
*   if error occured then
*     send error reply
*     delete path database
*
* REMARKS             :
*
* COMPONENT HISTORY   : 15 Sep 88 WC initial setup
*                       07 Feb 89 RD always send a second message after
*                                    after the P_IN_PROGRESS message.
*
****************************************************************/

typedef struct
        {
        char *key;
        int (*func)();
        } disp_s_tbl;


void PPcfg(p_ppdb, ev, argc, argv, msg)
PATH_DB **p_ppdb;
EVENT_DESC *ev;
int argc;
char *argv[];
char *msg;
        {
        static disp_s_tbl cfg_tbl[] = {
                "PATH", PPpath_cfg,
                "EA",   PPeqe_cfg,
                "PAT",  PPpat_cfg,
                "STEP", PPst_cfg,
                "END",  PPend_cfg,
                ""};

        PATH_DB *ppdb = *p_ppdb;
        RPY_DEST *reply_dest = &ev->data.msg.reply_dest;
        int err = P_IN_PROGRESS;
        disp_s_tbl *cfg_ptr;

/* check if all parameters are there */

        if (argc < 1)
                err = P_FORMAT_ERROR;

/* search for path using path name, if path does not yet exist then create it */

        else if(argv[0][0] == NULLC)
                err = P_FORMAT_ERROR;

        else if((ppdb = PPf_pth(ppdb, argv[0])) == NULLP(PATH_DB) &&
                        (ppdb = PPa_pth(p_ppdb, argv[0], ev)) == NULLP(PATH_DB))
                        {
                        PPerr_rpt(PAN, PE_FATAL_ERROR, ev->cmd_apname, "MALLOC");
                        err = P_FATAL_ERROR;
                        }

/* check if database was not configured before */

        else if (ppdb->cfg_state == CFG_DONE)
                err = P_INV_PATH_NAME;

/* tell msg originator what happened sofar */

        PPreply(ev, reply_dest, MSG_REF, O_PAC_LOAD, err, "");

/* Stop here in case of error */

        if (err != P_IN_PROGRESS)
                return;

/* process configuration message */

        err = PAN_OK;
        while ((msg = PPmsg_scan(msg, argv, &argc, ';')) != NULLP(char))
```

```
                {
                if (argc < 1)
                        {
                        err = P_FORMAT_ERROR;
                        break;
                        }

                cfg_ptr = cfg_tbl;
                while (1)
                        {
                        if (cfg_ptr->key[0] == NULLC)
                                {
                                err = P_FORMAT_ERROR;
                                break;
                                }

                        if (strcmp(cfg_ptr->key, argv[0]) == 0)
                                {
                                err = (*cfg_ptr->func)(ppdb, ev, argc - 1, &argv[1]);
                                break;
                                }

                        cfg_ptr++;
                        }

                if (err != PAN_OK || ppdb->cfg_state == CFG_DONE)
                        break;
                }

        if (err == P_MALLOC)
                {
                PPerr_rpt(PAN, PE_FATAL_ERROR, ev->cmd_apname, "MALLOC");
                err = P_FATAL_ERROR;
                }

/* Commented out because of protocol problem with SELSRV (RD)
        if (err != PAN_OK || ppdb->cfg_state == CFG_DONE)
*/
                PPreply(ev, reply_dest, MSG_REF, O_PAC_LOAD, err, "");

        if (err != PAN_OK)
                PPd_pth(p_ppdb, ev, ppdb);
        }

/*FF*/
/*****************************************************************
*
* (C) Copyright by Foxboro Company 1988
*
* All rights reserved: Foxboro Company 1988
*
******************************************************************
*
* NAME                  : PPpath_cfg
*
* FUNCTION              : Process PATH keyword
*
* INPUT PARAMETERS      : - argument count
*                         - argument vector
*
* IN/OUT PARAMETERS     : - path database
*                         - event database
*
* OUTPUT PARAMETERS     : none
*
* RETURN CODES          : - PAN_OK
*                         - P_FORMAT_ERROR
*
* SYNOPSIS              : PPpath_cfg(&pathdb, &eventdb, argc, argv)
*
* PRECONDITIONS         : none
*
* ERRORS/EXCEPTIONS     :
*       - message is not complete     (P_FORMAT_ERROR)
*       - auto_failsafe not Y or N    (P_FORMAT_ERROR)
*       - operation mode not M or A   (P_FORMAT_ERROR)
*
* FUNCTIONS CALLED      : - PPmnemtov
*
* DETAILED DESIGN       :
*   Check number of arguments
*   copy path owner from argv to path db
*   copy path alarm var from argv to path db
*   check operation mode for A or M
*   update path db with operation mode
```

```
*   check auto_failsafe for Y or N
*   update path db with auto failsafe
*   copy name of fail pattern from argv to path db
*   copy name of init pattern from argv to path db
*   copy path environment from argv to path db
*   copy name of exception procedure from argv to path db
*   copy type of exception procedure from argv to path db
*
* REMARKS              :
*
* COMPONENT HISTORY    : 15 Sep 88 WC initial setup
*                        04 Jan 89 RD added pep_type in message
*
*******************************************************************/

int PPpath_cfg(ppdb, ev, argc, argv)
PATH_DB *ppdb;
EVENT_DESC *ev;
int argc;

char *argv[];
        {
        int mode;
        int fs;
        int err;

/* check if all parameters are there */

        if (argc < 9)
                return P_FORMAT_ERROR;

/* get owner */

        strncpy(ppdb->owner, argv[0], OWNER_NAME_SIZE);

/* get name of path alarm variable */

        strncpy(ppdb->path_alrm, argv[1], VAR_NAME_SIZE);

/* get default pattern operation mode */

        if (argv[2][0] != NULLC)
                {
                mode = PPmnemtov(PPDmode, argv[2]);
                if (mode == -1)
                        return P_FORMAT_ERROR;
                else
                        ppdb->default_pat_mode = mode;
                }

/* get auto failsafe switch */

        if (argv[3][0] != NULLC)
                {
                fs = PPmnemtov(PPDfailsafe, argv[3]);
                if (fs == -1)
                        return P_FORMAT_ERROR;
                else
                        ppdb->auto_failsafe = fs;
                }

/* get name of fail pattern */

        strncpy(ppdb->name_fail_pat, argv[4], PATTERN_NAME_SIZE);

/* get name of initialization pattern */

        strncpy(ppdb->name_init_pat, argv[5], PATTERN_NAME_SIZE);

/* get environment */

        strncpy(ppdb->environment, argv[8], ENV_SIZE);

/* get exception procedure */

        switch (argv[6][0])
                {
        case C_HLBL_EXCEP:
                ppdb->excep_proc.type = D_HLBL_EXCEP;
                err = PPat_name(ppdb->mem_blk, ppdb->sort_blk, argv[7],
                        &ppdb->excep_proc.name);
                if (err != PAN_OK)
                        return err;
                break;
```

```
        case C_NO_EXCEP:
        case NULLC:
                ppdb->excep_proc.type = D_NO_EXCEP;
                break;

        default:
                return P_FORMAT_ERROR;
                }

        return PAM_OK;
        }

/*FF*/
/*****************************************************************
*
* (C) Copyright by Foxboro Company 1988
*
* All rights reserved: Foxboro Company 1988
*
******************************************************************
*
* NAME                : PPeqe_cfg
*
* FUNCTION            : Add equipment alarm variable to path database
*
* INPUT PARAMETERS    : - argument count
*                       - argument vector
*
* IN/OUT PARAMETERS   : - path database
*                       - event database
*
* OUTPUT PARAMETERS   : none
*
* RETURN CODES        : - PAM_OK
*                       - P_FORMAT_ERROR
*                       - P_FATAL_ERROR
*
* SYNOPSIS            : PPeqe_cfg(&pathdb, &eventdb, argc, argv)
*
* PRECONDITIONS       : none
*
* ERRORS/EXCEPTIONS   :
*       - message is not complete    (P_FORMAT_ERROR)
*       - EQE keyword follows PAT    (P_FORMAT_ERROR)
*       - memory allocation problems (P_MALLOC)
*
* FUNCTIONS CALLED    : - PPa_alrm
*
* DETAILED DESIGN     :
*   Check number of arguments
*   Add alarm var to database
*
* REMARKS             :
*
* COMPONENT HISTORY   : 15 Sep 88 WC initial setup
*
*****************************************************************/

int PPeqe_cfg(ppdb, ev, argc, argv)
PATH_DB *ppdb;
EVENT_DESC *ev;
int argc;
char *argv[];
        {
        if (argc < 1)
                return P_FORMAT_ERROR;

        if (ppdb->cfg_av_done != 0)
                return P_FORMAT_ERROR;

        if (PPa_alrm(ppdb, argv[0]) == NULLP(ALRM_DESC))
                return P_MALLOC;

        return PAM_OK;
        }

/*FF*/
/*****************************************************************
*
* (C) Copyright by Foxboro Company 1988
*
* All rights reserved: Foxboro Company 1988
*
******************************************************************
*
```

```
* NAME                  : PPpat_cfg
*
* FUNCTION              : Process PAT keyword
*
* INPUT PARAMETERS      : - argument count
*                         - argument vector
*
* IN/OUT PARAMETERS     : - path database
*                         - event database
*
* OUTPUT PARAMETERS     : none
*
* RETURN CODES          : - PAN_OK
*                         - P_FORMAT_ERROR
*                         - P_FATAL_ERROR
*
* SYNOPSIS              : PPpat_cfg(&pathdb, &eventdb, argc, argv)
*
* PRECONDITIONS         : none
*
* ERRORS/EXCEPTIONS     :
*      - message is not complete     (P_FORMAT_ERROR)
*      - memory allocation problems (P_FATAL_ERROR)
*
* FUNCTIONS CALLED      : - PPa_pat
*                         - PPbld_alrm
*
* DETAILED DESIGN       :
*    Check number of arguments
*    if first time PAT keyword
*       create OM alarm lists and refresh name and name sort tables
*    Add pattern to path database
*
* REMARKS               :
*
* COMPONENT HISTORY     : 15 Sep 88 WC initial setup
*
*****************************************************************/

int PPpat_cfg(ppdb, ev, argc, argv)
PATH_DB *ppdb;
EVENT_DESC *ev;
int argc;
char *argv[];
        {
        int err;

        if (argc < 1)
                return P_FORMAT_ERROR;

/* if first time create OM list for alarm variables */

        if (ppdb->cfg_av_done == 0)
                {
                err = PPbld_alrm(ppdb, ev);
                if (err  != PAN_OK)
                        return err;

                ppdb->cfg_av_done = 1;
                }

/* add pattern to path database */

        return PPa_pat(ppdb, argv[0]);
        }

/*FF*/
/*****************************************************************
*
* (C) Copyright by Foxboro Company 1988
*
* All rights reserved: Foxboro Company 1988
*
******************************************************************
*
* NAME                  : PPst_cfg
*
* FUNCTION              : Process STEP keyword
*
* INPUT PARAMETERS      : - argument count
*                         - argument vector
*
* IN/OUT PARAMETERS     : - path database
*                         - event database
*
* OUTPUT PARAMETERS     : none
```

```
 *
 * RETURN CODES       : - PAN_OK
 *                      - P_FORMAT_ERROR
 *                      - P_FATAL_ERROR
 *
 * SYNOPSIS           : PPst_cfg(&pathdb, &eventdb, argc, argv)
 *
 * PRECONDITIONS      : none
 *
 * ERRORS/EXCEPTIONS  :
 *      - message is not complete     (P_FORMAT_ERROR)
 *      - memory allocation problems  (P_FATAL_ERROR)
 *      - step already exists         (P_FORMAT_ERROR)
 *
 * FUNCTIONS CALLED   : - PPa_step
 *                      - PPstoval
 *                      - PPsync_scan
 *
 * DETAILED DESIGN    :
 *   Check number of arguments
 *   get step number, check for integer
 *   if name of action var specified
 *     get data type of action var, check for integer
 *     get action value, check using data type
 *   if sync rule specified
 *     get name, relation and value
 *   create step
 *
 * REMARKS            :
 *
 * COMPONENT HISTORY  : Sep 15, 1988 WC  Initial setup
 *                      Dec 16, 1988 MVS Modified to accept symbolic
 *                                       values for act var type
 *
*********************************************************************/

int PPst_cfg(ppdb, ev, argc, argv)
PATH_DB *ppdb;
EVENT_DESC *ev;
int argc;
char *argv[];
        {
        int err;
        int stepno;
        int type;
        UVAL val;
        char *sync_val;
        int sync_rel;

/* check for sufficient number of parameters */

        if (argc < 4)
                return P_FORMAT_ERROR;

/* get step number */

        if (sscanf(argv[0], "%d", &stepno) != 1)
                return P_FORMAT_ERROR;

        if (argv[2][0] == NULLC)        /* action specified? */
                argv[2] = NULLP(char);

        else
                {
/* get data type of action variable */

                type = PPmnemtov(PPDvartype, argv[1]);
                if (type == -1)
                        return P_FORMAT_ERROR;

/* get value of var */

                if (PPstoval(argv[3], type, &val) != PAN_OK)
                        return P_FORMAT_ERROR;
                }

/* get sync rule data */

        if (argc < 5 || argv[4][0] == NULLC)
                argv[4] = NULLP(char);

        else
                {
                err = PPsync_scan(argv[4], &sync_rel, &sync_val);
                if (err != PAN_OK)
                        return err;
                }
```

```
/* create step */

        err = PPa_step(ppdb, stepno, type,
                argv[2], val, argv[4], sync_val, sync_rel);

        return err;
        }

/*FF*/
/*****************************************************************
*
* (C) Copyright by Foxboro Company 1988
*
* All rights reserved: Foxboro Company 1988
*
******************************************************************
*
* NAME                 : PPsync_scan
*
* FUNCTION             : Scan sync rule for var name, relation and constant
*
* INPUT PARAMETERS     : sync rule in string format
*
* OUTPUT PARAMETERS    : - name of sync variable
*                        - relation sync rule
*                        - constant for sync rule in string format
*
* RETURN CODES         : - PAN_OK
*                        - P_FORMAT_ERROR
*
* SYNOPSIS             : err = PPsync_scan(str, &rel, &var)
*
* PRECONDITIONS        : none
*
* ERRORS/EXCEPTIONS    : relation token not found
*
* FUNCTIONS CALLED     : none
*
* DETAILED DESIGN      :
*   search for occurence of relation token in string
*     using table PPDrelation
*   if found
*     replace relation with '\0' to delimit name
*     pass begin of string, index in relation table and
*     pointer to first char after relation to caller
*
* REMARKS              :
*
* COMPONENT HISTORY    : 15 Sep 88 WC initial setup
*
*****************************************************************/

char *PPstrfind(s1, s2)
char *s1, *s2;
        {
        int l = strlen(s2);
        int n = strlen(s1) - l;

        while (n-- >= 0)
                {
                if (strncmp(s1, s2, l) == 0)
                        return s1;
                s1++;
                }

        return NULLP(char);
        }
int PPsync_scan(str, rel, val)
char *str;
int *rel;
char **val;
        {
        mnem_tbl *rel_tbl;
        char *pos;

        for (rel_tbl = PPDrelation; rel_tbl->val != -1; rel_tbl++)
                {
                pos = PPstrfind(str, rel_tbl->mnem);
                if (pos != NULLP(char))
                        {
                        *rel = rel_tbl->val;
                        *pos = NULLC;
                        *val = pos + strlen(rel_tbl->mnem);
                        return PAN_OK;
                        }
```

```
        }

    return P_FORMAT_ERROR;
    }

/*FF*/
/*****************************************************************
*
* (C) Copyright by Foxboro Company 1988
*
* All rights reserved: Foxboro Company 1988
*
******************************************************************
*
* NAME                 : PPend_cfg
*
* FUNCTION             : process message line with keyword END
*
* INPUT PARAMETERS     : - argument count
*                        - arguament vector
*
* IN/OUT PARAMETERS    : - path database
*                        - event database
*
* OUTPUT PARAMETERS    : none
*
* RETURN CODES         : - PAM_OK
*                        - P_FATAL_ERROR
*
* SYNOPSIS             : PPend_cfg(&pathdb, &eventdb, argc, argv)
*
* PRECONDITIONS        : none
*
* ERRORS/EXCEPTIONS    :
*      - Object manager list for alarm vars cannot be opened
*
* FUNCTIONS CALLED     : PPf_pat
*                        PPfm_mem_blk
*
* DETAILED DESIGN      :
*   set cfg state to CFG_DONE
*   search fail pattern, save ptr in path db
*   search init pattern, save ptr in path db
*   delete name sort chain
*   open Object Manager list for Alarm variables
*
* REMARKS              :
*
* COMPONENT HISTORY    : 15 Sep 88 WC initial setup
*                         8 Dec 88 NVS Delete alrm var tbl in PPend_cfg
*                        01 Aug 89 RRD Do not accept error ENOTFOUND.
*                                      Always close after bad open
*
*****************************************************************/

int PPend_cfg( ppdb, ev, argc, argv )
PATH_DB         *ppdb;
EVENT_DESC      *ev;
int             argc;
char            *argv[];
{
    int         status;
    char        err_str[LINE_LENGTH];

    ppdb->cfg_state = CFG_DONE;
    ppdb->cur_pat   = NULLP( PAT );

/*
 * Search for fail and init pattern.
 */

    ppdb->fail_pat = PPf_pat( ppdb->pat, ppdb->name_fail_pat );
    ppdb->init_pat = PPf_pat( ppdb->pat, ppdb->name_init_pat );

/*
 * Delete name sort tables.
 */

    PPfm_mem_blk( ppdb->sort_blk );
    ppdb->sort_blk = NULLP( MEM_BLK );

/*
 * Delete alarm variable tables.
 */

    PPfm_mem_blk( ppdb->alrm_blk );
    ppdb->alrm_blk = NULLP( MEM_BLK );
```

```
/*
 * Open OM alarm list.
 */

    if ( ppdb->n_eqe_alrms > 0 || ppdb->path_alrm[0] != NULLC )
    {
        status = omopen( &ppdb->alrm_header, &ppdb->om_id_alrm );
#ifdef DEBUG
        printf( "ALRM-OPEN: result = %d, om_id = %d\n", status,
            ppdb->om_id_alrm );
#endif
        if ( status != OM_SUCCESS )
        {
            omclose( ppdb->om_id_alrm, &ppdb->alrm_header,
                ppdb->alrm_header.open_list_ptr, NULLP( struct net_adr ) );
            sprintf( err_str, "Alarm List - %d", status );
            PPerr_rpt( PAN, PE_OMOPEN, ev->cmd_apname, err_str );
            return( P_ALRM_OPEN );
        }

        ppdb->alrm_open = 1;
    }

    return( PAN_OK );
}


/***********************************************************************
 * @(#)pac_cmd.c        1.2  New System, Foxboro Co.  8/17/89
 ***********************************************************************
 *
 * (C)Copyright by Foxboro Company  1988
 *
 * All rights reserved:  Foxboro Company  1988
 *
 ***********************************************************************
 *
 * FILE ID              : PAC_CMD.C
 *
 * PART NUMBER          :
 *
 * FUNCTION             :
 *
 * FUNCTIONS CONTAINED :
 *   PPmsg_proc     Process an incomming IPC message
 *   PPabort        Abort current pattern
 *   PPc_excep      Clear path exception state
 *   PPr_excep      Raise path exception state
 *   PPfree         Abort Path Controller
 *   PPpat          Execute pattern
 *   PPfailsafe     Execute pattern in failsafe mode
 *   PPstep         Execute steps of a pattern in manual
 *   PPg_cpat       Get name and status of current pattern
 *   PPmsg_scan     isolate arguments from a message
 *
 * DATA STRUCTURES      :
 *
 * COMPONENT HISTORY    : Dec 14, 1988 MVS Test for requestor == owner modified
 *                                         in PPpat, PPabort, PPizpat, PPfailsafe
 *                        Dec 15, 1988 MVS PPg_cpat modified to return symbolic
 *                                         values for pat_type and step_state
 *                        Dec 15, 1988 MVS PPfree modified to return symbolic
 *                                         values for pat_type
 *
 ***********************************************************************/

static char SCCS_ID[] = "@(#)pac_cmd.c  1.2\t(89/08/17)";

#include "pac.h"

#define MSG_REF ev->data.msg.buf        /* to keep code readable */

/*FF*/
/**********************************************************************
 *
 * (C) Copyright by Foxboro Company 1988
 *
 * All rights reserved: Foxboro Company 1988
 *
 **********************************************************************
 *
 * NAME                : PPmsg_proc
 *
 * FUNCTION            : Process incomming IPC messages
 *
```

```
 * INPUT PARAMETERS    : none
 *
 * IN/OUT PARAMETERS   : - system pointer to list of path databases
 *                       - event database
 *
 * OUTPUT PARAMETERS   : none
 *
 * RETURN CODES        : none
 *
 * SYNOPSIS            : PPmsg_proc(&pathdb_list, &event_db)
 *
 * PRECONDITIONS       : none
 *
 * ERRORS/EXCEPTIONS   :
 *     - message type is not recognized
 *     - message not complete (not enough arguments)
 *     - other errors are handled by underlaying functions
 *
 * FUNCTIONS CALLED    : See table "cmd_tbl"
 *                       PPmsg_scan
 *                       PPreply
 *
 * DETAILED DESIGN     :
 *    check for sufficient number of msg parameters
 *    check for valid (supported) message type using cmd_table
 *    in case of an error tell PAM error reporter and ignore
 *      the message
 *    else
 *      select handler using cmd_tbl and invoke it with
 *          remainder of first message line in argc and argv
 *          remainder of message
 *          system pointer to list of path databases
 *          event database
 *
 * REMARKS             :
 *
 * COMPONENT HISTORY   : Aug 26 '88 WC initial setup
 *                       Sep 28 '88 WC modified for support of more than 1 path
 *                       Nov 07 '88 WC integrate with PAM err reporter
 ***********************************************************************/

typedef struct
        {
        int key;
        void (*func)();
        } disp_i_tbl;


#ifdef DEBUG
extern void PPinfo();
#endif

        static disp_i_tbl cmd_tbl[] = {
            I_PAC_LOAD,        PPcfg,
            I_PAC_FREE,        PPfree,
            I_ABORT_P,         PPabort,
            I_RP_EXCEPTION,    PPr_excep,
            I_CP_EXCEPTION,    PPc_excep,
            I_PATH,            PPpat,
            I_IZ_PATH,         PPizpat,
            I_FS_PATH,         PPfailsafe,
            I_STEP_P,          PPstep,
            I_GP_STATE,        PPg_cpat,
#ifdef DEBUG
            1,                 PPinfo,    /* debug only */
#endif
            -1
        };


void PPmsg_proc(p_ppdb, ev)
PATH_DB **p_ppdb;
EVENT_DESC *ev;
        {
        int argc;
        char *argv[MSG_MAX_ARG + 1];
        char *msg = ev->data.msg.buf;
        int msg_type;
        disp_i_tbl *cmd_ptr;

/* check for existing message type */

        msg = PPmsg_scan(msg, argv, &argc, ':');
        if (argc < 2 || (msg_type = atoi(argv[1])) == 0)
                {
                PPerr_rpt(PAM, PE_INV_MESSAGE, ev->cmd_apname, "No ref:type: found");
                return;
                }
```

```
/* check for support of message type */

        cmd_ptr = cmd_tbl;
        while(cmd_ptr->key >= 0)
                {
                if (cmd_ptr->key == msg_type)
                        {
                        (*cmd_ptr->func)(p_ppdb, ev, argc-2, &argv[2], msg);
                        return;
                        }

                cmd_ptr++;
                }

        PPerr_rpt(PAM, PE_INV_MESSAGE, ev->cmd_apname, "Invalid msg type");
        return;
        }

/*FF*/
/**********************************************************************
*
* (C) Copyright by Foxboro Company 1988
*
* All rights reserved: Foxboro Company 1988
*
***********************************************************************
*
* NAME                : PPabort
*
* FUNCTION            : Abort execution of current pattern
*
* INPUT PARAMETERS    : - message argument count
*                       - message argument vector
*                       - pointer to first unused field in msg buffer
*
* IN/OUT PARAMETERS   : - system pointer to list of path databases
*                       - event database
*
* OUTPUT PARAMETERS   : none
*
* RETURN CODES        : none
*
* SYNOPSIS            : PPabort(&db_list, &ev, argc, argv, msg)
*
* PRECONDITIONS       : none
*
* ERRORS/EXCEPTIONS   :
*      - message is not complete    (P_FORMAT_ERROR)
*      - path name mismatch
*          or path in configuration (P_INV_PATH_NAME)
*      - requestor not owner path   (P_NOT_OWNER)
*      - no pattern in operation    (P_NO_OPERATION)
*      - pattern cannot be aborted  (P_IN_OPERATION)
*      The error code is passed as part of the message reply
*
* FUNCTIONS CALLED    : - PPreply
*                       - PPstop_pat
*                       - PPf_pth
*
* DETAILED DESIGN     :
*    check number of arguments
*    search for specified path
*    check for valid configuration of path
*    verify that requestor is owner
*    check for pattern in operation
*    if a pattern is in operation then
*      check for failsafe pattern
*    if no errors found
*      error code = PAM_OK
*      stop current pattern
*      log event on PAM event logger
*    send reply using error code
*
* REMARKS             :
*
* COMPONENT HISTORY   :  Aug 26 '88 WC initial setup
*                        Dec 14, 1988 MVS Test for req == owner modified
*
***********************************************************************/

void PPabort(p_ppdb, ev, argc, argv, msg)
PATH_DB **p_ppdb;
EVENT_DESC *ev;
int argc;
char *argv[];
```

```
char *msg;
        {
        PATH_DB *ppdb = *p_ppdb;
        RPY_DEST *reply_dest = &ev->data.msg.reply_dest;
        int err = PAM_OK;

/* verify valid number of arguments */

        if (argc < 2)
                err = P_FORMAT_ERROR;

/* search for path using path name */

        else if ((ppdb = PPf_pth(ppdb, argv[1])) == NULLP(PATH_DB))
                err = P_INV_PATH_NAME;

/* check configuration state */

        else if (ppdb->cfg_state != CFG_DONE)
                err = P_INV_PATH_NAME;

/* verify requestor */

        else if (ppdb->owner[0] != NULLC
                 && strncmp(ppdb->owner, argv[0], OWNER_NAME_SIZE) != 0)
                err = P_NOT_OWNER;

/* check for pattern in operation */

        else if (ppdb->pat_type == NO_PAT)
                err = P_NO_OPERATION;

/* check for failsafe pattern */

        else if (ppdb->pat_type == FAIL_PAT)
                err = P_IN_OPERATION;

/* execute request */

        if (err == PAM_OK)
                {
                PPstop_pat(ppdb, ev, P_ABORTED);

/* log event */

                argv[2] = ppdb->cur_pat->pat_name;
                argv[3] = NULLP(char);                  /* end of list */
                PPlog_pac(ev, E_ABORT_P, ppdb->environment, argv);
                }

/* tell results to sender of command */

        PPreply(ev, reply_dest, MSG_REF, O_ABORT_P, err, "");
        }

/*FF*/
/*****************************************************************
*
* (C) Copyright by Foxboro Company 1988
*
* All rights reserved: Foxboro Company 1988
*
******************************************************************
*
* NAME               : PPc_excep
*
* FUNCTION           : clear Path exception state
*
* INPUT PARAMETERS   : - message argument count
*                      - message argument vector
*                      - pointer to first unused field in msg buffer
*
* IN/OUT PARAMETERS  : - system pointer to list of path databases
*                      - event database
*
* OUTPUT PARAMETERS  : none
*
* RETURN CODES       : none
*
* SYNOPSIS           : PPc_excep(&db_list, &ev, argc, argv, msg)
*
* PRECONDITIONS      : none
*
* ERRORS/EXCEPTIONS  :
*     - message is not complete    (P_FORMAT_ERROR)
*     - path name mismatch
*         or path in configuration (P_INV_PATH_NAME)
```

```
 *
 *      The error code is passed as part of the message reply
 *
 * FUNCTIONS CALLED    : - PPreply
 *                       - PPalrm
 *                       - PPf_pth
 *
 * DETAILED DESIGN     :
 *    check number of arguments
 *    search for specified path
 *    check for valid configuration of path
 *    verify exception state (P_NO_EXCEPTION)
 *    if no error found then
 *      error code = PAM_OK
 *      invoke PPalrm to clear exception
 *    reply error code
 *
 * REMARKS             :
 *
 * COMPONENT HISTORY   : Aug 26 '88 WC initial setup
 *
 ******************************************************************/

void PPc_excep(p_ppdb, ev, argc, argv, msg)
PATH_DB **p_ppdb;
EVENT_DESC *ev;
int argc;
char *argv[];
char *msg;
        {
        PATH_DB *ppdb = *p_ppdb;
        RPY_DEST *reply_dest = &ev->data.msg.reply_dest;
        int err = PAM_OK;

/* verify valid number of arguments */

        if (argc < 2)
                err = P_FORMAT_ERROR;

/* search for path using path name */

        else if ((ppdb = PPf_pth(ppdb, argv[1])) == NULLP(PATH_DB))
                err = P_INV_PATH_NAME;

/* check configuration state */

        else if (ppdb->cfg_state != CFG_DONE)
                err = P_INV_PATH_NAME;

/* verify exception state */

        else if ((ppdb->excep & PATH_EXCEP) == 0)
                err = P_NO_EXCEPTION;


        PPreply(ev, reply_dest, MSG_REF, O_CP_EXCEPTION, err, "");

        if (err == PAM_OK)
                PPalrm(ppdb, ev, CLR_EXCEP, PATH_EXCEP, argv[0]);
        }

/*FF*/
/*****************************************************************
 *
 * (C) Copyright by Foxboro Company 1988
 *
 * All rights reserved: Foxboro Company 1988
 *
 *****************************************************************
 *
 * NAME                : PPr_excep
 *
 * FUNCTION            : raise Path exception
 *
 * INPUT PARAMETERS    : - message argument count
 *                       - message argument vector
 *                       - pointer to first unused field in msg buffer
 *
 * IN/OUT PARAMETERS   : - system pointer to list of path databases
 *                       - event database
 *
 * OUTPUT PARAMETERS   : none
 *
 * RETURN CODES        : none
 *
 * SYNOPSIS            : PPr_excep(&db_list, &ev, argc, argv, msg)
 *
 * PRECONDITIONS       : none
 *
```

```
 * ERRORS/EXCEPTIONS  :
 *      - message is not complete    (P_FORMAT_ERROR)
 *      - path name mismatch
 *          or path in configuration (P_INV_PATH_NAME)
 *      The error code is passed as part of the message reply
 *
 * FUNCTIONS CALLED   : - PPreply
 *                      - PPalrm
 *                      - PPf_pth
 *
 * DETAILED DESIGN    :
 *   check number of arguments
 *   search for specified path
 *   check for valid configuration of path
 *   verify exception state (P_IN_EXCEPTION)
 *   if no error found then
 *     error code = PAM_OK
 *     invoke PPalrm to raise exception
 *   reply error code
 *
 * REMARKS            :
 *
 * COMPONENT HISTORY  : Aug 26 '88 WC initial setup
 *
 *****************************************************************/

void PPr_excep(p_ppdb, ev, argc, argv, msg)
PATH_DB **p_ppdb;
EVENT_DESC *ev;
int argc;
char *argv[];
char *msg;
        {
        PATH_DB *ppdb = *p_ppdb;
        RPY_DEST *reply_dest = &ev->data.msg.reply_dest;
        int err = PAM_OK;

/* verify valid number of arguments */

        if (argc < 2)
                err = P_FORMAT_ERROR;

/* search for path using path name */

        else if ((ppdb = PPf_pth(ppdb, argv[1])) == NULLP(PATH_DB))
                err = P_INV_PATH_NAME;

/* check configuration state */

        else if (ppdb->cfg_state != CFG_DONE)
                err = P_INV_PATH_NAME;

/* verify exception state */

        else if ((ppdb->excep & PATH_EXCEP) != 0)
                err = P_IN_EXCEPTION;

        PPreply(ev, reply_dest, MSG_REF, O_RP_EXCEPTION, err, "");

        if (err == PAM_OK)
                PPalrm(ppdb, ev, SET_EXCEP, PATH_EXCEP, argv[0]);
        }
/*FF*/
/*****************************************************************
 *
 * (C) Copyright by Foxboro Company 1988
 *
 * All rights reserved: Foxboro Company 1988
 *
 *****************************************************************
 *
 * NAME               : PPfree
 *
 * FUNCTION           : Exit path controller
 *
 *
 * INPUT PARAMETERS   : - message argument count
 *                      - message argument vector
 *                      - pointer to first unused field in msg buffer
 *
 * IN/OUT PARAMETERS  : - system pointer to list of path databases
 *                      - event database
 *
 * OUTPUT PARAMETERS  : none
 *
 * RETURN CODES       : none
 *
```

```
* SYNOPSIS            : PPfree(&db_list, &ev, argc, argv, msg)
*
* PRECONDITIONS       : none
*
* ERRORS/EXCEPTIONS   :
*      - message is not complete     (P_FORMAT_ERROR)
*      - path name mismatch          (P_INV_PATH_NAME)
*      The error code is passed as part of the message reply
*
* FUNCTIONS CALLED    : - PPreply
*                       - PPf_pth
*                       - PPd_pth
*                       - PPstop_pat
*                       - PPexit
*
* DETAILED DESIGN     :
*    check number of arguments
*    search for specified path
*    check for valid configuration of path
*    if no path specified and list of path databases empty
*      error code is PAN_OK
*    if no errors found
*      error code is PAN OK
*      if pattern in operation
*        remember name and type of current pattern
*        stop pattern
*      delete path database
*    send reply using
*      - error code
*      - type and name of pattern (if one was active)
*    if error code = PAN_OK and no path databases left
*        exit Path controller
*
* REMARKS             :
*
* COMPONENT HISTORY   : Aug 26 '88 WC initial setup
*                       Dec 16, 1988 MVS Modified to return symbolic value
*                                        for pat_type
*
*****************************************************************/

void PPfree(p_ppdb, ev, argc, argv, msg)
PATH_DB **p_ppdb;
EVENT_DESC *ev;
int argc;
char *argv[];
char *msg;
        {
        PATH_DB *ppdb = *p_ppdb;
        RPY_DEST *reply_dest = &ev->data.msg.reply_dest;
        int err = PAN_OK;
        char rpy_body[LINE_LENGTH];

        strcpy(rpy_body, "::");

/* verify valid number of arguments */

        if (argc < 1)
                err = P_FORMAT_ERROR;

/* allow exit if no path's are configured */

        else if (*p_ppdb != NULLP(PATH_DB) || argv[0][0] !=  NULLC)
                {
/* search for path using path name */

                if ((ppdb = PPf_pth(ppdb, argv[0])) == NULLP(PATH_DB))
                        err = P_INV_PATH_NAME;

/* check for pattern in operation */

                else
                        {
                        if (ppdb->pat_type != NO_PAT)
                                {
                                sprintf(rpy_body, "%s:%s:",
                                   PPvtomnem(PPDpattype, ppdb->pat_type),
                                   ppdb->cur_pat->pat_name);
                                PPstop_pat(ppdb, ev, P_FREED);
                                }
                        else
                                sprintf(rpy_body, "%s::",
                                   PPvtomnem(PPDpattype, ppdb->pat_type));

                        PPd_pth(p_ppdb, ev, ppdb);
                        }
                }
```

```
        PPreply(ev, reply_dest, MSG_REF, O_PAC_FREE, err, rpy_body);

        if (err == PAM_OK && *p_ppdb == NULLP(PATH_DB))
                PPexit(ev);
        }

/*FF*/
/*********************************************************************
*
* (C) Copyright by Foxboro Company 1988
*
* All rights reserved: Foxboro Company 1988
*
**********************************************************************
*
* NAME                : PPpat
*
* FUNCTION            : Execute pattern
*
* INPUT PARAMETERS    : - message argument count
*                       - message argument vector
*                       - pointer to first unused field in msg buffer
*
* IN/OUT PARAMETERS   : - system pointer to list of path databases
*                       - event database
*
* OUTPUT PARAMETERS   : none
*
* RETURN CODES        : none
*
* SYNOPSIS            : PPpat(&db_list, &ev, argc, argv, msg)
*
* PRECONDITIONS       : none
*
* ERRORS/EXCEPTIONS   :
*      - message is not complete     (P_FORMAT_ERROR)
*      - path name mismatch
*          or path in configuration  (P_INV_PATH_NAME)
*      - requestor not owner path    (P_NOT_OWNER)
*      - pattern in operation        (P_IN_OPERATION)
*      - requested pattern not exist (P_INV_PATH_NAME)
*      The error code is passed as part of the message reply
*
* FUNCTIONS CALLED    : - PPreply
*                       - PPstrt_pat
*                       - PPf_pth
*                       - PPf_pat
*
* DETAILED DESIGN     :
*    check number of arguments
*    search for specified path
*    check for valid configuration of path
*    verify requestor is owner
*    verify pattern name
*    check for pattern already in operation
*    if no error found
*      error code = P_IN_PROGRESS
*    send reply using error code
*    if error code is PAM_OK
*      remember reply destination and msg ref
*      start requested pattern
*      log event to PAM event logger
*
* REMARKS             :
*
* COMPONENT HISTORY   :  Aug 26 '88 WC initial setup
*                        Dec 14, 1988 MVS Test for req == owner modified
*
*********************************************************************/

void PPpat(p_ppdb, ev, argc, argv, msg)
PATH_DB **p_ppdb;
EVENT_DESC *ev;
int argc;
char *argv[];
char *msg;
        {
        PATH_DB *ppdb = *p_ppdb;
        PAT *pat;
        RPY_DEST *reply_dest = &ev->data.msg.reply_dest;
        int err = P_IN_PROGRESS;

/* verify valid number of arguments */

        if (argc < 3)
                err = P_FORMAT_ERROR;

/* search for path using path name */
```

```
        else if ((ppdb = PPf_pth(ppdb, argv[1])) == NULLP(PATH_DB))
                err = P_INV_PATH_NAME;

/* check configuration state */

        else if (ppdb->cfg_state != CFG_DONE)
                err = P_INV_PATH_NAME;

/* verify requestor */

        else if (ppdb->owner[0] != NULLC
                 && strncmp(ppdb->owner, argv[0], OWNER_NAME_SIZE) != 0)
                err = P_NOT_OWNER;

/* verify pattern name */

        else if ((pat = PPf_pat(ppdb->pat, argv[2])) == NULLP(PAT))
                err = P_INV_PATTERN;

/* check for pattern in operation */

        else if (ppdb->pat_type != NO_PAT)
                err = P_IN_OPERATION;

/* all preconditions are checked, execute request */

        PPreply(ev, reply_dest, MSG_REF, O_PATH, err, "");

        if (err == P_IN_PROGRESS)
                {
                PPstrt_pat(ppdb, ev, pat, ppdb->default_pat_mode, NORM_PAT, O_PATH);

/* log event */

                argv[3] = NULLP(char);                  /* end of list */
                PPlog_pac(ev, E_PATH, ppdb->environment, argv);
                }
        }
/*FF*/
/*****************************************************************
*
* (C) Copyright by Foxboro Company 1988
*
* All rights reserved: Foxboro Company 1988
*
******************************************************************
*
* NAME                 : PPizpat
*
* FUNCTION             : Execute initialization pattern
*
* INPUT PARAMETERS     : - message argument count
*                        - message argument vector
*                        - pointer to first unused field in msg buffer
*
* IN/OUT PARAMETERS    : - system pointer to list of path databases
*                          event database
*
* OUTPUT PARAMETERS    : none
*
* RETURN CODES         : none
*
* SYNOPSIS             : PPiz_pat(&db_list, &ev, argc, argv, msg)
*
* PRECONDITIONS        : none
*
* ERRORS/EXCEPTIONS    :
*       - message is not complete      (P_FORMAT_ERROR)
*       - path name mismatch
*         or path in configuration     (P_INV_PATH_NAME)
*       - requestor not owner path     (P_NOT_OWNER)
*       - pattern in operation         (P_IN_OPERATION)
*       - init pattern does not exist  (P_NO_INITIALIZE)
*       The error code is passed as part of the message reply
*
* FUNCTIONS CALLED     : - PPreply
*                        - PPstrt_pat
*                        - PPf_pth
*                        - PPf_pat
*
* DETAILED DESIGN      :
*    check number of arguments
*    search for specified path
*    check for valid configuration of path
*    verify requestor is owner
*    verify existence of init pattern
*    check for pattern already in operation
```

```
*   if no error found
*     error code = P_IN_PROGRESS
*   send reply using error code
*   if error code is PAM_OK
*     remember reply destination and msg ref
*     start init pattern
*     log event to PAM event logger
*
* REMARKS              :
*
* COMPONENT HISTORY  :  Aug 26 '88 WC initial setup
*                       Dec 14, 1988 MVS Test for req == owner modified
*
******************************************************************/

void PPizpat(p_ppdb, ev, argc, argv, msg)
PATH_DB **p_ppdb;
EVENT_DESC *ev;
int argc;
char *argv[];
char *msg;
        {
        PATH_DB *ppdb = *p_ppdb;
        RPY_DEST *reply_dest = &ev->data.msg.reply_dest;

        int err = P_IN_PROGRESS;

/* verify valid number of arguments */

        if (argc < 2)
                err = P_FORMAT_ERROR;

/* search for path using path name */

        else if ((ppdb = PPf_pth(ppdb, argv[1])) == NULLP(PATH_DB))
                err = P_INV_PATH_NAME;

/* check configuration state */

        else if (ppdb->cfg_state != CFG_DONE)
                err = P_INV_PATH_NAME;

/* verify requestor */

        else if (ppdb->owner[0] != NULLC
                 && strncmp(ppdb->owner, argv[0], OWNER_NAME_SIZE) != 0)
                err = P_NOT_OWNER;

/* check for existing init pattern */

        else if (ppdb->init_pat == NULLP(PAT))
                err = P_NO_INITIALIZE;

/* check for pattern in operation */

        else if(ppdb->pat_type != NO_PAT)
                err = P_IN_OPERATION;

/* all preconditions are checked, execute request */

        PPreply(ev, reply_dest, MSG_REF, O_IZ_PATH, err, "");

        if (err == P_IN_PROGRESS)
                {
                PPstrt_pat(ppdb, ev, ppdb->init_pat, ppdb->default_pat_mode, INIT_PAT, O_IZ_PATH);
/* log event */

                argv[2] = ppdb->init_pat->pat_name;
                argv[3] = NULLP(char);              /* end of list */
                PPlog_pac(ev, E_INIT_P, ppdb->environment, argv);
                }
        }
/*FF*/
/*****************************************************************
*
* (C) Copyright by Foxboro Company 1988
*
* All rights reserved: Foxboro Company 1988
*
******************************************************************
*
* NAME                 : PPfailsafe
*
* FUNCTION             : Execute failsafe pattern
*
* INPUT PARAMETERS     : - message argument count
*                        - message argument vector
*                        - pointer to first unused field in msg buffer
*
```

```
* IN/OUT PARAMETERS  : - system pointer to list of path databases
*                      - event database
*
* OUTPUT PARAMETERS  : none
*
* RETURN CODES       : none
*
* SYNOPSIS           : PPfs_pat(&db_list, &ev, argc, argv, msg)
*
* PRECONDITIONS      : none
*
* ERRORS/EXCEPTIONS  :
*     - message is not complete       (P_FORMAT_ERROR)
*     - path name mismatch
*       or path in configuration      (P_INV_PATH_NAME)
*     - requestor not owner path      (P_NOT_OWNER)
*     - fail pat already in operation (P_IN_OPERATION)
*     - fail pattern does not exist   (P_NO_FAILSAFE)
*     The error code is passed as part of the message reply
*
* FUNCTIONS CALLED   : - PPreply
*                      - PPstrt_pat
*                      - PPf_pth
*                      - PPf_pat
*
* DETAILED DESIGN    :
*   check number of arguments
*   search for specified path
*   check for valid configuration of path
*   verify requestor is owner
*   verify existence of failsafe pattern
*   check for failsafe pattern already in operation
*   if no error found
*     error code = P_IN_PROGRESS
*     if other pattern in progress
*       stop current pattern
*     start failsafe pattern
*     log event to PAM event logger
*   send reply using error code
*
* REMARKS            :
*
* COMPONENT HISTORY  :  Aug 26 '88 WC initial setup
*                       Nov 10 '88 WC bug fix: local var "pat" deleted
*                       Dec 14, 1988 MVS Test for req == owner modified
*
*****************************************************************/
void PPfailsafe(p_ppdb, ev, argc, argv, msg)
PATH_DB **p_ppdb;
EVENT_DESC *ev;
int argc;
char *argv[];
char *msg;
        {
        PATH_DB *ppdb = *p_ppdb;
        RPY_DEST *reply_dest = &ev->data.msg.reply_dest;
        int err = P_IN_PROGRESS;

/* verify valid number of arguments */

        if (argc < 2)
                err = P_FORMAT_ERROR;

/* search for path using path name */

        else if ((ppdb = PPf_pth(ppdb, argv[1])) == NULLP(PATH_DB))
                err = P_INV_PATH_NAME;

/* check configuration state */

        else if (ppdb->cfg_state != CFG_DONE)
                err = P_INV_PATH_NAME;

/* verify requestor */

        else if (ppdb->owner[0] != NULLC
                 && strncmp(ppdb->owner, argv[0], OWNER_NAME_SIZE) != 0)
                err = P_NOT_OWNER;

/* check existance of fail pattern */

        else if (ppdb->fail_pat == NULLP(PAT))
                err = P_NO_FAILSAFE;

/* check for pattern in operation */

        else if (ppdb->pat_type == FAIL_PAT)
                err = P_IN_OPERATION;
```

```
/* all preconditions are checked, execute request */

        PPreply(ev, reply_dest, MSG_REF, O_FS_PATH, err, "");

        if (err == P_IN_PROGRESS)
                {
                if (ppdb->pat_type != NO_PAT)
                        PPstep_pat(ppdb, ev, P_FAILSAFE);

                PPstrt_pat(ppdb, ev, ppdb->fail_pat, PAC_AUTO, FAIL_PAT, O_FS_PATH);

/* log event */

                argv[2] = ppdb->fail_pat->pat_name;
                argv[3] = NULLP(char);                  /* end of list */
                PPlog_pac(ev, E_FAIL_P, ppdb->environment, argv);
                }
        }

/*FF*/
/**********************************************************************
*
* (C) Copyright by Foxboro Company 1988
*
* All rights reserved: Foxboro Company 1988
*
***********************************************************************
*
* NAME                 : PPstep
*
* FUNCTION             : Execute pattern in manual (single step) mode
*
* INPUT PARAMETERS     : - message argument count
*                        - message argument vector
*                        - pointer to first unused field in msg buffer
*
* IN/OUT PARAMETERS    : - system pointer to list of path databases
*                        - event database
*
* OUTPUT PARAMETERS    : none
*
* RETURN CODES         : none
*
* SYNOPSIS             : PPstep(&db, &ev, argc, argv, msg)
*
* PRECONDITIONS        : none
*
* ERRORS/EXCEPTIONS    :
*     - message is not complete          (P_FORMAT_ERROR)
*     - path name mismatch
*         or path in configuration       (P_INV_PATH_NAME)
*     - no pattern in operation          (P_NO_OPERATION)
*     - previous step in operation       (P_IN_OPERATION)
*     - path mode is not MANUAL          (P_NOT_IN_MANUAL)
*     - bad from / till / number of steps (P_INV_STEP_SPEC)
*     The error code is passed as part of the message reply
*
* FUNCTIONS CALLED     : - PPreply
*                        - PPst_sync
*                        - PPf_step
*
* DETAILED DESIGN      :
*   check number of arguments
*   verify path name
*   check for pattern in operation
*   check pattern operation mode
*   check for step in operation
*   check from step
*   check till step
*   check number of steps
*   if no error found
*       error code = P_IN_PROGRESS
*     set step state to READY
*   send reply using error code
*
* REMARKS              :
*
* COMPONENT HISTORY    : Aug 26 '88 WC initial setup
*                        Nov 07 '88 WC add test on cfg state
**********************************************************************/

#define DEFAULT -1

void PPstep(p_ppdb, ev, argc, argv, msg)
PATH_DB **p_ppdb;
EVENT_DESC *ev;
```

```
int argc;
char *argv[];
char *msg;
	{
	PATH_DB *ppdb = *p_ppdb;
	RPY_DEST *reply_dest = &ev->data.msg.reply_dest;
	int i;
	int err = P_IN_PROGRESS;
	int stepno_from = DEFAULT;
	int stepno_till = DEFAULT;
	int nsteps = DEFAULT;
	STEP *from_step, *xstep;

/* verify valid number of arguments */

	do
		{
		if (argc < 5)
			{
			err = P_FORMAT_ERROR;
			break;
			}

/* search for path using path name */

		ppdb = PPf_pth(ppdb, argv[1]);
		if (ppdb == NULLP(PATH_DB))
			{
			err = P_INV_PATH_NAME;
			break;
			}

/* check configuration state */

		if (ppdb->cfg_state != CFG_DONE)
			{
			err = P_INV_PATH_NAME;
			break;
			}

/* check for pattern in operation */

		if (ppdb->pat_type == NO_PAT)
			{
			err = P_NO_OPERATION;
			break;
			}

/* check operation mode */

		if (ppdb->pat_mode != PAC_MANUAL)
			{
			err = P_NOT_IN_MANUAL;
			break;
			}

/* check for single step still in progress */

		if (ppdb->no_of_steps != 0)
			{
			err = P_IN_OPERATION;
			break;
			}

/* get from step parameter */

		if (argv[2][0] != '\0' &&
			sscanf(argv[2], "%d", &stepno_from) != 1)
			{
			err = P_INV_STEP_SPEC;
			break;
			}

		if (stepno_from != DEFAULT)
			{
			from_step = PPf_step(ppdb->cur_pat->step, stepno_from);
			if (from_step == NULLP(STEP))
				{
				err = P_INV_STEP_SPEC;
				break;
				}
			}
		else
			from_step = ppdb->cur_step;
```

```
/* get till step parameter */

                if (argv[3][0] != '\0' &&
                        sscanf(argv[3], "%d", &stepno_till) != 1)
                        {
                        err = P_INV_STEP_SPEC;
                        break;
                        }

                if (stepno_till != DEFAULT &&
                        PPf_step(ppdb->cur_pat->step, stepno_till) == NULLP(STEP))
                        {
                        err = P_INV_STEP_SPEC;
                        break;
                        }

/* get number of steps parameter */

                if (argv[4][0] != '\0' &&
                        sscanf(argv[4], "%d", &nsteps) != 1)
                        {
                        err = P_INV_STEP_SPEC;
                        break;
                        }

/* calc number of steps */

                if (stepno_till == DEFAULT && nsteps == DEFAULT)
                        nsteps = 1;

                if (stepno_till != DEFAULT)
                        {
                        i = 0;
                        for (xstep = from_step;
                                xstep != NULLP(STEP) && xstep->step_no != stepno_till;
                                xstep = xstep->next)
                                i++;

                        if (nsteps == DEFAULT)
                                nsteps = i;

                        if (nsteps != i || nsteps <= 0)
                                {
                                err = P_INV_STEP_SPEC;
                                break;
                                }
                        }

                } while (0);  /* end do loop for test of parameters */

/* preconditions are checked, execute request */

        if (err == P_IN_PROGRESS)
                {
                /* remember reply dest for completion msg */

                memcpy(&ppdb->dest_step, reply_dest, sizeof(RPY_DEST));
                strncpy(ppdb->step_ref, MSG_REF, REF_SIZE);
                ppdb->rpy_step = 1;

                ppdb->cur_step = from_step;
                ppdb->no_of_steps = nsteps;
                ppdb->step_state = READY_FOR_STEP;

/* log event */

                argv[5] = NULLP(char);                  /* end of list */
                PPlog_pac(ev, E_STEP_P, ppdb->environment, argv);
                }

        PPreply(ev, reply_dest, MSG_REF, O_STEP_P, err, "");
        }

/*FF*/
/*********************************************************************
*
* (C) Copyright by Foxboro Company 1988
*
* All rights reserved: Foxboro Company 1988
*
**********************************************************************
*
* NAME              : PPg_cpat
*
* FUNCTION          : get name and status of current pattern
*
```

```
* INPUT PARAMETERS    : - message argument count
*                       - message argument vector
*                       - pointer to first unused field in msg buffer
*
* IN/OUT PARAMETERS   : - system pointer to list of path databases
*                       - event database
*
* OUTPUT PARAMETERS   : none
*
* RETURN CODES        : none
*
* SYNOPSIS            : PPg_pat(&db, &ev, argc, argv, msg)
*
* PRECONDITIONS       : none
*
* ERRORS/EXCEPTIONS   :
*     - message is not complete    (P_FORMAT_ERROR)
*     - path name mismatch
*         or path in configuration (P_INV_PATH_NAME)
*     The error code is passed as part of the message reply
*
* FUNCTIONS CALLED    : - PPreply
*
* DETAILED DESIGN     :
*   check number of arguments      (P_FORMAT_ERROR)
*   find path database             (P_INV_PATH_NAME)
*   check for valid configuration  (P_INV_PATH_NAME)
*   if error found then
*     send reply using error code
*   else
*     if pattern in operation
*       field  1 - current pattern type
*       field  2 - ""
*       field  3 - ""
*       field  4 - name of current pattern
*       field  6 - previous execution mode
*       field  9 - step state
*       field 10 - step number
*     else
*       if previous pattern type was NO_PAT
*         field 1 - "N"
*         field 2 - "N"
*         field 3 - ""
*         field 4 - ""
*       else
*         field 1 - "N"
*         field 2 - previous pattern type
*         field 3 - completion code of previous type
*         field 4 - name of previous pattern
*       field  6 - ""
*       field  9 - ""
*       field 10 - ""
*
*     field 5 - exception state of path
*     field 7 - default execution mode
*     field 8 - auto failsafe flag
*
* REMARKS             :
*
* COMPONENT HISTORY   : Aug 26, 1988 WC  Initial setup
*                       Dec 16, 1988 MVS Return values changed
*
******************************************************************/

static char null_str[] = "";

void PPg_cpat(p_ppdb, ev, argc, argv, msg)
PATH_DB **p_ppdb;
EVENT_DESC *ev;
int argc;
char *argv[];
char *msg;
        {
        PATH_DB *ppdb = *p_ppdb;
        RPY_DEST *reply_dest = &ev->data.msg.reply_dest;
        int err = PAM_OK;

        char rply[LINE_LENGTH];

/* verify valid number of arguments */

        if (argc < 1)
                err = P_FORMAT_ERROR;

/* search for path using path name */

        else if ((ppdb = PPf_pth(ppdb, argv[0])) == NULLP(PATH_DB))
                err = P_INV_PATH_NAME;
```

```
/* check configuration state */
        else if (ppdb->cfg_state != CFG_DONE)
                err = P_INV_PATH_NAME;

        if (err != PAM_OK)
                {
                PPreply(ev, reply_dest, MSG_REF, O_GP_STATE, err, "::::::::::");
                return;
                }

        if (ppdb->pat_type != NO_PAT)
                sprintf(rply,"%s:::%s:%d:%s:%s:%s:%s:%d:",
                        PPvtomnem(PPDpattype, ppdb->pat_type),
                        ppdb->cur_pat->pat_name,
                        ppdb->excep,
                        PPvtomnem(PPDmode, ppdb->pat_mode),
                        PPvtomnem(PPDmode, ppdb->default_pat_mode),
                        PPvtomnem(PPDfailsafe, ppdb->auto_failsafe),
                        PPvtomnem(PPDstepstate, ppdb->step_state),
                        ppdb->cur_step->step_no);

        else if (ppdb->prev_type != NO_PAT)
                sprintf(rply,"%s:%s:%d:%s:%d::%s:%s:::",
                        PPvtomnem(PPDpattype, ppdb->pat_type),
                        PPvtomnem(PPDpattype, ppdb->prev_type),
                        ppdb->prev_cc,
                        ppdb->prev_pat->pat_name,
                        ppdb->excep,
                        PPvtomnem(PPDmode, ppdb->default_pat_mode),
                        PPvtomnem(PPDfailsafe, ppdb->auto_failsafe));

        else
                sprintf(rply,"%s:%s:::%d::%s:%s:::",
                        PPvtomnem(PPDpattype, ppdb->pat_type),
                        PPvtomnem(PPDpattype, ppdb->prev_type),
                        ppdb->excep,
                        PPvtomnem(PPDmode, ppdb->default_pat_mode),
                        PPvtomnem(PPDfailsafe, ppdb->auto_failsafe));

        PPreply(ev, reply_dest, MSG_REF, O_GP_STATE, err, rply);
        }

/*FF*/
/*******************************************************************
*
* (C) Copyright by Foxboro Company 1988
*
* All rights reserved: Foxboro Company 1988
*
********************************************************************
*
* NAME                  : PPmsg_scan
*
* FUNCTION              : Scan 1 line of a msg and setup an argument
*                         vector array analog to the mechanism for
*                         the 'C' main function invocation line.
*                         Arguments are separated by a seperator character
*
*
*
* INPUT PARAMETERS      : message buffer
*                         seperator char
*
* OUTPUT PARAMETERS     : argument vector array
*                         argument count
*                         pointer to next line in buffer
*                           (NULL if buffer is empty)
*
* RETURN CODES          : none
*
* SYNOPSIS              : nextline = PPmsg_scan(msg, argv, argc)
*
* PRECONDITIONS         : none
*
* ERRORS/EXCEPTIONS     : none
*
* FUNCTIONS CALLED      : none
*
* DETAILED DESIGN       :
*   scan message for SEP, '\n' and '\0'
*   for each SEP
*     increment argc
*     add item to argv
*   if '\n' found and argc is 0 repeat with next line (skip empty line)
*   else ready
*   if '\0' found then ready
*
```

```
* REMARKS             : none
*
* COMPONENT HISTORY  : 15 Aug 88 WC initial setup
*   10 NOV 88 WC test on overflow of argv added
*****************************************************************/

char *PPmsg_scan(msg, argv, argc, sep)
char *msg;
char *argv[];
int *argc;
int sep;
        {
        int i = 0;
        int c;
        char *s;

        argv[0] = msg;
        *argc = 0;

        while (1)
                {
                if ((c  = *msg) == NULLC)       /* End of message reached */
                        {
                        if (i == 0)
                                return NULLP(char);
                        else
                                break;
                        }

                else if (c == '\n')             /* End of line reached */
                        {
                        msg++;
                        if (i > 0)
                                break;
                        }

                else if (c == sep)
                        {
                        *msg = NULLC;
                        argv[++i] = ++msg;
                        if (i >= MSG_MAX_ARG)   /* BUG FIX 11-10-88 WC */
                                break;
                        }
                else
                        msg++;
                }

        *argc = i;              /* skip leading blanks */
        while (--i >= 0)
                {
                s = argv[i];
                while ((c = *s) == ' ' || c == '\t' || c == '\n')
                        s++;
                argv[i] = s;
                }

        return msg;
        }
```

@(#)tds3528.db.p       1.1 Foxboro I/A System 9/14/89

BPJNINGDNOMAAJDDMHNFJMDAHGAACIFNMILAKBMDIHBACDEKJMEILBCCIIILDGGMNAAAAB
OACCIIBJDHDGHGLMBIIDEGANIOBOFDICLACBGDCDAIBKCGGNMCKIABFDNGAMBJBOGLICJENB
LBKCMPJPEAIDAKBNEKLEKINBKDEIJDCKFNMKJECJJECAFEJAMEOAADCHMGJHHHGOOMFALFPK
OGIOBLDOFDPIAEOBODGEOLBHDCGFOGIMDBELCGMNBMDINMEAMEJNCLLHOKJHDHGFPCNANNGL
JHEOBODIGFOGJGFFPADEKKAMKKDCKOGGJNBLHGGMFJDIIJNBKKEFHMMGCNFMLJJIPHGGMOAM
PJILFPMAICPJCIGAPDMGMNJJIBHENALIAJNDCGDAGJNDFIONKEJBFDLKANJPNHKHFDHHHFFD
EGAOFILBGEGPJHDOPDAFDFJKLDGJMHMIEJADIHEOJKNCDGGDNOMAJBADEGIMOIDFGMEMBHGO
LKHIJINEJFMPGGJPFOPNPKAMOJNEKNGDNHJONODMPKPCOLMJKLDPDPLOHNHMPLPENJMDMPCP
NPHNPNPNOPMNBHJDGGHDOBOGFNGKHIOJLFFJIBMDBJPHFJGAHCANNGNEIEBEPKMEEEAHPMGA
FAMGBHGBLABBIGBNGMBIIEFAIFCECCOFFBEGCCHJAEFCIKCEJJIEJCEKCJMBHABBEMNJMNFE
JDILBINFGAEDANDNJFOIODIPEAAGCJOEJAEEBGFJNBIGABLJEBIGIIAJBJOJKEECCHGKPEOC
EHCBENFJNCEJCDMBHIJBIMCPMFGEGDELDIGBGEFNAMDNDOGJOGJJGIKGKJOGJKECJFBBENBJ
ENLCEJGEJECNFCFJOHJFFDGKMJCFINDCNBCEADENDJMNCAGIJJHCBGGKOIKBIICGEKJEJLHC
MEKJCIIJHEEOLJKCJFCOGGKJOHINFOPKFJMDAMIBGOEKOIKDKAIGCKOKKIEFMCPBIFBNBNNG
ABOHEBENJCGKFEKEFJEOJKCFJOJGMCLIGHKGDFIBHEKCAMDCJAMJJBKLMAAGCLOMLADPANDE
IGKDMEBCAFKLIKFFMOFKKJJGBONNFKKDKGDGAEHKNDKHMJGGKLONLGIIKCIGCMLMDOCNHLJB
KMBONBAKONJGJIEOJLOLEJBHGNEKBDLGOAMGCLOPLMDPJCBGAGBJGHIJEBCPCFBONNHAADJG
MMNOPJCHINDDNELAGJLKDGNMGEHAANDBOEEEIDEGPADOCLPBMEBEPPDEICAKBIGMKNPBNGBM
MHOMPBNHCAIHCMLCACCDFMFEMCBFCFFMJEMEALEBIADAEFGPGJKEHFJBBBGPOACBMGBLLEIB
DAMEBLGNAMOEEGBOCGBHFBACNJCCBHGNPENBEIHLEMPCLJEMDHONPENDFAEDKLMCNCDKALJE
MNHCGHKAEBAHAIGCAAJNFKBJCANAGNDDMOGPFENMHDBIDPIDBAEDAONEEFONLGJGFDJHPMPG
NMHENHHNFBNNBHAFNBAGBLCAGAKNPFBMHNKHNFJLBNGFJABBHGKNDHOHLMPDNJGJKPNNLGNN
EPODANPJOEJENDENLEAJDACEKNPJOGJNELFOPJOHJEELGOEEBCENBEABICBOFFDEGBDKNHDK
IAGACPLOGEIIABDKNNJOMPGOPLNLKCFHOBNEBAFECEPBIEBDFOLHMOMEBLPHICPADFAIEPDF
ABACBJNPIFCBAGEBGAJLEBFLBLCAIEABMCBNGFGNPNIGBJCAAEDBNFBAEJCEABICBJGJLAJB

JGALCKNFHOPLPKEOELDOMEBDENEAPBHLBBEOFAABACBCEJEMEBMFBDFCGEOBFBOLOMLDJLOE
FKEAMAACBKPAIAAIEMKAACBHMIMAAGCGPAGOFEJLIBIMJEKADLLFLBCNAHCAGIABAIKLEAIC
AMOKEMAOGFPIMOHDNMBAMAKIKJKPIECIPEEINMDKMHMCBGIOEMABGFBIADBKMKCGACAFGEAP
AEMDLLFHBKEMIDLMNECNKPHJMPMDBOAIDCKGIABKCKMACNHBOAJLAGDFMIADBOIEEAABMMKD
IDPDKAAHICIBLEGBAHKDCBJOOBKEMHDDBAIICACAADCJAIKLEEAAICBNGCEPAOFLNLCBBNMK
AGEGICGAPBHFODJLJOBHLNDFMGDCLKOBINGJHEMDBKKLPIJNDHGKDBIOFNBEIBKJFAMFAGFF
MIHDODPHFOIDFIII
EECHFPEGGHFPPIMHHFPKOMBMINLIIPJOOIMNHFPHIKOAPHENAPNGJAOMOHGKJLJIGBJNCIHF
BEGJHFDJNHIHLKIGIAAKNIGCMAHGIKKJGIGMAADJIKFHKHHDAFCDILHFLAIMDEFJJDDGHJJD
DIJJJDDKLJJDDMNJJGDOPJJDEABJJEECDJJELGAI

```
@(#)steptst     1.1     1.1     TEST SOURCE FOR PAC STEP TEST

# "Start PAM Servers"

Execute_Prg "start_pam all"
Wait_Sec 60

# "Create variables"

Create_Var SHAREDCHAR Character
Create_Var SHAREDINT Integer

Create_Var PATH String
Create_Var KEY String
Create_Var ERR Long

# "Initialize variables"

Set_Var SHAREDCHAR 0
Set_Var SHAREDINT 0
Set_Var CPPAM6789012:PAMBLCK89012.RI0001 0.0
Set_Var CPPAM6789012:PAMBLCK89012.SN0001 ""
Set_Var CPPAM6789012:PAMBLCK89012.II0001 0
Set_Var CPPAM6789012:PAMBLCK89012.BI0001 0
Set_Var CPPAM6789012:PAMBLCK89012.BI0002 1

Set_Var PATH ""
Set_Var KEY ""
Set_Var ERR 0

# "Select path"

Execute_Prg "select_p -r steptest -e stepenv -p PATH -k KEY -x ERR"

Check_Var PATH "steppath"
Check_Var KEY "PACPCAT5300"
Check_Var ERR 0

# "Execute pattern"

Execute_Prg "path -r steptest -p steppath -k PACPCAT5300 -n steppatt -x ERR &"

# "Step 1000"

Wait_Sec 4
Check_Var SHAREDCHAR 0
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1100"

Set_Var SHAREDCHAR a

Wait_Sec 4
Check_Var SHAREDCHAR A
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1200"

Set_Var SHAREDCHAR b
Wait_Sec 4
Check_Var SHAREDCHAR B
Check_Var SHAREDINT 0
Check_Var CPPAM6789012:PAMBLCK89012.RI0001 0.0
Check_Var CPPAM6789012:PAMBLCK89012.SN0001 "ONE STRING"
```

```
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1300"

Set_Var SHAREDCHAR a
Wait_Sec 4
Check_Var SHAREDCHAR C
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1400"

Set_Var SHAREDCHAR a
Wait_Sec 4
Check_Var SHAREDCHAR D
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1500"

Set_Var SHAREDCHAR A
Wait_Sec 4
Check_Var SHAREDCHAR E
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1600"

Set_Var SHAREDCHAR Z
Wait_Sec 4
Check_Var SHAREDCHAR F
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1700"

Set_Var SHAREDCHAR E
Wait_Sec 4
Check_Var SHAREDCHAR G
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 1800"

Set_Var SHAREDCHAR J
Wait_Sec 4
Check_Var SHAREDCHAR H
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 2100"

Set_Var SHAREDINT 1
Wait_Sec 4
Check_Var SHAREDCHAR H
Check_Var SHAREDINT 10
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1
```

```
# "Step 2200"

Set_Var SHAREDINT 2
Wait_Sec 4
Check_Var SHAREDCHAR H
Check_Var SHAREDINT -20
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 2300"

Set_Var SHAREDINT 100
Wait_Sec 4
Check_Var SHAREDCHAR H
Check_Var SHAREDINT 0
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 2400"

Set_Var SHAREDINT -100
Wait_Sec 4
Check_Var SHAREDCHAR H
Check_Var SHAREDINT 1000
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 2500"

Set_Var SHAREDINT 999
Wait_Sec 4
Check_Var SHAREDCHAR H
Check_Var SHAREDINT -32768
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 2600"

Set_Var SHAREDINT 12345
Wait_Sec 4
Check_Var SHAREDCHAR H
Check_Var SHAREDINT 32767
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 2700"

Set_Var SHAREDINT -1

Wait_Sec 4
Check_Var SHAREDCHAR H
Check_Var SHAREDINT 12345
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 2800"

Set_Var SHAREDINT 30000
Wait_Sec 4
Check_Var SHAREDCHAR H
Check_Var SHAREDINT -12345
Check_Var CPPAM6789012:PAMBLCK89012.RI0001 0.0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1
```

```
# "Step 3100"

Set_Var CPPAM6789012:PAMBLCK89012.RI0001 1e3
Wait_Sec 4
Check_Var SHAREDCHAR H
Check_Var SHAREDINT -12345
Check_Var CPPAM6789012:PAMBLCK89012.RI0001 3.14
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 3200"

Set_Var CPPAM6789012:PAMBLCK89012.RI0001 -2
Wait_Sec 4
Check_Var SHAREDCHAR H
Check_Var SHAREDINT -12345
Check_Var CPPAM6789012:PAMBLCK89012.RI0001 1000000
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 3300"

Set_Var CPPAM6789012:PAMBLCK89012.RI0001 1.2345
Wait_Sec 4
Check_Var SHAREDCHAR H
Check_Var SHAREDINT -12345
Check_Var CPPAM6789012:PAMBLCK89012.RI0001 -330
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 3400"

Set_Var CPPAM6789012:PAMBLCK89012.RI0001 -330.2
Wait_Sec 4
Check_Var SHAREDCHAR H
Check_Var SHAREDINT -12345
Check_Var CPPAM6789012:PAMBLCK89012.RI0001 1.1415
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 3500"

Set_Var CPPAM6789012:PAMBLCK89012.RI0001 -0.1
Wait_Sec 4
Check_Var SHAREDCHAR H
Check_Var SHAREDINT -12345
Check_Var CPPAM6789012:PAMBLCK89012.RI0001 123
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 3600"

Set_Var CPPAM6789012:PAMBLCK89012.RI0001 123456
Wait_Sec 4
Check_Var SHAREDCHAR H
Check_Var SHAREDINT -12345
Check_Var CPPAM6789012:PAMBLCK89012.RI0001 -123
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 3700"

Set_Var CPPAM6789012:PAMBLCK89012.RI0001 -124
Wait_Sec 4
Check_Var SHAREDCHAR H
Check_Var SHAREDINT -12345
Check_Var CPPAM6789012:PAMBLCK89012.RI0001 +230E3
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 3800"

Set_Var CPPAM6789012:PAMBLCK89012.RI0001 230e5
Wait_Sec 4
```

```
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 4100"

Set_Var CPPAM6789012:PAMBLCK89012.II0001 12345
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 123456
Check_Var CPPAM6789012:PAMBLCK89012.BI0001 0
Check_Var CPPAM6789012:PAMBLCK89012.BI0002 1

# "Step 4200"

Set_Var CPPAM6789012:PAMBLCK89012.II0001 -1
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 -12
Check_Var CPPAM6789012:PAMBLCK89012.BI0001 0
Check_Var CPPAM6789012:PAMBLCK89012.BI0002 1

# "Step 4300"

Set_Var CPPAM6789012:PAMBLCK89012.II0001 0
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 345
Check_Var CPPAM6789012:PAMBLCK89012.BI0001 0
Check_Var CPPAM6789012:PAMBLCK89012.BI0002 1

# "Step 4400"

Set_Var CPPAM6789012:PAMBLCK89012.II0001 123456
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 -1234
Check_Var CPPAM6789012:PAMBLCK89012.BI0001 0
Check_Var CPPAM6789012:PAMBLCK89012.BI0002 1

# "Step 4500"

Set_Var CPPAM6789012:PAMBLCK89012.II0001 -1235

Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 -12345
Check_Var CPPAM6789012:PAMBLCK89012.BI0001 0
Check_Var CPPAM6789012:PAMBLCK89012.BI0002 1

# "Step 4600"

Set_Var CPPAM6789012:PAMBLCK89012.II0001 9999
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 10000
Check_Var CPPAM6789012:PAMBLCK89012.BI0001 0
Check_Var CPPAM6789012:PAMBLCK89012.BI0002 1

# "Step 4700"

Set_Var CPPAM6789012:PAMBLCK89012.II0001 100
Wait_Sec 4
Check_Var SHAREDCHAR H
```

```
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 0
Check_Var CPPAM6789012:PAMBLCK89012.BI0001 0
Check_Var CPPAM6789012:PAMBLCK89012.BI0002 1

# "Step 4800"

Set_Var CPPAM6789012:PAMBLCK89012.II0001 100
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var CPPAM6789012:PAMBLCK89012.BI0001 0
Check_Var CPPAM6789012:PAMBLCK89012.BI0002 1

# "Step 5100"

Set_Var "CPPAM6789012:PAMBLCK89012.BI0002" 0
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 1
Check_Var "CPPAM6789012:PAMBLCK89012.BI0002" 0

# "Step 5200"

Set_Var "CPPAM6789012:PAMBLCK89012.BI0002" 1
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 0
Check_Var "CPPAM6789012:PAMBLCK89012.BI0002" 1

# "Step 5300"

Set_Var "CPPAM6789012:PAMBLCK89012.BI0002" 0
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 1
Check_Var "CPPAM6789012:PAMBLCK89012.BI0002" 0

# "Step 5400"

Set_Var "CPPAM6789012:PAMBLCK89012.BI0002" 1
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 0
Check_Var "CPPAM6789012:PAMBLCK89012.BI0002" 1

# "Step 5500"

Set_Var "CPPAM6789012:PAMBLCK89012.BI0002" 0
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 1
Check_Var "CPPAM6789012:PAMBLCK89012.BI0002" 0

# "Step 5600"

Set_Var "CPPAM6789012:PAMBLCK89012.BI0002" 1
Wait_Sec 4
Check_Var SHAREDCHAR H
Check_Var SHAREDINT -12345
Check_Var CPPAM6789012:PAMBLCK89012.RI0001 0
```

```
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 0
Check_Var "CPPAM6789012:PAMBLCK89012.BI0002" 1

# "Step 5700"

Set_Var "CPPAM6789012:PAMBLCK89012.BI0002" 0
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 1
Check_Var "CPPAM6789012:PAMBLCK89012.BI0002" 0

# "Step 5800"

Set_Var "CPPAM6789012:PAMBLCK89012.BI0002" 1
Wait_Sec 4
Check_Var SHAREDCHAR H
Check_Var SHAREDINT -12345
Check_Var CPPAM6789012:PAMBLCK89012.RI0001 0
Check_Var CPPAM6789012:PAMBLCK89012.SN0001 "ONE STRING"
Check_Var CPPAM6789012:PAMBLCK89012.II0001 6
Check_Var "CPPAM6789012:PAMBLCK89012.BI0001" 0
Check_Var "CPPAM6789012:PAMBLCK89012.BI0002" 1

# "Completion of pattern"

Check_Var ERR 0

# "Release path"

Execute_Prg "release_p -r steptest -p steppath -k PACPCAT5300 -x ERR"

Check_Var ERR 0

# "Stop PAM Servers"

Execute_Prg "stop_pam all"
```

```
# @(#)steptst.db.p	1.1 Foxboro I/A System 9/14/89
```

```
BPJNIMGDNOMAAJDDMHMFJMDAHGAACIFMMILAKBMDIHBACDEKJMEILBCCIIILDHGMNAAAAB
OACCIIBJDHDGHGLMBIIDEGANIOBOFDGCLEHBJBAGINBLDGECMKIIABCDIGMHBKDHGLHIOIFI
LBKHMPJPEAIDAKBNEKLEKINGKDEIJDCKFNLKHEAOJNDCHAAGNCEBNDMHCJNEDLGOOMPAABMB
GHAKJPCAHMJMGMBNMLLFCMNJLDGGMNIKFFMALEKNMLLHHAODMKJNELLHKONNLIHHEJHFOAIH
KBMMJHDAGMMCMIGJGDBACBNOMDAODNGGBEOJBBCEGDJCCGFBKKEMAJKDOFMLJIDEGCMMHIKJ
FIAGAMBIDMBBILBOENLKLEOJNDHAPHAGHEEDKGHAECNEHGBFGLJEPMDBCEONJCLHEMLOLOFI
BJIEELJICBDFMDMGAIEDMGINNALAJDCLFPMOLMHJOKDIGFFMDLJPCLPLHBGNOLLIGJOPOOPN
BLLDPABLDMGHNEJAIBHMLKPJPDOINDCLCPBDEHIOHEPFEMKLNDHGHMDLLCOOONJGIBGHNOAM
POGCINBJDBJFAHNPIAAEBGGIGAFBHAHMGBAHGAHFEEHHNAGLAHAGCFJPGOPEOJJGNNHNBOOF
AEMDEJLOFNBGNCAMDCNACAIDGCCANGCAGAIECIKGKIOCIAFGEFBFMGFEFFDNOFCCBNHEMEHI
BFBLGFLEMBAHENJPHFMFMHBAFAEABBEEBDDBOBJAEDENDCOICAGEBDECDADBMEBCEGCCOJMC
BEEOHMFGBDBPEPDIFBAEAIFDFACBEFBCEOBMDBJGACCNEKEFFFJJCPNGNIGCBJDIOKBIADIP
DPHGIFEEBAFCBEEBMEBAHDEKPBJFJMHENKIJCHJNDNIEMBAHJJDCJKGJODIMGKMKMIGGIODL
HKAGEDJMFDOEOJGHJOHMAIMBGHJNHHOGNJEDAPGCAMIKCGIMJPCGHKCDKDJKPFDIMEKFJDNC
AJKJKEJJNCMJIDAPJGBCAKJFKBKBBOLKKIJLDEJIIKGKKLHKBCLBOLJPFCIENAMDKJLCMOHI
GGKBGJNKNKOGIODFOIBKGJJPLMPCFBMEKPHJPCOAGLLBLECCELKDLCKENKOACMKLMAPCGBAE
LFHEPKDACNLGCPBODLGLLCGLCOBLMDANNPECBLKOJIMPGCAKCMAPONJMPLKJLKIIHCOLCGAO
PBNKELCJBCOEEKOBEDAPEJHIKKCNLPFCIJAKMNKNHMMMNEGDMCPFNKAJCGBFDLDOFKDBBBBH
PHBAIDMCOLICKKKNMDBANLOACIBPBELDHKDBBPCNHILGGLMHDNMIAALCLBIHDGOMGPMEDDEM
PMLCBDBIGLKMDCMPKPLGPMCILKCCIHEMPCLCCBOKLMPBNKDNPKAMONMFMCAOLMGPMNOMCKIK
HELDIPKGPMDEMPCMIDAIBDAODLFDMBEDNDDDGHGLPEMNDKCJPNDDMGFOMHBELGAPCNLEANDG
NBAMFHDNKKIOMGKJLNDFMGDBMILAFJANGBODCLPFMCFEGPNLCOKDDCAAJMHFNICMPHPNPHNL
DBPPGNEDNJOJBGHODEKDDDMADJCOJAELBGHJGENPEKAONJOEJDFBPGONMCJHFGHODMIDALCF
PNBIOEJAJOCDBJDKJDEOECPJLJAMKHCHJBLKMHGFMMEAHJNBPNBOKOCDIIDNGOPODKJBDHJE
JOOEJCKDNLCOCFOKJPHNNMLEJFKOMHJOPMONLDDHKPHMOOLLPHNAPCOPHFBLGODFOGDJDPGK
LMPFMKGHFPPLPGNAFPBJHHMONFMDHOLNOMMMKPHPDLPHNBLPDKHNIPHEFLHOPDGGMFILBPPC
NCFHDPNCNNKPHNBPFLEBAMFIJHBJMAHBEOHOAEBEJNPNJOKHLLOIAJOLHNIDALFJPICOOHDM
KMIJELIALBADFMABJNGHDKAEDGMKHHAPBMCAPGEGMILOAKNGIEAHBJKEFJKNIEMHAHAAAFDA
IFCBFMJOAEANEIMBNEDFMOGPCAJMJPAIHMEIECNMCBNAAHIOADJPPPGIAIJCBLBOCPIHOKOD
GBAJFNJIEALPMBKAAICIHMKCBAMFEIDLCJBKJBIKPIGKEBNPGIKAMEBJIOGPHIIKPLCAAOLH
BIMFCCOCOPEKIPFKGDAELLOIMGCDEGAOAGGFCAGDPPMMHIOHDOGEKGEHEMAIOCBMLFHMLPCE
FAPBIECGJJJMBNFHEIMEONBJHCHHIODDEJBJEHHGODBBABFCJAIMKEKDCDAPCJEGJJCNJCHO
INCMCEBFDHCFMGEJJOINIGDECIBPBPACPJMJCBGKFCJEDOHMFMCLLJEIEICJDNDCHPMAOLJL
CJIDHHEGDPOGOKFBKMNEOCCACHGILKFLLKCPJCJIAEOFCLGNEJEFGBDNGOIPJEEEKFAHIDIJ
LOEMMGLCJIJMIMKEADIFGJENGCOCMOJIDBOAEBCHDHLDELJLKBNCFLMAEMKGCLKPPJMNEDEO
EPJNLEPEKGALMAJJELLPEJBCJKKHOMOFELCODJMLDGGONCIHMBOEKGDCNJDJEPDAMKIMHPFD
ODODMDJGEFIDDEFCBDICNMPEGCEBHNKIEIIBKOFDJOPEDMGIAMMNMGMLDONGAAEOJGOKCHAL
OPCHAEHMMCNDJPCEHFKBAMHKLANBMKCJBEGCODOJFBEICNBKEPIJJGBEKACHBNKJJEGOPKJJ
JFHKKMJMMGFLCIKDPOCDNDJMIGNCKMCGBFOJFBENMHNDOCOIAPKIOCPDOICPCLGFNEGFDCPF
JAABKNOGEAOFNJFEBJEEANKKBMOEEDANDMDIFDKNFONEKGEJKFCJEKJBGKCFBJIMANKMDHKL
ABDKKJKKFEKLOCKOKJBPMLCKEELHIKNGLGPKKAKFMADDGHCPHBFCNELKBCBEKPOLKKOKGBFF
CKDILINCLAAGGJCMOLFOMPOKEGMEOKFFIFHMKNKMEKAPPGDBAFIELFAGFDJFCMGGCJLLDMML
```

CKJGKLCKPNCKDODLCKFEBNINLFLAGKNFOJFFHNPIDBNDKCLGKNGPFNKNGADNDKFHNBECFBLG
HHMFOKGJPLNKNDLPDKHGLAPAHKJEGPNJAIFMBHCALGLGACBNNIBINOLDCCKALMKIDBLGLBJA
HNHGEDBCJGHEEIDPJKBJEPHIDCHCKCOKJKPHLNOIBFANBEIGBAAECKPMIHAPONOCFPHAHBHL
NCODHKDELCNDNFCNEOGNELNNOCHAHGFAJPANGNHOELCLFMPOOKLHKHKKENGIDLAHELNGABKH
JELGAOGGGLEPHDKLOAHMPCBGLGGGKNOJIBOBBIOBNJBGBHLABLIMGLHCOJBKNIKFNODHHKIJ
PNKEFEKIJLNOIJFMPHCCBFPCHIIFLIALACBJHAKIDLBPACNAIIPHJDBJPCHAKEMFEAAOLCJA
JJFCOBHOANNNKNPFNFGNFAGBIKFPADBDHILPCFLGKLHDDHPLFDMPMGFFMAEOHODAIKCPPLFL
BDEPLJKNAJCGNNELJHPFFKOFHGPIMEFHICGOIGNHOKGBKHHGLGNILLGNKNFIH HLOGCPGPLJ
NOFNDFKOJCKDCKGHMCJKDJMLBCEOHDDCIHENOIECBLPKNAIIEGLEKCBHNNOIEGDLPKNBJAIO
LEKEFDAE

@(#)tds3526.db.p 1.3 Foxboro I/A System 9/14/89

BPJNIMGDNONAAJDDMMMFJNDAHGAACIFMMILAKBMDIHBACDEKJMEILBCCIIILDGGMMAAAAB
OACCIIBJDHDGHGLHBIIDEGANIOBOFDNOIABBODCEAIBKCGGNHEJINBDCKDNHBKDHECHGKHHI
LDKHMPJPEAIDAKBHEKLEKINBKDEIJDCKFFDKJAAOJKBIMMNKLILBJDEGNOBLDNGNKENCOBAD
ICNPBEDOEBPIGEOBEKLGKLNJLCGINPHGIFOKIEIPICKGGIGGEEJNFKPFGKFGDHFLLLHOANDL
FGGNNKLPHOOFHGHNBLNGCJINLJFEKNGCNFEKHGKPFINAJAPNHGDNDNBIGOANNEHFBHODCFCD
KHEKJNDKGFOGNAHJCDNHCLNIHHJCNBECAJDCAENKJACAFEGANIIGBBJJNPOFNKIFNBNINAKN
PIOONGNOJPEDIPCOONLIGPONNFKNFPNHJOFNHLDHGOKHDHHINLGFKNPNLEPBNENINBEGHPIO
AGIHHENN.PDHIDBGENNKDENPNKFNJBLLIGDNJLNGHGOPNNHDNKPHNNFJLNPAPCNFNBPDFBKP
LNHNGNPJNNNFEAJLFEIJENLHBJHAODANGHBOGKNHLBLGNOHCLCNFCGCAFJIEDJBFADFEAEGG
EGFPHFOHGFOHCBFJBHFCAIFHAHDCNNNHBIICPHBBGHJNHOPNLBNHFNHGCEIKJINLENCGBOGI
BPHJCKHGNIGAHCCOEGAIKDGAGOINNIFIIGLNJNHIKDICPJHNNICCIEOOEBFGJCINBGFOEGKE
IBOBAFIHODICNHEBLGKEHPDANOBGGEGODCANEJFHJBDGFKIJOEIKEKDKNIBPHDFEAEOBNEBC
FPIENFOGJLFPAILBFPBAFCANBBOHJNHJNGHJNHBDEJDANBENJIFAKCCBIDFNFDICFHJPJJPI
KBLJODIDFNDKHJKIEJIFNKFAGCKCPEKBHIGFJCIPKOOJODFPKLFBIBNEBHFEGEABEFBBFPEA
EBAFFKBFBKIKOBJIFECOJKGAKDDKGGLHOFILGIBNFBIEBDEFEIBBAEBDFPBAFBNEBEKLPKNF
KKANADNCKKKIKGGHNGKKKFJKDNDGNJJFKOLNPKAKONBDFCCENBAEGEKNNGCABPKGNEPBNBJG
LDBPEOHBOKBAEJBIJBIEJONCHOJFFNLHNOIBFLOGKNDJDCGICLLEENHKHFGOLKOLHOIBGNBC
PKHFBLJNLNHJIJOLOIIHDAGOPHKFIFLLBBFNDAKHAIDLOJNNNCIGEKKJONIGFIOKPHKBANFO
BONLPANFOBECKNDBFKECBENBCLKLHANJDADANIJLHBGIOPNIGHJFHNPCFJNHHGHLHCJFPEGG
JNCGIPPJKGCGLDBEKNLGBBAGBOGJLEFBEHBLFPNANFIHNAEEBLINHEIGINBNANDDLHHAEEBF
DFLJJAIFNBIHBIHNINNBANBJFGDHHJONLHDHNLJKKCHOJNEGALJJANAAFCNIBFNBGGGPCKHF
GKLHHOJKNKANGCNDEF8DFKCCEHBHBIFENNNNHAGJNJCOGHJJFKBKFPIEIBLEFDGFHNLBEGBJ
HJNECGHIKBDDCAFKDGLDLELOEMDHLOJBNOANGEKLDDIIFJKAKCFNGJINLFNPGEIFFOOIBHGJ
ENFFODNDHDEPNNFFBAECANCBCNOF8GIPIOPBBNLBKDNONFANBNOLPNLBOOCBPHDOPFANBDID
LODCPBPDJONNDHKIJNODHKLHNCKAODKADFNNJINNGLDIPEDNHHIOJGNGDDNAEHPBANDJFNHP
PJJBJJGPOPFHNNNCHONPAHPJIFNCJACNPDLAJPDOLFPNPBLPEKPPNFIPJBBIHKANDGLIABAO
HCNAJCEJABFAIAAEPEFPENBAFINAPPAFNADLCPAIIDBINGEAIGDCJIOBANGIEIIDBKNGNAIG
BHLENBANACIJIDBNEEFDAHDLNNABAPBBJNGAAFCPJINBBHGNJAANBPAEELONIEGFIECDCACB
AJEKFIACBDHENAAECHDNABAKFBJAACLBKKGAIFCLGAIBAPEJHAECBCKIJAIEFPCFGBAKKIIC
ACBPINBAIEEAENCBAIEGIICCGNGEGILLCCNEPAIGDJNNGBAPHPBINECBBGBBALCOKAFNBHIN
KABPBKEAAFAJBEKDNBOAPGJHDNLENNKLHLNCPLILBNANFGDNKONBKNHALCEDALNHNCNHEHLN
OBNAGLHPLEGDCALNEGNILGIACOAHHOCEJNCCHNLHLFPHNJAHIOIPEEKECEJPINDKEGNKNHJB
JGLBNNPOAAEJEJLPAIIIDGKANNANAAFPNHDPPFINGNJFFNEJKFFDHANCEKFCOKINJGNJJBCF
BKGKEALGFBCOKICNKFEEALCPPJCIDNPLJNIFHNLFNJKDCONDBHEJFPHCNCGEIDPENODCAPFJ
NLEJEOINJBNCBNBPCEKLPJNNIIANPCJCNKNEKEDDINBHDBEPBGFCJFKCNEFAPBINDJLCFDJO
HDJGNDFDGHNLKNIJOKFILOHDJHNLJDGHPNDEANBJFNECEGJNNDENKEGDIAAJLDNGIFIBANGB
JAEDBLANICJAKFDINEKBBONJIIEIDNACJCIJJCNECECIEJEJEKGNPCJCJINNCEAGDGIAIBAN
CCGKKJBIONOEKBCIENKJEKFHNKNCJGLKPEKFDAIFNLBOONNAFADLJEEBIOFPIAEKKLGGFKND
JLNKOAALCFNKGJIJGINKAGJLOCFECOAKDIILDCNNINIDGGOKLDJFIBDNELDEOPBJDONBDONF
JGNBNECGFFLHCJFANCOKOHJLHNNAKENONCGAFFDCONNDJFOFLEOEDNGLJAEOLDECDFJIGHHB
CHEAODOJFGKNAGNCJOAANNGHFNOJPJBHHPKGAGKALNLNOKCPGFNHLIIALIIBANANENAIENBH
ALJBIIGKCEKDBPAJAJGEELHCJCJBKEGECGDGNANLEFGAACNAIPIGHEAGBBCFJBANEONKNINC
JKPGLEKIENKNGKFPKKDHDOBANFKGDDNICJBPKKGABKNKIANOLFDNINGNIJGICLCIJNNKBELH
EFLNKJGNGJPLBFNLPOPGLFNCNNCNBPHKELLBNLCALHAGLCAFJKBFHOGFIFCCEADHAGDOKAIN
GPFFAJFNJLFOHHLGNLOFIDHBLJPLFNNJIGGFLKENKIGOELHCNKADKIAEBFCOLLEBKOANIGBL
NOPBDKCFLODNJNCPFEKEELNNCCOIDNLLHNNIOONNLLFLAGPNPCIBLPOJPFGPEONJDAKBPHOG
AGLPNBDFDAICKLKLNPBOFNAGKJPACFLAIEPJIAFOAKCPNIANINDJENKLCAGNNDANHHFINBNI
ONIBFNCOODGCANEHJHNDPNNFCPAPHKBAJNNNLECKDKNILNABHNAFGFFPDEOALIKHDKNOCPIN
BDBNGEBPIEEFNADOCGNAJAAPDNOEOKAGJJANFKBIBENFNOBNNNCFEPLIAIEBOOABNADAJNBL
CKNLNENKENNGPCINNJCIGCLINILJANGADONBJBNLGACNBGJLFJNJCPFGPDICHLHAEEBLNDNF
DLNINFNBIONFELDBONPHFENPECDODBKANNOADPBNNACENANNCGDAKAJJCNOIAFBNJKAGLLHB
LAFDPNBNNNEFFPBJNAONDNJEKBCPJNOIDNNHLJLPIAOGABKBDFNNOIDCONIGNCDGLFNEJIAN
NNIDBGPIKPAIKOKGINJLEPKNOIEPCHDINEJJPOBPKNGBFACCDLONEGDONINNNBJONLANONJO
AKDLNAPNDNPGKIPPHNBJCEBNDLLINNGGHELCBNGNNAAHEKLJFFNPLGGJLEKPHNONFNNHOENN
BENLNGBJLGBNOGGDILFKIBLEDELFFDNEENOOBDCLLLNFOILONNKNNHENOANGEPDLAGDDEGPH
GOHNGNCBNKCAFHEANDKGNIIEPOANADFLKLLNOANIFFCDKCLLOFOPJOACBNNJAJHODIJELDGA
IFBKCKOBNKCDGKHINABPCOONIICDLNANFECANCFHLINNGPACHDPNNKBCPHIBAECJGIEBANGK
JAIDBPANOBAIOJFANCBDOGEBAPANFNKAHNNEPNBEINNLPEOEGBHOLIAPLEPNAECHPNIKAILG
BBLINPNLAAPEBDELBNOECCONADLPJPACJFNPNNCAOANNKKLKNDKPCOOENGKNKGAJAPENKAAN
HEPANFCBDAGBAIELBIGAABFNCAIECENNCGAGONFNPIIILELONBKODDNJOLEBAADLADEJEEPG
LNJLBNONGKCHBBNLNNCOBLNNADFINCEPBJKKNDNPAKBFNOPCLJFLIKNPDIODEPODHENGPHKA
EEEIKGNBLPGDNLPIPKAKFNCOJLDHNIBBGGNCFOKIGEBOPEAOOHDNOFPLELHKLIJHAIPBEPPK
DHANLACOCEJDNPBOOCOKLNPNLJOFDOKDNDNINOLNEBLPHNNLAPADHLONDKPNLLIOOPHBELEN
POFNJEFPNHPHJJDHPONGLPHLFONGFPLHLNJHEBLNANEIFNIGONIDPHCLDJAILPHNLKCFPNJP
FDDPOINAJNIBLNABFIIGBGNIIFOHNLPPPHPJJNAOFNBKNALLAGCNNJLPLNAFFONOKGNPNPPK
FPFAADDNKAEGDEGEEDDIKEEDGDAEEEECEEAFEEGEEEFJKAAFCLLHECCOKHAGFCEHDBCKEDGA
BHEIFNIPJHDCKINGHNNOKBIBLGNFDEEFHDDEEJJDBLELDDDECDPIDEGNFAAGGNPANNBLGIDF
CADIDOBDBDIDNKEDGACANBANGNOANJNFKDDFNIBFDOFKEDFLFNNBGDOENDIDLJFFDOOAFFDF
ECEIENDNEIENNJNHFEFOLDIEFOBDBGEBNIFEFNLDIEFNNDIENNGEIDENNFGEFDJIIFFGLIHK
AJBGDOECKAGCNOJBIEEPJIFLNENEGFOBDDAENBCHIENLNEIONLIEIFGDFFIFEFNIDFEAEDAG
GLNABAGKIAAGBHLEIBLJEBDONEBIFNIAAIIGNFEFDOGDAIDPGOHIIGICEIFGOANFGDOBGEID
INKIIGDJNAIGLEJBIIJABIIFHNBAIBGFOAIHFBNCHNNAIHHHHKBNHIGDFHHGGHJHHGGCDHHI
GPNNADLEBBBNKNDCENEFBAAFEFNABNCABICBKNCIBPKPBIILCNOBICIFNHFNLGAIILLCKBFN
NFNFGLLNNIANLNCIBLHCOBILCELNELLNIIILINDBILDNONIKLOAIADJNDBILPDKGINNEBIIN

LLDBILFDAHINLIBIBNLDNIIKJGLBINLCPBIBLFAFADNOFBILNHIIILPCDBILODBHIOOJNIBC
LEABICBDICIONFBICCPCIIGENNFIEALKBICDPEOIILDECCIPNJJIIPEPCCIPNPCIIONLCHIP
NFCIJANJFIFLCADFINPFOIINANAJIOKKGEJAOEFIFNDBHAIOOOFIIPOLNIJAONDIJBOPIICN
LKAIJCPNBIILDCNAHJNFFFJCAOOJILJGBCJCIIJHIPINBCJCABCJIOIEACICIEDCJCLNDGIN
LFNFDBCJEJJCALHJJCNLCIJDBAHJJCBCDJELDCFJJBOCCFADBIOJJBNFNIDGCBNJJBEEPJIO
HIKDILFBGJJDHLADICHLEDJFNACIFOJDEDJFNHFIFLJFLDJDDAKADKFGFJJAFAIJJDNFAFDN
GAIJDNFCPJJDFABJJEFKDJJENGFIINIEGEJFEJPJJEHCLJJBGHOJJEHBOJILPIADICPIGDJD
GOKEILIBAJJIFJAJADHLAEJIFNFJFNDEBAJDOPHIGINOEJJGNFEICJHOJJJAOCAIGJICHJJG
JBOJJGIGAJJHPJEIADEGGJJINFLJJHLBEIADHICJFOKEAJJGDFBAIPLFJFJKKIGJJCOCIFHP
KIFJJIDFNAJCOCNIFGLKGIJLDGFJADNNLIJKJAOJILDFGAJGKPEJJJOPLIEKCALIEKLJKJJJ
LEJEJLJPFJADKBJJIPNDFEJNHKJJIPCBKFILNDGJJDDCEBJNPICIIODGFAJINLAJJGJJEFJN
INFJINBKEBJNLNBJILDGAAJNCCCFJNOCNJJDOCJFBBNOKJJJABOEJNJPGJADNNKJJNKFCJFC
NBCJIOCLKBILPLGJJDDHOAJKDAPAJPGANJADIFEJKAADJKJIOCHFADOBOJILCBNBJPOFBJKA
OIHJADOKNJKAONBJKAJINJKAJKJJBDADPKJJACDEKAPHHJADPJPJIODIKAJKNFDFKCGAIJAD
AAIKKCCHFKJIDIEAJLCCIKKAOGLIKALBIIADLLFJKCAPIKADOIIJKDCHFKKBDIHAKBDDKKJJ
DINAJJOCIIADJPEJKECHHKJPADAEJGAEKEILELGKJDDJAAKAEPKKKEIFJJADCOFKINDJAAKD
FHKKKEDFCKFODJPAKADJIAJOFPKKKEBFJKADDOAKADDJKAJJGHKKKEJPJJADPFPJIOOBNHKE
CBHKILOOKEIBOODEJCACOCJKHHLKJDACJCJFHLKKKHGBOJICACCCKDACLCKFIDOKKHNACJCA
BDDKHKCCAFKIILGKKHABNKKIECJKIOACGCJEJDOKKHKFCJCANBAKILBHECKCABDGIPBJKJKJ
PGGIBKBHJCJNJCBKCDHENKIPJPDKNKPPCIKKDEGCKHADNJKKOFHJCBIHLKHNKONKJOBHOCKD
BHOCJGLJKKKHBHAJKILNOKKKJHOKCNHKAKJCHECKJCKJEKCCHIIKJCHGLKJCNFFKKFJKPKJC
NFCKKIDDCJKKDFHJKNDKFJKNIJCKFKIAOKHNNLKKKLBHLIKNJEIKJENDHKKJENGJKNFBEJKH
FDHJKNFFCJKKFHKJKONNLKJFOKIKKADDCBKIGCNJKOLBIKJGOIJKKNGKIJKOLINKIDOIBKKJ
HCDKJHONNKKGASHLKJPAGDKHNNCJKKHPHJKNIBEJKHIDNJLANNHKJIANCLKPILKJKHIOKJLA
LBCKJJAKJLKNJGOJLALIEKADLKAKLCBGELKJJOGJLBJHNKJKAKBAGANPGKKNOBEKLANPEKKO
JJDKHKOHNKKODNNGINBPAFKIONDKJBJOFBAGIJLFFKKGOFFIBGBFFJEBELFJJAKFFBBHABAD
JLOFFBDECBBDDBHABDJFDDADXEOFLDFCDLLFFEFLLFFGOLFCJOCBAHDNNLLFCNAFLEJAFFFB
JDIFFBJGGFLECAIALEBNNFFJELFLBCEONLFGFBNLLFGOPLLGHABLLHFNALAHFPEAFEKALBLF
NCHLBEFOGLFJGAGLFJEEDLLGBBAFBDGGNLFJDCEBBDDILBBBBICBDIDCNALGHJNLLIIOPLLI
JAILBEDCAFBFJDPLAFENNCEKBBLCBNDDOEEFAGBIEGDKKAIJCNPENCGNOAACPKJGIJCKNENC
BJPEECFNFEIAGAKEEDJPNLLKKBPLECKEFLGNONFGGNNLINNIIBFJLJJNPLNGOGLBLJFPNEIA
DLAELKBDNIEBLDOLEAKGNLHCLBNLEBKLNLLJKNBLLNLADLLNKDKLGPLFOLEALNBLENJEJLBL
GOCEFLGLFBNILEKBLJGLNELJKOCLLNKJELLNKFCLLOKCLLLNLPOLLJOGCLLLNCLLGNDKCNNG
NGNLAHJFALDIABFGHIFAOBLNKNALLNKPILLNNAFLLNNPLGLONKELIANNKLLPAABNLNLEOLLO
ANCEIKPBFLLJCFLCLNLNNGLNOIALLONONLLPODGLNANGFLNABBNNLNPLCLIBBFONLPAADELN
OPKLIPDLNFLNIGNBNFANFNLPLNNGLPBJENNANPNLNBOFNLNCONCLNAOJBLLODANNLOANKNGP
NFDLNCPCILLNFNANCEKNBEJFFPIDLNAOKFLNDOEFLGNNNNLNBDBONLLBCLNNBKICLLKBOGNAD
CAJNNAPAKLNDJFOLNDNGKINCDCLNNEAFPNNEEHNNNEKKJLNFBKLNNFONILNDAKENNFDNPNAF
JEIBNCPIBDNEDDDNNBEIGNNDBHENNEDJAINGCNENNBEODNNGLGFLNGJDLLNDCFINNGCACCBL
IBNJNGFKCNNNFNINNBHEDNNENGANNNDBBBNFGBCHNCHLFNLJFONCEKKNCJNIGBENNICPJNNI
ABKNNEJFINNJBGLNNIAINNNIKINKNDNNINAGNJBLNJLCABJLJEFNNNGPFNNENBNNNJCLINNI
KLNNNJBPPNNJDJPNNIGNDNDBKNDEJNKJANNLFONNNKPPCLNNKPENNDJNPNNEINFNNLKCFNLJ
LICNBLNNLJNLNCBNNLIFANNNINNNNNLNCNNLFAENNLNKNNNNGNKNDAKNLEJPNNONNGNDPNNN
KOBNNNNOJNLNNEFNNNNNFNNCKDJNLNNKCNBLACNKNNENENNOOABNNLNBDNNOPNILNNNENLNO
KEENNCPJPNAFOCNDEKCGOKNOGCGNNEIGKNNJKKPNNNPGBNNCKBINNOJFNLNPODIINFAENNNL
PANNNJPCCNNOOPFNNPDNJNNNFDGNNLNNNNDGKNLEKEAAGNNJACANNNAPCNNNBBNNNBPNJNNB
NILNNBNPGNKGAOPNLNJLONNNBCDNNNPDFNNBCOGNNCAIINLLPKJNLNBNCNBLFENKLLCOFNNA
CFNNNKBDDNNCPEFNNDAOGENOCIKNNAGNLNNDGGCKBNBPDNNNDBENNODDBNNAENGNNNEJJNNP
OJHNNFENNNKFDOJNLPBAGNNBECCNNDBEENNFJOENNGFNJNLLELLNNCGBPKNEDABNNCOBENNE
DENNNNDGCNNFIOJNNCPLLNNFLLNBNGAGONNGEDPNNDFPGNNEGFINNBNFKNNECKONNAGJKKNH
EBPNNLGPONNNCEANNGIBNNNCIDINNFJFLLNFNOIBNIIOLNEKADNNNIEFCNNNFFGNNGJBINNG
IFINNCGPGKNJIAINNJCCKNNJNBKNNILDONNJPNNINGJNCNNIAJCNNJGJGNNINJDNNFCABNNG
FCDNNGLNPNNIDNLNNALDCNNKNBEBNKJNKNNIPCDNBAGDIALHJBELBENLELFBJCOFLNGCELLG
BNDBJLEJILLGCABFADDNOALEDCNBLINJLNNNNNNNNNJBALCJJFEIBLCCAJNOENNJANGPKKAA
OEJNILLENINGDJKNNFGKFNNJLGANNFNNCNNGNAENNGKLANNLDIJNNFFPLANFPCCBNNKKLNBL
JJONNFINFNNKNFNNNKEBOFNKLNENNNLBANNKNNKNNGLFKNNLPCINNLNABLNPAINONPJALNOA
ONLNNPGKBNNNBELONNBCFONBNNINNNNOONBDNLNNBBNNOLBBNPALNNDENBNNGNFLLICNPBJP
DNCBENDFKANNCDFOODDGNOODKJKFNBPLLNNPGGNNNNJFOINLNNBNGCEALONPNCJBINANJOLN
KPDNOENJGLNKNBEEBLENEBANPINDGDENNONFPLKGOEFNBNBNNADJOFPNNNANKBKJOFPCDBNO
PGANOAKNCNOAJLPNNPEICNNCBFFOOAPIGNOFBKEONLFNCNNEADDONNKGLNNIGEJONKLOGNOB
LNNNODANGONIBNAOOBGJNONFFCNNAGGPBAAGGEPAAFGECAAGDINOBDBOJBBDJFNFNNEDPLNN
EGALDNGNDFNNDCNBBCONNJLENBANGJCGNFBBIJNOOJJOPOOJCJDFACCKDAOKKEFOOKKGNOOK
KIJOOKKKLOOKKNNOOKAKDAACBNFBACFNFAACBNJBAECPBAAECADAAFGFCAANGJBABKBNGBAE
GPIAANGCEABKGPAAACEDPAAGGNDABAGOJAANLBFOAECFPAOKKNBOONNCDOONNEJOOKKPAONN
NIJOONNKLOONNNNOONCKNAONNGCOBANJNAOLBIEEANCACAAGNNNODICAAAONNCEOONOBJOON
GBLAONCAOACNADNEONPGIOONNPAOOLPNLOOPPNNOOPEGJLOPBNBBAEGNNAAGCAEAOOGIEAAN
NDFAPAKBLBOLDGEFAGOLBOONNDGOBFOPKOONNNEOOPDJOAOPPGAOPABILPPBBNJPONPJKOAC
CGAAADNFDOPCCEFPPCBKNPPBCIJPPCBKKPCOENFAAECAGANEENOAPCNJKOADCACAOIIEGOOI
GCJAPCPONOPCDKNPPDPNLOPCFFOAAEEDNAEEEFLNONDENPAEIDOOPAOKPONFCAEAAGIFCBEB
AEFBAGCAGAAGFGNBAGCABAAGCADAANGFGAOOGPGAAGCABAAEFDIACOEJDAPFGJLAICAFKBFB
DNOPPDGKOPONOADOAEEPNAAEFAFANELLECAFCANAEDNEICCNFJOABBDELPPGBLKPPBCNPAPN
IABPPIICDPPIIEFPPIIGNPPIIIEPPIBNKBPBJKKFAEEBDPOPGNNKPBCNAAACFCEAAECADAPJ
EDNABJIFJBAGFNNBPNPNJOPGJOBPPKGIAPONCGFPPKKGNPOKAKKAAAGFDAAGGIFAONCCKAAA
KEAOACEIEPOIKNNDAGCANAPEEOEPANFAKPPFCAEAOKAKPAPKAKJAAGNDBAANAEDPPJJDNPAD
DNBAACAKJAPLLLCPPFADNBAGDLKAAADGOPPAFEIPONCACAACABDBBAAFNBBANGCAACCANADK
FKCPANOGNODKKDABACNJEPBANBDPPNFDFPPFNNNPBEIJOFPNOALPOLODIPBNNFNOBEOJJPPE
OLGPPNCCEALNNGNLLDNNAPPPGOBAPOPDFPPOADCBANNFNLFAKANBPPIEJOPPFGCPACIFNFBF
IIPFPPNPOPAGOBDPPPOFFPAGCLIIDEIGEFAGPNEPOIPJGPPFCCGAFAAIKFFAOPPPPNGOBAPO
PDFPPOGFLAICEINDFAAJAFPNNCIPPPNFGPPFCCLALDOPPPPNGOBAPOPDFPPODLNLPPIEJOPP
FGCPACFJPLPONPOPAGOBDPPPOFJPLFPNEPOIPJGPPFPLBPAGNNPNPPNPOPAGOBDPPPOFGPNN
NBKPPNKKNPPKKOAPPLKDAOACEENABFGFPAPLEJKFONBPNPPKKNNPPKKGJOPKKLNPPKNNAPPL
KDCOPLEJFPPLLNJPNNENPPPEGCBAPFLNDPOKLPJPPKNCEPPNJNNPPJCAIAPNNKOPPENNNPDI
INAOOKBCLBOIBCPKLFNNINOCJAKOFBNAEDKAJENOKNONCJADDNJBJKILNLOJKAAOOKKAAOOK
EECBOKKNNPPKKNGPOKOACOOLLEAOACLGIOOLLKNOOLLOPOPAONCOPBNNAOOPPCAOACCFOAON
KENPPKKNNPPKKFAOOOKCCPPKKDKPOPNNAOANODJOAGOFNOOOOJIOAGFCNPOOBBFPONNNAOOP
PCGOPBKCOPBBKACPPKKCNPPLOACOPAAEGPPAAIKPPAOBNPPAAPNPOOBCNPONPACOOPBGCPPK

KACPPKKCNPPLNABOPCKHHPPKKHOPPLPKCOPKKCDPPKPKNOPCCOAPPDDCIPONDENPPNINHDOI
KCKPONKACPPXKCNPPLOAGOAEEBDPPEEJFAPENKEOPDFDIABAFCLPPEHJNHPEEPCPAGFBPPPN
PENPPFFJLPPFCANAPFFPBPPGEJDAPGGGFAPGKBOBACKDKPOPKCCPPKKDKPOPGOAPPHNCOPAE
NEGPPHFEIAPHNKCPPKDPAPOOIJJPPIIJJPPIIJJPPIJDNPPLOANOPIIPGPPBJHEPPJJGIPPJ
JKEPAHJNOPAGKCNPONKACPPKKCNPPLKENPPKKHNPPKKFJOPKKLNPPKNHAPPLKDJOOLAIFBPL
LHJPHHENPPPEGCBAPFLNDPOKLPJPPKNCEPPNJHHPPJCAIAPNNKNPPNGCBAPFCAPAPNNBFPAH
GOKAPOOFIPPNACEBBAOPJPPFGFLAICGDGAOOCKJAPPFGHPPOHDBAPNHFOAAGOKFPPOPLFPBI
OPJPPFGFLAICGDGAOOCKJAPPFGGPPPAKFAAHGOKAPOOFLPPPHFHLFAHHPLPPFJFPAGCLDIAG
OGKOACPJGPPFADCBAHHFHLFAKABBPNHFOAAGOKFPPOCCFAFIFHIBFIPPJPPFGFLAICGDGAOO
CKJAPPFGFPAGCLIIDEIGEFAGNBFPAHGOKAPOOFCPACAGIFFAAKPFPOFJFPAGCLDIAGOGKOAC
PJGPPFGFLAICEIHDFAAJAFPNAKFAAHGOKAPOOFCPACDLPLPOFJFPAGCLDIAGOGKOACPJGPPF
DLBLPNHFOAAGOKFPPOCCJALFOPJPPFGFLAICGDGAOOCKJAPPFGJPLFNBFPAHGOKAPOOFLPPP
GBHANNFPJPPFGFLAICGDGAOOCKJAPPFGGPNNNBKPPNKKNPPKKOAPPLKDAOACEENABFGFPAPL
LAHPPKKHHPPKKGJOPKKLNPPKNHAPPLKDJOOLAIFBPLLHJPHHENPPPEGCBAPFLNDPOKLPJPPK
NCEPPNJHHPPJCAIAPNNKJPPLKAAOOKKAAOOKKAAOOKKAAOOKKAAOOKKAAOOKKAAOOKKAAOOK
KAAOOKINAF

@(#)psrs_test.p 1.2 Foxboro I/A System 8/:7/89

BPJNINGENKNAHBJBNGENBKAAAIBDCKFNNILAKBNDINBACDEKJNIIBAIFNFBI::IFBAAIAAI
GCNGANBKBKDJNGKAFBCDCEEHJBDAGONILAEIGDIGANBIDCGENLLIFBNOAGNNKLNGNGNKINI
LDKHNPJPEAIDAKBNEKLEKINBKDEIJDCKJFJIGGEOBNDGCAFKIEAFNBIDAHIISAAKBEJAAJED
CHINJIDAHDNKIAIABDKGNNIOKNHFNNLAHJBDIGANAIDKGPNGJ(JJFDJANOBJ:NGDOANNABBB
JGENJJDBNEEAKIAAGBEGNOJLDGCANGLNCBDLONGNNKLFGNNPNGKFDOLHOONNICGFPJJGFBAI
FIDAGBNDIIDNJNGJPDCFANJLDAHCNNCKHINNNGCNFNLJHENNNIHFPBDHGONP(PIBAHBHDOAN
ECDEGJNFGONIDIFGNLFKDCGNNLLEODIILNNNFJDHOINONKIHFDHGDNIJLCONNLHBOEGIOGJN
PLDDOPDCNJKFBHHPENDJPGGNDIHGNCGNNHONPJDHGCLCHCLOKEGHFDKHINPINIOEKNJPUHLK
LOLJPHPHFNNNEHNNNHBNHLJAAIHGCPNHFOHNOFIFNKBPBAFHANCKNEGBNHONFJJHHBHFJGDCE
NINOHDBIAKGIFNHJNIJBFBIGBNBKDKNHJLIIHGDNPIIGBLGGHIJJJPIFLENJGBBIHDAKDODH
GCBJLCHNCBGCILBCEOPHKBHONHJJNBNGINKCPJLNKABJGPKENGJFIOGFPAIIJFACBLPCKGBI
GDCOFGIIBNGGIINBBIGFGIHOJBGGBKGKKKLBEGCBIBLDNFFGOCHPLNHFKJGCHAFFJCIJNNHC
EFNGPIFNHEDNIOGHGFIBOAGJKHKFIJKBIFFHOHJICABGIIJOHKHLKCAJJPHNKGNFNHGGKAPL
BBNJNNJGANNCLBCIJAAGCCFIOIICGENBOBCAIEJONCIIOBJJJIIGDBEGKHCBIOAIOKHOCIKO
NJKDJIADDCHKJJINKHHOGHAHIOGIKEEBIHANHICNKFOLKOBLFJGENDKPCGHFPEFBLACDJFNE
OLEJCONJDABCELCONJEAEDANDBKELEJCEFDFNIBAONEOLNGGKLONLGNNHGOLONLHOAAODFEC
EBGDNACHGCACDNBNPGEFGNCCLKIAIGAPAKJNOLEGLJHFJNJLCOGJPFDGOJCOLNPCNCGLCPFJ
KEJNIBODLOPBJCGLGOBJOIACLNKOBNHCBAKNEAFNLNDBPNKAGNCAPEAAACANGHGFNFEGBIAF
KBAAACGKGHINNBKCNHHCJNEBGCAKFJEBANPCKIAKINIBAGGKICIBGNNHBGFNGELNAHJEBGKJ
ANFHBKCIKEJADBEHFAEACBDABNAPJKHBEGNPDPOHGNIGNHCLFHGNPBEKCIHDHEPDEJBGNBCB
ENFNELIDCAACBHGOEIOFDFAIFAAENBAEAIHFJFHBIGBNFNKFLBOCFLGFNNBBNINHCNHACNAC
AIDOODHNJCNFFIHLCNICAKHNPDANACBFGPHEAFNFBNHJLIDNBKNJLCJJINDGBNGKLLEBFIJC
CACAJBAEBFIEKFAFFIODHDLICAFINPCKNIENPHFJFEIDEANGBLGDIAFFAGNDDLDDFNPCNNDB
HEEBPHOHHGHDJEEGNGGFEIDNAGNFFBIHFOPFNFLCGFLNDHOHCAANHBBIBNHONBFBIGFLHHNI
IKAGAICFLIFFLLGBHCKADAEHAKJKHDNOLJBLCCINPNPNNEIBHFBNPKGGGBNFIGOFNOINOLGN
HNPANDBHNPDNFPHFINDBEGNLHDJIFBAHBLGNOEFBONOHJONHGNHHBPHGIDFPIGNNFDBLBPOP
OIOADLKOFFGBAOGBBABINJOGKAADBANEOKFGFECJFNFIEAOAIGDHPIAAAEBOIDIBNDEABAAE
CGDAIBGOFNNLBPOICHNCDPPOGJIFHEKGPDFIAFOJJGOCIKFFNAGGHGIDFIGNNOGAJHIKIBCA
AGEJODELPCOIOADCBFNGCFHHCALIJJPIEENHKEDANNIPAODKBICCEHNIEHEALNCFIBHOGGDD
ENGCENNHBHDIPNGFHGGJFIFPAIECCAECCFFKEEANHCNANNBKHCNIBBAJIKAFAGEJNEJNEFGG
FIEDILGBGNIIEDDEODANNDKINGBHANAGAKGBIEJAKNBKCHJIBHHILBDHGBCBJKNLKCKHDFCI
NNCAHLFKFLIBCCBHDJDHPNKJBBAEHGAEEBBCNNAAIHDKOENGIPIPCEJNOBNKKALHBHNEGBAO
HCHIABNAFOCAIGICLNOAANHDHINANFINHHLFLFLFAAAOGDNBFFANKCOCLIENDJIIAOHJLAGC
FEEIGENIEGJCJBGKJBCNACBOKNAIJIPFIFHBAOEHONODBPNLEAAHLHHNGBJABOILNBNIEENA
NLGJOCNCIKLCEEKEAIFAKJEKFLNFKONBLONNNKCDCDAJIFDHLIENIPINFLJLAKPNPINNNJNJ
ININGCEJABAINACINGBBJOCEIOFEJEABBNHFENNODNKOIIANNLFECHCGNFNIDGGGHOIBANGO
DIFKCBKBFAAECJEIABJBCNNIIBEECFPKEBOPBBDEJANPKEADCBEFBAAECINIAAAGFINAECDF
BDLJEIEFIGPDIPJBJNGECFCPPJENENBKIPJDFKPDCECIEFFJBGFCJKJCJLGDFIOFDNFNAJEL
DINIJCJGJBLKGFCONFNCACFONOCACKHIAABLEDBNBKBFKIHEPEKDCBDNOJDIAHCDENGCBKNP
CNNNENOGDKJHNJENKCCBFEKBDCJIGGNABKPKNAJBKBGACNAJJFGNNIJKPAIFCHCNGBJKDINF
GJCLLBAHLLENDCNDJJNAAEEBFILFPGFEJAIKPEJANGBNGKDGOBJKNKJNHKHDKOFCKNODBNNN
NJNDNPAGNENBFLGNGHNGOAPJDKNKIGGBINHAANJNBNGHLANPNAPFLDDGNBNJKNDCONIKNBKP
OKGNKNAOIFOIEECJFKNHILBKDEKPNEAECNEJELJKFIHOAOEGKFJGBNKNBKFNDKJKEOHUDCJE
KDCNKFBLEOFJFILJPCPBJFLBHEEBFCFLEANJAGHNOBJKEELFIDCBJBIKNKIHHCAOKFFEBNCG
GOINNJDGKNAOFENHHHPFGKECONDGADLBCOLFKNBIEEOLBJNEPKIFCEDINBAKFPAIBLBFJAPA
AFCHIIKNAIIEONCGCLNBNJFKPAHGDFKDIECHGPCBGFCLICJCJKPELKFDAFBLGDNBNJHHNIGK
JGIKDEOICHDAOPOINPNAKGBDLCNPPNBOEGGBDLNCACBLLILGJOLNCNCFHDLLNFENBGOOKFLO
JNGJHAGPAKAHBNDFIFHIGBNIEDFEHKPKNDBGLIKFJHAIFGCNAIKKLKFNKNHGJHANCNLFOLHP
PDEKADLBBCPIAFFECANCBEFOAANADJPINEAFDBNAOGBJFKNNGEBIOHABNEBDFGPADJBNHLGB
GFEKPGJNAFKBGBDNOHBJNGNLNKJDCDPIJNGAANCEHNJCNPDCFIKANLCNONHIBHEKFGNFKOLG
KCGHKGFKEBAFKJFBLNPFDFKEBNDGPAAKLANNGGBBKPFELHLKODCNENEFCAFDOANGFELIKHNE
PCILEPCDGDOEDOHJJGDGAGNLFBFLJANEOKDGJFIDBOPFCLKBDJBCENONBGNDNHNIAEDCKCLP
PHFPNDICKAAGOGKNLDFJNFKLFGLBLFPFKNFKJLLCILJNENOJHAAKBJKPHNHOPFDEPPPHFHGN
CCFJNJENHOPBGAHDCNGJFONHHINEBGCBOHICLJNNGAHGDONCJNHNAJHOANOFGJFJNNIGCONN
GCLBABJLEJENGBNAACLENLCFHGKNHIBFEKNNPDNKHJKCHIIOPDGLIDBNFLGNAKBKNKJADEDE
IJDOENDFEFKNNINBGNLAOJHAHFFNGFEKNPDILJNLCFNDHEDJFNFNHNJHNKKKNNENHFJAAJNK
OKDJNLCANGKJJNPFIKNGALLGPGLODHLOEBJIGPHNOPALNHGGFLNJNHBEAHDGCBCPDOGAHLHP
DINHLGNFHCGDCNFNGNHBFCENIODHBINHLENLPNGGANNLJLGINFNBFLBJGNAAJPCIIPCNKCBD
IFHJIICFDJOCIJCHPKNELNINOJGPGJBKHAEILPOPALPACJALDOGLBHBFDJCEHJAKFBBBALHI
GNNCNNKBBHNNJHCNIIBGANBNJOFNIIKDNKLLFNHFGGNAEBHAIDGJJKBNDFEGIPIKNKKHHJPF.
KNL' ^OLHCGALLNNHLOOOFGLEPFGNLGDOOHGJOEBAAGOBAOAEAOHPJAGFLIFNPFNHDNCBKHE
OOC..ILLBNPCIOHEIJPGFHNDAGHFHFLLGFBNJFNFOGCANONIGFPKKBNDPNPEENPOJLOKACHP
EBNPFBKDHFFGHGPNOLGBIHAONJNNKAHJENNLKBAFBPNFCAKHJFFKGHKFGHJJNHKHAGEBFGFF
NNHKFGDLNDNFDINADIHKNPLKPBFKLDNFKNHNCPADNGGJPPHHFGKCNNLPHCJHINNHKCKPLFNO
EDDEPINJNPDONKLKFPDLNBJHHDNLDEIHPDJHLOJNNAGNJDLJJOJJLNDJBFHDAAHJDHFDBLNO
JGANHEOCFNHOEEIHNNOPJGADJPKNGHHCNGGOANHHHEKGIHHKAJIGFLEOBHOKPOCGHFCKPGGI
KGDEHLOLAHNILNKNGELJFHAGNLNFHLAFLIHJGIDHADDACAHNJNOGGONGFHGIDLGGGKFHKFHN
DPDGIBHKFGHBAKJFADNCIHEINEJHFGBNOHFOPAFFAEFBDAHCENIAFPFKKDIBLFNHHOAJHIBC

OBPFAFHDGHIDAEFIHEAHJIHOHOAHHIOODHGNPBOHHDPDEHFJHHFGGGJINFHINBNCHPDMPHHP
DOBHIAAAHGFKAENGGPCLEIGOKKLHGPCNAFHFILNGGILAGHHFNKOHDGFMPBEJFNHHDGHOCEAH
HBPAIBHBCAELNCOHDIEOCAHIMIPHICNLCHIDCHFBIBIMDGHFCLDGHAHBNIBFHEEAIHCNCAHG
HLAIGFNCLHBHDIGGFBOANNGHIEBECNEGKGENHPJIHOHCNIIIHDDAIFPAEHHJPCGHHIGAFGHP
IJKHIFLPDEEFBDAECNFOCIHJOGCGFKNNKHIAKBDHGHKDJHHBKFHHGHEHHIBBHLDGIGCNDHEN
GGOIEIDKCGIBKLNGGPGMPIHKIJCIHLILDIIHHLNBACNKGBDNHHJIIHIPKIHLJCAIFEFFEAFN
CKCIIMDBBHIIBBAHHHLPLGGONBCEENHEIGILDJHIHBGLHFGLJOHIIIJPPEHNBEHIIMBGAIHA
LBCHDABJHFINNKHIIHFBEBIJIHLEILBGJBIEHJAFCNJLDIENFFKAENFHPHIJOLHIIGDLDHHI
GAFIHIGKIEGNFIHIHPGGGGHDCHCBEHDBKAEPKJIHEHLBIIGOPHIGIEALHIFKOOOGIALKGIIJ
KAIHIJGEOIHCLEGFJAJBEHIMLDFIIIOOHIIIBHFIHFBJLIIHKAFIIHNAEIDEHIPIIBCBAIAC
NHHIHANJLIIKGIHIINGPHHHNBJHJILDEBIENHLHFILNDEHGLDLPIHBDOAIIEECCIACADKJIO
KBKIIPLNDBGEHBDGJBPPDIFLIHJEIOHHCIIKDDEHIKFGGIIKPECHGGJFKFIKBAFJEGFEBEAD
JHFFJBJDCHILEBLJIPBLEGGPIBPGHCNKLIHECINJJGHNLBJCGOJIIHPCEIJAHNAIIJPGNIAC
PIAIIICONIINEABJHHCCHJEDACFGGPAACJGFDAFJJAHDJJGFOPNHJFGHFJJGFENDJAIIDHJG
PINHIFBBKGJGBHFJHDAJAAEILFNIIABNJJILPACGJFLNAIFLKAAGFFNFAGINHCNJJDAHFJJH
GLOINKOPPIIGDHNFJINNEJINNBHCIPJKIGINGENFFENECGJIGOAHIDBCFHINEIDIJEDHFEGE
ODHIJENFAHDGLGIGHNLJGGJLONDIIDCKBHENNINJFBKBAGGIAEBGJAHAAFJNCGCJGNKDDIJJ
FNHIJJFJJIJJAPNGIKGLNGJJIELHFFJPNJILKCNHIAKENJFKCAEJILIHKJJIFIHJGAIPNJIC
LAGJGCLCNJJCPAAIGJKLAJJFDGKJJLALIHAHANNHJNGNNHGDNCOJINCJAHIODHAEGLNJIJID
EIAJAFBONHIDDPGIFPEBLIJNPDAIIKNBFJJNNDNJKAFHOJGBLEIFKBHNNJJFOJGJGNALHJHI
KIIIJJAPNJIFOCIGJOAJJJJCLNPIJGBLBFJHCFHJJPGIJIJPLLIFJHIIIIIBIKPIAFJPJEEA
EEOFJHNFNIACHFKAGJNAIJKAIDEIJNECNJKBDBNAHCPECJACJNPIJNDOIKEAACEDKCCPGKKC
LKGDJJCJDKJOCLFKJOGCBBADDJOHKCFFKIENOLLJJBAPOKJBKFBJJPBKDJGPBLJFJKHOEFKD
INGEKAGJEIIIBNGBIINJNJKDKHKEHNDPKKEANCDINGEDFKKEADOKGJCNNAAGLPCJKNDOJJKA
IFPJINAHDFGNGAHKIDBKKHIDOHOIJNNLKEKHFEFKAGBLLKKEIHNJKIHNNHFJNKLKJDFFBDKKJ
FDAKKEFGDKKGAOHGKCKHCIJGFNLKIFFOHKEDIPCHKGFOEJKGKANJKAEGHJIAKHGHJKDCDKJC
KNFJKDKOHJJCENKHKEGLKEKDCNBJIPJEAKKEABEKKELLKJJDNFGHKDAHHJKIEJAKKDPLGIJN
DBEAHOLDPKKIOGDIKBFPLAJEBGNKJEPCLIKHJGGKJKFEJJIJNCAKKHCGIFKBNHDKKKKPFKKK
FJIKKCKIOKJAKKKKHPKNNIHPKODKJJGCHIGBGFNIJKJEIJJPLNOKKNHHLJJPHHOKJCNDBFEG
AHEFDKGLLADONOGIIHDECJINECBKADDJHAKENJNNKNHGGJKHDLOKKPHJBKKKHNJKLAAIGIKN
JFLIHIJIOKILAKPLKBENNAJIBECLHGIDEJAGOGCKKPDJNKKPBBBLHLPFDBKFEEPFINGNHDLA
PFAIGFALGLJCFKLKKOIKHHKPHCPEFBKPGIJBCFKKAAGFBKJKBNEJHKJNAHJPBKOLJGGNIKKL
PFDJGIHCIKKDKNIHGCLDJJINAALLBGGDDALAGOFBLADDPJAFDFNJKHJBKILALNJJFKIGDKLC
IIEKKHNPPKHNHDPGFBIOJKFONLBJKJLICGACFBCLLANHHDKJLPIKLCNBOKJPNDFKLBLIHJLB
IAJKIPGKLKLBHJGFLGLPKIDFBPELKOJFNKBLCDFLLCBIBJJLEONLJPLEDJFNCLPLEJCNGLLA
FIILLAHHILGPDFGLHPDHNLHINGLCLDGLHJLIDPCLKLOODJLELFKKKNLNLKHKAPALKNPNGJEK
GNDLLFAEOLLCNBKIINNLEFKADLHJKPDNAJLGAOGLJIILAKFGOCDIKNGIALKJNGIKKNCEKHDF
KJELLFIGFLHDOBLJKFONLKIKDJELJBAJNGLDFHPKHDLOPIKENBLIKLCJJFKPKFCLLNKHPLKP
NBPIBHHFBAEGFFNLLKDAKLLFLCDELDKCPLHAEIBKIDLOLKKPIJNLKPNCBKLCDBNLLFBIKLLN
EFDLJFBNBKBDBPDKAFCANLKNIEOLHGNDALIACHJLLOCJALGJINDLEBFGPLLCJBNLLOOCLLKL
JFJLIKOEOJKOGCCBADGJLJLNJLOLJJLBHKLLEBILILKABLGPPDAKJHPFKKKLLCPLJKNEILLI
FBKHLIFAJLLNGDLALNKLALLJFJGLLBFNGLFNODHLKAANGLLOPKJKIEKOOGNAGHFLIONGIHIO
NAELNCCGENLCFCAJLBHDFLJLONALLODCBLBFHJALLHPCHLJIDEPNLHCCGALPICELKNCAKILP
HCPKJJDNKLJPPOPLNGIHELKJIPHLLFCJDNLJDEKLKOJGELJGJILLJJEANNJJHAGLJECHNKG
OPBJLKNCKLGPGCILLOCBKNLOJAAGLAGBFBNCNNCLJDAELNNFOAPBLKAFNKNCINBIJNLFKLKI
NOFNJNOOGJNDEJEJKBENDJENHCKNLNNNLLLPFPGJKKGBPJNFALBNJBFJHEJOOOMNFOKPGLN
OCKKLEHLBLLHFFHNLNCPJANIHEHNNCFKCNLJHOKKLAEGONNDJOLNKNIDCINLOOFLNENODKLP
AOPKKEENCNKFPIPLNEDNGGNEKHKJNBCEBJKHHNNNLEONGILNILOLEJFIGNNHKNNLNKAHNNNB
JBNHKNDAFNLNJNBNNNKKENKNNGENNEEGPKNKEIBNNLBNPGKJNPKNEAIGHNGKINKNJAOJHKKK
JANNKFANKNFNCNFKNJNNJLNBDDLKNBLNGNLPKIBNNNNBCLNKHHENNKFLNLNNFEPNNGPPALNE
PIBLNNOPILNLNPOKDBDCOAKEBNBGLILEDNLINLNNFFLIHNKLFKBNLNDODLNBCNDJJKBHLNLE
BPFNNPGNHINPFHNNLCNEPNLNCKINKNFONLNHNKDNJNDBGNJNPPFNNDBBNKJNFLNANDKGOLNN
HFBLKEHNCLNNBJGLLLNNALNAAEIGNNCJJNLPLHBNNFFEHIKOFIBKDKAJKNKCONCKNJBDCEAD
GBGKNOKEOKENGGNNNAECPLIABAENLKCADNNBFGCNNNBGDNNANFANIJNKBNLLKJNHNBAKHKIJ
GHANNECCJNLGLNFLKBPHGFNDNPHJLINFGLLDGANNBBCFJEBFAPEDDBPNENEBCPDADCNHKEDN
NDDEDCNGIDANNNNDECIBPBECCNPDDCNKKBACGPCNBIEPDNDCCKDANHJCJCBFABEEDGJDKFFB
GDCABABONDNHEPPNDKCBOAEGCNCEDFEDLEDNLNBDBICLGADBDIDEEEENOEDLNCFEACDDEAAG
DKNADFBNHBENANFEACHDCANKPLDIENKFHNNKIOIDDIEILCNKHCNDACHPBEDKBFOENGGNADNH
NACANNCANIDNPGHENGGJBNBIPPDFHNLFCNJNLIKNNLHENNECLPNNNGLGDNAHLIHNBGCOADDD
IBLNNLDACEDLFJHDENFNGBDBINANEEIFNNILLGEDDBJHNNEDILLHNJHKNDNJJPBNNKKNCNJN
KFENAGKIJNLPOJINNKAFPBNKNNNDNKNJDDNLFEDDNNIMBNNHGNHDNNJGOINLBAPDFPCOEDEI
PGHNNLPJGLNNHFJNNNHIPNNNNKHBNPHAOANNHKCNBIICDNNNEKLDNIGNHDNNPJBLNJBGLBNN
PLNINNJGINNJOBDNEAJNENEFJOANNKOLENNKNNDDAGOLPNNEKFGNOCKNPNNOGPAANLNICDNL
IPEENLGNENNNADJONPLNLNDPAKGAECNJNNIPNBDGNNOJCBANNFGNODNIANDBANNODACKPAOD
IAPNNHAOCONNIEGNDHAICOJNFLCABDDFFADDHGJDBGHENBAGLNONBGDCAEKAGOGEEPBALDBF
FNNBFADIGCEDFCJOEDNIDGDEPDOBDBEIAOACFGBAAEFCJAAEEBCAAEENCAIEDALANNCDGDAC
NNHJONGABDAGGCOODIPCPENICAPAAEGNDFAFFFDAAEEDFAAEFDAAHGHNNAAHEKCEDNAAGKAC
BHIDANDBGAAENPGODBFDEAAFGPOOAEENGAOBEBDEEEIDJEBHHJCAOBNNKNDFNGPDHNCGEENN
OPIENIIKENODNJENOBBKKENNJDKNOBCAPANNJJBNDKOCDNIECAFONOCDNODGCONOIILKKBNNP
OONNCCCNAOONCPEONPCHBBOAKDKOOEICNNFPLOLNODNBDNIADOIOBKEBLOONCIGDOAGPNAOA
NALNOGNBENNHGHABDBEPANOBIIBDBINHGEEPFGJOAGFILODOFLEOIPFNBOEDBELDOHHNGOED
NEKBAHGFPAAGFJADDBNKHIOGNNJEOGCALAOGGNPOOGHBDOOHCDFDOHCAGAACHNINOHFAKJOH
FNNBOHHOOBOHBECOOIFPEAOIIGIOOIIKNOOILKODOIPEAIOJDACAOJJEEOOBOOEFAFEFNAAE
ANNFOJBICOJNDGDELELNANJBNIGGNNIAJONNAABEOLPBFBNJLDNOOBJKONOBODJNOLCCHONO
CENODNCHPOOLDKLPOCNCOOOCPDBNODPFDNODAKEOOANNJOODGIONONNGBJONEAFOODNEGONH
GNINONHLKNONAPKOAAOKBFOOPJALOOFHAPDBODFOOFGOHAOFFJIOPFHNGJEDGPCEDLONJOPA
OPGODBPBDOOPFJLDPFLIGDOGFJIDOGKGKBOGNCNOOGGOAOOHHCEOOHHHFOPAHJDOPAOOLOPA
IOGNDBAOAPPBIHJOOICALAOIINDOPGBIKPPBJFBOOIGNNFAEJKOOHBJEADOLKBGDNNBGGDPC
DIBOEDNFDNOBCLDPENCCOPPCNNBDPDOADNPDHJIDOLBDBEOCOGDNNKLNNODNGNKANOOHINOC
KNOPPKDJPDPDNEBOPEECNPBBNIDOONLLHNPECGKEPENOGEAGEAOGEDCDLDOGNKLOPLNFEOOE
NHJONHNJFOPHNLDONINANPBGIBPBONENNOPFIDNNBBNPNPBPFNNPBBOFNOOOFKEODBGDLPOO
GGBPBIHPDPOGGKJPAGPCEOOPBOHDPNDHKOPJBOCDPHGNEAPHENNPOPHIAPPABHLDPHACGOPA
NNIIPAGBAOPIINDPPIIFFOPIBDJPPIIPBOOJJDNOPIEGNAAEEPBAHCJPFPPJBDHOPJKLNFPC
ONEPPCCLHADBCOAAADLDGEBFINLNOICECPBFOAOAACDADAELBHNEPCJCPNDNLCEOOLBNFOPK
EOGJPDKJGPBBDJGPAGDLAPAHKFGNAGNBAONPKGBNNLNGIOPLEECPOANFKPNPCHNPPLBEJDNL
IELEOGPDIBNNEPHOOENNDPBPOANOPFNNEEOOFPGPOOGBJPOODBGJOJJIOOFOEHJAEDGBBEBI

GKJPOPHDLPOPHFCPPPPPKOPHPLGOBKHHNOPHIDLEPACIDABPCJLAACLDGEIJCJMPEMANDPOI
PPCPPBJPGPOLDEFPHODCBKDBNANDNOGOGANLHEGAOKEILPODBIDFHHGLDOBPHIPNOEEHIOBK
NNEODBPDABOOFMMPEMOEPOPFOGBOPGOJBOJDBGNDPBBPNPFADJBEEGIBKBPGPJDOPHPLFOPH
PCPPOPHKDPPAPDHBOHHNLPPGOIFPBHPCGEIJCJMPEMANDPOIPPCPPBJPGPOLDEFPHOBIOFON
AMJDCEONPNOCDAHIODGGINPEDLGOKGGLDOBPHIPNOEEHIOBKGHOBPGIBDBBPOAMOPFMMEEOO
FPGPOOGBJPOODBCJPIIPBPPJBNJPEDGBBEBIGKJPOPHDLPOPHFCPPPPPKOPHADDPBPHHNOPH
GLIPPOEIGJIJCJMPEMANDPOIPPCPPBJPGPOLDEFPHOALBIDBNANDNOCPAOIDDHGONGEILPOD
BIAFPNHEAAPPMDCPEFNFPOOEEHIOBKGHKBPOPLGOBKOAMOPFMMEEOOFPGPOOGBJPOODBGJDB
EGMAAEEPBAHCDJBEEGIBKBPGPJDOPHPLFOPHPCPPOPHKDPPAPDHBOHHNLPPGOIKPPOPCGEIJ
CJMPEMANDPOIPPCPPBJPGPOLDEFPHOBIAFPNNBMPDAEJMCNOCPAOIDDHGONGEIAPJBPMEMOB
OMDJGHGLDOBPHIPNOEEHIOBKGHOBPGIBDBBPOAMOPFMMEEOOFPGPOOGBJPOODBCJPIIPBPPJ
BNJPEDHCNAPKAEGBBAOBBCCOBAMBBBBIHBFEMHOCBBCAHBCMMFBCCMFEGDADDDDAADMMDCBD
DADAADDDIABDEHEFCNMOACADNIBCCOOBBCCOOBBCCOOBBCCOOBPCBDENPBBEFDCBBFFFHBBF
FJLBOHFPDBEBAAJDDBDOLCCAKOICBHHKIBDIGBCBAHIBFBBHHBDBCFGAHBBGDOLCCAKOECBL
JJFBBAGBCBAHIBFBBHHBOBBLKFHBBKKJHBBGDOLCCAKOECBLAIFCBAGBCBAHIBFBBHHBOBBL
GLBCCBDOLCCAKOJCBMGCFBBAGBCBAHIBFBBHHBABBOPGGBPFMFLBCAKOJCBMNKFBBAGBCBAH
IBFBBHHBJBCHGHOBCDALOCCKAGJCBOIIBDBGHCBABIHFBBBHIHDCBPIKGCPFMFLBCAKOGCCA
FMFBBAGBCBAHIBFBBHHBJBCJGHOBCDALOCCKJFBCBHAFBBBGHCBABIHFBBBHLGLECGBBOCCD
ALOCCKAGCCCKIIBDBGHCBABIHFBBBHBNKCAAEPMCKAGLDOBPHIPNOEEHIOBKGHOBPGIBDBBP
OAMOPFMMEEOOFPGPOOGBJPOODBCJPIIPBPPJBNJPEDKJLBAGDKBBCOOBCCBBBMIBBBNGHCBB
BOABBCMMFCCHMBBCDKDGDACNCNDBBDDGHAADDGDAADDEGABDCHIBBDDEIACNOBBCCOOBBCCO
OBBCCOOBBCCODPOBDOAOGECLLIJCCBCNJAAEGOGIDAPJPCACEILCFMGMAADAENIFCENLBFBH
APGEADFJLBBHAFBBBGHCBABIHFBBBHFDACBGGHOBCDALOCCKLEJBBJAFBBBGHCBABIHFBBBH
LOFBBKKHJBBKGHOBCDALOCCKLEIBCAAFBBBGHCBABIKFBBBHLOLBCGBBOCCDALOCCKMJCBBG
AFBBBGHCBABIKFBBBHOAGBBPFGFPBMALOCCKMJKBBMAFBBBGHCBABIHFBBBHHJHCBGDOLCCA
KOGCCAOJIBDIGBCBAHIBFBBHHBHBCIPDKBCIFGFPBMALOCCKAGMCBPAFBBBGHCBABIHFBBBH
JJHCBGDOLCCAKOFCCJHBFBBAGBCBAHIBFBBHHBGBELGLBCCBDOLCCAKOGCCAKCICDIGBCBAH
IBFBBHHBNBCBAKPACEAMLKOGPDIBNMEPHOOEKIHBBGGOBPBIPDABOOFMMPEMOEPOPFOGBOPG
OJBOJDICPPPIJBMPPBDJJEBKGLHAADOBBCCOBDHBBBBIGBCMBMOBBBCAMBCMMFBCCMKBGDAD
MDJCBDDANBKEMKKCEBCMFBADGAIKCMOBBCCOOBBCCOOBBCCOOBBCCODPOBDOGDLBBIDHIABH
FBJBAEGOGIDAPJPCACEILCFMGMAADAENIFCENLBFBHHALABIDHJABFHLFBBAGBCBAHIBFBBH
HBDBCFGAHBBGDOLCCAKOECBLJJFBBAGBCBAHIBFBBHHBOBBLKFHBBKKJHBBGDOLCCAKOECBL
AIFCBAGBCBAHIBFBBHHBOBBLGLBCCBDOLCCAKOJCBMGCFBBAGBCBAHIBFBBHHBABBOPGGBPF
MFLBCAKOJCBMNKFBBAGBCBAHIBFBBHHBJBCHGHOBCDALOCCKAGJCBOIIBDBGHCBABIHFBBBH
IHDCBPIKGCPFMFLBCAKOGCCAPMFBBAGBCBAHIBFBBHHBJBCJGHOBCDALOCCKJFBCBHAFBBBG
HCBABIHFBBBHLGLECGBBOCCDALOCCKAGCCCKIIBDBGHCBABIHFBBBHBNKCAAEPHCKAGLDOBP
MIPNOEEHIOBKGHOBPGIBDBBPOAMOPFMMEEOOFPGPOOGBJPOODBCJPIIPBPPJBNJPEDHCAAAH
ILHBADLJBCCOCBPCBABMPBCLDGMBCMBOABBCMMFCCMMBHCBDGAEKADCAABACDJABCNDGFAAD
NBGCBDNEBCBODHIACNOBBCCOOBBCCOOBBCCOOBBCCODPNBCPAHIDCOOKMCCOGFEADAPNHCDA
OIKCCOPJGCAGAENDCPAHJDDAGFPBAFACODAGAENDCPAHJDDAGFLBDAANPDCOFAEPNJBELDOO
BKMDDBGOKADKCBDDDCDCDDOEBELDDCFCBPODKLEDDDOAKODDGPMADDNKBIDEEDFDDEEHHDOP
FJNDDEDNPADEJPBPDKEBFDBAGJKAIEAHKCDHHALABILCCFIOLJKJKGLHLODFFNDDBFFCLBFG
OBKODIGJLDDGDDDJBFFONDEFLGEOPDKEAODMIACDDIGOIMBIGFHDDGGJLDDGEIKCBNFAPAAE
FAFADJPDHCGBJJLDDJHNNDEFKBDDDKGGIEDKGPMADDCEGDDCFLNADKKPKDKGNIEGNJLIPDEH
LHPODLHNIDDOACKBDOMIKDDMMMODDMAMJDCENCEDDNJLNODHLBBNDBCPPPPGJDMMAGOBPDEI
LHPODLHNIDDOACKBDOGOIBEMOOADDPPCEDDPPGLDDJHNNDEFEDBEDEGONDGCGJHACABJHEPE
LMMIAGOBCDNJLGEOPDFKGDEAIDNLBEAMAEAHILHBFEDMCAEHBFHEEBBJLEEBBNFEFBCBEEFH
PLINPECHGEEGDODEDECOJEPMAKFAMIDCHEJJDCBPPONCGJEPEPHOENBJEKIHBGHDACCKHAAC
PGPEOEMHMELOBGHDACCKHAACPGPEOEMHIEHFFLIAJGFNCANLAJHAENFPLAAGFLIAJGFEGODH
JPAOAHKBCOJMFIDHENNGGDDNHMPDHNJPAOAHKBCOJMFPLAAGNDGEDNNGHDDHLFDFAHDLNEED
GMPNPJEDLECDEGAEGEJAHHOLCCPAEENOHBAGFCCEEHEOHGEFGGJAEFGOLBEFFNPEEIJHLLKK
GINEFCJHAJPOFENDIFJKELMGINBMHDLOENDFJGJPCAFIKHDHKDKNENDIGCAHDHAAGFNKIEEI
MHIEHFMLPNAFGLPALFHOLMMMHPPEONHEBAENHGMOJMNHLHLGDEGCNEGLCNIOMHIEHFNDAEAH
DHAAGFNKEECDEGLMNGOCHIENFPLAAGGCBFAEEDNAFHEBBAAEDAJAHHCCEACDNNKNKPJGAPID
HOGBDKFIKHDHKDIMEIMHIEHFMLPNAFGLCAJFMPEOAHNBGEOHMMHJHNGLALAHIMAFIDHOGBDK
JEOLNFAKPMJANPLGKKMKKLGDNMDLNENOILHJHDPAODDHPAAFDCHAIALGGKFAMAEPAHHKDDAH
DPJOAGDHPAAFDCIAIDOKCPEPEDJLNEGKPIEIJGJPCAFIKHDHKDKNENDIGCAHAEGGELMPDFFE
DNAABHEELDDBHIIAEIMHIEHFNLPNAFGLPALFHOLMMMHPPEONHEOAMPHGMOJMNHLHLGDEGCNE
GLLNFHMHIEHFNDAEAHDHOAACDCKAENDEGCNEGLLNFHMHPEAFGLCAFGEBDAAEHNBFAEEBAAAD
HJCHACDENCHPOBEHAHPODNENHDPAODDHPAAFDCIAEIPOKIDFDENCHPLPBPPMHKDFENHDPAOD
GJHAADFPCAADDIKIPOPCBEBDCHDIENDENCMNPKGKPJDAOIBHKGIDHFHKDONKIIHEENFILHNM
FPLAAGFCPJONHEOAMPHGMOJMNHLHLGHAMAFIDAOIBHKGEDLJFOKNMAAPPJGNKLPKMADKMGLM
EDINMMNDKLNEIPGEPJAJICHFHKDDMKMKIECDHGEAGALGPEFNEDNFADBFLEHNJKICEINHIEHF
NLPNAFGLPALFHOLMMMHPPEONHEEAFOHGNOHBEOPAAECACHHCFAPAAEIJJOAEHJDPENDENCMN
OIKKNDFOKMMAAPPJGNKLCKMGDKMGLNEDINMMNDKLNEIPGEPJAJICHFHKDDMKMKIECDHGEAGA
LGPEFNEDNFADBILCDAMAJDDNMHIEHFCNHAENFPLAAGFPOLNHNLPNEHMPEOAHBOIDJMHNCNKB
EGBAHCBNHEKMAOPFAEFCDAENDENCMNOIKKNDFOKMMAAPPJGNKLEKMJDKMGLNEDINMMNDKLNE
IPGEPJAJICHFHKDDMKNKIECDHGEAGALGPEFNEDNFADAFJBAGALADDNNJHDENFINMACMHPEAF
GLPALFHOLMMMHPPEONHEOADBAONKNHBCOKFOJDPDAFEGBAAEEJDAOHEEDAENDEGCNEJGAPID
HOGBDKFIKHDHKDIMEIMHIEHFNLPNAFGLCAJFMPEOAHBOODKAHNKNLGHGEHLLKCGBDKNNIMKO
DKONMFAKPMJANPLGKKOFKMGDNMDLNENIDHLNEKPNEIJGJPCAFIKHDHKDJNDNJJOHAGHGEAGA
LGPEFNEDNFADOAPBENIKPHLGCMHAENFINHACMHPEAFGLPALFHOLMMMHPPEONHEOADBCMMHNH
BCOKAEEPAAHCCCBHAEGNJOAEEMPAOPENEJCDNNINKODKONMFAKCMMODOCNBGEBKMGDMMDLNE
MIDNLNEKPNEIJGJPCAFIKHDHKDKNENDIGCAHAEGGELMPDFFEDNFAAGGNLDDAMAJDDNMHIEHF
CMHAENFPLAAGFPOLNHNLPNEHMPEOAHBOFDHHDECOKBEOPAAECACNHCEBMAOGEJHAAEPPNOJE
DENCMNOIKKNDFOKMMAOCOMNDGCNBKKECINNDHPGEPJAJICHFHKDDMKNKIECDHGHAADFAKGEN
IIHEENFILHNMFPLAAGFCPJONHEDAHOHGNOJMNHLHLGFGADCHMNCBHILOENDFJGAPIDHOGBDK
FIKHDKKDKMENHAHAADFAKGENGBDDAEHNBFAEEBAAADFBPGLFHOLMMMHPPEONHEDAHOHGMOJM
MHLHLGGBOEBHKGNDMNOIKKNDFOKMMAOCOMNDGCABKPECINNDHPGEPJAJICHFHKDDMKNKIECD
HGEAGALGPEFNEDNFADHAEBDEBLIDAHNJHDENFINHACMHPEAFGLCAJFMPEOAHBONDIEHNKNLG
NDGEDFHAMCBNICOMMLFEGDPJDAOIBHKGIDHFHKDDMKNKAEAHDHOAACDCKAENGBDDAEHNBFAE
EBAAADFBPGLFHOLMMMHPPEONHEOADBENNINHGKILNIKCGBDKNNINKODKONMFAKCMMODOPNKF
GIBEKPGCBNIBBBKNEGJGAPIDHOGBDKFIKHDHKDKNENHAHAADJCKIENGBDDAEHNBFAEEBAAAD
FBPGLFHOLMMMHPPEONHEBAENACMPNHBCOKAEEPEAAFAPFPAEHDDOAEBOEPAEIICMBKKGNDMN
OIKKNDFOKMMAOCOMNOFPBKADJKELMGDOBHEJGKGEPJAJICHFHKDDMKNKIECDHGEAGALGPEFM
EDNFADHAMAADFAGGNEMHIEHFCMHAENFPLAAGJPLDFFJBKEEGMPEOAHOBGIOHMMHJHNGLGLDF

HAPCCIFBPGDJFLBFEJGKGEPJAJICHFHKDDHKNKIECDHGEAGALGPEFHEDHFADHAHAADFAGGHE
HHIEHFCHHAEHFPLAAGJPLDFFJBKEEGHPEOAHOBGIOHHHHJHHGLGLDFHAPCCIDCOAELFLBFEJ
CADAAFDIOCBGEGCAAFEFFAAEGDHBADFADGELHPDHAHIDPLBKGBDDAEHHBFAEEBAAADLDFEDH
DJJHGFLABJEJGKGEPJDAOIBHKGIDHFHKDDHKNKAEAHDHAAGFHJEHENEBDAAEHHBFAEEBAAAD
FBPGDJFLBFEJGKPEOHHEBAIOHGHOJHHHLHLGGBOEBHKGODELOILKHEFGFHJIBFHJHDJDBJEJ
GKGEPJDAOIBHKGIDHFHKDDHKNKAEAHDHAAGFDBCAAGNKBEDGEDHAFHEBBAAEDABAGFJPLDFF
JBKEEGHPEOAHOBGIOHHHHJHHGLALAHIHAFIDHOGBDKLOIEKOLGEOPDKGPPKFDBHAEAEOPAAE
JEJDAHHHHEDOHAAAAHEJHCFFFHDENGOBHHHDGGHJIKHKKLGDHHDLNEHIDHLHEKPHEIJGAPAC
LKDGLAKBKODFFPKHEHHAHAADFACGADIIHEEHFPLAAGFPOLHHHLPHEHHPEOAHEEGJOHHHHJHH
GLKLGLADHLGFFCLJHGFGCJJHFPLAAGHDOEFGFPLAAEEFJAAFFCHGGCADHLGFGACHJJGCANJG
AHHJLJKLIKJGJKELHGIHBHHDLOEHDFJGAPACLKDGLAKBKODFFPKHEHHAHAADFADGADIIHEEH
FPLAAGFPOLHHHLPHEHHPEOAHHBCEGAHHCHKBEOPAAEFEPAPAEFDAOHEDOAPBEEFAHCFPDALA
FHAGHGJCCJHGGAHJJAJHLLKKCDKBLJGEBHIGJHAHPHHEKADHHDPAODGGHAADFPCAADDIKIPD
PCDELEFCGJPJAJICHFHKDDHKNKIECDHGEAGALGPEFHEDHFADHAEBDEBLIDAHHJHDEHFIHHAC
HHPEAFGLCAJFHPEOAHHEGJOHHHHJHHGLGLDFHAHCBHICOHHLFEGDPJIEJBEKLGKEDHKDKHEH
HAHAADCOCAADHKBEDGEDHAFHEBBAAEDABAGFFPOLHHHLPHEHHPEOAHHEGJOHHHHJHHGLGLAG
KJGEELPHPHPLHBHPJHHDDEAHDPGOAGDHPAAFDCIAIDOKCPEPDBHBICHDGEAGKJGEELHHKHKP
JGAPIDHOGBDKFIKHDHKDIHEIHHIEHFHLPHAFGLCAJFHPEOAHHEGJOHHHHJHHGLALAHIHAFID
HOGBDKJEOLHFAKCHHODOPHKFJEKHGDHHDLHEHPGEPJAJICHFHKDDHKNKIECDHGEAGALGPEFH
EDHFADHAEBDEBLIDAHHJHDEHFIHHACHHPEAFGLCAJFHPEOAHHBOEKAHHKHLGHDGEDFHAHCBH
ICOHHLFEGDPJIEJBEKLGKEDHFHILAHHIKAEHHAHAADCOCAADHKBEDGEDHAFHEBBAAEDABAGF
FPOLHHHLPHEHHPEOAHHBOEKAHHCHKBEOPAAEFEHAFGFHOAAEAHDFEHGGJAEKLGHEHHPKGKPJ
DAOIBHKGIDHFHKDDHKIIHEEHFILHHHFPLAAGFCPJOHHEBAEHAOHKHHGKDLEHHAHAFIDAOIBH
KGEDLJFOKHHAOCOHHDFPFKHODKHGLHEDPHEHJGJPCAFIKHDHKDKHEHDIGCAHAEGGELHPDFFE
DHAABHEELDDBHIJADHHHIEHFCHHAEHFPLAAGFCPJOHHEBAEHCHHHHHGKDLEHFGADCHHHCBHI
LOEHDFJGEPBIKJGEELHKDDHKNKAEAHDHOAACDCKAEHADJLAHFIHALAICLIHHHPPEOHHEBAEH
CHHHHHBCHKIDCACHHCELFAAEFJDAEHGGJAEKLGHEHHPKGKPJDAOIBHKGIDHFHKDDHKIIHEEH
FILHHHFPLAAGFCPJOHHEBAEHCHHHHHGKDLEHHAHAFIDAOIBHKGEDLJFOKHHAOCOHHDFPBKHE
DKHGLHEDOHLHHAEPAHHKDDAHDPJOAGDHPAAFDCIAIDOKCPEPEDCLJFJGJPCAFIKHDHKDKHEH
DIGCAHAEGGELHPDFFEDHAABHEELDDBHIJADHHHIEHFCHHAEHFPLAAGFCPJOHHEBAEHHFEHOD
GKDLEHFGADCHHHCBHILOEHDFJGEPDGHKLAHHJKKCDHKDKHEHHAHAADCOCAADHKBEDGEDHAFH
EBBAAEDABAGFFPOLHHHLPHEHHPEOAHHBFEHHDEKOLGHDGEPOHLKHCJPHPHPLHBHPEDHFKHDF
HDPAODGJHAADFPCAADDIKIPOPCBEBDCHDIEHOGLPHHJKHCHHPKGKPJDAOIBHKGIDHFHKDDHK
IIHEEHFILHHHFPLAAGFCPJOHHEBAEHHFEHODGKDLEHHAHAFIDAOIBHKGEDLJFOKHHAOCOHHD
FPHKKKECIHHDHPGEPJAJICHFHKDDHKNKIECDHGEAGALGPEFHEDHFADHAEBDEBLIDAHHJHDEH
FIHHACHHPEAFGLCAJFHPEOAHHBEEHOHHKHLGHDGEDFHAHCBHICOHHLFEGDPJGEKDAHHLKHCJ
HKHDLFHIIAAHHKAEAHDHOAACDCKAEHGBDDAEHHBFAEEBAAADFBPGLFHOLHHHHPPEOHHEBAEH
OENHHHBCOKAEEPEAAFGNHFAFEONAFANDGEPONLKHCJNNKNKPJGAPIDHOGBDKFIKHDHKDIMEI
MHIEHFMLPNAFGLCAJFMPEOAHNBEEHOHNKNLGNDAEAHIMAFIDHOGBDKJEOLMFAKCMMODOPMKF
PACKNEDIPNEHJGJPCAFIKHDHKDKMENDIGCAHAEGGELMPDFFEDNAABHEELDDBHIJADNMHIEHF
CMHAEMFPLAAGFCPJONHEBAENEMNINMGKDLENFGADCHNMCBHILOEMDFJGEPDGHKLAHNJKKCDH
KDKMENHAHAADCOCAADNKDELAHJIAAFANCLIINLPMEHMPEOAHNBMEIEHNCNKBDMAIHCCCLHAE
EFJAAFNDGEPONLKHCJNNKMKPJGAPIDHOGBDKFIKHDHKDIMEIMHIEHFMLPNAFGLCAJFMPEOAH
NBMEIEHNKNLGNDAEAHIMAFIDHOGBDKJEOLMFAKCMMODONNMAGIBEKPIHCLIGMAEPAHHKDDAH
DPGOAGDHPAAFDCIAIDOKCPEPEDCLJFJGJPCAFIKHDHKDKMENDIGCAHAEGGELMPDFFEDNAABH
EELDDBHIJADNMHIEHFCMHAEMFPLAAGFCPJONHEOAMPACNPNHGKDLENFGADCHNMCBHILOEMDF
JGBPFEHKDDMKNKAEAHDHOAACDCKAENGOLDBINKBEDGEDNAFHEBBAAEDABAGFFPOLMHMLPMEH
MPEOAHPOCMPAHNKNLGNDGEELPMPMPLMBKPFHACCPACHDPAODGGHAADFPCAADDIKIPOPCBEBD
CHDIENLGNEMNPKGKPJDAOIBHKGIDHFHKDDMKIIHEEMFILHNMFPLAAGFCPJONHEOAMPACNPNH
GKDLENHAMAFIDAOIBHKGEDLJFOKMMAOCONNDANBMADJKELMGGBKIEGJGJPCAFIKHDHKDKMEN
DIGCAHAEGGELMPDFFEDNAABHEELDDBHIJADNMHIEHFCMHAEMFPLAAGFCPJONHEOAMPOCNINH
GKDLENFGADCHNMCBHILOEMDFJGBPFEHKDDMKNKAEAHDHOAACDCKAENGOLDBIHIIAAHNKBEDG
EDNAFHEBBAAEDABAGFFPOLMHMLPMEHMPEOAHPOCMIOHNCNKBDMAIHCFEOAPBFCOAAENDGEEL
NNKMKPJGAPIDHOGBDKFIKHDHKDIMEIMHIEHFMLPNAFGLCAJFMPEOAHPOCMIOHNKNLGNDAEAH
IMAFIDHOGBDKJEOLMFAKCMMODONNMAMKKLGDMMDLMEHPGEPJAJICHFHKDDMKNKIECDHGEAGA
LGPEFMEDNFADHAEBDEBLIDAHNJHDEMFIMHACMHPEAFGLCAJFMPEOAHPOLMFMHNKNLGNDGEDF
HAMCBNICOHMLFEGDPJEBKFDHKDKMENHAHAADCOCAADNKOEDGILKBENADJLAHFIMALAICLIMM
HPPEOMHEOAMPHLMFMMBCNKIDCACHHCELFAAEFJDAENLGNEMNPKGKPJDAOIBHKGIDHFHKDDMK
IIHEEMFILHNMFPLAAGFCPJONHEOAMPHLMFMMGKDLENHAMAFIDAOIBHKGEDLJFOKMMAOCONND
ANPMMADKMGLMEDONLMKCFHAGDBOAIENECKEPEDCLJFJGAPIDMPKEMIMHKDDHKDKMENOABBGF
FCPJONHEOAMPACNGNHGKDLENFGCDBGKALMMDICOHMLFEGDPJIJKBHNFBMIEKHKDDMKNKAEBO
HJJHHJDBOAIENDJEHGGLPHLFHOLMMMHPPEOMHEOAMPACNGNHGKALIFNMCHIFMEJMNFIJFJAG
DBOAIENECKEPGJCHPAEOKJHNFBOIHNGACNJJIHPLEIJGAPACABHMDKFKDDMKNKAEBOFBCGJF
MPEOAHPOCMGAHNKNLGNDAEAHIMAFACABNMKNKCLLNDKJIKLMPJCEMGDKMGLMEDPNEHJGAPID
MPKEMIMHKDDHKDKMENOABBGFFCPJONHEOAMPMINJNMGKDLENFGCDBGKALMMDICOHMLFEGDPJ
IJKBHNFBMIEKHKDDMKNKAEBOHJJHHJDBOAIENDJEHGCOAABDAMCLIINLPMEHMPEOAHPOIMJM
HMCNKBDMAIHCFCPAAFGNMOAEFFMAJEEEMIHOIBAHNGJCHJLIIPGEPJCABAMAKHKDDFKDKMEN
OABBGFFCPJONHEOAMPMINJNMGKDLENHAMAFICABAMANMCKLKDLJNKKMIDLMJJKELMGGBKIEG
JGAPIDMPKEMIMHKDDHKDKMENOABBGFFCPJONHEOAMPAONKMHGKDLENFGCDBGKALMMDICOHML
FEGDPJIJFBAHABKLLKGEKADHKDKMENOABBGFFPOLMHMLPMEHMPEOAHPOONKAHNKNLGHMFHAH
ABKLLKDMLMMJCEGPDBNJHMDKOFBHAHNJEHPAGNMDLOJLPMBGOBEHAMPOONKAHNKNLGHGAHLG
NJNMKNJLPMBGNOPENPPOONKAMHBELCCDHDACEMHAACHGAHLGNJNMKNHMCHMFOHKMEGJGAPAC
ABHMDKFKDDMKNKAEBOFBCGJFMPEOAHPOOMKAHNKNLGNDAEAHIMAFACABNMKNKCLLNDKJIKLM
PJFEMODKMGLMEDPNEHJGAPIDMPKEMIMHKDDHKDKMENOABBGFFCPJONHEOAMPCMNHNHGKDLEN
FGCDBGKALMMDICOHMLFEGDPJIJFBAHABKLLKGEKADHFHILAHHIKAENOABBGFFPOLMHMLPMEH
MPEOAHPONMMCHMCNKBEOPAAEFENAFGFHOAAEAMMFHMMFBALAKKMLMDHMCHMFOHKMEGJGAPAC
ABHMDKFKDDMKNKAEBOFBCGJFMPEOAHPONMMCHNKNLGNDAEAHIMAFACABNMKNKCLLNDKJIKLM
PJBENEDKMGLMEDIMMMMDKLMEIPGEPJCAPAJPMMCIHEHBJAHMAENPDGBJEKIHBMENLLMLPMEH
MPEOAHPOFMMMDEKOLGCCAKJFEGOMMPGIEAEIFKCMJMBJPKEJCDHDACFFHAACCCAKJFMMIMKO
DKOMMFAKCMMODOMMMAKNCKMEDIIMMMMDKLMEIPGEPJCAPAJPMMCIHEHBIAAHIIEEPAGMJDKB
MEMINBLELLMMHPPEOMHEOAMPOEMHMMBCMKIDMHOKMFBHCKKFCDAKMGJCCJMGGAMJJAJMLLKK
DCAAKPECIMMDMIDMLMEKPMEIJGAPACMJHMDKOFBHAHHJEHPAGMMDLOBMENLLMLPMEHMPEOAH
POMMIEHMKMLGEMFMKFFCOJMPGIEAEIDCMAIEMMBELCCDHDACEOHAACEMFMKFGACMJJGCAMJG
AMHJLJKLGKICJKELMGIMBMMDLOEMDFJGAPACMJHMDKOFBHAHHIIAEIAEMPDGOMMLMBLELLMM
HPPEOMMEEAFOACMPMMBCMKIDMHOKMFBHDKMAKCAKMGJCCJMGGAMJJAJMLLKKDDBAADJKELMG
IMBMHDLDEMDFJGAPIDABKLLKGEKADMKDKMEMOABBGFFPOLMHMLPMEHMPEOAHOECFIOMMKMLG
IIKMHMFCCLLMFCGJPJCAJAMMKHFDHOMBJAHMAEMPDGOMLLMJGPBBMOHEEAFOOCMIMMGKGLMM

GAJLMNNNLKMJGPOBEMPPENFOOCHIEMCBDLDCCHMAAECHGAHHGAJLMNNNMKMHFCHMMOGKGEPJ
CABAMAKHKDDFKDKMENOABBSFFCPJOMHEEAFOOCNINHGKDLENHAMAFICABAMANNCKLKDLJNKK
MIELEFDDKALMDKNGLMEDPNEHJGAPIDABKLLKGEKADHKDJMHHJJBHAHFBCGJFMPEOAHOELFFH
HNKNLGNDGEDFGCPBKOGOBBGFFCGJPJDABILAKKELAGHKDDMKAAABPJDABILAKKELAGHKDDMK
DCEELAAACBKCEMJMBICCEAKENIKBAAIEMDIHAPOJMMKBPDCFINBLDKCIEAMMJADBFAEOJJDJ
ADKBAEGJPCOFMJJCIBCCOAHIAEOBPBALJLDHGDNGJECBADCCKAECIGBAHDHKJMADKCAHMLDC
CGGBMKCEJDFBAEJNIPBEOFMEJJCBJAKAEBIEDHBLOGIMDILBOCMFIMBLDLHOAMDJLCOEEJIC
CKMLPMAMBKHDKGKGIEALKFEOPNMJNDGHMLJHGFIJBCDMFKFFCJINKGAFAPKCMFLJBGIEEEIK
BGDBGKOEMIJGCLEJJDCIMDIOIFDLBEMENNKIHNNJPGFMCMHEGGFBLKEJODNEMAPLHEKPNKKJ
HPKNAKMOFKBIIEMIMDFPFDKOHMFLJJOGOGKIJPHDLOFAABCCIJBLDIHFOIIAFAPBCCDGMEJN
JDFJMHLNIMPEILFCMOHKGBEHJOANKCAIBODIGFMGBMKFLJLDAOBLNNLMHNFDAFHMHFLAFGJA
KGLPFAHJPCOEELJDCAEOLCJELMOCKEIIJECJCIIFAPPFKMNNCBHDCIGPCGIOHJODIGEMBKDK
GJPALHFLGPJBABOHFDBNEANFDBEMBJMENFKFBHEKJNEBNGFHGIIBGBEFNIEOIGHJJFFIHOLK
CBPIIFICGCEBJFFGIBBPENOGCBIIANGGBGBAIEMJINDIGBFFBFHKFHNKGJBKICMFCBAICHCO
FIJDGHCELGIFGDICALKGGINMFCMIIJMINHFKBEHGEHBKIGKGHFIFJIINBDPNPIKBIJEMEJLI
JGIBFCKCDIFHHBHGBFMJODILNMINHGOBFGENKCLGGBJEDJIKPFJIILFHJGHICAJAAMGOOJOA
GGCMBKFJJPFPDACKDJCGHIDEDOJJNCINGJICPAFKFKHHKGGBEGEGHDFIHEAGBLGCKFAAICBI
BOIFLBAGEDLOINBBAGJFDDOIHAOHHNBOONNHNPHPABLKDBKAACJLNCGGBLGONIBBNIBHJGCN
CNDIEGBNBOMJGFBEJHHBHIKJFMFPMNDJAHJNHEGGFFHHNNKIJBCFDJNKAMNPGFOIGHKLNBMB
DKNDJHGNPKHIAGJAGBDMFLFEGHADJJLANDJEMBDGHKCEGIHJAOFLGMJJDFBGPEFMHENDIBPA
CMLGMPDCMLCNEFGDKACBAHFGMELCIFGOBJADJNDAMFAJBAIOMLCLENOHCKJICNHNMLNBIGJP
HOPMPJAHKAIANJPFGICCJMECBOFHKHLKDJAJALOPLHHNKGAGAHKAHAACNMJHKBIICKMKKIEC
IPEGDKCJKJFDFJEKCFANJKAGGMFKKHAFIDIKLAKKMNAGAHJEKLMKMKIKNJJALGLCLJKOGIFI
NBEALBJDBGKPDGHDLCLBGKLMBGHDKHOGAGOMKKGOIOEFHDKMANNHPKPAKNEHNDKGCLLJLNHO
GEFNKKHHEKKMJBMPDDHOBBAEBDFCHMDBEFBBEDFECBEFBBEEMEDHPEKLEFFDDNNFHNBMHKGK
HAKIELMHPMOGJEHBMOOKGAMONLEGNMGNMPDPJLAJGFIHBJMLJNBDMHCACEOKMGKCINIGFMIG
KEJEJGHMKJFIDDNEJADCKOACLDPMOJMBKCCGMMLEIPMIMCGNJJJMJJABNOPFOABKNFFAHILI
IKJFFOLDNBHDJLHKJLNCKCOLJNGFJAKIODDMDFKBCKFPLNCPFLFLOHLNHDIMJJLPOOGHJKLE
MLCGHANNCNIDDOGKKBIHDGOOHBOEJAEODOHCKFJHSLGEMDOGFFKPBMFNPEHIOHDOBFKLGPNH
BMLFOKMBLCDOIDANMKAHCNJGOMHBADMPHJGNLHHDKNPANOFKPKENBBBOHIFAFNKJJKKDKPHC
PJEKHPGAOCJJPHCIPGAFCHDMIBAKOLGJIPBEFAMCDMMFEBIESOAEPLFMPJGAHGLOKGKFGJHN
LPALBMEELMPGLOPIJNAJHBHMGLBOEEBIOHDIMIIBCMHLJECDJJEDPKKAAABKCKCADAHIKCMI
EENOAFACOHLMOBFLGFHIMOEAIOICAHNNKEIAFEDIPECBEDNKBFAGDJOMIGEJCKAICCBMAGKC
ACCCNCIBFCHLFAALALOJCAIHDBLEABADBJGBJCBEEBBGACJPMAEACBGKMJOCFEMKCAAHDJHM
GBAMBHABMBAKHMBCADBBKKCEDANFBDIBMJMEFCICBJJAEBAHFMBAJFEDHGKCADBAJEGAAOIB
HMIIBEALHJMIEEICMACCGGHIADCDBBOJAGIBNMGJCKDOAEKCBAPNBCEECDBOIJIGDGMEKBNH
DCFJBKCJAOLBJDGILMGBBMEJCJMGOHCMBBANENNMINBFLBKIMFOKABKHIMCABIODBBBPKCMG
JMLANBINHANEMNBMEBFAEHNPNMPBCCHJNMKDCBPNAIEIEBLCIFJBGEHAGECOJPADENEHECFC
JCIEKEKECFCDIDMJBPJGHCJDFGLEBCCIJBBIMHNALEILIHKMCEJDCJDJFJMEFECGPBANKPIM
GFCLOBBAEPCHFGLBJDLEHMAIODGOOJBDFNKGNBDHLPHMGDBMIHFJMMKJBMJDAOMJOMFOBPPP
CIENECBKHCAMNCFMOEEDKNOJIGEIEODCJANLOECGEENCAJJOHFIGJDENODCEKHGOMKBAJKBN
GGIEJEHGGIOCEADMIKMKCDKKFCDHEKFEAABDOMJJFCDJFAHBJNPHCMGCDOBNDCFDLGGMEBAG
DFKIEBBHIOFEAHDHCEOKAMGODAALAOCHBCAGDKCIGIDCDADIBCAOMJNANEDALIKEAMKCPCAJ
FAGLFADJIMDAOOFJHEEICJBLDCFCNDIBFICBAIFCEIECBAIEMAIECCAMAEAGNPDCABFDJNAK
BOBDFAJFAOFGGFJEKIBMIFMLCHJAGEAKFFBIMCBAIKDAIFCJIAIAAPHMNAAOAKOGPKFEBDIA
AAAGHIIIIBBBPIOKJDCJFACBKNEODIACBKHJOJJLBNIOABAOHJAICDJJEEKAICNCJGJGFJDG
NEGHPFDMPLEFNBHGPEDJGEDEODGGBNNCELIIAEDEJIHCKEKDBNOFIAMHKCCIMDKBMNHMIIED
BLOJEMIJBCNHKLBFMFCGHBDDKKFBIHHAHEKFOAGMOJCHGLEIKKJHOGHCJENOCMOLDEKHMIEO
CDIKLEIHPAJECJCMGJKKFCFJOCNDLKFCNMOJCDODLIBDKCBKDFANEIFFGKBMBJOLKDKIGKDB
IOHHMNCLFGCHJDCIDNJEOBANNFMDKBPNBOFJDNLAIKJFKMOFDNGLFKNHNKNGLHFGILEJHCMF
CLFNKLJFNPKLOOBFAEHNPNGLGAAHFLNIMDCGHGCNILJFHAGDBPBLNJMJGCNICHEJHAACBFIK
HAAEPHMMBGAELFBFGONDFKJAIDBKOHGALKLFHEONIJLHPLOCBIDLOELGADNFKNDBHJILEMNP
CKJEJJANPNEIDFILELENEDEGFDJANHLMGICFFJHAMJJMDMHHLLKHGMCHEIKJPLFNJCFGIFAN
IPDLGJHGMLMLFCCNHPDHKGDNFFIBHGHDHKEFAFLMOEHBOLBNKJCLEJFFNLDHJPCBMOGMHBOP
FBJDEKJDKFIKLILOFCMFGPFFCNMMNPDEPIBHMABJLBDDJOAHPMFFJCBOBIAENKFFLAFKNJOK
MGMHDOJIEMBBGOKKICCIDMGILNMGBGAEHODFNLIGAJGLFIMECKJGLOCAHACMGECFELFJFAJD
IEAJJJPNECIKKJNAGDNPGAIJMGDGMGLBGKHFIMELHPHCHGINGNBEKIDAIFGMFACCCDNEMIDK
ACGOJCOHMAEIDGOMFJJBENCOIBLDCJGKNBGMGCJEMKMNHNMIJFMLOMEJLFIEBEIMFOKGIIBJ
KOCDOGIBGIJHNLOOFMGFHINDLMOGFJCKGANMEPGIOKHGGJIJEDDJLEPJCBPAJGHHHLNFFCNE
DNMLFHDHKIDGGDKAHFFDGBEPPLKELPPPKNFOLOLLJNGDHDDJDKAMGDIFHEICNBDKOJAGFLDK
NFBAKGCPKHPBEKOIFGIHBKLAICCFLFIHEPPNOHFEJDJINFDLDGACBDJOBAAEFKOPJCLGLGJO
LBINGPOMGNBJBCFIMHCLHIKMALGABAADBAPAIAMHIIJFEMALHEMOHDBAPIIAMHCPIHDBEAID
IMFLICOOLGLHAEPJCNJCJMDJFMDDEEDENKFGIMHCHCKFMMNMOGGODLLKFKJOGOCIODPIBBJC
HOMBKEBCLMKJMENJJAEKHGJHFHMNBAFHGPLMEJKKGHPIPCBJMPABAHIBGFDBHLIEKOPOEEDH
AHHPHIMECDENHBAGFHBKKOGLKPJGMGBLMMEFINKCEAKMCJFIEBMPNJLEEPJCOOPIOOKOOOHA
NCHNAMICIDOGLBOMDKOEGCCONLPIAGDJCMFJCLHEEACNJHMBLNKADACBFIONGCGNPLHIMHFD
FDIGOAFAKMHCGHCPNNPJPHNOPIPGHJLOCFEHLBIKFJOMBOLPHLAEPAINBDFMOLMNFKHIEKDL
DINFGCFFPMJPAHICHAEEAHMGFBJELHKFOFDDCMOKJAGLPOJPMFIGHKEBFKCPJKNBMLKBPEEL
GOMKPBMFLJHKLCJDBPMMGHFIPONKGFBPELLIMLIBCBIKLOHNNMOJHMFPNNBMLPOOLOIHHHMB
OHGKFPAAGLEHCAGLCKGGHMJGBHHIGBAFHBPCCHGJIGPHMMCEBAHNKJLGHINFHHCIHGIGHNFC
KFHNLKMBHNCAMHGBIGLFHJEDCGHOKAOHBCHAPGELOIOHGENHPGHMOMDHHGCDEFHOODCGBINK
BFHLCOOFHGPHPHGOCPCBGPLIMHHPPKKEHLPHOGBAPNGGHHPPMGHIJKOGCDCKMHHCFEKAIAMI
NHHKIPEGHIALOGHMBHOHIBBACHHNEFEIHNIGJGHACILAMABKNIHAOLOHIBJJBHICOAJHBDJO
DHCNDAPICLCIGIHKCKDIGFCMLIGFOGFEHDCOJIELOPBHGGGJGHGOHEEAAGIOFDIHCOPAAGGN
BAAGAAMAIHMOPIIHIABIIIICDIIIIEFIIIIGHIIIIGPIBADGGAADDEAAACAAPABADDHAADIN
PIIIAOBBADDEFAADIOBIBJOEHAADAOEBADOPMDHDDHGAADDBAAADDDKAIIDCLAIJIPIIIIKK
LIIKKMNIIKKOPIIKLABIILLCDIILLEFIILLGHIILLIIIIILCNAAADAKNAACOBNAILOCNAILDD
NAILDENAILDFNAILDGEACKLOHIIMLOJIIMLOHIADLNBIADDIEACKPOLHHLAPBBIEABOIGHEF
DIBJKBGGIAAIJIIEDGLMHOAMNIIEBDPHIEBGIHHIFCHIAGFEDIGBNGHDGIBIHIBPGHLAIFLL
MGICFOOIHNGAPIGLGCGIGMJPBHIHHHHGIGOJIHHKCNNIGFGFCIIDOFEFIOKEGCIDAMLBHAGL
JHHLNFPIIDDINCHLHHKHINHEDFBJEHNIHCEKMIFPMKDHIHCAAAIBFAIIIOBEJIGJOMHIIBFJ
JIIDHECAIPFOMFIBJHKHGBPGFIGLOBFHGEEOOBJAOGJHICCFPAGEOKGHHJGMFIFNAPPBGNOO
GHHGPACHHPHGFAIHHHHIAGCOPAFJHDJAILEGGJJEIKMIIIJJOIBAJBDIIJAPGBIJJIEIIJDJ
CBADDMFHIKIOPBIJDHFAADDBBAADDHHAEGAOGBADBLBBADKJHIJEGEFJJGGGHJJGGIJJJGGK
LJJGGMAJAHDHOAACDBMAAHFIGFAHGPBJJHIHDFAFHMBAAEHMOAAEHMNAAEBGJBAGHLHIHGHA
MAFEGIOAACHMHAFIIIHJJIIKJJJIIMLJJIIKKJAAGOOJACDCCAJHGOEAJHIKIJJHHKMJJHEN

BAAGHIAAJIHFNAAGJNEHJIINLDCLIGJCAGJGACDKIGPJACAKCCAHCPOABPHDAAAHGMPAACJB
DJJJEDOAFHFAKAADEFIAAFIDAFAFHMMAFEPGNGJLHEPAAGHAMAAHIDMJAGENNEAGIKDJAHKF
AHFPLNEJAGEIMBAHGHLAJMGHAAJNMODJBBHMBAJMBELBIHHIMAAHHBIJAEIJBFJJDEEAJJJG
HJJHHMBAAFHMJAAFHMJAAEGMMACIGHAAHBCACAJMGMNEFEKBPCAFGNPAAGHOGJJIINJJJPIO
HJFIIDDJAGFPHAIGIOAJJJGPFJADOCHJADJHJJJHHLMJAHFEIAAGGCPBJHBFDBJIHEHABEHC
CACKJGOCAGDOKEBLGCCABGKNIHJPIKOJKAFPGAAGFFMFAGPLDJKCIHPFJHPPEJHKHCBAKAJB
GJADAFHKKAJJMJAHEFBAAHHFJAAGHANAAGFIKFBLBABHCJGEJAAHMJGHDKGLMAKBPKBJKEHC
BJAHGHEHDEDDKBKCGPGJKAHDGJKADEPJKCEFEAFIDLCFFGGJEABDAGNBEDGBGAKDEAEKKCFK
FKAGBPHBKCOHJHKCIJCJKAHAAJADCNNKKEAJAKAFKCJJAGDMOBBBIMHCDJDECBAGEKHDKBMJ
MHCIPLJCKFECHKKHNPFJJHDBBAAGGFMKAHJIJJKAALKKKGKBEJAHGIAAACHHJAAGOLPJEIOL
FJAGONLJJODMJKKBCAGAAGBODBBDHGKKKFINKJKHEIAKJHDBCAAGHNPKKHHMFJAEJPNJAGDM
AKKBIFBKJMGMMBEGHGCABGCCDBAEJBFKHKCAIAKJHIKKJPLAPKJIJBBJADJDLJKEAKEKAEHI
MJJHCPBKAEHDIKDFDEEBKKEDPEAGHPMHFLGFJAKKCACABCHJFAKJIJGJBCFPLAAEEFIAJOLB
JKKHMADJADHNMKKLAJOKAEGPIAKDLPDKDMKELKADDPCBKDEINBKKEOKEKMMMGKKJFKAKJJDG
AAJHOCNJKCIHIFKNHMGJAECJHIAGHDPAEGLMCFKBHIBDAGPNGBCOHAPAAFKOAJJLGBLAKMHM
PAACFEKAKLKNKJKGHALAKOHGIJKOINEJAHHJAABNAKBLKALIGKKGHMIJKGIEPKEIGLFKAGGN
LKCAGPBKKHNLNKKNNDHBKONDBKKGLFLKKHJNIKKAHNBJKIDMEBKKIGIKKIGMOHLCIMAKHBGM
PAKIGCCBKJFMPKKDAMKLKFLDHKFIGCLKJFJMDKLBHOIKLCHMAAKKGNCAKKIDFKKKMELKBDKI
KKKKEBMAKKJBOEEEDLJLLDIJBJLFDNHLKLJFGJKAAFLLKLECOLKLALECKHOFCCKMHOJBLECE
GFKMMIGKKOOIOKKMNACKKNDJNLLDNGAKLEPALKJHBPBLAGCAGLBGNPBKKOAIBCCFEPJLKMGF
CALACDILKOOKMKKOHDOJKOAJPKKCPCIKIGPEGKKPPPMBEGPJLKKPGHNAKPPPGKJMACELLAAG
PLKPBENLLHIHOFLAEABJBIECOJJMHGMAJGJOOLIIEJOJJEENCJIJELEJEMJHFILKDJLBJFDG
NAIJFIKJJFFELJLKFPCJADJCDIJGJPFLLLLGHLLLLIJLLLLKILJGMOAJKCFLPDJPJFMJAHEM
AAAFDMJHFILNBLAGLPDLJHNHPJJMAKBABKMKDLLMMFNLLMFFPBLMMEDLJJNCFIBBMKILBJIJ
DFKCDNGLLCEAOLKJAKIKAGICMKLCIHJKKIDAMLKIDDPLCIDFDLKJDIGLLJIKIJLFCFPLLDFH
OLKCAJEKLEEGMLLCKGKKLEHCIAKMKLEKKOKPKKKJFCDLKCPAFLJHFGGLJJFJHLIIIDDLLHMB
EKJIMDFKKMGJHAKMGCGBLGECIKLGNBBKMAGMHLKNECKLKNNMMKLFMAHKLEOAOKBBOCIKLHKO
CKMBABCMKEHPBLJHIBKLJIGPFLLIIFHELIGDHAKPIKCLCAPKMKCPIOILLAJAJLJKFJHLLAKP
FJLJCFHMJNHJJALJBHCBJEJDNDAGLLMLJGKBFLLKENFJLKFAIJLKKJNLIIFHGJADDAJAJFFL
HJADDNBHLLOPEDLLEFJMMFFKLMMFFMNMMFGKDJJLEDPKJGNGALLNHBKJAAMHJLLMMBKLLNNH
ALLNHGCALMMEFLMGPOBLLMNAGLLNHBNMMGGKMMLNCFMLKHNPCLLECKHLLECNGLLOILIKLODE
BLKJOMCLLCOIDKMAJKCKLPODBJLECPGKLPKDCKJKPJFLHGPLMLLEEOOLKKFBNLLHIIGMKLCN
HKMAGPMLLFBKNLMBGABLMJFMPEMAGFLLLHIGFMMBGKILKHBHOMLGBJBMLHAKOMMBHGDLKOHJ
ELNCOONLJICHNMKOCKCMLECMGMCOPFPKMCIJMLFLDCMMLIDFPMJKDHOMLADJEMLJOMOKLOJI
GLIHJKOLACODODNFGFHJNEFCJJNEFCLJNEFCDJJFDADAJFJOCIIKDBGAADFEEJADDCGAIKFK
IJNFNAFMMOOGHMMOOIANMNGAGNBAGCNMAHFFBALEGFLMMOHBCANGJMPKMOEMMAAHNGCLNPPE
MMAHFCNAJLDFHFADFPCAADDODAIKHMGAKNGCHKKLPDCNJJJMKKJHHDPANPABNNADFLNJAHOB
CJKGCMMKMOCOMAKCOPINJHPBJNKEEDAKEAOOANMPIJJFLOJAGKLDJENKMDFDALMACEKLKHIK
MMKEINFMLPKBPKMIBHBLNJALDCNJENFCNJFAILNCCGMMAHJJFMMAFIKLKLAIMMKLKPBMMKGC
DLMKBAKMLHMMKLKFKIGMMBLFNKLGPDPLKOKNLMMBJPONKNIEPJNBAGHBLHLKDBMLKGJNNDPK
HJNLCJONNEIEDLKPLNANNDNACNCKDDNNKPPOGKNDABILNDJDILLADNNMLHNLBNJENOBNAHGF
JANOLHCIMNJAEILKNFHMLKNHPNJEDAEAADLALLNNFBKNJFFNIJIJFPLJBBDAEANOHEJNNIIK
LNNIIMGNILBGENJLLGIJJLLKFJAGFAOAACECJAAENJFMLNJLNJJJGNPAJJLJNECIDGBKEHCI
GAKKJAPKDEDDJBACIGEJKGECDKAHHFAABNGOAEJPCJNKJHLCPNNBAKPANIJNHKFIJLONJJKA
PJNJKBINKBCADANKNEAKKJINHBNKKJINKOKNONNKFPAANLNJJKKAOPFNNLAJENKAIHEFAFNE
LKIHDCOBBHAMAKACGECAAGCADACJIJDCBBDHFKNMKLNNNKGMJENMKOLNNMHMNJNMBGCNLIDB
DKKDDFMKKDBINLKDDFGDJIHBHJMAPKHJNMODKNNMLDINJHOIHNBAJHIJFHPNNBEEFEAKNKOO
JNLHJIDBAHOAKNKFPGPNNKOFDNNLOHJNFIAGCBLIHJDLAGEADBJIHCHAKFCENFEGNMJJKLHI
FJNPOCBNNLAJKKNPAOBOAHAKKLNKHMPALEIFCEOBFPPAACOHICGKGFNNCPHDJACNHMEAOCBM
LOOAOGBNOCAKJLADIKGJOCCAMABINEGNKECAFANGEFOFBBGHKAKGBCBKODNGNNOBDFNONMLK
ABNNOKALNPLBICNKEGBONOMIINNPMLLNNPPLINNLJMKJNLJPFNAGLNPNCILPENNKGCDBNMGE
AAOFDCDOKCAJEONOBIMOOALEGNNBNAKNKANDCNCJGCEBKIGCJBNNNLNNBPNMHNBEBHHBOADD
HONPDEDONLFGHONBIKLJNODENKOFICGKNKDIDLNPDOLNOHAKJOOGBPLOOGPMHHNJHPOENFFHC
BAOAFMDOOAKOFKOAHKGOOGBNIOOGBOOOOHDGJOODKOIKOCBEGOOBEFIOOIBLKOOJHNBOLEPL
DNOCKAIOIGCIKOOCDDFDHCCNAOCNMPBCOFAIIOOEGKNOJHMOHNODKNFOEIDMOOOEGCFBNGEA
EMAHECBMAHHCNANILBGINHKDCLLKKGBLJFJBBBFEKMALNFFCNMJFLAALACNOJMJFIIINOMNK
LOONNMNONIEPLBLMBOFBFDMCCLJHDBEAOBGFPMOAOAEOBBOCJOAEHCGJADOGOOOAMADOOGJJ
NOJIGHEOOFJOOONMFHNOJHFJNONJLLCNOAHBKENNENCONNKNEBOGEHDOOFKJNOOAPIOOACGN
CONNCAEANNHBHONNHENONNEEPONNLGKOOIJNJOOECBPOJGOKCNKDIDOONOIFGOKEIHKOOBLH
GOPAINNOJHCAOONNALDLAFJBAOOAFLNOOFAEIOBEAGFOPBKINOONCFNPNNJPHOFIBBDOOBEN
EEOKBIGOOKCDFPPDCHPPOAGDNKOLNLANBELANONGLCHOLILEFOAGDCEPOPLIFOODLLAOJHDI
IOPDCJPIOLKGPNODPLDKONECPNJDNNNOIKNKKOBBHIPNJEHKLNBGFNOJNHNBBONILGDKIKIK
DIADDECAJGIONIPFHABPPHHCLPMFJJFNLNEFCADGFAGADGEFNAFGEDEAAFBJNOHDNGBKAGGC
FANKLKNBLCBNCNBNIJFFPHJDHJPHLFGJBOEPEAAEEFPAPHDFGBONHNNAEEIPCDBGLACNJPAC
FCJPNOJJPIJJGNKNINJPPHJGNFHCFFKANBNNDJPJAEGKPJNPOCNNPEOFPJNJBNJOHHLPDGGN
BFAEGHPDAFLNBJJHDNBHNOOBNJKGJDKDCDKEOKPKDAEAKAHHNPDGHNAPEBLHHPPKOBFNIKCM
NKPIIFEPJINANPKCHHLPFGEPCAAFNGCPPJLKNPAHICEPPIEHALPNAGNKPNCCEBAFNOIJPLJD
BPJOLPKPAAHFIPADDAGKDGCLJGPNNNJPPLKPAKACDIAAACDIOONNNHALAPNOGJPNJDIHOPHCJ
JGAENFCPPONHOPKAGJAAHBFNGIPPJJENNAHNGPAEEBJAAEENGAPLNGOPBICFBOAGIIPKOCGG
CABGOFJPNJBBNNPINOIPFGCDFBAECLNGNPJDOJPOKFBIJOONHCICBNNPNOHBDEOKDGFKOEPH
NPHDILPPAFIDPFAFGLGDAEOOFBAEEODAFIPIINPNICECPJONHCICBNNPNOLKGHAGGNIEFFBC
OOPKDBAAPKFPDAFIOKEPPKNIDJJJOOGPKAKKCPBGFFNNPBNAFNIEKOGPIJOJNPPIFAJAFGFG
JAAEGNNFGCPIINPNPAFPPJLAHEPJOPOJNKENOFKKNHGEANIINKKIENHPPPDNCNPNFPJADGHK
JPDGGLEDAEPIINPNJFAPELJHIPCDCPLOPKIGOOPKNNJNPOGJFDIAEPDAAENAEKAEPIINPNJF
APELJHIPCDCPLOPKGCOOPKFNJJPOGLFDIAEPDAAENAEKAEPIINPNHNCAOEBDOPEEFFNNPBHB
CEOGKOCPINOJLPDGHKJPDGGLEDAEPIINPNHNCAOEBDOPEEFFDNOICOBAOPKOBPADPJPPAFFF
NAPHKFBPPJJDOJPODIBOOEINDKPBEOFENFBNBPENCAECAGKOEPJFOJJPPNLJLJJLNOGPKNOO
GPKNCNBLEEBCAOANKADDPKDCBAJHLBJPPHLJLJJLNOGPKNOOGPKNNNANCLKCCCKJKANJLCEB
CEOBHAAADKKOCPADILPPAFGHNFAEEJEAAEFPOABOPNBNJOOOGPKNFCNKFNNIADKAAKNAIPBN
NPNOLKGHAGGNIEFFBCOOPKFKOPACGGNAAGHEDAPHIJPIJFEKDJNNGBFPIJGDNPBNDGNAIJEP
INPGDCLAJFKGGIADDFJAONNDDPPHNDDPPHGJBJJNLPIPODAKIANAONNNNLNNIAODAKGAKNKE
PKJPNICAOBNDGJNAOBCJKFNNNFPEAGPNAFINAPAFGJGFAFEJNAFGCNIGNPNIAPPPJFAPELJH
PPJOKONNFEKONKENNGIAKIINNKPEPNNPNDNCPPAFGJKDPNGJLDDGEEIANPNIFPPJLANEPJDI
PCOCKLGPOIKONPNNOJJPDGAFPIAEEDAAKNEEIANPNIFPPJLANEPJDIPCOCKLCPOGKONPJFOJ
LPDGAFPIAEEDAAKNEEIANPNINPANECDOPBEOFENFBNBPENGCOOPKNCJIPOGLKDPNGJLDDGEE
IANPNINPANECDOPBEOFENFIDOOACPBOOPKDBJAPPFPFAAFNNFPPKJBDPJJOOIPODEBNOKIBD
OPEEFFNNPBNBAECCGEOAPKFEJJPONJJPJLLLOJPNNGOKPONGNKLCEBCEOBHAAADKKOCPADHB

BJPLHJJPJLLLOJPHNGOKPONGHKHNLACCCKJCAKJKCNBLEEBCAOAHKAODPKDCLAPIFPHAFGEN
JAAEEEPAAFOON9NPOBOJPONGCKKFHHIFDHAAKKAAPNNIPBONKNHLGGNAEGFICFOBKOKPPFHJ
LIIHHDJPIIFPKJJENDBNPGJFDIPGGLEBADFBHNPGNEEOIKJNFININJJNONHDDPPHHDDPPHGJ
BJAGGHFEJNNHFJBLAKBAAGDNNHNAENAENAOBJNAEAKBAAGOBNNNAENJEAGAARNNOEGKAAAGB
FAIKANNNEEGGAANAOBGNAEAKBAAGINNINADLAPNAOBJNAEAKBAAGJININADLAPNADCKANNEJ
KAAAGBLALKGFFAODENNENDENEACKGBBAADJIAIAFFAOAROFCAAACENKAAAGBNANNKGNBIJFD
KAAAGBNAJFCABAAEFAEAJFFIIAAFFANAIJFDKAAAGBCAINLJOEOOENNENDEJEACKCLNAILJC
KHAACLBAINCLDAINCLFAINCLHAINCLJAINAKCAHJHHCIHJNJCIHJNACIHJNDKIAAHDAAADDN
NAILHDBAADDNNAILHDCAADDNAAADDLKHAAHDDAADDNAAADDLKHAAHDEAADDNNAILHDFAADDN
NAILHDGAADDNNAILAKDAAHDBFAADDNNAILHDNANNDNCAACCLLAACCLLAACCLLAACCCKAAAHD
NAJFDNCAACCLLAACCLLAACCLLAACCCKAAAHDCAINDNNAILAKNADGPIINPNHNCAOEBDOPEEFF
DNOICOBAOPKOBPADPJPPAFFFHAPHKFBPPJJDOJPODIBOOEINDKPBEOFENFBNBPEHCAECAGKO
EPJFOJJPPHLJLJJLHOGPKNOOGPKNCNBLEEBCAOAHKAODPKDCBAJHLBJPPHLJLJJLHOGPKNOO
GPKNNHAHCLKCCCKJKANJLCEBCEOBHAAADKKOCPADILPPAFGHNFAEEJEAAEFPOABOPNBNJOOO
GPKNFCHKFHHIAOKAAKNAIPBNNPNOLKGHAGGNIEFFBCOOPKFKOPACPNDJPHIJPIJFEKDJNNGB
FPIJGDNPBHNNHNPGFCPNNNKGHINFGPDPPHHDDPPHHDPPLJEBAAAFFEBJAEHKFJLNNJPNGBAN
NNEEAABNNOEJKAAAGBBANOANNNEEGJAANAOBGNAEAKBAAGKFNINAENGEAGAABNNOEGKAAAGB
NAIIANLNPDAABNNOEJKAAAGBIAIJANLNPDAACNADNKJNAEAKBAAGKLFLAGOFNOEEDNNHAEKE
BCAGDBIAIJFAAAAFOOCBAFCANAAEAKBAAGNNENBKJNDIAFAKBAAGFNAJACEBAAAFFEIJAFFI
AAAFJNDIAFAKBAAGNCJIELOONOEEDNJHAEKELCACLNCIHJAKLAACNBLIACNDLIACNFLIACNH
LIACNJKIAAJCHHINJCJHINJCAHINJCDHINAKDAAHDANAADLNDIAHDBNAADLNDIAHDCNAADDA
LAHDAKDAAHDDNAADDALAHDAKDAAHDENAADLNDIAHDFNAADLNDIAHDGNAADLNKIAAHDBAADDF
NAADLNDIAHNNNNADCCLAACCLLAACCLLAACCLCAACAKDAAHFNNJADCCLAACCLLAACCLLAACCL
CAACAKDAAHNCNIADLNKIAAGNIDNPNINPAHECDOPBEOFENFIDOOACPBOOPKDBJAPPFPFAAFHH
FPPKJBDPJJOOIPODEBNOKIBDOPEEFFNNPBHBAECCGEOAPKFEJJPOHJJPJLLLOJPHNGOKPONG
NKLCEBCEOBHAAADKKOCPADHBBJPLHJJPJLLLOJPHNGOKPONGHKHNLACCCKJCAKJKCNBLEEBC
AOAHKAODPKDCLAPIFPHAFGENJAAEEEPAAFOONBNPOBOJPONGCKKFHHIFDHAAKKAAPNNIPBON
KNHLGGNAEGFICFOBKOKPPFCOAAKBHDJPIIFPKJJENDBNPGJFDIPGHNFBADHPNNLKLGFKHELH
ALNFNJDOPHHDDPPHHDJPJGGAONJLNEJAOBAHANJNNCIJNPNELKKABOAKKCHICFKCGFGNAGAA
BNNOEGKAAAGBNAIIANLNPDAABNNOEJKAAAGBIAIJANLNPDAACNADNKJNAEAKBAAGKLFLAGOF
NOEEDNNHAEKEBCAGOBIAIJFAAAAFOOCBAFCANAAEAKBAAGNNGNBKJNDIAFAKBAAGFNAJACEB
AAAFFEIJAFFIAAAFJNDIAFAKBAAGNCJIELOONOEEDNJHAEKELCACLNCINJAKLAACNBLIACND
LIACNFLIACNHLIACNJKIAAJCHHINJCJHINJCAHINJCDHINAKDAAHDANAADLNDIAHDBNAADLN
DIAHDCNAADDALAHDAKDAAHDDNAADDALAHDAKDAAHDENAADLNDIAHDFNAADLNDIAHDGNAADLN
KIAAHDBAADDFNAADLNDIAHNNNNADCCLAACCLLAACCLLAACCLCAACAKDAAHFNNJADCCLAACCL
LAACCLLAACCLCAACAKDAAHNCNIADLNKIAAGNIDNPNINPAHECDOPBEOFENFIDOOACPBOOPKDB
JAPPFPFAAFHHFPPKJBDPJJOOIPODEBNOKIBDOPEEFFNNPBHBAECCGEOAPKFEJJPOHJJPJLLL
OJPHNGOKPONGNKLCEBCEOBHAAADKKOCPADHBBJPLHJJPJLLLOJPHNGOKPONGHKHNLACCCKJC
AKJKCNBLEEBCAOAHKAODPKDCLAPIFPHAFGENJAAEEEPAAFOONBNPOBOJPONGCKKFHHIFDHAA
KKAAPNNIPBONKNHLGGNAEGFICFOBKOKPPFCOAAAHPLDBPHIJPIJFEKDJNNGKFPIJGDBPBJNK
NNLKLGEKIKKGHIIKNJDOPHHDDPPHHDJPJGFKOPACHAJAFCHDJPIIFPKJJENDBNPGJFDIPGGE
EPNFGNCPNFFEOJJFNGCOLLDHJAONHDDPPHHDDPPHGJAJNGLOEJAHGBCNJJBJKOAEPONNEEGJ
AANAJDCJADDCFAAEJDNJLDGADNBBNCBJNGJCIJNPHNGAAEPONNEEGGAANAJDCJADDCFAAEJD
NJLDJBEJKABOAKKCHICFKCGNJOOBPHFNFDBPEKKCNNCJADGKFPADICKLAAFAEAJFFIIAAFFA
NAIJFDKAAAGBCAINLJOEOOENNENDEJEACKCLNAILJCKHAACLBAINCLDAINCLFAINCLHAINCL
JAINAKCAHJHHCIHJNJCIHJNACIHJNDKIAAHDAAADDNNAILHDBAADDNNAILHDCAADDNAAADDL
KHAAHDDAADDNAAADDLKHAAHDEAADDNNAILHDFAADDNNAILHDGAADDNNAILAKDAAHDBFAADDN
NAILHDNANNDNCAACCLLAACCLLAACCLLAACCCKAAAHDNAJFDNCAACCLLAACCLLAACCLLAACCC
KAAAHDCAINDNNAILAKNADGPIINPNHNCAOEBDOPEEFFDNOICOBAOPKOBPADPJPPAFFFHAPHKF
BPPJJDOJPODIBOOEINDKPBEOFENFBNBPEHCAECAGKOEPJFOJJPPHLJLJJLHOGPKNOOGPKNCN
BLEEBCAOAHKAODPKDCBAJHLBJPPHLJLJJLHOGPKNOOGPKNNHAHCLKCCCKJKANJLCEBCEOBHA
AADKKOCPADILPPAFGHNFAEEJEAAEFPOABOPNBNJOOOGPKNFCHKFHHIADKAAKNAIPBNNPNOLK
GHAGGNIEFFBCOOPKHFDPPHHDDPPHHDDPPHHDDPPHHDDPPHHDDPPHHDDPPHHDDPPHHDDPPHHD
NPNF

```
/*******************************************************************
*  @(#)rcv.c    1.2  I/A Series  Foxboro Company  89/08/17
********************************************************************
*                                                                  *
*  Copyright by the Foxboro Company 1988                           *
*                                                                  *
*  All rights reserved Foxboro Company 1988                        *
*                                                                  *
**80****************************************************************
*                                                                  *
*  FILE NAME            : rcv.c                                    *
*                                                                  *
*  PART NUMBER          :                                          *
*                                                                  *
*  FUNCTION             : Destination for message (sink).          *
*                                                                  *
*  FUNCTIONS CONTAINED  : main()                                   *
*                                                                  *
*  DATA STRUCTURES      :                                          *
*                                                                  *
*  COMPONENT HISTORY    :                                          *
*  --------------------------------------------------------------  *
*  16 DEC 1988 - RD - Creation                                     *
*                                                                  *
*******************************************************************/

#include <pam_com.h>
```

```
/*************************
* File global definitions *
*************************/

static  int     sz;

static  char    msg[BUFFER_SIZE];
static  char    rcv_name[IPC_NAME_LEN];
static  char    src_name[IPC_NAME_LEN];


/******************
* Main entry point *
******************/

main( argc, argv )
int     argc;
char    *argv[];
{
        int     rc;


        /*
         * Determine rcv_name.
         */
        if ( argc != 2 )
        {
                printf( "Usage: rcv <ap_name>\n" );
                exit( -1 );
        }

        strcpy( rcv_name, argv[1] );


        /*
         * Initialize IPC.
         */

        rc = PPini_ipc( rcv_name, TRUE, 1 );
        if ( rc != PAN_OK ) PPstp_ipc( rc );


        /*
         * Main loop.
         */

        while ( TRUE )
        {
                /*
                 * Receive message.
                 */

                rc = PPrcv_msg( msg, src_name, &sz, NULL );
                if ( rc != PAN_OK ) PPstp_ipc( rc );

                printf( "%s: Message of size %d received from %s ...\n",
                        rcv_name, sz, src_name );
                printf( "<%s>\n", msg );

        } /* End of while */

} /* End of main() */
```

@(#)rem.p 1.2 Foxboro I/A System 8/17/89

FDDGBHGGGACNGCLH
BPJNIMAHACAAAAEAAGNGEAHCAGAGCCCJDANABHNDIBBACDEGGHEGGPFDDGBHGGGACNGCLH
KINOCAGDACAGPBAAFAAKNPEHABFGBCNJEAHCGDFBLBACACAAEAFJGEEECGDKAHAAAGBBDDAA
AFNNAJBIFJHGAJGNBGAPEAJFINFGKOAEGCGHIBAACOAFDCHBANIEICALANINJONKHCOOENGE
NEKEBPHNAAOIBNPIGHAHBPLKEEABLCOAHKHDLFJBBBHEDNBJENNAEJOAJIBBHNACINBJDKLH
APAAENHNDLINBAOILDOCGPDEHAADINBIFIIEONNPINEGHLPHPFANCGIBCOCODLGNCDPHJEFF
JJBIIBHPHHNHDFIDMNLHKHJNBHFJIAEAHBALJHLEGEHEEAAGOIDENANFCLFILBGENNFCEICL
FFKGFLHLKLNPKONGINKOFDAAJNAIGKAPPKEKPCAACAFPHNPPNFBJFLBGJNDJAAFJFNCHLGNH
NINIABAAKOKJOCLJIKIOAJAELKOLGKDFDCNDOPILJHCONDIOLCELLKJEAJAALCEOLJJBOPNB
PJLDBNKHFINNNABDANPNOBJCEOAAFENFNEJDDBOHNJHGINABINNAKAAKANAPOKACIDBPBKBJ
IBNACINGNALAFNECHEJANABLFFFDOBDCEAFEPKPFOEICADNIHBKFNPHCPKIEFFNAFPOLDEDB
CCCOACFBJFODINCFKGIIIODAALOINEIAILDAAGEANHINKBIFIACDIKOEOBBAKEGHEEPKIBNH
JBDEBGNANLDKOALBONBOHNPCNBNHIOBEDJPJNAIHEBHECAIANPDPBGINKJJGIPBCCAKANGIJ
FEPJEIABILJOCNBJCHHJOCDNEJAAENAEKNDDEEINLICABANDJNFEFJBAJFCKPPPEDEENABNI
KNFDADHOLIHNDAKIFLKKPECENGADLOFBEKCICOIGFCIFGIEPKKDAEKANACOLDANANDEAHEOA
NCEDENHENELCNODCPIKBHDENALNJGJPJFOHNEICJNFAOCIAAOAICEEFEFDEBOGEFKCOIOIED
KHABLICIDICCGEFNBAHLNOLBNNBINCKNEANNCGLKKNCBNDJCEIIACOADEJEBFFIADNJNIAIA
JAKDGIODKBAPOGAGNAIHALPPNIGACOCOCKENGKAECKDNPNHCKNFLPEOCJCGCLCIHBCHLIAKI
AIIEGCGODKOIPIGFIEACJJHILLCELNAAHIILNOBDAGLEHIFHJBHEDIIAALLIOIIIGDEABGHP
KFNDELKPLPJCOIBLLGNECONBKNFEAEIIANEFKNDKBNILJPLANGEONFKOLJOICAHAIANEPKPN
LFIDABOGNCNBACFJPKOAFCIDLNPEKCBDNCLNPDGOKKONKHOIKEEBAAHCDECOABPDNKHGBIIA
AOCPJIHKEGBDCCILHIJBNNABFDKDEDNBAAFJHAGFNKHCKGJABEIBFLINANJHCNDKELNIOGNJ

DKANLAENLFCJOIPIBBFCJNADGBLJFOHLLHHGKJCLLHGEFJBNINAAGFBLNBNIHCINJADEEADK
NBIAANONNIEEBALLEGADLDPBKLDCGEECBAILAFOGDLFNCNCAGEFCBAHLECNGNFBJNCHJENLI
GICABOENINBECANBNIHCBAPLNHAKJJKKJOCIHODECBJAPAHAJFFDGNHFAKDHBDHDNACINIJN
JLHNAAHOAEIBALALABDAKHHAENNCPHLENNNDKDEGKJIPAAHECNHGFHDKLAAEHAGNPAHGLGJL
DNDKKPAAONOCDKAGIEJCLNPGABPANBNAIIGEDBICEOCBNHHJNGDIEJFGAKLENOAALNCJFCBP
AKKAALPPANIAGBALBAEGBNBOOHIBAALINFBBFEIBFDOBNADBIGCHNBGGGCFCAKNLODOICBLJ
NNBJCCHIOINAACADDCKHKNGAOJKOCHENBIGBOINAEFDKGCFJIAEOKJFLFNKPFNBHBNAIECKG
HGDNIJIDAKHCNHDJKKONEJEDLPIDENPACGLIIBIIBJAPHJNKIDABPDJNAHLNOKPBKLNKOIOI
IFNNJCIDNBONHFKPGDKCOIJFAJNJJHCDPDNBAABNKBNABOBFPFNBDOPHNBAAHOHNCANBPOOK
PAIAAHAKAPBNCPHIFPJPOKGGAEAINGAPBNGCNANKBNPHIHBLDLNIKPBEGJKBBLBPKJGDDPEL
KEEFIACPAAFKOBHAABAEKCPFIEANEPECAALODGAFCHFNDAINBGPJEDEAJFKOJECFNAHBCJFH
ELIJEJNHPGHEAEAHINHCBBFPIAEACCEKHJNKCDEAOAJEFPHANACKCBBAIKAILJIIEPKDIINA
CIIPOBEKANHFCNGHICJJOFCJOPLCEKBGPJABEEBEGIJNENAKHHCHNJNJNEACCJJIANDKENOA
EAFLHNHCDOLKIKEJCNNPHIJHFPAOOCAPDIKBNDAGNOGEAHHNKANDBOAKKANLACIAEBIHAFPN
HCBBKFFNBPDHLNAJEOPOFNAJEJGEONOEJGHAIFNNKFBACAENBNCCAJAHAKNHCOALKBADAFPP
KANLJJGNBACBKDKJLAEPGAPIIHADDKPEDNJLBEKBAEIJHLFBAGOLGACFCCANGABNEJCAKHDJ
PDKBCHGFAKOPCPHOONEJBGFADAJLGNNGOGCPLJNEIIBHPAPBBHGBNKABJIPICIOGCPHJAJAB
ANKBGDAIPKANBHCINJDBJAFGJKNCALHLEKKFEOJBAKNPFHDCDFJGLDINBFCPENJAIFNPBIKA
EDOIPINONPPGCJLIKFANGEKLECONCHFBOPGDAHAFJANFENFFILBFABIKIHAAFNIAGCFAOIKA
EBACNENCALLILCGAKONLCBIACKOKKAAAFNEAADKOBOJICLNNCAFFANLIEGCAABJGBJAHFNAP
DAFHJKBICABNNGOIFFDNOAJKAPDHKFCDCLLIPIAHFNNNGBNJGHPEIKABDCOINJDICNELINFO
FJCALEOINAIGGFHDNBCLBBKALGBJJGHFEFKPFNIAFKGBFIHGBELNNCABGKGPGBFJENPEOKAI
KIGFIFGFBLNBKLCJKADGBEJGBFEEKPNAIAFKELLIGJBNHINAIFBLFANLIIOHLKABBHHPEAKN
CAJOELAGFNEIACLFHIHIKOBGHADBAKNELKOBLJFENJAFGKNJPAFNCDOANCBHKINFNCHDHJIA
ALGHKABGAKNPJFABCOLEIBFKANGFGBBNCINAIFDJFANLIDOHHKGAJBOPEAONALNGDFLHAHLE
EACADNAAABAAODAADJHAENOCBPKHPAECANNOIKALHPKADGACANPGEPFPCJDAIDJOBACANEJK
AECLHNINJCKLEBLAADACGOKBHHCCPAPBCAEJNNGACAIDPAABBGGGBAIADKAEANBCDHOAAKDL
NGABABHEFEIDAAECOONBDPKEGDCFBIOAGDBNGNOANDCCKNGAIABCCNDJBAOCBIEICCAKHAIE
CDEIJJNKLJIAAAAABGJAINOOEFEDBNNBNAIGDIPELBOFCOPHGONKAKLAPCDPLAKNGFCOHLFJ
EDHAAOPDJINLGNIADDKHHJNNFLIODBFHOAGBBHHJHNNFAIPAKAIKADHGGHAHHGNNEPAELDOB
IKDLFENNNPKELIJJIABGOKBCJINANGAGDBNOLJINHDOAOAFJAAHENGEDICCBJNBEKGGDCCOJN
LNAOBFPAKJNNENDINGEDDCNNBFHKNINFBOCNJIEBINKJBCABEGNDADBNCCIAPEFGINCAAPEK
LDBIJLCOKGIAFLOADBODBKNPDIENDLOOPBIPIDPNJGFCCPGDAAFNEBEHKKDJLKOKCHCHGBBB
NPHAHDDAAPAAGOHBNDIGNNBKICLFXNAHCCGOAFKINLNGIIBGLCFNNNABADFNBLIBBNFEGJAA
KDNBIBIOEPIECANCEGFAAHKFAFOHGCAOLAKGNJJNHOHGIOKPKNOKFKGLABBM.:FOACLGKPIO
ONCGDPDJAPKPLGPDLKABGAOOCJCDEANOHEAGAAKNBNOLHBDNJDNJNNGIFGDDJ!ONENBDHHGL
PNCBOCBONCNLNJHNGHFJNOBNDNGPOBAKDJONGCAOBLNIJLBNFCDBCLNFNAIBJONGIAAAOAOC
BIHIIILNJOBIBIUGPLKNDNAAGPFLELJACPBCCFPECAAFEKPHILHNHJBACLLHIKDKIFOIIFIHG
HDJCIAKOIJFNAGBELAEDBOHNGFBDFFIACAHBNOFICHLHBJNAIPHFIIIBONNCLDILDHNAABIN
BBNNIGCGNOOANKGCLAABIIDPHACACNBHHAGHABFNBAJFHPHOEEDBAFDIHNEPIEIALNALIKGD
BNBHFADNODCDLINNPPKACDAFJFOHIKDIJGJDOFDOOINLAOHLBHICAINEBCINHNKECDBBAGED
PCNNNNPNGDJKLPNJAKHBLOHCJGEFNOHCDNODNOOEHNIOIGDOPOLNPCJINHJOODDFDPDOGLHE
NOHDCAPNJNCKAJGADENBFHPBABKECPOHOLHNNNLLCNECNADBCDCENNJKJFLOICILBNPABLIE
EDHNOBFCBHDFLFNNFEGKCCAEEANCFKGHHFANDCNOOFINLLDJNNHHDOPHGPLICCAPLLNAEDAJ
PGCGAPAJNCGIOOIAAOCNFAHNNDAGAPEKIHGNONIAABGONBBBEPKHHAJPCGGNOKKHHDKFHGAN
CCGHAEOEBAHPEPNGHNLCFHHPDAOHGFPIONFIIJIAGONJDBHLCCNIGOCFFIGOHHOGCCOIGGHO
APJIGNHGKBAOEOGAGPHAIBALBFNAGIOEIAAOJLOAABAAGHAOALGIGJONEAHOFGNABNBBOIGJ
ANDHHFEGNAHOEFFGAEBJOIAOBNLIAODBEAHPLBBGICCEFIAAFLEHGNPOEHAFABBIEBAEIIAO
DBOAIDAJBIIEOCPHGJBKJEAOKKAAAANODGBALIOAHILIKAAFCFIGAOKOIADNAFDAAKEALGEO
ADJEFJPPLAAOEBJAGDEACGAAHPIAAECGCCBDDDAAANCLGDADEAIGAOJNLADHAGGAIHDHIAIH
CCACCHIFHIIIIJEIAIINDIGDHIKIGPIIHIADOIIAAHBNKABGEILGAOEKNACOIJLIAGJPJIAI
DOAAGEHGKCDJKENIIJFONAIIJJNIIKOIJAAEJPKIIHOLLAABAPBCGNLNLCCDAKCCILCKHAII
OKNHFFELGHABDNDHBAGLNICLNKKCAGHBAIAPHCHDGKOKFAHBDEKBAUOLDAAENLCGGPELEIAG
DOPAGKIIEGICNENGDLLFHGGLEFHFDALFGBBHDBICHDPIFGDOHGKAAOOILAAPENAAHAOIEABG
OKPIAKBNJADIOGEABDOIGAGNAENNAOAGPHBGOGPHGHAHPFHOBELHGENNBGIKEIEAIFPCJHIC
PJLHICCDJIGOOELGJAOOHGAALCEGCNDJKHIBDNIHAHHPIHALANOAAPEDNHIJONDIGNNPOHEJ
NDHAGNECKIGNNLHIIEAAIAAOLCJAIBNKCGJAFGBCIKFDBIENCIHIIFNFHIGPPOHGAHPGHGIO
ANKAJBGENBGPBHNAJBBHCENAOACHJCOCKHIPEOHHINOIGAAFFJAIAOFKBHIKFCGAJAFGLIJA
OHOGINCILIHNBEGJAEOGAAAIBHIJAADKGJAHCEPHAKBLIAHEGFJIGDIGDAADCEKBACNHNIIG
FBIBAIHBPIACHLFDIKJEPAIINAJAIHKBNIACDJPGJGIANIABIDAIAFJDNICOGPIJADHNKABF
INPIJGHINIJCHLJIAAAPDCJGACBBAKGPLJEPPHLGALEBBAHLFDLGBILOIAAAFEDBAOFIOGAA
DGLGGCICBDAFGOHBEHEBGDAHDGEADFPKBACLPHHAIJPIGAAPAGNAAHDGAAACFHGCILACLAAI
NHJAAFINCJBPNDCEJJAIEAGGHGFAAAIIHAAAEDCAAOPLNACHNHCEIEAKHAGLPPPAAHNKEIAP
LFGBANHHCBAANKLJAPCEEJEFNFGGAEPEEADFPCOAEBJIGAJKFNEDAPNOOBBHHHIAIPEILBAI
PPGBHGIFLIADPDFADBFNNAAKCKHAAADOAGAIDPKAEBHPDCAPJIBAFGLJGACIHNLCEOHOGAAD
BBAGAAHPDAIFNIHABIAFGAAJCNNBBICNKBBICFLICKAACAAHENJFBAPHBAAOAFCAAGBCLAAI
NALAAINBLAALAGEBBEAGCKAHADIAAFOLBAAAFLDAAOAHJAAIJINJADHKAIBPFEIBAJDHLAAO
FOEABFJKHAKCFIEABFJNHAKCAKODAJCHNKAEFEABAKCHGKAEFECBAKCHKKBKLIEAAKCHKKAD
FEGBAKCHEKADFEIBAKCHOKACJOHCKCCIEABFKNHAKCCCEABFKOHAKCBNEABFLAHAKCBGEABF
LCHAKCBAEABFLEHAKCAKEABFLGHAKCCJIDALLINAKCFEKBALDAEKBFLNDAKDFEOBALDHEKBF
NALAKDFECBANDPEKBFNEDAKEFEGBANENEKBFNIKAKEFEKBANLOEKBFNNCAKFFEOBANFGEKBF
NAKAKFFECBANFOEKBFNECAKGFEGBANDHDAAFFBCAAFINNBACAABKANHALBAIGDABANFLKAAF
FJLAAFFINAAJPNLEALANPBGFLGFJJJJHJJJJCBNJCFPNAAJOAENAAKAKAAANHFLAAPCOLAAI
NOAAJOAGNAAKLLDJAELDFKBCHNNCCLCCHJEKFFHDJOLNPKKLDECFBINCJKIPILNBFEOEHGAF
ACFAACACBBHCLHOEKNILAAKNNCJHGGCACHAOHFNJBFPGJAAIFGIAAPLINABADDCAANNOJCBL
GEGBAPHNENCHJKIEFECFJIAINADKKOAAFAKOOHFKBGOJFKDAFJIDAAIHBBANNCPAELDDGAAP
ALLAANHNCAAAPHGAANADDAANBDGAANAFGABAIDCAANEBBFJNFHLAAILOPAEPILGAALAJNBDF
AIFANIAHEAABNENAADFNKDAAJNIKLBCLEAGOFOJDACEHPAJKFOAALCCEPLDFGHNFHHBHFAFF
HGIAAAFGGACHFHIAACNGNABJONKKEJCEPLJAOLEAABEJPBLBIOIBAOHNPAJFDLDBAANGPALB
CFCIINGCAFALHODBLBHOGBALAIKAIGEFDIBAIKEAAEAHIAAJIJGAAIFGPAAPILHAGKCPOCAL
FLELABHFGAEKHHFBKOPKDGGHNKFAJNOLAALCJOLALFNBDAAOIIHAAIBAEAGNPIKAAIAFIALF
PHLGEOHEIAAENLNBAOCFEAAHECJAAIHOEAAPENGALHHINLAOHKBLDBHODALHHFPAAOLALJAC
NCJJLFFLBLAAEFPIBHADKALFPPJALFFEPAAPIBIBAPHGEAJCPKAAAFFLGLALFIELBGPEIAAO
ACJAFAKDICHJPPEALKELGGAHPEAADEOIJAANBKPAHHIGLALJFBECFEHFBAAGHPLBACEIHGLL
PPJAACEEPAJKNEPEEDPKDAAANDNLLJHGLAAAIANAAHBLHLCEFGIAAONAGAABFJGAAPEEGAAA
EEEAAHCDGALNAGEAAAHFIAABOJPKBEKPHDBHJAALBNOIBAAFLFLLBDHKFLAANBKLANBEFALN
NHNLJKIEPJDPDEGBAPOJNAAHANFAINGKGIAIHAPAAPHGGIAIHEOALPFCALAPONGGLHEHHALI

OJPAAEAJBAAIEOGAAODBLBADOPMAMAOGPAEPOLIAAOBCBMLFOLBAAOBCCMGGOLKAANBCAMAE
FCOLAOHMODAMPMGAJFCAFMAHPPKGBICILLBIEHOAAPIDHGCKAANAAHLFEABDPAHAAPNIDAGI
IBGAAHBDAMAAOLMADGCKGMHGPAOEMCELAIMDHMDAAKPDNGDHJMFAMCOGEAAEPMCOMBBCEGBD
OMMAACAGKBLJPPGALIECMGBIPGHAAILBEAADAEEAAHBGLAAIMAKLALFAMBAPOKJABIFBDMMF
MAHLAEOLLAANEKAMMCHEFAHGMACLGJOLDAALGAIMLLIILGAOKKCAMBPODDAKEKCMBAHEHAAB
IDKABIHLBCHGPAPEKKFHOAMCIGMAAGJJGLAJGOLAIHMDPBMDIEMMMCJJJALFIKJMAIIMPMAP
GMFDGLPMDHAILOMAMIPKBJAFMOMLMJIKAMAAHDIAAEMBOCAHPPOAAGDEBACMABDMKMJMOMLP
IADABMKCOMLPHEJAABGAKMMIILMAMJPHKAAMDGDMAIFJEBMJILMMMIOLMAADJAKBMIDMDBAJ
PMJAAFJIPAAPEOCAGDFOEAAPLLAJGAEKMMCKAOMAMKPPAAAMKLAMMAPPOADPBDKAMEFBELAH
FJGLAIKICMAMMJMMMKMOJBMIFMMLMJFJFLDKJGLMLJIDBACDHPGAADKBOMALKFJDAAMHEAJH
LOLALJCEMBCCPEOMLPMDMBMGCEPBMFIGFADKLJLMLJALJLBDAOMLMMMOAMMMAHAAFMGAMMMO
JICLLOPEDKBMKFNDBDANGAEBBCGNKOCLGDALJLNLLKKFIDAOHBJAEONJGDAIEOLAMICLADMG
FLJLAJCLEANCPPLAABJGLADCAHNNLAPHNBNNNJLJJLJNKNNPHPHAAKPDFNNPHHOAAJAPJNMO
AGNNLAAJENNDNPLNJLAABNCCDECBAPJACLGDFGOAAOCLAAANONJNFADBOCANKPBENNABJHLF
PNCLNBAACAAAOJNAANABNANHGBABNIICANNEEHGANIIIFNNJJHNNLDIBGNAACLBNNEOFAKNN
JGNNNIJJBNLJNNIINOLJNNNICFDABAHEAGAIALCAANHFCAAAHCPHDILKOAAPNFENCNBBLAAP
NKKNNADFNNAAOJFAAKPOBACNFIPAAPNPBBCNFKPAAPAPBNNOJBPNAAPLFLNJCHACNGHPLNNG
IDNNNCGGANNHGJENABGLNNNGCNPNNGOIBNNHAJLFLIFINAGNHEEAADPPIDALIFEAADFJDLCN
HDINJNHFINNLOKDNNAILLNLJHNFNAHENNHNPCEJBABAAFNAHBADAIDACBBCNPNDLKNANLNNF
OLLAAGGABNNJJDNNNCJGNNNCLOFNNAPPDAACCNDNACCPPNAPJHDLCNINKBAIFHKLNIEFENGO
IGFANJNFFNNCDPKNNNNJIKANNLFKJNILOAAICFHNNCHNDGHNCKLHNOLPPNAPNBNNAJJNFNDK
CEFEAJEHENACEJLNNEFDOGNEFAGNAJOODNNFFFGNNHOKIANFHDPGNNAEGLJFGCEGAHOCPHNK
NNDBNLGBPBGNPHOGCIEKLNNFHFNAADNKLNLPNNANAAFKCNAAOLLAACNGGNAJOFGNNJDNNNAB
NGJNAJCNPONAAPNAADFIBABGONNAADGPBABGNBNAADHIBABGNFJAAOBGDAOBOGHANCAFDAGP
AJLBNGONGKAABELBAJNNHAAEPIOAOEJOEAAGPPLAAJJABBFBNDCBAGIJECBDOOAAAEPNBBND
NONDOFLDDNDLFANAOENNGAAIFEOOGCJKNEANGGPOABJLIAAOJFKFBDLCCEJNJNBNFBGBFBNN
OCPNAPJNNAOCPOIDACNDHNOHNGONAJHNNONDNNGNJFNPBNNOKIANAKIDOOBGIBNAHPNJNJJO
GBOBEONPANBKPEEANOJIDANLAGIBAJFNFDJNNEGGNDHOCANCPPENOBGELHOJKACBAPNOOBAC
FNEONFDHONLPHOPAABIPNOJOHPJNJNJEGOOJKENODJGDOBAIJLNLNBKLAOAAFEFNNHJJJLHD
PNBLOBNHOBEAEGNAOINCAJBJHLJALJIGNAAHFNILANNLGJOGGIFOOFNNOAABKCEAADEONONP
JLKAAIKGDAAFPPOAAJHEAAANGAKNOFEIEANFEEANLCNAGLNDKKJONPPPJAAAHOOAGKNAJLAJ
LJDANGPJDAAINCKABBNCLANNIONAONILOAAJNNLOJLLOAOOPPCEONFOLPAANLOHONAPIKOOP
PNPOAPLLAJBJHJPAAPDJLAONGEKBGPPJNOLFAJOPBNDALAAOOJNANJFKKOJPBJAAONFELOAJ
NDFOONNHFODKNJLOONNNNOGNCLNANDAANEACAANAPABENPOPCENLAOFJLNNFEGGCCFEODINL
GFNAPCPPDAPBPLAOPDNIPOAPCLNNONFJFLDLABBAONBCANAIAAJAAONAPANFCGNNDPEIJOBD
IKLBOEGGAOOFFCPOPBFHJOCIJAKBOFFALABNOONAADADNEOFLDDNBCGFFOBBGHJOOGONLAOG
GNPOOGBBFADNHDEOAPHFEONLCBNAOFDGPNPAFKOOANFPPNNNONAJADBFGDNNKKDAOINCGNJF
NEGNNNKNOAPHIFGOAOIHGONNKOLAOINFOOOIIGKAOFFEBNCNNNICGDOKNOOLAPPAOKGBHBDD
LONACNBCNAAHENNGNDPKCGCNFNDLOJNCGJOJJKOOAFJNCOAPLLLJPDJLPLANNJKANEGCFGAN
IKCLNCHOFANGKGFPOKKHNOPFFOIPCEONANEACDEBNFFNLOADNAOLANBDKANFABNAOFCLGNNH
GHBBONKKPPAPHNCAADPPNAPIPPOAANJFIPPHLAIOPJJKNPPJKLOGPJNPNPCNLCDOPKFHFLPK
KHBPNNNINAOILFJGAOANNAPEEFNOBNEPLPAOEBPCOJEOLPIEACKBOEGGDHPFFBNOANFDFOOF
FHJPOFIJNCPFBCPAPFELDIOGDCOBPBAJNFPGILNAOGGEOPOGOIEAAGKCNCPGBOCPONNEGOON
NNIAONNKNOONJOAAPLNBKCOFACJBOKONCOOKNFPACILAILAOONBAABGFIDLJNALPLJHNKAEJ
JIJLOOJLBLDPBFOAOLEIJABIDCEGHIDPAAADLALPPNOLEAAOBKPPAPPNNAANHAKNOFIBOBAO
HOOAEONADLOOELJIAOOOPAJLNALLNCIOLPIEOJFAAPPNAANFJIIAAINFLOAOCNACNJCNONAP
JIIAAINFEOPONCAJAEPNLNAOEENANKGECNNEPENANNAPGALKOICAAFBBJAAFIJKBNLPCLAAO
NBBPLJNALLOPBNANLNJANOCENNONAONNOAAOLODOOONELGAOBDPAAEOJOAALPFNAACBCGGOD
BDEGAPINNBGBKHNAALNJEIGNELCNLJOAKNNNJHNLLPFJNLPNIIAGPNNNPCANNADNCNEFLIAO
DGEANDJEGLAPEKCNGBHELAACBPCOAANFBAABCHEONDCLNNCNFNCBINCAILGICLDNCNABENND
FJNLCNOLGAAFEKPNEPHFPAAEDELNNCNNJCOOJLELABNOKAABGOBBLKDDELABFBABAJNBHIAN
GODPCKIDOAAKJLELABOLPAANJGBLNHLOKNLNBFOABGKBDLLKJLILALJABAIHENOAPGKLALLO
BNPNAPLIAAAJCFCGLLBDNACAILOBNLEEOCALABBNBGDNGALJNKENNFNKFLABGOBBLKKDBLNA
KNILNKOIJAAAGOLPLKOAGLALABNNLKKICNLLNPJADFILGBNFPKPAOBNNFDJAFNANLNKLEOAB
HOKAABGOBBLKDDELABFBGBAKHBHIANPDIABNIDOAAKJLELABOLPAANJGBLNHLOKNLNBFOABG
KBDLLKJLILALKGBAINJNDAAPINACLOBNPNAPLIGAAKCFCGLLGDJADFILOBNLEEACLGKNLOAD
JGILLJFEKNLNKACLLKKNFLLKLABLECPDNACIBNNALKKFALLLLCBLACFJLDBIFGKNAPEKENAI
DNPGDICCOAAPBPGOCEAFAJONOOKNDOBEOAANBKOABGKBDLLDBEBABFKGBAINAPDAAPNIDBAI
KOLALJBELAAONPGALJHBONNLNKFLABGOBBLKKDLLLJLIGAAKNBFIAOPCNACIOANLNBPPIAAL
KGFAGCLCLLAKNNPCNDCOKCNEEIEPANDNGALJIGFADLFLKNLNBFOABGKBDLLKLFNDIKNNAOEG
PCNACIOAGLALLFNDLKNNCOLLGNNACNLOOOCCEKPNEPALJEAOEBNALFIIAGPNNNPIAHIPNDAF
PNEANDCLNNCNOJLOLJBEOAANBKOABGKBDLLDBEBABFJABAIHENCAAPNIDBAIKOLALJBELAAO
NPGALJHBONNLNKGLABGOBBLKKDLLLJLIAAAJHBCIACPCIABNOJKAAAPNNALKJLILALJAFAGC
LCHLADKALDBILOLNDOODEAGJOIOAACNFDPEPCHHLAPGHKAEJNIAAEPAENAAPGHGAAAADIAAN
PAEELAGNGAAAADBAANNDIAAOBAFAPNNNPAENFBFLANBUAAEPAEFAKOPHHAAHILIBANPAEELA
NHLABINBDAANPAPEJKFHLACHBAIDEKPKLKAONBJAANHOIGANABFLANPENAAPPBLAAINNKAJH
BKPNAPHNGACGHHGADFJNKALKJKIEANFILAAINHLAACEPCAAABLHAAFAENANHHNPAAAHFEAAA
CHJHAAOFPKGADJJBBFNDFAKONDIAAOKEOABHNNDAADNJBAAFPALEBIFHHAJLNCNAAHAIBAAE
LLNNNLFJOBCNPAPEJKFHEAAAHNNNAHAIBAAELLNNNLFJOBCNIJPAAEPOIAAOGBKALKGOHCAP
NBOANHAKHAAPNAHAAPNCFAAAPBOPLANDIAAOFJOABHNNPAAPHHGACGHHGAAAPPHAAHJPHBAH
ACIAAOKEPAAPKBOKDABDKALKGLLOACCHLLABFHEAAALLNNNLFJDBANOIJAPCILNAANPPHAAH
GGHCANAGPAAPHHPABJHHCAAAOIGAFGKBOKDAOFOAAPFANDANCLNALCBLHAAFAELANLLNJNBF
NDIAAFILNAANPPHAANAGPAAPHHJAFEKJHLANKJHLADPPAAANFADDEPFPIANFNAFKICOBIHIO
BAEABGILGGANANGAOGICKBOGILNAOGGEOPOGOIEAJGDKABABEKJLBEHLGJAHBAEABGILGGAH
ANGAOGICKBOGILNAOGGEOPOGFJKFBFBAKALEECNIAFNLNBAADBHNOEEGNAAADIOGAHANPAAE
JNGPBNANDAAEPDBKPKNJPNBNAAOAALLCFAADGGCOBICAOPABACGAADEOOOANNAJAONGGBAAN
JODAANLGONAFNJBNBAAAGAOGICGBBBOAOAOEFGKAALEOIOFEFGCOJNGDOPOEICKBOGILNAOG
GEOPOGOIGAANALGAOGFOKAALJLKABDAKGAOGEGKAALEOIOFEJLGAOGNCAJPCBOKAAADGOAOE
NOAAAANNJGOAGNBOAAJALJEAONJAAAALOCAALDFGAOGNCAJPCBOCAABDGOAOEHOAAANNJGOAG
NBOAAJHCJAANLLGGOGNCAJPCAOKAABDGOAOEFGKAALGKLOAIGNEOPGGOIOAOGOLAAAGGOOAF
LCLAAJDKKBAAGGGOAELCAAPCAOCAACDGAAPCAGKAACDGLAAJNPOAAFKALAAJDEABAKINGAAF
NCFAGOGPDLAANDLAAINKFAKABANAACHFEAAJGGCOJNCAGPAADCGAADEOPONNFGGOAENCNAAI
FFPAAPNBCAAOADCAANINNBANNPJBPENBPAAPNGGCAFGGCOJNJLPAANFOAAANJLEABGNAIAAO
JKJADPILNBGNNHPAAENKLLABJDGIAFGOCBANILNAANNBCAAOADCAANINBBLENKJADPILABAP
OLJAKLNGNAACLCDANPPIJAAONKGFOGICABPCBOKAADDGOAOENOAAAANNJGOAGNBOAAJHGNAAG
GGCOBICAOPAAECGAADEOGOAFLKOAOEFGNAADEOGOAFLCAAPCBOKAAEDGOAOENOAAALNJGOAG

LBOAAJHDAAABGGHOGPEOIOFEJLDAAIOPPAFBHJGAOGICABPCAOCAAFDGOAOEFGKAALEOGOAF
OHOAOEFGCAALCAOPABFKGAADEOOOAHLAJAOHGGBAALJODAAHAOGAOGPHOGOEEILFAJEPPACK
DENBAAAFCAALOFHABFOKLABHLDLDEAHHKDAOFHCDELDPBAAIHOKAAOLCFAADHDKAAAHGGAAA
LCFAADLHCCALDFLAAOGHLAADOJHIAHFIBAAIPOCAAADGDAAHFCPAIAGDOPOEICABPCAOCAAG
DGOAOEFGKAALGKLOAIGHEOPGGOAOOHAJGAOGFOCAALJLKABDAKGAOGEGCAALEOIOFEJLDAIJ
FGGAOGPHLGAJHPOAAFHALAAJGEABAHENADJIILAAAPOLDAAKIBOAAHOKCAAADGCAAHAKGAAH
AGBAAADGHACLLCFAADKCAIJOOKIAKLIAPACPFHKDAOOHJJADHOEAADFHKDAOBGBPAIHOKAAO
LCFAADGFHFHHOKHADFOKOAAPAHBHAOFHKDAOHODBIFFOLAGIDHODAHLDFDAHHABAAIPOCAAL
DFGAAHEGELAADAGAAEOLEAAHHGPAEPLICAALDFEAIGFBAAKLDDHAHPPGEAAHAHLAAIHGAAPA
AAHAAPPJLAAIPAKAHGOPLABHFBFLAHBDLAAIPHDAAIPODABIAHGAHGKAGBAABGGPAEBAOHFI
ADHAAHLHOEOHHPABKLLAPJAEHKDLACILGAAHAAAPAAPHDAOPPFLOAIPHBOJJADHAAHILKAAH
POGOAHAAAAPAAPHJAAPILAAAPOLGAAHHPCBJLHLLKHEILOBALFAPBCBLHEOADHLBBLFHOOAAC
IKFAAEAGIAAJCFOADLAGFKAHBJDAAIHHPAEPHEDAABILFAAADLFAAENOJLABIDDALACEDBAB
PGFAAENIFLAHANFALDHPEADGHKELAAIFLIAOFLKAAIEFHALFIHPBLGHBDLLHHOHKDLPHOAAG
ILHBGHEFEAAADLFAAAHCPAADPGFAAENNALPLIBOAAPFLCNAHDDLALFPPKBAIEFHALFDHABAK
AHOGJJDLGAAHHEEAABIAHAAEAGHAHEBJHEPJDECCAAIFHIELHHJBAJPHHAEHOLHAACILFAAA
CPGFAFPGPANEOAKKAPHHPHAHBOFALDJGJIAFHLFGAOILGAAHIJGBAAEIFAKOPHFADFBOPHNE
ILCAAHOLOAAHOLFAEOHDLACHHGEALPHEHEBHIKPEBPLJIBAOHPFADHHOKDAPCJFAAEHEILBH
AFKAAIEFHALFIHPBLGHBDLLHCLHACIADBLHDAEFAKOPEFLAFACLAADHCDAEADFLLAHGELDAC
OFFEAHCOGAAPEFIALHHKGLAPEFHALHHPHLDLPHOAAGDHCBLOCLFDAHAEIAAOGHFADHAGLALO
DFALAPGJHBDLOLFAHGHHEBLJAEJAAOEIIAHJOACHDILPOAAGDGLAADDOOAAADHDAAHAKFALD
FAJBAFIDHAAHKEACAPEKPLLDEOOLALELLGAAHCLBCHHGLAAOEPGAAPEFBADBHEHAACPGFAAE
HHELAHAEFAIIOLFAAADFHLJOBHADAPIKFAAEFHHLBDIBEADGHIJIAALOLAGEHOBGBDPGFAAE
AGIAAAOACHBHAEIAAOHEFAAAFJHAAHEFPAEPAAGAAHEFJABAHHFAAEDBOBBHEFCAHLILGAAH
EKPLLDEOGLAPEFHAHGHFGAJIEFBABDPDAKAHOLHAACPGFAAEHHFLAHBKGAAPEFHAHGHEGAHK
HHPAEPBFLDAIAFLAADEFEAAAHGHAAADFCLACIBAEAOPGFAAEAGCALPKOFJIIEKJLBEFBCALB
AJKBAIEFGAAAJIFAACGAHCADECEABCECKAAIEFHALFIHPBLGILFAAADLCALHDHIAKBGIOIBH
BNPAAPAFKAAIICCBADOELAJLDCLAIBFACBBGIKCABIDCEAAODNFLLDMIIABNELLJIHEEKAAI
ICCBADOELAAODNKAAIEFGAAAJIFAACIGNCADAJFBAHDDKAAIICIBAIEGLAAPMHFAAEDBLBIL
LOGBAEJCKBAIEFHALFDNPBAGEGGEAADNCABANDKBAIICCBADOELAAODKAAAIENGAAACAGAIL
DBKAAIEFGAAAJIFAACLDGDKAHFJAABIDNAAHPPEEAHBDLAAIAFLAADEFOALNLFDLLACEEBAB
PGFAAENIDLLGDFOLAMNILBLOLGPIADPGFAAENIELAHIPHDADPPFALDDHFGFFENCAAAHNPAAA
FHKAAIICCBADEAIHAOBJKALKHDLEAIBNPAAPAFKAAIICCBADOELAJLDCEAAOPGFAAEAGCALP
LGFIAAIKCABIDCEAAOLCBJFGEJBBAFBCELLBHFLACHAFLAACMGOACCIJFAADPGFAAENIELAH
AEFAIIOLPAAAIKFAAEFHNLBIGPBLLHHDLLACEFIAGEEFCAAAIKFAAEFHNLBIGPBLLHHDLLAC
IMDCLADBEMAAOFEKLPFFCAAADLCAAMADFELDGIHAEIBJOEAHBNAADEFGKAAIEFHALFDNIBAH
KCGCAADJHABHGPAMAIENGAAACAOAJKIFCIJLGBPFLDEOKLAIEFGAAAJIFAACLDGDKALFGMAP
EFGAAAICDAJAHLOIAFIKFAAEAGIAAJCFPAAOPPMAAADBIBAJIIFAAEBBNDAHPPMEFBDFKLAE
NILBAIAFLAADEFOALNDMGAAPEFIALNHFGAADIKFAAEFHNLBIGPBLLHHDLLACEFIAGEEFCAAA
IKFAAEFHNLBIGPBLLHHDLLACIMDCLADBEMAAOFEKLPFFCAAADLCAAMADFELDMCIABNIFKILE
DPOLLEIKFAAEFHLLAIPAGAAPEFNALNHEAAACILGAAMLJHACCNDAAAOAFIAANEBFGAEAEFAAA
FBKLAIFFHAAAJCIAAJJCLAAINKPALGIJCALHCHPKGPPOCAAAHNOAABLIPKLGHBKLAGDGJAAI
EFEAAAAMCBAAIKFAAFAHCAAJJICAAJILKAANGPJLAIMCHLKCCHBACIACNABDOPIABNIJFAAE
AEKALHBKAAAIENGAAAJKFEAEAEMABAACKAAIFFHAAAJCIAAJJCLAAINKPALGIJCALHCHOKAB
ILGAAMLJHACCNDAAAOAFIAANEBFGAEAEFAAAFBKLAIFFHAAAJCIAAJJCLAAINKPALGIJCALH
CNFBAELCBHLNGAIABNHKKLAAPGFAAENNFLAHAEAAAIENGAAAEAKALEDPOLLEIKFAAEFHNLBI
GPBLLHHDLLACDDACAPHIAIABIKFAAEFHNLBIGPBLLHHDLLGFOLIAAADLPANHHNIAGNHPKNLE
LLHALBICKBKKCAMKKKECOJGCBCOABGOKKACDFEOAEDOIGACILDIBIHAEFAIILDENCNEBCJBP
LLGAADJAEJGFILDAJJKKAKKCKNCKJEGKAOIOGBKCADDHFGAHCCMCADDHNAAAACDBAKDKCAKC
DKHAADAMCABAKDMAADDHPACAEAHAADDMHAADAPOCADDHKAADDHBAAKEAHAADKDEAAEADEKAA
AFHACCOFJKALDBHBAPPBHAELDOOAADDHGABHGAOBBHAFJAAKACFBAHDGLAAIPDEHAAKJCABA
HFEAABKIOIADCNCBHLDJGAADEEHAADHFPAHKDOEAAECHAKLHHHHBBIADHAAMDLAAAPHCEALG
MDIMBIMHLAADMHIAKBOJIAADMFHPAPILFAAACFOAAPFMILAPDLOAAPHHGAALDLGAADEAHAAD
LABPAIPPKAADDHHACEIFJIAOJMHABPFNLBBMPIBAAAHGMAAJILOAADEEHAADJDHIFAIILDAI
PABAAKEAHAADEAAAAEDLAAAPHEEAAECILFMNPALONFPHJAAPLFBBOPAADAANOAPAFCNGFAKO
LJBABDPHBAAPHNENAHEMLAAINGFAKOLJBABDPHBAAPPNLCACNCOAKNILGAANNLLBAINNFGIE
JEPLGECMBAAKEAHAADCLIALNDHAAOPDBHBAPPJDAGFPKPANEOAEKFDNCHABAACFAKOKNEFLA
PBFABLPBAOAANDAAAOCPGFANIJEBFDNGLAADMCOAAHAEFAIIOLGAADDEJBFDNCBJAINNNBAH
HGGAABFCNBAHDNIBBGFJLAGNAEFAIIOLIAABIBNABFAAEAAILJIBAOHEJABGNLJGAANBLLAE
GJFBIIOLKAAHCKEBAECNOBABEABAGECNGBANIJEBAPOFILAEODEOAAKBAAAEDHAAAEEALAAD
PAEAAHJFOPABEANABCAHNAAAACLBAIBOAAAEEBEGGOHFAIAECCKKADDHNAAAACLBAIBOAAAE
EBEGGOPHJAAOIGOAAPIGIBBINHDAAKDOHAADDLAAAPHGBAABILOAABDOHABCAHDAAKECNABC
BOOAADCNFBAACFBIAKDOHAADANCABAFLJGADDOEAAEDHAAPLKBOAADDHDAAKEEPABIEFCAAA
GECILBBEHLAPEOOAAECKOBADCNEBAACFOAAPJJELAADLADAEDHFAANEIGGADEEHAADEKCLIE
ILBBJOEEOAAPKJOANHHNEEBAAOIBAANPPNADBEEOAAPCLGAANPABOBDPHJAAPNODKEBKJNAAP
BNIDAPALPAAPENLCADHOOALNHLHCANOLKAAFIOOFNNNCJAALDBHBAPPBFABLIBGBAPHDOADN
DJFFLJEFNIBIDOFELDLDAAJICOLCADNGDAAHCIEABDPINABIIJABBINGCAAHBNEABDPINABI
IJKBAPCLGAANPABOBDPHJAAPIHJBBIDJIDANKBCAAEEBEGGONNAJHOPCLBALBBBAHLJFEJBL
CBLKLGKDJEAIBOGAAECCDKBANHLEALBBBAHLJJDAAAAGGAAEDHCANDHFNAPBPBDAAOLEBBKC
HELDAIBOGAAECNDBANADOAKOBOGAAEDHAABPHKJIALANNANDODDAKNOBEJGFILDAJJLIIJAA
OHKJADNCCABGOCJAAPIFHICLLHGKANOLAABGFNECKNLGIJJLAHGAKNLNLJGGNBHKENFNNDAA
GGCOBIBGNBAPEOHOABCAGPAGAEGABBOAKAJJNPPJBPOHPJKLLGLKAINGAALJAEBAFGLLEALB
ICBBJJILDAJJKKAKKCKNHKGNNDJEKNAECABEAAEABEADPBALAPDAAFEOEAAEEFIAAFEOFIAE
FIFAAEFDCAAFEICJGBCFDAAHBCCBBBBCCBBBBCCBBBBCCBBBBCCBBBBCCBBBBCCBBBBCCBBB
BCCBBBBCCBBBBCCBBBADABAECIDAACCJAAAHGBNAAGFPDAAGGPNAAGCODAAGAJBAADLEAFAC
CAIAACDIIAADCPBAADDBPAACDBFAADCJAAAAEBCAAGGPCAAHHEFAAGGEAAACHHJAAGHEIAAG
CADAAEGPOAAGHECAAHGPNAAGCNAAFEEFCAAHHCPAAGHCAAACDNFAACGEOAADAAFAAEHCCAAH
GPCAAHCANAADCFEAAGDOAAAAEFCAAHHCPAAGHCAAACDNFAACGEOAADAAEAAEGFDAAHHEJAAG
GOBAAGHEJAAGGPOAAGCANAADCFDAAHDOAAACDLAAACEFCAAHHCPAAGHCAAACDNFAACGEOAAD
AAIAAGAIDAANAIOAANAIPAACAJPAACAJPAACAJPAACAJPAACAJPAACAJPAACAJJAAIAIEAAJAIPAAJ
AIFAALAIAAANAILAANAIKAAKAIPAACAJPAACAJPAACAJFAANAIPAANAIJAAOAIDAAPAINAAP
DGJDAACPJAAACPJAAACPJAAACPJAAAINLFABAJPAACAJFAACAJKAACCKKAACCAAAAFEBNAAE
CAFAAEHCCAANGPCAAHCACAAFGFAAANGPCAAHHEJAAGGOHAAGCAOAACCOOAACFAABACCAAAAC
CADAAFHFCAAGHDJAAHHDEAAHGFNAAGCAAAACCAKAADBCAGAFEBNAAEFAFBAFGOLAAGGOPAAG
HHOAAGCAIAACCFEAAGCJAABFCAAAACCAAAACEFCAANHCPAAGHCAAACEDPAAGGEFAAGCAAAAC

DKAAAACAAAAFEFPAAFEJOAAEEJEAAFFAABACFAFAAEFPCAAFEFDAAEEFJAAEFGFAAEFAABAC
FAFAAEFPDAAFEFOAAEEEAABFCAAAAFEFPAAFEHFAAEFEGAAFEBHAAEFAABACFAFAAEFPDAAF
EFEAAFFGBAAEEHAABFCAAAAFEFPAAFEPHAAEEPAAAFEFOAAEFAABACFAFAAEFPPAAEENDAAE
EHPAAEFDFAAEFAABACFAFAAEFPPAAEENCAAFEFBAAEEEAABFCAAAAFEFPAAFEPHAAEFHCAAF
EJEAAFEFAABFCAAAAFEFPAAFEEBAAFEDIAAEEBOAAEEHFAAEFAABACFAFAAEFPJAAEEOGAAF
FPHAAEEFDAAFFDBAAEEHFAAEFAABACFAFAAEFPJAAEEOGAAFFPBAAEFCHAAEFFHAAEEFOAAE
FEDAAFFAABACFAFAAEFPGAAEEBEAAFEBHAAEFPFAAEFCCAAFEPCAAFFAABACFAFAAEFPCAAF
EFDAAFFFHAAEFEAABFCAAAAFEFPAAFEPAAAFEFOAAEFPGAAEEBJAAEEHAABFCAAAAFEFPAAF
EECAAEEEJAAEFCPAAFEGBAAEEJHAAEFAABACFAFAAEFPIAAEEJHAAFEBJAAEFEAABFCAAAAF
EFPAAFEIJAAEEJOAAEEJEAAFFAABACFAFAAEFPDAAEEGHAAEFAABACFFOAAGGLOAAGGPHAAH
GOAAACCIFAACGEJAACFAABACCAAAACCAAAAFHCPAAGGDFAAGHDDAAHCAAAACCAAAACCAKAAD
CAFAACHDAABFCAAAACCAAAACEFIAAHHECAAHGBAAACEJOAAGGGPAAGCAAAACDKAAACCFDAAH
AKAABFAACABADBBBBDAJABBFPPBEBDFAIBBDLDPDEPDBJBBADIDBDLACBBBDDBBBBDFBCLBA
DBDBBACPEAAGGFGAAHCPJAAGHADAAGADBBBDAJABBFCPEAAGGFGAAHCPFAAGHCCAAHFPCAAH
HAEAAHADCBBADBCBBADBBBBDDBBBLFADPBACGEFAAGHGPAACGPHAAGAAAAACCAAAACCAAAAC
CAAAACCAAAACCAAAACCAAAACCAAAACCAAAACCAAAACBCAGAADAAAADDAAAADDAAAADDAAAAD
DAAAADDAAAADDAAAADDAAAADDAAAADDAGABAAADAAHBFAAAABPAAAABPKAAHBFAAAABPHAAJ
BOAAAABPAAAABPAAAABPAAAABPHAAHBFFAALBFAAAABPHAALBFBAAHBFAAAABPOAABBGKAAC
BGKAACBGKAACBGKAACBGKAACBGKAACBGKAACBGKAACBGKAACIGPCABAAPAABAAPAABAAPAAB
AAPAABAAPAABAAPAABAAPAABAAPAABAAPAABAAPAABCAOADKBPHAAKHPPJABAAPAABAAPAAB
AAPAABAAPAABAAPAABAAPAABAAPAABAAPAABAAPAABAAPAABAAPAABAAPAABAAPAABAAPAAB
AAPAABJHIAABAAPAABAAPAABAAPAABAAPAABAAPAABAAPAABAAPAABAAPAABAAPAABAAPAAB
KAOAABHJGAABCAKAABDJHAABKHHAABHHGACIBPAAAABPAAAABPCAAHIGPCABAAPAABIOIAAB
AAPAABAAPAABAAPAABLKOAABAAPAABCEIAABAAPAABAAPAABJHIAABCHJPPCBCAGADDBCAAD
DDEAADDFGAADDHIAADDJBAAEECDAAEEEFAAEDFABADDBCAADDDEAADDFGAADDHIAADDJBAAG
GCDAAGGEFAAGGGAAAADAPAODDAHAODCHJPPCBCCGBBBAHBPCCJCPGBAAAAACCAAAACCAAAAC
CAAAACCAAAACCIIAACCIIAACCIAAACCAAAACCAAAACCAAAACCAAAACCAAAACCAAAACCAAAAC
CAAAACCAIAAEBAAAABBAAAABBAAAABBAAAABBAAAABBAAAABBAAAABBAEAAIIEEAAIIEEAAI
IEEAAIIEEAAIIEAAABBAAAABBAAAABBAAAABIBBAAIIBBAAIIBBAAIABBAAAABBAAAABBAAA
ABBAAAABBAAAABBAAAABBAAAABBAAAABBAAAABBAAABAAAABBAAAABBAAAABICCAAIICCAAI
ICCAAIACCAAAACCAAAACCAAAACCAAAACCAAAACCAAAACCAAAACCAAAACCAAAACCAAABAAAAB
BAAAABBCCGBBBCCBBBBCCBBBBCCBBBBCCBBBBCCBBBBCCBBBBCCBBBBCCBBBBCCBBBBCCBBB
BCCBBBBCCBBBBCCBBBBCCBBBBCCBBBBCCBBBBCCBBBBCCBBBBCCBBBBCCBBBBCCBBBBCCBBB
BBIBAIHDAAAECHDAAEBHLAAOOCGAADBKHAJOBBIBAIHDAAAEJJJAAJJJJAAJJJAAOPONCJBB
PAHAJOBCCBBBADABAEIPAAHCBCABAPONCJBBCEAAHCBCABAPONBJBBIIDAAHEAIAAIDKAAAI
DICABBAACABABCLBHFABIAAOPOHIADGHCHBBBCCBBBBCCBBBBCCBBBBCCBBBBCCBBBBCCBBB
BCCBBBBCCBBBBCCBBBBCCBBBBCCBBBBCCBBBBCCBBBAAOAAAHPDGBAPAPAGHBCCBBBBCCBBB
BCCBBBBCCBBBBCABAAJAHAADDBEBAADBCBBBAJAAAAPPDEBADGAABBJKPHEPADIBACACABAA
BJAAAAAJDBBAABAFAACCAAAAAJDBBAOKGABAAAJAPCAJDBBAPKDBBADEAAAAPPDEBAACBALF
AAHACKPPDEBADAPABHAAFABDAJDBBABDDCBAPGPBEPADCBAHAJGBBEAAPAEPADLBJHAAOAAF
AAPAEPADDBAOAJABAAGHAAAAAJDBBAOGDCBADLJOBAADJBDHADHBAHAAJABAADIBCBADHBAH
AAPAEPADHBCGADHBAIAAPAEPKIJCAAADEBAJAAPAEPADKBABFAABAALHPCEPADOBAHFAABAA
KLAAAAPPAEBBALHAIGAAPAEPADCBALALDABAHCAAAAPPDEBAAEHAAAADOBFJPPDEBAHCHAAA
ADJBBFPPDEBAAEIABDAAFAAOAAPAEPADOBAGDIABAAAEPHEPADOBACJKAHAADBPCEPADCBAL
JKAHAAAFBAAAPPDEBACICAGGAAAAABABPAEPADEBAIGCAGAABLBAAAPPDEBAPACAGGAACAKH
PPDEBAEOBAABADPBGAPPDEBAGIBAABADGBADABPAEPADKBAJBBDABADPBAAAPPDEBALEBAAB
ADJBAEABPAEPADKBAPBBHACHABPAEPADHBABLDADAAFLBAAAPPDEBADHDAABADCBAGABPAEP
ADGBAFBDDABAGLBAAAPPDEBAHIDAABKIBCAAPPDEBAJCDAABADHBAHABPAEPADCBAJBDDABA
IGBAAAPPDEBABDEAABADPBAIABPAEPADIBABCCDABAJHBAAAPPDEBAEJDAACADGBBHPPDEBA
GKDAACADABEIPPDEBAGKDAACADHBAKABPAEPADEBAKCGDABALCBAAAPPDEBAHDDAACADHBAL
ABPAEPADHBABCHDABAHABAAAPPDEBAICIAACADJBAHABPAEPHHHCACADBBAHABPAEPADGBAG
CHDABANIBAAAPPDEBAGGHAACADBBAOABPAEPADCBAJCHDABAAHPCEPADHBAKCHDABAPCBAAA
AJDBBAEEPAGHPLBAAAAJDBBADOPAGHADCAAAAJDBBADKPAGHALCAAAAJDBBAEAPAGHBDCAAA
AJDBBAECPAGHBLCAAAPPIECKCPDABACBCAAAPPDEBAHIPAACADPBILPPDEBAOHPAACADDBAD
ACPAEPADKBAAAGABAADKCAAAPPDEBACGGABAAADAAEACPAEPADHBADAGABAAELCAAAPPDEBA
FGGABAAAEAAFACAABDIGGGAFAGABAAFKCAAAAHOBAHBCABAGACHABAHAAAAADGAABBGGCAAA
AJHAKAAAHABCADPBAGACHABAHHBAAACICABAAAIAAHACHABADHIOAGBBDABAIACAAAAFBAAA
HHAAAAFGDAABADIBAIACHABAFLAAAAIHBABDAABAAJACHABAHLAAAAADPAEPAAKAAJACHABA
BIHICAADDBAKACFAAAABOALPHIDAABADLBAKACAABDACBAAACGBABAAADAALACHABAFBBAAA
AEIABDAAHAALACJAAACCBHAAEKPAGHHFCAAAAHDBAJABEAAIGCAGAAHOCAAAAHIBDPBKAABF
AAHAAHACHABADEAAAALCLAAAADABAOACJAAAAAJAAKABBACAADJBAOACHABAPJHAKAANDABA
PCCAAADALBAHAAPAAKIHAHAAPICAAAAHOBACABKAAJBBAABBADPABHLPDCCGADJBAAADJAAA
AAHAAIAAGAAGHPCGABADJAAAAAFAALEGPCGHBLDAAAAHCBGBLEBAABADEBACADJAAAAAOAHO
ICPAGHCHDAAADAJBAAABHAAOCPDABADFDAAAAHEBHAPKBAABADHBADADHABAHEEFAAAHDABA
EGDAAAAHIBACGEDHBAEPDAAAAHBBAKHHADBFAAIAAFADHABABEAAAACICAGGAABAAGADFAAA
PPKAAHABHAABLDADAAGJDAAAAHHBABADLBAAADIBKBDAHBAHAAHAAKCHDABAHKDAAAAHDBAC
AACAALJKJHBDADHABAHLBAAAGHDCBAIHDAAAAHKBAGAAOAACJKAHAAJFDAAADAOBAEAACAAJ
CHDABAJHDAAAAJHADAABAAGEADFBAKADHABABPAAAAGOIABDAAOAAKADJAAAAAKAAFAAAAHF
LFDAAAHPBBLFDLDGBALODAAAAHOBHFEOBAABADFBAHADFAAAABLABLDHDAABADHBGHDAPBAH
ABCAAFCHDABAHCDAAAAHLBABAAAAAPGCAGAAHLDAAAAJAAAAHGBAAAGPDJBAODDAAAAFBAAA
ECKACOBEDABAOHDAAAAHCAAAEIOPAGDGDABAPCDAAAHBHHAPAAAAKAADHBLHDAABAHAAHAAJ
CDAABBAEAABDPDAAAAHIPAACADIBAAABDHHBAAABHHAACADABABAEAABDFCKBAGCDDABA
EHABBDHEJEABCHDABABPLAFGACOAAHAADALHADIBACAEFAAAPPFAFKBLCAACADHBACGLCFAA
IHBAAALAEAADADFBADAEFAAAPPCAAJAAFAAKCCDABADKEAAAAFPAAPPHAAAAKCCAACADABAE
AEAABDBHBAAAFHKAACADJBAEAEFAAAPPHAFKPACAACADOBAEAEFAAAHDAGAABODAACADEBAF
AEFAAAPPAAAGABIAABCCDABAFLEAAAAFPAAPHBGEADCCDABAGCEAAAAFPAAPDCBAAABICAAC
ADIBAGAEFAAAPPFAAFABLAABCDDABAGPEAAAAFPAAPIHLDABCCDABAHFEAAAAFPAAPFOAAAA
DJCAACADLBAHAEFAAAHLBHAAOHCAACHKEHAADAGBAPAAKAAAAGABAAIHEAAADAPBALABHAAH
CKDABAJAEAAADAHBAFABHAADAGABAAJHEAAADAHBAFAACAAICIDABAKAEAAADAKBACABOAAE
CJDABAKJLAFGACFABEGKGAADADCBALAEJAAAACHAHIHIPAGHLKEAAADAOBAGAAFAAACJDABA
HCEAAADABBJCFOJAPCAAHADHAHCAAAGLBAAAAOPAGHHEEAAADAGBAFABGAAGCHDABAHHEAAA
DAEBACAAOAAJCIHABAAEJAAAACHAACAAAAAIDIDABAOHEAAAAJCAAAHOBAAAIIKAADADEBAP
AEAABDDHBAAAHFHAHIAAHAAPAEAABDCJBABGCPDABAACFAAADADBABABDAAJCPDABAAIFAAA
AJCAAACGAAAAJADABCAAHAAAAFPAAFFAAAAFGHJAAGHDEAAHFPAAAAFPAAAFFABAAGGEEAAG
FPJAPDFPEAAHGBJAAGGHAAAAFPAAAFFAFAAHHAEAAGFPJAPDFPAAAFFAEAAGGFHAAGFPJAPD
FPAAAFFAHAAGGPDAAGFPJAPDFPCAAHGDGAAHFPJAAGGEAAAAFPDAAHGOEAAGFPJAAGGEAAAA

FPIAAGGFBAAGGEAAAAGFCAAHHCPAAFHCAAAHHEOAACDLDOAGFPHAAHGPCAAHGFGAAHGFOAAG
HEOAACDLDOAGGMPAAFGDBAAGGODAAGGFNAAGCOLAODGDNAAGFPDAAGGILAAGGJPAAGCOLAOD
GDNAAGFPCAAHGFDAAGGFJAAGHGFAAGCOLAODGDNAAGFPDAAHGFOAAGGEOAACDLDOAGHDPAAF
GBDAAGHEJAAGHGBAAGHEOAACDLDOAGHDPAAFHCFAAGGHPAAFGFOAACDLDOAGHDPAAFHFOAAG
HCFAAGGHOAACDLJOAGHADAAGFPPAAGHAFAAGGOOAACDLFOAGHCCAAHFPCAAHHAEAAHCOLAOD
GPCAAGGKDAAGHCFAAGGBEAAHCOLAODGPCAAGGKEAAGGFNAAGGFEAAHCOLAODGHNAAGGPCAAG
GBNAAGFPGAAGCOLAODGPAAAHGFOAAGFPPAAGGNOAACDLGOAGGDOAAGHENAAGCOLAODHACAAH
GJOAAGHEGAAGCOLAODGNFAAGGNDAAHGFEAAHCOLAODHDAAAHHCJAAGGOEAAHGGOAACDLDOAH
HECAAHGDNAAGHAOAACDLDOAHGJHAAGGOBAAGGNOAACDLPOAGHAFAAGGOOAACDLDOAHHECAAH
GDBAAGHEOAACDLDOAHHECAAHGDAAAHHJOAACDLEOAGGPAAAHHCOAAGHEOAACDLPOAFFPNAAG
GPHAAHGEJAAGGHAAAAFPPAAFGEPAAGHHCAAHGJEAAHAABAAGHCJAAGHEIAAGCOLAODGBPAAF
GDPAAGGNAAAASDEAAHHJAAAHGFOAACDLFOAGGDGAAHHEOAACDLPOAFGJEAAHGPBAAGAAPAAF
GDGAAHHEAAAAGGHAAHHCJAAGHEFAAGCOLAODGGNAAGHDCAAGHFGAAGCOLAODGDNAAGGPDAAH
GFOAACDLEOAGGBEAAHGBOAACDLJOAGHDBAAGHEEAAHHJOAACDLJOAGGPDAAGHENAAGCOLAOD
GNBAAGGHMAAGGPDAAGCOLAODFPBAAGGMMAAGGPDAAGGFOAAGAAPAAFGBNAAGGNPAAGGDAAAH
AAPAAFGBNAAGGMPAAGGDDAAHAAPAAFGBNAAGGNPAAGGDEAAHAAPAAFGBNAAGGMPAAGGDPAOD
GCCAAHGLOAACDLNOAGGFNAAGGDIAAGHCOAACDLNOAGGFNAAGGDAAAHHJOAACDLNOAGGPEAAG
GGOAACDLDOAHHECAAHGMFAAGGOOAACDLHOAHHCJAAGHEFAAGCOLAODGDFAAHGFIAAHGJEAAH
COLAODFPFAAGHIJAAGHEEAHKHEBAAGHCEAAHAAPAAFGNBAAGGJOAAGAAPAAFGFOAAGHGJAAG
HCPAAGGOAAAAFPAAAFFAJAAGGOJAAGFPJAAGAAPAAFHACAAHGJOAAGHEGAAGAAPAAFHDEAAH
HCDAAGGBEAAHAAPAAFFAAAAFHCDAAGHGPAAFGNAAAAFPAAAFFADAAHGOEAAGFPHAAGAAPAAF
FAAAAFHDPAOHFPJAAGAAPAAFHDEAAHHCDAAGHAJAAHAAPAAFHDEAAHHCNAAGGFOAAGAAPAAF
GDDAAHFPFAAHGOCAAHDJPPAFGDIAAGGHPAAFGOBAAGGNAAAAFPHAAGGMPAAGGCBAAGGMPAAF
AAPAAFGDMAAGFPDAAGGBOAAGGDAAAAFPDAAGGMPAAFHDFAAGGOEAAGAAPAAFGBNAAGGJPAAF
GOBAAGGNAAAAFPDAAGHDPAAFHCFAAGGHPAAFAAPAAFGGCAAHGFJAPDFPNAAGGFNAAGHDFAAG
HEAAAAFPFAAHHDFAAGHCPAAFHDEAAHAAPAAFGFFAAGHDPAAFGOBAAGGNAAAAFPDAAHGFNAAG
FPOAAGGBNAAGAAPAAFHDAAAHHCJAAGGOEAAHGGAAAAFPJAAGHCDAAHFPOAAGGBNAAGAAPAAF
GNFAAGGNDAAGHAJAAHAAPAAFHDEAAHHCDAAGGNAAAHAAPAAFGDDAAHFPBAAGGDEAAHGJAAAA
FPDAAGFPHAAHGPCAAHGFGAAHAAPAAFGDNAAGFPDAAGGILAAGGJAAAAFPPAAGGCKAAGFPEAAG
GFNAAGAAPAAFHDJAAGEHOAAGGBNAAGAAPAAFGDNAAGFPCAAHGFDAAGDJPPAFGNBAAGGMNAAG
GPDAAGAAPAAFGPCAAGGKPAAFGDCAAHDJPPAFFAAAAFGFCAAHHCPAAFHCAAAAFPFAAGHCCAAH
FPCAAHHAEAAHAAPAAFGJPAAGGDEAAHGNAAAAFPPAAFGJAAAHGDNAAGGGEAAGAAPAAFGJAAAH
GDPAAFGPAAAHDJPPAFGFCAAHHCOAAGDLPOAFGPAAAHGFOAAGFPGAAGGNAAAAFPGAAGGDOAAG
HENAAGAAPAAFGPAAAHGFOAAGAAPAAFGDNAAGGPDAAHDJPPAFGPAAAHGFOAAGFPPAAGGNAAAA
FPPAAFGPNAAGGHGAAGGEAAAAFPPAAFGEPAAGHACAAHGOEAAHAAPAAFFPJAAGGPJAEHENDAAH
GJHAAGHGFAAGGDAAAAFPGAAGGDGAAHHEAAAAFPNAAGGFNAAGGDIAAGHCAAAAFPGAAGHHCAAH
GJEAAHDJPPAFGFDAAGHGEAAHAAPAAFFPCAAGHFGAAGHDJAAHGOAAAAFPPAAFGCFAAHGGFAAG
GOEAAGAANAAGGNFAAHGMAAAAFPPAAFGDEAAHHJAAAHDJNPAGGEJAAGHGAAAAGBNAAGGEJAAG
HGAAAAFPPAAFHIGAAGGMDAAHGCFAAHAAHAAGHCFAAGGNEABCGMCAAHGFNAAGAABAAGHFNAAG
GNFAAHGMAAAASBFAAHGMEAAGGJGAAHAABAAGGMNAAGHFMAAGAABAAGHFMAAGHCFAAGGNEABC
GMNAAGHFMAAGCEMBAGGEJAAGHGAAAAGBMAAGHCFAAGGNAAAAFPNAAGGPEAAGGGAAAAFPPAAF
HHCAAHHEDAAGGILAAGAAPAAFHHCAAHGJEAAHDJPPAFFPDAAGGMFAAGGBOAAGHFAAAAFPPAAF
GGNAAGHDCAAGHFGAAGAAPAAFFPDAAHHEEAAGGCFAAHGGAAAAFPPAAFHDNAAGGCFAAHGGAAAA
FPGAAGGGMAAGHFDAAHGIAAAAFPPAAFGGJAAGGOEAAGGCFAAHAAPAAFFPMAAGGBDAAHHECAAG
HFAAAAFPJAAGHDBAAGHEEAAHHJAAAAFPGAAGGDMAAGGPDAAHDJPPAFFPDAAHGPCAAGHFGAAG
AAPAAFFPDAAHGJCAAGHFGAAGAAPAAFHCFAAGGBMAAGGMPAAGGDAAAAFPCAAGHCLAAGAAPAAF
HDCAAGHCLAAGAAPAAFGFOAAGGEAAAA

```
/*********************************************************************
 * @(#)snd.c    1.2  I/A Series  Foxboro Company  89/08/17
 *********************************************************************
 *                                                                   *
 *  Copyright by the Foxboro Company 1988                            *
 *                                                                   *
 *  All rights reserved Foxboro Company 1988                         *
 *                                                                   *
 **80*****************************************************************
 *                                                                   *
 *  FILE NAME            : snd.c                                     *
 *                                                                   *
 *  PART NUMBER          :                                           *
 *                                                                   *
 *  FUNCTION             : Send IPC messages                         *
 *                                                                   *
 *  FUNCTIONS CONTAINED  : main()                                    *
 *                                                                   *
 *  DATA STRUCTURES      :                                           *
 *                                                                   *
 *  COMPONENT HISTORY    :                                           *
 *  ---------------------------------------------------------------- *
 *  16 DEC 1988 - RD - Creation                                      *
 *                                                                   *
 *********************************************************************/

#include <pam_cos.h>

/*************************
 * File global definitions *
 *************************/

static  char    SCCS_id[] = "@(#)snd.c  1.2";

static  char    snd_name[IPC_NAME_LEN];
```

```
static  char    dst_name[IPC_NAME_LEN];
static  char    src_name[IPC_NAME_LEN];

static  char    msg[BUFFER_SIZE];


/******************
* Main entry point *
******************/

main( argc, argv )
int     argc;
char    *argv[];
{
        int     sz;
        int     rc;

        char    *pt;
        /*
         * Determine snd_name.
         */

        if ( argc == 2 )
        {
                strcpy( dst_name, argv[1]);
                strcpy( snd_name, "SND" );
        }
        else if ( argc == 3 )
        {
                strcpy( dst_name, argv[1]);
                strcpy( snd_name, argv[2] );
        }
        else
        {
                printf( "Usage: snd <dst_name> [<src_name>]\n" );
                exit( -1 );
        }


        /*
         * Initialize IPC.
         */

        rc = PPini_ipc( snd_name, TRUE, 1 );
        if ( rc != PAM_OK ) PPstp_ipc( rc );


        /*
         * Main loop.
         */

        do
        {
                /*
                 * Get and send message.
                 */

                memset( msg, NULL, sizeof( msg ) );
                printf( "Enter message:\n" );
                if ( ( pt = gets( msg ) ) != NULL )
                {
                        /*
                         * Send message.
                         */

                        rc = PPsnd_msg( msg, dst_name,
                                        strlen( msg ) + 1 );
                        if ( rc != PAM_OK ) PPstp_ipc( rc );


                        /*
                         * Wait for answer.
                         */
                        printf( "Waiting for answer ...\n" );

                        rc = PPrcv_msg( msg, src_name, &sz, 75 );
                        if ( rc != PAM_OK && rc != E_TIME_OUT ) PPstp_ipc( rc );

                        if ( rc != E_TIME_OUT )
                        {
                                printf( "%s: Message of size %d received from %s ...\n",
                                        snd_name, sz, src_name );
                                printf( "<%s>\n" );
                        }
                        else
                        {
```

```
                        printf( "%s: No message received\n", snd_name );
                  }
            }

      } while( pt != NULL );

      PPstp_ipc( 0 );

} /* End of main() */
/* @(#)pop3635.c        1.1     1.1 */

#include        <om_ecode.h>
#include        <om_udef.h>
#include        <pam_gen.h>
#include        <pam_err.h>

int err_cnt = 0;


main( argc, argv )

int argc;
char *argv[];

{
   int atoi();

   PPget_cfg();

   if( argc == 2 )
   {
      PPini_ipc( "pop7", 1, 10 );
      printf( "\n- - - PAM integration test - - -\n" );
      printf( "***** Total system integration for POP functions. *****\n" );
      docase( atoi( argv[1] ) );
      if( err_cnt )
         printf( "***** Completed with %d error(s). *****\n", err_cnt );
      else
         printf( "***** Completed successfully. *****\n" );

      PPstp_ipc( 0 );
   }
   else
   {
      printf( "\nUsage is: pop7 <case no> ( 0 == ALL )\n\n" );
   }
}

docase( no )

int no;

{
   int single = 1;
   int res;
   char res_status = '*';
   char res_usage = '*';
   char res_p[13],
        res_k[13];

   strcpy( res_p, "************" );
   strcpy( res_k, "************" );

   switch( no )
   {
      default:
         printf( "Illegal case specified !!\n" );
         break;

      case 0:
         single = 0;

      case 1:
         /* Precondition */

         /* Input */
         res = select_p( "test_rq", "env7.1", "", res_p, res_k );

         /* Expected result */
         tst_int( 1, res, PAM_OK, "select" );
         tst_str( 1, res_p, "p7.1", "select" );
         tst_str( 1, res_k, "PACAP20AA01", "select" );

         /* Postcondition */
         res = release_p( "test_rq", res_p, res_k );
         tst_int( 1, res, PAM_OK, "post release" );

         if( single ) break;
```

```
case 2:
   /* Precondition */
   eset_int( "svar7_2", -9999 );
   eset_flt( "svari7_2", (float) -9999 );

   /* Input */
   res = select_p( "test_rq", "env7", "path_type=tot_max", res_p, res_k );

   /* Expected result */
   tst_int( 2, res, PAM_OK, "select" );
   tst_str( 2, res_p, "p7.2", "select" );
   tst_str( 2, res_k, "PACAP20AA01", "select" );
   etst_int( 2, "svar7_2", 11, "select" );
   etst_flt( 2, "svari7_2", (float) 2200, "select" );

   /* Postcondition */
   res = release_p( "test_rq", res_p, res_k );
   tst_int( 2, res, PAM_OK, "post release" );

   if( single ) break;

case 3:
   /* Precondition */

   /* Input */
   res = select_p( "test_rq", "env7", "path_type=no_path", res_p, res_k );

   /* Expected result */
   tst_int( 3, res, P_NO_PATH_POSSIBLE, "select" );

   /* Postcondition */

   if( single ) break;

case 4:
   /* Precondition */

   /* Input */
   res = select_p( "test_rq", "env7", "path_type=pac_error",res_p,res_k );

   /* Expected result */
   tst_int( 4, res, P_FATAL_ERROR, "select" );

   /* Postcondition */

   if( single ) break;

case 5:
   /* Precondition */

   /* Input */
   res = select_p( "test_rq", "env7", "path_type=ini_error",res_p,res_k );

   /* Expected result */
   tst_int( 5, res, P_INIT_FAILED, "select" );
   res = release_p( "test_rq", res_p, res_k );
   tst_int( 5, res, PAM_OK, "expected release" );

   /* Postcondition */

   if( single ) break;

case 6:
   /* Precondition */

   /* Input */
   res = select_p( "test_rq","env7", "path_type=eq_secured",res_p,res_k );

   /* Expected result */
   tst_int( 6, res, P_NO_PATH_AVAILABLE, "select" );

   /* Postcondition */

   if( single ) break;

case 7:
   /* Precondition */

   /* Input */
   res = select_p( "test_rq", "env7", "path_type=ees_error",res_p,res_k );

   /* Expected result */
   tst_int( 7, res, P_NO_PATH_AVAILABLE, "select" );

   /* Postcondition */

   if( single ) break;
```

```
case 8:
   /* Precondition */
   res = select_p( "test_rq", "env7.1", "", res_p, res_k );
   tst_int( 8, res, PAM_OK, "pre select" );

   /* Input */
   res = release_p( "test_rq", "p7.1", "PACAP20AA01" );

   /* Expected result */
   tst_int( 8, res, PAM_OK, "release" );

   /* Postcondition */

   if( single ) break;

case 9:
   /* Precondition */
   res = select_p( "test_rq", "env7", "path_type=tot_max",res_p,res_k );
   tst_int( 9, res, PAM_OK, "pre select" );

   /* Input */
   res = release_p( "test_rq", "p7.2", "PACAP20AA01" );

   /* Expected result */
   tst_int( 9, res, PAM_OK, "release" );

   /* Postcondition */

   if( single ) break;

case 10:
   /* Precondition */

   /* Input */
   res = release_p( "test_rq", "p7.10", "PACAP20AA01" );

   /* Expected result */
   tst_int( 10, res, P_NOT_SELECTED, "release" );

   /* Postcondition */

   if( single ) break;

case 11:
   /* Precondition */
/*       res = select_p( "test_rq", "env7", "path_type=p7.11",res_p,res_k );*/
/*       tst_int( 11, res, PAM_OK, "pre select 1" );*/
/*       res = select_p( "test_rq", "env7", "path_type=p7.11",res_p,res_k );*/
/*       tst_int( 11, res, PAM_OK, "pre select 2" );*/
/*  Send FREE p7.11 message to PACAP20AA01 . */

   /* Input */
/*       res = release_p( "test_rq", "p7.11", "PACAP20AA01" );*/
/*       tst_int( 11, res, PAM_OK, "release" );*/
   /* Expected result */

   /* Postcondition */
/*       res = release_p( "test_rq", "p7.11b", "PACAP20AA01" );*/
/*       tst_int( 11, res, PAM_OK, "post release" );*/

   printf( "case 11: NOT yet supported\n" );

   if( single ) break;

case 12:
   /* Precondition */

   /* Input */
   res = gp_key( "TDS", "p7.12", res_k );

   /* Expected result */
   tst_int( 12, res, PAM_OK, "gp_key" );
   tst_str( 12, res_k, "OK_KEY", "gp_key" );

   /* Postcondition */

   if( single ) break;

case 13:
   /* Precondition */

   /* Input */
   res = gp_key( "TDS", "p7.13", res_k );

   /* Expected result */
   tst_int( 13, res, P_NOT_SELECTED, "gp_key" );
```

```
    /* Postcondition */

    if( single ) break;

  case 14:
    /* Precondition */
    eset_flt( "svarf7_2", (float) -9999 );
    res = select_p( "test_rq", "env7", "path_type=tot_max",res_p,res_k );
    tst_int( 14, res, PAM_OK, "pre select" );

    /* Input */
    res = fs_path( "test_rq", "p7.2", "PACAP20AA01" );

    /* Expected result */
    tst_int( 14, res, PAM_OK, "fs_path" );
    etst_flt( 14, "svarf7_2", (float) 2200, "fs_path" );

    /* Postcondition */
    res = release_p( "test_rq", res_p, res_k );
    tst_int( 14, res, PAM_OK, "post release" );

    if( single ) break;

  case 15:
    /* Precondition */
    res = select_p( "test_rq", "env7", "path_type=tot_max",res_p,res_k );
    tst_int( 15, res, PAM_OK, "pre select" );

    /* Input */
    res = fs_path( "test_xx", "p7.2", "PACAP20AA01" );

    /* Expected result */
    tst_int( 15, res, P_NOT_OWNER, "fs_path" );

    /* Postcondition */
    res = release_p( "test_rq", res_p, res_k );
    tst_int( 15, res, PAM_OK, "post release" );

    if( single ) break;

  case 16:
    /* Precondition */
    res = select_p( "test_rq", "env7", "path_type=tot_max",res_p,res_k );
    tst_int( 16, res, PAM_OK, "pre select" );

    /* Input */
    res = fs_path( "test_rq", "p7.2", "keyX" );

    /* Expected result */
    tst_int( 16, res, P_INV_PATH_KEY, "fs_path" );

    /* Postcondition */
    res = release_p( "test_rq", res_p, res_k );
    tst_int( 16, res, PAM_OK, "post release" );

    if( single ) break;

  case 17:
    /* Precondition */
    eset_flt( "svari7_2", (float) -9999 );
    res = select_p( "test_rq", "env7", "path_type=tot_max",res_p,res_k );
    tst_int( 17, res, PAM_OK, "pre select" );

    /* Input */
    res = iz_path( "test_rq", "p7.2", "PACAP20AA01" );

    /* Expected result */
    tst_int( 17, res, PAM_OK, "iz_path" );
    etst_flt( 17, "svari7_2", (float) 2200, "iz_path" );

    /* Postcondition */
    res = release_p( "test_rq", res_p, res_k );
    tst_int( 17, res, PAM_OK, "post release" );

    if( single ) break;

  case 18:
    /* Precondition */
    res = select_p( "test_rq", "env7", "path_type=tot_max",res_p,res_k );
    tst_int( 18, res, PAM_OK, "pre select" );

    /* Input */
    res = iz_path( "test_xx", "p7.2", "PACAP20AA01" );

    /* Expected result */
    tst_int( 18, res, P_NOT_OWNER, "iz_path" );
```

```
    /* Postcondition */
    res = release_p( "test_rq", res_p, res_k );
    tst_int( 18, res, PAN_OK, "post release" );

    if( single ) break;

case 19:
    /* Precondition */
    res = select_p( "test_rq", "env7", "path_type=tot_max",res_p,res_k );
    tst_int( 19, res, PAN_OK, "pre select" );

    /* Input */
    res = iz_path( "test_rq", "p7.2", "keyX" );

    /* Expected result */
    tst_int( 19, res, P_INV_PATH_KEY, "iz_path" );

    /* Postcondition */
    res = release_p( "test_rq", res_p, res_k );
    tst_int( 19, res, PAN_OK, "post release" );

    if( single ) break;

case 20:
    /* Precondition */
    eset_flt( "svarf7_2", (float) -9999 );
    res = select_p( "test_rq", "env7", "path_type=tot_max",res_p,res_k );
    tst_int( 20, res, PAN_OK, "pre select" );

    /* Input */
    res = path( "test_rq", "p7.2", "stop", "PACAP20AA01" );

    /* Expected result */
    tst_int( 20, res, PAN_OK, "path" );
    etst_flt( 20, "svarf7_2", (float) 2200, "path" );

    /* Postcondition */
    res = release_p( "test_rq", res_p, res_k );
    tst_int( 20, res, PAN_OK, "post release" );

    if( single ) break;

case 21:
    /* Precondition */
    res = select_p( "test_rq", "env7", "path_type=tot_max",res_p,res_k );
    tst_int( 21, res, PAN_OK, "pre select" );

    /* Input */
    res = path( "test_rq", "p7.2", "stopxx", "PACAP20AA01" );

    /* Expected result */
    tst_int( 21, res, P_INV_PATTERN, "path" );

    /* Postcondition */
    res = release_p( "test_rq", res_p, res_k );
    tst_int( 21, res, PAN_OK, "post release" );

    if( single ) break;

case 22:
    /* Precondition */
    res = select_p( "test_rq", "env7", "path_type=tot_max",res_p,res_k );
    tst_int( 22, res, PAN_OK, "pre select" );

    /* Input */
    res = path( "test_rq", "p7.2", "stop", "keyX" );

    /* Expected result */
    tst_int( 22, res, P_INV_PATH_KEY, "path" );

    /* Postcondition */
    res = release_p( "test_rq", res_p, res_k );
    tst_int( 22, res, PAN_OK, "post release" );

    if( single ) break;

case 23:
    /* Precondition */
    eset_lng( "elpar1", (long) -9999 );
    res = re_secured( "test_rq", "eq1" );
    tst_int( 23, res, PAN_OK, "pre re_secured" );

    /* Input */
    res = ce_parameter( "test_rq", "eq1", "elpar1", "-10" );

    /* Expected result */
    tst_int( 23, res, PAN_OK, "ce_parameter" );
    etst_lng( 23, "elpar1", (long) -10, "ce_parameter" );
```

```
/* Postcondition */
res = ue_use( "test_rq", "eq1" );
tst_int( 23, res, PAM_OK, "post ue_use" );

if( single ) break;

case 24:
/* Precondition */
res = re_secured( "test_rq", "eq1" );
tst_int( 24, res, PAM_OK, "pre re_secured" );

/* Input */
res = ce_parameter( "test_rq", "eq1", "elpar1", "-1.02" );

/* Expected result */
tst_int( 24, res, P_INV_PAR_VALUE, "ce_parameter" );

/* Postcondition */
res = ue_use( "test_rq", "eq1" );
tst_int( 24, res, PAM_OK, "post ue_use" );

if( single ) break;

case 25:
/* Precondition */
res = re_secured( "test_rq", "eq1" );
tst_int( 25, res, PAM_OK, "pre re_secured" );

/* Input */
res = cu_locked( "test_rq", "eq1" );

/* Expected result */
tst_int( 25, res, PAM_OK, "cu_locked" );
res = ge_usage( "eq1", &res_usage );
tst_int( 25, res, PAM_OK, "expected ge_usage" );
tst_chr( 25, res_usage, 'L', "expected ge_usage" );

/* Postcondition */
res = ue_use( "test_rq", "eq1" );
tst_int( 25, res, PAM_OK, "post ue_use" );

if( single ) break;

case 26:
/* Precondition */
res = re_secured( "test_rq", "eq1" );
tst_int( 26, res, PAM_OK, "pre re_secured" );

/* Input */
res = cu_locked( "test_xx", "eq1" );

/* Expected result */
tst_int( 26, res, P_NOT_OWNER, "cu_locked" );

/* Postcondition */
res = ue_use( "test_rq", "eq1" );
tst_int( 26, res, PAM_OK, "post ue_use" );

if( single ) break;

case 27:
/* Precondition */

/* Input */
res = ge_status( "eq1", &res_status );

/* Expected result */
tst_int( 27, res, PAM_OK, "ge_status" );
tst_chr( 27, res_status, 'U', "ge_status" );

/* Postcondition */
if( single ) break;

case 28:
/* Precondition */

/* Input */
res = ge_status( "eqx", &res_status );

/* Expected result */
tst_int( 28, res, P_INV_EQ_NAME, "ge_status" );

/* Postcondition */

if( single ) break;
```

```
case 29:
   /* Precondition */

   /* Input */
   res = ge_usage( "eq1", &res_usage );

   /* Expected result */
   tst_int( 29, res, PAM_OK, "ge_usage" );
   tst_chr( 29, res_usage, 'N', "ge_usage" );

   /* Postcondition */

   if( single ) break;

case 30:
   /* Precondition */

   /* Input */
   res = ge_usage( "eqx", &res_usage );

   /* Expected result */
   tst_int( 30, res, P_INV_EQ_NAME, "ge_usage" );

   /* Postcondition */

   if( single ) break;

case 31:
   /* Precondition */

   /* Input */
   res = re_locked( "test_rq", "eq1" );

   /* Expected result */
   tst_int( 31, res, PAM_OK, "re_locked" );
   res = ge_usage( "eq1", &res_usage );
   tst_int( 31, res, PAM_OK, "expected ge_usage" );
   tst_chr( 31, res_usage, 'L', "expected ge_usage" );

   /* Postcondition */
   res = ue_use( "test_rq", "eq1" );
   tst_int( 31, res, PAM_OK, "post ue_use" );

   if( single ) break;

case 32:
   /* Precondition */
   res = re_locked( "test_rq1", "eq1" );
   tst_int( 32, res, PAM_OK, "pre re_locked 1" );
   res = re_locked( "test_rq2", "eq1" );
   tst_int( 32, res, PAM_OK, "pre re_locked 2" );
   res = re_locked( "test_rq3", "eq1" );
   tst_int( 32, res, PAM_OK, "pre re_locked 3" );
   res = re_locked( "test_rq4", "eq1" );
   tst_int( 32, res, PAM_OK, "pre re_locked 4" );
   res = re_locked( "test_rq5", "eq1" );
   tst_int( 32, res, PAM_OK, "pre re_locked 5" );

   /* Input */
   res = re_locked( "test_rq", "eq1" );

   /* Expected result */
   tst_int( 32, res, P_TOO_MANY_OWNERS, "re_locked" );

   /* Postcondition */
   res = ue_use( "test_rq1", "eq1" );
   tst_int( 32, res, PAM_OK, "post ue_use 1" );
   res = ue_use( "test_rq2", "eq1" );
   tst_int( 32, res, PAM_OK, "post ue_use 2" );
   res = ue_use( "test_rq3", "eq1" );
   tst_int( 32, res, PAM_OK, "post ue_use 3" );
   res = ue_use( "test_rq4", "eq1" );
   tst_int( 32, res, PAM_OK, "post ue_use 4" );
   res = ue_use( "test_rq5", "eq1" );
   tst_int( 32, res, PAM_OK, "post ue_use 5" );

   if( single ) break;

case 33:
   /* Precondition */

   /* Input */
   res = re_secured( "test_rq", "eq1" );

   /* Expected result */
   tst_int( 33, res, PAM_OK, "re_secured" );
   res = ge_usage( "eq1", &res_usage );
```

```
            tst_int( 33, res, PAM_OK, "expected ge_usage" );
            tst_chr( 33, res_usage, 'S', "expected ge_usage" );

            /* Postcondition */
            res = ue_use( "test_rq", "eql" );
            tst_int( 33, res, PAM_OK, "post ue_use" );

            if( single ) break;

        case 34:
            /* Precondition */
            res = re_secured( "test_rq", "eql" );
            tst_int( 34, res, PAM_OK, "pre re_secured" );

            /* Input */
            res = re_secured( "test_rq", "eql" );

            /* Expected result */
            tst_int( 34, res, P_ALR_SECURED, "re_secured" );

            /* Postcondition */
            res = ue_use( "test_rq", "eql" );
            tst_int( 34, res, PAM_OK, "post ue_use" );

            if( single ) break;

        case 35:
            /* Precondition */
            res = re_secured( "test_rq", "eql" );
            tst_int( 35, res, PAM_OK, "pre re_secured" );

            /* Input */
            res = ue_use( "test_rq", "eql" );

            /* Expected result */
            tst_int( 35, res, PAM_OK, "ue_use" );

            /* Postcondition */

            if( single ) break;

        case 36:
            /* Precondition */
            res = re_secured( "test_rq", "eql" );
            tst_int( 36, res, PAM_OK, "pre re_secured" );

            /* Input */
            res = ue_use( "test_xx", "eql" );

            /* Expected result */
            tst_int( 36, res, P_NOT_OWNER, "ue_use" );

            /* Postcondition */
            res = ue_use( "test_rq", "eql" );
            tst_int( 36, res, PAM_OK, "post ue_use" );

            if( single ) break;

    }
}

int tst_str( no, res, exp, text )

int no;
char *res, *exp, *text;
{
    if( strcmp( res, exp ) != 0 )
    {
        err_cnt += 1;
        printf( "case %3d:\n   res: %s\n   exp: %s\n  info: %s\n",
                no, res, exp, text );
    }
}

int tst_int( no, res, exp, text )

int no, res, exp;
char *text;

{
    if( res != exp )
    {
        err_cnt += 1;
        printf( "case %3d:\n   res: %d\n   exp: %d\n  info: %s\n",
                no, res, exp, text );
```

```c
   }
}

int tst_chr( no, res, exp, text )

int no;
char res, exp;
char *text;

{
   if( res != exp )
   {
      err_cnt += 1;
      printf( "case %3d:\n   res: %c\n   exp: %c\n  info: %s\n",
               no, res, exp, text );
   }
}

int etst_str( no, var, exp, text )

int no;
char *var, *exp, *text;

{
   char res[255];
   unsigned int status = 0;
   int data_len = 255;

   if( getval( var, VARIABLE, 0, res, &status, &data_len ) != OM_SUCCESS ||
       (status & 0x1F) != STRING )
   {
      strcpy( res, "******" );
   }
   if( strcmp( res, exp ) != 0 )
   {
      err_cnt += 1;
      printf( "case %3d:\n   res: %s\n   exp: %s\n  info: %s\n",
               no, res, exp, text );
   }
}

int etst_int( no, var, exp, text )

int no;
char *var, *text;
int exp;

{
   int res;
   unsigned int status = 0;
   int data_len = sizeof( int );

   if( getval( var, VARIABLE, 0, &res, &status, &data_len ) != OM_SUCCESS ||
       (status & 0x1F) != INTEGER )
   {
      res = -9999;
   }

   if( res != exp )
   {
      err_cnt += 1;
      printf( "case %3d:\n   res: %d\n   exp: %d\n  info: %s\n",
               no, res, exp, text );
   }
}

int etst_lng( no, var, exp, text )

int no;
char *var, *text;
long int exp;

{
   long int res;
   unsigned int status = 0;
   int data_len = sizeof( long int );

   if( getval( var, VARIABLE, 0, &res, &status, &data_len ) != OM_SUCCESS ||
       (status & 0x1F) != OM_LNG_INT )
   {
      res = -9999;
   }
```

```
    if( res != exp )
    {
       err_cnt += 1;
       printf( "case %3d:\n   res: %ld\n   exp: %ld\n  info: %s\n",
               no, res, exp, text );
    }
}

int etst_flt( no, var, exp, text )

int no;
char *var, *text;
float exp;

{
int rt;
   float res;
   unsigned int status = 0;
   int data_len = sizeof( float );

   if( getval( var, VARIABLE, 0, &res, &status, &data_len ) != OM_SUCCESS ||
       (status & 0x1F) != FLOAT )
   {
      res = -9999;
   }

   if( res + 0.01 < exp || res - 0.01 > exp )
   {
      err_cnt += 1;
      printf( "case %3d:\n   res: %f\n   exp: %f\n  info: %s\n",
              no, res, exp, text );
   }
}

int eset_str( var, val )

char *var, *val;

{
   int ret;
   unsigned int status = STRING;

   ret = setval( var, VARIABLE, 0, val, &status, strlen(val)+1 );
   if( ret != OM_SUCCESS )
   {
      printf( "eset_str error: %d\n, ret" );
   }
}

int eset_int( var, val )

char *var;
int val;

{
   int ret;
   unsigned int status = INTEGER;

   ret = setval( var, VARIABLE, 0, &val, &status, sizeof(int) );
   if( ret != OM_SUCCESS )
   {
      printf( "eset_int error: %d\n", ret );
   }
}

int eset_lng( var, val )

char *var;
long int val;

{
   int ret;
   unsigned int status = OM_LNG_INT;

   ret = setval( var, VARIABLE, 0, &val, &status, sizeof(long) );
   if( ret != OM_SUCCESS )
   {
      printf( "eset_lng error: %d\n", ret );
   }
}

int eset_flt( var, val )

char *var;
float val;
```

```
{
   int ret;
   unsigned int status = FLOAT;

   ret = setval( var, VARIABLE, 0, &val, &status, sizeof(float) );
   if( ret != OM_SUCCESS )
   {
      printf( "eset_flt error: %d\n", ret );
   }
}
```

```
:
# @(#)preptst   1.1 89/09/14
# Function : Prepare PAM testing
# History  : 17 AUG 1989 - RD - Creation
#
if [ ! -d /usr/pam/test ]
then
        echo "No directory /usr/pam/test, exit!"
        exit
fi
#
echo "*** Prepare PAM testing ***"
cd /usr/pam/test
#
echo "Installing HLBL sources in sequence library ..."
if [ ! -d /usr/fox/ciocfg/sequenlibrary ]
then
        echo "No sequence library on this system!"
else
        echo "Do you want to preprocess the HLBL sources? (Y/N) \c"
        read a
        if [ $a = y -o $a = Y ]
        then
                for i in *.s
                do
                        rm -f /usr/fox/ciocfg/sequenlibrary/$i
                        hpp $i /usr/fox/ciocfg/sequenlibrary/$i
                done
        else
                for i in *.s
                do
                        rm -f /usr/fox/ciocfg/sequenlibrary/$i
                        cp $i /usr/fox/ciocfg/sequenlibrary/$i
                done
        fi
fi
#
echo "Compiling ..."
cc -o dbg dbg.c -I. -lpam -lcom -lfox
cc -o lib lib.c -I. -lpam -lcom -lfox
#
echo "Saving configuration file ..."
cp /usr/pam/config/cfg.dat /usr/pam/config/CFG.DAT
#
echo "*** Done ***"
```

```
#*************************************************************************
#  @(#)pam_gen.mk        1.3  I/A Series  Foxboro Company  6/17/89
#*************************************************************************
#                                                                       *
#  Copyright by the Foxboro Company 1988                                *
#                                                                       *
#  All rights reserved Foxboro Company 1988                             *
#                                                                       *
#*&0**********************************************************************
#                                                                       *
#  FILE NAME           : pam_gen.mk                                     *
#                                                                       *
#  PART NUMBER         :                                                *
#                                                                       *
#  FUNCTION            : Makefile for PAM Generic function library.     *
#                                                                       *
#  COMPONENT HISTORY   :                                                *
#  ------------------------------------------------------------------   *
#  31 OCT 1988 - GM - Creation                                          *
#                                                                       *
#*************************************************************************

PREFIX  =       /usr/pam

HDRDIR  =       $(PREFIX)/header

BINDIR  =       $(PREFIX)/bin
```

```
LIBDIR  =       $(PREFIX)/lib

OBJDIR  =       $(PREFIX)/pam_gen/obj

SRCDIR  =       $(PREFIX)/pam_gen/source

LIBPAM  =       $(LIBDIR)/libpam.a

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h

OBJECTS =       $(OBJDIR)/bool_chk.o\
                $(OBJDIR)/flt_chk.o\
                $(OBJDIR)/int_chk.o\
                $(OBJDIR)/int_ptr_ar.o\
                $(OBJDIR)/itoa.o\
                $(OBJDIR)/lng_chk.o\
                $(OBJDIR)/ltoa.o\
                $(OBJDIR)/rls.o\
                $(OBJDIR)/rts.o

TARGET  =       $(LIBDIR)/pam_gen.a

CFLAGS  =       -I$(HDRDIR) -c

$(TARGET):      $(OBJECTS)
                ar rv $@ $?
                ranlib $@

$(OBJDIR)/bool_chk.o:   $(SRCDIR)/bool_chk.c $(HEADERS)
                cc $(CFLAGS) $(SRCDIR)/bool_chk.c
                mv bool_chk.o $(OBJDIR)

$(OBJDIR)/flt_chk.o:    $(SRCDIR)/flt_chk.c $(HEADERS)
                cc $(CFLAGS) $(SRCDIR)/flt_chk.c
                mv flt_chk.o $(OBJDIR)

$(OBJDIR)/int_chk.o:    $(SRCDIR)/int_chk.c $(HEADERS)
                cc $(CFLAGS) $(SRCDIR)/int_chk.c
                mv int_chk.o $(OBJDIR)

$(OBJDIR)/int_ptr_ar.o: $(SRCDIR)/int_ptr_ar.c $(HEADERS)
                cc $(CFLAGS) $(SRCDIR)/int_ptr_ar.c
                mv int_ptr_ar.o $(OBJDIR)

$(OBJDIR)/itoa.o:       $(SRCDIR)/itoa.c $(HEADERS)
                cc $(CFLAGS) $(SRCDIR)/itoa.c
                mv itoa.o $(OBJDIR)

$(OBJDIR)/lng_chk.o:    $(SRCDIR)/lng_chk.c $(HEADERS)
                cc $(CFLAGS) $(SRCDIR)/lng_chk.c
                mv lng_chk.o $(OBJDIR)

$(OBJDIR)/ltoa.o:       $(SRCDIR)/ltoa.c $(HEADERS)
                cc $(CFLAGS) $(SRCDIR)/ltoa.c
                mv ltoa.o $(OBJDIR)

$(OBJDIR)/rls.o:        $(SRCDIR)/rls.c $(HEADERS)
                cc $(CFLAGS) $(SRCDIR)/rls.c
                mv rls.o $(OBJDIR)

$(OBJDIR)/rts.o:        $(SRCDIR)/rts.c $(HEADERS)
                cc $(CFLAGS) $(SRCDIR)/rts.c
                mv rts.o $(OBJDIR)

/*******************************************************************
*  @(#)bool_chk.c        1.2  8/17/89
********************************************************************
*
*  (C) Copyright by Foxboro Company 1988
*
*  All rights reserved: Foxboro Company 1988
*
********************************************************************
*
* NAME              : PPbool_check
*
* FUNCTION          : Check that the supplied value is a boolean and
*                     convert it to '1' for TRUE and '0' for FALSE
*                     if it is. Also return integer value.
*
* INPUT PARAMETERS  : char *c_pointer;
*
```

```
 * OUTPUT PARAMETERS : char *c_pointer;
 *                     int *intval;      { integer value representing
 *                                         boolean input condition }
 *
 * RETURN CODES      : PAM_OK
 *                     !PAM_OK
 *
 * SYNOPSIS          : int PPbool_check( c_pointer, intval )
 *
 * PRECONDITIONS     :
 *
 * COMPONENT HISTORY :
 *       22 SEP 88, GM, Created
 *
 ************************************************************* */

#include <stdio.h>
#include <ctype.h>
#include <pam_err.h>

int PPbool_check( c_pointer, intval )
char *c_pointer;
int *intval;
{
char test;

   if ( isalpha( c_pointer[0] ) )
      test = toupper( c_pointer[0] );
   else
      test = c_pointer[0];

   switch( test )
   {
      case 'T':
      case 'Y':
      case '1': test = '1';
                break;
      case 'F':
      case 'N':
      case '0': test = '0';
                break;
      default:  return !PAM_OK;
   }

   c_pointer[0] = test;
   c_pointer[1] = '\0';
   *intval = atoi( c_pointer );

   return PAM_OK;
}

/* ************************************************************
 *  @(#)flt_chk.c        1.2  8/17/89
 **************************************************************
 *
 *  (C) Copyright by Foxboro Company 1988
 *
 *  All rights reserved: Foxboro Company 1988
 *
 **************************************************************
 *
 * NAME              : PPfloat_check
 *
 * FUNCTION          : Checks that supplied string is a float and
 *                     reformat. Also return float value.
 *
 * INPUT PARAMETERS  : char *ip_str;
 *
 * OUTPUT PARAMETERS : char *ip_str;  { reformatted input string }
 *                     float *result; { float value of input string }
 *
 * RETURN CODES      : PAM_OK
 *                     !PAM_OK
 *
 * SYNOPSIS          : int PPfloat_check( ip_str, result )
 *
 * PRECONDITIONS     :
 *
 * COMPONENT HISTORY :
 *       22 SEP 88, GM, Created
 *
 ************************************************************* */

#include <ctype.h>
#include <fox/nsstd.h>
#include <pam_err.h>
```

```
PPfloat_check(ip_str, result)
char *ip_str;
float *result;
{
int exp_adjust;
char sign[2];
char mantissa[9];
char exponent[5];
char *rem_str = ip_str;

void make_sign();
double atof();

        rls(rem_str);
        rts(rem_str);

        make_sign(&rem_str, sign);

        if( make_mant(&rem_str, mantissa, &exp_adjust) != PAM_OK )
                return (!PAM_OK);

        if( make_exp(rem_str, exp_adjust, mantissa, exponent) != PAM_OK )
                return (!PAM_OK);

        /* force the sign to be a null string if the value is zero      */

        if ( mantissa[0] == '0' )
        {
                sign[0] = '\0';
        }

        strcpy(ip_str, sign);
        strcat(ip_str, mantissa);
        strcat(ip_str, exponent);

        *result = atof(ip_str);

        return(PAM_OK);
}

/*****************************************************************
*                                                                *
*       Following functions are local to this module             *
*                                                                *
*****************************************************************/


/*****************************************************************
*                                                                *
*       make_sign()                                              *
*                                                                *
*       Takes the address off a pointer to the input string, and *
*       sets up the sign string.  The sign string is a null string *
*       for positive numbers, and "-" for negative numbers.      *
*       Also increments the input pointer to indicate the characters of *
*       the input string which have yet to be checked            *
*                                                                *
*****************************************************************/

static void make_sign(ip_str, sign)
char **ip_str;
char *sign;
{
        switch ( **ip_str )
        {
        case '-':
                *(sign++) = '-';
        case '+':
                (*ip_str)++;
        }

        *sign = '\0';
}

/*****************************************************************
*                                                                *
*       make_mant()                                              *
*                                                                *
*       Assembles the mantissa in the output buffer provided,    *
*       modifies the pointer to the input string to point to the *
*       next character to be checked, and sets up an integer to be *
*       used to modify the exponent to correct for the movement of the *
*       decimal point in the mantissa                            *
*                                                                *
*****************************************************************/
```

```
static make_mant(ip_str, mantissa, exp_adj)
char **ip_str;
char *mantissa;
int *exp_adj;
{

char *dp;
char *msd;
char *end;

void find_end();
void put_digits();

        find_end(*ip_str, &end);

        if(find_dp(*ip_str, end, &dp) != PAN_OK)
        {
                return(!PAN_OK);
        }

        if(find_msd(*ip_str, end, &msd) != PAN_OK)
        {
                return(!PAN_OK);
        }

        put_digits( msd, end, mantissa);

        /* calculate the value which must be added to the exponent to   */
        /* adjust for the movement of the decimal point in the mantissa */

        *exp_adj = dp - msd;
        if( *exp_adj > 0 )
        {
                (*exp_adj)--;
        }

        *ip_str = end;  /* point to remainder of string for further checks */

        return(PAN_OK);
}

/*****************************************************************
*                                                               *
*       find_end()                                              *
*                                                               *
*       Finds the character following the last mantissa character in *
*       the input string.                                       *
*       This could be the end of the string, or the start of the area *
*       where the exponent is expected.                         *
*                                                               *
*****************************************************************/

static void find_end(str, end_ptr)
char *str;
char **end_ptr;
{
        while(isdigit(*str) || *str == '.')
        {
                str++;
        }

        *end_ptr = str;
}

/*****************************************************************
*                                                               *
*       find_dp()                                               *
*                                                               *
*       Sets up a pointer to the decimal point in the mantissa. *
*       Sets up the pointer to the decimal point.  If there is no *
*       decimal point this will be the same as the end of the   *
*       mantissa  (ie  it will indicate where a point is assumed to be) *
*       !PAN_OK is returned if there is more than one decimal point. *
*                                                               *
*****************************************************************/

static find_dp(str, end, dp)
char *str;
char *end;
char **dp;
{
        while( *str != '.' && str != end )
        {
```

```
		str++;
	}

	*dp = str;

	while( str++ != end )
	{
		if(*str == '.')
		{
			return(!PAM_OK);
		}
	}
	return(PAM_OK);
}

/*****************************************************************
*                                                                *
*	find_msd()                                               *
*                                                                *
*	Sets up a pointer to the most significant digit in the   *
*	mantissa.  This may be the same as the end pointer if the value *
*	of the mantissa is zero.                                 *
*	If there is not at least one digit in the mantissa, !PAM_OK is *
*	returned.                                                *
*                                                                *
*****************************************************************/

static find_msd(str, end, msd)
char *str;
char *end;
char **msd;
{
int got_digit = FALSE;

	while(*str == '0' || *str == '.')
	{
		if( *str == '0' )
		{
			got_digit = TRUE;
		}
		str++;
	}

	if( got_digit == FALSE && str == end)
	{
		return(!PAM_OK);
	}

	*msd = str;

	return(PAM_OK);

}

/*****************************************************************
*                                                                *
*	put_digits()                                             *
*                                                                *
*	Assembles the mantissa digits in the buffer provided.  The *
*	point is placed in the correct position, and the string of *
*	digits is truncated or padded with zeros as necessary.   *
*                                                                *
*****************************************************************/

static void put_digits( next_dig, end, mant)
char *next_dig;
char *end;
char *mant;
{
int i;

	mant[1] = '.';

	for ( i=0 ; i < 8 && next_dig != end ; )
	{
		if ( i == 1 )		/* skip over decimal point */
		{
			i++;
			continue;
		}

		if ( *next_dig != '.')
		{
```

```
                        mant[i++] = *next_dig;
                }
                next_dig++;
        }

        /* add trailing zeros and terminating NULL */

        for ( ; i < 8 ; i++ )
        {
                if ( i == 1 )
                {
                        continue;
                }
                mant[i] = '0';
        }
        mant[8] = '\0';
}


/*****************************************************************
*                                                               *
*       make_exp()                                              *
*                                                               *
*       Assembles the exponent part in the buffer provided, adjusting *
*       for movement of the decimal point in the mantissa.      *
*                                                               *
*****************************************************************/

make_exp(str, exp_adj, mantissa, exponent)
char *str;
int exp_adj;
char *mantissa;
char *exponent;
{
int exp_val;
        switch(*str)
        {
        case '\0':
                exp_val = 0;
                break;
        case 'e':
        case 'E':
                if( PPint_check( ++str, &exp_val) != PAM_OK )
                {
                        return(!PAM_OK);
                }
                break;
        }

        /* calculate true value of exponent, and check it's within the  */
        /* valid range for a float                                      */


        if ( *mantissa != '0' )
        {
                exp_val += exp_adj;
                if ( Abs(exp_val) > 36 )
                {
                        return(!PAM_OK);
                }
        }
        else
        {
                /* the exponent must be zero if the mantissa is zero    */

                exp_val = 0;
        }

        /* compose the exponent string  */

        *(exponent++) = 'e';

        exponent[3] = '\0';

        itoa( exp_val, exponent );

        if ( exp_val >= 0 )
        {
                exponent[2] = exponent[1];
                exponent[1] = exponent[0];
                exponent[0] = '+';
        }
        if ( Abs(exp_val) < 10 )
        {
                exponent[2] = exponent[1];
                exponent[1] = '0';
```

```
        }
        return(PAM_OK);
}

/* ****************************************************************
 * @(#)int_chk.c        1.2  8/17/89
*******************************************************************
 *
 * (C) Copyright by Foxboro Company 1988
 *
 * All rights reserved: Foxboro Company 1988
 *
*******************************************************************
 *
 * NAME              : PPint_check
 *
 * FUNCTION          : Checks that the supplied value is an integer with
 *                     no spurious trailing characters. All white space
 *                     is removed.
 *
 * INPUT PARAMETERS  : char *value;
 *
 * OUTPUT PARAMETERS : char *value;  { white space removed }
 *                     int *result;  { integer value }
 *
 * RETURN CODES      : PAM_OK
 *                     !PAM_OK
 *
 * SYNOPSIS          : int PPint_check( value, result )
 *
 * PRECONDITIONS     :
 *
 * COMPONENT HISTORY :
 *       22 SEP 88, GM, Created
 *
****************************************************************** */

#include <stdio.h>
#include <string.h>
#include <pam_err.h>
#include <pam_gen.h>

extern char *rts();
extern char *rls();
extern char *itoa();

int PPint_check(value,result)
char *value;
int *result;
{
char val[PAM_INT_LEN+2];     /* max len +32676 plus null = 7 characters */
char *fd = value;            /* first digit  pointer    */
char *fsd = value;           /* first sig digit pointer */

    rts(value);
    rls(value);

    if ((value[0] == '+') || (value[0] == '-'))
        fsd = ++fd;
    if ( strlen(fsd) > PAM_INT_LEN )    /* too large to be an int */
       return !PAM_OK;

    while (*fsd == '0')
        fsd++;

    if ((*fsd == NULL) && (fsd != fd))
    {
        /* the string is an optional sign followed by one or more zeros */

        strcpy(value, "0");
        *result = 0;
        return PAM_OK;
    }
    else
    {
        /* remove any leading zeros */
        if(fsd != fd)
            strcpy(fd, fsd);
    }

    *result = (int)atoi(value);
    itoa(*result,val);
```

```
    if (value[0] == '+')  /* + sign removed by atoi */
    {
        if (strcmp(&value[1].val))
            return(!PAM_OK);
    }
    else
        if (strcmp(value.val))
            return(!PAM_OK);

    strcpy(value.val);            /* always store + no's without sign */
    return (PAM_OK);
}

/* ***************************************************************
 * @(#)int_ptr_ar.c     1.2  8/17/89
 *****************************************************************
 *                                                               *
 *  (C) Copyright by Foxboro Company 1988                        *
 *                                                               *
 *  All rights reserved: Foxboro Company 1988                    *
 *                                                               *
 *****************************************************************
 *                                                               *
 * NAME              : init_ptr_arr                              *
 *                                                               *
 * FUNCTION          : Split a string into tokens and return an array *
 *                     of pointers to these tokens. Use '@' as the *
 *                     seperator character.                       *
 *                                                               *
 * INPUT PARAMETERS  : char var[]  {input-string containing tokens} *
 *                                                               *
 * OUTPUT PARAMETERS : char *p_arr[]  {pointer to array of pointers to *
 *                                    token-strings}             *
 *                                                               *
 * RETURN CODES      : PAM_OK                                    *
 *                                                               *
 * SYNOPSIS          : int init_ptr_arr(var,p_arr)               *
 *                                                               *
 * PRECONDITIONS     :                                           *
 *                                                               *
 * ERRORS/EXCEPTIONS : 1. input string filled incorrectly        *
 *                     ACTION: assign (char *) NULL to the first *
 *                        element of the output array            *
 *                                                               *
 * COMPONENT HISTORY :                                           *
 *       31 Oct 88, GM, Copied from bp_gen library.              *
 *                                                               *
 *************************************************************** */

#include <stdio.h>
#include <string.h>
#include <pam_err.h>

int init_ptr_arr(var,p_arr)
char var[],
     *p_arr[];
{
   int i;
   char *strtok();

   if ((char *)NULL == (p_arr[0] = strtok(var,"@")))
      return PAM_OK;

   for (i = 1;;i++)

      if ((char *)NULL == (p_arr[i] = strtok((char *)NULL,"@")))
         return PAM_OK;
}

/* ***************************************************************
 * @(#)itoa.c   1.2  8/17/89
 *****************************************************************
 *
 *  (C) Copyright by Foxboro Company 1987
 *
 *  All rights reserved: Foxboro Company 1987
 *
 *****************************************************************
 *
 *  NAME                  : itoa
 *
 *  FUNCTION              : Convert an integer into a string.
 *
 *  INPUT PARAMETERS      : value - integer value
 *
```

```
 *  OUTPUT PARAMETERS     : string - result string
 *
 *  RETURN CODE           : result string
 *
 *  SYNOPSIS              : char *itoa( value, string )
 *                            int value;
 *                            char string[];
 *
 *  COMPONENT HISTORY   :
 *       31 Oct 88, GM, Copied from bp_gen library.
 *
 ***********************************************************************/
char *itoa( value, string )

int  value;
char string[];

{
    char *s = string;
    char *letter = "0123456789";
    long power, val;

    val = value;

    if (val < 0)
    {
       *s++ = '-';   val *= -1;
    }

    power = 1;

    while( power * 10 <= val )
        power *= 10;

    do
    {
        *s++ = letter[val / power];
        val %= power;
    }
    while( power /= 10 );
    *s = '\0';

    return string;
}


/* *****************************************************************
 *  @(#)lng_chk.c        1.2  8/17/89
 *******************************************************************
 *
 *  (C) Copyright by Foxboro Company 1988
 *
 *  All rights reserved: Foxboro Company 1988
 *
 *******************************************************************
 *
 * NAME               : PPlng_check
 *
 * FUNCTION           : Checks that the supplied value is a long with
 *                      no spurious trailing characters. All white space
 *                      is removed.
 *
 * INPUT PARAMETERS   : char *value;
 *
 * OUTPUT PARAMETERS  : char *value;  { white space removed }
 *                      long *result; { long value }
 *
 * RETURN CODES       : PAM_OK
 *                      !PAM_OK
 *
 * SYNOPSIS           : int PPlong_check( value, result )
 *
 * PRECONDITIONS      :
 *
 * COMPONENT HISTORY :
 *       22 SEP 88, GM, Created
 *
 ***************************************************************** */

#include <stdio.h>
#include <string.h>
#include <pam_gen.h>
#include <pam_err.h>

extern char *rts();
extern char *rls();
```

```
extern char *ltoa();
extern long atol();

int PPlong_check(value,result)
char *value;
long *result;
{
char val[PAM_LONG_LEN+2];  /* max len +2147483648 plus null = 11 characters */
char *fd = value;           /* first digit  pointer    */
char *fsd = value;          /* first sig digit pointer */

    rts(value);
    rls(value);

    if ((value[0] == '+') || (value[0] == '-'))
        fsd = ++fd;
    if ( strlen(fsd) > PAM_LONG_LEN )   /* too large to be a long */
       return !PAM_OK;

    while (*fsd == '0')
        fsd++;

    if ((*fsd == NULL) && (fsd != fd))
    {
        /* the string is an optional sign followed by one or more zeros */

        strcpy(value, "0");
        *result = 0;
        return PAM_OK;
    }
    else
    {
        /* remove any leading zeros */
        if(fsd != fd)
            strcpy(fd, fsd);
    }

    *result = (long)atol(value);
    ltoa(*result,val);

    if (value[0] == '+')  /* + sign removed by atoi */
    {
        if (strcmp(&value[1],val))
            return(!PAM_OK);
    }
    else
        if (strcmp(value,val))
            return(!PAM_OK);

    strcpy(value,val);          /* always store + no's without sign */
    return (PAM_OK);
}

/* ****************************************************************
 * @(#)ltoa.c   1.2  8/17/89
*******************************************************************
 *
 * (C) Copyright by Foxboro Company 1988
 *
 * All rights reserved: Foxboro Company 1988
 *
*******************************************************************
 *
 * NAME                  : ltoa
 *
 * FUNCTION              : Convert a long integer into a string.
 *
 * INPUT PARAMETERS      : value - long integer value
 *
 * OUTPUT PARAMETERS     : string - result string
 *
 * RETURN CODE           : result string
 *
 * SYNOPSIS              : char *ltoa( value, string )
 *                         long value;
 *                         char string[];
 *
 * COMPONENT HISTORY   :
 *      31 Oct 88, GM, Copied from bp_gen library.
 *
*******************************************************************/

char *ltoa( value, string )

long value;
char string[];
```

```
{
    char *s = string;
    char *letter = "0123456789";
    long power, val;

    val = value;


        power = 1;

        if ( val >= 0 )
                val*= -1;
        else
                *s++='-';


        while ( val/power <= -10)
            power *=10;

        do
        {
           *s++ = letter[((val/power)*-1)];
           val %= power;
        }
        while ( power /= 10 );

        *s = '\0';

        return string;

}

/* ****************************************************************
 * @(#)rls.c    1.2  8/17/89
 *****************************************************************
 *                                                               *
 *  (C) Copyright by Foxboro Company 1988                        *
 *                                                               *
 *  All rights reserved: Foxboro Company 1988                    *
 *                                                               *
 *****************************************************************
 *                                                               *
 * NAME               : rls                                      *
 *                                                               *
 * FUNCTION           : Remove the leading spaces from a string. *
 *                                                               *
 * INPUT PARAMETERS   : char string[]  (input-string)            *
 *                                                               *
 * OUTPUT PARAMETERS  : char string[]  (pointer to input string, from *
 *                          which the leading spaces are removed)    *
 *                                                               *
 * RETURN CODES       : char *rls()  (pointer to input string, from  *
 *                          which the leading spaces are removed)    *
 *                                                               *
 * SYNOPSIS           : char *rls(string)                        *
 *                                                               *
 * PRECONDITIONS      :                                          *
 *                                                               *
 * ERRORS/EXCEPTIONS  :                                          *
 *                                                               *
 * REMARKS            : Both the parameter <string> and the function *
 *                      itself deliver a pointer to the result-string. *
 *                      This makes it possible to embed the function in *
 *                      another function-call.                   *
 *                                                               *
 * COMPONENT HISTORY :                                           *
 *       31 Oct 88, GM, Copied from bp_gen library.              *
 *                                                               *
 **************************************************************** */

#include <stdio.h>
#include <string.h>

char *rls(string)
char *string;

{
int i,j=0;

   i = strlen(string);

   while (j < i && string[j] == ' ')
       j++;
```

```
   strcpy(string,&string[j]);
   return(string);
}

/* *************************************************************
 * @(#)rts.c    1.2  8/17/89
 ***************************************************************
 *                                                             *
 *  (C) Copyright by Foxboro Company 1988                      *
 *                                                             *
 *  All rights reserved: Foxboro Company 1988                  *
 *                                                             *
 ***************************************************************
 *                                                             *
 * NAME               : rts                                    *
 *                                                             *
 * FUNCTION           : Remove the trailing spaces from a string. *
 *                                                             *
 * INPUT PARAMETERS   : char string[]  {input-string}          *
 *                                                             *
 * OUTPUT PARAMETERS  : char string[]  {pointer to input string, from *
 *                          which the trailing spaces are removed} *
 *                                                             *
 * RETURN CODES       : char *rts()  {pointer to input string, from *
 *                          which the trailing spaces are removed} *
 *                                                             *
 * SYNOPSIS           : char *rts(string)                      *
 *                                                             *
 * PRECONDITIONS      :                                        *
 *                                                             *
 * ERRORS/EXCEPTIONS  :                                        *
 *                                                             *
 * REMARKS            : Both the parameter <string> and the function *
 *                      itself deliver a pointer to the result-string. *
 *                      This makes it possible to embed the function in *
 *                      another function-call.                 *
 *                                                             *
 * COMPONENT HISTORY :                                         *
 *        31 Oct 88, GM, Copied from bp_gen library.           *
 *                                                             *
 ************************************************************** */

#include <stdio.h>
#include <string.h>

char *rts(string)
char string[];

{
int i;

   i = strlen(string);

   while (--i >= 0 && string[i] == ' ');

   string[++i] = '\0';

   return(string);
}

#*************************************************************************
#  @(#)pamtst.mk        1.2  I/A Series  Foxboro Company  8/17/89
#*************************************************************************
#                                                                        *
#  Copyright by the Foxboro Company 1988                                 *
#                                                                        *
#  All rights reserved Foxboro Company 1988                              *
#                                                                        *
#*&O**********************************************************************
#                                                                        *
#  FILE NAME             : pamtst.mk                                     *
#                                                                        *
#  PART NUMBER           :                                               *
#                                                                        *
#  FUNCTION              : Makefile for PAM TDS interpreter tool.        *
#                                                                        *
#  COMPONENT HISTORY     :                                               *
#  ----------------------------------------------------------------     *
#  03 NOV 1988 - MvS - Creation                                          *
#  26 APR 1989 - RRD - Take library -lcom into loader                    *
#  11 AUG 1989 - RRD - Use LIBCOM                                        *
#  12 AUG 1989 - RRD - Add path to /usr/informix/incl                    *
#                                                                        *
#*************************************************************************
```

```
PREFIX  =       /usr/pam

HDRDIR  =       /usr/informix/incl

BINDIR  =       $(PREFIX)/bin

LIBDIR  =       $(PREFIX)/lib

OBJDIR  =       $(PREFIX)/pamtst/obj

SRCDIR  =       $(PREFIX)/pamtst/source

LIBPAM  =       $(LIBDIR)/libpam.a

LIBCOM  =       -lcom

HEADERS =

OBJECTS =       $(OBJDIR)/pamtst.o \
                $(OBJDIR)/eestst.o

TARGET  =       $(BINDIR)/pamtst

CFLAGS  =       -I$(HDRDIR) -c


$(TARGET):      $(OBJECTS)
                cc $(OBJECTS) /usr/informix/lib/libsql.a $(LIBCOM) \
                        -lfox -o $(TARGET)

$(OBJDIR)/pamtst.o:     $(SRCDIR)/pamtst.c

                cc $(CFLAGS) $(SRCDIR)/pamtst.c
                mv pamtst.o $(OBJDIR)

$(OBJDIR)/eestst.o:     $(SRCDIR)/eestst.ec
                /usr/informix/lib/esqlc $(SRCDIR)/eestst.ec
                cc $(CFLAGS) -I/usr/informix/incl eestst.c
                rm eestst.c
                mv eestst.o $(OBJDIR)


/*****************************************************************
*  @(#)eestst.ec    ,   1.2  I/A Series, Foxboro Company   8/17/89
******************************************************************
*
*  (C) Copyright by Foxboro Company 1988
*
*  All rights reserved: Foxboro Company 1988
*
**&D**************************************************************
*
* FILE ID             : eestst.ec
*
* PART NUMBER         :
*
* FUNCTION            : ESQL/C functions to extend the TDS interpreter
*                       tool. These functions provide selection,
*                       updating and checking of Informix database
*                       records/columns.
*
* FUNCTIONS CONTAINED : void PPselect_rec()
*                       void PPupdate_col()
*                       void PPchk_col()
*
* DATA STRUCTURES     :
*
* COMPONENT HISTORY   :
*       24 Oct 1988, GM: Created.
*
***************************************************************** */

static char *SCCS_ID = "@(#)eestst.ec   1.2\t(89/08/17)";


#include <stdio.h>
#include <string.h>
$include sqlca;

#ifdef DEBUG
#       define dprintf(x)       printf x
#else
#       define dprintf(x)
#endif
```

```
#define SEL_BUF_LEN      200
#define TABLE_NAME_LEN   18
#define UPD_LEN          200

#define PASSED  0
#define FAILED  1
#define INIT    2

extern char data_buff[];
extern char my_name[];
extern int case_res;

int db_selected = 0;
char sel_buf[ SEL_BUF_LEN + 1 ];
char *rts(), *rls();

/* ****************************************************************
 *
 *  (C) Copyright by Foxboro Company 1988
 *
 *  All rights reserved: Foxboro Company 1988
 *
 **&1***************************************************************
 *
 * NAME              : PPselect_rec
 *
 * FUNCTION          : Fill dedicated buffer with selection clause.
 *
 * INPUT PARAMETERS  : argv[0]:  selection data:
 *                               "<table>.<column> = <value>"
 *
 * OUTPUT PARAMETERS :
 *
 * RETURN CODES      :
 *
 * SYNOPSIS          : void PPselect_rec( argc, argv )
 *
 * PRECONDITIONS     :
 *
 * COMPONENT HISTORY :
 *
 **************************************************************** */

void PPselect_rec( argc, argv )
int argc;
char *argv[];
{
   char *sel;

   sel = argv[0];

   /* check number of arguments */
   if ( argc < 1 )
   {
      PPfmt_err();
      return;
   }

   dprintf(("%s: Select_Rec, argv[0] = [%s]\n", my_name, argv[0]));

   if ( *sel != '!' )    /* start new selection */
      strcpy( sel_buf, "" );

   else if ( strlen( sel_buf ) > 0 )
   {
      strcat( sel_buf, " and " );
      sel++;
   }

   strcat( sel_buf, strtok( sel, "=" ) );
   strcat( sel_buf, "= \"" );
   strcat( sel_buf, rls(rts( strtok((char*)NULL, "=") )) );
   strcat( sel_buf, "\"" );

   dprintf(("%s: Select_Rec, sel_buf = [%s]\n", my_name, sel_buf));
}
```

```
/* ****************************************************************
*
*  (C) Copyright by Foxboro Company 1988
*
*  All rights reserved: Foxboro Company 1988
*
**$1**************************************************************
*
* NAME              : PPupdate_col
*
* FUNCTION          : Update one column in record selected by previously
*                     constructed selection clause.
*
* INPUT PARAMETERS  : argv[0];  column update data:
*                               "<table>.<column> = <value>"
*
* OUTPUT PARAMETERS :
*
* RETURN CODES      :
*
* SYNOPSIS          : void PPupdate_col( argc, argv )
*
* PRECONDITIONS     :
*
* COMPONENT HISTORY :
*
***************************************************************** */

void PPupdate_col( argc, argv )
int argc;
char *argv[];
{
   $char spec[ 500 ];
   char in_buf[ SEL_BUF_LEN + 1 ],
        upd_str[ UPD_LEN + 1 ],
        *table;

   /* check number of arguments */
   if ( argc < 1 )
   {
      PPfmt_err();
      return;
   }

   dprintf(("%s: Update_Col, argv[0] = [%s]\n", my_name, argv[0]));

   if ( !db_selected )
   {
      $database pam;
      if ( sqlca.sqlcode != 0 )
      {
         printf( "%s: Error opening pam database, %d\n",my_name, sqlca.sqlcode);
         case_res = FAILED;
         return;
      }
      dprintf(("%s: Update_Col, pam database selected\n", my_name));
         db_selected = 1;
      }

      strcpy( in_buf, argv[0] );
      strcpy( upd_str, strtok( in_buf, "=" ) );
      strcat( upd_str, "= \"" );
      strcat( upd_str, rls(rts( strtok( (char*)NULL, "=" ) )) );
      strcat( upd_str, "\"" );

      table = strtok( in_buf, "." );

      /* prepare update statement */
      sprintf( spec, "update %s set %s where %s", table , upd_str, sel_buf );
      dprintf(("%s: Update_Col, [%s]\n", my_name, spec ));
      $prepare updt from $spec;

      $execute updt;
      if ( sqlca.sqlcode != 0 )
      {
         printf( "%s: Error updating pam database, %d\n", my_name, sqlca.sqlcode);
         case_res = FAILED;
         return;
      }
   }
```

```
/* ***************************************************************
 *
 *  (C) Copyright by Foxboro Company 1988
 *
 *  All rights reserved: Foxboro Company 1988
 *
 **&1*************************************************************
 *
 * NAME              : PPchk_rec
 *
 * FUNCTION          : Check one column in record selected by previously
 *                     constructed selection clause.
 *
 * INPUT PARAMETERS  : argv[0];  column check data:
 *                               "<table>.<column> = <value>"
 *
 * OUTPUT PARAMETERS :
 *
 * RETURN CODES      :
 *
 * SYNOPSIS          : void PPchk_col( argc, argv )
 *
 * PRECONDITIONS     :
 *
 * COMPONENT HISTORY :
 *
 ************************************************************** */

void PPchk_col( argc, argv )
int argc;
char *argv[];
{
   $char spec[ 500 ],
         proj[ 127 ];
   char in_buf[ UPD_LEN + 1 ],
        table[ TABLE_NAME_LEN + 1 ],
        *tab,
        *column,
        *val;

   /* check number of arguments */
   if ( argc < 1 )
   {
      PPfmt_err();
      return;
   }

   dprintf(("%s: Check_Col, argv[0] = [%s]\n", my_name, argv[0]));

   if ( !db_selected )
   {
      $database pam;
      if ( sqlca.sqlcode != 0 )
      {
         printf( "%s: Error opening pam database, %d\n",my_name, sqlca.sqlcode);
         case_res = FAILED;
         return;
      }
      dprintf(("%s: Check_Col, pam database selected\n", my_name));

      db_selected = 1;
   }

   strcpy( table, argv[0] );
   tab = strtok( table, "." );
   rts( tab );

   strcpy( in_buf, argv[0] );
   column = strtok( in_buf, "=" );
   rts( column );

   val = strtok( (char*)NULL, "=" );
   rts( val );
   rls( val );

   /* prepare select statement */
   sprintf( spec, "select %s from %s where %s",
                                column, tab, sel_buf );
   dprintf(("%s: Check_Col, [%s]\n", my_name, spec ));
   $prepare selct from $spec;

   $declare s_curs cursor for selct;

   $open s_curs;
```

```
    $fetch s_curs into $proj;
    rts( proj );

    $close s_curs;

    if ( sqlca.sqlcode != 0 )
    {
       printf( "%s: Error checking pam database, %d\n", my_name, sqlca.sqlcode);
       case_res = FAILED;
       return;
    }

    if ( strcmp( val, proj ) )
    {
       PPunexp_res();
       printf( "    projection %s  : %s\n", column );
       printf( "    expected value : %s\n", val );
       printf( "    actual value   : %s\n", proj );
       case_res = FAILED;
       return;
    }
}


/*
 * Remove trailing spaces.
 */

char *rts( str )
char *str;
{
   while ( str[ strlen(str)-1 ] == ' ' ) str[ strlen(str)-1 ] = '\0';
   return str;
}


/*
 * Remove leading spaces.
 */

char *rls( str )
char *str;
{
   int i = 0;

   while ( str[i] == ' ' ) i++;
   strcpy( str, str+i );

   return str;
}
#-----------------------------------------------------------------
#  @(#)inc      1.2  I/A Series, Foxboro Company  89/08/17
#-----------------------------------------------------------------
#
# Name   : INClude processor for tpp
#
# Author : Ronald Duursma
#
# Date   : 1988/10/19
#
# History:
#       19 JAN 89, JvB: Created under SCCS.
#
awk 'BEGIN { printf "divert(-1) " } \
    /#define/ && $3 == "(" { printf "define(%s,eval(", $2 ; \
                            for(i=4;$i!=")";i++) printf "%s", $i ; \
                            printf "))\n" } \
    /#define/ && $3 != "(" { printf "define(%s,%s)\n", $2, $3 } \
    END { printf "divert(0) " }' $1

/************************************************************************
 *  @(#)pamtst.c 1.2  New System, Foxboro Co.  8/17/89
 ************************************************************************
 *
 * (C)Copyright by Foxboro Company  1988
 *
 * All rights reserved:  Foxboro Company  1988
 *
 ************************************************************************
 *
 * FILE ID             : PAMTST.C
 *
 * PART NUMBER         :
 *
 * FUNCTION            : PAM Path Controller test program
```

```
 *
 * FUNCTIONS CONTAINED : main()          Test program main function
 *                       PPinit_test()   Initialize test program
 *                       PPexit_test()   Exit test program
 *                       PPexec_test()   Execute testcases
 *
 *                       PPcase_id()     Set testcase identification
 *                       PPchk_rpy()     Check IPC reply
 *                       PPchk_var()     Check value of variable
 *                       PPset_var()     Set variable to value
 *                       PPvar_create()  Create shared variable
 *                       PPvar_delete()  Delete shared variable
 *                       PPexe_prg()     Execute system command
 *                       PPfill_buff()   Fill message buffer
 *                       PPsnd_file()    Send file as IPC message
 *                       PPsnd_msg()     Send IPC message
 *                       PPseq_msg()     Send 'sequence' message
 *                       PPstop_prg()    Stop venix program
 *                       PPwait_sec()    Wait x second(s)
 *                       PPchg_dest()    Change destination
 *                       PPon_trace()    Set trace on
 *                       PPoff_trace()   Set trace off
 *                       PPerror_exp()   Error expected
 *
 *                       PPfmt_err()     Print 'format error' message
 *                       PPlookup()      Find keyword index
 *                       PPscan_line()   Scan input line
 *                       PPstoval()      Convert string to value
 *                       PPunexp_res()   Print 'unexpected result' message
 *
 * DATA STRUCTURES     :
 *
 * COMPONENT HISTORY   : Oct  7, 1988 MVS Initial setup
 *                       Oct 12, 1988 MVS Function PPexe_prg added
 *                       Oct 17, 1988 MVS Function PPfill_buff, PPsnd_buff
 *                                        and PPwait_sec added
 *                       Oct 31, 1988 MVS PPsnd_buff deleted; PPseq_msg and
 *                                        PPstop_prg added
 *                       Nov  8, 1988 MVS Debug statements added
 *                       Nov 22, 1988 MVS Functions 'gmatch', 'cclass' added
 *                       Dec  5, 1988 RRD Function PPchg_dest added.
 *                                        Modified PPwait_sec to use system call
 *                                        sleep and changed test on command
 *                                        line arguments.
 *                       Dec 14, 1988 MVS Function PPvar_create, PPvar_delete
 *                                        and PPinit_test modified for maximum
 *                                        length of shared variable name
 *                       Dec 14, 1988 MVS Separator '\f' (formfeed) added to
 *                                        function PPscan_line
 *                       Jan 16, 1989 RRD Function PPon_trace and PPoff_trace
 *                                        added, changed PPexec_test to
 *                                        support tracing, changed 'Chg_Dest'
 *                                        to 'Change_Dst'.
 *                       Jan 18, 1989 JVB Corrected printf statements.
 *                       Apr 26, 1989 RRD Use CL for IPC.
 *                       Jun 30, 1989 RRD Add include of <fox/almtypes.h>
 *                                        Corrected boolean tests
 *                       Jul  6, 1989 RRD Add function PPerror_exp()
 *                       Jul 14, 1989 RRD Use lookup() to report errors
 *                       Aug 14, 1989 RRD Use CL errors
 *
 ***********************************************************************/

static char *SCCS_ID = "@(#)pamtst.c    1.2\t(89/08/17)";


#ifdef DEBUG
#       define dprintf(x)       printf x
#else
#       define dprintf(x)
#endif

/* VENIX include files */

#include <signal.h>
#include <stdio.h>

/* Foxboro include files */

#include <fox/om_user.h>
#include <fox/om_ecode.h>
#include <fox/concat.h>
#include <fox/almtypes.h>
#include <fox/alarmmsg.h>
#include <fox/err_cms.h>
#include <fox/cl_errors.h>
```

```
/* global defines */

#define BUFFER_SIZE 1024

char my_name[IPC_NAME_LEN + 1];  /* ap name of test program */
char pac_name[IPC_NAME_LEN + 1]; /* ap name of path controller */
char source[IPC_NAME_LEN + 1]; /* source name of sender */

char rcv_msg[BUFFER_SIZE + 1];  /* IPC receive buffer */
char data_buff[BUFFER_SIZE + 1]; /* temporary data buffer */

char case_id[80];          /* testcase identification */
int case_res;              /* result of testcase (PASSED / FAILED) */
int line_no;               /* line number counter  */
int trace = 0;             /* trace on/off */
int size;                  /* size of received message */

#define PASSED 0
#define FAILED 1
#define INIT   2           /* No testcase executed yet */

/*
obj_list: stores name and type of shared
variables created by test program
*/

#define LIST_LEN 40

typedef struct
        {
        char name[NAME_LEN + 1];
        int type;
        } OBJ_INFO;

OBJ_INFO obj_list[LIST_LEN];

/* function declarations */

void PPinit_test();
void PPexit_test();
void PPexec_test();

void PPcase_id();
void PPchk_rpy();
void PPchk_var();
void PPvar_create();
void PPvar_delete();
void PPexe_prg();
void PPfill_buff();
void PPset_var();
void PPsnd_file();
void PPsnd_msg();
void PPseq_msg();
void PPstop_prg();
void PPwait_sec();
void PPchg_dest();
void PPon_trace();
void PPoff_trace();
void PPerror_exp();

void PPchk_col();
void PPupdate_col();
void PPselect_col();
void PPfat_err();
int  PPlookup();
void PPscan_line();
void PPstoval();
void PPunexp_res();

/* keyword table: used when searching for keywords */

char *keyw_tbl[] = {
        "#",
        "Check_Col",
        "Check_Rpy",
        "Check_Var",
        "Create_Var",
        "Delete_Var",
        "Execute_Prg",
        "Fill_Buff",
        "Select_Rec",
        "Set_Var",
        "Send_File",
        "Send_Msg",
```

```
        "Seq_Msg",
        "Stop_Prg",
        "Update_Col",
        "Wait_Sec",
        "Change_Dst",
        "Trace_On",
        "Trace_Off",
        "Error_Exp",
        "" };

/* function table: contains a function address for each keyword */

void (*func_tbl[])() = {
        PPcase_id,
        PPchk_col,
        PPchk_rpy,
        PPchk_var,
        PPvar_create,
        PPvar_delete,
        PPexe_prg,
        PPfill_buff,
        PPselect_col,
        PPset_var,
        PPsnd_file,
        PPsnd_msg,
        PPseq_msg,
        PPstop_prg,
        PPupdate_col,
        PPwait_sec,
        PPchg_dest,
        PPon_trace,
        PPoff_trace,
        PPerror_exp};

#define DATA_LEN 255

/* Define for OM type BOOLEAN (only for compound variables) */

#define BOOLEAN 5

/*******************************************************************
*
* (C) Copyright by Foxboro Company 1988
*
* All rights reserved: Foxboro Company 1988
*
********************************************************************
*
* NAME                  :  main
*
* FUNCTION              :  Test program main function
*
* INPUT PARAMETERS      :  Command line argument(s)
*
* OUTPUT PARAMETERS     :  none
*
* RETURN CODES          :  none
*
* SYNOPSYS              :  NA
*
* PRECONDITIONS         :  none
*
* ERRORS/EXCEPTIONS     :  none
*
* FUNCTIONS CALLED      :  PPinit_test
*                          PPexec_test
*                          PPexit_test
*
* DETAILED DESIGN       :  Initialize test program
*                          Execute testcases
*                          Exit test program
*
* REMARKS               :
*
* COMPONENT HISTORY     :  oct 7, 1988 MVS Initial setup
*
*******************************************************************/

main(argc, argv)
int argc;
char *argv[];
{
/* Initialize test program */

PPinit_test(argc, argv);
```

```
/* Execute specified testcases */

PPexec_test();

/* Exit test program */

PPexit_test();
}

*
* (C) Copyright by Foxboro Company 1988
*
* All rights reserved: Foxboro Company 1988
*
*********************************************************************
*
* NAME                : PPinit_test
*
* FUNCTION            : Initialize test program
*
* INPUT PARAMETERS    : Command line argument(s)
*
* OUTPUT PARAMETERS   : none
*
* RETURN CODES        : none
*
* SYNOPSYS            : PPinit_test(argc, argv);
*                       int  argc;
*                       char *argv[];
*
* PRECONDITIONS       : none
*
* ERRORS/EXCEPTIONS   : bad OM object create
*                       bad IPC register
*                       bad IPC CS activate
*
* FUNCTIONS CALLED    : PPexit_test
*
* DETAILED DESIGN     : Retrieve ap name for IPC destination process and
*                       (optionally) for test program
*                       Initialize variable list
*                       Initialize data buffer
*                       Initialize testcase related data
*                       Set VENIX signal
*                       Make process globally known
*                       Register for IPC
*                       Activate the process
*
* REMARKS             :
*
* COMPONENT HISTORY   : Oct  7, 1988 NVS Initial setup
*                       Nov  3, 1988 NVS ap name for IPC destination process
*                                        must be supplied on command line !
*                       Nov  8, 1988 NVS Debug statements added
*                       Dec  5, 1988 RRD Made <dest_name> optional
*                       Dec 14, 1988 NVS Modified for max length s. var.
*
*********************************************************************/

void PPinit_test(argc, argv)
int argc;
char *argv[];
{
int result, idx;

/* Turn off buffering to stdout */

setbuf( stdout, 0 );

/* Retrieve ap names for IPC destination process and for test program */

if (argc == 1)
        {
        strcpy(pac_name, ""); /* first arg is destination process name */
        strcpy(my_name, "TST");    /* default process name for pamtst */
        }

if (argc == 2)
        {
        strcpy(pac_name, argv[1]); /* first arg is destination process name */
        strcpy(my_name, "TST");    /* default process name for pamtst */
        }
```

```
if (argc > 2)
        {
        strcpy(pac_name, argv[1]); /* first arg is destination process name */
        strcpy(my_name, argv[2]);  /* second arg is pamtst process name */
        }

#ifdef DEBUG
printf("%s: PPinit_test();argc=%d;", my_name, argc);
for (idx = 0; idx < argc; idx++)
        printf("%s;", argv[idx]);
printf("\n");
#endif

/* Initialize variable list */

memset(obj_list, 0, sizeof(obj_list));

/* Initialize data buffer */

*data_buff = '\0';

/* Initialize testcase related data */

strcpy(case_id, "1");
case_res = INIT;
line_no = 0;

/* set VENIX signal */

signal(SIGINT, PPexit_test);

/* Initialize IPC */

CLcon_fig( 1, 0, 0 );
result = CLini_ipc( my_name, 1, 10 );
if ( result != 0 )
        {
        printf("%s: CLini_ipc() returned %d\n", my_name, result);
        PPexit_test();
        }

printf("\n%s: Initialization completed\n", my_name);
}

/*******************************************************************
 *
 * (C) Copyright by Foxboro Company 1988
 *
 * All rights reserved: Foxboro Company 1988
 *
 *******************************************************************
 *
 * NAME                 :  PPexit_test
 *
 * FUNCTION             :  Exit test program
 *
 * INPUT PARAMETERS     :  none
 *
 * OUTPUT PARAMETERS    :  none
 *
 * RETURN CODES         :  none
 *
 * SYNOPSYS             :  PPexit_test();
 *
 * PRECONDITIONS        :  none
 *
 * ERRORS/EXCEPTIONS    :  none
 *
 * FUNCTIONS CALLED     :  none
 *
 * DETAILED DESIGN      :  Search through variable list and delete
 *                         all created variables
 *                         Cancel IPC events for this process
 *                         Delete process name from object directory
 *                         Unregister for IPC
 *                         Print result of last testcase
 *                         Exit testprogram
 *
 * REMARKS              :
 *
 * COMPONENT HISTORY    :  Oct  7, 1988 MVS Initial setup
 *                         Nov  8, 1988 MVS Debug statements added
 *
 *******************************************************************/
```

```
void PPexit_test()
{
int result, idx;
char infostr[80];

#ifdef DEBUG
printf("%s: PPexit_test();\n", my_name);
#endif

/* Search through object list and delete all created variables */

for (idx = 0; idx < LIST_LEN; idx++)
        if (*obj_list[idx].name != '\0')
                {
                /* Delete the variable */
                result = obj_delete(obj_list[idx].name, VARIABLE);
                if (result != OM_SUCCESS)
                {
                        lookup( OMSS, result, infostr );
                        printf("%s: Bad object delete - %s - %s\n",
                                my_name, obj_list[idx].name, infostr);
                }

                /* Free the entry in the object list */

                *obj_list[idx].name = '\0';
                }

/* Print result of last testcase */

if (case_res != INIT)
        {
        if (case_res == PASSED)
                printf("%s: Passed\n", my_name);
        else
                printf("%s: Failed\n", my_name);

        printf("--------------------------------------------------");
        }

printf("\n%s: Test completed; Goodbye !\n", my_name);

/* Exit testprogram */

CLstp_ipc( 0 );

exit( 0 );
}

/*****************************************************************
*
* (C) Copyright by Foxboro Company 1988
*
* All rights reserved: Foxboro Company 1988
*
******************************************************************
*
* NAME                 :  PPexec_test
*
* FUNCTION             :  Execute testcases
*
* INPUT PARAMETERS     :  none
*
* OUTPUT PARAMETERS    :  none
*
* RETURN CODES         :  none
*
* SYNOPSYS             :  PPexec_test();
*
* PRECONDITIONS        :  Test program initialized
*
* ERRORS/EXCEPTIONS    :  none
*
* FUNCTIONS CALLED     :  PPscan_line
*                         PPlookup
*
*                         function table:
*
*                         PPcase_id
*                         PPchk_rpy
*                         PPchk_var
*                         PPvar_create
*                         PPvar_delete
*                         PPexe_prg
*                         PPfill_buff
```

```
*                       PPset_var
*                       PPsnd_file
*                       PPsnd_msg
*                       PPseq_msg
*                       PPstop_prg
*                       PPwait_sec
*                       PPchg_dest
*
*                       PPchk_col        (external)
*                       PPselect_col     (external)
*                       PPupdate_col     (external)
*
* DETAILED DESIGN    :  For each line in case specification
*                          scan line
*                          check for keywords, get index
*                          if keyword found
*                             invoke handler using function table & index
*
* REMARKS            :  Function PPscan_line returns a maximum of
*                       MAX_ARGS arguments
*
* COMPONENT HISTORY  :  Oct  7, 1988 MVS Initial setup
*                       Nov  8, 1988 MVS Debug statements added
*                       Jan 16, 1989 RRD Tracing now supported
*
*****************************************************************/

#define MAX_ARGS          4

void PPexec_test()
{
char line[DATA_LEN];
char copy[DATA_LEN];
int argc;
char *argv[MAX_ARGS];
int key_id;

#ifdef DEBUG
printf("%s: PPexec_test():\n", my_name);
#endif

while (gets(line) != NULL)
        {
        line_no++;
        if ( trace )
                {
                strcpy( copy, line );
                }
        PPscan_line(line, argv, &argc);
        if (argc >= 1)
                {
                key_id = PPlookup(keyw_tbl, argv[0]);
                if (key_id >= 0)
                        {
                        if ( trace )
                                {
                                printf( "%5d : %s\n", line_no, copy );
                                }
                        (*func_tbl[key_id])(argc - 1, &argv[1]);
                        }
                else if ( trace )
                        {
                        printf( "       %s\n", copy );
                        }
                }
        }
}

/*****************************************************************
*
* (C) Copyright by Foxboro Company 1988
*
* All rights reserved: Foxboro Company 1988
*
******************************************************************
*
* NAME               :  PPcase_id
*
* FUNCTION           :  Set testcase identification
*
* INPUT PARAMETERS   :  testcase id
*
* OUTPUT PARAMETERS  :  none
*
* RETURN CODES       :  none
*
```

```
 * SYNOPSYS             :  PPcase_id(argc, argv);
 *                          int argc;
 *                          char *argv[];
 *
 *                          argv[0] = case_id;
 *
 * PRECONDITIONS        :  none
 *
 * ERRORS/EXCEPTIONS    :  none
 *
 * FUNCTIONS CALLED     :  PPfmt_err
 *
 * DETAILED DESIGN      :  If too few arguments specified
 *                              Print message and return
 *                          Copy case_id into global string
 *                          Print result of previous testcase
 *                          Print testcase separator
 *                          Print case_id of next testcase
 *                          Initialize case_res for next testcase
 *
 * REMARKS              :  No check for length of argument !
 *
 * COMPONENT HISTORY    :  Oct  7, 1988 NVS Initial setup
 *                          Nov  8, 1988 NVS Debug statements added
 *
 ******************************************************************/

void PPcase_id(argc, argv)
int argc;
char *argv[];
{
int idx;

#ifdef DEBUG
printf("%s: PPcase_id();argc=%d;", my_name, argc);
for (idx = 0; idx < argc; idx++)
        printf("%s:", argv[idx]);
printf("\n");
#endif

/* Check number of arguments */

if (argc < 1)
        {
        PPfmt_err();
        return;
        }

/* Copy case_id into global variable */

strcpy(case_id, argv[0]);

/* Print result of previous testcase */

if (case_res == PASSED)
        printf("%s: Passed\n", my_name);
else if (case_res == FAILED)
        printf("%s: Failed\n", my_name);

/* Print testcase separator */

printf("-------------------------------------------------\n");

/* Print case_id of next testcase */

printf("%s: Testcase = %s\n", my_name, case_id);

/* Initialize case_res for next testcase */

case_res = PASSED;
}


/******************************************************************
 *
 * (C) Copyright by Foxboro Company 1988
 *
 * All rights reserved: Foxboro Company 1988
 ******************************************************************
 *
 * NAME                 :  PPchk_rpy
 *
 * FUNCTION             :  Check IPC reply
 *
```

```
* INPUT PARAMETERS    :  Expected reply
*
* OUTPUT PARAMETERS   :  none
*
* RETURN CODES        :  none
*
* SYNOPSYS            :  PPchk_rpy(argc, argv);
*                        int argc;
*                        char *argv[];
*
*                        argv[0] = Expected reply
*
* PRECONDITIONS       :  none
*
* ERRORS/EXCEPTIONS   :  Bad IPC return codes
*
* FUNCTIONS CALLED    :  PPfmt_err
*                        PPunexp_res
*
* DETAILED DESIGN     :  if data buffer is not empty
*                           Data buffer specifies expected reply
*                        else
*                           If too few arguments specified
*                              Print message and return
*                           First argument specifies expected reply
*                        Wait for IPC message (10 sec timeout)
*                        If timeout
*                           Print message
*                           Fail testcase
*                           Cancel IPC receive event
*                        If message received
*                           Check if received messages
*                           equals expected message
*                           If not equal
*                              Print message
*                              Fail testcase
*                        Clear data buffer
*
* REMARKS             :
*
* COMPONENT HISTORY   :  Oct  7, 1988 MVS Initial setup
*                        Oct 31, 1988 MVS code added to compare reply
*                                         with data buffer
*                        Nov  3, 1988 MVS timeout for reply changed to 30 s
*                        Nov  8, 1988 MVS Debug statements added
*                        Nov 22, 1988 MVS 'strcpy' repl. w. 'gmatch'
*
*********************************************************************/

void PPchk_rpy(argc, argv)
int argc;
char *argv[];
{
int result, idx;
char *exp_msg;

#ifdef DEBUG
printf("%s: PPchk_rpy():argc=%d:", my_name, argc);
for (idx = 0; idx < argc; idx++)
        printf("%s:", argv[idx]);
printf("\n");
#endif

if (*data_buff != '\0')
        exp_msg = data_buff;
else
        {
        /* Check number of arguments */

        if (argc < 1)
                {
                PPfmt_err();
                return;
                }

        exp_msg = argv[0];
        }

/* Receive IPC message (30 sec timeout) */

result = CLrcv_msg( rcv_msg, source, &size, 30 );

if (result == CL_TIME_OUT)
        {
```

```
        /* Print message, fail testcase and cancel IPC receive event */

        PPunexp_res();
        printf("    Received reply: none (timeout)\n");
        printf("    Expected reply: %s\n", exp_msg);
        case_res = FAILED;
        *data_buff = '\0';
        return;
        }

if (result != 0)
        {
        printf("%s: CLrcv_msg() returned %d\n", my_name, result);
        case_res = FAILED;
        *data_buff = '\0';
        return;
        }

rcv_msg[size] = '\0';

/* Reply received: Check if received reply equals expected reply */

if (!gmatch(rcv_msg, exp_msg))
        {
        /* Print message and fail testcase */

        PPunexp_res();
        printf("    Received reply: %s\n", rcv_msg);
        printf("    Expected reply: %s\n", exp_msg);
        case_res = FAILED;
        }

*data_buff = '\0';
}

/*****************************************************************
*
* (C) Copyright by Foxboro Company 1988
*
* All rights reserved: Foxboro Company 1988
*
******************************************************************
*
* NAME                : PPchk_var
*
* FUNCTION            : Check value of variable
*
* INPUT PARAMETERS    : name
*                       value
*
* OUTPUT PARAMETERS   : none
*
* RETURN CODES        : none
*
* SYNOPSYS            : PPchk_var(argc, argv);
*                       int argc;
*                       char *argv[];
*
*                       argv[0] = name; argv[1] = value
*
* PRECONDITIONS       : none
*
* ERRORS/EXCEPTIONS   : Bad OM return codes
*
* FUNCTIONS CALLED    : PPfmt_err
*                       PPstoval
*                       PPunexp_res
*
* DETAILED DESIGN     : If too few arguments specified
*                          Print message and return
*                       Get actual value of variable
*                       Convert expected value from string
*                       to value format
*                       If actual value not equal to expected value
*                          Print message
*                          Fail testcase
*
* REMARKS             :
*
* COMPONENT HISTORY   : Oct  7, 1988 MVS Initial setup
*                       Oct 17, 1988 MVS Type Boolean added
*                       Nov  8, 1988 MVS Debug statements added
*                       Jun 30, 1989 RRD Corrected BOOLEAN case
*
*****************************************************************/
```

```
void PPchk_var(argc, argv)
int argc;
char *argv[];
{
int result, type, i;
int data_len = DATA_LEN;
char *name;              /* variable name */
char *str_val;           /* expected value in string format */
char act_val[DATA_LEN]; /* actual value */
char exp_val[DATA_LEN]; /* expected value */
float delta = 0.01;
char infostr[80];

#ifdef DEBUG
printf("%s: PPchk_var():argc=%d:", my_name, argc);
for (i = 0; i < argc; i++)
        printf("%s:", argv[i]);
printf("\n");
#endif

/* Chack number of arguments */

if (argc < 2)
        {
        PPfat_err();
        return;
        }

name = argv[0];
str_val = argv[1];

/* Get actual value */

result = getval(name, VARIABLE, 0, act_val, &type, &data_len);
if (result != OM_SUCCESS)
        {
        lookup( OMSS, result, infostr );
        printf("%s: Bad get value - %s - %s\n",
                my_name, name, infostr);
        case_res = FAILED;
        return;
        }

type = type & 0x1F;

/* Convert expected value from string to value format */

PPstoval(str_val, type, exp_val);

switch (type)
        {
        case CHARACTER:
                if ( *act_val != *exp_val)
                        {
                PPunexp_res();
                printf("    variable name  : %s\n", name);
                printf("    expected value : %c\n", *exp_val);
                printf("    actual value   : %c\n", *act_val);
                case_res = FAILED;
                return;
                        }
                break;

        case INTEGER:
                if (*((int *)act_val) != *((int *)exp_val))
                        {
                PPunexp_res();
                printf("    variable name  : %s\n", name);
                printf("    expected value : %d\n", *((int *)exp_val));
                printf("    actual value   : %d\n", *((int *)act_val));
                case_res = FAILED;
                return;
                        }
                break;

        case FLOAT:
                if ((*((float *)act_val) < *((float *)exp_val) - delta) ||
                    (*((float *)act_val) > *((float *)exp_val) + delta))
                        {
                PPunexp_res();
                printf("    variable name  : %s\n", name);
                printf("    expected value : %f\n", *((float *)exp_val));
                printf("    actual value   : %f\n", *((float *)act_val));
                case_res = FAILED;
                return;
```

```
                }
                break;

        case OM_LNG_INT:
                if (*((long *)act_val) != *((long *)exp_val))
                        {
                PPunexp_res();
                printf("    variable name  : %s\n", name);
                printf("    expected value : %ld\n", *((long *)exp_val));
                printf("    actual value   : %ld\n", *((long *)act_val));
                case_res = FAILED;
                return;
                        }
                break;

        case STRING:
                for (i=strlen(act_val) - 1; i >= 0 && act_val[i] == ' '; i--);
                act_val[++i] = '\0';
                if (strcmp(act_val, exp_val))
                        {
                PPunexp_res();
                printf("    variable name  : %s\n", name);
                printf("    expected value : %s\n", exp_val);
                printf("    actual value   : %s\n", act_val);
                case_res = FAILED;
                return;
                        }
                break;

        case BOOLEAN:
                if ((*act_val == '\0' && *exp_val != '\0')
                ||  (*act_val != '\0' && *exp_val == '\0'))

                        {
                PPunexp_res();
                printf("    variable name  : %s\n", name);
                printf("    expected value : %d\n", *exp_val != '\0' );
                printf("    actual value   : %d\n", *act_val != '\0' );
                case_res = FAILED;
                return;
                        }
                break;

        default:
                printf("%s: Variable type unknown\n", my_name);
                case_res = FAILED;
                return;
        }
}

/*****************************************************************
*
* (C) Copyright by Foxboro Company 1988
*
* All rights reserved: Foxboro Company 1988
*
******************************************************************
*
* NAME                  :  PPvar_create
*
* FUNCTION              :  Create shared variable
*
* INPUT PARAMETERS      :  name
*                          type
*
* OUTPUT PARAMETERS     :  none
*
* RETURN CODES          :  none
*
* SYNOPSYS              :  PPvar_create(argc, argv);
*                          int argc;
*                          char *argv[];
*
*                          argv[0] = name; argv[1] = type
*
* PRECONDITIONS         :  none
*
* ERRORS/EXCEPTIONS     :  Bad OM return code
*
* FUNCTIONS CALLED      :  PPfmt_err
*
* DETAILED DESIGN       :  If too few arguments specified
*                             Print message and return
*                          Convert type to OM format
*                          Create shared variable using name and type
```

```
*                     Search free entry in variable list
*                     If free entry found
*                        Add name and type to variable list
*                     else
*                        Delete variable
*                        Print message
*
* REMARKS             :
*
* COMPONENT HISTORY   :  Oct  7, 1988 MVS Initial setup
*                        Nov  8, 1988 MVS Debug statements added
*                        Dec 14, 1988 MVS Modified for max length s.var
*
*******************************************************************/

void PPvar_create(argc, argv)
int argc;
char *argv[];
{
int result, idx;
char *name;
int var_type;
char infostr[80];

#ifdef DEBUG
printf("%s: PPvar_create();argc=%d:", my_name, argc);
for (idx = 0; idx < argc; idx++)
        printf("%s:", argv[idx]);
printf("\n");
#endif

/* Check number of arguments */

if (argc < 2)
        {
        PPfmt_err();
        return;
        }

name = argv[0];

/* Convert type to OM format */

switch (tolower(*argv[1]))
        {
        case 'c':
           var_type = CHARACTER;
           break;
        case 'i':
           var_type = INTEGER;
           break;
        case 'f':
           var_type = FLOAT;
           break;
        case 'l':
           var_type = OM_LNG_INT;
           break;
        case 's':
           var_type = STRING;
           break;
        default:
           PPfmt_err();
           break;
        }

/* Create the variable using name and type */

result = obj_create(name, VARIABLE, var_type, DATA_LEN);
if (result != OM_SUCCESS)
        {
        lookup( OMSS, result, infostr );
        printf("%s: Bad object create - %s - %s\n",
                my_name, name, infostr);
        return;
        }

/* Search for free entry in variable list */
for (idx = 0; idx < LIST_LEN; idx++)
        if (*obj_list[idx].name == '\0')
                {

                /* Add name and type to variable list */
```

```
                strncpy(obj_list[idx].name, name, NAME_LEN);
                obj_list[idx].type = var_type;
                return;
                }

/* Delete variable and print message */

obj_delete(name, VARIABLE);
printf("%s: Variable list overflow; Maximum: %d)\n",
        my_name, LIST_LEN);
}


/*****************************************************************
*
* (C) Copyright by Foxboro Company 1988
*
* All rights reserved: Foxboro Company 1988
*
******************************************************************
*
* NAME                :  PPvar_delete
*
* FUNCTION            :  Delete shared variable
*
* INPUT PARAMETERS    :  name
*
* OUTPUT PARAMETERS   :  none
*
* RETURN CODES        :  none
*
* SYNOPSYS            :  PPvar_delete(argc, argv);
*                        int argc;
*                        char *argv[];
*
*                        argv[0] = name
*
* PRECONDITIONS       :  none
*
* ERRORS/EXCEPTIONS   :  Bad OM return codes
*
* FUNCTIONS CALLED    :  PPfmt_err
*
* DETAILED DESIGN     :  If too few arguments specified
*                           Print message and return
*                        Delete shared variable using name
*                        Search for variable name in list and free
*                        the entry
*
* REMARKS             :
*
* COMPONENT HISTORY   :  Oct  7, 1988 MVS Initial setup
*                        Nov  8, 1988 MVS Debug statements added
*                        Dec 14, 1988 MVS Modified for max length s.var
*
*****************************************************************/

void PPvar_delete(argc, argv)
int argc;
char *argv[];
{
int result, idx;
char *name;
char infostr[80];

#ifdef DEBUG
printf("%s: PPvar_delete():argc=%d;", my_name, argc);
for (idx = 0; idx < argc; idx++)
        printf("%s:", argv[idx]);

printf("\n");
#endif

/* Check number of arguments */

if (argc < 1)
        {
        PPfmt_err();
        return;
        }

name = argv[0];

/* Delete the shared variable using name */
```

```
result = obj_delete(name, VARIABLE);
if (result != OM_SUCCESS)
{
        lookup( OMSS, result, infostr );
        printf("%s: Bad object delete - %s - %s\n",
                my_name, name, infostr);
}

/* Search for variable name in the list and free the entry */

for (idx = 0; idx < LIST_LEN; idx++)
        if (!strncmp(obj_list[idx].name , name, NAME_LEN))
                *obj_list[idx].name = '\0';
}

/*****************************************************************
*
* (C) Copyright by Foxboro Company 1988
*
* All rights reserved: Foxboro Company 1988
*
******************************************************************
*
* NAME                 :  PPexe_prg
*
* FUNCTION             :  Execute system command
*
* INPUT PARAMETERS     :  command
*
* OUTPUT PARAMETERS    :  none
*
* RETURN CODES         :  none
*
* SYNOPSYS             :  PPexe_prg(argc, argv);
*                         int argc;
*                         char *argv[];
*
*                         argv[0] = command
*
* PRECONDITIONS        :  none
*
* ERRORS/EXCEPTIONS    :  none
*
* FUNCTIONS CALLED     :  PPfat_err
*
* DETAILED DESIGN      :  If data buffer is not empty
*                            Data buffer specifies command
*                         else
*                            If too few arguments specified
*                               Print message and return
*                            First argument specifies command
*                         Execute system command
*                         If error
*                            Print message
*                            Fail testcase
*
* REMARKS              :
*
* COMPONENT HISTORY    :  Oct  7, 1988 MVS Initial setup
*                         Nov  4, 1988 MVS Code added to execute command
*                                          specified in data buffer
*                         Nov  8, 1988 MVS Debug statements added
*
*****************************************************************/

void PPexe_prg(argc, argv)
int argc;
char *argv[];
{
int result, idx;
char *command;

#ifdef DEBUG
printf("%s: PPexe_prg():argc=%d:", my_name, argc);
for (idx = 0; idx < argc; idx++)
        printf("%s:", argv[idx]);
printf("\n");
#endif

if (*data_buff != '\0')
        command = data_buff;
else
        {
        /* Check number of arguments */
```

```
        if (argc < 1)
                {
                PPfmt_err();
                return;
                }

        command = argv[0];
        }

/* Execute system command */

result = system(command);

/* Clear data buffer */

*data_buff = '\0';

/* test command result */

if (result != 0)
        {
        /* On error print message and fail testcase */

        printf("%s: Execute_Program returned %d\n", my_name, result);
        case_res = FAILED;
        }
}


/*****************************************************************
 *
 * (C) Copyright by Foxboro Company 1988
 *
 * All rights reserved: Foxboro Company 1988
 *
 *****************************************************************
 *
 * NAME               :  PPfill_buff
 *
 * FUNCTION           :  Fill message buffer
 *
 * INPUT PARAMETERS   :  buffer data
 *
 * OUTPUT PARAMETERS  :  none
 *
 * RETURN CODES       :  none
 *
 * SYNOPSYS           :  PPfill_buff(argc, argv);
 *                        int argc;
 *                        char *argv[];
 *
 *                        argv[0] = buffer data
 *
 * PRECONDITIONS      :  none
 *
 * ERRORS/EXCEPTIONS  :  none
 *
 * FUNCTIONS CALLED   :  PPfmt_err
 *
 * DETAILED DESIGN    :  If too few arguments specified
 *                           Print message and return
 *                        Append first argument to message buffer
 *
 * REMARKS            :
 *
 * COMPONENT HISTORY  :  Oct 17, 1988 MVS Initial setup
 *                        Oct 31, 1988 MVS '\n' specified by argument
 *                        Nov  8, 1988 MVS Debug statements added
 *
 *****************************************************************/

void PPfill_buff(argc, argv)
int argc;
char *argv[];
{
char *arg_ptr, *buff_ptr;
int idx;

#ifdef DEBUG
printf("%s: PPfill_buff():argc=%d:", my_name, argc);
for (idx = 0; idx < argc; idx++)
        printf("%s:", argv[idx]);
printf("\n");
#endif
```

```
/* Check number of arguments */

if (argc < 1)
        {
        PPfmt_err();
        return;
        }

/* Locate end of data buffer */

for (buff_ptr = data_buff; *buff_ptr != '\0'; buff_ptr++);

/* Append first argument to end of data buffer */

for (arg_ptr = argv[0]; *arg_ptr != '\0'; arg_ptr++)
        if (*arg_ptr == '\\' && *(arg_ptr + 1) == 'n')
                {
                arg_ptr++;
                *buff_ptr++ = '\n';
                }
        else
                *buff_ptr++ = *arg_ptr;

*buff_ptr = '\0';
}


/*****************************************************************
*
* (C) Copyright by Foxboro Company 1988
*
* All rights reserved: Foxboro Company 1988
*
******************************************************************
*
* NAME                  :  PPset_var
*
* FUNCTION              :  Set variable to value
*
* INPUT PARAMETERS      :  name
*                          value
*
* OUTPUT PARAMETERS     :  none
*
* RETURN CODES          :  none
*
* SYNOPSYS              :  PPset_var(argc, argv);
*                          int argc;
*                          char *argv[];
*
*                          argv[0] = name; argv[1] = type
*
* PRECONDITIONS         :  none
*
* ERRORS/EXCEPTIONS     :  Bad OM return codes
*
* FUNCTIONS CALLED      :  PPfmt_err
*                          PPstoval
*
* DETAILED DESIGN       :  If too few arguments specified
*                             Print message and return
*                          Search for variable in variable list
*                          If not found
*                             Do om getval to determine type
*                          Else
*                             Get type from variable list
*                          Convert value from string to value format
*                          Do om set_confirm using name, type and value
*
* REMARKS               :
*
* COMPONENT HISTORY     :  Oct  7, 1988 MVS Initial setup
*                          Nov  8, 1988 MVS Debug statements added
*                          Jul 17, 1989 RRD Ignore error 2 in set_confirm()
*
*****************************************************************/

void PPset_var(argc, argv)
int argc;
char *argv[];
{
int result, idx, type;
int data_len = DATA_LEN;
```

```
char val[DATA_LEN];
char *name;
char *str_val;
char infostr[80];

#ifdef DEBUG
printf("%s: PPset_var():argc=%d:", my_name, argc);
for (idx = 0; idx < argc; idx++)
        printf("%s;", argv[idx]);
printf("\n");
#endif

/* Check number of arguments */

if (argc < 2)
        {
        PPfmt_err();
        return;
        }

name = argv[0];
str_val = argv[1];

/* Search for variable in variable list */

for (idx = 0; idx < LIST_LEN; idx++)
        if (!strcmp(obj_list[idx].name, name))
                break;

if (idx == LIST_LEN)
        {

        /* Variable not found; Do om getval to determine type */

        result = getval(name, VARIABLE, 0, val, &type, &data_len);
        if (result != OM_SUCCESS)
                {
                lookup( OMSS, result, infostr );
                printf("%s: Bad get value - %s - %s\n",
                        my_name, name, infostr);
                return;
                }
        type = type & 0x1F;
        }
else
        /* variable found; Get type from variable list */

        type = obj_list[idx].type;

/* Convert value from string to value format */

PPstoval(str_val, type, val);

/* Do om set_confirm using name, type and value */

if ( type == STRING )

        {
        data_len = strlen( val ) + 1;
        }

result = set_confirm(name, VARIABLE, 0, val, &type, data_len );
if (result != OM_SUCCESS && result !=2) /* Error 2 occurs when .ACTIVE
                                            parameter is set to 0 when it
                                            is already 0. */
        {
        lookup( OMSS, result, infostr );
        printf("%s: Bad set confirm - %s - %s\n",
                my_name, name, infostr);
        }
}

/*******************************************************************
*
* (C) Copyright by Foxboro Company 1988
*
* All rights reserved: Foxboro Company 1988
*
********************************************************************
*
* NAME               :  PPsnd_file
*
* FUNCTION           :  Send file as IPC message
*
* INPUT PARAMETERS   :  filename
```

```
 *
 * OUTPUT PARAMETERS  :  none
 *
 * RETURN CODES       :  none
 *
 * SYNOPSYS           :  PPsnd_file(argc, argv);
 *                       int argc;
 *                       char *argv[];
 *
 *                       argv[0] = filename
 *
 * PRECONDITIONS      :  none
 *
 * ERRORS/EXCEPTIONS  :  Bad IPC return codes
 *
 * FUNCTIONS CALLED   :  PPfmt_err
 *                       PPsnd_msg
 *
 * DETAILED DESIGN    :  Clear data buffer
 *                       If too few arguments specified
 *                          Print message and return
 *                       If file does not exist
 *                          Print message and return
 *                       else
 *                          Open file
 *                          Copy file contents to data buffer
 *                          Send data buffer to destination process
 *                          Clear data buffer
 * REMARKS            :
 *
 * COMPONENT HISTORY  :  Oct  7, 1988 MVS Initial setup
 *                       Oct 31, 1988 MVS Modified for new version of
 *                                        function 'PPsnd_msg'
 *                       Nov  8, 1988 MVS Debug statements added
 *
 ****************************************************************/

void PPsnd_file(argc, argv)
int argc;
char *argv[];
{
FILE *fp;
char *buff_ptr;

int max, idx;

#ifdef DEBUG
printf("%s: PPsnd_file():argc=%d:", my_name, argc);
for (idx = 0; idx < argc; idx++)
        printf("%s:", argv[idx]);
printf("\n");
#endif

/* Clear data buffer */

*data_buff = '\0';

/* Check number of arguments */

if (argc < 1)
        {
        PPfmt_err();
        return;
        }

buff_ptr = data_buff;
max = BUFFER_SIZE;

if ((fp = fopen(argv[0], "r")) == NULL)
        {
        printf("%s: File not found: %s\n", my_name, argv[0]);
        return;
        }

/* Copy file contents to data buffer */

while (((*buff_ptr++ = fgetc(fp)) != EOF) && (max--));

*--buff_ptr = '\0';

fclose(fp);

/* Send data buffer to destination process */

PPsnd_msg(argc, argv);
```

```
/* Clear data buffer */

*data_buff = '\0';
}

/***************************************************************
*
* (C) Copyright by Foxboro Company 1988
*
* All rights reserved: Foxboro Company 1988
*
****************************************************************
*
* NAME                 :  PPsnd_msg
*
* FUNCTION             :  Send IPC message
*
* INPUT PARAMETERS     :  message
*
* OUTPUT PARAMETERS    :  none
*
* RETURN CODES         :  none
*
* SYNOPSYS             :  PPsnd_msg(argc, argv);
*                         int argc;
*                         char *argv[];
*
*                         argv[0] = message
*
* PRECONDITIONS        :  none
*
* ERRORS/EXCEPTIONS    :  Bad IPC return codes
*
* FUNCTIONS CALLED     :  PPfmt_err
*
* DETAILED DESIGN      :  If data buffer is not empty
*                            Data buffer specifies message
*                         else
*                            If too few arguments specified
*                               Print message and return
*                            First argument specifies message
*                         Send IPC message to destination process
*                         Wait for IPC event
*                         Check result of IPC send
*                         Clear data buffer
*
* REMARKS              :
*
* COMPONENT HISTORY    :  Oct  7, 1988 MVS Initial setup
*                         Oct 31, 1988 MVS Code added to send and clear
*                                          data buffer
*                         Nov  8, 1988 MVS Debug statements added
*                         Apr 21, 1989 PR  strlen in cl_send modified
*
***************************************************************/

void PPsnd_msg(argc, argv)
int argc;
char *argv[];
{
int result, idx;

char *msg;

#ifdef DEBUG
printf("%s: PPsnd_msg();argc=%d;", my_name, argc);
for (idx = 0; idx < argc; idx++)
        printf("%s:", argv[idx]);
printf("\n");
#endif

if (*data_buff != '\0')
        msg = data_buff;
else
        {
        /* Check number of arguments */

        if (argc < 1)
                {
                PPfmt_err();
                return;
                }

        msg = argv[0];
        }
```

```
/* Send IPC message to destination process */

result = CLsnd_msg( msg, pac_name, strlen( msg ) + 1 );
if ( result != 0 )
        {
        printf("%s: CLsnd_msg() returned %d\n", my_name, result);
        *data_buff = '\0';
        return;
        }

*data_buff = '\0';
}

/*******************************************************************
*
* (C) Copyright by Foxboro Company 1988
*
* All rights reserved: Foxboro Company 1988
*
********************************************************************
*
* NAME                 :  PPseq_msg
*
* FUNCTION             :  Send 'sequence' message
*
* INPUT PARAMETERS     :
*
* OUTPUT PARAMETERS    :  none
*
* RETURN CODES         :  none
*
* SYNOPSYS             :  PPseq_msg(argc, argv);
*
* PRECONDITIONS        :  none
*
* ERRORS/EXCEPTIONS    :  none
*
* FUNCTIONS CALLED     :  PPfmt_err
*                         PPexe_prg
*
* DETAILED DESIGN      :  If too few arguments specified
*                             Print message and return
*                         Build message
*                         Call PPsnd_msg to send message
*
* REMARKS              :
*
* COMPONENT HISTORY    :  Oct 31, 1988 RD Initial setup
*                         Nov  8, 1988 MVS Debug statements added
*
*******************************************************************/

void PPseq_msg(argc, argv)
int argc;
char *argv[];
{
int result, idx;
char *msg;

CONCAT_MSG      concat_msg;
PTR_ALARM_MSG   alarm_ptr;

#ifdef DEBUG
printf("%s: PPseq_msg();argc=%d;", my_name, argc);
for (idx = 0; idx < argc; idx++)
       printf("%s;", argv[idx]);
printf("\n");
#endif

/* Check number of arguments */

if (*data_buff != '\0')
        {
        /* Check number of arguments */

        if (argc < 2)
                {
                PPfmt_err();
                return;
                }

        msg = data_buff;
        }
```

```
else
        {
        /* Check number of arguments */

        if (argc < 3)
                {
                PPfmt_err();
                return;
                }

        msg = argv[2];
        }

memset( &concat_msg, 0, sizeof( concat_msg ) );

alarm_ptr = ( PTR_ALARM_MSG ) concat_msg.aprint_buf;
alarm_ptr -> messg_type = SEQ_1_MESSAGE;
strcpy( alarm_ptr -> compound_name, argv[0] );
strcpy( alarm_ptr -> block_name, argv[1] );
strcpy( alarm_ptr -> text_buffer, msg );


/* Send IPC message to destination process */

result = CLsnd_msg( &concat_msg, pac_name, sizeof( concat_msg ) );
if ( result != 0 )
        {
        printf("%s: CLsnd_msg() returned %d\n", my_name, result);
        *data_buff = '\0';
        return;
        }

/* Clear data buffer */

*data_buff = '\0';

}


/********************************************************************
*
* (C) Copyright by Foxboro Company 1988
*
* All rights reserved: Foxboro Company 1988
*
*********************************************************************
*
* NAME                : PPstop_prg
*
* FUNCTION            : Stop venix program
*
* INPUT PARAMETERS    : prg_name
*
* OUTPUT PARAMETERS   : none
*
* RETURN CODES        : none
*
* SYNOPSYS            : PPstop_prg(argc, argv);
*                       int argc;
*                       char *argv[];
*
*                       argv[0] = prg_name
*
* PRECONDITIONS       : none
*
* ERRORS/EXCEPTIONS   : none
*
* FUNCTIONS CALLED    : PPfmt_err
*
* DETAILED DESIGN     : If too few arguments specified
*                          Print message and return
*                       Build command
*                       Call PPexe_prg to execute command
*
* REMARKS             :
*
* COMPONENT HISTORY   : Oct 31, 1988 RD Initial setup
*                       Nov  8, 1988 MVS Debug statements added
*                       Jan 16, 1989 RRD Use kill -16 to stop programs
*
*******************************************************************/

void PPstop_prg(argc, argv)
int argc;
char *argv[];
{
```

```
char command[80];
int idx;

#ifdef DEBUG
printf("%s: PPstop_prg();argc=%d;", my_name, argc);
for (idx = 0; idx < argc; idx++)
        printf("%s;", argv[idx]);
printf("\n");
#endif

/* Check number of arguments */

if (argc < 1)
        {
        PPfmt_err();
        return;
        }

/* Build command */

*command = '\0';

strcat(command, "kill -16 `ps -e | awk '/");
strcat(command, argv[0]);
strcat(command, "/{ printf \"%d \", $1}'`");

/* Call PPexe_prg to execute command */

argc = 1;
argv[0] = command;

PPexe_prg(argc, argv);
}


/*****************************************************************
*
* (C) Copyright by Foxboro Company 1988
*
* All rights reserved: Foxboro Company 1988
*
******************************************************************
*
* NAME                  :  PPwait_sec
*
* FUNCTION              :  Wait x second(s)
*
* INPUT PARAMETERS      :  number of seconds
*
* OUTPUT PARAMETERS     :  none
*
* RETURN CODES          :  none
*
* SYNOPSYS              :  PPwait_sec(argc, argv);
*                          int argc;
*                          char *argv[];
*
*                          argv[0] = number of seconds
*
* PRECONDITIONS         :  none
*
* ERRORS/EXCEPTIONS     :  none
*
* FUNCTIONS CALLED      :  PPfmt_err
*
* DETAILED DESIGN       :  If too few arguments specified
*                              Print message and return
*                          Call sleep
*
* REMARKS               :
*
* COMPONENT HISTORY     :  Oct 17, 1988 MVS Initial setup
*                          Nov  8, 1988 MVS Debug statements added
*                          Dec  5, 1988 RRD System call sleep is now used
*
*****************************************************************/

void PPwait_sec(argc, argv)
int argc;
char *argv[];
{
int idx;
```

```
#ifdef DEBUG
printf("%s: PPwait_sec():argc=%d;", my_name, argc);
for (idx = 0; idx < argc; idx++)
        printf("%s;", argv[idx]);
printf("\n");
#endif

/* Check number of arguments */

if (argc < 1)
        {
        PPfmt_err();
        return;
        }

/* Go sleep */

sleep( atoi( argv[0] ) );

}

/******************************************************************
 *
 * (C) Copyright by Foxboro Company 1988
 *
 * All rights reserved: Foxboro Company 1988
 *
 ******************************************************************
 *
 * NAME                 :  PPchg_dest
 *
 * FUNCTION             :  Change destination for Send_Msg
 *
 * INPUT PARAMETERS     :  New destination name
 *
 * OUTPUT PARAMETERS    :  none
 *
 * RETURN CODES         :  none
 *
 * SYNOPSYS             :  PPchg_dest(argc, argv);
 *                         int argc;
 *                         char *argv[];
 *
 *                         argv[0] = new destination name
 *
 * PRECONDITIONS        :  none
 *
 * ERRORS/EXCEPTIONS    :  none
 *
 * FUNCTIONS CALLED     :  PPfmt_err
 *
 * DETAILED DESIGN      :  If too few arguments specified
 *                            Print message and return
 *                         Put new destination name in pac_name
 *
 * REMARKS              :
 *
 * COMPONENT HISTORY    :  Dec  5, 1988 RRD Initial setup
 *
 *****************************************************************/

void PPchg_dest(argc, argv)
int argc;
char *argv[];
{
int idx;

#ifdef DEBUG
printf("%s: PPchg_dest():argc=%d;", my_name, argc);
for (idx = 0; idx < argc; idx++)
        printf("%s;", argv[idx]);
printf("\n");
#endif

/* Check number of arguments and size of new destination name */

if (argc < 1 || strlen(argv[0]) > IPC_NAME_LEN || strlen(argv[0]) == 0)

        {
        PPfmt_err();
        return;
        }

/* Copy name */
```

```
strcpy(pac_name, argv[0]);

}

/*******************************************************************
*
* (C) Copyright by Foxboro Company 1988
*
* All rights reserved: Foxboro Company 1988
*
********************************************************************
*
* NAME                 :  PPon_trace
*
* FUNCTION             :  Set trace on
*
* INPUT PARAMETERS     :  none
*
* OUTPUT PARAMETERS    :  none
*
* RETURN CODES         :  none
*
* SYNOPSYS             :  PPon_trace( argc, argv )
*                         int      argc;
*                         char     *argv[];
*
* PRECONDITIONS        :  none
*
* ERRORS/EXCEPTIONS    :  none
*
* FUNCTIONS CALLED     :  none
*
* DETAILED DESIGN      :  Set trace to 1
*
* REMARKS              :
*
* COMPONENT HISTORY    :  Jan 16, 1989 RRD Initial setup
*
*******************************************************************/

void PPon_trace( argc, argv )
int     argc;
char    *argv[];
{
int idx;

#ifdef DEBUG
printf( "%s: PPon_trace():argc=%d;", my_name, argc );
for ( idx = 0 ; idx < argc ; idx++ )
        printf( "%s;", argv[idx] );
printf( "\n" );
#endif

/* Set trace to 1 */

trace = 1;

}

/*******************************************************************
*
* (C) Copyright by Foxboro Company 1988
*
* All rights reserved: Foxboro Company 1988
*
********************************************************************
*
* NAME                 :  PPoff_trace
*
* FUNCTION             :  Set trace off
*
* INPUT PARAMETERS     :  none
*
* OUTPUT PARAMETERS    :  none
*
* RETURN CODES         :  none
*
* SYNOPSYS             :  PPoff_trace( argc, argv )
*                         int      argc;
*                         char     *argv[];
*
* PRECONDITIONS        :  none
*
* ERRORS/EXCEPTIONS    :  none
```

```
 *
 * FUNCTIONS CALLED    :  none
 *
 * DETAILED DESIGN     :  Set trace to 0
 *
 * REMARKS             :
 *
 * COMPONENT HISTORY   :  Jan 16, 1989 RRD Initial setup
 *
 ****************************************************************/

void PPoff_trace( argc, argv )
int     argc;
char    *argv[];
{
int idx;

#ifdef DEBUG
printf( "%s: PPoff_trace();argc=%d;", my_name, argc );
for ( idx = 0 ; idx < argc ; idx++ )
        printf( "%s;", argv[idx] );
printf( "\n" );
#endif

/* Set trace to 0 */

trace = 0;

}

/****************************************************************
 *
 * (C) Copyright by Foxboro Company 1988
 *
 * All rights reserved: Foxboro Company 1988
 *
 ****************************************************************
 *
 * NAME                :  PPerror_exp
 *
 * FUNCTION            :  Expected error
 *
 * INPUT PARAMETERS    :  none
 *
 * OUTPUT PARAMETERS   :  none
 *
 * RETURN CODES        :  none
 *
 * SYNOPSYS            :  PPerror_exp( argc, argv )
 *                        int     argc;
 *                        char    *argv[];
 *
 * PRECONDITIONS       :  none
 *
 * ERRORS/EXCEPTIONS   :  none
 *
 * FUNCTIONS CALLED    :  none
 *
 * DETAILED DESIGN     :  Print error expected
 *
 * REMARKS             :
 *
 * COMPONENT HISTORY   :  Jul  6, 1989 RRD Initial setup
 *
 ****************************************************************/

void PPerror_exp( argc, argv )
int     argc;
char    *argv[];
{
int idx;

#ifdef DEBUG
printf( "%s: PPerror_exp();argc=%d;", my_name, argc );
for ( idx = 0 ; idx < argc ; idx++ )
        printf( "%s;", argv[idx] );
printf( "\n" );
#endif

/* Check number of arguments */

if (argc < 1)
        {
        PPfat_err();
        return;
        }
```

```
/* Print error expected */

printf( "%s: Error expected: %s\n", my_name, argv[0] );

}

/*****************************************************************
*
* (C) Copyright by Foxboro Company 1988
*
* All rights reserved: Foxboro Company 1988
*
******************************************************************
*
* NAME                 :  PPfmt_err
*
* FUNCTION             :  Print 'format error' message
*
* INPUT PARAMETERS     :  none
*
* OUTPUT PARAMETERS    :  none
*
* RETURN CODES         :  none
*
* SYNOPSYS             :  PPfmt_err():
*
* PRECONDITIONS        :  none
*
* ERRORS/EXCEPTIONS    :  none
*
* FUNCTIONS CALLED     :  none
*
* DETAILED DESIGN      :  Print message +
*
*                                 - The case_id of current testcase
*                                 - Line number of test spec file
*
* REMARKS              :
*
* COMPONENT HISTORY    :  Oct 7, 1988 MVS Initial setup
*
*****************************************************************/

void PPfmt_err()
{
        printf("%s: Too few arguments: Testcase = %s; Line = %d\n",
                my_name, case_id, line_no);
}

/*****************************************************************
*
* (C) Copyright by Foxboro Company 1988
*
* All rights reserved: Foxboro Company 1988
*
******************************************************************
*
* NAME                 :  PPlookup
*
* FUNCTION             :  Find keyword index
*
* INPUT PARAMETERS     :  table
*                         string
*
* OUTPUT PARAMETERS    :  none
*
* RETURN CODES         :  index in table
*
* SYNOPSYS             :  index = PPlookup(tbl, str)
*                         char *tbl[];
*                         char *str;
*
* PRECONDITIONS        :  none
*
* ERRORS/EXCEPTIONS    :  none
*
* FUNCTIONS CALLED     :  none
*
* DETAILED DESIGN      :  Search in table for entry that equals
*                         search string
*                            If found
*                               return table index
*                            Else
*                               return -1
```

```
 *
 * REMARKS              :
 *
 * COMPONENT HISTORY    :  Sep 15, 1988 WC Initial setup
 *
 ******************************************************************/

int PPlookup(tbl, str)
char *tbl[], *str;
        {
        int i;

        for (i = 0; tbl[i][0] != '\0'; ++i)
                if (strcmp(tbl[i], str) == 0)
                        return i;
        return -1;
        }

/******************************************************************
 *
 * (C) Copyright by Foxboro Company 1988
 *
 * All rights reserved: Foxboro Company 1988
 *
 ******************************************************************
 *
 * NAME                 :  PPscan_line
 *
 * FUNCTION             :  Scan input line
 *
 * INPUT PARAMETERS     :  line
 *
 * OUTPUT PARAMETERS    :  number of arguments
 *                         argument pointer array
 *
 * RETURN CODES         :  none
 *
 * SYNOPSYS             :  PPscan_line(line, argv, argc);
 *                         char *line;
 *                         int  *argv[];
 *                         int  *argc;
 *
 * PRECONDITIONS        :  none
 *
 * ERRORS/EXCEPTIONS    :  none
 *
 * FUNCTIONS CALLED     :  none
 *
 * DETAILED DESIGN      :  word = FALSE
 *                         string = FALSE
 *                         For each character on line
 *                            If word == TRUE
 *                               If end of word
 *                                  Terminate word with null character
 *                                  word = FALSE
 *                            Else if string == TRUE
 *                               If end of string
 *                                  Terminate string with null character
 *                                  string == FALSE
 *                            Else if start of string
 *                               Add word pointer to pointer array
 *                               string = TRUE
 *                               Increment argument counter
 *                            Else if start of word
 *                               Add string pointer to pointer array
 *                               word = TRUE
 *                               Increment argument counter
 *
 * REMARKS              :
 *
 * COMPONENT HISTORY    :  Oct  7, 1988 MVS Initial setup
 *                         Dec 14, 1988 MVS Separator '\f' added
 *
 ******************************************************************/

void PPscan_line(line, argv, argc)
char *line;
char *argv[];
int *argc;
{
int i = 0;
char c;
int word = 0;
int string = 0;
```

```
while ((c = *line) != '\0')
        {
        if (word)
                {
                if (c == ' ' || c == '\t' || c == '\n' || c == '\f')
                        {
                        /* End of word */

                        *line = '\0';
                        word = 0;
                        if (i == MAX_ARGS)
                                break;
                        }
                }
        else if (string)
                {
                if (c == '"')
                        {
                        /* End of string */

                        *line = '\0';
                        string = 0;
                        if (i == MAX_ARGS)
                                break;
                        }
                }
        else if (c == '"')
                {
                /* Start of string */

                argv[i++] = line + 1;
                string = 1;
                }
        else if (c != ' ' && c != '\t' && c != '\n')
                {
                /* Start of word */

                argv[i++] = line;
                word = 1;
                }
        line++;
        }

*argc = i;
}


/*******************************************************************
*
* (C) Copyright by Foxboro Company 1988
*
* All rights reserved: Foxboro Combany 1988
*
********************************************************************
*
* NAME                 :  PPstoval
*
* FUNCTION             :  Convert string to value
*
* INPUT PARAMETERS     :  value in string format
*                         type
*
* OUTPUT PARAMETERS    :  value
*
* RETURN CODES         :  none
*
* SYNOPSYS             :  PPstoval(i_val, type, o_val);
*                         char *i_val;
*                         int type;
*                         char *o_val;
*
* PRECONDITIONS        :  none
*
* ERRORS/EXCEPTIONS    :  Specified type not supported
*
* FUNCTIONS CALLED     :  none
*
* DETAILED DESIGN      :  If type == CHARACTER
*                            Copy first character from i_val to o_val
*                         If type == INTEGER
*                            Convert i_val to integer and store in o_val
*                         If type == FLOAT
*                            Convert i_val to float and store in o_val
*                         If type == OM_LNG_INT
*                            Convert i_val to long and store in o_val
```

```
 *                       If type == STRING
 *                          Copy string i_val to o_val
 *
 * REMARKS               :
 *
 * COMPONENT HISTORY     :  Sep 16, 1988 WC  Initial setup
 *                          Oct 7,  1988 MVS Return code deleted; Types
 *                                           CHARACTER and OM_LNG_INT added
 *                          Oct 12, 1988 MVS Interface spec changed; Type
 *                                           STRING added;
 *                          Oct 17, 1988 MVS Type BOOLEAN added
 *
 ****************************************************************************/

void PPstoval(i_val, type, o_val)
char *i_val;
int type;
char *o_val;

{

/*
This function converts a value from string format to value format
*/

switch (type)
        {
        case CHARACTER:
                o_val[0] = i_val[0]:
                return;

        case INTEGER:
        case BOOLEAN:
                if (sscanf(i_val, "%d", o_val) != 1)
                        printf("%s: Conversion error; value: %s\n",
                                my_name, i_val);
                return;

        case FLOAT:
                if (sscanf(i_val, "%f", o_val) != 1)
                        printf("%s: Conversion error; value: %s\n",
                                my_name, i_val);
                return;

        case OM_LNG_INT:
                if (sscanf(i_val, "%ld", o_val) != 1)
                        printf("%s: Conversion error; value: %s\n",
                                my_name, i_val);
                return;

        case STRING:
                strcpy(o_val, i_val);
                return;

        default:
                printf("%s: Conversion error; type: %d\n",
                        my_name, type);
        }
}

/****************************************************************************
 *
 * (C) Copyright by Foxboro Company 1988
 *
 * All rights reserved: Foxboro Company 1988
 *
 ****************************************************************************
 *
 * NAME                 :  PPunexp_res
 *
 * FUNCTION             :  Print 'Unexpected result' message
 *
 * INPUT PARAMETERS     :  none
 *
 * OUTPUT PARAMETERS    :  none
 *
 * RETURN CODES         :  none
 *
 * SYNOPSYS             :  PPunexp_res();
 *
 * PRECONDITIONS        :  none
 *
 * ERRORS/EXCEPTIONS    :  none
 *
 * FUNCTIONS CALLED     :  none
```

```
 *
 * DETAILED DESIGN    :  Print message +
 *
 *
 *                             - The case_id of current testcase
 *                             - Line number of test spec file
 *
 * REMARKS            :
 *
 * COMPONENT HISTORY  :  Oct 7, 1988 MVS Initial setup
 *
 ****************************************************************/

void PPunexp_res()
{
printf("%s: Unexpected result; Testcase = %s; Line = %d\n",
       my_name, case_id, line_no);
}

/* -------- gmatch.c -------- */
/*
 * int gmatch(string, pattern)
 * char *string, *pattern;
 *
 * Match a pattern as in sh(1).
 */

#define NULL    0
#define CMASK   0377
#define QUOTE   0200
#define QMASK   (CMASK&~QUOTE)
#define NOT     '!'     /* might use ^ */

static  char    *cclass();

int
gmatch(s, p)
register char *s, *p;
{
        register int sc, pc;

        if (s == NULL || p == NULL)
                return(0);
        while ((pc = *p++ & CMASK) != '\0') {
                sc = *s++ & QMASK;
                switch (pc) {
                case '[':
                        if ((p = cclass(p, sc)) == NULL)
                                return(0);
                        break;

                case '?':
                        if (sc == 0)
                                return(0);
                        break;

                case '*':
                        s--;
                        do {
                                if (*p == '\0' || gmatch(s, p))
                                        return(1);
                        } while (*s++ != '\0');
                        return(0);

                default:
                        if (sc != (pc&~QUOTE))
                                return(0);
                }
        }
        return(*s == 0);
}

static char *
cclass(p, sub)
register char *p;
register int sub;
{
        register int c, d, not, found;

        if ((not = *p == NOT) != 0)
                p++;
        found = not;
        do {
                if (*p == '\0')
                        return(NULL);
                c = *p & CMASK;
                if (p[1] == '-' && p[2] != ']') {
                        d = p[2] & CMASK;
```

```
                p++;
        } else
                d = c;
        if (c == sub || c <= sub && sub <= d)
                found = !not;
    } while (*++p != ']');
    return(found? p+1: NULL);
}
```

```
#-----------------------------------------------------------------
#  @(#)tpp      1.2  I/A Series, Foxboro Company  89/08/17
#-----------------------------------------------------------------
#
# Name   : Test Pre Processor
#
# Author : Ronald Duursma
#
# Date   : 1988/10/19
#
# History:
#       19 JAN 89, JvB: Created under SCCS.
#
awk '/Define_File/ { printf "%s syscmd(inc %s)\n", $0, $2 } \
    ! /Define_File/ { print }' $1 | m4 ; m4
```

```
#*********************************************************************
#  @(#)pirs.mk  1.3  I/A Series  Foxboro Company  8/17/89
#*********************************************************************
#                                                                    *
#                                                                    *
#  Copyright by the Foxboro Company 1988                             *
#                                                                    *
#  All rights reserved Foxboro Company 1988                          *
#                                                                    *
#*$0******************************************************************
#                                                                    *
#  FILE NAME           : pirs.mk                                     *
#                                                                    *
#  PART NUMBER         :                                             *
#                                                                    *
#  FUNCTION            : Makefile for PAM PIRS Server.               *
#                                                                    *
#  COMPONENT HISTORY   :                                             *
#  ---------------------------------------------------------------   *
#  22 NOV 1988 - JVB - Creation                                      *
#  11 AUG 1989 - RD  - Link CL                                       *
#                                                                    *
#*********************************************************************

PREFIX  =       /usr/pam

HDRDIR  =       $(PREFIX)/header

BINDIR  =       $(PREFIX)/bin

LIBDIR  =       $(PREFIX)/lib

OBJDIR  =       $(PREFIX)/pirs/obj

SRCDIR  =       $(PREFIX)/pirs/source

LIBPAM  =       $(LIBDIR)/libpam.a

LIBCOM  =       -lcom

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h

OBJECTS =       $(OBJDIR)/pirs_srv.o\
                $(OBJDIR)/pirsfuncs.o

TARGET  =       $(BINDIR)/pirs

CFLAGS  =       -I$(HDRDIR) -c


$(TARGET):      $(OBJECTS) $(LIBPAM) $(LIBDIR)/pam_gen.a
                cc $(OBJECTS) $(LIBPAM) $(LIBCOM) $(LIBDIR)/pam_gen.a \
```

```
                -lpream -lisam -lfox -z -i -o $(TARGET)

$(OBJDIR)/pirs_srv.o:   $(SRCDIR)/pirs_srv.c $(HEADERS)
                cc $(CFLAGS) $(SRCDIR)/pirs_srv.c
                mv pirs_srv.o $(OBJDIR)

$(OBJDIR)/pirsfuncs.o:  $(SRCDIR)/pirsfuncs.c $(HEADERS)
                cc $(CFLAGS) $(SRCDIR)/pirsfuncs.c
                mv pirsfuncs.o $(OBJDIR)

/*****************************************************************************
* @(#)pirs_srv.c        1.2  I/A Series, Foxboro Company  89/08/17
******************************************************************************
*                                                                            *
*  (C) Copyright by Foxboro Company 1988                                     *
*                                                                            *
*  All rights reserved: Foxboro Company 1988                                 *
*                                                                            *
**&0**************************************************************************
*                                                                            *
* FILE ID             : pirs_srv.c                                           *
*                                                                            *
* PART NUMBER         :                                                      *
*                                                                            *
* FUNCTION            : PAM Path Information Retrieval Subsystem             *
*                                           server process.                  *
*                                                                            *
* FUNCTIONS CONTAINED :                                                      *
*                                                                            *
* DATA STRUCTURES     :                                                      *
* COMPONENT HISTORY   :                                                      *
* ----------------------------------------------------------------------     *
* 21 NOV 1988 - JVB - Creation                                               *
* 04 JUL 1989 - RRD - Added setbuf() in case of testing                      *
*                                                                            *
*****************************************************************************/

#include <pam_com.h>
#include <errno.h>
#include <isam.h>
#include <fox/pream.h>

/****************************************************************************
*                                                                           *
*  (C) Copyright by Foxboro Company 1988                                    *
*                                                                           *
*  All rights reserved: Foxboro Company 1988                                *
*                                                                           *
**&1*************************************************************************
*                                                                           *
* NAME                : main                                                *
*                                                                           *
* FUNCTION            : Receive PIRS addressed messages and invoke          *
*                       required function by switching on the message       *
*                       type. Also notify requestor of reception            *
*                       and/or completion of the request.                   *
*                                                                           *
* INPUT PARAMETERS    : argv[1]  ( full pathname of PAM database )          *
*                                                                           *
* OUTPUT PARAMETERS   :                                                     *
*                                                                           *
* RETURN CODES        :                                                     *
*                                                                           *
* SYNOPSIS            :                                                     *
*                                                                           *
* PRECONDITIONS       :                                                     *
*                                                                           *
* COMPONENT HISTORY   :                                                     *
* ----------------------------------------------------------------------    *
* 21 NOV 1988 - JVB - Creation                                              *
*                                                                           *
****************************************************************************/

main( argc, argv )
int argc;
char *argv[];
{
   P_ISAM_ENTRY opentable();
   char msg[ BUFFER_SIZE + 1 ],
        err_str[ LINE_LENGTH + 1 ],
        *pt,
        req_id[ IPC_NAME_LEN + 1 ],
        valarr[ 2 ][ PAM_MAX_DATA + 1 ],
        *val[ 3 ],
```

```
        ret_param[ PAM_MAX_DATA + 1 ],
        field[ PAM_MAX_DATA + 1 ],
        ref[ LINE_LENGTH + 1 ];
    int i,
        n,
        in_type,
        out_type,
        ret_code,
        size;

#ifdef TESTING
    setbuf( stdout, 0 );
#endif

        for ( i = 0; i < 2; i++ )
           val[i] = valarr[i];

        ret_code = PPget_cfg();
        if ( ret_code != PAM_OK )
        {
           PPerr_rpt( PAM, PE_INIT, "??pirs??", "configuration file error" );
           PPstp_ipc( ret_code );
        }

        /* if no directory specified */
        if ( argc != 2 )
        {
           PPerr_rpt( PAM, PE_INV_ARGUMENTS, irs_name, "" );
           exit( -1 );
        }

        /*
         * initialize IPC communication
         */

        ret_code = PPini_ipc( irs_name, 1, 25 );
        if ( ret_code != PAM_OK )
        {
           PPerr_rpt( PAM, PE_INIT, irs_name, "IPC initialize error" );
           PPstp_ipc( ret_code );
        }

        /*
         * change current directory
         */
        if ( chdir( argv[1] ) != 0 )
        {
           strcpy( err_str, "Venix error: " );
           itoa( errno, err_str + strlen(err_str) );
           PPerr_rpt( PAM, PE_DBDIR_FAIL, irs_name, err_str );
           PPstp_ipc( PAM_OK );
        }

        /*
         * check for a valid database directory
         */
        if ( opentable( "copas", ISINPUT + ISMANULOCK ) == (P_ISAM_ENTRY)NULL )
        {
           strcpy( err_str, "PREAM open error: " );
           itoa( isliberr, err_str + strlen(err_str) );
           PPerr_rpt( PAM, PE_OPEN_FAIL, irs_name, err_str );
           PPstp_ipc( PAM_OK );
        }

        /*
         * Catch PIRS requests and translate and forward them to appropriate
         * functions.
         */

        for( ;; )             /* begin forever loop */

    {
        dprintf(("%s: Waiting for message ...\n", irs_name ));

        if ( PPrcv_msg( msg, req_id, &size ) == PAM_OK )
        {
           dprintf(("%s: Message received: [%s]\n", irs_name, msg ));

           ret_code = !PAM_OK;
           out_type = O_INVALID;

           if ( (pt = PPget_fld( msg, ref, LINE_LENGTH )) != (char*)NULL &&
                (pt = PPget_fld( pt, field, PAM_INT_LEN )) != (char*)NULL )
           {
              /* now field contains message type; use it for switch */
```

```
in_type = atoi( field );
out_type = in_type + 1;
ret_param[0] ='\0';

dprintf(( "%s: in_type=[%d] \n", irs_name, in_type ));
switch( in_type )
{
   case I_GP_DESCRIPTN:     /* val[0]=path_name */
      if ( PPdecode_msg( pt, val ) == 1 )
         ret_code = PPgp_descriptn( val[0], ret_param );
      else
         ret_code = P_INV_PATH_NAME;
      break;

   case I_GP_DISPLAY:       /* val[0]=path_name */
      if ( PPdecode_msg( pt, val ) == 1 )
         ret_code = PPgp_display( val[0], ret_param );
      else
         ret_code = P_INV_PATH_NAME;
      break;

   case I_GP_KEY:   /* val[0]=requestor, val[1]=path_name */
      if ( (n = PPdecode_msg( pt, val ) ) == 2 )
         ret_code = PPgp_key( val[0], val[1], ret_param );
      else
         ret_code = ( n == 1 ? P_INV_PATH_NAME : P_INV_REQUESTOR );
      break;

   case I_GP_OWNER: /* val[0]=path_name */
      if ( PPdecode_msg( pt, val ) == 1 )
         ret_code = PPgp_owner( val[0], ret_param );
      else
         ret_code = P_INV_PATH_NAME;
      break;

   case I_GP_STATUS:        /* val[0]=path_name */
      if ( PPdecode_msg( pt, val ) == 1 )
      {
         if ((ret_code = PPgp_status(val[0], ret_param)) == PAM_OK)
            ret_param[1] = '\0';
      }

      else
         ret_code = P_INV_PATH_NAME;
      break;

   case I_GS_CRITERION:     /* val[0]=path_name, val[1]=crit_name */
      if ( (n = PPdecode_msg( pt, val ) ) == 2 )
         ret_code = PPgs_criterion(val[0], val[1], ret_param);
      else
         ret_code = ( n == 1 ? P_INV_CRIT_NAME : P_INV_PATH_NAME );
      break;

   default: PPerr_rpt( PAM, PE_INV_MESSAGE, irs_name, "" );
            out_type = O_INVALID;
            break;

}  /* switch */

dprintf(( "%s: ret_code=[%d] ret_param=[%s]\n",
               irs_name, ret_code, ret_param ));

}  /* type field has been read from message */
else
{
   PPerr_rpt( PAM, PE_INV_MESSAGE, irs_name, "" );
}

/* send response message */
if ( out_type != O_INVALID )
{
   strcpy( msg, ref );
   strcat( msg, ";" );
   itoa( out_type, msg + strlen(msg) );
   strcat( msg, ";" );
   itoa( ret_code, msg + strlen(msg) );
   strcat( msg, ";" );

   if ( ret_param[0] != '\0' )
   {
      strcat( msg, ret_param );
      strcat( msg, ";" );
   }

   if ( PPsnd_msg( msg, req_id, strlen(msg) + 1 ) != PAM_OK )
   {
```

```
                strcpy( err_str, "Function result: " );
                itoa( ret_code, err_str + strlen(err_str) );
                PPerr_rpt( PAM, PE_RESULT, irs_name, err_str );
             }
          }  /* valid out_type */

       }  /* if message received OK */

    }  /* end forever loop */

}

int PPdecode_msg( msg, val )
char *msg,
     *val[];
{
   int i = 0;
   char *pt;

   pt = msg;

   while ( (pt = PPget_fld(pt, val[i], PAM_MAX_DATA)) != (char*)NULL )
   {
      i++;
   }
   val[i] = (char*)NULL;

   return i;
}

/***************************************************************************
* @(#)pirsfuncs.c       1.2  I/A Series, Foxboro Company  89/08/17
****************************************************************************
*                                                                          *
*  (C) Copyright by Foxboro Company 1988                                   *
*                                                                          *
*  All rights reserved: Foxboro Company 1988                               *
*                                                                          *
**@0************************************************************************
*                                                                          *
* FILE ID              : pirsfuncs.c                                       *
*                                                                          *
* PART NUMBER          :                                                   *
*                                                                          *
* FUNCTION             : PAM Path Information Retrieval Subsystem functions. *
*                                                                          *
* FUNCTIONS CONTAINED : int PPgp_descriptn()                               *
*                       int PPgp_display()                                 *
*                       int PPgp_key()                                     *
*                       int PPgp_owner()                                   *
*                       int PPgp_status()                                  *
*                       int PPgs_criterion()                               *
*                                                                          *
* DATA STRUCTURES      :                                                   *
*                                                                          *
* COMPONENT HISTORY    :                                                   *
* ------------------------------------------------------------------------ *
* 22 NOV 1988 - JVB - Creation                                             *
*                                                                          *
***************************************************************************/

#include <pam_com.h>
#include <isam.h>
#include <fox/pream.h>
#include <psrs.h>
#include <seltab.h>

/* ******************************************************************
*
*  (C) Copyright by Foxboro Company 1988
*
*  All rights reserved: Foxboro Company 1988
*
**@1****************************************************************
*
* NAME               : PPgp_descriptn
*
* FUNCTION           : Get path description.
*
* INPUT PARAMETERS   : char *path_name;
*
* OUTPUT PARAMETERS : char *path_descr;
*
```

```
* RETURN CODES        : PAM_OK
*                       P_INV_PATH_NAME
*
* SYNOPSIS            : int PPgp_descriptn( path_name, path_descr )
*
* PRECONDITIONS       :
*
* COMPONENT HISTORY :
*
*************************************************************** */

int PPgp_descriptn( path_name, path_descr )
char *path_name,
     *path_descr;
{
   P_ISAM_ENTRY p_entry,
                opentable();
   char sel[ PAM_COL_LEN + PATH_NAME_SIZE + 2 ], *p_sel[2],
        proj[ PAM_COL_LEN + 1 ], *p_proj[2],
        val[ 1 ][ PAM_MAX_DATA + 1 ], *p_val[2];
   int result = PAM_OK;

   strcpy( sel, "path_name=" ); strcat( sel, path_name );
   init_ptr_arr( sel, p_sel );

   strcpy( proj, "description");
   init_ptr_arr( proj, p_proj );

   p_val[0] = val[0];
   p_val[1] = (char*)NULL;

   p_entry = opentable( "copas", ISINPUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOWD ) == IL_SUCCESS )
   {
      /*
       * val[0] == description
       */
      /* get description */
      strcpy( path_descr, rts(val[0]) );
   }
   else
   {
      result = (isliberr == ENOREC || isliberr == EENDFILE ?
                P_INV_PATH_NAME : isliberr);
   }

   dprintf(( "PPgp_descriptn: path_descr = [%s] result = [%d]\n",
                                  path_descr, result ));
   return result;
}

/* ***************************************************************
*
* (C) Copyright by Foxboro Company 1988
*
* All rights reserved: Foxboro Company 1988
*
**&1*************************************************************
*
* NAME               : PPgp_display
*
* FUNCTION           : Get path display.
*
* INPUT PARAMETERS   : char *path_name;
*
* OUTPUT PARAMETERS  : char *path_display;
*
* RETURN CODES       : PAM_OK
*                      INV_PATH_NAME
*
* SYNOPSIS           : int PPgp_display( path_name, path_display )
*
* PRECONDITIONS      :
*
* COMPONENT HISTORY :
*
*************************************************************** */

int PPgp_display( path_name, path_display )
char *path_name,
     *path_display;
```

```
{
   P_ISAM_ENTRY p_entry,
                opentable();
   char sel[ PAM_COL_LEN + PATH_NAME_SIZE + 2 ], *p_sel[2],
        proj[ PAM_COL_LEN + 1 ], *p_proj[2],
        val[ 1 ][ PAM_MAX_DATA + 1 ], *p_val[2];
   int result = PAM_OK;

   strcpy( sel, "path_name=" ); strcat( sel, path_name );
   init_ptr_arr( sel, p_sel );

   strcpy( proj, "path_display");
   init_ptr_arr( proj, p_proj );

   p_val[0] = val[0];
   p_val[1] = (char*)NULL;

   p_entry = opentable( "copas", ISINPUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOWD ) == IL_SUCCESS )
   {
      /*
       * val[0] == path_display
       */
      /* get display */
      strcpy( path_display, rts(val[0]) );
   }
   else
   {
      result = (isliberr == ENOREC || isliberr == EENDFILE ?
                P_INV_PATH_NAME : isliberr);
   }

   dprintf(( "PPgp_display: path_display = [%s] result = [%d]\n",
                                    path_display, result ));
   return result;
}

/* ***************************************************************
 *
 *  (C) Copyright by Foxboro Company 1988
 *
 *  All rights reserved: Foxboro Company 1988
 *
 **&1**************************************************************
 *
 * NAME              : PPgp_key
 *
 * FUNCTION          : Get path key.
 *
 * INPUT PARAMETERS  : char *requestor;
 *                     char *path_name;
 *
 * OUTPUT PARAMETERS : char *key;
 *
 * RETURN CODES      : PAM_OK
 *                     P_INV_PATH_NAME
 *                     P_NOT_OWNER
 *                     P_NOT_SELECTED
 *
 * SYNOPSIS          : PPgp_key( requestor, path_name, key )
 *
 * PRECONDITIONS     :
 *
 * COMPONENT HISTORY :
 *
 *************************************************************** */

int PPgp_key( requestor, path_name, key )
char *requestor,
     *path_name,
     *key;
{
   P_ISAM_ENTRY p_entry,
                opentable();
   char sel[ PAM_COL_LEN + PATH_NAME_SIZE + 2 ], *p_sel[2],
        proj[ 2 * PAM_COL_LEN + 2 ], *p_proj[3],
        val[ 2 ][ PAM_MAX_DATA + 1 ], *p_val[3];
   int result = PAM_OK,
       i;

   strcpy( sel, "path_name=" ); strcat( sel, path_name );
   init_ptr_arr( sel, p_sel );
```

```
    strcpy( proj, "owner@key");
    init_ptr_arr( proj, p_proj );

    for ( i = 0; i < 2; i++ )
       p_val[i] = val[i];

    p_val[2] = (char*)NULL;

    p_entry = opentable( "copas", ISINPUT + ISMANULOCK );

    if ( p_entry != (P_ISAM_ENTRY)NULL
       && opencursor( p_entry, p_sel, p_proj, IL_TOP ) == IL_SUCCESS
       && fetchcursor( p_entry, p_val, IL_FOWD ) == IL_SUCCESS )
    {
       /*
        * val[0] == owner
        * val[1] == key
        */
       if ( strlen( rts(val[0]) ) != 0 )
       {
          if ( !strcmp( requestor, rts(val[0]) ) )
          {
             /* get key */
             strcpy( key, rts(val[1]) );
          }
          else
          {
             result = P_NOT_OWNER;
          }
       }
       else
       {
          result = P_NOT_SELECTED;
       }
    }
    else
    {
       result = (isliberr == ENOREC || isliberr == EENDFILE ?
                P_INV_PATH_NAME : isliberr);
    }

    dprintf(( "PPgp_key: key = [%s] result = [%d]\n",
                                         key, result ));
    return result;
}

/* ****************************************************************
 *
 *  (C) Copyright by Foxboro Company 1988
 *
 *  All rights reserved: Foxboro Company 1988
 *
 **&1**************************************************************
 *
 * NAME               : PPgp_owner
 *
 * FUNCTION           : Get path owner.
 *
 * INPUT PARAMETERS   : char *path_name;
 *
 * OUTPUT PARAMETERS  : char *owner;
 *
 * RETURN CODES       : PAM_OK
 *                      P_INV_PATH_NAME
 *                      P_NOT_SELECTED
 *
 * SYNOPSIS           : PPgp_owner( path_name, owner )
 *
 * PRECONDITIONS      :
 *
 * COMPONENT HISTORY :
 *
 ***************************************************************** */

int PPgp_owner( path_name, owner )
char *path_name,
     *owner;
{
   P_ISAM_ENTRY p_entry,
                opentable();
   char sel[ PAM_COL_LEN + PATH_NAME_SIZE + 2 ], *p_sel[2],
        proj[ PAM_COL_LEN + 1 ], *p_proj[2],
        val[ 1 ][ PAM_MAX_DATA + 1 ], *p_val[2];
   int result = PAM_OK;
```

```
   strcpy( sel, "path_name=" ); strcat( sel, path_name );
   init_ptr_arr( sel, p_sel );

   strcpy( proj, "owner");
   init_ptr_arr( proj, p_proj );

   p_val[0] = val[0];
   p_val[1] = (char*)NULL;

   p_entry = opentable( "copas", ISINPUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOWD ) == IL_SUCCESS )
   {
      /*
       * val[0] == owner.

       */
      if ( strlen( rts(val[0]) ) != 0 )
      {
         /* get owner */
         strcpy( owner, rts(val[0]) );
      }
      else
      {
         result = P_NOT_SELECTED;
      }

   }
   else
   {
      result = (isliberr == ENOREC || isliberr == EFNDFILE ?
               P_INV_PATH_NAME : isliberr);
   }

   dprintf(( "PPgp_owner: owner = [%s] result = [%d]\n",
                                    owner, result ));
   return result;
}


/* ***************************************************************
 *
 *  (C) Copyright by Foxboro Company 1988
 *
 *  All rights reserved: Foxboro Company 1988
 *
 **&1**************************************************************
 *
 * NAME              : PPgp_status
 *
 * FUNCTION          : Get path status.
 *
 * INPUT PARAMETERS  : char *path_name;
 *
 * OUTPUT PARAMETERS : char *path_status;
 *
 * RETURN CODES      : PAM_OK
 *                     P_INV_PATH_NAME
 *
 * SYNOPSIS          : int PPgp_status( path_name, path_status )
 *
 * PRECONDITIONS     :
 *
 * COMPONENT HISTORY :
 *
 **************************************************************** */

int PPgp_status( path_name, path_status )
char *path_name,
     *path_status;
{
   P_ISAM_ENTRY p_entry,
                opentable();
   char sel[ PAM_COL_LEN + PATH_NAME_SIZE + 2 ], *p_sel[2],
        proj[ PAM_COL_LEN + 1 ], *p_proj[2],
        val[ 1 ][ PAM_MAX_DATA + 1 ], *p_val[2];
   int result = PAM_OK;

   strcpy( sel, "path_name=" ); strcat( sel, path_name );
   init_ptr_arr( sel, p_sel );

   strcpy( proj, "path_status");
   init_ptr_arr( proj, p_proj );
```

```
   p_val[0] = val[0];
   p_val[1] = (char*)NULL;

   p_entry = opentable( "copas", ISINPUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOWD ) == IL_SUCCESS )
   {
      /*
       * val[0] == path_status
       */
      /* get status */
      *path_status = val[0][0];
   }
   else
   {
      result = (isliberr == ENOREC || isliberr == EENDFILE ?
                P_INV_PATH_NAME : isliberr);
   }

   dprintf(( "PPgp_status: path_status = [%c] result = [%d]\n",
                                        *path_status, result ));
   return result;
}


/* ****************************************************************
 *
 *  (C) Copyright by Foxboro Company 1988
 *
 *  All rights reserved: Foxboro Company 1988
 *
 **&1***************************************************************
 *
 * NAME              : PPgs_criterion
 *
 * FUNCTION          : Get selection criterion.
 *
 * INPUT PARAMETERS  : char *path_name;
 *                     char *crit_name;
 *
 * OUTPUT PARAMETERS : char *crit_value;
 *
 * RETURN CODES      : PAM_OK
 *                     P_INV_PATH_NAME
 *                     P_INV_CRIT_NAME
 *
 * SYNOPSIS          : int PPgs_criterion( path_name, crit_name, crit_value )
 *
 * PRECONDITIONS     :
 *
 * COMPONENT HISTORY :
 *
 **************************************************************** */

int PPgs_criterion( path_name, crit_name, crit_value )
char *path_name,
     *crit_name,
     *crit_value;
{
   P_ISAM_ENTRY p_entry,
                opentable();
   char sel[ PAM_COL_LEN + PATH_NAME_SIZE + 2 ], *p_sel[2],
        proj[ PAM_COL_LEN + 1 ], *p_proj[2],
        val[ 1 ][ PAM_MAX_DATA + 1 ], *p_val[2];
   int result,
       i;

   result = !PAM_OK;
   for ( i = 0 ; i < MAX_SC ; i++ )
   {    /* test for valid crit_name */
      if ( !strcmp( crit_name, sc_specs[i].name ) )
      {
         result = PAM_OK;
         break;    /* out of for loop */
      }
   }
   if ( result != PAM_OK )
   {
      result = P_INV_CRIT_NAME;
      return result;
   }
```

```
    strcpy( sel, "path_name=" ); strcat( sel, path_name );
    init_ptr_arr( sel, p_sel );

    strcpy( proj, crit_name );
    init_ptr_arr( proj, p_proj );

    p_val[0] = val[0];
    p_val[1] = (char*)NULL;

    p_entry = opentable( "copas", ISINPUT + ISMANULOCK );

    if ( p_entry != (P_ISAM_ENTRY)NULL
       && opencursor( p_entry, p_sel, p_proj, IL_TOP ) == IL_SUCCESS
       && fetchcursor( p_entry, p_val, IL_FOWD ) == IL_SUCCESS )
    {
        /*
         * val[0] == criterion value
         */

        /* get crit_val */
        strcpy( crit_val, rts(val[0]) );
    }
    else
    {
       result = (isliberr == ENOREC || isliberr == EENDFILE ?
                P_INV_PATH_NAME : isliberr);
    }

    dprintf(( "PPgs_criterion: crit_val = [%s] result = [%d]\n",
                                      crit_val, result ));
    return result;
}

#*************************************************************************
#  @(#)psrs.mk  1.4  I/A Series  Foxboro Company  89/08/17
#*************************************************************************
#                                                                        *
#  Copyright by the Foxboro Company 1988                                 *
#                                                                        *
#  All rights reserved Foxboro Company 1988                              *
#                                                                        *
#*************************************************************************
#                                                                        *
#  FILE NAME         : psrs.mk                                           *
#                                                                        *
#  PART NUMBER       :                                                   *
#                                                                        *
#  FUNCTION          :                                                   *
#                                                                        *
#  COMPONENT HISTORY :                                                   *
#  ------------------------------------------------------------------   *
#  20 SEP 1988 - AAM - created                                           *
#                                                                        *
#*************************************************************************

#*************************************************************************
#                                                                        *
#                        Directory Macros                                *
#                                                                        *
#*************************************************************************
PREFIX       = /usr/pam
BINDIR       = $(PREFIX)/bin/
HDRDIR       = $(PREFIX)/header/
LIBDIR       = $(PREFIX)/lib/
OBJDIR       = $(PREFIX)/psrs/obj/
SRCDIR       = $(PREFIX)/psrs/source/

#*************************************************************************
#                                                                        *
#                        File Macros                                     *
#                                                                        *
#*************************************************************************
H_FILES        = $(HDRDIR)pam_com.h \
                 $(HDRDIR)pam_err.h \
                 $(HDRDIR)pam_gen.h \
                 $(HDRDIR)pam_log.h \
                 $(HDRDIR)pam_msg.h \
                 $(HDRDIR)pam_rpt.h \
                 $(HDRDIR)psrs.h    \
                 $(HDRDIR)seldef.h
```

```
#..............................................................
#                                                             .
#                  Make Rules                                 .
#                                                             .
#..............................................................
$(LIBDIR)psrs.a:        $(OBJDIR)get_par.o \
                        $(OBJDIR)set_par.o \
                        $(OBJDIR)strip.o \
                        $(OBJDIR)tst_double.o \
                        $(OBJDIR)tst_float.o \
                        $(OBJDIR)tst_bool.o \
                        $(OBJDIR)tst_int.o \
                        $(OBJDIR)tst_long.o \
                        $(OBJDIR)tst_string.o \
                        $(OBJDIR)acc.o \
                        $(OBJDIR)a000.o \
                        $(OBJDIR)a001.o \
                        $(OBJDIR)a003.o \
                        $(OBJDIR)a020.o \
                        $(OBJDIR)a030.o \
                        $(OBJDIR)a031.o \
                        $(OBJDIR)a110.o \
                        $(OBJDIR)a111.o \
                        $(OBJDIR)a112.o \
                        $(OBJDIR)a113.o \
                        $(OBJDIR)a210.o \
                        $(OBJDIR)a211.o \
                        $(OBJDIR)a310.o \
                        $(OBJDIR)a311.o \
                        $(OBJDIR)a410.o \
                        $(OBJDIR)a411.o \
                        $(OBJDIR)a520.o \
                        $(OBJDIR)a530.o \
                        $(OBJDIR)a900.o \
                        $(OBJDIR)a901.o \
                        $(OBJDIR)a902.o \
                        $(OBJDIR)a903.o \
                        $(OBJDIR)a904.o \
                        $(OBJDIR)a905.o \
                        $(OBJDIR)a910.o
                        ar rv $@ $?
                        ranlib $@

$(OBJDIR)get_par.o:     $(H_FILES) $(SRCDIR)get_par.c
                        cc -c $(DEBUG) -I$(HDRDIR) $(SRCDIR)get_par.c
                        mv get_par.o $(OBJDIR)

$(OBJDIR)set_par.o:     $(H_FILES) $(SRCDIR)set_par.c
                        cc -c $(DEBUG) -I$(HDRDIR) $(SRCDIR)set_par.c
                        mv set_par.o $(OBJDIR)

$(OBJDIR)strip.o:       $(H_FILES) $(SRCDIR)strip.c
                        cc -c $(DEBUG) -I$(HDRDIR) $(SRCDIR)strip.c
                        mv strip.o $(OBJDIR)

$(OBJDIR)tst_double.o:  $(H_FILES) $(SRCDIR)tst_double.c
                        cc -c $(DEBUG) -I$(HDRDIR) $(SRCDIR)tst_double.c
                        mv tst_double.o $(OBJDIR)

$(OBJDIR)tst_float.o:   $(H_FILES) $(SRCDIR)tst_float.c
                        cc -c $(DEBUG) -I$(HDRDIR) $(SRCDIR)tst_float.c
                        mv tst_float.o $(OBJDIR)
$(OBJDIR)tst_bool.o:    $(H_FILES) $(SRCDIR)tst_bool.c
                        cc -c $(DEBUG) -I$(HDRDIR) $(SRCDIR)tst_bool.c
                        mv tst_bool.o $(OBJDIR)

$(OBJDIR)tst_int.o:     $(H_FILES) $(SRCDIR)tst_int.c
                        cc -c $(DEBUG) -I$(HDRDIR) $(SRCDIR)tst_int.c
                        mv tst_int.o $(OBJDIR)

$(OBJDIR)tst_long.o:    $(H_FILES) $(SRCDIR)tst_long.c
                        cc -c $(DEBUG) -I$(HDRDIR) $(SRCDIR)tst_long.c
                        mv tst_long.o $(OBJDIR)

$(OBJDIR)tst_string.o:  $(H_FILES) $(SRCDIR)tst_string.c
                        cc -c $(DEBUG) -I$(HDRDIR) $(SRCDIR)tst_string.c
                        mv tst_string.o $(OBJDIR)

$(OBJDIR)acc.o:         $(H_FILES) $(HDRDIR)seltab.h $(SRCDIR)acc.c
                        cc -c $(DEBUG) -I$(HDRDIR) $(SRCDIR)acc.c
                        mv acc.o $(OBJDIR)

$(OBJDIR)a000.o:        $(H_FILES) $(SRCDIR)a000.c
                        cc -c $(DEBUG) -I$(HDRDIR) $(SRCDIR)a000.c
                        mv a000.o $(OBJDIR)
```

```
$(OBJDIR)a001.o:        $(H_FILES) $(SRCDIR)a001.c
                        cc -c $(DEBUG) -I$(HDRDIR) $(SRCDIR)a001.c
                        mv a001.o $(OBJDIR)

$(OBJDIR)a003.o:        $(H_FILES) $(SRCDIR)a003.c
                        cc -c $(DEBUG) -I$(HDRDIR) $(SRCDIR)a003.c
                        mv a003.o $(OBJDIR)

$(OBJDIR)a020.o:        $(H_FILES) $(SRCDIR)a020.c
                        cc -c $(DEBUG) -I$(HDRDIR) $(SRCDIR)a020.c
                        mv a020.o $(OBJDIR)

$(OBJDIR)a030.o:        $(H_FILES) $(SRCDIR)a030.c
                        cc -c $(DEBUG) -I$(HDRDIR) $(SRCDIR)a030.c
                        mv a030.o $(OBJDIR)

$(OBJDIR)a031.o:        $(H_FILES) $(SRCDIR)a031.c
                        cc -c $(DEBUG) -I$(HDRDIR) $(SRCDIR)a031.c
                        mv a031.o $(OBJDIR)

$(OBJDIR)a110.o:        $(H_FILES) $(SRCDIR)a110.c
                        cc -c $(DEBUG) -I$(HDRDIR) $(SRCDIR)a110.c
                        mv a110.o $(OBJDIR)

$(OBJDIR)a111.o:        $(H_FILES) $(SRCDIR)a111.c
                        cc -c $(DEBUG) -I$(HDRDIR) $(SRCDIR)a111.c
                        mv a111.o $(OBJDIR)

$(OBJDIR)a112.o:        $(H_FILES) $(SRCDIR)a112.c
                        cc -c $(DEBUG) -I$(HDRDIR) $(SRCDIR)a112.c
                        mv a112.o $(OBJDIR)
$(OBJDIR)a113.o:        $(H_FILES) $(SRCDIR)a113.c
                        cc -c $(DEBUG) -I$(HDRDIR) $(SRCDIR)a113.c
                        mv a113.o $(OBJDIR)

$(OBJDIR)a210.o:        $(H_FILES) $(SRCDIR)a210.c
                        cc -c $(DEBUG) -I$(HDRDIR) $(SRCDIR)a210.c
                        mv a210.o $(OBJDIR)

$(OBJDIR)a211.o:        $(H_FILES) $(SRCDIR)a211.c
                        cc -c $(DEBUG) -I$(HDRDIR) $(SRCDIR)a211.c
                        mv a211.o $(OBJDIR)

$(OBJDIR)a310.o:        $(H_FILES) $(SRCDIR)a310.c
                        cc -c $(DEBUG) -I$(HDRDIR) $(SRCDIR)a310.c
                        mv a310.o $(OBJDIR)

$(OBJDIR)a311.o:        $(H_FILES) $(SRCDIR)a311.c
                        cc -c $(DEBUG) -I$(HDRDIR) $(SRCDIR)a311.c
                        mv a311.c $(OBJDIR)

$(OBJDIR)a410.o:        $(H_FILES) $(SRCDIR)a410.c
                        cc -c $(DEBUG) -I$(HDRDIR) $(SRCDIR)a410.c
                        mv a410.o $(OBJDIR)

$(OBJDIR)a411.o:        $(H_FILES) $(SRCDIR)a411.c
                        cc -c $(DEBUG) -I$(HDRDIR) $(SRCDIR)a411.c
                        mv a411.o $(OBJDIR)

$(OBJDIR)a520.o:        $(H_FILES) $(SRCDIR)a520.c
                        cc -c $(DEBUG) -I$(HDRDIR) $(SRCDIR)a520.c
                        mv a520.o $(OBJDIR)

$(OBJDIR)a530.o:        $(H_FILES) $(SRCDIR)a530.c
                        cc -c $(DEBUG) -I$(HDRDIR) $(SRCDIR)a530.c
                        mv a530.o $(OBJDIR)

$(OBJDIR)a900.o:        $(H_FILES) $(SRCDIR)a900.c
                        cc -c $(DEBUG) -I$(HDRDIR) $(SRCDIR)a900.c
                        mv a900.o $(OBJDIR)

$(OBJDIR)a901.o:        $(H_FILES) $(SRCDIR)a901.c
                        cc -c $(DEBUG) -I$(HDRDIR) $(SRCDIR)a901.c
                        mv a901.o $(OBJDIR)

$(OBJDIR)a902.o:        $(H_FILES) $(SRCDIR)a902.c
                        cc -c $(DEBUG) -I$(HDRDIR) $(SRCDIR)a902.c
                        mv a902.o $(OBJDIR)

$(OBJDIR)a903.o:        $(H_FILES) $(SRCDIR)a903.c
                        cc -c $(DEBUG) -I$(HDRDIR) $(SRCDIR)a903.c
                        mv a903.o $(OBJDIR)

$(OBJDIR)a904.o:        $(H_FILES) $(SRCDIR)a904.c
                        cc -c $(DEBUG) -I$(HDRDIR) $(SRCDIR)a904.c
                        mv a904.o $(OBJDIR)
```

```
$(OBJDIR)a905.o:        $(H_FILES) $(SRCDIR)a905.c
                        cc -c $(DEBUG) -I$(HDRDIR) $(SRCDIR)a905.c
                        mv a905.o $(OBJDIR)

$(OBJDIR)a910.o:        $(H_FILES) $(SRCDIR)a910.c
                        cc -c $(DEBUG) -I$(HDRDIR) $(SRCDIR)a910.c
                        mv a910.o $(OBJDIR)

/*****************************************************************
 * @(#)a000.c   1.2  New System, Foxboro Company  8/17/89
 *****************************************************************
 *                                                               *
 *  (C) Copyright by Foxboro Company 1986                        *
 *                                                               *
 *  All rights reserved: Foxboro Company 1986                    *
 *                                                               *
 **$0*************************************************************
 *                                                               *
 * FILE ID            : a000.c                                   *
 *                                                               *
 * PART NUMBER        :                                          *
 *                                                               *
 * FUNCTION           : Data Base Access.                        *
 *                                                               *
 * COMPONENT HISTORY  :                                          *
 * ------------------------------------------------------------- *
 * 15 OCT 88  AAM, creation                                      *
 *                                                               *
 *****************************************************************/

/*******************************************************/
/*******************************************************/
#include        <stdio.h>
#include        <string.h>
#include        <isam.h>
#include        <fox/pream.h>
#include        <pam_com.h>
#include        <psrs.h>

/*******************************************************/
/* External functions.                                 */
/*******************************************************/

char *strip_sp();

/*******************************************************/
/*******************************************************/
extern P_ISAM_ENTRY copas_entry;

extern char path_env[ST_FLD_SZ +1];

extern char xap_name[UE_LEN +1];

/*****************************************************************/
/*
 *  (C) Copyright by Foxboro Company 1986
 *
 *  All rights reserved: Foxboro Company 1986
 *
 **$1**************************************************************
 *
 * NAME               : A000_r_COPAS
 *
 * FUNCTION           : Read the first valid COPAS record.
 *
 * INPUT PARAMETERS   : path_name  - path_name for the COPAS
 *
 * OUTPUT PARAMETERS  :
 *
 * RETURN VALUE       : PAM_OK     - valid COPAS read
 *                      NOT PAM_OK - No valid record or error
 *
 * SYNOPSIS           : int A000_r_COPAS( path_name )
 *                      char *path_name;
 *
 * COMPONENT HISTORY :
 * --------------------------------------------------------------
 * 15 OCT 88  AAM, creation
 *
 *****************************************************************/

int A000_r_COPAS( path_name )

char *path_name;
```

```
{
   int res;
   char *sel[2], *proj[2], *val_read[2];
   char temp[MAX_VAL +1];

   dprintf(("**** A000 ****\n"));

   strcpy( temp, "path_name=" );
   strcat( temp, path_name );

   sel[0]       = temp;
   sel[1]       = (char *) NULL;
   proj[0]      = "path_environment";
   proj[1]      = (char *) NULL;
   val_read[0]  = path_env;
   val_read[1]  = (char *) NULL;

   res = opencursor( copas_entry, sel, proj, IL_TOP );
   if( res != IL_SUCCESS )
   {
      if( isliberr != ENOREC )
      {
         PPerr_rpt( PAM, isliberr, xap_name, "A000 - opencursor" );
      }

         return( !PAM_OK );
      }

      res = fetchcursor( copas_entry, val_read, IL_FOWD );

      if( res != IL_SUCCESS )
      {
         if( isliberr != ENO_MTCH_REC && isliberr != EENDFILE )
         {
            PPerr_rpt( PAM, isliberr, xap_name, "A000 - fetchcursor" );
         }
         return( !PAM_OK );
      }

      strip_sp( val_read[0] );

      return( PAM_OK );

   }

/*****************************************************************
*  @(#)a001.c   1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**$0**************************************************************
*                                                                *
* FILE ID               : a001.c                                 *
*                                                                *
* PART NUMBER           :                                        *
*                                                                *
* FUNCTION              : Data Base Access.                      *
*                                                                *
* COMPONENT HISTORY     :                                        *
* -------------------------------------------------------------  *
* 15 OCT 88  AAN, creation                                       *
* 05 JAN 89  AAN                                                 *
*                                                                *
*****************************************************************/

/*********************************************************/
/*********************************************************/
#include        <stdio.h>
#include        <string.h>
#include        <isam.h>
#include        <fox/pream.h>
#include        <pam_com.h>
#include        <psrs.h>

/*********************************************************/
/* External functions.                                  */
/*********************************************************/

char *strip_sp();

/*********************************************************/
/*********************************************************/
```

```
extern int num_sc;

extern P_ISAM_ENTRY copas_entry;

extern SC_SPEC sc_specs[];
extern SC_VAL  sc_vals[];

extern char xap_name[UE_LEN +1];


/*****************************************************************/
/*
 *  (C) Copyright by Foxboro Company 1986
 *
 *  All rights reserved: Foxboro Company 1986
 *
 **&1*************************************************************
 *
 * NAME              : A001_r_COPAS
 *
 * FUNCTION          : Read first valid COPAS record as determined by
 *                     environment and selection criteria.
 *
 * INPUT PARAMETERS  : env   - path environent
 *
 * OUTPUT PARAMETERS : copas - record attributes read
 *
 * RETURN VALUE      :     PAM_OK - valid record read
 *                     NOT PAM_OK - no valid record or error occurred
 *
 * SYNOPSIS          : int A001_r_COPAS( env, copas )
 *                     char *env;
 *                     P_REC_COPAS copas;
 *
 * COMPONENT HISTORY :
 * ---------------------------------------------------------------
 * 15 OCT 88  AAM, creation
 * 05 JAN 89  AAM, path_excep_type attribute addeD
 *
 *****************************************************************/

int A001_r_COPAS( env, copas )

char *env;
P_REC_COPAS copas;

{
   int i, res;
   char *sel[2], *proj[NUM_RC_ATTR + MAX_SPEC_SC +1];
   char temp[MAX_VAL +1];

   dprintf(("**** A001 ****\n"));

   strcpy( temp, "path_environment=" );
   strcat( temp, env );

   sel[0]      = temp;
   sel[1]      = (char *) NULL;

   proj[0]     = "path_name";
   proj[1]     = "owner";
   proj[2]     = "path_status";
   proj[3]     = "operation_mode";
   proj[4]     = "auto_failsafe";
   proj[5]     = "path_excep_proc";
   proj[6]     = "path_excep_type";
   proj[7]     = "init_pattern";
   proj[8]     = "fail_pattern";
   proj[9]     = "alarm_ref";

   /* Add specified selection criteria to the list. */
   for( i = 0; i < num_sc; i++ )
      proj[NUM_RC_ATTR + i] = sc_specs[ sc_vals[i].idx ].name;

   proj[NUM_RC_ATTR + i] = (char *) NULL;

   res = opencursor( copas_entry, sel, proj, IL_TOP );

   if( res != IL_SUCCESS )
   {
      if( isliberr != ENOREC )
      {
         PPerr_rpt( PAM, isliberr, xap_name, "A001 - opencursor" );
      }
      return( !PAM_OK );
```

```
    }

    if( A003_n_COPAS( copas ) != PAM_OK )
    {
        return( !PAM_OK );
    }

    return( PAM_OK );
}

/*****************************************************************
 * @(#)a003.c   1.2  New System, Foxboro Company  8/17/89
 *****************************************************************
 *                                                               *
 *  (C) Copyright by Foxboro Company 1986                        *
 *                                                               *
 *  All rights reserved: Foxboro Company 1986                    *
 *                                                               *
 **a0*************************************************************
 *                                                               *
 * FILE ID            : a003.c                                   *
 *                                                               *
 * PART NUMBER        :                                          *
 *                                                               *
 * FUNCTION           : Data Base Access.                        *
 *                                                               *
 * COMPONENT HISTORY  :                                          *
 * ------------------------------------------------------------  *
 * 15 OCT 88  AAM, creation                                      *
 * 05 JAN 89  AAM                                                *
 *                                                               *
 *****************************************************************/

#include        <stdio.h>
#include        <string.h>
#include        <isam.h>
#include        <fox/pream.h>
#include        <pam_com.h>
#include        <psrs.h>

/*********************************************************/
/* External functions.                                  */
/*********************************************************/

char *strip_sp();
long atol();
double atof();

/*********************************************************/
/*********************************************************/
extern char xap_name[UE_LEN +1];

extern P_ISAM_ENTRY copas_entry;

extern int num_sc;

extern SC_VAL  sc_vals[];

extern SC_SPEC sc_specs[];

extern char sc_db_vals[MAX_SPEC_SC][MAX_VAL +1];


/*****************************************************************/
/*
 *  (C) Copyright by Foxboro Company 1986
 *
 *  All rights reserved: Foxboro Company 1986
 *
 **a1**************************************************************
 *
 * NAME               : A003_n_COPAS
 *
 * FUNCTION           : Read next valid COPAS record.
 *
 * INPUT PARAMETERS   :
 *
 * OUTPUT PARAMETERS  : copas  - copas attributes
 *
 * RETURN VALUE       :     PAM_OK - valid record read
 *                      NOT PAM_OK - no valid record or error occurred
 *
 * SYNOPSIS           : int A003_n_COPAS( copas )
 *                      P_REC_COPAS copas
 *
```

```
 * COMPONENT HISTORY :
 * ----------------------------------------------------------------
 * 15 OCT 88  AAM, creation
 * 05 JAN 89  AAM, path_excep_type attribute added
 *
 *****************************************************************/

int A003_n_COPAS( copas )

P_REC_COPAS copas;

{
   int i, res;
   char *val_read[NUM_RC_ATTR + MAX_SC +1];

   dprintf(("**** A003 ****\n"));

   val_read[0] = copas->path_name;
   val_read[1] = copas->owner;
   val_read[2] = copas->path_status;
   val_read[3] = copas->operation;
   val_read[4] = copas->auto_failsafe;
   val_read[5] = copas->path_excep_proc;
   val_read[6] = copas->pep_type;
   val_read[7] = copas->init_pattern;
   val_read[8] = copas->fail_pattern;
   val_read[9] = copas->alarm_ref;

   for( i = 0; i< num_sc; i++ )
      val_read[NUM_RC_ATTR + i] = sc_db_vals[i];

   val_read[NUM_RC_ATTR + num_sc] = (char *) NULL;

   res = fetchcursor( copas_entry, val_read, IL_FOWD );

   while( res == IL_SUCCESS )
   {
      /* Remove trailing spaces from values read. */
      for( i = 0; i < NUM_RC_ATTR + num_sc; i++ )
         strip_sp( val_read[i] );

      if( strcmp( copas->owner      , ""         ) == 0 &&
          copas->path_status[0] == SELECTABLE          &&
          mtch_sel_crit() == TRUE                        )
      {
         return( PAM_OK );
      }

      res = fetchcursor( copas_entry, val_read, IL_FOWD );
   }

   if( isliberr != ENO_MTCH_REC && isliberr != EENDFILE )
   {
      PPerr_rpt( PAM, isliberr, xap_name, "A003 - fetchcursor" );
   }

   return( !PAM_OK );

}

/*************************************************************/
/*************************************************************/
int mtch_sel_crit()

{
   int i, res;

   for( i = 0; i < num_sc; i++ )
   {
      switch( sc_specs[ sc_vals[i].idx ].type )   /* type */
      {
         case CHARTYPE:
               res = tst_string( sc_vals[i].oper,
                                 sc_db_vals[i],
                                 sc_vals[i].val.s );

               break;

         case INTTYPE:
               res = tst_int(  sc_vals[i].oper,
                               atoi( sc_db_vals[i] ),
                               sc_vals[i].val.i );

               break;
```

```
        case LONGTYPE:
             res = tst_long( sc_vals[i].oper,
                                  atol( sc_db_vals[i] ),
                                  sc_vals[i].val.l );

             break;

        case FLOATTYPE:
             res = tst_float( sc_vals[i].oper,
                                  (float) atof( sc_db_vals[i] ),
                                  sc_vals[i].val.f );

             break;

        case DOUBLETYPE:
             res = tst_double( sc_vals[i].oper,
                                  atof( sc_db_vals[i] ),
                                  sc_vals[i].val.d );

             break;

      }

      if( res == FALSE )
          return( FALSE );

   }

   return( TRUE );
}

/*****************************************************************
*  @(#)a020.c   1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**a0**************************************************************
*                                                                *
* FILE ID             : a020.c                                   *
*                                                                *
* PART NUMBER         :                                          *
*                                                                *
* FUNCTION            : Data Base Access.                        *
*                                                                *
* COMPONENT HISTORY   :                                          *
* -------------------------------------------------------------- *
* 15 OCT 88  AAM, creation                                       *
*                                                                *
*****************************************************************/

#include        <stdio.h>
#include        <string.h>
#include        <isam.h>
#include        <fox/pream.h>
#include        <pam_com.h>
#include        <psrs.h>

/*************************************************************/
/*************************************************************/

char *strip_sp();

/*************************************************************/
/*************************************************************/
extern P_ISAM_ENTRY copas_entry;

extern char path_env[ST_FLD_SZ +1];

extern char xap_name[UE_LEN +1];

/*****************************************************************/
/*
 *  (C) Copyright by Foxboro Company 1986
 *
 *  All rights reserved: Foxboro Company 1986
 *
 **a1**************************************************************
 *
 * NAME               : A020_r1_COPAS
 *
 * FUNCTION           : Read first valid COPAS record and lock.
```

```
 *
 * INPUT PARAMETERS  : path_name   - name of path
 *                     clm0        - attribute 0 name to be retrieved
 *                     clm1        - attribute 1 name to be retrieved
 *
 * OUTPUT PARAMETERS : val0        - retrieved value 0
 *                     val1        - retrieved value 1
 *
 * RETURN VALUE      :      PAM_OK - valid record read
 *                     NOT PAM_OK - no valid record or error occurred
 *
 * SYNOPSIS          : int A020_rl_COPAS( path_name, clm0, clm1,
 *                                        val0, val1 )
 *                     char *path_name, *clm0, *clm1, *val0, *val1;
 *
 * COMPONENT HISTORY :
 * -------------------------------------------------------------------
 * 15 OCT 88  AAM, creation
 *
 ********************************************************************/

int A020_rl_COPAS( path_name, clm0, clm1, val0, val1 )

char *path_name, *clm0, *clm1, *val0, *val1;

{
   int res;
   char *sel[2], *proj[4], *val_read[4];
   char temp[MAX_VAL +1];

   dprintf(("**** A020 ****\n"));

   strcpy( temp, "path_name=" );
   strcat( temp, path_name );

   sel[0]      = temp;
   sel[1]      = (char *) NULL;
   proj[0]     = "path_environment";
   proj[1]     = clm0;
   proj[2]     = clm1;
   proj[3]     = (char *) NULL;
   val_read[0] = path_env;
   val_read[1] = val0;
   val_read[2] = val1;
   val_read[3] = (char *) NULL;

   res = IL_SUCCESS != opencursor( copas_entry, sel, proj, IL_TOP );
   if( res != IL_SUCCESS )
   {
      if( isliberr != ENOREC )
      {
         PPerr_rpt( PAM, isliberr, xap_name, "A020 - opencursor" );
      }
      return( !PAM_OK );
   }

   res = fetchcursor( copas_entry, val_read, IL_FOWD );

   if( res != IL_SUCCESS )
   {
      if( res != ENO_MTCH_REC && isliberr != EENDFILE )
      {
         PPerr_rpt( PAM, isliberr, xap_name, "A020 - fetchcursor" );
      }
      return( !PAM_OK );
   }

   strip_sp( val_read[0] );
   strip_sp( val_read[1] );
   strip_sp( val_read[2] );

   return( PAM_OK );

}

/*******************************************************************
 * @(#)a030.c   1.2  New System, Foxboro Company  8/17/89
 *******************************************************************
 *                                                                 *
 * (C) Copyright by Foxboro Company 1986                           *
 *                                                                 *
 * All rights reserved: Foxboro Company 1986                       *
 *                                                                 *
 **80**************************************************************
 *                                                                 *
```

```
* FILE ID            .: a030.c                                  *
*                                                                *
* PART NUMBER        :                                           *
*                                                                *
* FUNCTION           : Data Base Access.                         *
*                                                                *
* COMPONENT HISTORY  :                                           *
* -------------------------------------------------------------- *
* 15 OCT 88  AAM, creation                                       *
*                                                                *
******************************************************************/

#include        <stdio.h>
#include        <string.h>
#include        <isam.h>
#include        <fox/pream.h>
#include        <pam_com.h>
#include        <psis.h>

/*********************************************************/
/*********************************************************/

char *strip_sp();

/*********************************************************/
/*********************************************************/
extern P_ISAM_ENTRY copas_entry;

extern char xap_name[UE_LEN +1];

/*****************************************************************/
/*
 *  (C) Copyright by Foxboro Company 1986
 *
 *  All rights reserved: Foxboro Company 1986
 *
 **&1**************************************************************
 *
 * NAME               : A030_ru_COPAS
 *
 * FUNCTION           : Update first valid COPAS record.
 *
 * INPUT PARAMETERS   : path_name - name of path
 *                      clm       - attribute to be updated
 *                      val       - update value for attribute
 *
 * OUTPUT PARAMETERS  :
 *
 * RETURN VALUE       :     PAM_OK - record updated
 *                      NOT PAM_OK - no valid record or error occurred
 *
 * SYNOPSIS           : int A030_ru_COPAS( path_name, clm, val )
 *                      char *path_name, *clm, *val;
 *
 * COMPONENT HISTORY :
 * ---------------------------------------------------------------
 * 15 OCT 88  AAM, creation
 *
 *****************************************************************/

int A030_ru_COPAS( path_name, clm, val )

char *path_name, *clm, *val;

{
   int res;
   char *value[2];
   char temp[MAX_VAL +1];

   dprintf(("**** A030 ****\n"));
   if( strlen( clm ) + strlen( val ) + 1 > MAX_VAL )
   {
      PPerr_rpt( PAM, PE_FATAL_ERROR, xap_name, "A030 - value size" );
   }

   if( lock_table( copas_entry ) != SUCCESS )
   {
      PPerr_rpt( PAM, isliberr, xap_name, "A030 - lock_table" );
      return( !PAM_OK );
   }

   if( PAM_OK != A000_r_COPAS( path_name ) )
   {
      res = unlock_table( copas_entry );
      if( res != IL_SUCCESS )
      {
```

```
            PPerr_rpt( PAM, isliberr, xap_name, "A030 - unlock_table" );
         }
         return( !PAM_OK );
      }

      strcpy( temp, clm );
      strcat( temp, "=" );
      strcat( temp, val );

      value[0] = temp;
      value[1] = (char *) NULL;

      res = upd_curr( copas_entry, value );
      if( res != IL_SUCCESS )
      {
         PPerr_rpt( PAM, isliberr, xap_name, "A030 - upd_curr" );

         res = unlock_table( copas_entry );
         if( res != IL_SUCCESS )
         {
            PPerr_rpt( PAM, isliberr, xap_name, "A030 - unlock_table" );
         }
         return( !PAM_OK );
      }

      res = unlock_table( copas_entry );
      if( res != IL_SUCCESS )
      {
         PPerr_rpt( PAM, isliberr, xap_name, "A030 - unlock_table" );
         return( !PAM_OK );
      }

      return( PAM_OK );

}

/*****************************************************************
*  @(#)a031.c   1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**&0**************************************************************
*                                                                *
* FILE ID              : a031.c                                  *
*                                                                *
* PART NUMBER          :                                         *
*                                                                *
* FUNCTION             : Data Base Access.                       *
*                                                                *
* COMPONENT HISTORY    :                                         *
* -------------------------------------------------------------- *
* 15 OCT 88   AAM, creation                                      *
*                                                                *
*****************************************************************/

#include        <stdio.h>
#include        <string.h>
#include        <isam.h>
#include        <fox/pream.h>
#include        <pam_com.h>
#include        <psrs.h>

/*******************************************************/
/*******************************************************/


/*******************************************************/
/*******************************************************/
extern P_ISAM_ENTRY copas_entry;

extern char xap_name[UE_LEN +1];

/******************************************************************/
/*
 *  (C) Copyright by Foxboro Company 1986
 *
 *  All rights reserved: Foxboro Company 1986
 *
 **&1**************************************************************
 *
 * NAME                 : A031_uu_COPAS
```

```
 *
 * FUNCTION           : Update current COPAS record and unlock.
 *
 * INPUT PARAMETERS   : clm0  - attribute 0 to be updated
 *                      clm1  - attribute 1 tp be updated
 *                      val0  - value for attribute 0
 *                      val1  - value for attribute 1
 *
 * OUTPUT PARAMETERS :
 *
 * RETURN VALUE       :      PAM_OK - record updated
 *                      NOT PAM_OK - error occurred
 *
 * SYNOPSIS           : int A031_uu_COPAS( clm0, clm1, val0, val1 )
 *                      char *clm0, *clm1, *val0, *val1;
 *
 * COMPONENT HISTORY :
 * ------------------------------------------------------------------
 * 15 OCT 88  AAM, creation
 *
 ****************************************************************/

int A031_uu_COPAS( clm0, clm1, val0, val1 )

char *clm0, *clm1, *val0, *val1;

{
   int res;
   char *value[3];
   char temp1[MAX_VAL +1],
        temp2[MAX_VAL +1];


   dprintf(("**** A031 ****\n"));

   strcpy( temp1, clm0 );
   strcat( temp1, "=" );
   strcat( temp1, val0 );

   strcpy( temp2, clm1 );
   strcat( temp2, "=" );
   strcat( temp2, val1 );

   value[0] = temp1;
   value[1] = temp2;
   value[2] = (char *) NULL;

   if( lock_table( copas_entry ) != SUCCESS )
   {
      PPerr_rpt( PAM, isliberr, xap_name, "A031 - lock_table" );
      return( !PAM_OK );
   }

   res = upd_curr( copas_entry, value );
   if( res != IL_SUCCESS )
   {
      PPerr_rpt( PAM, isliberr, xap_name, "A031 - upd_curr" );

      res = unlock_table( copas_entry );
      if( res != IL_SUCCESS )
      {
         PPerr_rpt( PAM, isliberr, xap_name, "A031 - unlock_table" );
      }
      return( !PAM_OK );
   }

   res = unlock_table( copas_entry );
   if( res != IL_SUCCESS )
   {
      PPerr_rpt( PAM, isliberr, xap_name, "A031 - unlock_table" );
      return( !PAM_OK );
   }

   return( PAM_OK );

}

/****************************************************************
 * @(#)a110.c   1.2  New System, Foxboro Company  8/17/89
 ****************************************************************
 *                                                              *
 * (C) Copyright by Foxboro Company 1986                        *
 *                                                              *
 * All rights reserved: Foxboro Company 1986                    *
 *                                                              *
 **SD************************************************************
```

```
 *                                                                      *
 * FILE ID             : a110.c                                         *
 *                                                                      *
 * PART NUMBER         :                                                *
 *                                                                      *
 * FUNCTION            : Data Base Access.                              *
 *                                                                      *
 * COMPONENT HISTORY   :                                                *
 * ------------------------------------------------------------------- *
 * 15 OCT 88  AAM, creation                                             *
 * 03 JAN 89  AAM, A110_r_ELEM_COND                                     *
 * 05 JAN 89  AAM, A110_r_ELEM_COND                                     *
 *                                                                      *
 ***********************************************************************/

#include        <stdio.h>
#include        <string.h>
#include        <isam.h>
#include        <fox/pream.h>
#include        <pam_com.h>
#include        <psrs.h>

/*********************************************************/
/*********************************************************/

char *strip_sp();

/*********************************************************/
/*********************************************************/
extern P_ISAM_ENTRY ec_entry;

extern char xap_name[UE_LEN +1];

/***********************************************************************/
/*
 *  (C) Copyright by Foxboro Company 1986
 *
 *  All rights reserved: Foxboro Company 1986
 *
 **$1*******************************************************************
 *
 * NAME               : A110_r_ELEM_COND
 *
 * FUNCTION           : Read first valid ELEM_COND record.
 *
 * INPUT PARAMETERS   : path_name - name of path
 *                      elem_name - name of element
 *                      cond_code - condition code spec
 *
 * OUTPUT PARAMETERS  : clm  - attribute to be retrieved
 *                      val  - value of retrieved attribute
 *
 * RETURN VALUE       :     PAM_OK - valid record read
 *                      NOT PAM_OK - no valid record or error occurred
 *
 * SYNOPSIS           : int A110_r_ELEM_COND( path_name, elem_name,
 *                                    cond_code, clm, val )
 *                      char *path_name, *elem_name, *cond_code,
 *                           *clm, *val
 *
 * COMPONENT HISTORY :
 * --------------------------------------------------------------------
 * 15 OCT 88  AAM, creation
 * 03 JAN 89  AAM, Add condition to select list !
 * 05 JAN 89  AAM, ELEM_COND index changE
 *
 ***********************************************************************/

int A110_r_ELEM_COND( path_name, elem_name, cond_code, clm, val )

char *path_name, *elem_name, *cond_code, *clm, *val;

{
   int res;
   char *sel[5], *proj[2], *val_read[2];
   char temp1[MAX_VAL +1],
        temp2[MAX_VAL +1],
        temp3[MAX_VAL +1],
        temp4[MAX_VAL +1];

   dprintf(("***** A110 ****\n"));

   strcpy( temp1, "path_name=" );
   strcat( temp1, path_name );
```

```
    strcpy( temp2, "cond_code=" );
    strcat( temp2, cond_code );

    strcpy( temp3, "elem_name=" );

    strcat( temp3, elem_name );

    strcpy( temp4, "condition=" );

    sel[0]       = temp1;
    sel[1]       = temp2;
    sel[2]       = temp3;
    sel[3]       = temp4;
    sel[4]       = (char *) NULL;
    proj[0]      = clm;
    proj[1]      = (char *) NULL;
    val_read[0] = val;
    val_read[1] = (char *) NULL;

    res = opencursor( ec_entry, sel, proj, IL_TOP );
    if( res != IL_SUCCESS )
    {
       if( isliberr != ENOREC )
       {
          PPerr_rpt( PAM, isliberr, xap_name, "A110 - opencursor" );
       }
       return( !PAM_OK );
    }

    res = fetchcursor( ec_entry, val_read, IL_FOND );

    if( res != IL_SUCCESS )
    {
       if( res != ENO_MTCH_REC && isliberr != EENDFILE )
       {
          PPerr_rpt( PAM, isliberr, xap_name, "A110 - fetchcursor" );
       }
       return( !PAM_OK );
    }

    strip_sp( val_read[0] );

    return( PAM_OK );

}

/***************************************************************
*  @(#)a111.c   1.2  New System, Foxboro Company  8/17/89
****************************************************************
*                                                              *
*  (C) Copyright by Foxboro Company 1986                       *
*                                                              *
*  All rights reserved: Foxboro Company 1986                   *
*                                                              *
**&0************************************************************
*                                                              *
* FILE ID              : a111.c                                *
*                                                              *
* PART NUMBER          :                                       *
*                                                              *
* FUNCTION             : Data Base Access.                     *
*                                                              *
* COMPONENT HISTORY    :                                       *
* ------------------------------------------------------------ *
* 15 OCT 88  AAM. creation                                     *
*                                                              *
***************************************************************/

#include        <stdio.h>
#include        <string.h>
#include        <isam.h>
#include        <fox/pream.h>
#include        <pam_com.h>
#include        <psrs.h>

/***********************************************************/
/***********************************************************/

char *strip_sp();

/***********************************************************/
/***********************************************************/
extern P_ISAM_ENTRY ec_entry;

extern char xap_name[UE_LEN +1];
```

```
/*************************************************************/
/*
 *  (C) Copyright by Foxboro Company 1986
 *
 *  All rights reserved: Foxboro Company 1986
 *
 **&1***********************************************************
 *
 * NAME              : A111_n_ELEM_COND
 *
 * FUNCTION          : read next valid ELEM_COND record
 *
 * INPUT PARAMETERS  :
 *
 * OUTPUT PARAMETERS : val - value of retrieved attribute
 *
 * RETURN VALUE      :     PAM_OK - valid record read
 *                     NOT PAM_OK - no valid record or error occurred
 *
 * SYNOPSIS          : int A111_n_ELEM_COND( val )
 *                     char *val;
 *
 * COMPONENT HISTORY :
 * ------------------------------------------------------------
 * 15 OCT 88  AAM, creation
 *
 *************************************************************/

int A111_n_ELEM_COND( val )

char *val;

{
   int res;
   char *val_read[2];

   dprintf(("**** A111 ****\n"));

   val_read[0] = val;
   val_read[1] = (char *) NULL;

   res = fetchcursor( ec_entry, val_read, IL_FOWD );

   if( res != IL_SUCCESS )
   {
      if( isliberr != ENO_MTCH_REC && isliberr != EENDFILE )
      {
         PPerr_rpt( PAM, isliberr, xap_name, "A111 - fetchcursor" );
      }
      return( !PAM_OK );
   }

   strip_sp( val_read[0] );

   return( PAM_OK );

}

/*************************************************************
 *  @(#)a112.c   1.2  New System, Foxboro Company  8/17/89
 *************************************************************
 *                                                           *
 *  (C) Copyright by Foxboro Company 1986                    *
 *                                                           *
 *  All rights reserved: Foxboro Company 1986                *
 *                                                           *
 **&0*********************************************************
 *                                                           *
 * FILE ID           : a112.c                                *
 *                                                           *
 * PART NUMBER       :                                       *
 *                                                           *
 * FUNCTION          : Data Base Access.                     *
 *                                                           *
 * COMPONENT HISTORY   :                                     *
 * --------------------------------------------------------- *
 * 15 OCT 88  AAM, creation                                  *
 * 14 DEC 88  AAM                                            *
 * 03 JAN 89  AAM                                            *
 * 05 JAN 89  AAM                                            *
 *                                                           *
 *************************************************************/
```

```
#include        <stdio.h>
#include        <string.h>
#include        <isam.h>
#include        <fox/pream.h>
#include        <pam_com.h>
#include        <psrs.h>

/*******************************************************/
/*******************************************************/

char *strip_sp();

/*******************************************************/
/*******************************************************/
extern P_ISAM_ENTRY ec_entry;

extern char xap_name[UE_LEN +1];

/*****************************************************************/
/*
 *  (C) Copyright by Foxboro Company 1986
 *
 *  All rights reserved: Foxboro Company 1986
 *
 **s1**************************************************************
 *
 * NAME              : A112_r_ELEM_COND
 *
 * FUNCTION          : Read first valid ELEM_COND record.
 *
 * INPUT PARAMETERS  : path_name - name of path
 *                     elem_name - name of element
 *                     cond_code - condition code spec
 *                     clm0      - attribute 0 to be retrieved
 *                     clm1      - attribute 1 to be retrieved
 *
 * OUTPUT PARAMETERS : val0      - value retrieved for attr 0
 *                     val1      - value retrieved for attr 1
 *
 * RETURN VALUE      :     PAM_OK - valid record read
 *                     NOT PAM_OK - no valid record or error occurred
 *
 * SYNOPSIS          : int A112_r_ELEM_COND( path_name, elem_name,
 *                             cond_code, clm0, clm1, val0, val1, db_err )
 *                     char *path_name, *elem_name, *cond_code,
 *                          *clm0, *clm1, *val0, *val1;
 *                     bool *db_err;
 *
 * COMPONENT HISTORY :
 * ---------------------------------------------------------------
 * 15 OCT 88  AAM, creation
 * 14 DEC 88  AAM, Add db_err output parameter.
 * 03 JAN 89  AAM, Add condition to selection list !
 * 05 JAN 89  AAM, ELEM_COND inde changE
 *
 *****************************************************************/

int A112_r_ELEM_COND( path_name, elem_name, cond_code,
                      clm0, clm1, val0, val1, db_err )

char *path_name, *elem_name, *cond_code, *clm0, *clm1, *val0, *val1;
bool *db_err;

{
   int res;
   char *sel[5], *proj[3], *val_read[3];
   char temp1[MAX_VAL +1],
        temp2[MAX_VAL +1],
        temp3[MAX_VAL +1],
        temp4[MAX_VAL +1];

   dprintf(("**** A112 ****\n"));

   *db_err = FALSE;

    strcpy( temp1, "path_name=" );
    strcat( temp1, path_name );

    strcpy( temp2, "cond_code=" );
    strcat( temp2, cond_code );

    strcpy( temp3, "elem_name=" );
    strcat( temp3, elem_name );

    strcpy( temp4, "condition=" );
```

```
    sel[0]      = temp1;
    sel[1]      = temp2;
    sel[2]      = temp3;
    sel[3]      = temp4;
    sel[4]      = (char *) NULL;
    proj[0]     = clm0;
    proj[1]     = clm1;
    proj[2]     = (char *) NULL;
    val_read[0] = val0;
    val_read[1] = val1;
    val_read[2] = (char *) NULL;

    res = opencursor( ec_entry, sel, proj, IL_TOP );
    if( res != IL_SUCCESS )
    {
       if( isliberr != ENOREC )
       {
          PPerr_rpt( PAM, isliberr, xap_name, "A112 - opencursor" );
          *db_err = TRUE;
       }
       return( !PAM_OK );
    }

    res = fetchcursor( ec_entry, val_read, IL_FOWD );

    if( res != IL_SUCCESS )
    {
       if( res != ENO_MTCH_REC && isliberr != EENDFILE )
       {
          PPerr_rpt( PAM, isliberr, xap_name, "A112 - fetchcursor" );
          *db_err = TRUE;
       }
       return( !PAM_OK );
    }

    strip_sp( val_read[0] );
    strip_sp( val_read[1] );

    return( PAM_OK );

}

/*******************************************************************
*  @(#)a113.c   1.2  New System, Foxboro Company  8/17/89
********************************************************************
*                                                                  *
*  (C) Copyright by Foxboro Company 1986                           *
*                                                                  *
*  All rights reserved: Foxboro Company 1986                       *
*                                                                  *
**$0****************************************************************
*                                                                  *
* FILE ID              : a113.c                                    *
*                                                                  *
* PART NUMBER          :                                           *
*                                                                  *
* FUNCTION             : Data Base Access.                         *
*                                                                  *
* COMPONENT HISTORY    :                                           *
* ---------------------------------------------------------------- *
* 15 OCT 88  AAM, creation                                         *
* 14 DEC 88  AAM                                                   *
*                                                                  *
*******************************************************************/

#include        <stdio.h>
#include        <string.h>
#include        <isam.h>
#include        <fox/pream.h>
#include        <pam_com.h>
#include        <psrs.h>

/*********************************************************/
/*********************************************************/

char *strip_sp();

/*********************************************************/
/*********************************************************/
extern P_ISAM_ENTRY ec_entry;

extern char xap_name[UE_LEN +1];
```

```
/*****************************************************************/
/*
 *  (C) Copyright by Foxboro Company 1986
 *
 *  All rights reserved: Foxboro Company 1986
 *
 **&1*************************************************************
 *
 * NAME              : A113_n_ELEM_COND
 *
 * FUNCTION          : Read next valid ELEM_COND record.
 *                     Refer to A112_r_ELEM_COND !
 *
 * INPUT PARAMETERS  :
 *
 * OUTPUT PARAMETERS : val0 - value retrieved for attr 0
 *                     val1 - value retrieved for attr 1
 *
 * RETURN VALUE      :     PAM_OK - valid record retrieved
 *                     NOT PAM_OK - no valid record or error occurred
 *
 * SYNOPSIS          : int A113_r_ELEM_COND( val0, val1, db_err )
 *                     char *val0, *val1;
 *                     bool *db_err;
 *
 * COMPONENT HISTORY :
 * ----------------------------------------------------------------
 * 15 OCT 88  AAM, creation
 * 14 DEC 88  AAM, Added db_err output parameter
 *
 *****************************************************************/

int A113_n_ELEM_COND( val0, val1, db_err )

char *val0, *val1;
bool *db_err;

{
   int res;
   char *val_read[3];

   dprintf(("**** A113 ****\n"));

   *db_err = FALSE;

   val_read[0] = val0;
   val_read[1] = val1;
   val_read[2] = (char *) NULL;

   res = fetchcursor( ec_entry, val_read, IL_FOWD );

   if( res != IL_SUCCESS )
   {
      if( isliberr != ENO_MTCH_REC && isliberr != EENDFILE )
      {
         PPerr_rpt( PAM, isliberr, xap_name, "A113 - fetchcursor" );

         *db_err = TRUE;
      }
      return( !PAM_OK );
   }

   strip_sp( val_read[0] );
   strip_sp( val_read[1] );

   return( PAM_OK );

}


/*****************************************************************
 * @(#)a210.c   1.2  New System, Foxboro Company  8/17/89
 *****************************************************************
 *                                                               *
 *  (C) Copyright by Foxboro Company 1986                        *
 *                                                               *
 *  All rights reserved: Foxboro Company 1986                    *
 *                                                               *
 **&0*************************************************************
 *                                                               *
 * FILE ID            : a210.c                                   *
 *                                                               *
 * PART NUMBER        :                                          *
 *                                                               *
 * FUNCTION           : Data Base Access.                        *
 *
```

```
* COMPONENT HISTORY   :                                              *
* ----------------------------------------------------------------- *
* 15 OCT 88  AAM, creation                                           *
*                                                                    *
*******************************************************************/

#include        <stdio.h>
#include        <string.h>
#include        <isam.h>
#include        <fox/pream.h>
#include        <pam_com.h>
#include        <psrs.h>

/*********************************************************/
/*********************************************************/

char *strip_sp();

/*********************************************************/
/*********************************************************/
extern P_ISAM_ENTRY ea_entry;

extern char xap_name[UE_LEN +1];


/******************************************************************/
/*
 *  (C) Copyright by Foxboro Company 1986
 *
 *  All rights reserved: Foxboro Company 1986
 *
 **$1**************************************************************
 *
 * NAME              : A210_r_ELEM_ALARM
 *
 * FUNCTION          : Read first valid ELEM_ALARM record.
 *
 * INPUT PARAMETERS  : path_name - name of path
 *                     elem_name - name of element
 *                     clm       - attribute to be retrieved
 *
 * OUTPUT PARAMETERS : val       - value of retrieved attribute
 *
 * RETURN VALUE      :     PAM_OK - valid record read
 *                     NOT PAM_OK - no valid record or error occurred
 *
 * SYNOPSIS          : int A210_r_ELEM_ALARM( path_name, elem_name,
 *                                             clm, val )
 *                     char *path_name, *elem_name, *clm, *val;
 *
 * COMPONENT HISTORY :
 * ---------------------------------------------------------------
 * 15 OCT 88  AAM, creation
 *
 *****************************************************************/

int A210_r_ELEM_ALARM( path_name, elem_name, clm, val )

char *path_name, *elem_name, *clm, *val;

{
   int res;
   char *sel[3], *proj[2], *val_read[2];
   char temp1[MAX_VAL +1],
        temp2[MAX_VAL +1];

   dprintf(("**** A210 ****\n"));

   strcpy( temp1, "path_name=" );
   strcat( temp1, path_name );

   strcpy( temp2, "elem_name=" );
   strcat( temp2, elem_name );

   sel[0]      = temp1;
   sel[1]      = temp2;
   sel[2]      = (char *) NULL;
   proj[0]     = clm;
   proj[1]     = (char *) NULL;
   val_read[0] = val;
   val_read[1] = (char *) NULL;
```

```
   res = opencursor( ea_entry, sel, proj, IL_TOP );
   if( res != IL_SUCCESS )
   {
      if( isliberr != ENOREC )
      {
         PPerr_rpt( PAM, isliberr, xap_name, "A210 - opencursor" );
      }
      return( !PAM_OK );
   }

   res = fetchcursor( ea_entry, val_read, IL_FOWD );

   if( res != IL_SUCCESS )
   {
      if( res != ENO_MTCH_REC && isliberr != EENDFILE )
      {
         PPerr_rpt( PAM, isliberr, xap_name, "A210 - fetchcursor" );
      }
      return( !PAM_OK );
   }

   strip_sp( val_read[0] );

   return( PAM_OK );

}

/*****************************************************************
*  @(#)a211.c   1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**$0**************************************************************
*                                                                *
* FILE ID              : a211.c                                  *
*                                                                *
* PART NUMBER          :                                         *
*                                                                *
* FUNCTION             : Data Base Access.                       *
*                                                                *
* COMPONENT HISTORY    :                                         *
* -------------------------------------------------------------  *
* 15 OCT 88  AAM, creation                                       *
*                                                                *
*****************************************************************/

#include        <stdio.h>
#include        <string.h>
#include        <isam.h>
#include        <fox/pream.h>
#include        <pam_com.h>
#include        <psrs.h>

/*******************************************************/
/*******************************************************/

char *strip_sp();

/*******************************************************/
/*******************************************************/
extern P_ISAM_ENTRY ea_entry;

extern char xap_name[UE_LEN +1];

/*****************************************************************/
/*
 *  (C) Copyright by Foxboro Company 1986
 *
 *  All rights reserved: Foxboro Company 1986
 *
 **$1**************************************************************
 *
 * NAME               : A211_n_ELEM_ALARM
 *
 * FUNCTION           : Read next ELEM_ALARM record.
 *                      Refer to A210_r_ELEM_ALARM !
 *
 * INPUT PARAMETERS  :
 *
 * OUTPUT PARAMETERS : val - value of retieved attribute
```

```
 *
 * RETURN VALUE      :      PAM_OK - valid record read
 *                       NOT PAM_OK - no valid record or error occurred
 *
 * SYNOPSIS          : int A211_n_ELEM_ALARM( val )
 *                     char *val;
 *
 * COMPONENT HISTORY :
 * ----------------------------------------------------------------
 * 15 OCT 88  AAM, creation
 *
 ******************************************************************/

int A211_n_ELEM_ALARM( val )

char *val;

{
   int res;
   char *val_read[2];

   dprintf(("***** A211 ****\n"));

   val_read[0] = val;
   val_read[1] = (char *) NULL;

   res = fetchcursor( ea_entry, val_read, IL_FOWD );

   if( res != IL_SUCCESS )
   {
      if( isliberr != ENO_MTCH_REC && isliberr != EENDFILE )
      {
         PPerr_rpt( PAM, isliberr, xap_name, "A211 - fetchcursor" );
      }
      return( !PAM_OK );
   }

   strip_sp( val_read[0] );

   return( PAM_OK );
   }

/******************************************************************
 *  @(#)a310.c   1.2  New System, Foxboro Company  8/17/89
 ******************************************************************
 *                                                                *
 *  (C) Copyright by Foxboro Company 1986                         *
 *                                                                *
 *  All rights reserved: Foxboro Company 1986                     *
 *                                                                *
 **$0**************************************************************
 *                                                                *
 * FILE ID            : a310.c                                    *
 *                                                                *
 * PART NUMBER        :                                           *
 *                                                                *
 * FUNCTION           : Data Base Access.                         *
 *                                                                *
 * COMPONENT HISTORY  :                                           *
 * -------------------------------------------------------------- *
 * 15 OCT 88  AAM, creation                                       *
 *                                                                *
 ******************************************************************/

#include        <stdio.h>
#include        <string.h>
#include        <isam.h>
#include        <fox/pream.h>
#include        <pam_com.h>
#include        <psrs.h>

/***********************************************************/
/***********************************************************/

char *strip_sp();

/***********************************************************/
/***********************************************************/
extern P_ISAM_ENTRY pat_entry;

extern char xap_name[UE_LEN +1];
```

```
/*****************************************************************/
/*
 *  (C) Copyright by Foxboro Company 1986
 *
 *  All rights reserved: Foxboro Company 1986
 *
 **$1***************************************************************
 *
 * NAME              : A310_r_PAT
 *
 * FUNCTION          : Read first PAT record.
 *
 * INPUT PARAMETERS  : path_name - name of path
 *                     pat_name  - name of pattern
 *                     clm       - atrribute to be retrieved
 *
 * OUTPUT PARAMETERS : val       - value of attribute retrieved
 *
 * RETURN VALUE      :     PAM_OK - valid record read
 *                     NOT PAM_OK - no valid record or error occurred
 *
 * SYNOPSIS          : int A310_r_PAT( path_name, pat_name, clm, val )
 *                     char *path_name, *pat_name, *clm, *val;
 *
 * COMPONENT HISTORY :
 * ---------------------------------------------------------------
 * 15 OCT 88  AAM, creation
 *
 *****************************************************************/

int A310_r_PAT( path_name, pat_name, clm, val )

char *path_name, *pat_name, *clm, *val;

{
   int res;
   char *sel[3], *proj[2], *val_read[2];
   char temp1[MAX_VAL +1],
        temp2[MAX_VAL +1];

   dprintf(("**** A310 ****\n"));

   strcpy( temp1, "path_name=" );
   strcat( temp1, path_name );

   strcpy( temp2, "pattern_name=" );
   strcat( temp2, pat_name );

   sel[0]      = temp1;
   sel[1]      = temp2;
   sel[2]      = (char *) NULL;
   proj[0]     = clm;
   proj[1]     = (char *) NULL;
   val_read[0] = val;
   val_read[1] = (char *) NULL;

   res = opencursor( pat_entry, sel, proj, IL_TOP );
   if( res != IL_SUCCESS )
   {
      if( isliberr != ENOREC )
      {
         PPerr_rpt( PAM, isliberr, xap_name, "A310 - opencursor" );
      }
      return( !PAM_OK );
   }

   res = fetchcursor( pat_entry, val_read, IL_FOWD );

   if( res != IL_SUCCESS )
   {
      if( res != ENO_MTCH_REC && isliberr != EENDFILE )
      {
         PPerr_rpt( PAM, isliberr, xap_name, "A310 - fetchcursor" );
      }
      return( !PAM_OK );
   }

   strip_sp( val_read[0] );

   return( PAM_OK );

}

/*****************************************************************
 *  @(#)a311.c   1.2  New System, Foxboro Company  8/17/89
 *****************************************************************
```

```
 *
 * (C) Copyright by Foxboro Company 1986                              *
 *                                                                    *
 * All rights reserved: Foxboro Company 1986                          *
 *                                                                    *
 **$0*****************************************************************
 *                                                                    *
 * FILE ID              : a311.c                                      *
 *                                                                    *
 * PART NUMBER          :                                             *
 *                                                                    *
 * FUNCTION             : Data Base Access.                           *
 *                                                                    *
 * COMPONENT HISTORY    :                                             *
 * ---------------------------------------------------------------   *
 * 15 OCT 88  AAM, creation                                           *
 *                                                                    *
 *********************************************************************/

#include        <stdio.h>
#include        <string.h>
#include        <isam.h>
#include        <fox/pream.h>
#include        <pam_com.h>
#include        <psrs.h>

/*********************************************************************/
/*********************************************************************/

char *strip_sp();

/*********************************************************************/
/*********************************************************************/
extern P_ISAM_ENTRY pat_entry;

extern char xap_name[UE_LEN +1];

/*********************************************************************/
/*
 * (C) Copyright by Foxboro Company 1986
 *
 * All rights reserved: Foxboro Company 1986
 *
 **$1*****************************************************************
 *
 * NAME               : A311_n_PAT
 *
 * FUNCTION           : Read next valid PAT record.
 *                      Refer to A310_r_PAT !
 *
 * INPUT PARAMETERS  :
 *
 * OUTPUT PARAMETERS : val - value of attribute retrieved.
 *
 * RETURN VALUE       :      PAM_OK - valid record record
 *                      NOT PAM_OK - no valid record or error occurred
 *
 * SYNOPSIS           : int A311_n_PAT( val )
 *                      char *val;
 *
 * COMPONENT HISTORY :
 * ------------------------------------------------------------------
 * 15 OCT 88  AAM, creation
 *
 *********************************************************************/

int A311_n_PAT( val )

char *val;

{
   int res;
   char *val_read[2];

   dprintf(("**** A311 ****\n"));

   val_read[0] = val;
   val_read[1] = (char *) NULL;

   res = fetchcursor( pat_entry, val_read, IL_FOWD );

   if( res != IL_SUCCESS )
   {
      if( isliberr != ENO_MTCH_REC && isliberr != EENDFILE )
      {
```

```
            PPerr_rpt( PAM, isliberr, xap_name, "A311 - fetchcursor" );
        }
        return( !PAM_OK );
    }

    strip_sp( val_read[0] );

    return( PAM_OK );
}

/*****************************************************************
*  @(#)a410.c   1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**80**************************************************************
*                                                                *
* FILE ID              : a410.c                                  *
*                                                                *
* PART NUMBER          :                                         *
*                                                                *
* FUNCTION             : Data Base Access.                       *
*                                                                *
* COMPONENT HISTORY    :                                         *
* -------------------------------------------------------------- *
* 15 OCT 88  AAM, creation                                       *
*                                                                *
*****************************************************************/

#include        <stdio.h>
#include        <string.h>
#include        <isam.h>
#include        <fox/pream.h>
#include        <pam_com.h>
#include        <psrs.h>

/*********************************************************/
/* External functions.                                  */
/*********************************************************/


/*********************************************************/
/*********************************************************/

extern P_ISAM_ENTRY pv_entry;

extern char xap_name[UE_LEN +1];


/*****************************************************************/
/*
*  (C) Copyright by Foxboro Company 1986
*
*  All rights reserved: Foxboro Company 1986
*
**81**************************************************************
*
* NAME               : A410_r_PAR_VALUE
*
* FUNCTION           : Read first valid PAR_VALUE record.
*
* INPUT PARAMETERS   : path_name - name of path
*                      pat_name  - name of pattern
*                      step_no   - step number
*
* OUTPUT PARAMETERS : par_val   - parameter value
*
* RETURN VALUE       :     PAM_OK - valid record read
*                      NOT PAM_OK - no valid record or error occurred
*
* SYNOPSIS           : int A410_r_PAR_VALUE( path_name, pat_name,
*                                            step_no, par_val )
*                      char *path_name, *pat_name, *step_no, *par_val;
*
* COMPONENT HISTORY :
* ---------------------------------------------------------------
* 15 OCT 88  AAM, creation
*
*****************************************************************/

int A410_r_PAR_VALUE( path_name, pat_name, step_no, par_val )
```

```
char *path_name, *pat_name, *step_no;
P_REC_PAR_VALUE par_val;

{
   int res;
   char *sel[4], *proj[NUM_RP_ATTR +1];
   char temp0[MAX_VAL +1],
        temp1[MAX_VAL +1],
        temp2[MAX_VAL +1];

   dprintf(("**** A410 ****\n"));

   strcpy( temp0, "path_name=" );
   strcat( temp0, path_name );

   strcpy( temp1, "pattern_name=" );
   strcat( temp1, pat_name );

   strcpy( temp2, "step_no=" );
   strcat( temp2, step_no );


   sel[0]      = temp0;
   sel[1]      = temp1;
   sel[2]      = temp2;
   sel[3]      = (char *) NULL;

   proj[0]     = "elem_name";
   proj[1]     = "step_no";
   proj[2]     = "par_type";
   proj[3]     = "par_name";
   proj[4]     = "par_value";
   proj[5]     = "sync_rule";
   proj[6]     = (char *) NULL;

   res = opencursor( pv_entry, sel, proj, IL_TOP );

   if( res != IL_SUCCESS )
   {
      if( isliberr != ENOREC )
      {
         PPerr_rpt( PAM, isliberr, xap_name, "A410 - opencursor" );
      }
      return( !PAM_OK );
   }

   if( A411_n_PAR_VALUE( par_val ) != PAM_OK )
   {
      return( !PAM_OK );
   }

   return( PAM_OK );
}

/*****************************************************************
*  @(#)a411.c   1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**$0*************************************************************
*                                                                *
* FILE ID              : a411.c                                  *
*                                                                *
* PART NUMBER          :                                         *
*                                                                *
* FUNCTION             : Data Base Access.                       *
*                                                                *
* COMPONENT HISTORY   :                                          *
* -------------------------------------------------------------- *
* 15 OCT 88  AAM, creation                                       *
*                                                                *
*****************************************************************/

#include        <stdio.h>
#include        <string.h>
#include        <isam.h>
#include        <fox/pream.h>
#include        <pam_com.h>
#include        <psrs.h>

/********************************************************/
/* External functions.                                  */
```

```
/*************************************************************/
char *strip_sp();

/*************************************************************/
/*************************************************************/
extern P_ISAM_ENTRY pv_entry;

extern char xap_name[UE_LEN +1];

/******************************************************************/
/*
 *  (C) Copyright by Foxboro Company 1986
 *
 *  All rights reserved: Foxboro Company 1986
 *
 **&1***************************************************************
 *
 * NAME              : A411_n_PAR_VALUE
 *
 * FUNCTION          : Read next valid PAR_VALUE record.
 *                     Refer to A410_r_PAR_VALUE !
 *
 * INPUT PARAMETERS  :
 *
 * OUTPUT PARAMETERS : par_value - parameter value
 *
 * RETURN VALUE      :     PAM_OK - valid record read
 *                     NOT PAM_OK - no valid record or error occurred
 *
 * SYNOPSIS          : int A411_n_PAR_VALUE( par_value )
 *                     P_REC_PAR_VALUE *par_value;
 *
 * COMPONENT HISTORY :
 * ----------------------------------------------------------------
 * 15 OCT 88  AAM, creation
 *
 ******************************************************************/

int A411_n_PAR_VALUE( par_val )

P_REC_PAR_VALUE par_val;

{
   int i, res;
   char *val_read[NUM_RP_ATTR +1];

   dprintf(("**** A411 ****\n"));

   val_read[0] = par_val->elem_name;
   val_read[1] = par_val->step_no;
   val_read[2] = par_val->par_type;
   val_read[3] = par_val->par_name;
   val_read[4] = par_val->par_value;
   val_read[5] = par_val->sync_rule;
   val_read[6] = (char *) NULL;

   res = fetchcursor( pv_entry, val_read, IL_FOWD );

   if( res != PAM_OK )
   {
      if( isliberr != ENO_MTCH_REC && isliberr != EENDFILE )
      {
         PPerr_rpt( PAM, isliberr, xap_name, "A411 - fetchcursor" );
      }
         return( !PAM_OK );
      }

      /* Remove trailing spaces from values read. */
      for( i = 0; i < NUM_RP_ATTR; i++ )
         strip_sp( val_read[i] );

      return( PAM_OK );

   }

/*****************************************************************
 * @(#)a520.c   1.2  New System, Foxboro Company  8/17/89
 *****************************************************************
 *                                                               *
 *  (C) Copyright by Foxboro Company 1986                        *
 *                                                               *
 *  All rights reserved: Foxboro Company 1986                    *
```

```
*
**&0***********************************************************
*                                                             *
* FILE ID              : a520.c                               *
*                                                             *
* PART NUMBER          :                                      *
*                                                             *
* FUNCTION             : Data Base Access.                    *
*                                                             *
* COMPONENT HISTORY    :                                      *
* ----------------------------------------------------------- *
* 15 OCT 88  AAN, creation                                    *
*                                                             *
**************************************************************/

#include        <stdio.h>
#include        <string.h>
#include        <isam.h>
#include        <fox/pream.h>
#include        <pam_com.h>
#include        <psrs.h>
/*******************************************************/
/*******************************************************/
char *strip_sp();
/*******************************************************/
/*******************************************************/
extern P_ISAM_ENTRY pac_entry;

extern char xap_name[UE_LEN +1];

/*****************************************************************/
/*
 *  (C) Copyright by Foxboro Company 1986
 *
 *  All rights reserved: Foxboro Company 1986
 *
 **&1*************************************************************
 *
 * NAME              : A520_r_PAC
 *
 * FUNCTION          : Read first PAC record with smallest load value
 *                     and load value less than maximum.
 *
 * INPUT PARAMETERS  :
 *
 * OUTPUT PARAMETERS : lbug   - host station letter bug
 *                     pacno  - path controller number on station
 *                     ld     - load ( number of paths ) assigned to
 *                              path controller
 *
 * RETURN VALUE      :     PAM_OK - valid record read
 *                     NOT PAM_OK - no valid record or error occurred
 *
 * SYNOPSIS          : int A520_r_PAC( lbug, pacno, ld )
 *                     char *lbug, *pacno;
 *                     int  *ld;
 *
 * COMPONENT HISTORY :
 * ------------------------------------------------------------
 * 15 OCT 88  AAN, creation
 *
 *****************************************************************/

int A520_r_PAC( lbug, pacno, ld )

char *lbug, *pacno;
int *ld;

{
   int res;
   char load[2+1];
   char *sel[2], *proj[4], *val_read[4];
   char templ[MAX_VAL +1];

   dprintf(("**** A520 ****\n"));

   strcpy( templ, "load*" );

   sel[0]       = templ;
   sel[1]       = (char *) NULL;
   proj[0]      = "lbug";
   proj[1]      = "pacno";
   proj[2]      = "load";
```

```
    proj[3]        = (char *) NULL;
    val_read[0] = lbug;
    val_read[1] = Bscno;
    val_read[2] = load;
    val_read[3] = (char *) NULL;

    res = opencursor( pac_entry, sel, proj, IL_TOP );
    if( res != IL_SUCCESS )
    {
       if( isliberr != ENOREC )
       {
          PPerr_rpt( PAM, isliberr, xap_name, "A520 - opencursor" );
       }
       return( !PAM_OK );
    }

    res = fetchcursor( pac_entry, val_read, IL_FOWD );

    if( res != IL_SUCCESS )
    {
       if( res != ENO_MTCH_REC && isliberr != EENDFILE )
       {
          PPerr_rpt( PAM, isliberr, xap_name, "A520 - fetchcursor" );
       }
       return( !PAM_OK );
    }


    *ld = atoi( load );
    if( *ld >= 99 )
    {
       /* No more PAC's available. */
       return( !PAM_OK );
    }

    strip_sp( val_read[0] );
    strip_sp( val_read[1] );

    return( PAM_OK );

}

/*****************************************************************
*  @(#)a530.c   1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**@0**************************************************************
*                                                                *
* FILE ID              : a530.c                                  *
*                                                                *
* PART NUMBER          :                                         *
*                                                                *
* FUNCTION             : Data Base Access.                       *
*                                                                *
* COMPONENT HISTORY    :                                         *
* -------------------------------------------------------------- *
* 15 OCT 88  AAM, creation                                       *
* 30 JUN 89  RRD, avoided use of strncat() because of bug in this*
*                 function.                                      *
* 16 AUG 89  RRD, added function A530_lt_PAC() and A530_ul_PAC().*
*                                                                *
*****************************************************************/

#include        <stdio.h>
#include        <string.h>
#include        <isam.h>
#include        <fox/pream.h>
#include        <pam_com.h>
#include        <psrs.h>

/***********************************************************/
/***********************************************************/


/***********************************************************/
/***********************************************************/
extern P_ISAM_ENTRY pac_entry;

extern char xap_name[UE_LEN +1];

static bool pac_locked = FALSE;
```

```
/*****************************************************************/
/*
 *  (C) Copyright by Foxboro Company 1986
 *
 *  All rights reserved: Foxboro Company 1986
 *
 **$1**************************************************************
 *
 * NAME              : A530_ru_PAC
 *
 * FUNCTION          : Read and update PAC record.
 *
 * INPUT PARAMETERS  : key    - path_key
 *                     ld_dlt - delta value for load attribute
 *
 * OUTPUT PARAMETERS :
 *
 * RETURN VALUE      :     PAM_OK - record updated
 *                     NOT PAM_OK - no valid record or error occurred
 *
 * SYNOPSIS          : int A530_ru_PAC( key, ld_dlt )
 *                     char *key;
 *                     int ld_dlt;
 *
 * COMPONENT HISTORY :
 * ---------------------------------------------------------------
 * 15 OCT 88  AAM, creation
 * 30 JUN 89  RRD, avoided use of strncat() because of bug in this function
 * 16 AUG 89  RRD, removed locking
 *
 *****************************************************************/

int A530_ru_PAC( key, ld_dlt )

char *key;
int  ld_dlt;

{
   int res, ld;
   char load[2+1];
   char *sel[3], *proj[2], *val_read[2];
   char *value[2];
   char temp1[MAX_VAL +1];
   char temp2[MAX_VAL +1];


   dprintf(("**** A530 ****\n"));

   strcpy( temp1, "lbug=" );
   strcat( temp1, key+3 );        /* key ::= PAC<lbug(6)><pacno(2)> */
   temp1[11] = '\0';              /* strip off pacno */
   strcpy( temp2, "pacno=" );
   strcat( temp2, key+9 );

   sel[0]      = temp1;
   sel[1]      = temp2;
   sel[2]      = (char *) NULL;
   proj[0]     = "load";
   proj[1]     = (char *) NULL;
   val_read[0] = load;
   val_read[1] = (char *) NULL;

   /* Read record first ( might have changed in mean time ). */
   res = opencursor( pac_entry, sel, proj, IL_TOP );
   if( res != IL_SUCCESS )
   {
      if( isliberr != ENOREC )
      {
         PPerr_rpt( PAM, isliberr, xap_name, "A530 - opencursor" );
      }
      return( !PAM_OK );
   }

   res = fetchcursor( pac_entry, val_read, IL_FOWD );
   if( res != IL_SUCCESS )
   {
      if( res != ENO_MTCH_REC && isliberr != EENDFILE )
      {
         PPerr_rpt( PAM, isliberr, xap_name, "A530 - fetchcursor" );
      }
      return( !PAM_OK );
   }

   ld = atoi( load ) + ld_dlt;
   if( ld > 99 || ld < 0 )
```

```
    {
       /* Update result in illegal load value. */
       PPerr_rpt( PAM, PE_FATAL_ERROR, xap_name, "Illegal load value." );

       return( !PAM_OK );
    }

    sprintf( temp1, "load=%02d", ld );

    value[0] = temp1;
    value[1] = (char *) NULL;

    res = upd_curr( pac_entry, value );
    if( res != IL_SUCCESS )
    {
       PPerr_rpt( PAM, isliberr, xap_name, "A530 - upd_curr" );

       return( !PAM_OK );
    }

    return( PAM_OK );
}

/*****************************************************************/
/*
 *  (C) Copyright by Foxboro Company 1986
 *
 *  All rights reserved: Foxboro Company 1986
 *
 **81**************************************************************
 *
 * NAME              : A530_lt_PAC
 *
 * FUNCTION          : Lock PAC table.
 *
 * INPUT PARAMETERS  : None.
 *
 * OUTPUT PARAMETERS : None.
 *
 * RETURN VALUE      : PAM_OK, !PAM_OK
 *
 * SYNOPSIS          : int A530_lt_PAC()
 *
 * COMPONENT HISTORY :
 * ---------------------------------------------------------------
 * 16 AUG 1989 - RD - Creation
 *
 *****************************************************************/

int A530_lt_PAC()
{
   int res;
   int retries = 0;

   dprintf(("**** Lock PAC Table ****\n"));

   if ( pac_locked ) return( PAM_OK );

   while ( ( res = lock_table( pac_entry ) ) != IL_SUCCESS )
   {
      if ( ( isliberr != ELOCKED && isliberr != EFLOCKED ) || ++retries > 24 )
      {
         /* Something wrong */

         PPerr_rpt( PAM, isliberr, xap_name, "A530 - lock_table" );
         return( !PAM_OK );
      }

      /* Sleep and retry */

      sleep( 5 );
   }
   pac_locked = TRUE;
   return( PAM_OK );
}

/*****************************************************************/
/*
 *  (C) Copyright by Foxboro Company 1986
 *
 *  All rights reserved: Foxboro Company 1986
 *
 **81**************************************************************
 *
```

```
 * NAME               : A530_ul_PAC
 *
 * FUNCTION           : Unlock PAC table.
 *
 * INPUT PARAMETERS   : None.
 *
 * OUTPUT PARAMETERS  : None.
 *
 * RETURN VALUE       : PAM_OK, !PAM_OK
 *
 * SYNOPSIS           : int A530_ul_PAC()
 *
 * COMPONENT HISTORY  :
 * ----------------------------------------------------------------
 * 16 AUG 1989 - RD - Creation
 *
 *****************************************************************/

int A530_ul_PAC()
{
   int res;

   dprintf(("**** UNlock PAC Table ****\n"));

   if ( !pac_locked ) return( PAM_OK );

   res = unlock_table( pac_entry );
   if ( res != IL_SUCCESS )
   {
      /* Something wrong */

      PPerr_rpt( PAM, isliberr, xap_name, "A530 - unlock_table" );
      return( !PAM_OK );
   }
   pac_locked = FALSE;
   return( PAM_OK );
}

/****************************************************************
*  @(#)a900.c   1.2  New System, Foxboro Company  8/17/89
*****************************************************************
*                                                               *
*  (C) Copyright by Foxboro Company 1986                        *
*                                                               *
*  All rights reserved: Foxboro Company 1986                    *
*                                                               *
**@D*************************************************************
*                                                               *
* FILE ID              : a900.c                                 *
*                                                               *
* PART NUMBER          :                                        *
*                                                               *
* FUNCTION             : Data Base Access.                      *
*                                                               *
* COMPONENT HISTORY    :                                        *
* ------------------------------------------------------------- *
* 15 OCT 88  AAM, creation                                      *
* 14 AUG 89  RRD, correct error code on open failure            *
*                                                               *
*****************************************************************/

#include        <stdio.h>
#include        <string.h>
#include        <isam.h>
#include        <fox/pream.h>
#include        <pam_com.h>
#include        <psrs.h>

/*******************************************************/
/*******************************************************/


/*******************************************************/
/*******************************************************/
extern P_ISAM_ENTRY copas_entry;

extern char xap_name[UE_LEN +1];

/****************************************************************/
/*
 *  (C) Copyright by Foxboro Company 1986
 *
 *  All rights reserved: Foxboro Company 1986
 *
```

```
**&1*************************************************************
*
* NAME                 : A900_o_COPAS
*
* FUNCTION             : Open COPAS table for update.
*
* INPUT PARAMETERS     :
*
* OUTPUT PARAMETERS    :
*
* RETURN VALUE         :      PAM_OK - open successfull
*                         NOT PAM_OK - error occurred
*
* SYNOPSIS             : int A900_o_COPAS()
*
* COMPONENT HISTORY    :
* ----------------------------------------------------------------
* 15 OCT 88  AAM, creation
*
*****************************************************************/

int A900_o_COPAS()

{
   P_ISAM_ENTRY opentable();

   dprintf(("**** A900 ****\n"));

   copas_entry = opentable( "copas", ISMANULOCK + ISINOUT );
   if( copas_entry == (P_ISAM_ENTRY) NULL )
   {
      PPerr_rpt( PAM, PE_OPEN_FAIL, xap_name, "A900 - opentable" );
      return( !PAM_OK );
   }

   return( PAM_OK );
}

/****************************************************************
*  @(#)a901.c   1.2  New System, Foxboro Company  8/17/89
*****************************************************************
*                                                               *
*  (C) Copyright by Foxboro Company 1986                        *
*                                                               *
*  All rights reserved: Foxboro Company 1986                    *
*                                                               *
**&0*************************************************************
*                                                               *
* FILE ID              : a901.c                                 *
*                                                               *
* PART NUMBER          :                                        *
*                                                               *
* FUNCTION             : Data Base Access.                      *
*                                                               *
* COMPONENT HISTORY    :                                        *
* ------------------------------------------------------------- *
* 15 OCT 88  AAM, creation                                      *
* 14 AUG 89  RRD, correct error code on open failure            *
*                                                               *
*****************************************************************/

#include        <stdio.h>
#include        <string.h>
#include        <isam.h>
#include        <fox/pream.h>
#include        <pam_com.h>
#include        <psrs.h>

/*******************************************************/
/*******************************************************/


/*******************************************************/
/*******************************************************/
extern P_ISAM_ENTRY ec_entry;

extern char xap_name[UE_LEN +1];

/****************************************************************/
/*
*  (C) Copyright by Foxboro Company 1986
*
*  All rights reserved: Foxboro Company 1986
*
**&1*************************************************************
```

```
 *
 * NAME              : A901_o_ELEM_COND
 *
 * FUNCTION          : Open ELEM_COND table for read.
 *
 * INPUT PARAMETERS  :
 *
 * OUTPUT PARAMETERS :
 *
 * RETURN VALUE      :     PAM_OK - open successfull
 *                     NOT PAM_OK - error occurred
 *
 * SYNOPSIS          : int A901_o_ELEM_COND()
 *
 * COMPONENT HISTORY :
 * ----------------------------------------------------------------------
 * 15 OCT 88  AAM, creation
 *
 *********************************************************************/

int A901_o_ELEM_COND()

{
   P_ISAM_ENTRY opentable();

   dprintf(("**** A901 ****\n"));

   ec_entry = opentable( "elem_cond", ISMANULOCK + ISINPUT );
   if( ec_entry == (P_ISAM_ENTRY) NULL )
   {
      PPerr_rpt( PAM, PE_OPEN_FAIL, xap_name, "A901 - opentable" );
      return( !PAM_OK );
   }

   return( PAM_OK );
}

/*********************************************************************
 *  @(#)a902.c   1.2  New System, Foxboro Company  8/17/89
 *********************************************************************
 *                                                                   *
 *  (C) Copyright by Foxboro Company 1986                            *
 *                                                                   *
 *  All rights reserved: Foxboro Company 1986                        *
 *                                                                   *
 **&0*****************************************************************
 *                                                                   *
 * FILE ID             : a902.c                                      *
 *                                                                   *
 * PART NUMBER         :                                             *
 *                                                                   *
 * FUNCTION            : Data Base Access.                           *
 *                                                                   *
 * COMPONENT HISTORY   :                                             *
 * ----------------------------------------------------------------- *
 * 15 OCT 88  AAM, creation                                          *
 * 14 AUG 89  RRD, correct error code on open failure                *
 *                                                                   *
 *********************************************************************/

#include        <stdio.h>
#include        <string.h>
#include        <isam.h>
#include        <fox/pream.h>
#include        <pae_com.h>
#include        <psrs.h>

/*********************************************************/
/*********************************************************/

/*********************************************************/
/*********************************************************/
extern P_ISAM_ENTRY ea_entry;

extern char xap_name[UE_LEN +1];

/*********************************************************************/
/*
 *  (C) Copyright by Foxboro Company 1986
 *
 *  All rights reserved: Foxboro Company 1986
 *
 **&1*****************************************************************
 *
```

```
 * NAME               : A902_o_COPAS
 *
 * FUNCTION           : Open COPAS table for read.
 *
 * INPUT PARAMETERS   :
 *
 * OUTPUT PARAMETERS  :
 *
 * RETURN VALUE       :      PAM_OK - open successfull
 *                       NOT PAM_OK - error occurred
 *
 * SYNOPSIS           : int A902_o_COPAS()
 *
 * COMPONENT HISTORY  :
 * ---------------------------------------------------------------------
 * 15 OCT 88  AAM, creation
 *
 **********************************************************************/

int A902_o_COPAS()

{
   P_ISAM_ENTRY opentable();

   dprintf(("**** A902 ****\n"));

   ea_entry = opentable( "elem_alarm", ISMANULOCK + ISINPUT );
   if( ea_entry == (P_ISAM_ENTRY) NULL )
   {
      PPerr_rpt( PAM, PE_OPEN_FAIL, xap_name, "A902 - opentable" );
      return( !PAM_OK );
   }

   return( PAM_OK );
}

/**********************************************************************
 *  @(#)a903.c   1.2  New System, Foxboro Company  8/17/89
 **********************************************************************
 *                                                                    *
 *  (C) Copyright by Foxboro Company 1986                             *
 *                                                                    *
 *  All rights reserved: Foxboro Company 1986                         *
 *                                                                    *
 **&0*******************************************************************
 *                                                                    *
 * FILE ID            : a903.c                                        *
 *                                                                    *
 * PART NUMBER        :                                               *
 *                                                                    *
 * FUNCTION           : Data Base Access.                             *
 *                                                                    *
 * COMPONENT HISTORY  :                                               *
 * ------------------------------------------------------------------ *
 * 15 OCT 88  AAM, creation                                           *
 * 14 AUG 89  RRD, correct error on open failure                      *
 *                                                                    *
 **********************************************************************/

#include        <stdio.h>
#include        <string.h>
#include        <isam.h>
#include        <fox/pream.h>
#include        <pam_com.h>
#include        <psrs.h>

/************************************************************/
/************************************************************/

/************************************************************/
/************************************************************/
extern P_ISAM_ENTRY pat_entry;

extern char xap_name[UE_LEN +1];

/**********************************************************************/
/*
 *  (C) Copyright by Foxboro Company 1986
 *
 *  All rights reserved: Foxboro Company 1986
 *
 **&1********************************************************************
 *
 * NAME               : A903_o_PAT
```

```
 *
 * FUNCTION          : Open PAT table for read.
 *
 * INPUT PARAMETERS  :
 *
 * OUTPUT PARAMETERS :
 *
 * RETURN VALUE      :     PAM_OK - open successfull
 *                     NOT PAM_OK - error occurred
 *
 * SYNOPSIS          : int A903_o_PAT()
 *
 * COMPONENT HISTORY :
 * ----------------------------------------------------------------
 * 15 OCT 88  AAM, creation
 *
 *****************************************************************/

int A903_o_PAT()

{
   P_ISAM_ENTRY opentable();

   dprintf(("**** A903 ****\n"));

   pat_entry = opentable( "pat", ISMANULOCK + ISINPUT );
   if( pat_entry == (P_ISAM_ENTRY) NULL )
   {
      PPerr_rpt( PAM, PE_OPEN_FAIL, xap_name, "A903 - opentable" );
      return( !PAM_OK );
   }

   return( PAM_OK );
}

/*****************************************************************
 *  @(#)a904.c   1.2  New System, Foxboro Company  8/17/89
 *****************************************************************
 *                                                               *
 *  (C) Copyright by Foxboro Company 1986                        *
 *                                                               *
 *  All rights reserved: Foxboro Company 1986                    *
 *                                                               *
 **&0*************************************************************
 *                                                               *
 * FILE ID           : a904.c                                    *
 *                                                               *
 * PART NUMBER       :                                           *
 *                                                               *
 * FUNCTION          : Data Base Access.                         *
 *                                                               *
 * COMPONENT HISTORY :                                           *
 * ------------------------------------------------------------- *
 * 15 OCT 88  AAM, creation                                      *
 * 14 AUG 89  RRD, correct error code on open failure            *
 *                                                               *
 *****************************************************************/

#include        <stdio.h>
#include        <string.h>
#include        <isam.h>
#include        <fox/pream.h>
#include        <pam_com.h>
#include        <psrs.h>

/*************************************************************/
/*************************************************************/

/*************************************************************/
/*************************************************************/
extern P_ISAM_ENTRY pv_entry;

extern char xap_name[UE_LEN +1];

/*****************************************************************/
/*
 *  (C) Copyright by Foxboro Company 1986
 *
 *  All rights reserved: Foxboro Company 1986
 *
 **&1**************************************************************
 *
 * NAME             : A904_o_PAR_VAL
 *
```

```
 * FUNCTION          : Open PAR_VALUE table for read.
 *
 * INPUT PARAMETERS  :
 *
 * OUTPUT PARAMETERS :
 *
 * RETURN VALUE      :      PAM_OK - open successfull
 *                      NOT PAM_OK - error occurred
 *
 * SYNOPSIS          : int A904_o_PAR_VAL()
 *
 * COMPONENT HISTORY :
 * -----------------------------------------------------------------
 * 15 OCT 88  AAM, creation
 *
 ****************************************************************/

int A904_o_PAR_VAL()

{
   P_ISAM_ENTRY opentable();

   dprintf(("**** A904 ****\n"));

   pv_entry = opentable( "par_value", ISMANULOCK + ISINPUT );
   if( pv_entry == (P_ISAM_ENTRY) NULL )
   {
      PPerr_rpt( PAM, PE_OPEN_FAIL, xap_name, "A904 - opentable" );
      return( !PAM_OK );
   }

   return( PAM_OK );
}

/****************************************************************
 *  @(#)a905.c   1.2  New System, Foxboro Company  8/17/89
 ****************************************************************
 *                                                              *
 *  (C) Copyright by Foxboro Company 1986                       *
 *                                                              *
 *  All rights reserved: Foxboro Company 1986                   *
 *                                                              *
 **&0************************************************************
 *                                                              *
 * FILE ID              : a905.c                                *
 *                                                              *
 * PART NUMBER          :                                       *
 *                                                              *
 * FUNCTION             : Data Base Access.                     *
 *                                                              *
 * COMPONENT HISTORY    :                                       *
 * ------------------------------------------------------------ *
 * 15 OCT 88  AAM, creation                                     *
 * 14 AUG 89  RRD, correct error code on open failure           *
 *                                                              *
 ****************************************************************/

#include        <stdio.h>
#include        <string.h>
#include        <isam.h>
#include        <fox/pream.h>
#include        <pam_com.h>
#include        <psrs.h>

/**********************************************************/
/**********************************************************/

/**********************************************************/
/**********************************************************/
extern P_ISAM_ENTRY pac_entry;

extern char xap_name[UE_LEN +1];

/****************************************************************/
/*
 *  (C) Copyright by Foxboro Company 1986
 *
 *  All rights reserved: Foxboro Company 1986
 *
 **&1*************************************************************
 *
 * NAME              : A905_o_PAC
 *
 * FUNCTION          : Open PAC table for update.
```

```
 *
 * INPUT PARAMETERS  :
 *
 * OUTPUT PARAMETERS :
 *
 * RETURN VALUE      :     PAM_OK - open successfull
 *                     NOT PAM_OK - error occurred
 *
 * SYNOPSIS          : int A905_o_PAC()
 *
 * COMPONENT HISTORY :
 * ------------------------------------------------------------------
 * 15 OCT 88  AAN, creation
 *
 *****************************************************************/

int A905_o_PAC()

{
   P_ISAM_ENTRY opentable();

   dprintf(("**** A905 ****\n"));

   pac_entry = opentable( "pac", ISMANULOCK + ISINOUT );
   if( pac_entry == (P_ISAM_ENTRY) NULL )
   {
      PPerr_rpt( PAM, PE_OPEN_FAIL, xap_name, "A905 - opentable" );
      return( !PAM_OK );
   }

   return( PAM_OK );
}

/*****************************************************************
 * @(#)a910.c   1.2  New System, Foxboro Company  8/17/89
 *****************************************************************
 *                                                               *
 * (C) Copyright by Foxboro Company 1986                         *
 *                                                               *
 * All rights reserved: Foxboro Company 1986                     *
 *                                                               *
 **&0*************************************************************
 *                                                               *
 * FILE ID             : a910.c                                  *
 *                                                               *
 * PART NUMBER         :                                         *
 *                                                               *
 * FUNCTION            : Data Base Access.                       *
 *                                                               *
 * COMPONENT HISTORY   :                                         *
 * ------------------------------------------------------------- *
 * 15 OCT 88  AAN, creation                                      *
 * 14 AUG 89  RRD, correct error code on open failure            *
 *                                                               *
 *****************************************************************/

#include        <stdio.h>
#include        <string.h>
#include        <isam.h>
#include        <fox/pream.h>
#include        <pam_com.h>
#include        <psrs.h>

/*********************************************************/
/*********************************************************/


/*********************************************************/
/*********************************************************/
extern P_ISAM_ENTRY copas_entry;

extern char xap_name[UE_LEN +1];

/*****************************************************************/
/*
 * (C) Copyright by Foxboro Company 1986
 *
 * All rights reserved: Foxboro Company 1986
 *
 **&1**************************************************************
 *
 * NAME              : A910_ul_COPAS
 *
 * FUNCTION          : Unlock COPAS.
```

```
 *
 * INPUT PARAMETERS  :
 *
 * OUTPUT PARAMETERS :
 *
 * RETURN VALUE      :     PAM_OK - unlock successfull
 *                     NOT PAM_OK - error occurred
 *
 * SYNOPSIS          : int A910_ul_COPAS()
 *
 * COMPONENT HISTORY :
 * ----------------------------------------------------------------
 * 15 OCT 88  AAM, creation
 *
 *****************************************************************/

int A910_ul_COPAS()

{
   dprintf(("**** A910 ****\n"));

   if( unlock_table( copas_entry ) != SUCCESS )
   {
      PPerr_rpt( PAM, PE_FATAL_ERROR, xap_name, "A910 - unlock_table" );
      return( !PAM_OK );
   }

   return( PAM_OK );
}

/*****************************************************************
 *  @(#)acc.c    1.2  New System, Foxboro Company  8/17/89
 *****************************************************************
 *                                                               *
 *  (C) Copyright by Foxboro Company 1986                        *
 *                                                               *
 *  All rights reserved: Foxboro Company 1986                    *
 *                                                               *
 **@0*************************************************************
 *                                                               *
 * FILE ID            : acc.c                                    *
 *                                                               *
 * PART NUMBER        :                                          *
 *                                                               *
 * FUNCTION           : Data Base Access global data.            *
 *                                                               *
 * COMPONENT HISTORY  :                                          *
 * ------------------------------------------------------------- *
 * 15 OCT 88  AAM, creation                                      *
 *                                                               *
 *****************************************************************/

#include        <pam_com.h>
#include        <isam.h>
#include        <fox/pream.h>
#include        <psrs.h>
#include        <seltab.h>      /* Defines sc_specs table. */


/***********************************************************/
/*                                                         */
/* PREAM table entries for PAM Data Base.                  */
/*                                                         */
/***********************************************************/
P_ISAM_ENTRY copas_entry,
             ec_entry,
             ea_entry,
             pac_entry,
             pat_entry,
             pv_entry;

/* Path's environment. Set when COPAS is read. */
char path_env[ST_FLD_SZ +1];

/* List of specified selection criteria ( names ). */
SC_VAL sc_vals[MAX_SPEC_SC];

/* List of selection criteria values read from the COPAS. */
char sc_db_vals[MAX_SPEC_SC][MAX_VAL +1];

/*****************************************************************
 *  @(#)get_par.c       1.2  New System, Foxboro Company  8/17/89
 *****************************************************************
 *                                                               *
```

```
 * (C) Copyright by Foxboro Company 1986                          *
 *                                                                *
 * All rights reserved: Foxboro Company 1986                      *
 *                                                                *
 **&0*************************************************************
 *                                                                *
 * FILE ID              : get_par.c                               *
 *                                                                *
 * PART NUMBER          :                                         *
 *                                                                *
 * FUNCTION             : Standard APM function.                  *
 *                                                                *
 * COMPONENT HISTORY    :                                         *
 * -------------------------------------------------------------- *
 * 15 OCT 88  AAM, creation                                       *
 *                                                                *
 *****************************************************************/

#include        <fox/om_udef.h>
#include        <pam_com.h>
#include        <isam.h>
#include        <fox/pream.h>
#include        <psrs.h>

/*****************************************************************/
/*
 * (C) Copyright by Foxboro Company 1986
 *
 * All rights reserved: Foxboro Company 1986
 *
 **&1**************************************************************
 *
 * NAME              : get_par
 *
 * FUNCTION          : Get an equipment parameter variable value.
 *
 * INPUT PARAMETERS  : eq_name
 *                     par_name
 *
 * OUTPUT PARAMETERS : par_value
 *                     par_type
 *
 * RETURN VALUE      :     PAM_OK - unlock successfull
 *                     NOT PAM_OK - error occurred
 *
 * SYNOPSIS          : int get_par( eq_name, par_name, par_value, type )
 *                     char *eq_name, *par_name, *par_value;
 *                     int *type;
 *
 * COMPONENT HISTORY :
 * -------------------------------------------------------------- 
 * 15 OCT 88  AAM, creation
 *
 *****************************************************************/

int get_par( eq_name, par_name, par_value, type )

char *eq_name, *par_name, *par_value;
int *type;

{
   int res;
   unsigned int status;
   int datalen = sizeof( UVAL );

   dprintf(("**** get_par ****\n"));

   res = getval( par_name, VARIABLE, 0, par_value, &status, &datalen );

   if( res != OM_SUCCESS )
   {
      return( !PAM_OK );
   }

   *type = status & 0x1f;

   return( PAM_OK );

}

/*****************************************************************
 * @(#)set_par.c        1.3  New System, Foxboro Company  8/17/89
 *****************************************************************
 *                                                               *
 * (C) Copyright by Foxboro Company 1986                         *
```

```
 *
 * All rights reserved: Foxboro Company 1986                    *
 *                                                               *
 **&0*************************************************************
 *                                                               *
 * FILE ID              : set_par.c                              *
 *                                                               *
 * PART NUMBER          :                                        *
 *                                                               *
 * FUNCTION             : Standard APM function.                 *
 *                                                               *
 * COMPONENT HISTORY    :                                        *
 * ----------------------------------------------------------    *
 * 15 OCT 88  AAM, creation                                      *
 * 02 MAR 89  AAM                                                *
 *                                                               *
 ****************************************************************/

#include        <fox/om_udef.h>
#include        <paa_com.h>
#include        <isam.h>
#include        <fox/pream.h>
#include        <psrs.h>

extern char xap_name[UE_LEN +1];

/****************************************************************/
/*
 *  (C) Copyright by Foxboro Company 1986
 *
 *  All rights reserved: Foxboro Company 1986
 *
 **&1**************************************************************
 *
 * NAME                 : set_par
 *
 * FUNCTION             : Set an equipment parameter variable value.
 *
 * INPUT PARAMETERS     : requestor
 *                        eq_name
 *                        par_name
 *                        par_value
 *
 * OUTPUT PARAMETERS :
 *
 * RETURN VALUE         :      PAM_OK - unlock successfull
 *                        NOT PAM_OK - error occurred
 *
 * SYNOPSIS             : int set_par( requestor, eq_name, par_name, par_value )
 *                        char *requestor, *eq_name, *par_name, *par_value;
 *
 * COMPONENT HISTORY :
 * ----------------------------------------------------------------
 * 15 OCT 88  AAM, creation
 * 02 MAR 89  AAM, support for boolean variables
 *
 ****************************************************************/

int set_par( requestor, eq_name, par_name, par_value )

char *requestor, *eq_name, *par_name, *par_value;

{
   unsigned int status;
   int res, datalen = sizeof( UVAL );
   UVAL tmp;
   char *ptr;
   char err_str[30];
   float atof();
   long int strtol();

   dprintf(("**** set_par ****\n"));

   if( (res = getval( par_name, VARIABLE, 0, tmp.s, &status, &datalen ))
                                                        != OM_SUCCESS )
   {
      sprintf( err_str, "getval error: %d", res );
      PPerr_rpt( PAM, PE_FATAL_ERROR, xap_name, err_str );
      return( !PAM_OK );
   }

   /* Switch on OM data type */
```

```
switch( status &= 0x1F )
{
   case INTEGER:
      tmp.i = (int) strtol( par_value, &ptr, 10 );
      if( ptr == par_value || *ptr != '\0' )
      {
         sprintf( err_str, "INT conv. error: %s", par_value );
         PPerr_rpt( PAM, PE_FATAL_ERROR, xap_name, err_str );
         return( !PAM_OK );
      }

      res = setval( par_name, VARIABLE, 0,tmp.s, &status, datalen );
      break;

   case FLOAT:
      tmp.f = atof( par_value );

      res = setval( par_name, VARIABLE, 0,tmp.s, &status, datalen );
      break;

   case OM_LNG_INT:
      tmp.l = strtol( par_value, &ptr, 10 );
      if( ptr == par_value || *ptr != '\0' )
      {
         sprintf( err_str, "LONG conv. error: %s", par_value );
         PPerr_rpt( PAM, PE_FATAL_ERROR, xap_name, err_str );
         return( !PAM_OK );
      }

      res = setval( par_name, VARIABLE, 0,tmp.s, &status, datalen );
      break;

   case 5:    /* BOOLEAN */
      if( par_value[0] == '0' || par_value[0] == '1' )
      {
         tmp.b = par_value[0] - '0';
      }

      else
      {
         sprintf( err_str, "BOOL conv. error: %s", par_value );
         PPerr_rpt( PAM, PE_FATAL_ERROR, xap_name, err_str );
         return( !PAM_OK );
      }

      res = setval( par_name, VARIABLE, 0,tmp.s, &status, datalen );
      break;

   case STRING:
      res = setval( par_name, VARIABLE, 0, par_value, &status,
                                          strlen( par_value ) + 1 );
      break;

   default:
      sprintf( err_str, "Unknown OM type: %d", status  );
      PPerr_rpt( PAM, PE_FATAL_ERROR, xap_name, err_str );
      return( !PAM_OK );
}

if( res != OM_SUCCESS )
{
   sprintf( err_str, "setval error: %d", res );
   PPerr_rpt( PAM, PE_FATAL_ERROR, xap_name, err_str );
   return( !PAM_OK );
}

return( PAM_OK );
}

/*****************************************************************
* @(#)strip.c  1.2  New System, Foxboro Company  8/17/89
*****************************************************************
*                                                               *
*  (C) Copyright by Foxboro Company 1986                        *
*                                                               *
*  All rights reserved: Foxboro Company 1986                    *
*                                                               *
**@0*************************************************************
*                                                               *
* FILE ID             : strip.c                                 *
*                                                               *
* PART NUMBER         :                                         *
*                                                               *
* FUNCTION            : Standard function.
```

```
 *
 * COMPONENT HISTORY   :                                              *
 * ---------------------------------------------------------------    *
 * 15 OCT 88  AAN, creation                                           *
 *                                                                    *
 *********************************************************************/

/*********************************************************************/
/*
 *  (C) Copyright by Foxboro Company 1986
 *
 *  All rights reserved: Foxboro Company 1986
 *
 **@1*****************************************************************
 *
 * NAME              : strip
 *
 * FUNCTION          : Removes trailing spaces from character string.
 *
 * INPUT PARAMETERS  : s  - input string
 *
 * OUTPUT PARAMETERS : s  - output string
 *
 * RETURN VALUE      : address of output parameter
 *
 * SYNOPSIS          : char *strip( s )
 *                     char *s;
 *
 * COMPONENT HISTORY :
 * ---------------------------------------------------------------
 * 15 OCT 88  AAN, creation
 *
 *********************************************************************/

char *strip_sp( s )

char *s;

{
   int i;

   for( i = strlen(s)-1; i >= 0 && s[i] == ' '; i-- )
      ;

   s[i+1] = '\0';
}

/*********************************************************************
 *  @(#)tst_bool.c       1.2  New System, Foxboro Company  8/17/89
 *********************************************************************
 *                                                                   *
 *  (C) Copyright by Foxboro Company 1986                            *
 *                                                                   *
 *  All rights reserved: Foxboro Company 1986                        *
 *                                                                   *
 **@0*****************************************************************
 *                                                                   *
 * FILE ID            : tst_bool                                     *
 *                                                                   *
 * PART NUMBER        :                                              *
 *                                                                   *
 * FUNCTION           : Standard function.                           *
 *                                                                   *
 * COMPONENT HISTORY  :                                              *
 * ---------------------------------------------------------------   *
 * 02 MAR 89  AAN, creation                                          *
 *                                                                   *
 *********************************************************************/

#include        <pam_com.h>
#include        <string.h>
#include        <isam.h>
#include        <fox/pream.h>
#include        <psrs.h>

/*********************************************************************/
/*
 *  (C) Copyright by Foxboro Company 1986
 *
 *  All rights reserved: Foxboro Company 1986
 *
 **@1*****************************************************************
 *
 * NAME              : tst_bool
```

```
 *
 * FUNCTION           : Evaluate relational expression of two boolean
 *                      values for a specific operator.
 *                      For any operator other than EQ or NE the result
 *                      of the expression is FALSE.
 *
 *
 * INPUT PARAMETERS   : oper  - operator
 *                      opnd1 - left operand
 *                      opnd2 - right operand
 *
 * OUTPUT PARAMETERS  :
 *
 * RETURN VALUE       : TRUE / FALSE
 *
 * SYNOPSIS           : bool tst_bool( oper, opnd1, opnd2 )
 *                      int oper;
 *                      int opnd1, opnd2;
 *
 * COMPONENT HISTORY :
 * ----------------------------------------------------------------
 * 02 MAR 89  AAM, creation
 *
 ******************************************************************/

bool tst_bool( oper, opnd1, opnd2 )

int oper;
int opnd1, opnd2;

{
   switch( oper )
   {
      case EQ:
            if( opnd1 != opnd2 )
               return( FALSE );

            break;

      case NE:
            if( opnd1 == opnd2 )
               return( FALSE );

            break;

      case GT:
      case LS:
      case GE:
      case LE:
            return( FALSE );


   }

   return( TRUE );
}

/******************************************************************
 *  @(#)tst_double.c     1.2  New System, Foxboro Company  8/17/89
 ******************************************************************
 *                                                                *
 *  (C) Copyright by Foxboro Company 1986                         *
 *                                                                *
 *  All rights reserved: Foxboro Company 1986                     *
 *                                                                *
 **&0*************************************************************
 *                                                                *
 * FILE ID              : tst_double.c                            *
 *                                                                *
 * PART NUMBER          :                                         *
 *                                                                *
 * FUNCTION             : Standard function.                      *
 *                                                                *
 * COMPONENT HISTORY    :                                         *
 * -------------------------------------------------------------- *
 * 15 OCT 88  AAM, creation                                       *
 *                                                                *
 ******************************************************************/

#include        <pam_com.h>
#include        <string.h>
#include        <isam.h>
#include        <fox/pream.h>
#include        <psrs.h>
```

```
/*****************************************************************/
/*
 *  (C) Copyright by Foxboro Company 1986
 *
 *  All rights reserved: Foxboro Company 1986
 *
 **@1**************************************************************
 *
 * NAME              : tst_double
 *
 * FUNCTION          : Evaluate relational expression of two double
 *                     values for a specific operator.
 *
 * INPUT PARAMETERS  : oper  - operator
 *                     opnd1 - left operand
 *                     opnd2 - right operand
 *
 * OUTPUT PARAMETERS :
 *
 * RETURN VALUE      : TRUE / FALSE
 *
 * SYNOPSIS          : bool tst_double( oper, opnd1, opnd2 )
 *                     int oper;
 *                     double opnd1, opnd2;
 *
 * COMPONENT HISTORY :
 * ----------------------------------------------------------------
 * 15 OCT 88  AAM, creation
 *
 *****************************************************************/

bool tst_double( oper, opnd1, opnd2 )

int oper;
double opnd1, opnd2;

{
   switch( oper )
   {
      case EQ:
            if( opnd1 != opnd2 )
               return( FALSE );

            break;

      case NE:
            if( opnd1 == opnd2 )
               return( FALSE );

            break;

      case GT:
            if( opnd1 <= opnd2 )
               return( FALSE );

            break;

      case LS:
            if( opnd1 >= opnd2 )
               return( FALSE );

            break;

      case GE:
            if( opnd1 < opnd2 )
               return( FALSE );

            break;

      case LE:
            if( opnd1 > opnd2 )
               return( FALSE );

            break;

   }

   return( TRUE );
}

/*****************************************************************
 * @(#)tst_float.c      1.2  New System, Foxboro Company  8/17/89
 *****************************************************************
 *                                                               *
```

```
 *  (C) Copyright by Foxboro Company 1986                              *
 *                                                                     *
 *  All rights reserved: Foxboro Company 1986                          *
 *                                                                     *
 **80*******************************************************************
 *                                                                     *
 * FILE ID              : tst_float                                    *
 *                                                                     *
 * PART NUMBER          :                                              *
 *                                                                     *
 * FUNCTION             : Standard function.                           *
 *                                                                     *
 * COMPONENT HISTORY    :                                              *
 * ------------------------------------------------------------------- *
 * 15 OCT 88  AAM, creation                                            *
 *                                                                     *
 **********************************************************************/

#include        <pam_com.h>
#include        <string.h>
#include        <isam.h>
#include        <fox/pream.h>
#include        <psrs.h>

/**********************************************************************/
/*
 *  (C) Copyright by Foxboro Company 1986
 *
 *  All rights reserved: Foxboro Company 1986
 *
 **81*******************************************************************
 *
 * NAME                 : tst_float
 *
 * FUNCTION             : Evaluate relational expression of two float
 *                        values for a specific operator.
 *
 * INPUT PARAMETERS     : oper  - operator
 *                        opnd1 - left operand
 *                        opnd2 - right operand
 *
 * OUTPUT PARAMETERS    :
 *
 * RETURN VALUE         : TRUE / FALSE
 *
 * SYNOPSIS             : bool tst_float( oper, opnd1, opnd2 )
 *                        int oper;
 *                        float opnd1, opnd2;
 *
 * COMPONENT HISTORY    :
 * --------------------------------------------------------------------
 * 15 OCT 88  AAM, creation
 *
 **********************************************************************/

bool tst_float( oper, opnd1, opnd2 )

int oper;
float opnd1, opnd2;

{
   switch( oper )
   {
      case EQ:
            if( opnd1 != opnd2 )
               return( FALSE );

            break;

      case NE:
            if( opnd1 == opnd2 )
               return( FALSE );

            break;

      case GT:
            if( opnd1 <= opnd2 )
               return( FALSE );

            break;

      case LS:
            if( opnd1 >= opnd2 )
               return( FALSE );
```

```
            break;

      case GE:
            if( opnd1 < opnd2 )
               return( FALSE );

            break;

      case LE:
            if( opnd1 > opnd2 )
               return( FALSE );

            break;

   }

   return( TRUE );
}

/*****************************************************************
*  @(#)tst_int.c       1.2  New System, Foxboro Company  8/17/89
******************************************************************
*                                                                *
*  (C) Copyright by Foxboro Company 1986                         *
*                                                                *
*  All rights reserved: Foxboro Company 1986                     *
*                                                                *
**&0**************************************************************
*                                                                *
* FILE ID             : tst_int                                  *
*                                                                *
* PART NUMBER         :                                          *
*                                                                *
* FUNCTION            : Standard function.                       *
*                                                                *
* COMPONENT HISTORY   :                                          *
* -------------------------------------------------------------- *
* 15 OCT 88  AAM, creation                                       *
*                                                                *
*****************************************************************/

#include        <pam_com.h>
#include        <string.h>
#include        <isam.h>
#include        <fox/pream.h>
#include        <psrs.h>


/*****************************************************************/
/*
 *  (C) Copyright by Foxboro Company 1986
 *
 *  All rights reserved: Foxboro Company 1986
 *
 **&1*************************************************************
 *
 * NAME              : tst_int
 *
 * FUNCTION          : Evaluate relational expression of two integer
 *                     values for a specific operator.
 *
 * INPUT PARAMETERS  : oper  - operator
 *                     opnd1 - left operand
 *                     opnd2 - right operand
 *
 * OUTPUT PARAMETERS :
 *
 * RETURN VALUE      : TRUE / FALSE
 *
 * SYNOPSIS          : bool tst_int( oper, opnd1, opnd2 )
 *                     int oper;
 *                     int opnd1, opnd2;
 *
 * COMPONENT HISTORY :
 * --------------------------------------------------------------
 * 15 OCT 88  AAM, creation
 *
 *****************************************************************/

bool tst_int( oper, opnd1, opnd2 )

int oper;
int opnd1, opnd2;
```

```
{
   switch( oper )
   {
      case EQ:
            if( opnd1 != opnd2 )
               return( FALSE );

            break;

      case NE:
            if( opnd1 == opnd2 )
               return( FALSE );

            break;

      case GT:
            if( opnd1 <= opnd2 )
               return( FALSE );

            break;

      case LS:
            if( opnd1 >= opnd2 )
               return( FALSE );

            break;

      case GE:
            if( opnd1 < opnd2 )
               return( FALSE );

            break;

      case LE:
            if( opnd1 > opnd2 )
               return( FALSE );

            break;

   }

   return( TRUE );
}

/****************************************************************
*  @(#)tst_long.c       1.2  New System, Foxboro Company  8/17/89
*****************************************************************
*                                                               *
*  (C) Copyright by Foxboro Company 1986                        *
*                                                               *
*  All rights reserved: Foxboro Company 1986                    *
*                                                               *
**#0*************************************************************
*                                                               *
* FILE ID              : tst_long                               *
*                                                               *
* PART NUMBER          :                                        *
*                                                               *
* FUNCTION             : Standard function.                     *
*                                                               *
* COMPONENT HISTORY    :                                        *
* ------------------------------------------------------------- *
* 15 OCT 88  PAM, creation                                      *
*                                                               *
****************************************************************/

#include        <pam_com.h>
#include        <string.h>
#include        <isam.h>
#include        <fox/preae.h>
#include        <psrs.h>

/****************************************************************/
/*
 *  (C) Copyright by Foxboro Company 1986
 *
 *  All rights reserved: Foxboro Company 1986
 *
 **#1*************************************************************
 *
 * NAME                : tst_long
 *
 * FUNCTION            : Evaluate relational expression of two long
 *                       values for a specific operator.
```

```
*
* INPUT PARAMETERS   : oper  - operator
*                      opnd1 - left operand
*                      opnd2 - right operand
*
* OUTPUT PARAMETERS :
*
* RETURN VALUE       : TRUE / FALSE
*
* SYNOPSIS           : bool tst_long( oper, opnd1, opnd2 )
*                      int oper;
*                      long opnd1, opnd2;
*
* COMPONENT HISTORY :
* ----------------------------------------------------------------
* 15 OCT 88  AAM, creation
*
*****************************************************************/

bool tst_long( oper, opnd1, opnd2 )

int oper;
long opnd1, opnd2;

{
   switch( oper )
   {
      case EQ:
            if( opnd1 != opnd2 )
               return( FALSE );

            break;

      case NE:
            if( opnd1 == opnd2 )
               return( FALSE );

            break;

      case GT:
            if( opnd1 <= opnd2 )
               return( FALSE );

            break;

      case LS:
            if( opnd1 >= opnd2 )
               return( FALSE );

            break;

      case GE:
            if( opnd1 < opnd2 )
               return( FALSE );

            break;

      case LE:
            if( opnd1 > opnd2 )
               return( FALSE );

            break;

   }

   return( TRUE );
}

/****************************************************************
* @(#)tst_string.c     1.2  New System, Foxboro Company  8/17/89
*****************************************************************
*                                                               *
* (C) Copyright by Foxboro Company 1986                         *
*                                                               *
* All rights reserved: Foxboro Company 1986                     *
*                                                               *
*****************************************************************
*                                                               *
* FILE ID             : tst_string                              *
*                                                               *
* PART NUMBER         :                                         *
*                                                               *
* FUNCTION            : Standard function.                      *
*                                                               *
```

```
 * COMPONENT HISTORY   :                                              *
 * ---------------------------------------------------------------- *
 * 15 OCT 88  AAN, creation                                         *
 *                                                                  *
 ******************************************************************/

#include        <pas_com.h>
#include        <string.h>
#include        <isam.h>
#include        <fox/preas.h>
#include        <psrs.h>

/******************************************************************/
/*
 *  (C) Copyright by Foxboro Company 1986
 *
 *  All rights reserved: Foxboro Company 1986
 *
 **&1**************************************************************
 *
 * NAME                : tst_string
 *
 * FUNCTION            : Evaluate relational expression of two string
 *                       values for a specific operator.
 *
 * INPUT PARAMETERS    : oper  - operator
 *                       opnd1 - left operand
 *                       opnd2 - right operand
 *
 * OUTPUT PARAMETERS :
 *
 * RETURN VALUE        : TRUE / FALSE
 *
 * SYNOPSIS            : bool tst_string( oper, opnd1, opnd2 )
 *                       int oper;
 *                       char *opnd1, *opnd2;
 *
 * COMPONENT HISTORY :
 * ----------------------------------------------------------------
 * 15 OCT 88  AAN, creation
 *
 ******************************************************************/

bool tst_string( oper, opnd1, opnd2 )

int oper;
char *opnd1, *opnd2;

{
   switch( oper )
   {
      case EQ:
            if( strcmp( opnd1, opnd2 ) != 0 )
               return( FALSE );

            break;

      case NE:
            if( strcmp( opnd1, opnd2 ) == 0 )
               return( FALSE );

            break;

      case GT:
            if( strcmp( opnd1, opnd2 ) <= 0 )
               return( FALSE );

            break;

      case LS:
            if( strcmp( opnd1, opnd2 ) >= 0 )
               return( FALSE );

            break;


      case GE:
            if( strcmp( opnd1, opnd2 ) < 0 )
               return( FALSE );

            break;
```

```
        case LE:
              if( strcmp( opnd1, opnd2 ) > 0 )
                 return( FALSE );

              break;

     }

     return( TRUE );
 }
```

```
#*************************************************************************
# @(#)selsrv.mk        1.3  I/A Series  Foxboro Company  89/08/17
#*************************************************************************
#                                                                        *
# Copyright by the Foxboro Company 1988                                  *
#                                                                        *
# All rights reserved Foxboro Company 1988                               *
#                                                                        *
#*************************************************************************
#                                                                        *
# FILE NAME          : selsrv.mk                                         *
#                                                                        *
# PART NUMBER        :                                                   *
#                                                                        *
# FUNCTION           : Makefile for PAN Select Server.                   *
#                                                                        *
# COMPONENT HISTORY :                                                    *
# --------------------------------------------------------------------   *
# 20 SEP 1988 - AAM - Created.                                           *
# 04 JUL 1989 - RRD - Adapted to standard layout.                        *
# 11 AUG 1989 - RRD - Link CL.                                           *
#                                                                        *
#*************************************************************************

PREFIX  =       /usr/pan

HDRDIR  =       $(PREFIX)/header

BINDIR  =       $(PREFIX)/bin

LIBDIR  =       $(PREFIX)/lib

OBJDIR  =       $(PREFIX)/selsrv/obj

SRCDIR  =       $(PREFIX)/selsrv/source

LIBPAN  =       $(LIBDIR)/libpan.a

LIBCOM  =       -lcom

LIBPSRS =       $(LIBDIR)/psrs.a

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h\
                $(HDRDIR)/psrs.h\
                $(HDRDIR)/seldef.h

OBJECTS =       $(OBJDIR)/selcom.o\
                $(OBJDIR)/selpar.o\
                $(OBJDIR)/selpld.o\
                $(OBJDIR)/selq.o\
                $(OBJDIR)/selsrv.o\
                $(OBJDIR)/seluse.o

TARGET  =       $(BINDIR)/selsrv

CFLAGS  =       -I$(HDRDIR) -c

LFLAGS  =       -i -z

$(TARGET):      $(OBJECTS) $(LIBPAN) $(LIBPSRS)
                cc $(LFLAGS) $(OBJECTS) $(LIBPSRS) $(LIBPAN) $(LIBCOM) -lpream \
                   -lisam -lfox -o $(TARGET)

$(OBJDIR)/selcom.o:     $(SRCDIR)/selcom.c $(HEADERS)
                        cc $(CFLAGS) $(SRCDIR)/selcom.c
                        mv selcom.o $(OBJDIR)
```

```
$(OBJDIR)/selpar.o:     $(SRCDIR)/selpar.c $(HEADERS)
                        cc $(CFLAGS) $(SRCDIR)/selpar.c
                        mv selpar.o $(OBJDIR)

$(OBJDIR)/selpld.o:     $(SRCDIR)/selpld.c $(HEADERS)
                        cc $(CFLAGS) $(SRCDIR)/selpld.c
                        mv selpld.o $(OBJDIR)

$(OBJDIR)/selq.o:       $(SRCDIR)/selq.c $(HEADERS)
                        cc $(CFLAGS) $(SRCDIR)/selq.c
                        mv selq.o $(OBJDIR)

$(OBJDIR)/selsrv.o:     $(SRCDIR)/selsrv.c $(HEADERS)
                        cc $(CFLAGS) $(SRCDIR)/selsrv.c
                        mv selsrv.o $(OBJDIR)

$(OBJDIR)/seluse.o:     $(SRCDIR)/seluse.c $(HEADERS)
                        cc $(CFLAGS) $(SRCDIR)/seluse.c
                        mv seluse.o $(OBJDIR)

/*************************************************************************
*  @(#)selcom.c 1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&0**********************************************************************
*                                                                        *
*  FILE NAME        : selcom.c                                           *
*                                                                        *
*  PART NUMBER      :                                                    *
*                                                                        *
*  FUNCTION         :  Communication of Select Server of PAN PSRS.       *
*                                                                        *
*  COMPONENT HISTORY :                                                   *
*  ---------------------------------------------------------------------- *
*  20 SEP 1988 - AAN - created                                           *
*  19 DEC 1988 - AAN - rcv_pac()                                         *
*  06 JAN 1989 - AAN - stop_pac() created                                *
*  16 AUG 1989 - RRD - rcv_pac()                                         *
*                                                                        *
*************************************************************************/

#include        <pam_com.h>
#include        <isam.h>
#include        <fox/pream.h>
#include        <psrs.h>
#include        <fox/cl_errors.h>

extern unsigned int refno;
extern char xap_name[];

/* Alias for communication with user ( PAN function library ) and
   alias for communication with Path Controller. */
char user_alias[ UE_LEN +1 ],
     lead_alias[ UE_LEN +1 ];

/* Send and receive message string for comm. with PAC. */
char pac_r_msg[BUFFER_SIZE +1],
     pac_s_msg[BUFFER_SIZE +1];

/* AP_NAME of the PAC currently communicating with. */
char pac_ap[ST_FLD_SZ +1];

/* Send and receive message string for comm. with PAN function
   library. */
char r_msg[BUFFER_SIZE +1],
     s_msg[BUFFER_SIZE +1];

/* AP_NAME of sender of current request.
   Message reference of current request. */
char source[UE_LEN +1],
     msg_ref[LINE_LENGTH +1];

/* Local functions. */
void send_o_select_p(), send_rsp();

char *rcv_rq();

/* External functions. */
```

```
/****************************************************************************
 * @(#)selcom.c 1.2  I/A Series  Foxboro Company  89/08/17
 ****************************************************************************
 *                                                                          *
 *  Copyright by the Foxboro Company 1988                                   *
 *                                                                          *
 *  All rights reserved Foxboro Company 1988                                *
 *                                                                          *
 **&2************************************************************************
 *
 *  NAME               : rcv_pac
 *
 *  FUNCTION           : Check response message(s) on PAC load message.
 *
 *  INPUT  PARAMETERS :
 *
 *  OUTPUT PARAMETERS :
 *
 *  RETURN VALUES      : PAN_OK      - Expected messages received within
 *                                     timeout.
 *                       NOT PAN_OK  - Expected messages not received
 *                                     within time out value.
 *
 *  SYNOPSIS           : int rcv_pac()
 *                       int msg_type;
 *
 *  COMPONENT HISTORY :
 *  ------------------------------------------------------------------------
 *  20 SEP 1988 - AAN - created
 *  19 DEC 1988 - AAN - allow O_PAC_LOAD response without P_INPROGRESS first.
 *  16 AUG 1989 - RRD - unlock PAC table after OK from PAC.
 *
 ***************************************************************************/
int rcv_pac()

{
   bool received = FALSE;
   int  err_val = PAN_OK;
   int to = 60;
   char *msg,
        ref[ LINE_LENGTH +1 ],
        type[ 6 + 1 ],
        err_code[ 6 + 1 ],
        src[ UE_LEN +1 ];
   int size;

   dprintf(("**** rcv_pac ****\n"));

   CLchg_ali( load_alias );

   /* Get O_PAC_LOAD message with correct reference from
      currently loading Path Controller. If message indicates
      P_IN_PROGRESS then wait for final O_PAC_LOAD response. */
   while( !received )
   {
   /* Severe error or time-out occurred. */
   if( CLrcv_msg( pac_r_msg, src, &size, to ) != CL_OK )
   {
      return( !PAN_OK );
   }

   dprintf(( "rcv from PAC [%s]: %s\n", src, pac_r_msg ));

   msg = PPget_fld( pac_r_msg, ref, LINE_LENGTH );
   msg = PPget_fld( msg, type, 6 );
   msg = PPget_fld( msg, err_code, 6 );

   /* Check message reference, type, source and return_code. */
   if( refno == atoi( ref ) && O_PAC_LOAD == atoi( type )
                            && strcmp( src, pac_ap ) == 0 )
   {
      err_val = atoi( err_code );
      if( err_val == P_IN_PROGRESS )
      {
         /* Wait for the final response message. */
         to = 120;
      }
      else if( err_val == PAN_OK )
      {
         received = TRUE;
      }
      else
      {
         /* Error occurred while loading PAC. */
         return( !PAN_OK );
```

```
         }
      }
   }
   /*
    * Unlocking the PAC table should be done only after the first message.
    * Because no sequence number is kept, unlock is always tried.
    */

   A530_ul_PAC();
   return( PAN_OK );
}

/***************************************************************************
 * @(#)selcom.c 1.2  I/A Series  Foxboro Company  89/08/17
 ***************************************************************************
 *                                                                         *
 *  Copyright by the Foxboro Company 1988                                  *
 *                                                                         *
 *  All rights reserved Foxboro Company 1988                               *
 *                                                                         *
 **&2************************************************************************
 *
 *  NAME              : rcv_rq
 *
 *  FUNCTION          : Receive message and extract msg reference, msg type and
 *                      the actual request.
 *
 *  INPUT  PARAMETERS : wait  - Boolean indicator for time out.
 *
 *  OUTPUT PARAMETERS : type   - msg type, or -1 if no message received.
 *
 *  RETURN VALUES     : actual request
 *
 *  SYNOPSIS          : char *rcv_rq( wait, type )
 *                      bool wait;
 *                      int  *type;
 *
 *  COMPONENT HISTORY :
 *  ------------------------------------------------------------------------
 *  20 SEP 1988 - AAN - created
 *
 **************************************************************************/
char *rcv_rq( wait, type )

bool wait;
int  *type;

{
   int res;
   char *rq, dummy[20];
   int to = 0;
   int size;

   dprintf(("**** rcv_rq ****\n"));

   rq = r_msg;
   CLchg_ali( user_alias );

   if( !wait )
      to = 1;

   if( CLrcv_msg( rq, source, &size, to ) != CL_OK )
   {
      /* Time out ( -> no message ) or error occurred. */
      dprintf(( "TIME OUT on receive\n" ));
      *type = -1;
      return( rq );
   }

   dprintf(( "rcv from requestor [%s]: %s\n", source, rq ));

   if( (rq = PPget_fld( rq, msg_ref, LINE_LENGTH )) == (char *) NULL ||
       (rq = PPget_fld( rq, dummy, 6 )) == (char *) NULL )
   {
      *type = 0;                  /* Invalid message. */
   }
   else
   {
      *type = atoi( dummy );
   }

   return( rq );
}
```

```
/*****************************************************************************
 * @(#)selcom.c 1.2  I/A Series  Foxboro Company  89/08/17
 *****************************************************************************
 *                                                                           *
 *  Copyright by the Foxboro Company 1988                                    *
 *                                                                           *
 *  All rights reserved Foxboro Company 1988                                 *
 *                                                                           *
 **%2*************************************************************************
 *
 *  NAME               : send_o_select_p
 *
 *  FUNCTION           : Send a O_SELECT_P message.
 *
 *  INPUT  PARAMETERS : a_name
 *                       ref         - message reference
 *                       result      - result code
 *                       path_name
 *                       key
 *
 *  OUTPUT PARAMETERS :
 *
 *  RETURN VALUES      :
 *
 *  SYNOPSIS           : void send_o_select_p( a_name, ref, result,
 *                                             path_name, key )
 *                       char *a_name, *ref, *path_name, *key;
 *                       int result;
 *
 *  COMPONENT HISTORY :
 *  --------------------------------------------------------------------------
 *  20 SEP 1988 - AAN - created
 *
 ****************************************************************************/
void send_o_select_p( a_name, ref, result, path_name, key )

char *a_name, *ref, *path_name, *key;
int result;

{
   dprintf(("**** send_o_select_p ****\n"));

   CLchg_alt( user_alias );

   sprintf( s_msg, "%s;%d;%d;", ref, O_SELECT_P, result );

   if( strlen( path_name ) != 0 )
   {
      strcat( s_msg, path_name );
      strcat( s_msg, ";" );
      strcat( s_msg, key );
      strcat( s_msg, ";" );
   }

   dprintf(( "snd to requestor [%s]: %s\n", a_name, s_msg ));
   CLsnd_msg( s_msg, a_name, strlen(s_msg) + 1 );
}

/*****************************************************************************
 * @(#)selcom.c 1.2  I/A Series  Foxboro Company  89/08/17
 *****************************************************************************
 *                                                                           *
 *  Copyright by the Foxboro Company 1988                                    *
 *                                                                           *
 *  All rights reserved Foxboro Company 1988                                 *
 *                                                                           *
 **%2*************************************************************************
 *
 *  NAME               : send_pac
 *
 *  FUNCTION           : Send a load message to the path controller.
 *
 *  INPUT  PARAMETERS :
 *
 *  OUTPUT PARAMETERS :
 *
 *  RETURN VALUES      : PAN_OK      - load message is sent, received
 *                                       and processed correctly.
 *                       NOT PAN_OK  - a send error, a receive error
 *                                       ( NO IN_PROGRESS msg ) or a
 *                                       process error ( error in reply
 *                                       message has occurred.
 *
 *  SYNOPSIS           : int send_pac()
```

```
*
* COMPONENT HISTORY :
* -----------------------------------------------------------------------
* 20 SEP 1988 - AAN - created
*
*************************************************************************/
int send_pac()

{
   dprintf(("**** send_pac ****\n"));

   CLchg_ali( load_alias );

   dprintf(( "snd to PAC [%s]: %s\n", pac_ap, pac_s_msg ));

   if( CLsnd_msg( pac_s_msg, pac_ap, strlen( pac_s_msg ) + 1 ) != CL_OK ||
                                              rcv_pac() != PAN_OK   )
   {
      refno++;
      return( !PAN_OK );
   }

   refno++;
   return( PAN_OK );
}

/************************************************************************
* @(#)selcom.c 1.2  I/A Series  Foxboro Company  89/08/17
*************************************************************************
*                                                                       *
* Copyright by the Foxboro Company 1988                                 *
*                                                                       *
* All rights reserved Foxboro Company 1988                              *
*                                                                       *
**&2*********************************************************************
*
* NAME              : send_rsp
*
* FUNCTION          : Send a response message on the latest request.
*
* INPUT  PARAMETERS : type    - msg type
*                     result  - result code
*
* OUTPUT PARAMETERS :
*
* RETURN VALUES     :
*
* SYNOPSIS          : void send_rsp( type, result )
*                     int type, result;
*
* COMPONENT HISTORY :
* -----------------------------------------------------------------------
* 20 SEP 1988 - AAN - created
*
*************************************************************************/
void send_rsp( type, result )

int type, result;

{
   dprintf(("**** send_rsp ****\n"));

   sprintf( s_msg, "%s;%d;%d;", msg_ref, type, result );

   dprintf(( "snd to requestor [%s]: %s\n", source, s_msg ));

   CLsnd_msg( s_msg, source, strlen(s_msg) + 1 );
}

/************************************************************************
* @(#)selcom.c 1.2  I/A Series  Foxboro Company  89/08/17
*************************************************************************
*                                                                       *
* Copyright by the Foxboro Company 1988                                 *
*                                                                       *
* All rights reserved Foxboro Company 1988                              *
*                                                                       *
**&1*********************************************************************
*
* NAME              : stop_pac
*
* FUNCTION          : stops a PAC with no paths loaded ( caused by error )
*
* INPUT  PARAMETERS :
```

```
 *
 *  OUTPUT PARAMETERS :
 *
 *  RETURN VALUES     :
 *
 *  SYNOPSIS          : void stop_pac()
 *
 *  COMPONENT HISTORY :
 *  ---------------------------------------------------------------------------
 *  06 JAN 1989 - AAH - created
 *
 ***************************************************************************/
void stop_pac()

{
   bool received = FALSE;
   int  err_val = PAM_OK;
   char *msg,
        ref[ LINE_LENGTH +1 ],
        type[ 6 + 1 ],
        err_code[ 6 + 1 ],
        src[ UE_LEN +1 ];
   int size;

   dprintf(("**** stop_pac ****\n"));

   CLchg_ali( load_alias );

   sprintf( pac_s_msg, "%d:%d::", refno, I_PAC_FREE );

   CLerr_rpt( PAM, PE_FATAL_ERROR, xap_name, "PAC load failure" );

   dprintf(( "snd to PAC [%s]: %s\n", pac_ap, pac_s_msg ));

   if( CLsnd_msg( pac_s_msg, pac_ap, strlen( pac_s_msg ) + 1 ) != CL_OK )
   {
      CLerr_rpt( PAM, PE_FATAL_ERROR, xap_name, "PAC stop failure" );
   }

   /* Get O_PAC_FREE message with correct reference from
      currently loading Path Controller. */
  while( !received )
  {
     /* Severe error or time-out occurred. */
     if( CLrcv_msg( pac_r_msg, src, &size, 60 ) != CL_OK )
     {
        CLerr_rpt( PAM, PE_FATAL_ERROR, xap_name, "PAC stop failure" );
        received = TRUE;
     }

     else
     {

        dprintf(( "rcv from PAC [%s]: %s\n", src, pac_r_msg ));

        msg = PPget_fld( pac_r_msg, ref, LINE_LENGTH );
        msg = PPget_fld( msg, type, 6 );
        msg = PPget_fld( msg, err_code, 6 );

        /* Check message reference, type, source and return_code. */
        if( refno == atoi( ref ) && O_PAC_FREE == atoi( type )
                                 && strcmp( src, pac_ap ) == 0 )
        {
           err_val = atoi( err_code );
           if( err_val != PAM_OK )
           {
              /* Error occurred while stopping PAC. */
              CLerr_rpt( PAM, PE_FATAL_ERROR, xap_name, "PAC stop failure" );
           }
           received = TRUE;
        }
     }
  }

  refno++;
}

/***************************************************************************
 * @(#)selpar.c 1.2  I/A Series  Foxboro Company  89/08/17
 ***************************************************************************
 *                                                                         *
 *  Copyright by the Foxboro Company 1988                                  *
 *                                                                         *
 *  All rights reserved Foxboro Company 1988                               *
```

```
/**$0****************************************************************
*                                                                  *
*  FILE NAME          : selpar.c                                   *
*                                                                  *
*  PART NUMBER        :                                            *
*                                                                  *
*  FUNCTION           :  Select Server parameter handler of PAM PSRS.
*                                                                  *
*  COMPONENT HISTORY :                                             *
*  --------------------------------------------------------------- *
*  20 SEP 1988 - AAM - created                                     *
*                                                                  *
*******************************************************************/

#include        <pam_com.h>
#include        <isam.h>
#include        <fox/pream.h>
#include        <psrs.h>

/* Data definitions. */
extern U_ELM u_list[ MAX_PATH_ELEM ];

extern int tot_use;

/* Local functions. */
void splt_assign();

/*******************************************************************
*  @(#)selpar.c 1.2  I/A Series  Foxboro Company  89/08/17
********************************************************************
*                                                                  *
*  Copyright by the Foxboro Company 1988                           *
*                                                                  *
*  All rights reserved Foxboro Company 1988                        *
*                                                                  *
**$1****************************************************************
*                                                                  *
*  NAME              : set_assign                                  *
*                                                                  *
*  FUNCTION          : Process the 'assign' type elem_cond's for
*                      a particular path and element.              *
*                                                                  *
*  INPUT  PARAMETERS : path_name                                   *
*                      elem_name                                   *
*                                                                  *
*  OUTPUT PARAMETERS :                                             *
*                                                                  *
*  RETURN VALUES     : PAM_OK     - all conditions are processed OK
*                      NOT PAM_OK - at one of the conditions can not
*                                   be processed correctly         *
*                                                                  *
*  SYNOPSIS          : int set_assign( path_name, elem_name )
*                      char *path_name, *elem_name;                *
*                                                                  *
*  COMPONENT HISTORY :                                             *
*  --------------------------------------------------------------- *
*  20 SEP 1988 - AAM - created                                     *
*                                                                  *
*******************************************************************/
int set_assign( path_name, elem_name )

char *path_name, *elem_name;

{
   int res;
   char assign[COND_SZ +1],
        assi[2];
   char par_name[P_NAME_SZ +1], par_value[P_VALUE_SZ +1];

   dprintf(("**** set_assign ****\n"));

   assi[0] = ASSIGN;
   assi[1] = '\0';

   res = A110_r_ELEM_COND( path_name, elem_name, assi,
                           "condition", assign );

   while( res == PAM_OK )
   {
      /* Extract parameter name and value from specification. */
      /* Set the parameter to the value. */
      splt_assign( assign, par_name, par_value );
```

```
      if( set_par( path_name, elem_name,
                   par_name, par_value ) != PAM_OK )
      {
         return( !PAM_OK );
      }

      /* Read the next condition. */
      res = A111_n_ELEM_COND( assign );
   }

   return( PAM_OK );
}

/***************************************************************************
 * @(#)selpar.c 1.2  I/A Series  Foxboro Company  89/08/17
 ***************************************************************************
 *                                                                         *
 * Copyright by the Foxboro Company 1988                                   *
 *                                                                         *
 * All rights reserved Foxboro Company 1988                                *
 *                                                                         *
 **&2***********************************************************************
 *
 * NAME              : splt_assign
 *
 * FUNCTION          : Split an assign type condition ( COND_ELEM )
 *                     into name and value.
 *
 * INPUT  PARAMETERS : condition
 *
 * OUTPUT PARAMETERS : name
 *                     value
 *
 * RETURN VALUES     :
 *
 * SYNOPSIS          : void splt_assign( condition, name, value )
 *                     char *condition, *name, *value;
 *
 * COMPONENT HISTORY :
 * ------------------------------------------------------------------------
 * 20 SEP 1988 - AAM - created
 *
 **************************************************************************/
void splt_assign( condition, name, value )

char *condition, *name, *value;

{
   /* Extract the parameter name until the '=' character. */
   while( *condition != '=' )
   {
      *name = *condition;
      name++;
      condition++;
   }

   *name = '\0';
   condition++;        /* Skip '=' */

   /* Extract the rest of the specification as the value. */
   while( *condition != '\0' )
   {
      *value = *condition;
      value++;
      condition++;
   }

   *value = '\0';
}

/***************************************************************************
 * @(#)selpld.c 1.2  I/A Series  Foxboro Company  89/08/17
 ***************************************************************************
 *                                                                         *
 * Copyright by the Foxboro Company 1988                                   *
 *                                                                         *
 * All rights reserved Foxboro Company 1988                                *
 *                                                                         *
 **&0***********************************************************************
 *                                                                         *
 * FILE NAME         : selpld.c                                            *
 *                                                                         *
 * PART NUMBER       :                                                     *
 *                                                                         *
```

```
 * FUNCTION          : PAC load & start of Select Server of PAN PSRS.      *
 *                                                                         *
 * COMPONENT HISTORY :                                                     *
 *                                                                         *
 * -------------------------------------------------------------------    *
 * 20 SEP 1988 - AAM - created                                             *
 * 05 JAN 1989 - AAM - la_path                                             *
 *                                                                         *
 **************************************************************************/

#include        <pam_com.h>
#include        <stdio.h>
#include        <string.h>
#include        <isam.h>
#include        <fox/pream.h>
#include        <psrs.h>

extern char pac_s_msg[];
extern char bindir[];
extern char log_ap[];
extern char pac_ap[];
extern char xap_name[];

/* Name the the path currently being loaded. */
char path_name[ST_FLD_SZ +1];

/* Message reference ( number ), increased for each message. */
unsigned int refno = 0;

/* Flag to indicate that PAC was started ( i.e. first path loaded ),
   so in case of load error ( e.g. FORMAT ERROR ) the PAC must be stopped. */
bool pac_started = FALSE;

/* Local functions. */
void la_hdr(),
     stop_pac();


/* External functions. */


/**************************************************************************
 * @(#)selpld.c 1.2  I/A Series  Foxboro Company  89/08/17
 **************************************************************************
 *                                                                         *
 * Copyright by the Foxboro Company 1988                                   *
 *                                                                         *
 * All rights reserved Foxboro Company 1988                                *
 *                                                                         *
 **&2***********************************************************************
 *
 * NAME              : la_ela_alrm
 *
 * FUNCTION          : Compiles a PAC load message from the element
 *                     alarm variables.
 *
 * INPUT  PARAMETERS : var  - element alarm variable name
 *
 * OUTPUT PARAMETERS :
 *
 * RETURN VALUES     : PAM_OK
 *                     NOT PAM_OK
 *
 * SYNOPSIS          : int la_ela_alrm( var )
 *                     char *var;
 *
 * COMPONENT HISTORY :
 *
 * ----------------------------------------------------------------------
 * 20 SEP 1988 - AAM - created
 *
 **************************************************************************/
int la_ela_alrm( var )

char *var;

{
   dprintf(("**** la_ela_alrm ****\n"));

   if( strlen( pac_s_msg ) + strlen( var ) + 5 > BUFFER_SIZE )
   {
      if( send_pac() != PAM_OK )
      {
         return( !PAM_OK );
      }
      la_hdr();
   }
```

```
   strcat( pac_s_msg, "EA;" );
   strcat( pac_s_msg, var );
   strcat( pac_s_msg, ";\n" );

   return( PAM_OK );
}

/*************************************************************************
*  @(#)selpld.c 1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&2**********************************************************************
*
*  NAME              : lm_end
*
*  FUNCTION          : Finishes the PAC load message and sends the message.
*
*  INPUT  PARAMETERS :
*
*  OUTPUT PARAMETERS :
*
*  RETURN VALUES     : PAM_OK
*                      NOT PAM_OK
*
*  SYNOPSIS          : int lm_end()
*
*  COMPONENT HISTORY :
*  -----------------------------------------------------------------------
*  20 SEP 1988 - AAM - created
*
*************************************************************************/
int lm_end()

{
   dprintf(("**** lm_end ****\n"));

   if( strlen( pac_s_msg ) + 5 > BUFFER_SIZE )
   {
      if( send_pac() != PAM_OK )
      {
         return( !PAM_OK );
      }
      lm_hdr();
   }

   strcat( pac_s_msg, "END;\n" );

   if( send_pac() != PAM_OK )
      return( !PAM_OK );

   return( PAM_OK );
}

/*************************************************************************
*  @(#)selpld.c 1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&2**********************************************************************
*
*  NAME              : lm_hdr
*
*  FUNCTION          : Compiles the header for a PAC load msg.
*
*  INPUT  PARAMETERS :
*
*  OUTPUT PARAMETERS :
*
*  RETURN VALUES     :
*
*  SYNOPSIS          : void lm_hdr()
*
*  COMPONENT HISTORY :
*  -----------------------------------------------------------------------
*  20 SEP 1988 - AAM - created
*
*************************************************************************/
```

```
void lm_hdr()

{
   char dummy[6];

   dprintf(("**** lm_hdr ****\n"));

   sprintf( pac_s_msg, "%d;%d;%s;\n", refno, I_PAC_LOAD, path_name );
}

/***************************************************************************
*  @(#)selpld.c 1.2  I/A Series  Foxboro Company  89/08/17
****************************************************************************
*
*  Copyright by the Foxboro Company 1988
*
*  All rights reserved Foxboro Company 1988
*
**%2************************************************************************
*
*  NAME              : lm_par_val
*
*  FUNCTION          : Compiles a PAC load message from the par_val
*                      data.
*
*  INPUT  PARAMETERS : par_val  - par_value data
*
*  OUTPUT PARAMETERS :
*
*  RETURN VALUES     : PAM_OK
*                      NOT PAM_OK
*
*  SYNOPSIS          : int lm_par_val( par_val )
*                      P_REC_PAR_VALUE par_val;
*
*  COMPONENT HISTORY :
*  ------------------------------------------------------------------------
*  20 SEP 1988 - AAM - created
*
***************************************************************************/
int lm_par_val( par_val )

P_REC_PAR_VALUE par_val;

{
   dprintf(("**** lm_par_val ****\n"));

   if( strlen( pac_s_msg ) + 11
             + strlen( par_val->step_no )
             + strlen( par_val->par_type )
             + strlen( par_val->par_name )
             + strlen( par_val->par_value )
             + strlen( par_val->sync_rule ) > BUFFER_SIZE )
   {
      if( send_pac() != PAM_OK )
      {
         return( !PAM_OK );
      }
      lm_hdr();
   }

   sprintf( ( pac_s_msg + strlen( pac_s_msg ) ),
                    "STEP;%s;%s;%s;%s;%s;\n",
                                              par_val->step_no,
                                              par_val->par_type,
                                              par_val->par_name,
                                              par_val->par_value,
                                              par_val->sync_rule );

   return( PAM_OK );
}

/***************************************************************************
*  @(#)selpld.c 1.2  I/A Series  Foxboro Company  89/08/17
****************************************************************************
*
*  Copyright by the Foxboro Company 1988
*
*  All rights reserved Foxboro Company 1988
*
**%2************************************************************************
*
*  NAME              : lm_path
```

```
 *
 * FUNCTION          : Compiles a PAC load message from the path data.
 *
 * INPUT  PARAMETERS : owner            - path owner name
 *                     copas            - copas attributes
 *                     environment      - the path's environment
 *
 * OUTPUT PARAMETERS :
 *
 * RETURN VALUES     : PAM_OK
 *                     NOT PAM_OK
 *
 * SYNOPSIS          : int lm_path( owner, copas, environment )
 *                     char *owner, *environment;
 *                     P_REC_COPAS copas;
 *
 * COMPONENT HISTORY :
 * ------------------------------------------------------------------------
 * 20 SEP 1988 - AAM - created
 * 05 JAN 1989 - AAM - pep_type attribute added to COPAS
 *
 **************************************************************************/
int lm_path( owner, copas, environment )

char *owner, *environment;
P_REC_COPAS copas;

{
   dprintf(("**** lm_path ****\n"));

   /* Initialize load message handling. */

   strcpy( path_name, copas->path_name );
   lm_hdr();

   if( strlen( pac_s_msg ) + 14              /* <PATH> + ';' + <NL> */
             + strlen( owner )
             + strlen( copas->alarm_ref )
             + strlen( copas->operation_mode )
             + strlen( copas->auto_failsafe )
             + strlen( copas->init_pattern )
             + strlen( copas->fail_pattern )
             + strlen( copas->pep_type )
             + strlen( copas->path_excep_proc )
             + strlen( environment ) > BUFFER_SIZE )
   {
      return( !PAM_OK );
   }

   sprintf( ( pac_s_msg + strlen( pac_s_msg ) ),
              "PATH;%s;%s;%s;%s;%s;%s;%s;%s;%s;\n",
                                               owner,
                                               copas->alarm_ref,
                                               copas->operation_mode,
                                               copas->auto_failsafe,
                                               copas->fail_pattern,
                                               copas->init_pattern,
                                               copas->pep_type,
                                               copas->path_excep_proc,
                                               environment );

   return( PAM_OK );
}

/**************************************************************************
 * @(#)selpld.c 1.2  I/A Series  Foxboro Company  89/08/17
 **************************************************************************
 *                                                                        *
 * Copyright by the Foxboro Company 1988                                  *
 *                                                                        *
 * All rights reserved Foxboro Company 1988                               *
 *                                                                        *
 **82**********************************************************************
 *
 * NAME              : lm_pattern
 *
 * FUNCTION          : Compiles a PAC load message from the pattern
 *                     names.
 *
 * INPUT  PARAMETERS : pattern  - pattern name
 *
 * OUTPUT PARAMETERS :
 *
 * RETURN VALUES     : PAM_OK
```

```
*                         NOT PAM_OK
*
*  SYNOPSIS             : int lm_pattern( pattern )
*                         char *pattern;
*
*  COMPONENT HISTORY :
*  ---------------------------------------------------------------------
*  20 SEP 1988 - AAM - created
*
*************************************************************************/
int lm_pattern( pattern )

char *pattern;

{
   dprintf(("**** lm_pattern ****\n"));

   if( strlen( pac_s_msg ) + strlen( pattern ) + 6 > BUFFER_SIZE )
   {
      if( send_pac() != PAM_OK )
      {
         return( !PAM_OK );
      }
      lm_hdr();
   }

   strcat( pac_s_msg, "PAT;" );
   strcat( pac_s_msg, pattern );
   strcat( pac_s_msg, ";\n" );

   return( PAM_OK );
}

/************************************************************************
*  @(#)selpld.c 1.2  I/A Series  Foxboro Company  89/08/17
*************************************************************************
*                                                                       *
*  Copyright by the Foxboro Company 1988                                *
*                                                                       *
*  All rights reserved Foxboro Company 1988                             *
*                                                                       *
**&1*********************************************************************
*
*  NAME                 : load_pac
*
*  FUNCTION             : Load the Path Controller with rquired path data.
*
*  INPUT  PARAMETERS : requestor    - requester of select
*                        copas        - copas record
*                        environment - the path's environment
*
*  OUTPUT PARAMETERS :
*
*  RETURN VALUES      : PAM_OK      - All data successfully down loaded.
*                        NOT PAM_OK - Failure during down loading.
*
*  SYNOPSIS            : int load_pac( requester, copas, *environment )
*                        char *requestor, *environment;
*                        P_REC_COPAS copas;
*
*  COMPONENT HISTORY :
*  ---------------------------------------------------------------------
*  20 SEP 1988 - AAM - created
*  05 JAN 1989 - AAM - ge_alarmref now supported
*
*************************************************************************/
int load_pac( requestor, copas, environment )

char *requestor, *environment;
P_REC_COPAS copas;

{
   int res;
   char pat_name[ ST_FLD_SZ +1];
   char elem_alarm[ ST_FLD_SZ +1];
   char alarm_var[ P_NAME_SZ +1];
   REC_PAR_VALUE par_value;

   dprintf(("**** load_pac ****\n"));

   /* Compile load message header info. */
   /* For the time being ( until better alternative ):
      WAIT until PAC has registered itself ... */
   sleep( 5 );
   if( lm_path( requestor, copas, environment ) != PAM_OK )
```

```
{
   if( pac_started )
      stop_pac();
   return( !PAM_OK );
}

/* Add all element alarm variables to message. */

res = A210_r_ELEM_ALARM(copas->path_name,"","elem_name",elem_alarm);

while( res == PAM_OK )
{
   ge_alarmref( elem_alarm, alarm_var );
   if( lm_elm_alrm( alarm_var ) != PAM_OK )
   {
      if( pac_started )
         stop_pac();

      return( !PAM_OK );
   }

   res = A211_n_ELEM_ALARM( elem_alarm );
}

/* Add all patterns to message. */
res = A310_r_PAT( copas->path_name, "", "pattern_name", pat_name );

while( res == PAM_OK )
{
   if( lm_pattern( pat_name ) != PAM_OK )
   {
      if( pac_started )
         stop_pac();

      return( !PAM_OK );
   }

   /* Add all parameter value to message for a pattern. */
   res = A410_r_PAR_VALUE( copas->path_name,pat_name,"",&par_value );

   while( res == PAM_OK )
   {
      if( lm_par_val( &par_value ) != PAM_OK )
      {
         if( pac_started )
            stop_pac();

         return( !PAM_OK );
      }

      res = A411_n_PAR_VALUE( &par_value );
   }

   res = A311_n_PAT( pat_name );

}

/* Finish message and send. */
   if( lm_end() != PAM_OK )
   {
      if( pac_started )
         stop_pac();

      return( !PAM_OK );
   }

   return( PAM_OK );
}

/************************************************************************
*  @(#)selpld.c 1.2  I/A Series  Foxboro Company  89/08/17
*************************************************************************
*                                                                       *
*  Copyright by the Foxboro Company 1988                                *
*                                                                       *
*  All rights reserved Foxboro Company 1988                             *
*                                                                       *
**a1*********************************************************************
*
*  NAME               : start_pac
*
*  FUNCTION           : Start the path controller.
*
*  INPUT  PARAMETERS :
*
```

```
 * OUTPUT PARAMETERS : key  - key for the path
 *
 * RETURN VALUES     : PAM_OK
 *                     NOT PAM_OK
 *
 * SYNOPSIS          : int start_pac( key )
 *                     char *key;
 *
 * COMPONENT HISTORY :
 * -----------------------------------------------------------------------
 * 20 SEP 1988 - AAM - created
 *
 *************************************************************************/
int start_pac( key )

char *key;

{
   int load;
   char lbug[7+1],
        pacno[2+1],
        cmd[ 120 ];

   dprintf(("**** start_pac ****\n"));

   if( A520_r_PAC( lbug, pacno, &load ) != PAM_OK )
   {
      PPerr_rpt( PAM, PE_FATAL_ERROR, xap_name,
                 "start_pac - no more PAC's available" );
      return( !PAM_OK );
   }

   if( load == 0 )
   {
      /* PAC must be started first.. */
      pac_started = TRUE;
      sprintf( cmd, "%s/pac PAC%s%s %s\&", bindir,
                                            lbug,
                                            pacno,
                                            log_ap );
      if( system( cmd ) < 0 )
      {
         return( !PAM_OK );
      }
   }
   else
   {
      pac_started = FALSE;
   }

   sprintf( key, "PAC%s%s", lbug, pacno );

   strcpy( pac_ap, key );

   return( PAM_OK );
}

/*************************************************************************
 * @(#)selq.c   1.2  I/A Series  Foxboro Company  89/08/17
 *************************************************************************
 *                                                                       *
 * Copyright by the Foxboro Company 1988                                 *
 *                                                                       *
 * All rights reserved Foxboro Company 1988                              *
 *                                                                       *
 **&O*********************************************************************
 *                                                                       *
 * FILE NAME         : selq.c                                            *
 *                                                                       *
 * PART NUMBER       :                                                   *
 *                                                                       *
 * FUNCTION          :  Select queue routines of Select Server of        *
 *                      PAM PSRS.                                        *
 *                                                                       *
 * COMPONENT HISTORY :                                                   *
 * --------------------------------------------------------------------- *
 * 20 SEP 1988 - AAM - created                                           *
 *                                                                       *
 *************************************************************************/

#include        <pam_com.h>
#include        <string.h>
#include        <isam.h>
#include        <fox/pream.h>
#include        <psrs.h>
```

```
extern char source[],
            msg_ref[LINE_LENGTH +1];

extern char xap_name[];

/* The select message queue. */
/* The queue is a circular list of empty tuple, that each can be filled
   with a select request. */
Q_ENTRY sel_queue[MX_Q_ENTRY];

/* The first entry in the queue ( HEAD of queue ).
   The first free entry inthe queue ( TAIL of queue ). */
P_Q_ENTRY first_q_entry = (P_Q_ENTRY) NULL,
          free_q_entry  = sel_queue;

/* Local functions. */
void add_q_entry(), del_q_entry();
int  alloc_q_entry(), srch_q_entry();

/* External functions. */
void send_rsp();

char *malloc(),
     *PPget_fld();

/*************************************************************************
*  @(#)selq.c   1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&2**********************************************************************
*
*  NAME              : add_q_entry
*
*  FUNCTION          : Adds a select request to the sel_queue.
*                      When queue is full,  it extends the queue.
*
*  INPUT  PARAMETERS : rq  - request
*
*  OUTPUT PARAMETERS :
*
*  RETURN VALUES     :
*
*  SYNOPSIS          : void add_q_entry( rq )
*                      char *rq;
*
*  COMPONENT HISTORY :
*  -----------------------------------------------------------------------
*  20 SEP 1988 - AAM - created
*
*************************************************************************/
void add_q_entry( rq )

char *rq;

{
   dprintf(("**** add_q_entry ****\n"));

   /* Allocate space for request. */
   free_q_entry->rq = malloc( (unsigned int) strlen(rq) +1 );

   if( free_q_entry->rq == (char *) NULL )
   {
      PPerr_rpt( PAM, PE_FATAL_ERROR, xap_name, "add_q_entry - malloc" );
      send_rsp( O_SELECT_P, P_FATAL_ERROR );
      return;
   }

   if( first_q_entry == (P_Q_ENTRY) NULL )
   {
      /* The select queue was empty. */
      first_q_entry = free_q_entry;
   }

   /* Check to see if queue is full. If so, allocate space for some
      more entries. */
   if( free_q_entry->next == first_q_entry )
   {
      if( alloc_q_entry( &(free_q_entry->next) ) != PAM_OK )
      {
         PPerr_rpt( PAM,PE_FATAL_ERROR,xap_name,"add_q_entry - malloc" );
         send_rsp( O_SELECT_P, P_FATAL_ERROR );
```

```
      if( free_q_entry == first_q_entry )
      {
         /* Queue remains empty. */
         first_q_empty = (P_Q_ENTRY) NULL;
      }
      /* Entry not filled, free request space. */
      free( free_q_entry->rq );
      return;
    }
  }

  /* Store source xap_name, message reference and request. */
  strcpy( free_q_entry->source, source );
  strcpy( free_q_entry->ref   , msg_ref);
  strcpy( free_q_entry->rq    , rq     );

  /* Set free_q_entry on next ( free ) entry. */
  free_q_entry = free_q_entry->next;

  send_rsp( O_SELECT_P, P_IN_PROGRESS );
}

/*************************************************************************
 * @(#)selq.c   1.2  I/A Series  Foxboro Company  89/08/17
 *************************************************************************
 *                                                                       *
 * Copyright by the Foxboro Company 1988                                 *
 *                                                                       *
 * All rights reserved Foxboro Company 1988                              *
 *                                                                       *
 **&2**********************************************************************
 *
 * NAME              : alloc_q_entry
 *
 * FUNCTION          : Allocates memory for a number of q_entries and
 *                     initializes them in a way that a circular linked
 *                     is maintained.
 *
 * INPUT  PARAMETERS :
 *
 * OUTPUT PARAMETERS : strt - address of first entry in allocated list
 *
 * RETURN VALUES     : PAM_OK     - allocation + initialization OK
 *                     NOT PAM_OK - an error occurred
 *
 * SYNOPSIS          : int alloc_q_entry( cnt, strt )
 *                     P_Q_ENTRY *strt;
 *
 * COMPONENT HISTORY :
 * ----------------------------------------------------------------------
 * 20 SEP 1988 - AAM - created
 *
 ************************************************************************/
int alloc_q_entry( strt )

P_Q_ENTRY *strt;

{
  int i;
  P_Q_ENTRY tmp;

  dprintf(("**** alloc_q_entry ****\n"));

  /* Allocate space for AL_Q_ENTRY entries. */
  tmp =(P_Q_ENTRY) malloc((unsigned int) AL_Q_ENTRY*sizeof( Q_ENTRY ));

  if( tmp == (P_Q_ENTRY) NULL )
  {
     return( !PAM_OK );
  }

  /* Initialize all entries except the last one. */
  for( i = 0; i < AL_Q_ENTRY-1; i++ )
  {
     tmp[i].next = &(tmp[i+1]);
  }
  /* Let the last entry point back to first_q_entry and
     let strt point to first allocated entry to restore
     circular list. */

  tmp[AL_Q_ENTRY-1].next = first_q_entry;
  *strt = tmp;
```

```
   return( PAM_OK );

}

/*****************************************************************
 * @(#)selq.c   1.2  I/A Series  Foxboro Company  89/08/17
 *****************************************************************
 *                                                               *
 *  Copyright by the Foxboro Company 1988                        *
 *                                                               *
 *  All rights reserved Foxboro Company 1988                     *
 *                                                               *
 **&2*************************************************************
 *
 *  NAME              : del_q_entry
 *
 *  FUNCTION          : Deletes a select request from the sel_queue.
 *
 *  INPUT  PARAMETERS : q_entry  - entry to be deleted
 *
 *  OUTPUT PARAMETERS :
 *
 *  RETURN VALUES     :
 *
 *  SYNOPSIS          : void del_q_entry( q_entry )
 *                      P_Q_ENTRY q_entry;
 *
 *  REMARKS           : A deleted entry is not removed from the linked
 *                      list, but only the 'rq' attribute is set to
 *                      (char *) NULL. This leaves the linked list in
 *                      tact, but it might have some unfilled entries.
 *                      If the first entry is deleted, first_q_entry
 *                      is set to the next ( not deleted ) entry.
 *
 *  COMPONENT HISTORY :
 *  ------------------------------------------------------------------
 *  20 SEP 1988 - AAM - created
 *
 *****************************************************************/
void del_q_entry( q_entry )

P_Q_ENTRY q_entry;

{
   dprintf(("**** del_q_entry ****\n"));

   /* Free space for request. */
   free( q_entry->rq );
   /* Mark entry 'deleted'. */
   q_entry->rq = (char *) NULL;

   if( q_entry == first_q_entry )
   {
      /* First entry in queue deleted. Find new first entry. */
      /* Skip deleted entries. */
      while( first_q_entry->rq == (char *) NULL &&
             first_q_entry     != free_q_entry     )
      {
         first_q_entry = first_q_entry->next;
      }

      if( first_q_entry == free_q_entry )
      {
         /* Select queue is empty. */
         first_q_entry = (P_Q_ENTRY) NULL;
      }

   }
}

/*****************************************************************
 * @(#)selq.c   1.2  I/A Series  Foxboro Company  89/08/17
 *****************************************************************
 *                                                               *
 *  Copyright by the Foxboro Company 1988                        *
 *                                                               *
 *  All rights reserved Foxboro Company 1988                     *
 *                                                               *
 **&2*************************************************************
 *
 *  NAME              : init_q
 *
```

```
*  FUNCTION          : Initialize the select queue, i.e. it create
*                      a linked list by setting the poiter values.
*
*  INPUT  PARAMETERS :
*
*  OUTPUT PARAMETERS :
*
*  RETURN VALUES     :
*
*  SYNOPSIS          : void init_q()
*
*  COMPONENT HISTORY :
*  ------------------------------------------------------------------------
*  20 SEP 1988 - AAM - created
*
**************************************************************************/
void init_q()
{
   int i;

   /* Initialize the sel_queue except the last one. */
   for( i = 0; i < MX_Q_ENTRY-1; i++ )
   {
      sel_queue[i].next = &(sel_queue[i+1]);
   }

   /* Let last entry point back to first entry to obtain
      a circular last. */
   sel_queue[MX_Q_ENTRY-1].next = sel_queue;
}

/*************************************************************************
*  @(#)selq.c   1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&2**********************************************************************
*
*  NAME              : srch_q_entry
*
*  FUNCTION          : Search an entry in the sel_queue with keys
*                      'environment' and 'requestor'.
*
*  INPUT  PARAMETERS : req_key
*                      env_key
*
*  OUTPUT PARAMETERS : q_entry    - first entry with desired 'requestor'
*                                   and 'environment' values.
*
*  RETURN VALUES     : PAM_OK      - entry found
*                      NOT PAM_OK  - entry not found
*
*  SYNOPSIS          : int srch_q_entry( req_key,env_key,q_entry )
*                      char *req_key, *env_key;
*                      P_Q_ENTRY *q_entry;
*
*  COMPONENT HISTORY :
*  ------------------------------------------------------------------------
*  20 SEP 1988 - AAM - created
*
**************************************************************************/
int srch_q_entry( req_key, env_key, q_entry )

char *req_key, *env_key;
P_Q_ENTRY *q_entry;

{
   P_Q_ENTRY tmp;
   char *rq;
   char requestor[ST_FLD_SZ +1],
        environment[ST_FLD_SZ +1];

   dprintf(("**** srch_q_entry ****\n"));

   tmp = first_q_entry;

   if( tmp == (P_Q_ENTRY) NULL )
   {
      /* Queue is empty. */
      *q_entry = (P_Q_ENTRY) NULL;
      return( !PAM_OK );
   }
```

```
   while( tmp != free_q_entry )
   {
      /* Make sure queue entry is not a deleted entry. */
      if( tmp->rq != (char *) NULL )
      {
         rq = tmp->rq;
         if( (rq=PPget_fld( rq, requestor,ST_FLD_SZ )) != (char *) NULL &&
             (rq=PPget_fld( rq, environment,ST_FLD_SZ))!= (char *) NULL &&
             strcmp( environment, env_key ) == 0 &&
             strcmp( requestor  , req_key ) == 0    )
         {
            /* Queue entry found. */
            *q_entry = tmp;
            return( PAM_OK );
         }
      }

      tmp = tmp->next;
   }

   /* Entire list searched, entry not found. */
   *q_entry = (P_Q_ENTRY) NULL;
   return( !PAM_OK );
}

/*********************************************************************
 * @(#)selsrv.c 1.2  I/A Series  Foxboro Company  89/08/17
 *********************************************************************
 *                                                                   *
 * Copyright by the Foxboro Company 1988                             *
 *                                                                   *
 * All rights reserved Foxboro Company 1988                          *
 *                                                                   *
 **&0*****************************************************************
 *                                                                   *
 * FILE NAME         : selsrv.c                                      *
 *                                                                   *
 * PART NUMBER       :                                               *
 *                                                                   *
 * FUNCTION          :  Select Server of PAM PSRS.                   *
 *                                                                   *
 * COMPONENT HISTORY :                                               *
 * ----------------------------------------------------------------- *
 * 20 SEP 1988 - AAM - created                                       *
 * 14 DEC 1988 - AAM - select_p()                                    *
 * 19 DEC 1988 - AAM - main()                                        *
 *                     initialize()                                  *
 * 02 JAN 1989 - AAM - select_p()                                    *
 * 06 JAN 1989 - AAM - g_ap_name()                                   *
 * 16 JAN 1989 - AAM - initialize                                    *
 * 04 JUL 1989 - RRD - main()                                        *
 * 11 AUG 1989 - RRD - Use CL functions                              *
 * 12 AUG 1989 - RRD - Use PPini_ipc and PPstp_ipc                   *
 * 14 AUG 1989 - RRD - Corrected call to CLadd_ali                   *
 * 14 AUG 1989 - RRD - Do not create object for ap_name and load_alias *
 * 16 AUG 1989 - RRD - select_p()                                    *
 *                                                                   *
 *********************************************************************/

#include        <pam_com.h>
#include        <isam.h>
#include        <fox/pream.h>
#include        <psrs.h>
#include        <sys/utsname.h>
#include        <fox/cl_errors.h>

extern char user_alias[],
            load_alias[];

extern SC_VAL sc_vals[];
extern SC_SPEC sc_specs[];
extern P_Q_ENTRY first_q_entry;

extern int load_val;

/* List of event arguments for event logging. */
char *event_arg[10];
/* Select servers xap_name ( required for event logging ). */
char xap_name[UE_LEN +1];
/* Event logging xap_name. */
char log_ap[UE_LEN +1];
/* PAM bin directory, to locate the executable for PAC. */
char bindir[128];

/* Number of configured selection criteria specified at selection. */
int num_sc;
```

```
/* Local functions. */
void sel_driver();
int  tst_rel();

/* External functions. */
void add_q_entry(),
     del_q_entry(),
     init_q(),
     reset_usage(),
     select_p(),
     send_o_select_p(),
     send_rsp();

int  srch_q_entry(),
     make_u_list();

char *rcv_rq();

long strtol();

double atof();

/***************************************************************************
*  @(#)selsrv.c 1.2  I/A Series  Foxboro Company  89/08/17
****************************************************************************
*                                                                          *
*  Copyright by the Foxboro Company 1988                                   *
*                                                                          *
*  All rights reserved Foxboro Company 1988                                *
*                                                                          *
**&1************************************************************************
*
*  NAME               : main
*
*  FUNCTION           : Select Server Main function.
*
*  INPUT  PARAMETERS : argc  - number of arguments
*                      argv  - list of arguments:
*                              0: selsrv progr. name.
*                              1: PAM data base directory name.
*                              2: PAM bin directory name.
*
*  OUTPUT PARAMETERS :
*
*  RETURN VALUES      : 0 - normal return
*                       1 - return because of failure
*
*  SYNOPSIS           : int main( argc, argv )
*                       int argc, *char argv[];
*
*  COMPONENT HISTORY :
*  -------------------------------------------------------------------------
*  20 SEP 1988 - AAM - created
*  19 DEC 1988 - AAM - Removed the selsrv ap_name from argv list.
*  22 DEC 1988 - AAM - Removed the els ap_name from argv list.
*  04 JUL 1989 - RRD - Added setbuf() in case of testing.
***************************************************************************/
int main( argc, argv )

int  argc;
char *argv[];

{
   int res;

#ifdef TESTING
   setbuf( stdout, 0 );
#endif

   dprintf(("***** main ****\n"));

   /* Check argument lengths. */
   if( argc != 3                   ||
       strlen( argv[1] ) > 127     ||
       strlen( argv[2] ) > 127          )
   {

      CLerr_rpt( PAM, PE_INV_ARGUMENTS, "??selsrv??", "main - invocation" );
      return(1);
   }

   /* Store PAM bin directory. */
   strcpy( bindir, argv[2] );
```

```
   res = initialize( argv[1] );
   if( res == PAM_OK )
   {
      sel_driver();
   }

   PPstp_ipc( res );
}

/****************************************************************************
 * @(#)selsrv.c 1.2  I/A Series  Foxboro Company  89/08/17
 ****************************************************************************
 *                                                                          *
 * Copyright by the Foxboro Company 1988                                    *
 *                                                                          *
 * All rights reserved Foxboro Company 1988                                 *
 *                                                                          *
 **&2*************************************************************************
 *
 * NAME              : ap_select
 *
 * FUNCTION          : Abort a select path request.
 *
 * INPUT  PARAMETERS : rq  - request
 *
 * OUTPUT PARAMETERS :
 *
 * RETURN VALUES     : TRUE  - current select in progress is to be
 *                             aborted
 *                     FALSE - otherwise
 *
 * SYNOPSIS          : int ap_select( rq )
 *                     char * rq;
 *
 * COMPONENT HISTORY :
 * --------------------------------------------------------------------------
 * 20 SEP 1988 - AAM - created
 *
 ***************************************************************************/
int ap_select( rq )

char * rq;
{
   int res;
   bool abort_flag;
   P_Q_ENTRY q_entry;

   char requestor[ST_FLD_SZ +1],
        environment[ST_FLD_SZ +1];

   dprintf(("**** ap_select ****\n"));

   if( (rq = PPget_fld( rq, requestor, ST_FLD_SZ )) == (char *) NULL ||
                                               strlen( requestor ) == 0 )
   {
      send_rsp( O_AP_SELECT, P_INV_REQUESTOR );
      return( FALSE );
   }

   if( (rq = PPget_fld( rq, environment, ST_FLD_SZ )) == (char *) NULL ||
                                               strlen( environment ) == 0 )
   {
      send_rsp( O_AP_SELECT, P_INV_ENVIRONMENT );
      return( FALSE );
   }

   /* Search select request in select queue. */
   res = srch_q_entry( requestor, environment, &q_entry );

   if( res != PAM_OK )
   {
      /* No selection for this environment and requestor in queue. */
      send_rsp( O_AP_SELECT, P_NO_SELECTION );
      return( FALSE );
   }

   while( res == PAM_OK )
   {
      if( q_entry == first_q_entry )
      {
         /* The selection currently processed must be aborted. */
         abort_flag = TRUE;
      }
```

```
      /* Send response messagei P_ABORTED to source of select. */
      send_o_select_p( q_entry->source,q_entry->ref,
                                      P_SELECT_ABORTED, "", "" );
      /* Delete select request from queue. */
      del_q_entry( q_entry );

      /* Search next request ( if any ) for environment/requestor. */
      res = srch_q_entry( requestor, environment, &q_entry );
   }

   event_arg[0] = requestor;
   event_arg[1] = environment;
   event_arg[2] = (char *) NULL;

   /* Log abort event. */
   PPlog_event( E_AP_SELECT, environment, event_arg );

   /* Send response to source of abort request. */
   send_rsp( O_AP_SELECT, PAM_OK );

   if( abort_flag )
      return( TRUE );

   return( FALSE );
}

/***********************************************************************
 *                                                                     *
 *  Copyright by the Foxboro Company 1988                              *
 *                                                                     *
 *  All rights reserved Foxboro Company 1988                           *
 *                                                                     *
 **&2********************************************************************
 *                                                                     *
 *  FILE NAME           : g_ap_name.c                                  *
 *                                                                     *
 *  PART NUMBER         :                                              *
 *                                                                     *
 *  FUNCTION            : returns ap_name, which is letterbug          *
 *                                                                     *
 *  FUNCTIONS CONTAINED : g_ap_name()                                  *
 *                                                                     *
 *  DATA STRUCTURES     :                                              *
 *                                                                     *
 *  COMPONENT HISTORY   :                                              *
 *  ----------------------------------------------------------------   *
 *  19 DEC 1988 - AAM - Creation                                       *
 *  06 JAN 1989 - AAM - Make the ap_name PID independent               *
 *                                                                     *
 ***********************************************************************/
g_ap_name(ap_name,base_name)

char *ap_name;

{
   struct utsname sysnames;

   dprintf(("**** g_ap_name ****\n"));

   uname(&sysnames);
   strcpy( ap_name, base_name );
   strcat( ap_name, sysnames.nodename );

}

/***********************************************************************
 * @(#)selsrv.c 1.2  I/A Series  Foxboro Company  89/08/17
 ***********************************************************************
 *                                                                     *
 *  Copyright by the Foxboro Company 1988                              *
 *                                                                     *
 *  All rights reserved Foxboro Company 1988                           *
 *                                                                     *
 **&2********************************************************************
 *
 *  NAME              : get_sc_idx
 *
 *  FUNCTION          : Detemine the selection criterion index number.
 *
 *  INPUT  PARAMETERS : sc_name  - name of the selection criterion
 *
 *  OUTPUT PARAMETERS :
 *
 *  RETURN VALUES     : index number  ( -1 if not found )
```

```
 *
 *  SYNOPSIS            : int get_sc_idx( sc_name )
 *                          char *sc_name;
 *
 *  COMPONENT HISTORY :
 *  ----------------------------------------------------------------------------
 *  20 SEP 1988 - AAM - created
 *
 *****************************************************************************/
int get_sc_idx( sc_name )

char *sc_name;

{
   int i;

   dprintf(("**** get_sc_idx ****\n"));

   for( i = 0; i < MAX_SC; i++ )
   {
      if( strcmp( sc_specs[i].name, sc_name ) == 0 )
      {
         return( i );
      }
   }

   return( -1 );
}


/*****************************************************************************
 *  @(#)selsrv.c 1.2  I/A Series  Foxboro Company  89/08/17
 *****************************************************************************
 *                                                                           *
 *  Copyright by the Foxboro Company 1988                                    *
 *                                                                           *
 *  All rights reserved Foxboro Company 1988                                 *
 *                                                                           *
 **&2*************************************************************************
 *
 *  NAME                : init_sc_exprs
 *
 *  FUNCTION            : Initialize the init_sc_exprs list from the
 *                          specified selection criteria.
 *
 *  INPUT  PARAMETERS : sel_crit    - string of selection criteria
 *
 *  OUTPUT PARAMETERS :
 *
 *  RETURN VALUES       : PAM_OK      - Selection criteria where specified
 *                                        correctly.
 *                        NOT PAM_OK - An invalid name, operator or value
 *                                        is specified in the criteria spec.
 *
 *  SYNOPSIS            : int init_sc_exprs( sel_crit )
 *                          char *path_name;
 *
 *  COMPONENT HISTORY :
 *  ----------------------------------------------------------------------------
 *  20 SEP 1988 - AAM - created
 *
 *****************************************************************************/
int init_sc_exprs( sel_crit )

char *sel_crit;

{
   char spec[ MAX_VAL +2 +1 ],          /* Name + Value + Operator */
        name[ IL_MAX_COL +1 ],
        value[ 80 +1 ];
   char *ptr;
   int  idx, operator;

   dprintf(("**** init_sc_exprs ****\n"));

   num_sc = 0;

   sel_crit = PPget_fld( sel_crit,spec,MAX_VAL+2 );

   while( sel_crit != (char *)NULL && num_sc < MAX_SPEC_SC )
   {
      if( tst_rel( spec,name,IL_MAX_COL,value,80,&operator ) != PAM_OK )
         return( !PAM_OK );

      if( strlen(name) != 0 )
```

```
      {
         idx = get_sc_idx( name );
         if( idx == -1 )
         {
            /* Illegal ( non existing ) selection criterion name. */
            return( !PAM_OK );
         }

         sc_vals[ num_sc ].idx = idx;
         sc_vals[ num_sc ].oper = operator;

         switch( sc_specs[ idx ].type )
         {
            case CHARTYPE:
                  strcpy( sc_vals[ num_sc ].val.s, value );
                  break;

            case INTTYPE:
                  if( strlen(value) == 0 )
                     return( !PAM_OK );

                  sc_vals[ num_sc ].val.i =(int) strtol( value, &ptr, 10 );
                  /* Test if entire value specified long type */
                  if( ptr == value || *ptr != '\0' )
                     return( !PAM_OK );

                  break;

            case LONGTYPE:
                  if( strlen(value) == 0 )
                     return( !PAM_OK );

                  sc_vals[ num_sc ].val.l = strtol( value, &ptr, 10 );
                  /* Test if entire value specified long type */
                  if( ptr == value || *ptr != '\0' )
                     return( !PAM_OK );

                  break;

            case FLOATTYPE:
                  if( strlen(value) == 0 )
                     return( !PAM_OK );

                  sc_vals[ num_sc ].val.f = atof( value );
/* atof should actually be strtod, but libc does not contain the
   SYMBOL definition, so we leave the tests out for the time ... */
                  /* Test if entire value specified long type */
/*                if( ptr == value || *ptr != '\0' )
                     return( !PAM_OK );
*/
                  break;

            case DOUBLETYPE:
                  if( strlen(value) == 0 )
                     return( !PAM_OK );
                  sc_vals[ num_sc ].val.d = atof( value );
/* atof should actually be strtod, but libc does not contain the
   SYMBOL definition, so we leave the tests out for the time ... */
                  /* Test if entire value specified long type */
/*                if( ptr == value || *ptr != '\0' )
                     return( !PAM_OK );
*/
                  break;
         }

         num_sc++;
      }

      sel_crit = PPget_fld( sel_crit,spec,MAX_VAL+2 );
   }

   return( PAM_OK );

}

/**************************************************************************
 * @(#)selsrv.c 1.2  I/A Series  Foxboro Company  89/08/17
 **************************************************************************
 *                                                                        *
 *  Copyright by the Foxboro Company 1988                                 *
 *                                                                        *
 *  All rights reserved Foxboro Company 1988                              *
 *                                                                        *
 **82***********************************************************************
 *
```

```
 * NAME              : initialize
 *
 * FUNCTION          : Initialization function for select server.
 *
 * INPUT  PARAMETERS : dbdir   - PAM data base directory.
 *
 * OUTPUT PARAMETERS :
 *
 * RETURN VALUES     : PAM_OK      - Initialization successfull.
 *                     NOT PAM_OK - Initialization failure.
 *
 * SYNOPSIS          : int initialize( dbdir )
 *                     char dbdir[];
 *
 * COMPONENT HISTORY :
 * -----------------------------------------------------------------------
 * 20 SEP 1988 - AAM - created
 * 19 DEC 1988 - AAM - xap_name retrieved via get_cfg()
 * 16 JAN 1989 - AAM - add user_alias as 'basename' argument to g_ap_name
 *
 *************************************************************************/
int initialize( dbdir )

char *dbdir;

{
   dprintf(("**** initialize ****\n"));

   /* Initialize the select queue. */
   init_q();

   if( PPget_cfg() != PAM_OK )
   {
      CLerr_rpt( PAM, PE_INIT, "??selsrv??", "configuration file error" );
      return( !PAM_OK );
   }

   /* Set user_alias to sel_name & log_ap to els_name. */
   strcpy( user_alias, sel_name );
   strcpy( log_ap, els_name );

   /* Generate unique ap_name from letterbug and make load_alias.*/
   g_ap_name( xap_name, user_alias );
   strcat( strcpy( load_alias, xap_name ), "1" );
   if( PPini_ipc( xap_name, FALSE, 20 ) == PAM_OK &&
       CLadd_ali( user_alias, TRUE ) == CL_OK &&
       CLadd_ali( load_alias, FALSE ) == CL_OK )
   {
      if( chdir( dbdir ) == SUCCESS )
      {
         if( A900_o_COPAS()      == PAM_OK &&
             A901_o_ELEM_COND()  == PAM_OK &&
             A902_o_ELEM_ALARM() == PAM_OK &&
             A903_o_PAT()        == PAM_OK &&
             A904_o_PAR_VALUE()  == PAM_OK &&
             A905_o_PAC()        == PAM_OK    )
         {
            return( PAM_OK );
         }

         else
         {
            CLerr_rpt( PAM, PE_OPEN_FAIL, xap_name, "initialize" );
         }
      }

      else
      {
         CLerr_rpt( PAM, PE_DBDIR_FAIL, xap_name, "initialize" );
      }
   }

   else
   {
      CLerr_rpt( PAM, PE_INIT, xap_name, "initialize" );
   }

   return( !PAM_OK );
}

/*************************************************************************
 * @(#)selsrv.c 1.2  I/A Series  Foxboro Company  89/08/17
 *************************************************************************
 *                                                                       *
 * Copyright by the Foxboro Company 1988                                 *
```

```
*                                                                    *
*  All rights reserved Foxboro Company 1988                          *
*                                                                    *
**&2******************************************************************
*
*  NAME              : process_msg
*
*  FUNCTION          : Processes incoming requests. Path select
*                      requests are queued, abort select requests are
*                      handled immediately.
*
*  INPUT  PARAMETERS : path_name
*
*  OUTPUT PARAMETERS :
*
*  RETURN VALUES     : ABORT     - All parameters successfully set.
*                      NOT ABORT - At least one parameter can not be
*                                  set successfully.
*
*  SYNOPSIS          : int process_msg()
*
*  COMPONENT HISTORY :
*  ------------------------------------------------------------------------
*  20 SEP 1988 - AAM - created
*
***********************************************************************/
int process_msg()

{
   char *rq;
   bool contin = TRUE;
   bool abort_flag = FALSE;
   int  type;

   dprintf(("**** process_msg ****\n"));

   while( contin )
   {
      rq = rcv_rq( FALSE, &type );
      switch( type )
      {
         case -1:
            contin = FALSE;
            break;

         case I_AP_SELECT:
            abort_flag = abort_flag | ap_select( rq );
            break;

         case I_SELECT_P:
            add_q_entry( rq );
            break;

         default:
            /* Invalid message type. */
            CLerr_rpt( PAM, PE_INV_MESSAGE, xap_name, "process_msg" );
            break;

      }
   }

   if( abort_flag )
      /* Current selection must be aborted. */
      return( ABORT );

   return( !ABORT );
}


/**********************************************************************
*  @(#)selsrv.c 1.2  I/A Series  Foxboro Company  89/08/17
**********************************************************************
*                                                                    *
*  Copyright by the Foxboro Company 1988                             *
*                                                                    *
*  All rights reserved Foxboro Company 1988                          *
*                                                                    *
**&2******************************************************************
*
*  NAME              : sel_driver
*
*  FUNCTION          : Select Server sel_driver function.
*
*  INPUT  PARAMETERS :
*
```

```
*  OUTPUT PARAMETERS :
*
*  RETURN VALUES     :
*
*  SYNOPSIS          : void sel_driver( )
*
*  COMPONENT HISTORY :
*  -----------------------------------------------------------------------------
*  20 SEP 1988 - AAM - created
*
******************************************************************************/
void sel_driver()

{
   char *rq;
   int  type;

   dprintf(("***** sel_driver ****\n"));

   while( TRUE )
   {
      while( first_q_entry != (P_Q_ENTRY) NULL )
      {
         select_p( first_q_entry );
      }

      rq = rcv_rq( TRUE, &type );
      switch( type )
      {
         case -1:
            return;

         case I_AP_SELECT:
            send_rsp( O_AP_SELECT, P_NO_SELECTION );
            break;

         case I_SELECT_P:
            add_q_entry( rq );
            break;
            default:
               /* Invalid message type. */
               CLerr_rpt( PAM, PE_INV_MESSAGE, xap_name, "sel_driver" );
               break;

         }
      }
   }

/******************************************************************************
*  @(#)selsrv.c 1.2  I/A Series  Foxboro Company  89/08/17
*******************************************************************************
*                                                                             *
*  Copyright by the Foxboro Company 1988                                      *
*                                                                             *
*  All rights reserved Foxboro Company 1988                                   *
*                                                                             *
*******************************************************************************
*
*  NAME              : select_p
*
*  FUNCTION          : Handles a path select request.
*
*  INPUT  PARAMETERS : qe  - queue entry
*
*  OUTPUT PARAMETERS :
*
*  RETURN VALUES     :
*
*  SYNOPSIS          : void select_p( qe )
*                      P_Q_ENTRY qe;
*
*  COMPONENT HISTORY :
*  -----------------------------------------------------------------------------
*  20 SEP 1988 - AAM - created
*  14 DEC 1988 - AAM - test return value of make_u_list()
*  02 JAN 1989 - AAM - when make_u_list() returns NOT PAM_OK, the q_entry
*                      is deleted and select response is sent !
*  16 AUG 1989 - RRD - lock/unlock PAC table
*
******************************************************************************/
void select_p( qe )

P_Q_ENTRY qe;

{
```

```
int res;
bool not_yet_selected = TRUE;
REC_COPAS copas;
char *sel_crit;
char requestor[ST_FLD_SZ +1],
     environment[ST_FLD_SZ +1],
     key[ST_FLD_SZ +1];
char ld_str[2+1];

dprintf(("**** select_p ****\n"));

if( (sel_crit=PPget_fld( qe->rq,requestor,ST_FLD_SZ ) ) == (char *) NULL ||
                                              strlen( requestor ) == 0 )
{
   send_o_select_p( qe->source, qe->ref,P_INV_REQUESTOR,"","" );
   del_q_entry( qe );
   return;
}

if( (sel_crit = PPget_fld( sel_crit, environment, ST_FLD_SZ ))
                                              == (char *) NULL  ||
                                              strlen( environment ) == 0 )
{
   send_o_select_p( qe->source, qe->ref,P_INV_ENVIRONMENT,"","" );
   del_q_entry( qe );
   return;
}

/* Extract list of specified selection criteria and expresions
   from request. */
if( init_sc_exprs( sel_crit ) != PAM_OK )
{
   /* Invalid list specified. */
   send_o_select_p( qe->source, qe->ref,P_INV_CRITERIA_LIST,"","" );
   del_q_entry( qe );
   return;
}


/* Read COPAS for the environment that satisfies the selection
   criteria. */
res = A00i_r_copas( environment, &copas );

if( res != PAM_OK )
{
   /* No such path exist. */
   send_o_select_p( qe->source, qe->ref,P_NO_PATH_POSSIBLE, "", "" );
   del_q_entry( qe );
   return;
}

while( not_yet_selected && res == PAM_OK )
{
   if( process_msg() == ABORT )
   {
      return;
   }

   /* Compile list of element usages for this path. */
   if( make_u_list( copas.path_name ) != PAM_OK )
   {
      send_o_select_p( qe->source,qe->ref,P_FATAL_ERROR, "", "" );
      del_q_entry( qe );
      return;
   }

   /* Set the usage of all elements according to list. */
   if( set_usage( copas.path_name ) == PAM_OK )
   {
      if( process_msg() == ABORT )
      {
         reset_usage( copas.path_name );
         return;
      }
      /* Initialize 'to be locked' equipment. */
      if( init_locked( copas.path_name ) != PAM_OK )
      {
         reset_usage( copas.path_name );
         send_o_select_p( qe->source,qe->ref,P_FATAL_ERROR, "", "" );
         del_q_entry( qe );
         return;
      }

      if( process_msg() == ABORT )
      {
         reset_usage( copas.path_name );
         return;
```

```
            }

            /* Start Path Controller ( if required ). */
            A530_lt_PAC();
            if( start_pac( key ) != PAM_OK )
            {
               A530_ul_PAC();
               reset_usage( copas.path_name );
               send_o_select_p( qe->source, qe->ref,P_FATAL_ERROR,"","" );
               del_q_entry( qe );
               return;
            }

            /*
             * PAC table is unlocked in selcom.c - rcv_pac() after
             * having received first reply from PAC.
             */

            /* Load PAC with path data. */
            if( load_pac( requestor, &copas, environment ) != PAM_OK )
            {
               A530_ul_PAC();
               reset_usage( copas.path_name );
               send_o_select_p( qe->source, qe->ref,P_FATAL_ERROR,"","" );
               del_q_entry( qe );
               return;
            }

            /* Path is selected, no errors. */
            not_yet_selected = FALSE;
         }

         else
         {
            /*  At least one equipment element not available. */
            /* Read next candidate path. */
            res = A003_n_copas( &copas );
         }
      }

      if( res != PAM_OK )
      {
         send_o_select_p( qe->source,qe->ref,P_NO_PATH_AVAILABLE, "", "" );
         del_q_entry( qe );
         return;
      }

      /* Path is selected, update COPAS. */

      if( A031_nu_copas( "owner", "key", requestor, key ) != PAM_OK ||
          A530_lt_PAC() != PAM_OK || A530_ru_PAC( key, 1 ) != PAM_OK )
      {
         A530_ul_PAC();
         reset_usage( copas.path_name );
         send_o_select_p( qe->source, qe->ref, P_FATAL_ERROR, "", "" );
         del_q_entry( qe );
         return;
      }
      A530_ul_PAC();

      /* Remove processed request from queue. */
      del_q_entry( qe );

      event_arg[0] = requestor;
      event_arg[1] = copas.path_name;
      event_arg[2] = environment;
      event_arg[3] = copas.operation_mode;
      event_arg[4] = (char *) NULL;

      /* Log selection. */
      PPlog_event( E_SELECT_P, environment, event_arg );

      /* Send response with path name and key. */
      send_o_select_p( qe->source, qe->ref, PAM_OK, copas.path_name,
                                                       key );

      return;

}


/***********************************************************************
*  @(#)selsrv.c 1.2  I/A Series  Foxboro Company  89/08/17
************************************************************************
*                                                                      *
```

```
 * Copyright by the Foxboro Company 1988                                  *
 *                                                                        *
 * All rights reserved Foxboro Company 1988                               *
 *                                                                        *
 **&2**********************************************************************
 *
 * NAME              : tst_rel
 *
 * FUNCTION          : Split and test a relation type expression ( selection
 *                     criterion spec. ) into operator, name and value.
 *
 * INPUT  PARAMETERS : condition
 *
 * OUTPUT PARAMETERS : name       - Selection Criterion name
 *                     name_sz    - Maximum size allowed for name
 *                     value      - Selection Criterion expression value
 *                     value_sz   - Maximum value size
 *                     operator   - Relational operator
 *
 * RETURN VALUES     : PAM_OK      - Correct specification
 *                     NOT PAM_OK - Incorrect specification:
 *                                  * illegal operator
 *                                  * name / value too long
 *                                  * name / value omitted
 *
 * SYNOPSIS          : int tst_rel( condition, name, name_sz,
 *                                  value, value_sz, operator )
 *                     char *condition, *name, *value;
 *                     int name_sz, value_sz, *operator;
 *
 * COMPONENT HISTORY :
 * ------------------------------------------------------------------------
 * 20 SEP 1988 - AAM - created
 *
 *************************************************************************/
int tst_rel( condition, name, name_sz, value, value_sz, operator )

char *condition, *name, *value;
int name_sz, value_sz, *operator;

{
   int ci = 0, ni = 0, vi = 0;          /* Indexes */

   dprintf(("**** tst_rel ****\n"));

   if( condition[0] == '\0' )
   {
      name[0] = '\0';
      return( PAM_OK );
   }
   while( condition[ci] != '=' &&
          condition[ci] != '<' &&
          condition[ci] != '>'    )
   {
      if( ni == name_sz )
      {
         /* Name too long. */
         return( !PAM_OK );
      }

      name[ni++] = condition[ci++];
   }

   if( ni == 0 )
      /* Name omitted. */
      return( !PAM_OK );

   name[ni] = '\0';

   *operator = condition[ci++] << 8;

   if( condition[ci] == '=' || condition[ci] == '>' )
   {
      *operator = *operator + condition[ci++];
   }

   while( condition[ci] != '\0' )
   {
      if( vi == value_sz )
         /* value specification too long */
         return( !PAM_OK );

      value[vi++] = condition[ci++];
   }
```

```
   if( vi == 0 )
      /* Value specification omitted. */
      return( !PAM_OK );

   value[vi] = '\0';

   return( PAM_OK );
}

/****************************************************************************
*  @(#)seluse.c 1.3  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**&0*************************************************************************
*                                                                           *
*  FILE NAME          : seluse.c                                            *
*                                                                           *
*  PART NUMBER        :                                                     *
*                                                                           *
*  FUNCTION           :  Select Server usage handler of PAM PSRS.           *
*                                                                           *
*  COMPONENT HISTORY :                                                      *
*  ---------------------------------------------------------------------   *
*  20 SEP 1988 - AAM - created                                              *
*  14 DEC 1988 - AAM - set_usage()                                          *
*                      make_u_list()                                        *
*  19 DEC 1988 - AAM - make_u_list()                                        *
*  02 MAR 1989 - AAM - chk_relation()                                       *
*  26 JUN 1989 - RRD - Test on array boundary in make_u_list                *
*                      Values read first in temporary buffer space          *
*                                                                           *
****************************************************************************/

#include        <fox/om_udef.h>
#include        <pam_com.h>
#include        <isam.h>
#include        <fox/pream.h>
#include        <psrs.h>

extern char xap_name[];

/* Data definitions. */

/* Usage list. */
U_ELM u_list[ MAX_PATH_ELEM ];

int tot_use;  /* Number of usage entries in usage list. */

/* Local functions. */
void splt_rel();

/* External functions. */
long int strtol();
double atof();

/****************************************************************************
*  @(#)seluse.c 1.3  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**&0*************************************************************************
*
*  NAME               : chk_relation
*
*  FUNCTION           : Process the 'RELATION' elem_cond for a particular path
*                       and equipment element.
*
*  INPUT  PARAMETERS : path_name
*                      elem_name
*
*  OUTPUT PARAMETERS :
*
*  RETURN VALUES      : TRUE   - evaluation of expr. yields TRUE
*                       FALSE  - evaluation of expr. yields FALSE
*
```

```
*  SYNOPSIS            : bool chk_relation( path_name, elem_name )
*                        char *path_name, *elem_name;
*
*  COMPONENT HISTORY :
*  ------------------------------------------------------------------------
*  20 SEP 1988 - AAM - created
*  02 MAR 1989 - AAM - support for boolean variables
*
**************************************************************************/
bool chk_relation( path_name, elem_name )

char *path_name, *elem_name;

{
   int res, rel_op = -1, type;
   char tmp_b;
   int tmp_i;
   long int tmp_l;
   float tmp_f;
   char *ptr;
   char condition[COND_SZ +1],
        relation[2];
   char par_name[P_NAME_SZ +1],
        par_val[P_VALUE_SZ +1];
   UVAL ext_val;

   dprintf(("**** chk_relation ****\n"));

   relation[0] = RELATION;
   relation[1] = '\0';

   /* Read first relation condition. */
   res = AIIO_r_ELEM_COND( path_name, elem_name, relation,
                                             "condition", condition );

   while( res == PAM_OK )
   {
      /* Extract parameter name, value and operator from spec. */
      splt_rel( condition, par_name, par_val, &rel_op );
      /* Get value from C&IO variable. */
      if( get_par( elem_name, par_name, ext_val.s, &type ) != PAM_OK )
      {
         PPerr_rpt( PAM, PE_FATAL_ERROR, xap_name, "get_par" );
         return( FALSE );
      }

      switch( type )
      {
         case INTEGER:
               tmp_i = (int) strtol( par_val, &ptr, 10 );
               if( ptr == par_val || *ptr != '\0' )
                  return( FALSE );

               res = tst_int( rel_op, ext_val.i, tmp_i );
               break;

         case FLOAT:
               tmp_f = (float) atof( par_val );
               res = tst_float( rel_op, ext_val.f, tmp_f );
               break;

         case OM_LNG_INT:
               tmp_l = strtol( par_val, &ptr, 10 );
               if( ptr == par_val || *ptr != '\0' )
                  return( FALSE );

               res = tst_long( rel_op, ext_val.l, tmp_l );
               break;

         case 5:   /* BOOLEAN */
               if( par_val[0] == '0' || par_val[0] == '1' )
               {
                  tmp_b = par_val[0] - '0';
               }

               else
                  return( FALSE );

               res = tst_bool( rel_op, ext_val.b, tmp_b );
               break;

         case STRING:
               res = tst_string( rel_op, ext_val.s, par_val );
               break;
```

```
        default:
              return( FALSE );
      }

       if( res == FALSE )
         return( FALSE );

       res = All1_n_ELEM_COND( condition );
   }

   return(TRUE);
}

/**********************************************************************
* @(#)seluse.c 1.3  I/A Series  Foxboro Company  89/08/17
***********************************************************************
*                                                                     *
*  Copyright by the Foxboro Company 1988                              *
*                                                                     *
*  All rights reserved Foxboro Company 1988                           *
*                                                                     *
**&1*******************************************************************
*
*  NAME              : init_locked
*
*  FUNCTION          : Initialize the locked elements.
*
*  INPUT  PARAMETERS : path_name
*
*  OUTPUT PARAMETERS :
*
*  RETURN VALUES     : PAM_OK     - all elements are set correctly
*                      NOT PAM_OK - at least one parameter of an
*                                   element can not be set correctly
*
*  SYNOPSIS          : int init_locked( path_name )
*                      char *path_name;
*
*  COMPONENT HISTORY :
*  -------------------------------------------------------------------
*  20 SEP 1988 - AAM - created
*
**********************************************************************/
int init_locked( path_name )

char *path_name;

{
   int i;

   dprintf(("**** init_locked ****\n"));

   /* All elements in usage list that must be set ( assign == TRUE ). */
   for( i = 0; i< tot_use; i++ )
   {
      if( u_list[i].assign == TRUE )
      {
         /* Set all parameters as specified. */
         if( set_assign( path_name, u_list[i].elem_name ) != PAM_OK ||
             cu_locked( path_name, u_list[i].elem_name ) != PAM_OK )
         {
            return( !PAM_OK );
         }

      }
   }

   return( PAM_OK );
}

/**********************************************************************
* @(#)seluse.c 1.3  I/A Series  Foxboro Company  89/08/17
***********************************************************************
*                                                                     *
*  Copyright by the Foxboro Company 1988                              *
*                                                                     *
*  All rights reserved Foxboro Company 1988                           *
*                                                                     *
**&1*******************************************************************
*
*  NAME              : make_u_list
*
*  FUNCTION          : Set up the list of equipment usages.
```

```
 *
 * INPUT  PARAMETERS : path_name
 *
 * OUTPUT PARAMETERS :
 *
 * RETURN VALUES     : PAM_OK     - all ELEM_COND read
 *                     NOT PAM_OK - severe error while reading ELEM_COND
 *
 * SYNOPSIS          : int make_u_list( path_name )
 *                     char *path_name;
 *
 * COMPONENT HISTORY :
 * ----------------------------------------------------------------------
 * 20 SEP 1988 - AAM - created
 * 14 DEC 1988 - AAM - make_u_list returns PAM_OK / !PAM_OK
 * 19 DEC 1988 - AAM - skip usage ELEM_CONDs other then 'S' or 'L'
 * 26 JUN 1989 - RRD - Test on array boundary (tot_use < MAX_PATH_ELEM )
 *                   - Values read first in temporary buffer
 *
 ***********************************************************************/
int make_u_list( path_name )

char *path_name;

{
   int res;
   char usage[2];
   char tmp_elem[ST_FLD_SZ + 1];
   char tmp_usage[COND_SZ + 1];
   bool db_err = FALSE;

   dprintf(("**** make_u_list ****\n"));

   usage[0] = USAGE;
   usage[1] = '\0';

   tot_use = 0;
   res = A112_r_ELEM_COND( path_name, "",usage,"elem_name","condition",
                 tmp_elem, tmp_usage, &db_err );

   while( res == PAM_OK )
   {
     /* If usage not equals LOCKED or SECURED then skip. */
     if( tmp_usage[0] == SECURED ||
          tmp_usage[0] == LOCKED )
     {
        if ( tot_use == MAX_PATH_ELEM )
        {
              PPerr_rpt( PAM, PE_USAGE_CONDS, xap_name, path_name );
              return( !PAM_OK );
        }

        strcpy( u_list[tot_use].elem_name, tmp_elem );
        strcpy( u_list[tot_use].usage, tmp_usage );

        /* Initialize .assign to FALSE. */
        u_list[tot_use].assign = FALSE;

        tot_use++;
     }

     res = A113_n_ELEM_COND( tmp_elem, tmp_usage, &db_err );
   }

   if( db_err )
   {
     return( !PAM_OK );
   }

   return( PAM_OK );
}

/***********************************************************************
 * @(#)seluse.c 1.3  I/A Series  Foxboro Company  89/08/17
 ***********************************************************************
 *                                                                     *
 * Copyright by the Foxboro Company 1988                               *
 *                                                                     *
 * All rights reserved Foxboro Company 1988                            *
 *                                                                     *
 **&1*******************************************************************
 *
 * NAME              : reset_usage
 *
```

```
 *  FUNCTION           : Reset usages of all elements of the path
 *                        currently being selected. This function is
 *                        particularly invoked when a select is aborted.
 *
 *  INPUT  PARAMETERS : path_name
 *
 *  OUTPUT PARAMETERS :
 *
 *  RETURN VALUES      :
 *
 *  SYNOPSIS           : void reset_usage( path_name )
 *                        char *path_name;
 *
 *  COMPONENT HISTORY :
 *  ---------------------------------------------------------------------
 *  20 SEP 1988 - AAM - created
 *
 ************************************************************************/
void reset_usage( path_name )

char *path_name;

{
   int i;

   dprintf(("**** reset_usage ****\n"));

   for( i = 0; i < tot_use; i++ )
   {
      ue_use( path_name, u_list[i].elem_name );
   }
}


/************************************************************************
 *  @(#)seluse.c 1.3  I/A Series  Foxboro Company  89/08/17
 ************************************************************************
 *                                                                      *
 *  Copyright by the Foxboro Company 1988                               *
 *                                                                      *
 *  All rights reserved Foxboro Company 1988                            *
 *                                                                      *
 **$1*********************************************************************
 *
 *  NAME               : set_usage
 *
 *  FUNCTION           : Registers list of equipment for usage as
 *                       specified for each element in the list (secured
 *                       or locked). If one of the equipments can not be
 *                       registered, the usages of all equipment in the
 *                       are restored.
 *
 *  INPUT  PARAMETERS : path_name
 *
 *  OUTPUT PARAMETERS :
 *
 *  RETURN VALUES      : PAM_OK      - each element in the list has been
 *                                     registered according to spec.
 *                       NOT PAM_OK - at least one element could not be
 *                                     registered appropriately.
 *
 *  SYNOPSIS           : int set_usage( path_name )
 *                       char *path_name;
 *
 *  COMPONENT HISTORY :
 *  ---------------------------------------------------------------------
 *  20 SEP 1988 - AAM - created
 *  14 DEC 1988 - AAM - Element is unregistered when cu_locked fails.
 *
 ************************************************************************/
int set_usage( path_name )

char *path_name;

{
   int i, res;
   bool restore = FALSE;

   dprintf(("**** set_usage ****\n"));

   for( i = 0; i < tot_use; i++ )
   {
      /* Try to secure the element. */
      res = re_secured( path_name, u_list[i].elem_name );
```

```
    if( u_list[i].usage[0] == SECURED )
    {
       /* Required usage is SECURED. */
       if( res != PAM_OK )
       {
          /* Element can not be SECURED. */
          restore = TRUE;
       }
    }

    else
    {
       /* Required usage is LOCKED */
       if( res != PAM_OK )
       {
          /* Securing failed, try locking. */
          res = re_locked( path_name, u_list[i].elem_name );

          if( res != PAM_OK )
          {
             /* Element can not be LOCKED. */
             restore = TRUE;
          }

          else
          {
             /* Check to see if element is in correct state. */
             if( chk_relation( path_name, u_list[i].elem_name )
                                                 == FALSE )
             {
                /* Not in correct state. */
                /* Unlock this equipment. */
                ue_use( path_name, u_list[i].elem_name );
                restore = TRUE;
             }
          }
       }

       else     /* Element is SECURED ( required: LOCKED ) */
       {
          if( chk_relation(path_name, u_list[i].elem_name)==FALSE )
          {
             /* Postpone processing of assign conditions until
                all elements are regitered.
                Mark the list element ( .assign = TRUE ) */

             u_list[i].assign = TRUE;
          }

          else
          {
             if( cu_locked( path_name, u_list[i].elem_name ) != PAM_OK )
             {
                /* Make sure this element is unregistered ! */
                i++;
                restore = TRUE;
             }
          }
       }
    }
    if( restore == TRUE )
    {
       for( i--; i >= 0; i-- )
       {
          ue_use( path_name, u_list[i].elem_name );
       }

       return( !PAM_OK );
    }
  }

  return( PAM_OK );
}

/*************************************************************************
* @(#)seluse.c 1.3  I/A Series  Foxboro Company  89/08/17
**************************************************************************
*                                                                        *
* Copyright by the Foxboro Company 1988                                  *
*                                                                        *
* All rights reserved Foxboro Company 1988                               *
*                                                                        *
**&2**********************************************************************
*
```

```
 *  NAME              : splt_rel
 *
 *  FUNCTION          : Split a relation type condition ( COND_ELEM )
 *                      into operator, name and value.
 *
 *  INPUT  PARAMETERS : condition
 *
 *  OUTPUT PARAMETERS : name
 *                      value
 *                      operator
 *
 *  RETURN VALUES     :
 *
 *  SYNOPSIS          : void splt_rel( condition, name, value, operator )
 *                      char *condition, *name, *value;
 *                      int *operator;
 *
 *  COMPONENT HISTORY :
 *  ---------------------------------------------------------------------
 *  20 SEP 1988 - AAM - created
 *
 ***********************************************************************/
void splt_rel( condition, name, value, operator )

char *condition, *name, *value;
int *operator;

{
   dprintf(("**** splt_rel ****\n"));

   while( *condition != '=' &&
          *condition != '<' &&
          *condition != '>'   )
   {
      *name = *condition;
      name++;
      condition++;
   }

   *name = '\0';

   *operator = *condition << 8;
   condition++;

   if( *condition == '=' || *condition == '>' )
   {
      *operator = *operator + *condition;
      condition++;
   }

   while( *condition != '\0' )
   {
      *value = *condition;
      value++;
      condition++;
   }

   *value = '\0';
}

{***********************************************************************
*  @(#)copas.ace        1.2  I/A Series  Foxboro Company  89/08/17
************************************************************************
*                                                                      *
*  Copyright by the Foxboro Company 1988                               *
*                                                                      *
*  All rights reserved Foxboro Company 1988                            *
*                                                                      *
**s0********************************************************************
*                                                                      *
*  FILE NAME           : copas.ace                                     *
*                                                                      *
*  PART NUMBER         :                                               *
*                                                                      *
*  FUNCTION            : Report contents of COPAS table.               *
*                                                                      *
*  COMPONENT HISTORY   :                                               *
*  ------------------------------------------------------------------  *
*  11 JAN 1989 - RD - Creation                                         *
*                                                                      *
***********************************************************************}

database
        pam
end
```

```
define
        variable teller integer
end

output
        report to "copas.out"
        left margin 0
        right margin 132
        top margin 0
        bottom margin 0
end

select
        path_name,
        path_environment,
        owner,
        path_status,
        operation_mode,
        auto_failsafe,
        description,
        path_display,
        path_excep_proc,
        init_pattern,
        fail_pattern,
        alarm_ref,
        key,
        specific_origin,
        specific_dest,
        general_origin,
        general_dest,
        path_type,
        path_rank,
        path_excep_type
from copas
order by path_name
end

format
        first page header
                let teller = 0
                print "-- Complete Path Specification Table ( COPAS ) --"
                skip 2 lines
        on every row
                let teller = teller + 1
                print teller using "#####", "  Path Name          -    : ",
                        path_name clipped
                print "         Path Environment        : ",
                        path_environment clipped
                print "         Path Status             : ", path_status;
                if ( path_status = "S" ) then
                        print "(electable)"
                else if ( path_status = "N" ) then
                        print "(ot selectable)"
                else
                        print
                print "         Operation Mode          : ", operation_mode;
                if ( operation_mode = "A" ) then
                        print "(uto)"
                else if ( operation_mode = "M" ) then
                        print "(anual)"
                else
                        print
                print "         Auto Failsafe           : ", auto_failsafe;
                if ( auto_failsafe = "Y" ) then
                        print "(es)"
                else if ( auto_failsafe = "N" ) then
                        print "(o)"
                else
                        print
                print "         Description             : ", description clipped
                print "         Path Display            : ", path_display clipped
                print "         Exception Proc. Type    : ", path_excep_type;
                if ( path_excep_type = "H" ) then
                        print "(LBL)"
                else if ( path_excep_type = "N" ) then
                        print "(one)"
                else
                        print
                print "         Exception Proc. Name    : ",
                        path_excep_proc clipped
                print "         Initialise Pattern      : ", init_pattern clipped
                print "         Failsafe Pattern        : ", fail_pattern clipped
                print "         Alarm Reference         : ", alarm_ref clipped
                print "         Specific Origin         : ", specific_origin clipped
                print "         Specific Destination    : ", specific_dest clipped
                print "         General Origin          : ", general_origin clipped
```

```
        print "        General Destination      : ", general_dest clipped
        print "        Path Type                : ", path_type clipped
        print "        Path Rank                : ", path_rank clipped
        skip 1 line
    on last row
        if ( count = 0 ) then
        begin
            print "-- EMPTY --"
            skip 1 line
        end
        skip 1 line
        print "-- End of COPAS Table --", ascii 12;
end
```

```
# @(#)copassel.cnf      1.2 Foxboro I/A System 8/17/89
```

BPJNINMHDQAJEBJJDNGENJKDBFPNOMIEJHDCGINJLAEAJNGKAAJCDAHEFANBJCJFICENIAD
GCAIJCCAFCKIGEIBFCAEEEBPAFABANBGDNPIIFENJJDJHECAEKKEGIBBKDEGIOBOEBIKCEGJ
FCMBJJDCGOMKMIAJNDCGOBMCIGAPCDEOKMHIDBODNGIOBPEDIOCNHJPCGHNAKBEFFNMCJELJ
LEKGFDJMFBHHFCFFAACHANBNDEFPOIOEBBMIJFGGNDJLFAHFEOONFJPGOMJHKBGONGLEKNFI
CDAFEEIOCAJCDIKBCCLGKHAC

```
{*************************************************************************
*  @(#)dev_conf.ace     1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&0**********************************************************************
*                                                                        *
*  FILE NAME          : dev_conf.ace                                     *
*                                                                        *
*  PART NUMBER        :                                                  *
*                                                                        *
*  FUNCTION           : Report contents of DEV_CONF table.               *
*                                                                        *
*  COMPONENT HISTORY  :                                                  *
*  ------------------------------------------------------------------   *
*  11 JAN 1989 - RD - Creation                                           *
*                                                                        *
*************************************************************************}

database
        pam
end

define
        variable teller integer
end

output
        report to "dev_conf.out"
        left margin 0
        right margin 132
        top margin 0
        bottom margin 0
end

select
        environmt,
        device
from dev_conf
order by environmt, device
end

format
        first page header
                let teller = 0
                print "-- Device Configuration Table ( DEV_CONF ) --"
                skip 2 lines
        on every row
                let teller = teller + 1
                print teller using "#####", "  Environment          : ",
                    environmt clipped
                print "       Device               : ", device clipped
                skip 1 line
        on last row
                if ( count = 0 ) then
                begin
                    print "-- EMPTY --"
                    skip 1 line
```

```
                end
                skip 1 line
                print "-- End of DEV_CONF Table --", ascii 12;
end

# @(#)dev_conf.ini      1.2  I/A Series, Foxboro Company  8/17/89
#
# Database initialization script for table 'dev_conf'.
#
# History:
#       04 JAN 89, JvB, $PANDIR is changed to '/usr/pam', so the db-directory
#                       becomes '$PANDIR/db'.
#

echo "

Initializing table 'dev_conf'.
-----------------------------

"
cd $PANDIR/db

isql - - <<!

database pam;

delete from dev_conf;

insert into dev_conf
values
(       "default_env",
        "LP01"
);

insert into dev_conf
values
(       "default_env",
        "test"
);

insert into dev_conf
values
(       "tst_env",
        "LP01"
);

insert into dev_conf
values
(       "tst_env",
        "LP02"
);

insert into dev_conf
values
(       "tst_env",
        "test"
);

!

echo "

End of initialization.
----------------------

"

{*****************************************************************************
* @(#)e_alarm.ace       1.2  I/A Series  Foxboro Company  89/08/17
******************************************************************************
*                                                                            *
* Copyright by the Foxboro Company 1988                                      *
*                                                                            *
* All rights reserved Foxboro Company 1988                                   *
*                                                                            *
**&0*************************************************************************
*                                                                            *
* FILE NAME            : elem_alarm.ace                                      *
*                                                                            *
* PART NUMBER          :                                                     *
*                                                                            *
* FUNCTION             : Report contents of ELEM_ALARM table.                *
*                                                                            *
* COMPONENT HISTORY    :                                                     *
```

```
*  -------------------------------------------------------------------  *
*  11 JAN 1989 - RD - Creation                                          *
*                                                                       *
************************************************************************}

database
        pam
end

define
        variable teller integer
end

output
        report to "elem_alarm.out"
        left margin 0
        right margin 132
        top margin 0
        bottom margin 0
end

select
        path_name,
        elem_name
from elem_alarm
order by path_name, elem_name
end

format
        first page header
                let teller = 0
                print "-- Element Alarm Table ( ELEM_ALARM ) --"
                skip 2 lines
        on every row
                let teller = teller + 1
                print teller using "#####", "  Path Name              : ",
                        path_name clipped
                print "        Element Name           : ", elem_name clipped
                skip 1 line
{************************************************************************
```

Oct 12 16:15 1989 /usr/tmp/pam/db/e_alarm.ace Page 2

```
        on last row
                if ( count = 0 ) then
                begin
                        print "-- EMPTY --"
                        skip 1 line
                end
                skip 1 line
                print "-- End of ELEM_ALARM Table --", ascii 12;
end

{************************************************************************
*  @(#)e_cond.ace       1.2  I/A Series  Foxboro Company  89/08/17
*************************************************************************
*                                                                       *
*  Copyright by the Foxboro Company 1988                                *
*                                                                       *
*  All rights reserved Foxboro Company 1988                             *
*                                                                       *
**&0*********************************************************************
*                                                                       *
*  FILE NAME            : elem_cond.ace                                 *
*                                                                       *
*  PART NUMBER          :                                               *
*                                                                       *
*  FUNCTION             : Report contents of ELEM_COND table.           *
*                                                                       *
*  COMPONENT HISTORY    :                                               *
*  -------------------------------------------------------------------  *
*  11 JAN 1989 - RD - Creation                                          *
*                                                                       *
************************************************************************}

database
        pam
end

define
        variable teller integer
end
```

```
output
        report to "elem_cond.out"
        left margin 0
        right margin 132
        top margin 0
        bottom margin 0
end

select
        path_name,
        elem_name,
        cond_code,
        condition,
        seqno
from elem_cond
order by path_name, elem_name, seqno
end

format
        first page header
                let teller = 0
                print "-- Element Condition Table ( ELEM_COND ) --"
                skip 2 lines
        on every row
                let teller = teller + 1
                print teller using "#####", "  Path Name              : ",
                        path_name clipped
                print "         Element Name            : ", elem_name clipped
                print "         Condition Code          : ", cond_code;
                if ( cond_code = "U" ) then
                        print "(sage)"
                else if ( cond_code = "R" ) then
                        print "(elation)"
                else if ( cond_code = "A" ) then
                        print "(ssignment)"
                else
                        print
                print "         Condition               : ", condition clipped;
                if ( condition = "L" ) then
                        print "(ocked)"
                else if ( condition = "S" ) then
                        print "(ecured)"
                else
                        print
                print "         Sequence Number         : ", seqno clipped
                skip 1 line
        on last row
                if ( count = 0 ) then
                begin
                        print "-- EMPTY --"
                        skip 1 line
                end
                skip 1 line
                print "-- End of ELEM_COND Table --", ascii 12;
end

{*************************************************************************
* @(#)eqe.ace  1.2  I/A Series  Foxboro Company  89/08/17
**************************************************************************
*                                                                        *
* Copyright by the Foxboro Company 1988                                  *
*                                                                        *
* All rights reserved Foxboro Company 1988                               *
*                                                                        *
**&O**********************************************************************
*                                                                        *
* FILE NAME            : eqe.ace                                         *
*                                                                        *
* PART NUMBER          :                                                 *
*                                                                        *
* FUNCTION             : Report contents of EQE table.                   *
*                                                                        *
* COMPONENT HISTORY    :                                                 *
* ---------------------------------------------------------------------- *
* 11 JAN 1989 - RD - Creation                                            *
*                                                                        *
*************************************************************************}

database
        pam
end

define
        variable teller integer
end
```

```
output
        report to "eqe.out"
        left margin 0
        right margin 132
        top margin 0
        bottom margin 0
end

select
        elem_name,
        alarm_ref,
        description,
        owner_count,
        owner1,
        owner2,
        owner3,
        owner4,
        owner5,
        default_owner,
        default_oper_priv,
        oper_privilege,
        usage,
        eq_status
from eqe
order by elem_name
end

format
        first page header
                let teller = 0
                print "-- Equipment Element Table ( EQE ) --"
                skip 2 lines
        on every row
                let teller = teller + 1
                print teller using "#####", "  Element Name          : ",
                        elem_name clipped
                print "        Alarm Reference        : ", alarm_ref clipped
                print "        Description            : ", description clipped
                print "        Default Owner          : ", default_owner clipped
                print "        Default Privilege      : ", default_oper_priv;
                if ( default_oper_priv = "T" ) then
                        print "(rue)"
                else if ( default_oper_priv = "F" ) then
                        print "(alse)"
                else
                        print
                print "        Equipment Status       : ", eq_status;
                if ( eq_status = "U" ) then
                        print "(sable)"
                else if ( eq_status = "N" ) then
                        print "(ot usable)"
                else
                        print
                skip 1 line
        on last row
                if ( count = 0 ) then
                begin
                        print "-- EMPTY --"
                        skip 1 line
                end
                skip 1 line
                print "-- End of EQE Table --", ascii 12;
end

{*****************************************************************************
*  @(#)eqr.ace  1.2  I/A Series  Foxboro Company  89/08/17
******************************************************************************
*                                                                            *
*  Copyright by the Foxboro Company 1988                                     *
*                                                                            *
*  All rights reserved Foxboro Company 1988                                  *
*                                                                            *
**&0**************************************************************************
*                                                                            *
*  FILE NAME            : eqr.ace                                            *
*                                                                            *
*  PART NUMBER          :                                                    *
*                                                                            *
*  FUNCTION             : Report contents of EQR table.                      *
*                                                                            *
*  COMPONENT HISTORY    :                                                    *
*  ----------------------------------------------------------------------   *
*  11 JAN 1989 - RD - Creation                                               *
*                                                                            *
*****************************************************************************}
```

```
database
        pam
end

define
        variable teller integer
end

output
        report to "eqr.out"
        left margin 0
        right margin 132
        top margin 0
        bottom margin 0
end

select
        elem_name,
        reference_name,
        parameter_type,
        parameter_name
from eqr
order by elem_name, parameter_name
end

format
        first page header
                let teller = 0
                print "-- Equipment Reference Table ( EQR ) --"
                skip 2 lines
        on every row
                let teller = teller + 1
                print teller using "#####", "  Element Name          : ",
                        elem_name clipped
                print "       Reference Name        : ", reference_name clipped
                print "       Parameter Type        : ", parameter_type;
                if ( parameter_type = "B" ) then
                        print "(oolean)"
                else if ( parameter_type = "I" ) then
                        print "(nteger)"
                else if ( parameter_type = "L" ) then
                        print "(ong)"
                else if ( parameter_type = "F" ) then
                        print "(loat)"
                else if ( parameter_type = "S" ) then
                        print "(tring)"
                else if ( parameter_type = "C" ) then
                        print "(haracter)"
                else
                        print
                print "       Parameter Name        : ", parameter_name clipped
                skip 1 line
        on last row
                if ( count = 0 ) then
                begin
                        print "-- EMPTY --"
                        skip 1 line
                end
                skip 1 line
                print "-- End of EQR Table --", ascii 12;
end

# @(#)evnt_def.ini      1.3  I/A Series, Foxboro Company  9/14/89
#
# Database initialization script for table 'event_def'.
#
# History:
#       04 JAN 89, JvB, $PAMDIR is changed to '/usr/pam', so the db-directory
#                       becomes '$PAMDIR/db'.
#       01 SEP 89, RRD, Support extra argument for event 20 & 21
#

echo "

Initializing table 'event_def'.
-------------------------------

"
cd $PAMDIR/db

isql - - <<!

database pam;

delete from event_def;
```

```
insert into event_def
values
(       "00001",
        "E_AP_SELECT",
        "1",
        "1 3",
        "abort path select"
);

insert into event_def
values
(       "00002",
        "E_CO_MODE",
        "1",
        "1 2 6",
        "change operation mode"
);

insert into event_def
values
(       "00003",
        "E_CP_STATUS",
        "1",
        "1 2 5",
        "change path status"
);

insert into event_def
values
(       "00004",
        "E_RELEASE_P",
        "1",
        "1 2 4",
        "release path"
);

insert into event_def
values
(       "00005",
        "E_SELECT_P",
        "1",
        "1 2 3 6",
        "select path"
);

insert into event_def
values
(       "00006",
        "E_ABORT_P",
        "1",
        "1 2 4",
        "abort path"
);

insert into event_def
values
(       "00007",
        "E_PATH",
        "1",
        "1 2 4",
        "path"
);

insert into event_def
values
(       "00008",
        "E_STEP_P",
        "1",
        "1 2 7 8 9",
        "step path"
);

insert into event_def
values
(       "00009",
        "E_INIT_P",
        "1",
        "1 2 4",
        "initialize path"
);

insert into event_def
values
(       "00010",
        "E_FAIL_P",
        "1",
        "1 2 4",
        "failsafe path"
```

```
);

insert into event_def
values
(        "00011",
         "E_CE_PARAMETER",
         "2",
         "1 2 3 4",
         "chng equipment parameter"
);

insert into event_def
values
(        "00012",
         "E_CE_REFERENCE",
         "2",
         "1 2 5 6",
         "chng equipment reference"
);

insert into event_def
values
(        "00013",
         "E_CE_STATUS",
         "2",
         "1 2 7",
         "change equipment status"
);

insert into event_def
values
(        "00014",
         "E_CO_PRIVILEGE",
         "2",
         "1 2 8",
         "change operator privilege"
);

insert into event_def
values
(        "00015",
         "E_CU_SECURED",
         "2",
         "1 2",
         "change usage secured"
);

insert into event_def
values
(        "00016",
         "E_CU_LOCKED",
         "2",
         "1 2",
         "change usage locked"
);
insert into event_def
values
(        "00017",
         "E_RE_LOCKED",
         "2",
         "1 2",
         "register equipment locked"
);

insert into event_def
values
(        "00018",
         "E_RE_SECURED",
         "2",
         "1 2",
         "register equipm. secured"
);

insert into event_def
values
(        "00019",
         "E_UE_USE",
         "2",
         "1 2 9",
         "unregister equipment used"
);

insert into event_def
values
(        "00020",
         "E_P_EXCEPT",
```

```
        "3",
        "1 2 3 4",
        "path exception"
);

insert into event_def
values
(       "00021",
        "E_RP_EXCEPT",
        "3",
        "1 2 3 4",
        "return frm path exception"
);

insert into event_def
values
(       "00022",
        "E_VALID_ERR",
        "4",
        "1 2 3",
        "validation error"
);

!

echo "

End of initialization.
----------------------

"

# @(#)fmt_def.ini       1.3  I/A Series, Foxboro Company  9/14/89
#
# Database initialization script for table 'format_def'.
#
# History:
#       04 JAN 89, JvB, $PAMDIR is changed to '/usr/pam', so the db-directory
#                       becomes '$PAMDIR/db'.
#       01 SEP 89, RRD, Support extra argument for class 3
#

echo "

Initializing table 'format_def'.
--------------------------------

"
cd $PAMDIR/db

isql - - <<!

database pam;

delete from format_def;

insert into format_def
values
(       "1",
        "path",
        "9"
);

insert into format_def
values
(       "2",
        "equipment",
        "9"
);

insert into format_def
values
(       "3",
        "path_except",
        "4"
);

insert into format_def
values
(       "4",
        "validate",
        "3"
);
```

```
!

echo "

End of initialization.
----------------------

"

{*********************************************************************
*  @(#)p_value.ace      1.2  I/A Series  Foxboro Company  89/08/17
**********************************************************************
*                                                                    *
*  Copyright by the Foxboro Company 1988                             *
*                                                                    *
*  All rights reserved Foxboro Company 1988                          *
*                                                                    *
**#0******************************************************************
*                                                                    *
*  FILE NAME            : par_value.ace                              *
*                                                                    *
*  PART NUMBER          :                                            *
*                                                                    *
*  FUNCTION             : Report contents of PAR_VALUE table.        *
*                                                                    *
*  COMPONENT HISTORY    :                                            *
*  ----------------------------------------------------------------  *
*  11 JAN 1989 - RD - Creation                                       *
*                                                                    *
*********************************************************************}

database
        pam
end

define
        variable teller integer
end

output
        report to "par_value.out"
        left margin 0
        right margin 132
        top margin 0
        bottom margin 0
end

select
        path_name,
        pattern_name,
        elem_name,
        step_no,
        par_type,
        par_name,
        par_value,
        sync_rule
from par_value
order by path_name, pattern_name, elem_name, step_no
end

format
        first page header
                let teller = 0
                print "-- Parameter Value Table ( PAR_VALUE ) --"
                skip 2 lines
        on every row
                let teller = teller + 1
                print teller using "#####", "  Path Name            : ",
                        path_name clipped
                print "       Pattern Name          : ", pattern_name clipped
                print "       Element Name          : ", elem_name clipped
                print "       Step Number           : ", step_no clipped
                print "       Parameter Type        : ", par_type;
                if ( par_type = "B" ) then
                        print "(oolean)"
                else if ( par_type = "I" ) then
                        print "(nteger)"
                else if ( par_type = "L" ) then
                        print "(ong)"
                else if ( par_type = "F" ) then
                        print "(loat)"
                else if ( par_type = "S" ) then
                        print "(tring)"
                else if ( par_type = "C" ) then
                        print "(haracter)"
```

```
                else
                        print
                print "       Parameter Name         : ", par_name clipped
                print "       Parameter Value        : ", par_value clipped
                print "       Synchronisation Rule   : ", sync_rule clipped
                skip 1 line
        on last row
                if ( count = 0 ) then
                begin
                        print "-- EMPTY --"
                        skip 1 line
                end
                skip 1 line
                print "-- End of PAR_VALUE Table --", ascii 12;
end

{**************************************************************************
*  @(#)pac.ace  1.2  I/A Series  Foxboro Company  89/08/17
***************************************************************************
*                                                                         *
*  Copyright by the Foxboro Company 1988                                  *
*                                                                         *
*  All rights reserved Foxboro Company 1988                               *
*                                                                         *
**&U***********************************************************************
*                                                                         *
*  FILE NAME          : pac.ace                                           *
*                                                                         *
*  PART NUMBER        :                                                   *
*                                                                         *
*  FUNCTION           : Report contents of PAC table.                     *
*                                                                         *
*  COMPONENT HISTORY  :                                                   *
*  -------------------------------------------------------------------    *
*  11 JAN 1989 - RD - Creation                                            *
*                                                                         *
**************************************************************************}

database
        pam
end

define
        variable teller integer
end

output
        report to "pac.out"
        left margin 0
        right margin 132
        top margin 0
        bottom margin 0
end

select
        lbug,
        pacno,
        load
from pac
order by lbug, pacno
end

format
        first page header
                let teller = 0
                print "-- Path Controller Table ( PAC ) --"
                skip 2 lines
        on every row
                let teller = teller + 1
                print teller using "#####", "  Letterbug            : ",
                        lbug
                print "       PAC Number             : ", pacno
                skip 1 line
        on last row
                if ( count = 0 ) then
                begin
                        print "-- EMPTY --"
                        skip 1 line
                end
                skip 1 line
                print "-- End of PAC Table --", ascii 12;
end
```

```
#**************************************************************************
# @(#)pam_conf.per     1.2  I/A Series  Foxboro Company  89/08/18
#*************************************************************************
#                                                                        *
#  Copyright by the Foxboro Company 1989                                 *
#                                                                        *
#  All rights reserved Foxboro Company 1989                              *
#                                                                        *
#*&0**********************************************************************
#                                                                        *
#  FILE NAME           : pam_conf.per                                    *
#                                                                        *
#  PART NUMBER         :                                                 *
#                                                                        *
#  FUNCTION            : PAM perform screen for database configuration.  *
#                                                                        *
#  COMPONENT HISTORY   :                                                 *
#  ------------------------------------------------------------------   *
#  12 AUG 1988 - GM - Creation.                                          *
#  06 JAN 1989 - RD - Completely rewritten for Phase I.                  *
#  09 JAN 1989 - RD - Added initial screen.                              *
#  09 JAN 1989 - RD - Added table dev_conf.                              *
#  09 JAN 1989 - RD - Removed 'before ... par_value' part.               *
#  18 JAN 1989 - GM - Changed 1.2 keyword into @(#)pam_conf.per 1.2 for nsrev administration. *
#  30 JUN 1989 - RD - Support sync rules, changed SCCS keywords, use picture *
#                     in stead of include for numbers.                   *
#  16 AUG 1989 - RD - Added this header. This header is removed by the   *
#                     p_init.PTMGM script (sformbld does not accept comment). *
#                     Comment is now accepted. The first character of a  *
#                     comment line must be '#'.                          *
#                                                                        *
#************************************************************************/
database pam
screen
{
- FOXBORO COMPANY ------------------------------------------- 1.2 89/08/18 --

                    P A T H   M A N A G E M E N T

                        Database Configuration

    -- Table -- Description -------------------------------- Screen --

       1      Complete Path Specification ( COPAS ) .......... 2
       2      Pattern Specification ( PAT ) .................. 3
       3      Step Specification ( PAR_VALUE ) ............... 3
       4      Element Condition Specification ( ELEM_COND ) .. 4
       5      Element Alarm Specification ( ELEM_ALARM ) ..... 4
       6      Equipment Element Specification ( EQE ) ........ 5
       7      Equipment Reference Specification ( EQR ) ...... 6
       8      Path Controller Specification ( PAC ) .......... 7
       9      Device Configuration ( DEV_CONF ) .............. 7

    -------------------------------- Press S to start configuration --
}
screen
{
-- Table 1 -- Complete Path Specification -------------------------- Screen 2 --

Path Name               [f000        ]  Path Environment      [f001        ]
Path Owner              [f002        ]  Path Key              [f011        ]
Path Status             [a]
Operation Mode          [b]
Auto Failsafe           [c]
Description             [f003                              ]
Path Display            [f004                                  ]
                        [f005                                  ]
                        [f006                                  ]
Exception Proc. Type    [d]
Exception Proc. Name    [f007                 ]
Initialise Pattern      [f008        ]
Failsafe Pattern        [f009        ]
Alarm Reference         [f010                         ]
Specific Origin         [f012        ]  Specific Destination  [f013        ]
General Origin          [f014        ]  General Destination   [f015        ]
Path Type               [f016        ]  Path Rank             [f017 ]
}
screen
{
-- Table 2 -- Pattern Specification -------------------------------- Screen 3 --
```

```
Path Name              [f018         ]
Pattern Name           [f019         ]
Sequence Number        [f020 ]


-- Table 3 -- Step Specification -----------------------------------------------

Path Name              [f021         ]
Pattern Name           [f022         ]
Element Name           [f023         ]
Step Number            [f024 ]
Parameter Type         [e]
Parameter Name         [f025                              ]
Parameter Value        [f026         ]
Synchronisation Rule   [f027                                                 ]
}
screen
{

-- Table 4 -- Element Condition Specification ---------------------- Screen 4 --

Path Name        [f028         ]
Element Name     [f029         ]
Condition Code   [f]
Condition        [f030                                  ]
Sequence Number  [f031 ]

-- Table 5 -- Element Alarm Specification -------------------------------------

Path Name        [f032         ]
Element Name     [f033         ]
}
screen
{

   Table 6 -- Equipment Element Specification ---------------------- Screen 5 --

Element Name        [f034         ]
Alarm Reference     [f035                             ]
Description         [f036                                  ]
Owner Count         [a0]
Owner 1             [f037         ]
Owner 2             [f038         ]
Owner 3             [f039         ]
Owner 4             [f040         ]
Owner 5             [f041         ]
Default Owner       [f042         ]
Default Privilege   [g]
Current Privilege   [h]
Usage               [i]
Equipment Status    [j]
}
Screen
{

-- Table 7 -- Equipment Reference Specification -------------------- Screen 6 --

Element Name     [f043         ]
Reference Name   [f044         ]
Parameter Type   [k]
Parameter Name   [f045                             ]
}
screen
{

-- Table 8 -- Path Controller Specification ------------------------ Screen 7 --

Letterbug     [f046  ]
PAC Number    [a1]
Load          [a2]


-- Table 9 -- Device Configuration --------------------------------------------

Environment   [f047         ]
Device        [f048         ]
}
end
tables
copas
pat
par_value
elem_cond
```

```
elem_alarm
eqe
eqr
pac
dev conf
attributes
f000 = copas.path_name,
       required;
f001 = copas.path_environment,
       required;
f002 = copas.owner,
       noentry;
f011 = copas.key,
       noentry;
a = copas.path_status,
    comments = "Enter S(electable) or N(ot selectable)",
    upshift,
    default = "S",
    include = ( S, N );
b = copas.operation_mode,
    comments = "Enter A(uto) or M(anual)",
    upshift,
    default = "A",
    include = ( A, M );
c = copas.auto_failsafe,
    comments = "Enter Y(es) or N(o)",
    upshift,
    default = "N",
    include = ( Y, N );
f003 = copas.description;
f004 = copas.path_display[1,42],
       autonext;
f005 = copas.path_display[43,84],
       autonext;
f006 = copas.path_display[85,126];
d = copas.path_excep_type,
    comments = "Enter H(LBL procedure) or N(o procedure)",
    upshift,
    default = "N",
    include = ( H, N );
f007 = copas.path_excep_proc;
f008 = copas.init_pattern;
f009 = copas.fail_pattern;
f010 = copas.alarm_ref;
f012 = copas.specific_origin;
f013 = copas.specific_dest;
f014 = copas.general_origin;
f015 = copas.general_dest;
f016 = copas.path_type;
f017 = copas.path_rank,
       comments = "Enter an integer value",
       picture = "#####";
f018 = pat.path_name,
       required;
f019 = pat.pattern_name,
       required;
f020 = pat.seqno,
       default = "0",
       picture = "#####";

f021 = par_value.path_name,
       required;
f022 = par_value.pattern_name,
       required;
f023 = par_value.elem_name;
f024 = par_value.step_no,
       default = "0",
       picture = "#####";
e = par_value.par_type,
    comments = "Enter B(oolean), I(nteger), L(ong), F(loat), S(tring) or C(haracter)",
    upshift,
    include = ( " ", B, I, L, F, S, C );
f025 = par_value.par_name;
f026 = par_value.par_value;
f027 = par_value.sync_rule;

f028 = elem_cond.path_name,
       required;
f029 = elem_cond.elem_name,
       required;
f = elem_cond.cond_code,
    comments = "Enter U(sage), R(elation) or A(ssigment)",
    upshift,
    default = "U",
    include = ( U, R, A );
```

```
f030 = elem_cond.condition,
       required;
f031 = elem_cond.seqno,
       default = "0",
       picture = "#####";

f032 = elem_alarm.path_name,
       required;
f033 = elem_alarm.elem_name,
       required;

f034 = eqe.elem_name,
       required;
f035 = eqe.alarm_ref;
f036 = eqe.description;
a0 = eqe.owner_count,
     noentry,
     default = "0";
f037 = eqe.owner1,
       noentry;
f038 = eqe.owner2,
       noentry;
f039 = eqe.owner3,
       noentry;
f040 = eqe.owner4,
       noentry;
f041 = eqe.owner5,
       noentry;
f042 = eqe.default_owner;
g = eqe.default_oper_priv,
    comments = "Enter T(rue) or F(alse)",
    upshift,
    default = "F",
    include = ( T, F );
h = eqe.oper_privilege,
    noentry,
    comments = "Enter T(rue) or F(alse)",
    upshift,
    default = "F",
    include = ( T, F );
i = eqe.usage,
    noentry,
    comments = "Enter N(ot in use), L(ocked) or S(ecured)",
    upshift,
    default = "N",
    include = ( N, L, S );
j = eqe.eq_status,
    comments = "Enter U(sable) or N(ot usable)",
    upshift,
    default = "U",
    include = ( U, N );

f043 = eqr.elem_name,
       required;
f044 = eqr.reference_name;
k = eqr.parameter_type,
    comments = "Enter B(oolean), I(nteger), L(ong), F(loat), S(tring) or C(haracter)",
    upshift,
    include = ( B, I, L, F, S, C );
f045 = eqr.parameter_name,
       required;

f046 = pac.lbug,
       upshift;
a1 = pac.pacno,
     zerofill,
     default = "00",
     picture = "##";
a2 = pac.load,
     noentry,
     zerofill,
     default = "00",
     picture = "##";

f047 = dev_conf.environmt,
       required;
f048 = dev_conf.device,
       required;
instructions
before editadd editupdate of condition
if ( f = "U" ) then
       comments "Enter S(ecured) or L(ocked)"
if ( f = "R" ) then
       comments "Enter a relation"
```

```
if ( f = "A" ) then
        comments "Enter an assignment"
before editadd of pat
        let f018 = f000
        nextfield = f019
before editadd of elem_cond
        let f028 = f000
        nextfield = f029
before editadd of elem_alarm
        let f032 = f000
        nextfield = f033
before editadd of eqr
        let f043 = f034
        nextfield = f044
end


:
#**********************************************************************
#  @(#)pam_conf.rep     1.2  I/A Series  Foxboro Company  89/08/17
#**********************************************************************
#                                                                     *
#  Copyright by the Foxboro Company 1988                              *
#                                                                     *
#  All rights reserved Foxboro Company 1988                           *
#                                                                     *
#*&U*******************************************************************
#                                                                     *
#  FILE NAME            : pam_conf.rep                                *
#                                                                     *
#  PART NUMBER          :                                             *
#                                                                     *
#  FUNCTION             : Build a report of the complete PAM database *
#                                                                     *
#  COMPONENT HISTORY    :                                             *
#  -------------------------------------------------------------------*
#  11 JAN 1989 - RD - Creation                                        *
#                                                                     *
#**********************************************************************

echo
echo 'Building a report of the PAM database ...'
echo

for i in *.arc
do
        echo Table `basename $i .arc` '...'
        sacego -q `basename $i .arc`
done

cat copas.out pat.out par_value.out elem_cond.out elem_alarm.out eqe.out \
    eqr.out pac.out dev_conf.out > pam_conf.out

echo
echo 'Report available in pam_conf.out !'
echo

#
#  SCCS-ID:      @(#)pam_db.ini  1.3     89/08/18
#
#  Title:        PAth Management database creation script
#
#  Description:
#
#  Preconditions:
#                1. Directory /usr/pam already exists and Informix
#                   has been installed on system.
#
#                2. Group 'informix' and User 'pam' have been created.
#                   This script is executed by pam.
#
#                3. Set PAMDIR=/usr/pam and export PAMDIR.
#
#                4. The copas selection criteria configuration file has
#                   been installed in $PAMDIR.
#
#                5. Set INFORMIXDIR (usually = /usr/informix)
#                   and export INFORMIXDIR.
#
# History:
#       16 AUG 89, RRD, Feed smaller portions to isql to prevent buffer
#                       problem in AP10
#       09 JAN 89, AAM, Reversed elem_cond table: elem_name and cond_code
#       05 JAN 89, AAM, step_no added to par_value unique index
#       05 JAN 89, JvB, Reversed elem_cond_idx fields elem_name and cond_code.
```

```
#       04 JAN 89, JvB, Added column copas.path_excep_type, char(1).
#       04 JAN 89, JvB, $PAMDIR is changed to '/usr/pam', so the db-directory
#                        becomes '$PAMDIR/db'. The index pat_idx2, pat_idx4,
#                        pat_cond_idx2, elem_cond_idx2, par_value_idx2 and
#                        eqr_idx2 are deleted. The index pat_idx3 and
#                        par_value_idx are changed. The indexes are renumbered.
#       18 NOV 88, GM, Length of copas.path_environment 14 --> 12.
#                      Length of copas.path_status 5 --> 1.
#                      Added column copas.key, char(12).
#                      Length of eqe.owner_count 5 --> 2.
#                      Create index copas_idx2.
#       17 NOV 88, GM, Added creation of event_def, format_def and
#                      dev_conf.
#                      eqe.oper_privilige --> eqe.oper_privilege
#       26 JUL 88, GM, Created
#

COPASSEL=$PAMDIR/db/copassel.cnf
export COPASSEL

echo "

PATH MANAGEMENT DATABASE INSTALLATION
-------------------------------------


"

cd $PAMDIR/db

echo "

Creating Path Management database ...
-------------------------------------


"

if test -d pam.dbs
then
   rm -r pam.dbs
fi

(echo 'create database pam;

create table copas
(       path_name               char(12),
        path_environment        char(12),
        owner                   char(12),
        path_status             char(1),
        operation_mode          char(1),
        auto_failsafe           char(1),
        description             char(38),
        path_display            char(126),
        path_excep_proc         char(25),
        init_pattern            char(12),
        fail_pattern            char(12),
        alarm_ref               char(32),
        key                     char(12)
'
if test -s $COPASSEL
then
   echo ,
   cat $COPASSEL
fi
echo '  ,path_excep_type        char(1)
);

create table elem_alarm
(       path_name               char(12),
        elem_name               char(12)
);

create table pat
(       path_name               char(12),
        pattern_name            char(12),
        seqno                   char(5)
);

create table path_cond
(       path_name               char(12),
        cond_code               char(5),
        condition               char(46),
        seqno                   char(5)
```

```
);

create table elem_cond
(       path_name               char(12),
        elem_name               char(12),
        cond_code               char(1),
        condition               char(46),
        seqno                   char(5)
);

create table par_value
(       path_name               char(12),
        pattern_name            char(12),
        elem_name               char(12),
        step_no                 char(5),
        par_type                char(1),
        par_name                char(32),
        par_value               char(12),
        sync_rule               char(46)
);

create table eqe
(       elem_name               char(12),
        alarm_ref               char(32),
        description             char(38),
        owner_count             char(2),
        owner1                  char(12),
        owner2                  char(12),
        owner3                  char(12),
        owner4                  char(12),
        owner5                  char(12),
        default_owner           char(12),
        default_oper_priv       char(1),
        oper_privilege          char(1),
        usage                   char(1),
        eq_status               char(1)
);

") : $INFORMIXDIR/bin/isql - -

(echo "database pam;

create table eqr
(       elem_name               char(12),
        reference_name          char(12),
        parameter_type          char(1),
        parameter_name          char(32)
);

create table event_def
(       event_type              char(5),
        def_lit                 char(20),
        class                   char(5),
        control                 char(20),
        description             char(25)
);

create table format_def
(       class                   char(5),
        format                  char(10),
        nr_params               char(5)
);

create table dev_conf
(       environmt               char(12),
        device                  char(12)
);

create table pac
(       lbug                    char(6),
        pacno                   char(2),
        load                    char(2)
);

create unique index copas_idx on copas
(       path_name
);

create index copas_idx2 on copas
(       path_environment
);

create unique index elem_alarm_idx on elem_alarm
(       path_name,
        elem_name
```

```
);

create unique index pat_idx on pat
(       path_name,
        pattern_name
);

create index pat_idx2 on pat
(       path_name,
        seqno
);

create unique index path_cond_idx on path_cond
(       path_name,
        cond_code,
        condition
);

') | $INFORMIXDIR/bin/isql - -

(echo 'database pam;

create unique index elem_cond_idx on elem_cond
(       path_name,
        cond_code,
        elem_name,
        condition

);

create unique index par_value_idx on par_value
(       path_name,
        pattern_name,
        step_no
);

create index par_value_idx2 on par_value
(       path_name,
        elem_name
);

create unique index eqe_idx on eqe
(       elem_name
);

create unique index eqr_idx on eqr
(       elem_name,
        parameter_name
);

create unique index event_def_idx on event_def
(       event_type
);

create unique index format_def_idx on format_def
(       class
);


create unique index dev_conf_idx on dev_conf
(       environmt,
        device
);

create unique index pac_idx on pac
(
        lbug,
        pacno
);

create index pac_idx2 on pac
(
        load
);

') | $INFORMIXDIR/bin/isql - -

echo "

END OF PATH MANAGEMENT DATABASE INSTALLATION
-------------------------------------------
"
```

```
{*****************************************************************************
 * @(#)pat.ace  1.2  I/A Series  Foxboro Company  89/08/17
 *****************************************************************************
 *                                                                           *
 * Copyright by the Foxboro Company 1988                                     *
 *                                                                           *
 * All rights reserved Foxboro Company 1988                                  *
 *                                                                           *
 **$0*************************************************************************
 *                                                                           *
 * FILE NAME          : pat.ace                                              *
 *                                                                           *
 * PART NUMBER        :                                                      *
 *                                                                           *
 * FUNCTION           : Report contents of PAT table.                        *
 *                                                                           *
 * COMPONENT HISTORY  :                                                      *
 * ------------------------------------------------------------------------- *
 * 11 JAN 1989 - RD - Creation                                               *
 *                                                                           *
 *****************************************************************************}

database
        pam
end

define
        variable teller integer
end

output
        report to "pat.out"
        left margin 0
        right margin 132
        top margin 0
        bottom margin 0
end

select
        path_name,
        pattern_name,
        seqno
from pat
order by path_name, pattern_name, seqno
end

format
        first page header
                let teller = 0
                print "-- Pattern Table ( PAT ) --"
                skip 2 lines
        on every row
                let teller = teller + 1
                print teller using "#####", "  Path Name           : ",
                        path_name clipped
                print "        Pattern Name          : ", pattern_name clipped
                print "        Sequence Number       : ", seqno clipped
                skip 1 line
        on last row
                if ( count = 0 ) then
                begin
                        print "-- EMPTY --"
                        skip 1 line
                end
                skip 1 line
                print "-- End of PAT Table --", ascii 12;
end


#
#  @(#)backup_pam       1.2  PAM backup script  8/17/89
#

BU=`date ; awk '{ print $2$3 }'`
BU=pam$BU

find /usr/pam -type d -name '*SCCS' -print > /tmp/dlist

sed 's/\/usr/\./' /tmp/dlist > /tmp/dlist1

cd /usr

case $# in
   0) tar cvf /usr/tmp/$BU `cat /tmp/dlist1`
      doscopy /usr/tmp/$BU dos!c:/$BU ;;
```

```
    *) tar cvdf 2 /usr/tmp/$BU.inc `cat /tmp/dlist1`
       doscopy /usr/tmp/$BU.inc dos!c:/$BU.inc ;;
esac
```

```
# @(#)backupcron.p      1.2 Foxboro I/A System 8/17/89
```

BPJNIMDAGAIAJACBADIEAKIDCAGALAIIMBGCAGILBKCAFONEJJCDOMIFJIDAGDNGNEIBGD
BBKDEGDIFPDAIEGJADCCINJLDBCAHMEEJMFIPBGCMGINBNFPMCHBCBJCKEAMBPCGGCCIAIDI
LAOAMBIDDGFGFCIMPJJBOIMGJACDFDAKGNOJBBKGMLIPDBGICGLNJJHDKHEAICAIAPCKGEOI
BAKCMEKBEPJNDGAFCJAGAOEJJDCIFFHOGFCKNDOIMMLCDGHBOKOEIJPFCHIIKAGLNNLKPNAC
FHGJNOLABMABEHONELFFCH

```
# @(#)bin-to-sccs       1.2  8/17/89
#
# sccsconv : conversion from binary to sccs acceptable
#            format (ASCII + keywords) and vice versa.
#
#
# History
#  24 AUG 88, PV: Initial creation
#  26 APR 89, RD: Added basename just before switch, so program can
#                 be run from another directory.
#
#
KW1='# $W'
KW2='% '
KW3='Foxboro I/A System'
KW4=' %'
KW5='G%'
KEYWORDS="$KW1$KW2$KW3$KW4$KW5"

PATH=$PATH:/usr/foxbin
#
# The keywords are split over multiple variables to allow storage
# of this file under sccs
#
case $# in
0)
cat <<!
Usage: $0 file [file]...

bin-to-sccs file [file] ... Converts each 'file' into an sccs
                            acceptable 'file'.p.

sccs-to-bin file [file] ... Converts each 'file'.p into its
                            binary original 'file'.


  Sccs acceptable means an ASCII file with sccs keywords.

  The source file ('file' or 'file.p') is kept.

!
  ;;
*)
    for i in $*
    do
        case `basename $0` in
   bin-to-sccs)
            if [ ! -f $i ]
            then
              echo Error: $i does not exist
            elif head -1 $i | grep "$KW3" > /dev/null
            then
              echo Error: $i is not a binary file
            else
              echo Converting binary $i to sccs format
              cp $i $i.b
              compress -fFq $i
              hc a $i.Z /tmp/_cv.tmp
              echo $KEYWORDS > $i.p
              cat /tmp/_cv.tmp >> $i.p
              rm /tmp/_cv.tmp $i.Z
              mv $i.b $i
            fi
            ;;
   sccs-to-bin)
            if [ ! -f $i.p ]
            then
              echo Error: $i.p does not exist
            elif head -1 $i.p | grep "$KW3" > /dev/null
            then
              echo Converting $i.p to binary format
              cp $i.p $i.s
```

```
          sed "1d" $i.p > /tmp/_cv.tmp
          hc b /tmp/_cv.tmp $i.Z
          uncompress -fq $i
          rm /tmp/_cv.tmp
          mv $i.s $i.p
        else
          echo Error: $i.p is not in sccs format
        fi
        ;;
 *)     echo Type bin-to-sccs or sccs-to-bin ; exit 2
        ;;
      esac
   done
esac


#
#  @(#)comp_env_chk     1.2  8/17/89
#

echo "Compile Environment on machine `uname -n` on `date`"
echo "

For each of: Foxboro Compile Environment
             Informix-CISAM Compile Environment
             Venix Compile Environment

The Environment is defined by three commands:

             - directory listing of files (command: /tmp/fsize)
             - versions of the files (command: what)
             - checksums of the files (command: sum)

"
FOXBORO_ENV='/usr/lib/lib*fox.a /usr/include/fox/* /usr/include/private/*'

INFORMIX_ENV='/usr/lib/libisam.a /usr/include/isam.h'

VENIX_ENV='/bin/ar /bin/as /bin/cc /bin/ld /bin/make /lib/* /usr/bin/admin /usr/
bin/delta /usr/bin/get /usr/bin/lex /usr/bin/ranlib /usr
/bin/rmdel /usr/bin/what /usr/bin/yacc'

echo "

 Foxboro Compile Environment
"
for i in $FOXBORO_ENV
do
/tmp/fsize $i
done
what $FOXBORO_ENV
sum $FOXBORO_ENV

echo "

 Informix-CISAM Compile Environment
"
for i in $INFORMIX_ENV
do
/tmp/fsize $i
done
what $INFORMIX_ENV
sum  $INFORMIX_ENV

echo "

 Venix Compile Environment
"
for i in $VENIX_ENV
do
/tmp/fsize $i
done
what  $VENIX_ENV
sum  $VENIX_ENV


/*****************************************************************
*  @(#)convlist.c       1.2  Foxboro Company  8/17/89
******************************************************************
*
*  convlist: Converts list of full pathnames into list which can serve as
*            input for the 'release' tool. This list can also be given to
*            the 'mkfl2' tool, which creates a file-list for a 'tar'
*            command.
*
```

```
 *           If an option -s is given in the command, the SCCS part of
 *           the input pathnames is not transferred to the output list.
 *           If this option is omitted, the output list will contain SCCS
 *           path- and filenames.
 *
 * History:
 *  10 Jan 1989 - GM - Use $HOME instead of /usr/bpm
 *
 ******************************************************************/

#include <stdio.h>
#include <string.h>

#define MX_PATH 64

main( argc, argv )
int argc;
char *argv[];
{
   char line [ MX_PATH + 1 ],
        *p_line,
        *split,
        *file,
        *opt,
        prev_path [ MX_PATH + 1 ],
        *name,
        *root,
        *getenv();
   FILE *fp;

   if ( argc < 2 || argc > 3 )
   {
      printf( "usage: convlist <filename> [-s]\n" );
      exit( 0 );
   }

   if ( argv[1][0] == '-' )
   {
      opt = argv[1];
      file = argv[2];
   }
   else
   {
      opt = "";
      file = argv[1];
   }
   strcpy(prev_path,"");

   if ( (FILE*)NULL == (fp = fopen( file, "r" )) )
   {
      printf( "can not open file %s\n", file );
      exit( 0 );
   }

   if ( (root = getenv( "HOME" )) == (char*)NULL )
   {
      printf( "error reading environment: HOME\n" );
      exit( 0 );
   }

   while ( EOF != fscanf( fp, "%s", line ) )
   {
      p_line = line;

      if ( !strncmp(line, root, strlen(root)) )
         p_line += strlen(root);

      split = strrchr( p_line,'/' );

      if ( split != (char*)NULL && strlen(name = split + 1) > 0 )
      {
         *split = '\0';

         if ( !strcmp(opt,"-s") &&
              !strncmp("/SCCS",p_line + strlen(p_line) - 5,5) )
         {
             p_line[ strlen(p_line) - 5 ] = '\0';
             if ( !strncmp("s.",name,2) )
                name += 2;
         }

         if ( strcmp(p_line,prev_path) )
         {
            printf( ".%s\n",p_line );
            strcpy( prev_path,p_line );
```

```
        }

        printf ( "%s\n",name );
      }
    }
}

#************************************************************************
# @(#)load_db  1.1  I/A Series  Foxboro Company  89/08/18
#************************************************************************
#                                                                       *
#  Copyright by the Foxboro Company 1989                                *
#                                                                       *
#  All rights reserved Foxboro Company 1989                             *
#                                                                       *
#*&0*********************************************************************
#                                                                       *
#  FILE NAME           : load_db                                        *
#                                                                       *
#  FUNCTION            : Load the PAM database from a set of ASCII files.  *
#                                                                       *
#  COMPONENT HISTORY   :                                                *
#  --------------------------------------------------------------------  *
#  30 JUN 1989 - RD - Creation                                          *
#                                                                       *
#************************************************************************

echo "
*** Loading PAM database ***
"

isql - - <<!
database pam;
load from "copas.sav" insert into copas;
load from "pat.sav" insert into pat;
load from "p_value.sav" insert into par_value;
load from "e_cond.sav" insert into elem_cond;
load from "e_alarm.sav" insert into elem_alarm;
load from "eqe.sav" insert into eqe;
load from "eqr.sav" insert into eqr;
load from "pac.sav" insert into pac;
!

echo "
*** Done
"

#
# @(#)mk_pamdlist       1.2  8/17/89
#

find /usr/pam -type d -name '*SCCS' -print > /tmp/pamtmp
sed '/\/SCCS$/s/\/SCCS$//' /tmp/pamtmp
rm /tmp/pamtmp

#
# @(#)mk_rellist        1.2  8/17/89
#

for i in `cat /usr/pamrelease/rel$1/sccs_dirs`
do
   prssid+tim $i/*
done

#
# @(#)mk_sccsdlist      1.2  8/17/89
#

find /usr/pam -type d -name '*SCCS' -print

#
# @(#)mkfl2     1.2  8/17/89
#

case $# in
0)
cat <<!
Usage: $0 filespec [filespec]...

Filespec contains lines that are:
 - comments (start with # or @): Silently ignored
 - directories (start with .): Sets directory base
 - files (start with anything else) : Echo relative full pathname
   to standard output
```

```
!
    ;;
*)
#    set -x
    for i in $*
    do
      IFS='
'
      for j in `cat $i`
      do
        case $j in
        \#*|@*)
              ;;
        \.*) DIR="$j"
              ;;
        *)  echo $DIR/$j
              ;;
        esac
      done
    done
esac
# set -
#
# @(#)pam_bld_chk      1.2  8/17/89
#

echo "Result of PAM build on machine `uname -n` on `date`"
echo "

The build result is defined by the following commands:

            - directory listing of files (command: l)
            - versions of the files (command: what)
            - checksums of the files (command: sum)
            - contents table of libraries (command: ar tv)

"
PREF=$1
export PREF

LIB=`ls $1/lib`

BIN=`ls $1/bin`

OBJ=`find $PREF -name obj -type d -print`

echo "

Versions of PAM libraries
"
cd $1/lib
for i in $LIB
do
   echo "
contents of $i:"
   ar tv $1/lib/$i | awk '{ print $2, $7 }'
done
fsize $LIB
what  $LIB
sum   $LIB

echo "

Versions of PAM executables
"
cd $1/bin
fsize $BIN
what  $BIN
sum   $BIN

echo "

Versions of PAM object files
"
for i in $OBJ
do
   cd $i
   OBFILES=`ls $i`
   fsize $OBFILES
   what $OBFILES
   sum  $OBFILES
done

#
# @(#)prssid+tim      1.2  8/17/89
```

```
#
prs -d":I:      :D:     :PN:" $*

#
# @(#)release   1.2  8/17/89
#

case $# in
0)
cat <<!
Usage: $0 [-r<num>] filespec [filespec]...

Filespec contains lines that are:
 - comments (start with # or @): Silently ignored
 - directories relative to current dir of $0: Changes directory
 - files relative to current dir of $0 : Perform action dependent
   on $0 containing patterns: cl, gt, ge, un, dt

  cl: removes the files (rm -f)
  gt: get the files from sccs (sccs get -r<num>)
  ge: get the files from sccs for edit (sccs edit -r<num>)
  gk: get the files from sccs without keyword subs.(sccs get -r<num> -k)
  un: unedit the files in sccs (sccs unedit)
  dt: delta the files back to SCCS (sccs delta)
      CMT_FILE must be set (and exported) to contain
      the full path name of the comments file
!
  ;;
*)
#     set -x
    BASE=`pwd`
    prog_name="$0"
    case "$1" in
    -r*) version="$1"
         shift
         ;;
    *)   version=
    esac
    for i in $*
    do
      IFS='
'
      cd /usr/pam
      for j in `cat $i`
      do
        case $j in
        \#*|@*) echo Comment: "$j"
            ;;
        *)
            echo Parsing: "$j"
            if test -d $BASE/$j
            then
              cd $BASE/$j
              pwd
            else
                case $prog_name in
                *cl*)  rm -f $j
                esac
                case $prog_name in

                *gt*)  sccs get $j -p  $version  >$j
                       ;;
                *ge*)  sccs edit $j -p  $version  >$j
                       ;;
                *gk*)  sccs get $j -p -k  $version  >$j
                       ;;
                *un*)  sccs unedit $j
                       ;;
                *dt*)  sccs delta $j < $CMT_FILE
                       ;;
                esac
            fi
        esac
      done
    done
esac
# set -
#
# @(#)relpam    1.2  8/17/89
#
# relpam: Automatic execution of all release related
#         activities.
#
```

```
# History:
#  10 Jan 89 - GM - Created
#

case $# in
0)
cat <<!
Usage: $0 <path for release dirs> <X.X> { -d <cutoff date> | -i }

Possible options:
   -d: create delta release diskette(s)
       <cutoff date> specification: yymmdd[hhmm]
   -i: create install diskette(s)

   login as root before running script

!
exit ;;
esac

case $3 in
-d)
   cd /usr/pam

   # create lists
   prs -l -c$4 -d":PN:" `cat $1/rel$2/sccs_dirs` | uniq > $1/rel$2/files.$2
   /usr/pam/tools/convlist -s $1/rel$2/files.$2 > $1/rel$2/sources.$2
   sed '/^cm_/d' $1/rel$2/sources.$2 >/tmp/srclist
   mv /tmp/srclist $1/rel$2/sources.$2
   /usr/pam/tools/mkfl2 $1/rel$2/sources.$2 > $1/rel$2/tarlist.$2
   /usr/pam/tools/mkfl2 $1/rel$2/cm_.new >> $1/rel$2/tarlist.$2

   su - pam <<!
   /usr/pam/tools/pclgk $1/rel$2/sources.$2
   /usr/pam/tools/pclgt $1/rel$2/cm_.new
!

   # delta release to file
   cd /usr/pam
   tar cvf $1/rel$2/fl `cat $1/rel$2/tarlist.$2`
   /usr/pam/tools/pclgt $1/rel$2/sources.$2
   ;;

i)
   su - bpm <<!

   pclgt $1/rel$2/*.fl
   pclgt $1/rel$2/cm_.f
   make cleanup
   rm -f bin/* lib/*
   make bpm SCCS=SCCS/ PREF=/usr/bpm
!
   /usr/bpm/tools/mk_install
#  format -n /dev/fh0
#  cd /usr/install
#  tar cvf /dev/fh0 ./usr
   ;;

esac


#
# @(#)rp_pream_h        1.2  8/17/89
#
# change 'pream.h' into 'fox/pream.h'

for i in `/usr/pam/tools/mk_pamdlist`
do
   cd $i
   for j in *.c
   do
      if grep pream.h $j >/dev/null 2>&1
      then
         echo parsing $i/$j
         rm -f $j
         sccs edit $j
         sed 's/pream.h/fox\/pream.h/g' $j >/tmp/repfile
         mv /tmp/repfile $i/$j
         sccs delta -y"include fox/pream.h instead of pream.h" $j
         sccs get $j
      fi
   done
done
```

```
#*************************************************************************
# @(#)save_db  1.1  I/A Series  Foxboro Company  89/08/18
#*************************************************************************
#                                                                        *
# Copyright by the Foxboro Company 1989                                  *
#                                                                        *
# All rights reserved Foxboro Company 1989                               *
#                                                                        *
#*&0**********************************************************************
#                                                                        *
# FILE NAME             : save_db                                        *
#                                                                        *
# FUNCTION              : Save the PAN database into a set of ASCII files. *
#                                                                        *
# COMPONENT HISTORY     :                                                *
# -----------------------------------------------------------------     *
# 30 JUN 1989 - RD - Creation                                            *
#                                                                        *
#*************************************************************************

echo "
*** Saving PAN database ***
"

isql - - <<!
database pam;
unload to "copas.sav" select * from copas;
unload to "pat.sav" select * from pat;
unload to "p_value.sav" select * from par_value;
unload to "e_cond.sav" select * from elem_cond;
unload to "e_alarm.sav" select * from elem_alarm;
unload to "eqe.sav" select * from eqe;
unload to "eqr.sav" select * from eqr;
unload to "pac.sav" select * from pac;
!

echo "
*** Done
"


# @(#)sccs-to-bin       1.2  8/17/89
#
# sccsconv : conversion from binary to sccs acceptable
#            format (ASCII + keywords) and vice versa.
#
#
# History
#  24 AUG 88, PV: Initial creation
#  26 APR 89, RD: Added basename just before switch, so program can
#                 be run from another directory.
#
#
KW1='# %W'
KW2='% '
KW3='Foxboro I/A System'
KW4=' %'
KW5='G%'
KEYWORDS="$KW1$KW2$KW3$KW4$KW5"

PATH=$PATH:/usr/foxbin
#
# The keywords are split over multiple variables to allow storage
# of this file under sccs
#
case $# in
0)
cat <<!
Usage: $0 file [file]...

bin-to-sccs file [file] ... Converts each 'file' into an sccs
                            acceptable 'file'.p.

sccs-to-bin file [file] ... Converts each 'file'.p into its
                            binary original 'file'.

  Sccs acceptable means an ASCII file with sccs keywords.

- The source file ('file' or 'file.p') is kept.

!
  ;;
*)
   for i in $*
   do
```

```
case `basename $0` in
bin-to-sccs)
        if [ ! -f $i ]
        then
          echo Error: $i does not exist
        elif head -1 $i | grep "$KW3" > /dev/null
        then
          echo Error: $i is not a binary file
        else
          echo Converting binary $i to sccs format
          cp $i $i.b
             compress -fFq $i
             hc a $i.Z /tmp/_cv.tmp
             echo $KEYWORDS > $i.p
             cat /tmp/_cv.tmp >> $i.p
             rm /tmp/_cv.tmp $i.Z
             mv $i.b $i
           fi
           ;;
  sccs-to-bin)
           if [ ! -f $i.p ]
           then
             echo Error: $i.p does not exist
           elif head -1 $i.p | grep "$KW3" > /dev/null
           then
             echo Converting $i.p to binary format
             cp $i.p $i.s
             sed "1d" $i.p > /tmp/_cv.tmp
             hc b /tmp/_cv.tmp $i.Z
             uncompress -fq $i
             rm /tmp/_cv.tmp
             mv $i.s $i.p
           else
             echo Error: $i.p is not in sccs format
           fi
           ;;
  *)       echo Type bin-to-sccs or sccs-to-bin ; exit 2
           ;;
      esac
   done
esac

{ @(#)COMPBLCK.s        1.3, 89/09/14, RD }

INDEPENDENT_SEQUENCE

VARIABLES

USER_LABELS

STATEMENTS

SENDMSG ( "39;req" ) TO MSGGR4;
SENDMSG ( "57;eq" ) TO MSGGR4;
SENDMSG ( "59;eq" ) TO MSGGR4;
SENDMSG ( "61;req" )TO MSGGR4;
SENDMSG ( "63;req" ) TO MSGGR4;
SENDMSG ( "65;req" ) TO MSGGR4;

ENDSEQUENCE

{ @(#)COMPHLBL.s        1.3, 89/09/14, RD }
{********************************************************
*                                                       *
*  Function : HLBL source file for COMP:HLBL ( TDS 3530 ) *
*                                                       *
*  Author   : Ronald Duursma                            *
*                                                       *
*  Date     : 88/10/31                                  *
*                                                       *
*********************************************************}

INDEPENDENT_SEQUENCE

CONSTANTS

VARIABLES
        error       : I;
        name        : S12;
        key         : S12;
        status      : S6;
        usage       : S6;
        cur_type    : I;
```

```
        prv_type   : I;
        prv_code   : I;
        pat_name   : S12;
        alarm      : I;
        cur_mode   : I;
        def_mode   : I;
        auto_fs    : I;
        step_state : I;
        step_no    : I;

USER_LABELS

/****************************************
* Include PAM Function Library for HLBL *
****************************************/

#include "/usr/lib/pfl.s"

SUBROUTINE test( IN case, actual, expected : I )

VARIABLES

STATEMENTS

        IF actual <> expected THEN
                SENDMSG ( "*** CASE ", case, " ***" ) TO MSGGR1;
                SENDMSG ( "    Expected : ", expected ) TO MSGGR1;
                SENDMSG ( "    Actual   : ", actual ) TO MSGGR1;
                SENDMSG ( "" ) TO MSGGR1;
        ENDIF;

ENDSUBROUTINE

STATEMENTS

        CALL release_p( "req", "path", "TST", error );
        CALL test( 1, error, PAM_OK );

        CALL release_p( "req", "path", "TST", error );
        CALL test( 2, error, P_NOT_SELECTED );

        CALL release_p( "req", "path", "TST", error );
        CALL test( 3, error, P_TIME_OUT );

        CALL select_p( "req", "env", "SRC=TANK_A;",
                       "DST=TANK_B;", name, key, error );
        SENDMSG ( "*** CASE 4 ***" ) TO MSGGR1;
        SENDMSG ( "    Name  : ", name ) TO MSGGR1;
        SENDMSG ( "    Key   : ", key ) TO MSGGR1;
        SENDMSG ( "    Error : ", error ) TO MSGGR1;
        SENDMSG ( "" ) TO MSGGR1;

        CALL select_p( "req", "env", "SRC=TANK_A;",
                       "DST=TANK_B;", name, key, error );
        CALL test( 5, error, PAM_OK );
        SENDMSG ( "*** CASE 5 ***" ) TO MSGGR1;
        SENDMSG ( "    Name  : ", name ) TO MSGGR1;
        SENDMSG ( "    Key   : ", key ) TO MSGGR1;
        SENDMSG ( "    Error : ", error ) TO MSGGR1;
        SENDMSG ( "" ) TO MSGGR1;

        CALL select_p( "req", "env", "SRC=TANK_A;",
                       "DST=TANK_B;", name, key, error );
        CALL test( 6, error, P_INIT_FAILED );

        CALL select_p( "req", "env", "SRC=TANK_A;",
                       "DST=TANK_B;", name, key, error );
        CALL test( 7, error, P_NO_PATH_POSSIBLE );

        CALL select_p( "req", "env", "SRC=TANK_A;",
                       "DST=TANK_B;", name, key, error );
        CALL test( 8, error, P_INV_ENVIRONMENT );

        CALL select_p( "req", "env", "SRC=TANK_A;",
                       "DST=TANK_B;", name, key, error );
        CALL test( 9, error, P_TIME_OUT );

        CALL select_p( "req", "env", "SRC=TANK_A;",
                       "DST=TANK_B;", name, key, error );
        CALL test( 10, error, P_TIME_OUT );

        CALL gp_key( "req", "path", key, error );
        CALL test( 11, error, PAM_OK );
        SENDMSG ( "*** CASE 11 ***" ) TO MSGGR1;
```

```
SENDMSG ( "    Key   : ", key ) TO MSGGR1;
SENDMSG ( "    Error : ", error ) TO MSGGR1;
SENDMSG ( "" ) TO MSGGR1;

CALL gp_key( "req", "path", key, error );
CALL test( 12, error, P_INV_PATH_NAME );

CALL gp_key( "req", "path", key, error );
CALL test( 13, error, P_TIME_OUT );

CALL fs_path( "req", "path", "TST", error );
CALL test( 14, error, PAM_OK );

CALL fs_path( "req", "path", "TST", error );
CALL test( 15, error, P_FREED );

CALL fs_path( "req", "path", "TST", error );
CALL test( 16, error, P_NO_FAILSAFE );

CALL fs_path( "req", "path", "TST", error );
CALL test( 17, error, P_TIME_OUT );

CALL gp_state( "path", "TST", cur_type, prv_type,
               prv_code, pat_name, alarm, cur_mode,
               def_mode, auto_fs, step_state,
               step_no, error );
SENDMSG ( "*** CASE 18 ***" ) TO MSGGR1;
SENDMSG ( "    Current Type  : ", cur_type ) TO MSGGR1;
SENDMSG ( "    Previous Type : ", prv_type ) TO MSGGR1;
SENDMSG ( "    Previous Code : ", prv_code ) TO MSGGR1;
SENDMSG ( "    Pattern Name  : ", pat_name ) TO MSGGR1;
SENDMSG ( "    Alarm State   : ", alarm ) TO MSGGR1;
SENDMSG ( "    Current Mode  : ", cur_mode ) TO MSGGR1;
SENDMSG ( "    Default Mode  : ", def_mode ) TO MSGGR1;
SENDMSG ( "    Auto Failsafe : ", auto_fs ) TO MSGGR1;
SENDMSG ( "    Step State    : ", step_state ) TO MSGGR1;
SENDMSG ( "    Step Number   : ", step_no ) TO MSGGR1;
SENDMSG ( "    Error Number  : ", error ) TO MSGGR1;
SENDMSG ( "" ) TO MSGGR1;

CALL gp_state( "path", "TST", cur_type, prv_type,
               prv_code, pat_name, alarm, cur_mode,
               def_mode, auto_fs, step_state,
               step_no, error );
SENDMSG ( "*** CASE 19 ***" ) TO MSGGR1;
SENDMSG ( "    Current Type  : ", cur_type ) TO MSGGR1;
SENDMSG ( "    Previous Type : ", prv_type ) TO MSGGR1;
SENDMSG ( "    Previous Code : ", prv_code ) TO MSGGR1;
SENDMSG ( "    Pattern Name  : ", pat_name ) TO MSGGR1;
SENDMSG ( "    Alarm State   : ", alarm ) TO MSGGR1;
SENDMSG ( "    Current Mode  : ", cur_mode ) TO MSGGR1;
SENDMSG ( "    Default Mode  : ", def_mode ) TO MSGGR1;
SENDMSG ( "    Auto Failsafe : ", auto_fs ) TO MSGGR1;
SENDMSG ( "    Step State    : ", step_state ) TO MSGGR1;
SENDMSG ( "    Step Number   : ", step_no ) TO MSGGR1;
SENDMSG ( "    Error Number  : ", error ) TO MSGGR1;
SENDMSG ( "" ) TO MSGGR1;

CALL gp_state( "path", "TST", cur_type, prv_type,
               prv_code, pat_name, alarm, cur_mode,
               def_mode, auto_fs, step_state,
               step_no, error );
CALL test( 20, error, P_INV_PATH_NAME );

CALL gp_state( "path", "TST", cur_type, prv_type,
               prv_code, pat_name, alarm, cur_mode,
               def_mode, auto_fs, step_state,
               step_no, error );
CALL test( 21, error, P_TIME_OUT );

CALL iz_path( "req", "path", "TST", error );
CALL test( 22, error, PAM_OK );

CALL iz_path( "req", "path", "TST", error );
CALL test( 23, error, P_ABORTED );

CALL iz_path( "req", "path", "TST", error );
CALL test( 24, error, P_NO_INITIALIZE );

CALL iz_path( "req", "path", "TST", error );
CALL test( 25, error, P_TIME_OUT );

CALL path( "req", "path", "pat", "TST", error );
CALL test( 26, error, PAM_OK );
```

```
        CALL path( "req", "path", "pat", "TST", error );
        CALL test( 27, error, P_FAILSAFE );

        CALL path( "req", "path", "pat", "TST", error );
        CALL test( 28, error, P_IN_OPERATION );

        CALL path( "req", "path", "pat", "TST", error );
        CALL test( 29, error, P_TIME_OUT );

        CALL ce_parameter( "req", "eq", "par", "val", error );
        CALL test( 30, error, PAM_OK );

        CALL ce_parameter( "req", "eq", "par", "val", error );
        CALL test( 31, error, P_INV_PAR_NAME );

        CALL ce_parameter( "req", "eq", "par", "val", error );
        CALL test( 32, error, P_TIME_OUT );

        CALL ge_status( "eq", status, error );
        SENDMSG ( "*** CASE 33 ***" ) TO MSGGR1;
        SENDMSG ( "    Status : ", status ) TO MSGGR1;
        SENDMSG ( "    Error  : ", error ) TO MSGGR1;
        SENDMSG ( "" ) TO MSGGR1;

        CALL ge_status( "eq", status, error );
        CALL test( 34, error, P_INV_EQ_NAME );

        CALL ge_status( "eq", status, error );
        CALL test( 35, error, P_TIME_OUT );

        CALL ge_usage( "eq", usage, error );

        SENDMSG ( "*** CASE 36 ***" ) TO MSGGR1;
        SENDMSG ( "    Usage : ", usage ) TO MSGGR1;
        SENDMSG ( "    Error : ", error ) TO MSGGR1;
        SENDMSG ( "" ) TO MSGGR1;

        CALL ge_usage( "eq", usage, error );
        CALL test( 37, error, P_INV_EQ_NAME );

        CALL ge_usage( "eq", usage, error );
        CALL test( 38, error, P_TIME_OUT );

        CALL re_locked( "req", "eq", error );
        CALL test( 39, error, PAM_OK );

        CALL re_locked( "req", "eq", error );
        CALL test( 40, error, P_EQ_NOT_USABLE );

        CALL re_locked( "req", "eq", error );
        CALL test( 41, error, P_TIME_OUT );

        CALL re_secured( "req", "eq", error );
        CALL test( 42, error, PAM_OK );

        CALL re_secured( "req", "eq", error );
        CALL test( 43, error, P_ALR_SECURED );

        CALL re_secured( "req", "eq", error );
        CALL test( 44, error, P_TIME_OUT );

        CALL ue_use( "req", "eq", error );
        CALL test( 45, error, PAM_OK );

        CALL ue_use( "req", "eq", error );
        CALL test( 46, error, P_NOT_OWNER );

        CALL ue_use( "req", "eq", error );
        CALL test( 47, error, P_TIME_OUT );

ENDSEQUENCE

{ @(#)CPPAMBLCK.s       1.1, 89/09/14 }

INDEPENDENT_SEQUENCE

VARIABLES

USER_LABELS

STATEMENTS

WAIT 60;

ENDSEQUENCE
```

```
/*******************************************************************
* @(#)dbg.c    1.2  8/17/89
********************************************************************
*                                                                  *
* Copyright by the Foxboro Company 1988                            *
*                                                                  *
* All rights reserved Foxboro Company 1988                         *
*                                                                  *
**&0****************************************************************
*                                                                  *
* FILE NAME            : dbg.c                                     *
*                                                                  *
* PART NUMBER          :                                           *
*                                                                  *
* FUNCTION             : HLBL Debug Server                         *
*                                                                  *
* FUNCTIONS CONTAINED  : main()                                    *
*                        PPpop_msg()                               *
*                                                                  *
* DATA STRUCTURES      :                                           *
*                                                                  *
* COMPONENT HISTORY    :                                           *
* ---------------------------------------------------------------- *
* 24 OCT 1988 - RD - Creation                                      *
* 06 JUL 1989 - RD - Added include of <fox/almtypes.h>             *
* 06 JUL 1989 - RD - Turned off buffering                          *
*                                                                  *
*******************************************************************/

#include <fox/almtypes.h>
#include <fox/alarmmsg.h>
#include <fox/concat.h>
#include <stdio.h>

/*************************
* File global definitions *
*************************/

static  char    SCCS_id[] = "@(#)DBG    1.1, 88/10/19";

static  char    dbg_name[14];

static  char    o_name[14];

static  char    msg_in[1024];

static  PTR_CONCAT_MSG  concat_ptr;
static  PTR_ALARM_MSG   alarm_ptr;


/*******************************************************************
*                                                                  *
* Copyright by the Foxboro Company 1988                            *
*                                                                  *
* All rights reserved Foxboro Company 1988                         *
*                                                                  *
**&2****************************************************************
*                                                                  *
* NAME              : main                                         *
*                                                                  *
* FUNCTION          : Main line of DBG.                            *
*                                                                  *
* RETURN CODES      : None.                                        *
*                                                                  *
* COMPONENT HISTORY :                                              *
* ---------------------------------------------------------------- *
* 24 OCT 1988 - RD - Creation                                      *
*                                                                  *
*******************************************************************/

main( argc, argv )
int     argc;
char    *argv[];
{
        int     rc;
        int     sz;


        setbuf( stdout, 0 );


        /*
         * Determine dbg_name.
         */
```

```
        if ( argc > 1 )
        {
                strcpy( dbg_name, argv[1] );
        }
        else
        {
                strcpy( dbg_name, "DBG" );
        }


        /*
         * Initialize IPC.
         */

        rc = PPini_ipc( dbg_name, 1, 25 );
        if ( rc != 0 ) PPstp_ipc( rc );


        /*
         * Main loop.
         */
        while ( 1 )
        {
                /*
                 * Receive message.
                 */

                rc = PPrcv_msg( msg_in, o_name, &sz, 0 );
                if ( rc != 0 ) PPstp_ipc( rc );


                /*
                 * Check type.
                 */

                concat_ptr = ( PTR_CONCAT_MSG ) msg_in;
                alarm_ptr  = ( PTR_ALARM_MSG ) concat_ptr -> aprint_buff;

                if ( alarm_ptr -> messg_type == SEQ_1_MESSAGE )
                {
                        rc = PPpop_msg();
                        if ( rc != 0 ) PPstp_ipc( rc );
                }

        } /* End of while */

} /* End of main() */

/***********************************************************************
*                                                                      *
*  Copyright by the Foxboro Company 1988                               *
*                                                                      *
*  All rights reserved Foxboro Company 1988                            *
*                                                                      *
**$2*********************************************************************
*                                                                      *
*  NAME              : PPpop_msg                                       *
*                                                                      *
*  FUNCTION          : Handle POP message.                             *
*                                                                      *
*  RETURN CODES      : PAM_OK or return codes of called functions.     *
*                                                                      *
*  COMPONENT HISTORY :                                                 *
*  ------------------------------------------------------------------  *
*  24 OCT 1988 - RD - Creation                                         *
*                                                                      *
***********************************************************************/

int     PPpop_msg()
{
        int             offset = 0;
        int             counter = 0;

        char            *msg_ptr;


        /*
         * Do loop for every sequence message in IPC message.
         */

        do
        {
                /*
                 * Determine message location in structure.
                 */
```

```
                alarm_ptr  = ( PTR_ALARM_MSG ) ( concat_ptr -> aprint_buff +
                                                  offset );
                msg_ptr    = alarm_ptr -> text_buffer +
                             alarm_ptr -> block_dscrp_length;

                printf( "%s\n", msg_ptr );


                offset = concat_ptr -> msg_offset[counter++];

        } while ( ( offset != 0 ) && ( counter <= MAX_MSGS ) );


        /*
         * Return to caller.
         */

        return( 0 );

} /* End of PPpop_msg() */

# @(#)ees_tst.ini        1.2  I/A Series, Foxboro Company  8/17/89
#
# Database initialization script for EES TDS execution.
#
# History:
#       04 JAN 89, JvB, $PAMDIR is changed to '/usr/pam', so the db-directory
#                       becomes '$PAMDIR/db'.
#

echo "

PATH MANAGEMENT DATABASE INITIALIZATION
---------------------------------------

"
cd $PAMDIR/db

isql - - <<!

database pam;

delete from eqe;
delete from eqr;

insert into eqe
(       elem_name,
        description,
        owner_count,
        default_owner,
        default_oper_priv,
        usage,
        eq_status
)
values
(       "valve_789012",
        "Valve_789012 description",
        "0",
        "super_owner2",
        "F",
        "N",
        "U"
);

insert into eqr
values
(       "valve_789012",
        "",
        "I",
        "Iparam1"
);

insert into eqr
values
(       "valve_789012",
        "",
        "F",
        "Fparam1"
);

insert into eqr
values
(       "valve_789012",
        "",
        "S",
        "Sparam1"
```

```
);

insert into eqr
values
(       "valve_789012",
        "",
        "L",
        "Lparam1"
);

insert into eqr
values
(       "valve_789012",
        "",
        "B",
        "CPPAM6789012:PAMBLCK89012.BI0001"
);
!

echo "

END OF PATH MANAGEMENT DATABASE INITIALIZATION
---------------------------------------------

"


:
# @(#)exectst   1.2 89/09/21
# Function : Execute PAM testing
# History  : 17 AUG 1989 - RD - Creation
#            21 SEP 1989 - RD - Reset database before testing 'steptst'
#
if [ ! -d /usr/pam/test ]
then
        echo "No test environment, exit!"
        exit
fi
#
echo "*** Execute PAM tests ***"
cd /usr/pam/test
#
echo "Do you want to load the test sources? (Y/N) \c"
read a
if [ $a = y -o $a = Y ]
then
        echo "Put test sources diskette into drive 0 and hit RETURN \c"
        read a
        echo "Loading test sources ..."
        tar xf /dev/rfh0
        for i in *.z
        do
                FILE=`basename $i .z`
                unpack $FILE >/dev/null
                tar xf $FILE >/dev/null
                rm -f $FILE
        done
fi
#
echo "Do you want to preprocess the test sources? (Y/N) \c"
read a
if [ $a = y -o $a = Y ]
then
        for i in tds*.doc
        do
                FILE=`basename $i .doc`
                date "+Preprocessing $FILE started at %H:%M"
                tpp $FILE.doc > $FILE.tst
        done
        date "+Preprocessing ....... stopped at %H:%M"
fi
#
if [ -f errors.log ]
then
        rm errors.log
fi
#
for i in tds*.tst
do
        FILE=`basename $i .tst`
        echo "*** Error log of $FILE ***" >> errors.log
        date "+Executing $FILE started at %H:%M"
        pamtst < $FILE.tst > $FILE.log 2>> errors.log
done
#
cp /usr/pam/config/CFG.DAT /usr/pam/config/cfg.dat
#
```

```
if [ -f steptst ]
then
        FILE=steptst
        echo "*** Error log of $FILE ***" >> errors.log
        date "+Executing $FILE started at %H:%M"
        /usr/pam/db/pam_db.ini >> errors.log 2>&1
        /usr/pam/db/dev_conf.ini >> errors.log 2>&1
        /usr/pam/db/evnt_def.ini >> errors.log 2>&1
        /usr/pam/db/fmt_def.ini >> errors.log 2>&1
        cd /tmp >> errors.log 2>&1
        tar xvf /usr/pam/test/steptst.db >> errors.log 2>&1
        /usr/pam/test/load_db >> errors.log 2>&1
        cd /usr/pam/test >> errors.log 2>&1
        pamtst < $FILE > $FILE.log 2>> errors.log
fi
#
if [ -f tds3635 ]
then
        FILE=tds3635
        echo "*** Error log of $FILE ***" >> errors.log
        date "+Executing $FILE started at %H:%M"
        $FILE > $FILE.log 2>> errors.log
fi
#
date "+Executing ....... stopped at %H:%M"
#
echo "*** Done ***"
```

@(#)exesrv.p 1.2 Foxboro I/A System 8/17/89

BPJNIMAHACAAAAIAEAMGEACBAHAGCCCJDAFAIOIBIBBACDEKGMEGGPFDDGBHAKGECMGCLH
KINOCAGDACAGPBAAFAAHNPEHABFGBCNJFAJCGDFBLBACACAAEAFJGEEECGDKAHAAAGBBDDAA
AFNNLCBIFJMGAJGMBGAPEAJFINFGKOAEGCIHIBAACOAFDCHBAJIEICILIBIMJOGKACOIDEJA
MIIILOEBHOPEABKAHDOAJPBNHNOIDCAIMICCDFOKFEHEEACGOIHEDKBAEKCDCDPGOMBKCBGH
NHBALJHNDNCJIFCEIGKAOLNHLAGDMLJOEFEHCOEABGLAPGAAPMBJJAOOEBIALLPCHKJKIJJA
GFABDADKBAHAENLIIKAOAPGHFMPPPOPFAEACBEJNDIAJFMPBPFEIFNCHDEAINCFNEOKHOOFJ
ACCIFIHNCELLLEONHJIPEFBGLDPENANBIDJAKFIHEANALIFKJAJOKBFLDFLKHNDANINGONDJ
MNDIHCHENAJIPHIIAJLNAJOJAHNFHLFOMLPOBNJGPBEGHOABKDFLMFLJKHDAPGHGJCGPDCIO
ALAAIBLOHPEBGBJGDNOIFMCCNHEOFNNJODJJBPCEJIGFMPFNHHMBBHCADKCLAMLAJFGBGAIJ
EFJGFJGIPNADEABGOLAMIDMLHGBAFCNFAGGJAHFIIIKAFHBJCGMGCBDKNLHNDICADKDFPAFH
BHDKBHGEJHIOCPPODEGCAGDPFPHINBMFDAEHLBJDNEFCEMAAGAJGFDNAJAFGMDIBAECNIJIL
BGDJPEIEACJEMDINGIJDDBBBMMHFIMABIAMIOAIJAMFPLKCCIDBMBKBJIBMACIMKMIAANGED
HEJANAFPFEHFOBDCEAFEENPGOEICADDKBFMGCCGCHEBEEAJDDOOLDEDBCHFFFDGFFJGMJNHJ
KCCDMMACDKDBIAGBFIABAEDKOIDKCBGENJCIAOJABCEDMAKEPKFECKKIFHOLBEDAOHDKAAPI
AIKEJAEECCKFBEDLFCOEOEADBMAGNBIBMAJCPPFIEACLFLINEKIAAAFLHHFCNFCIAFHMHKKK
CJGJOCHEEKAAENAEKMDDEEKBLIPAHDBFCOHJOCGCEBFEKKFIDHENABHNKOFDIDJEBDMMKAJH
CKIBDNLANFFNOEFCDLONLFFEGFNLJDCKNMBCLGAOADDNAMEEAHCOODINFFMLDKMLCNIJNODK
COGEKBGKJAEDBGHJCEDLKAAAIAALBCHEMKAEJPBHNGLBGADOEOFKFCFFBHHMFMFIJHMBMEAG
BMGDEIMGACGBKMNKKBAPIPOMJPCOADEJEBBFJFDNJNIAEAKEKDDIODKGAPDCAHNAIMALPPNI
CADDCOBOIIHLBHCKDNMFFDKMABDPALDLOMNGLILIILMOABPBCCBAIKMMOJKAADAAENAKGEKC
HCFLCIADKADCDKEPBINACHKIJFDKDAGFJFKOBJJAMFKAOJPEKCDAMDBGDLGMAIMEDMPFDBHE
HPPPBNOKCPBLEDCPFJHCNLACOKCMADDKAIBMPALFFHIDOOGAIAMMHELANACBCOCJPIGMAENA
OIEMDBHENBOKFCIFLENCGJBANAOHKFELOMGNJGABOINAACMBFMDECBLCIIBHIFBNLAOHDKBE
AMJAEFFHKGIAGFAKEJBBNMMFEIFPHAKDLDIEIKMNDGGALLIAHGJIICIOBPIDNBAFAAKKADLD
GKPAKLCIHPIOEODEGLMFMFAIFIINJAEEFJDEGLDHNMBHBBNGHFNCNAFGBFJDGMIIBANGCJPC
DNMFCMMDCHIFMFBPIMOOKJMHOEMHIEILAGDCNBMEEIABBCLICNIHHFHHLAHAOOPIKKFJBCEN
BAGALFONAFNAAOKAELIBOAIIMBIAFBDAGDGGAPAMIABPICIAALBGAECAGLFHILAJAGHLLCAM
MNBBAGFEACKAIDABNAAGILAAIIIPHLIIJCEJMOBOIIIOFHDEMNDAOLDAEACIBOAIDGDODENA
GOHGGAAEDKAKKBBFEPFBIPCEKGBCMIDKAGDAKHAMNJKMAALKBAOCAALCLGAAGBNEIBDCBOLI
IMBBBMEBJFGADJGPAMJNOCMKJPDEEEBJHKGEIPGPPAEBCBDKBIMBAAPACBONGCAAOMEJBOMK
IILOCKKJMPDKAOJIBIABOAPHAPPJNBEPCPFEIEMPPOHKJCIGBFPMIPHMMAFLJGJKAKBIMGAD
ICGOADFOGDKAADCBCIADAJFCNAICBLMENCAGNBNBALBFPJOJDAPKAIOBAILMJCAOFBCIAMIN
CIBMMOAKPPBGAKAPFODCIGDDJEEBANEJPAMDDKDMOACOFEHENOALHKNIDLFIACEPIHGCHIIJ
KHNGPBDNDPFEGPEDDJEEEHCJBMMDMLBPACFDIHJGHAIMBBPLPAACAOHNAOBHDEHABMOEDNNB
CJAEFAKOFKMBEKJKHFGIMBEDAEFMNKFEADEBNOIPAIMGCKCDLNCKCGKHFLNGBBBMJAMOEFHM
ABACIJFIGHDLIPAAIBHGHOMBABPBIEEACIMCGEBIGGINCCEMOJDMAGDNNBHEDKHNDACLJPON
PEEKDMPJOEAHDIFBGAHOCKEECALDPAGMBDANKIGACLOIDAMBGFMGKJDMFHCNCFCGPLFECFOB
LMPAJFDPOAIEAOBLMANFGCFAKACMMPMAGBABAFFNMEDKGBMIINICAOMCKEEADMMFKIAIJFCK
IOBGMMKDOMCAIAKMNKEEBCAOHMCOGHGGECAMAKPODBBHFMNJCAEMGJDJFPLDMAPAAPAHLEKJ
ICDGOJIBAJFOLHMFJNBCGBAAOLEIICEKNBBCAPDGDKOFIOJPBLBEEFHLBCIFBEGMCFKELBBJ
NEDPDFOCAFMMAMAKKBCEKFAJDOBGFKFAIBECAAENOIBIECEPFHPFFDHDCOGFCAPDGEKHBHJG
PFEOLOCOFGKGPFHMOMDNPDOJCPFKJMOADIAGGINDNCAGELMOOFBNJGLDBNDFCMDLAGGCBGAF
JIOFFGAIPEBHABBGIIAAFMFAECFMOIDAEDACNIBCALNIHKGBLGGACBIACKOKKAAAFMBAADLG
FAJICNCPKFJEAMNIAOCBABHDMBMFDFGAJLIDNJNCHEAAOJLAIGNCNCABNLBFMMDGBNNKFANI
DMGAALICOLDOODJDDEOIEJAFKOELAMIFCJCALMOIFAMAHFHDKBDAALKAPHBPLPEKIHCLBECG
ACPENCCDLOKDFAJIALMAJLIOPIGCECGBDLEAKPDHOCNLAIIFBNABLNNDIIKPCABEEGAFPECC
ODFHOLMAADCOMEIAFOFPEANIANLIJIADHKGJABGBDCOANCBAOIFFAFIELFIAILELKABHBEBA
KGMKCINAGLAJAIBLABBHLCEACPCDCAMMADFMAIADLNICIALAAMHAOBAMPEOCABNCCIMAIFDG
NAOLAGAIHLOAJJODEAGPBIFOLGNLAHLEEACADNAAABAADOJAIOGIIAGDBCPPDIIFBEGGHAFK
FMMIADLNEDGAHCJEOMNAFLAENEKACHDGBAPDKJEADLCEKDLIGKBAOMIAMAFNOILBAIHMMMIJ
BCDJBIMICAHMMAIEBKAEKAAOEOJDEEAOLKMCIOHFEAAABNNFPIJEBBNIDBJLHPNEMBFEDAMA
MHDKNKMAKMEFFIMBAACFEIEMCAMEDBJAEEBEOAAIEHKIPEKFHDABABAACHCABJCCIMIGDKKC
IBAMHBOIMDNDKABOKAKFBFJAOJMPGMLKNDJPAOLFJKGGENGKFDKDNKAAKKGGLFKLDNDNOHKO
MAODBIEGJAMHEAOOACAPKKDIOAIAOMEAENBPEGHACBCDLICDHJIFENAKJMBJHABHLLNKNJAA
HINGDDJPPMAMOIFAAINKNIIGEGMHALBEAMIPEGDPBKBHJBFOIMAKAOJKOLGDDACEFFEGNIKL

BBOIIBGHHLIAKAAGHDKGEKAEAOAIAPHEGIIANKCLJCAHLGIHOBGGHDHCJJACHHKOPDJHPDCH
KLDOPPDJHAIDDGHCLPAOLNIHABHEAFBNOOIGLEKEJDLAIIGPHENKAIJPDKEANJEPHOBFJFKL
AJNGEHLAPHEAEOKOAAJIHLBNNPPACADELCNNEBACIACPJKCKANDICADKAKCEICGKKLGDOSHL
IDDDAHOOICAOIJIDJLOCHLLGHILJHPGNAEHAKEDLAJBOKPHKHIOBCHOJDHHABLHEDHGHLJKF
BBFAOLFLADAAOGHPBNHLKPEPJNOKFFLHPKNFLJKGJKHNOPHNHCEJNFJLOOLKHGOHNNJHKNPB
KOJAADNJOGFAIBHPPJPCJEADICADBNOFAIEBLFHFIBPEDHLDNDADEHHHHKLICLEOGOIHHHHF
OKIHLOIEAACOLPPFHIKHAANJNOEAKHBHLHPGIHFKCFOAHEKEJHABAFOHJAIHIFNJEEBECBOA
KKDHDNPDGOAGPAGDBNGCHADNPAANGABGGPKAADBJKHNHAJENLHNBJFBBGCADBAHPOAHAFIDK
PANHACLICACKECJNIJBBANFAAAOFPHEEAIBONEKCDINGHBIBOGDPLPIKBBCFAADKFCJAPNKO
IIADCHJHOOEDNAONOAHLBNIHIACNNBNIEHDKBCDBDFJENPHNOGLKOGHKNOABHAHCGPFKIBNG
JKNGGJGHBHHHLLPGHPGLPHGLNBKAAPHCAGHHHFHHHPPHJHHHAOHIHEHOAHNIDEDAHIFEJBAA
IGIHAOKDAAACILAHBGKBAHEHLOOHAKCCHADGEGHAHIDOFFEONKHGAOAOHABHPGCAHJFADHGO
BHGHGOBJOHAOOJFGAEABNABFOONAHJJCFGADFPBHHDHILHHCPJJHAIKKIDBHFNCBAPHIEGAP
DOOAHDJJDBCCAHOEAOOIFAACBNLICCPANAHIAOHHBEHHHBBBNPDGHJFBFHHJDCOIHHOJHGAN
GHLHBHDKLIAOCEPICJPLBHGLCGBHIECOFHBIGHBIGKGJCIHHCKPHIGEGCACJCOKHHHFHPIHB
HIKGAOECOAHDOIEABFBFHAEAOEIAAOJOPAABNFGGAOFEJIICCLIIBHCOCIGOFCGHHJNGFGID
GBJIIDLECBHCOLBAADDNBIHGEBFIAACHFIIEEHIIAEEKFIEFENDIHOIECIIFIHHIAFFLDIBG
JEKBAKAADAHBADIBALNBIHALEOHAGGOIOAAKPBECAAKDCAGIJONBAHKGJCBKOLBAAEHLCGGI
ACPAAHEIGACHDCDBADHANADHICIGAOLADABIAGHAILDJJAILHCBCCNNGIIIHDJIAAOJIHAIH
HFJGILEBGHADHJAIAHBOHABGLHKIAEDJJDIHGDPAINIJOAADICJGCFNLDBIONFHIAGHHKIIN
ONIIAOEBPAINKIPBAPOLLAABFPGCHBAKJDCIOLHIINNFOIADHHCIIDJNOFHIBGAAHIADNBIK
AKIDDEFOCAILPAOAEBIKKGAOCBEHBDOKLAAOEONAGHDKGHGNFINAIDPGGHAEPAPAFHEFDIEA
FHNBGPHIIBFIEGFAHDPJIGGHGCIBGPONJAECHAKDAOOIDAAPBNFAGNOIGABGCOHJAKBNHAFF
OGEABDOILAHAANJHICELKHHBILAIAAEKHFIDFKDHIJPFLIAOELHAIJDPCIINCHAHIECABJIH
DECHIEPGBGDCHNLHBHIANHAGBGFIBFPOAADHIHAHAHDBLJCCCGEIFIANJHHEOHAAHBBNBJJE
OICAALGBAIHCEGHJILJGGIHPGNOIJBJKNIJBBHOJAOHAOAHDCLIJALANLAJFGGDBHEBEPAJF
FKHEHECHNIJDKGHIAODPNJHEFJEIHBOIGAAFGBAIAOFLNHILECKAJEPIOHJENDCHIECANJIG
BCGIJFEGGAAOHEJAJFAINAJHHGHAHIKHHAABILFHIKHLKGAHDFEABCEKIAJAKOBIBFHHCAIL
CPHADLKDGAAJHPAIANLKHIJECHLAGHLEBJIHBNEAIHFADAIHDJEDJLOIBAADLKNEIHLEJJIL
LLGIIPAJPACFKICJBAKBEAJLOENEHALLJAACPFEHAAEEDBAOJPOCAAHINGGGEFLCALEBFAJN
JGDGECEOIAAAHHJJJHHLDJJGBLLBALCKAAAAHHHJBFHKJJADEDJCEOECJIAIFHCAAAHGJIAO
PBOACBHLBDAFHHKBEFPKIAALHIIAADHAKDAPPOCCAHCKDCECPIGAAPAGOAAHDIAAACIBHCJE
ACLAAIHHJAAFHBFJCEAJCFJOAIHAABKHGFAAAIIHAAAEDCAAOPLHACHHJFGJIAKHAGPPPPAAH
AHLFGPLBGBAHFOCBAACHLKAPGGOJCHAKLHGPHACDAPHOODAFAHFKGHKHEDAPHGJABABCHKJD
AGLDAIHGLACHKDGHIHDLDAAPHEOAAAPHHAAKCKHAAAIAAGAIDPIAIKHPDCAPJIBAFKCJAIDK
LHBAIGPIEAHLCAAAJHEDIKALIPHAGGLIHAAIGCEKAILCHIAGLKNEFLHPGABDHHPACBOKGIBD
JBKAELHLICAPFJBCCHOIBAAIHCLKAIFDOIBFDHHBAIOGIIBHDLJAGPCCAEBJIOKGAOFHFADB
OIDAAFHCGKAFLOBJDJHCEKKIIPEGBDPGDAEEIDACKEOJLJADOAOJAACHNBAIJHFGJOIJPAJO
IFCFBENFOJKJKAHKHALLBABDKEIKGHOFJEALHHHCCHALGCADFBCGBJJGIIAHFGFGAAJINABC
NIPAAPDHOAJBAHJACPHCHAFKAPHBAPOBFAAAPCDAABILAAANILBAAHLLAAADOHBJAPLODKAA
FILAAOABLAAFODHAAAJPIKGHPFDICEFEKBAJDJLAAOFOEABFJHHAKHFIEABFJOHAKHFHADAK
HHHKAEFECBAKHHGKAEFEEBAKHHAKAEFEGBAKHHKADFEIBAKNNBKFOEJHDKHCOEABFKHNAKN
CIEABFKONAKHCCEABFLANAKNBHEABFLCHAKNBGEABFLENAKNBAEABFLGHAKNAKEABFLINAKN
HFKDALOCEKBFLHGAKOFEOBALOJEKBFHAHAKOFECBAHPBEKBFHEFAKPFEGBAHPJEKBFHIHAKP
FEKBAHAAELBFHHEALAFEOBAHAICLCHAHELBFNCAALBFEEBAHBEELBFHGIALBFEIBANDJDAAF
FBCAAFILIAANCHHAKLHBHAIHILFABGHALAAFFKJAAFFLIAAFJHFAEOLLHABAKCIGKBKJAKJP
OINJAOLLHACHFHLLAIODPJLFHHIJBEOHIEEAELHKKBEDKAAAHAFABCHHHCCKIEAJGHCDPEFI
CKFHJPCFCABAGGHHEPHILLAIPFJJIAKHFGHGOCHAKCAJJCAIFGEAKHAHDBADHCKADCGGIBAP
AOACBOHFOCENILDFJPPFIJALILHLLIHAADLJHGGAAPFCDDDBAIGAGFHBCAAHAFDFADAKLCAH
HHCAAAPHGAANADDAAHBDGAAHAFHAKHIDCAANGHIGICFHLAAILOCAFEILGAALAPHBDKAIIAHH
AHEAABHEHAADKHKDAAFBOLLLCLKAHCKIJDACEHBAKBFOGALHHKJLDKKHAFBOBHHABHHGIAAA
IKDKBFFHIAAOHGCAABJLIDDKHHPLLHECLIAQBEJABEHFKLKLHCLGABFLDBAAHGFALHECDIJA
KCAFALFDJDLLFDGDALAILAIKCDAJAAIKEAAEAHIAAJIJGAAIFGPAAPILKAGIFPOBALABENAB
HFHAEOFONBLIEBGHGLHKHAKCOLGALHJOBAHANBDAAOILHAAIBCJAHBPIKAAILGEKGICOIFAE
GANBAOCFEAAHECJAAIHOEAAPEHHANBPOLLGICOOFDFHOCANCHFPAAOBCLKACCKAKHAPPBAAA
IKOIBFADGAHDPPELAFPPBAKIPIGAAHGGKJAPFABAHALGBAHANPCBAAENCFCPBHPAAPEHJHBK
PJPBCCHJKAABFLLBAIIGOANDJDDCFKHFBAAGIDLCACJPHCHFPPJAACFEBAKBAFEIEIPKUAAA
GDAHHEHGLAAAIAHAAHHBBLCIFGIAAOHAGAABFJGAAPEEGAAAEEEAAHCDGAHHAGEAAAHFIAAB
AOPCBEPFODBFDEJHBHOIBAAFFELHBDCOFFAAHBKHANBEFAHHHHOHKAHJEJKJHIJBAOHHHAAA
AGLJIKIGAAAHBOKCHJHEHAHJHIAGAPDDHHHBEHLAHCOHJAAOEPJAAAIBOAAFOGBABDOIPAAO
KLGHAOECLFAOHHHKHKPHLLAOOBBAHLKFLGAONKBAHLEAIALPOOBAEONOHAAPJLPJHLHFKAHI
HDOHLHCDHEAEPOGAGHPFACAAHHFAALDEABAPPHIAANHGBGAIHGCANLHHBODLHJIHHKUCHFHH
HGPGHHHHDAAKDLBHEOJHEAHHOGEAAEEABENLFCEGBOONHAACHHHKHDPPKAHCIELGLEPGHAAI
LDGAADAEEAAHBGGANFDOKHALFAHBAPOKDAAAILAGHPGHAHHGEHLAAONLIAHOLPEHAHKHAHHG
DILIAOLDOAHPPPIAGOKKBAHLECDEAKOIPHBHBHDAAINDEHKEHLHHAPIANLHHIGHAAGBFGNAJ
GOGAIPHCHBHHKDPHHHJJPALPCGJHAICIPHAPLGBDJCEFDIAILOJANCJCBBAFGOIHHDCGAHAA
HDIAAEBOODAHPPAAAHDGOADBJPHHLHDJOHCBIAFAAHICOOALDPEHAHBJGANFCGLHAIDDHHAP
HKFAHHIDJAFHDAHHHCCJLHAODHAABPCGHHBDJDHAAPFJIAAJPPDAAEHEOGAFPEHAKBOLIAAC
OIEHBOAODAHEPPCAAHEHGHAIEJHHDHBDIAHOPHELAHJIGHAIEEEHAHHHJHHHFECHHADDPHLP
OLCDHDDODHAIGCPBAHDGHAHDLOLADOAJHAAHLJOJALDOEHBCHHBCHJBOOCHEAHEHBCPHGHAI
OLGOHFDOBHLLDJEBLLGJLHHGGHHHAABBGGHFIJGHHDICHHLICKPDEGDHHBAAFJPEHKJKOLHE
DOOHHEOLIDAOHBKAAAFPGDAIEOHAHCACGCHFABJHAJCLAAHHPPLAABJGCACAKEDHLLEKKCHG
DLHKKBDIHHHJHPHAAKJACHHJHHOAAJKHGHHIKDCHLLKGAHHHGHHHKBJHBHCHDECBAPDEEHGH
FGOAAOCLAAAHIKHHFEGCOBAHPFAEHBEGKAAOPPHLHJLBAHAAACJAAOHHBAAABLDHBGBHPHHB
HOHHAECCHHAFCEBHHDDDEHLOBOGHAAHKPHHHIHHLHFDCJHHCDFKHKCHJFGHIFGJHHCCFDABA
LHAGAIALCAAHHFCAAALEEHBJLKHACDCFGHBHBBLAAPGHHHHKHBHHAAOJFAAKPOOADBFIPAAP
AJOBDBFKFAEHHHPDHHCPPOAAJKDHODHHHCHPHEPAHPHHBHOAADFOOAFOGHIPBEJAOAALHOHH
AHDOOCAPHOFECPIHAFOPGGAHDGDAEELIHAAIDGPALPBABDOBPEPAJBCDFOOBBFAHHKCHOHHD
BLFOAHBHKIHJCEJBABJHFHBLHJCIBABOHDHJHHHLHKPILHAOGLGAHFCPPOHCHICHHDHDOHOF
KCPHAPCDIAHHCDLAHHPPLAHDBALDLEIKHALPCIBOHOCKGHAIDDEOOHHBLHHHHJCOLIHIEALI
CHLKAIIOBAHHGHAHGHAKPIHGIIPHOFPPBAOGJHIAHDOLEDBCJFDAHOCEFAHOOHGHGJOKHHHO
JGLAHIOPBHHPFIDHHPPFGHGLGOKOLKJLFJGKHEGAIKELEHBCEPBHHFCELHGIHOICHOPIFHAH
DHJAOGJKHHOGAAHAHPACLAAOCLEAHHJIDAHIDELOAOBHEAHHJLHAOHKOPHAADHIAAFGOHBAO
DHPAAGGDBBAHDHIAAHGDFBAHOJGAABLCGOAOHGFHAADLPHBAAJEOLJAGEABBJLHAAHEHIAAP
BHOOAJGEPAAPJLAABPFEHFBHGCKABKDEOBAOEAHAADPJHDAHJLHEOPFCJOOPFAHAOOHHGAAI
PDAOGHHOHEAHAGPPABJLIAAOPJHAGEPILEGPDIEHFFGDDBHHIAPHAPJOHAOHECAEHHJLCJHH

HEAHAKBHKPHHHHDHBGHPEHHEKCDAPCHHBBAIBPHJHGFADKBGDAHFHGPPLAGPIDIOAJFCHOKH
JIHADKDGJKGHHCOHAHHBHHHJLDDOBGKHOHAFDLCPAPDHOKACPLCOHPHDOHCBHOPAABDLPKPC
DHLOKDDDEPAPDFKPPDDDCPAPBHPKAPIOOAHDLHLHPEAAAAHPBEPHHBKPHOHPFCHEPCPLAGBP
HLHAOFHHCAHAHIHAKDOHFJBBAHDPOPJLHAAHBOEAAKDGHAOOJKLHAJIKGAAKFDKAPBHEAAAH
FGJHOPEICAHPOCGHLHGAFHHHEKGPHJPPJAAAHODAGPGAJHAJLJBAHAPJDAAIPHLBAIHCIAHG
IOLAPGILOAAJGLHPKBBEAHPJJCCPHPOLPAAHBEEHHKJIKPPJJHPPAPBHAKBPHJPAAPDJGAAI
GLGPAHEBJHPJACJHPKDHAKADOLJAAODIJHOPJCJBABAGIPPAPEEOPHHGIPPHOLKDPHHHKPPB
OPLGACHHEDEECHAAAAKHFPPLJHKPLHOHHAHPPJCHCKLIFAAEHLIPALGFOAPHFKIPPKHBIPPG
PPHAHHGLPPLPPLBOAAJLAHOLOGAAAIAAJAAOHAHAHPHFAHEEOHJOBDHDKHOOAGPPOOPBCOPH
PGKOBKPAJBOPFAAABGOOHAADLKLIOPFCDOBCAFAPPHHAKPPAILHAPAHAOPPAOIBAABALDEPB
PEFAPBBOECAHCBLAOPHFPHPKPJOOAHPHOHPCOPAAADEJEKHHKHDAPCGPBHHHBHEPHHKODAPC
OLLAHHJLHJHHCHPPAPLAKAPCEGGAPGPCBAPIFHOOHDBOJDDBHKKGPIFPPPAAEPBPKFGEIBHD
BJCDABHHAAGJHHBDHEBPCDHADCEPPDPHJLPDEEHPPFFJLPPFCHJKAHOIFHGKHFOAHCHBOHAH
EDFPPEEHOPPPDHKAILPLCOOFCDCBHPPLLOADGAOHAHBDEAPGPLHOHHKHIOAOKPKOPFDOHHAH
DCPAAPIGJAOPHOPAAAEPBPKFGEIBHDBJCDABHHAAGJHHBDHEBPCDHADCEPPDPHJLPDEEHPPF
GOIHAHCLBPJCOJHAAAOOEPOOLIBOPPOLAACJDOAPPPHGCGBAOJIOHKPFAPOPHHCAOPPEJOPP
PIKOBKPOCPABLKLIOPADCPBDLPJPPAOHLAPAAHPPPAGEBACPBDEPAPLPCPPHHCHPPHHHJAPH
HLHPPHJOFAAHBHGDAIPJCOBAEJHPPIEBFPAHHPJCBPOIHAAOJHPBLPABLHADGAHHAHHOHEHD
GALHPEABHAAHBFEAHBEIEAHAHEHGHHDPAAADHFHAHLFLGPIPOELAPLPPHAAPHHPAHAPJBOKI
OOOAAHDAAFHGIDGPGHOJOAAOCBAKHGHHJHOPDIJIAOPFHAAPOOIHAJIIGAAEIBLAAOHHHCHC
HLOHAPJIIAAIEGBAAICLBPJCEAFAIEOLEAAEEGBOOAOAEHAPGHPOAAHPCBAFJHEBHAFJJOGH
JIECBDFJAOHGJLJPHLGAAHPFAFJAHGOOHAAHOOEAHBIDJPGHOLDAABEPLACDPFHAACFCFGOH
FDEGAPFGIGGFKHOAALBKGJHODFBHHADLPHHJDLHHHJPPJLDBHOLHADBPHDKCAPAHOCHILBAO
DGDAHHDIGHAPOICHGFHELAACLOCOAAHFBAABHGDOHHHHJHDBFHDBJBHGHLJBHHAHDCPDDHHH
PPJLDBOLGAAFOICHFEHFPAAEHDHHHHBJJDPIDOEHABHOKAABHHEBHEIHEKABFBCBAJLCHIAH
PEHACHIDOAAKDOEHABOLPAAHIDLCHDFIOHOFGKFHABHHEBHEEGOHHDLICAAJLCHIAEPEHACH
IAGHALDOIHALJCHAGGCPDCABOODDECFOIOCBLOPAHJGDHBADIDLCHDJPCHHPGKFHABHHEBHE
EGPHHJEOEHHEOIJAAAPEHACHIAGHALJPOHHEEEPHCCHPHADBGBOPBFLOBOECEJOJOKGALHPE
BEOAAHBKHABHEEHHKIBEBABFKICAILHHDAAPHHDCAIKOOAHDBELAAOHPDACIDLIHHFFOKOHG
BFHABHEEGHHEDOIHALKICAILJHDAAPHHACHILGOAHDLIIAAKGHPGCCGDHADBHLIHCBAGHHPE
DLDACIDLBHHAPCKHHGEDFHHEEOIHHEPJIBAOFKDAAPHHHCHEEPIHBHCPBCACBHBDPGFOIBHO
IEPAGHJECBACPOOAOLJFJCJEHHAHHGELEPABHOKAABHHEBHEIHEKABFBIBAKLCPIAAPDHACH
IDOAAKDOEHABOLPAAHIDLCHDFIOHOFGKFHABHHEBHEEGOHHDLIIAAKLCFIAOPCHACHIAGHAL
DOIHALKIHAGGCPLCAKEDLDHHIGIBHOOKEPAHDHDACIDLLHDPPCKHHGBFHABHEEGHHEPLODHE
GLIPAOKBCAAPHHACHILGLADPEOLHPGCPHCAGEDBDPGFOIBHOECPFEEOJBAAEACHHJBDLPADB
CHEKBJFHHAAPHDHHHHBJJDPIDOEHABHOKAABHHEBHEIHEKABFBCBAJLCHIAEPCHACHIDOAAK
DOEHABOLPAAHIDLCHDFIOHOFGKGHABHHEBHEEGOHHDLICAAJLCCIACPCHACHOJKAAAPHIAHL
PPIAALJCHAGGCPHCAOOHDDECFOADEDODLAHAOIOAACABLAAIDFHFLHPHHAAGHOIEAHDCEFAA
PHHAAGAGDAAAHICAFDKKHLAGAGDAAAHBDAAHOIAAABABLAAIHHHAFDPHFLAHHGHKAEAEHALI
PHHAAHCDIEAHDCKFLKHHDAECHBDAAHDCBFKBFHLACHFHODEOKBLLAOHBJAAHHBIGAHALLAAH
HFEAAPPHBAAPILHAAHLPHJHLHHHACLHHAADKJHLAHEHOIEAHFILAAIHHLAACEPCAAABLHAAF
AELAOBHHPAAAHFEAAAGHJHAAIHPLGEDJJBFHHDHALIHDIAAOKEDADFHHDAADHJBAAFDCDFEC
FHJAKBHCHAAHAIBAAEFIKHHFHJKFDCDCBFKBFHEAAABLHOAHAIBAAEFIKHHFHJKFDCIJPAAE
POIAAOGBLAHELPHCAPHBPABHAKHAAPHAHAAPHCFAAAACOBHHHDIAAOFJDADFHHPAAPHHHACL
HHHAHLHHBACFHHCAAAOIEAAKPPGALFFLDDABELLHPACLHALHBLHAAFAEIAHFFKJHFHHDEACB
FDHDAHPPHAAHLHHCAHLHHHAHFBHCAHACJAFOPPGALFFLFDAOPOLADJHHLAACHHLLABFHEAAA
FIKHHFHJDFAHFILAAIHHPAAPHHHAHLHHHAFIEKHHAHEKHHADPPAAAHJLFDFDFPLAHJPFCJIE
LGCLEKHGAAABGGPBGHHGHAAAAGIPHCAKLPAIAHAPPHAOIPAODDKAELBAAALPEJOBKFBAGABG
HPGGAHAHGAPACIKHPAILHAPAHAOPPAJLKFBDBAAALPCJHIAFGAHBAAHAGHOOHDKIGHHOHAAA
EPHAAHOGDOIHEOAAAAFHHGDKBAHAAHAJABAALOEAALDHGAPACIDHPHBOEAAADIHAOOHOAAAH
HKGPAGHBOAAJHDDAHFFOAAABHHBABAGPHPOOCIGHBBOAHAOOFGKAALOHLOFIPFEOKDAGIPHC
AKLPAIAHAPPHAOIPAOHGLAAAAGOPAFLKLAAJDKKBAAAGGPAELKHAOOILLFAJAGLPGPHDOPAB
AHIAADOHOOAHHAKAPHGGBAAHJOPAEEOJJAAHAAOAALLEHAADAGLPGPHDOPABBEIAADOHOOAH
HAKAPHGGBAAHJOCAAHHJBAHAAGLPGPHDOPAABHIAADOHGOAFLKKAPAILHAPAHAOPPAOIOAAG
AIGAPAFOCAALJLKABDAKGAPAEGCAALHDOPAACEIAADHDGPAACHIAADJLPAAHFOAAAKJLEABD
KAHAKJHCLAHCBFDHAAHDLAAIHKCAIEDHAAABCHFAAHJEGAPAPLDGPHAGEAADDIHAOOGHFHOP
EGCAAHIHFAAFPPBAAHOCDAAAHCLALEHHJABAOLBPAHPPDABHFGGAPAPLLGAJHPOAAFHALAAJ
GGABAHOIKAAJOHDEECBHHJAHEPOAFCBLDAIHFGHABHHCLAAIHHBAAHOCDAAAHCLALEOIKLAH
DHDEECPALAAOHOLAAIHGHAACLELAKLPIJAAOALGGPACIDHPHBOHAADDIHAOOHOAAAHHKGPAG
HBOAAJHGHAAGAGIPHCHDOPAAEEIAADOHGOAFLKHAOOFGHAAOOHGOAFLCDAPHBOHAAEDIHAOO
HOAAALHKGPAGLBOAAJHDAAABAGLPGIOHLOFIJLDAAIOPAAFGHJGAPACIDHPHAOEAAFDIHAOO
FGKAALOHGOAFOHHAOOFGCAALHDOPABFHIAADOHOOAHLAKAPHGGBAALJODAAHAOGAPAILHGOO
ILLFAJEPHACPDEHBAAAFEAALDHHABFOKAABGPJPDEEBCKEAOKHIDEPDPBAAIHOKAAOLEHAAD
HDKAAAHGGAAALEHAADAKEDALDHLAAOGHLAADHGKAAOHHIAAFIBOAAPAEIAADHDCAAFFHFIPA
HAIPHCHDOPAAGEIAADOHGOAFLKKAPAILHAPAHAOPPABAJPAAAGOPAFLCLAAJDKKBAAAGGPAE
LCHAOOILLFAJHDGIAFAGLPGIJLPAAHFOAAAHJLGABGHAIAAOGJFAJHHKLKAOKDBAAIHOKAAO
AEIAADHCKAAAHGGAAAADIAADAKEDALDHLAAOEKCAKEOKLAAIHOAAAIEHHDDKOKAAKFDJOAAH
DEHADKOKHAPLIBOAAHOKEAALDHEAGGGJKHAOKHKDAOPOKAHKOBHADKOKHAKDJGOIAFHPCGDI
HOJADPHFAAAHIBOAAPLEHAADHGHALOAEAAADEGLAAOHEGAAHECIFALLEHAADKFBIAFECEKAA
FHLGAAPGEAAHAHLAAIHGAAPKAAHAPPJKAKHAJPHAOGAHBLPHFGAKHPHDAAIPOEAAAJHIHHK
DDGPAALHGPAEKPPHFHADHAAHPHHEPGDODKKEBCPKAECODFACILGAAHKAAPAAPHDAPJJFHPPJ
DBDJAAHHLAAIHKOAPJHGAAPKAAHAAPPJKAKHOLGAAHIDECKBHEELJGCDOEALFAPBCGFPEPAD
GAHBLPHOOAACIKFAAEAGIAAJCFJADPPJFCAHBJDAAIHHCAFEHEGAKHAFLAADEFOAHHBJDAAI
KJELBCBDGAAPEFIAHHHFHAAAHLDLBJJHPBBJAEGAIHOLLAAFIKFAAEPHLLLEBFHHHBBJJHCA
ADHEAPGODAECBHFJAEAELAADAFCAAHDPGAAPEFHAHHHFGAAAIBOAAPPICHAHDDBAHAEDKKAI
EFHALPDHHBALEHOGJPDLGAAHHEEAABIAHAAEAGHAIBIIHBAHDLLFAOPGAJAHPHOEBFJJHAAP
AHLFAOCHLAAIAFBAFHFGGAAPOLIHLIPKLAOBHPOAABHLELAIGLOBGOOFLAAIHGEAHAAGIAAE
IHHLAPBCGFAFAILAHOJGLPAOHOLAADGHDBAHHLGCAHJEPHGKFOOBEHEDPKLIOIPAAHALLEEJ
PKJAACEFEAHGKBFCAAIKFAAEPHLLLEBFHHHBBJLHACHHJCLKHAEHAAIHELKJFFCAAADLCAAH
LKLILHHLOADKCLHABGHFOAACPGFAAEHIKHHHPGFAAEHHPHHHADHEAPGOHABDICCHCAHFCAHO
GHLAEAAGLAHIHLALAPIODBEAOLHAHKFOIBHDAEJAAOEIEAHDCHLIDHLPAAAHDILAADDOAAAE
DJDAAHAKLALHFAPBBIHHIAAAOLAAAPPAGLLOPEOLALKJLBAAIOLGCHHGLAAOEPGAAPEFOADF
HEHAACPGFAAEHHEHAHAEGAIHKFLCLHFBHKDGPAKAAIEFHALPDHBBAIKOJDILAJOAALKJDBHB
DBGBAPEFGAAAAIDAHHIOCGHOHEFAAAFJHAAHEFCAFEAAGAAHEFFPABAHHFAAEDBDBDFEFGAIG
ILGAAHPAGLLOPEGLAPEFKAOAHFLAJHEFBABDAAGAIHOLHAACPGFAAEHHFHAHBKGAAPEFKAOA
HEFAOEHHCAFEEJLKAIAFLAADEFEAAAHGHAAAHLCLACHEAEAOPGFAAEAGCAHJBAGKIHPAJLBE

FBIALLAPKBAIEFGAAAJIFAACLBNCADECEABCECKAAIEFNALPELFLNBILFAAADLIANBDJCAAH
KJDIDFBNPAAPAFKAAICICHADOENAKBDCEAAODNAABFGEKBAICICHADOEEALONLIIIAMBPPCJI
PGEIAEIKIAHCDCEAADOLNAADIKFAAEAGIAAJCFHACNDNPABAHFDAADIKIAHCIIGAAEPLHAAN
EFBABDPLOIDAEGAABIIKFAAEFNNLBDILJAEIAGOABNLIKOAICICHADOELAADDKAAAIENGAAA
CAHAJEDBKAAIEFGAAAJIFAACPJJDCPHFJAABIDNAAHECEFAHNGFKAADLFAALHOCNNFKJELBC
BEGAAPEFIANHAJLNLNNOPACBILHNJEDPGAAPEFIANHHEEABJDHPAAPNLHLADDCNCAEACNAAH
APHAAFIKIAHCDCHABHGJLBNELNLDAIBNPAAPAFKAAICICHADOENAKBDCEAAOPGFAAEAGLAHJ
EHFJAAIKIAHCDCEAAOBEGKKFFHBAAFLIKLLLNFLACHAFLAACHGGABIIJFAADPCFAAEHIEHAN
AEGAINOLPAAAIKFAAEPNLLLEBFHNNBBJLNACEFPACJEFCAAAIKFAAEPNLLLEBFHNNBBJLNAC
NHJCLKNAEHAAINELKJFFCAAADLCAAHLKLILNGIKAENIIOBAHBNHACBFGKAAIEFNALPIBBBCP
AGJAADFOOBNAIANAAEAGAAACBAGKINBEGKKFLHELLPIKFAAEAGIAAJCFJADPPJCCNFPGFAAE
AGCAAIOPNGILFOKAAIEFGAAAJIFAACOPPAAPANBABDJIIAAIEFOADFHNCAFEIPLGLNEKPACB
ILFAAADLFAAEHONNADPGFAAEHIFNAHDGKAAIEFNALPELFLNBBHJNNBCLFAAEJPFCAEACKAAI
EFNALPELFLNBBHJNNBCLNACNKJALNNAENALIJEFKAFACLAADHCKAILNLCLANBPGCINPAGLLG
PEKLAIEFNALPHKGKAPEFNAHHHEAAACILGAANLJHACHNDAAAOAFKAANIDFGAEAEFAAAPHKLAI
FFHAAAJCIAAJJCLAAINKFANBIJIANBNNKKHIPOCAAAHNOAABILOAANBFHNNBGNIAADIJFAAE
AENABAACKAAIFFHAAAJCIAAJJCLAAINKFANBIJIANBNNHKACLIIAAAACNABDOPPACBIJFAAE
AEOAFCBKAAAIENGAAANOFCAEAENABAACKAAIFFHAAAJCIAAJJCLAAINKFANBIJIANBNNOKAB
ILGAANLJHACHNDAAAOAFKAANIDFGAEAEFAAAPHKLAIFFHAAAJCIAAJJCLAAINKFANBIJIANB
CNFBAEGGBINNGAPACBCOKFAAPGFAAEHNFNAHAEAAAIENGAAAEAAALPOGELLPIKFAAEPNLLLE
BFHNNBBJLNACICACAPLJAIABIKFAAEPNLLLEBFHNNBBJONGJOLIAAADLNADBHNOAHBBNAOLP
LLNALLCIINLGGBJLICBCHABHOKIACIFEBAEIOIHACNFLJBILAEGAINFCBODCIDNJJNOGAAJO
JHGGLGOEBJAPNIHJKNGAFLLHONIAAAPNCGGODNJAGHHFCACHDOJAADANCABAKDNAADDJIAAL
DNJAADANCABAKDOAADDJPACFECJAADDOJAADFPACAEDJNAADDJBAAKECJAADKDGAAECNIBHC
AFNACHINJLALDBHBAPPBNAEPDOAAAEDJIAGNNADBDFAFJAAKACFBAHDGLAAIDNEIAAKJCABA
HFEAABOHAIAECNGBIGDJGAADEGJAADHFDAHPDOGAAENNGKNBFOGBGFADHAANDLAAAPHCKANA
AKAIAOADHAANDLHAANHCEABJDIBAAAILHAAPILFAAACFOAAPACINAPDLOAAPHHGAALDLGAAD
ECJAADHFGAAAIBPAAPDNJAADIBHCJPJNKACEPJPGBLABGAAHJHLAAIDOGAAEDJDAINEKLFBG
HKBKAKECJAADEAAAAEDLAAAPHEEAAEGKHFHDJAIPNPPHJAAPLBBBPJAADAANOABAFHNGNALI
LJBABDPHBAAPBLEOANENLAAINGHALILJBABDPHBAAPFKLCACNCJACAILGAANAENNICBNIJBH
DICHGJCNBAAKECJAADCLGAAAEGJAADJABPBDPHJAAPJGKGAPOLINLIHGCFANANGBJPNCHAFO
KKBLAPLBBBPJAADAANOABAFHNGEANAHGGFANDLCAANHDEAAANGLIAODGKAFHCBBJAIHOAABN
HHGAAHBGNABPHNNABDIJOABIOOEGAANGLIAOBIBAAIPJAGAAIEPALIOIEAAHIOOBGOAJBANH
ELOABINGLIAOHKKABCEGNABCBOCAAEIDLGKLNGEANAPEFANIEIDAPIAEBAAKECJAADEAAAAE
DLAAAPHEPAAAILOAABECNABCAHNAAAACLBAIBOCAAEIDKGHCLGCIAEDJIAALDNJAADANCABA
ILOAABECDAGICKHHAPOJGAAIPODACIFGDGAANHDAAKEAJAADDLAAAPHGBAABILOAABEANABC
AHDAAKEENABCBOAAAECNFBAAECBIAKEAJAADANCABAJOJGADDOGAAEDJFAAHDCAEAEDJOAAK
EGJAADINFAAEACFAIKLIKLLLPHOAAEEOKABCEANABCAEFAACPOFANBAEGADIECJAADHFPACJ
DGGAAEDJAALPFHCKKENLECAEPOJAAKNPKBBIOCBHANPPHADGEEOAAPCLGAANJAHPBDPHJAAP
AJOCDNKJNAAPGHLDKFPPBACIDLOAANHOLNCHNHLAAOFKPAFNEANALILJBABDPHKAAPLBBBKI
PGDAAHJLKEGPCNIIBHFGBGEINLDLALNFGJBIDLGAANHDIAACHKGFGFAEKNAPDLGAANHCNAAB
HKGFGFAEKNAPCLGAANJABPBDPHJAAPFGEGNAAGIFANKBEAAEIDKGHCNHEAIFLLBAABKDBKAP
ODOAJOHIBGNBPCOJABEIJAADHDBCKKBBFAJNJJDAAAAGIAAEDJOANNHFOAPLPBDAAOOOIJGH
LNLEAIBOIAAECNDBANADFALJBOIAAEGAFLIPLJNAAANHDDAODNCJKENLHCGJGGJLKBNJHALN
ELKKADNCEABGOCJAAPNGNICKEOLAAINGLAAONABBKEIPCFFBODKJKBAHNALGBGOEGKHOFLFI
KHNDAAAGIPHCBGNBAPONHOABHDGPAGAEGABBOAJALGEGCCKEAFLAKEHAFLAHPLOAAEILGAAN
DEENAAKBLFALAJNGJONHNKKNEDEPAAALLAANHELAHJBHJALGGCKLLLCINHJOGGIIJOPGIAJN
NHAKLGANJHFONGIFHCKCEKBEADPBALAPFAAEFIFAAEFDCAAFINAJAFGJAAANGFAAACGGBAAG
GJNAAGGFEAAGFAGBAEGPCAAHGLAAACGGBAAGGJNAAGGFEAAGFADBAEGIJAAGGHIAAGCHDAAH
CAEAAGHFAAAHCAEAAGGJEAAGGOHAACHEOAKAGBLAAGGFAAACHDEAAHGEPAAGHFFAAHFADBAE
GIJAAGGNEAAGCHDAAHCAEAAGHFAAAHCAFAAGGJEAAGGONAACHEOAKAGBLAAGGFAAACHDEAAH
GEFAAGHCCAAHFAN3NJBCCBBBBCCBBBBCCBBBBCCBBBBCCBBBBCCBBBBCCBBBBCCBBBBCCBEB
BCCBBBBCCBBBEAIAACCDJAACHABAAGGNPAAFGDPAAGGNOAACGDJAAADBOAACDCAAACCAIAAC
DIIAADCPBAADDBPAACDBFAADNEBJAEGCPAAGHCEAAHGFEAAGCAHAAHGJEAAHGIAAACEDPAAG
GOEAAHHCPAAGGNNAACICFFAEHCCAAHGPCAAHCANAADCFEAAGDOAAAAEFCAAHHCPAAGHCAAAC
DNFAACGEOAADAAFAAEHCCAAHGPCAAHCANAADCFEAAGDOAAAAEEFAAGHDEAAHGJOAAGGBEAAH
GJPAAGGOAAACDNFAACHDOAADCALAADCAFAAEHCCAAHGPCAAHCANAADCFEAAGDOAAAAPIIAAA
ADJAAAAOJAAALPJAAALPJAAALPJAAALPJAAALPJAAALPJAAABJJAAACEJAAACPJAAAEFJAAA
NBLFAFAJKAADAJPAALAJPAALAJPAALAJFAAGAJPAAGAJJAAHNIJFAAINJAAAJHJAAALPJAAA
LPJAAALPJAAALPJAAAKBJAAAKLJAAALPJAAALFJAAACKKAACCKAAACFABAAEENAAACEFCAAH
HCPAAGHCAAACFCFAAGHAPAAGHCEAAHGJOAAGGHAAACCOOAACBIABAACAAAACCAAAACFDFAAH
GCDAAHHJDAAHHEFAAGGNAAACCAAAACDKCAGFFABAAEENAABFFFOAAGGLOAAGGPHAAHGOAAAC
CIFAACGEJAACFAABACCAAAACCAFAAEHCCAAHGPCAAHCADAAEGPEAAGGFAAACCAKAADAAAAAC
FAFAAEFPJAAEEOJAAEFEAABFCAAAAFEFPAAFFCFAAEEDFAAEEJGAAFEFAABFCAAAAFEFPAAF
FDFAAEEOEAAEFAABACFAFAAEFPHAAEEFEAAFFGBAAEENAABFCAAAAFEFPAAFFDFAAEFEGAAF
EBNAAEFAABACFAFAAEFPPAAEENPAAEFAFAAEEOAABFCAAAAFEFPAAFEPNAAEEDNAAEEPDAAF
EFAABFCAAAAFEFPAAFEPNAAEFCFAAEEBEAAEFAABACFAFAAEFPPAAEENHAAFFCJAAEFEFAAE
FAABACFAFAAEFPEAAEFBDAAEEIBAAEEONAAEEFAABFCAAAAFEFPAAFEJOAAEFGPAAFENFAAE
FDDAAFEBHAAEEFAABFCAAAAFEFPAAFEJOAAEFGPAAFEBCAAFEHFAAFENFAAEEOEAAFFDAABF
CAAAAFEFPAAFEGBAAEFEBAAEENPAAFEFCAAFFCPAAEFCAABFCAAAAFEFPAAFFCFAAEFDFAAF
ENEAAFFAABACFAFAAEFPPAAEFAFAAEEOPAAFEGBAAEEJNAAEFAABACFAFAAEFPEAAEECEAAE
EJCAAFFPGAAEEBJAAEENAABFCAAAAFEFPAAFEIJAAEFHBAAEEJEAAFFAABACFAFAAEFPIAAE
EJJAAEEOJAAEFEAABFCAAAAFEFPAAFEDGAAEEHAABFCAFAAFGOLAAGGOPAAGHHOAAGCAIAAC
CFEAAGCJAABFCAAAACCAAAACFACAAHGPDAAGGFDAAHHDAAACCAAAACCAAAACDKAAACCFDAAH
FAABACCAAAACCAFAAEHIEAAHHCBAAGCAJAAEGOGAAGGPAAACCAKAADCAFAACHDKAAAFAABAA
ACBBBDDBPBBAFACBFEDBABBFDIJBDPECBFBDAPIBBDPJCDBADBBBBDDBHBLPACBBBDADPBAC
GEFAAGHGPAACGJAAAHGDDABADBPBBAFAPBACGEFAAGHGPAACGFCAAHHCPAAFHCAAAHHEDABA
ACBBBDACBBBDDBBBBDPHDLBACPEAAGGFGAAHCPPAAGGIPKACGCJAAGGOPAACHDIAAGEAINAG
AANAACGDAAAACAAAACCAAAACCAAAACCAAAACCAAAACCAAAACCAAAACCAAAACCAAAACCACAGF
AAAAADDAAAADDAAAADDAAAADDAAAADDAAAADDAAAADDAAAADDAAAADDAAAADNNAKAAELHAAB
IIAAACIIAAACFCHAABIIAAACBPAAACIIAAACIIAAACIIAAACIIAAACGFHAABDNHAABIIAAAC
EEFALNBHIAAICAGAAKBHCAALBHCAALBHCAALBHCAALBHCAALBHCAALBHCAALBHCAALBHCAAL
BHIAAICAIAAICAIAAICAIAAICAIAAICAIAAICAIAAICAIAAICAIAAICAIAAICAIAAICAIAAK
BLIAAICAEAADBPIAAICAIAAICAIAAICAIAAICAIAAICAIAAICAIAAICAIAAICAIAAICAIAAI
CAIAAICAIAAICAIAAICAIAAICAIAAICAIAAICAEAACBKIAAICAIAAICAIAAICAIAAICAIAAI
CAIAAICAIAAICAIAAICAIAAICAIAAICAIAACCABAAABIIAAKBLBAANBNEAADBPPAAPBHIAAI
CAIAAICAIAAICAKAAPBHIAAICAIAAICAGAABBKIAAICAIAAICAIAAICACAAECAIAAICANAAK

BJIAAICAIAAICAEAACBKNAPHMKCPGFDABAADDCDAADBFGIADDHIAADDJBAAEECDAAEEEFAAE
DFABADDBCAADDDFAIBDGHAADDIJAADGBCAAGGDEAAGGFGAAGAAAAADNOAOADNGNOPHMKCPGF
BCABBBHNKPPHFCAGAACAAAACCAAAACCAAAACCAAAACCAIAACCIIAACCIIAACCAAAACCAAAAC
CAAAACCAAAACCAAAACCAAAACCAAAACCAAAACCAAAACEIAAABBAAAABBAAAABBAAAABBAAAAB
BAAAABBAAAABBAAAABIEEAAIIEEAAIIEEAAIIEEAAIIEEAAIBAAAABBAAAABBAAAABBABAAI
IBBAAIIBBAAIIBBAAAABBAAAABBAAAABBAAAABBAAAABBAAAABBAAAABBAAAABBAAAABBAAA
ABAAABBAAAABBAAAABBACAAIICCAAIICCAAIICCAAAACCAAAACCAAAACCAAAACCAAAACCAAA
ACCAAAACCAAAACCAAAACCAAAACAAABBAAAABBACAGFBCCBBBBCCBBBBCCBBBBCCBBBBCCBBB
BCCBBBBCCBBBBCCBBBBCCBBBBCCBBBBCCBBBBCCBBBBCCBBBBCCBBBBCCBBBBCCBBBBCCBBB
BCCBBBBCCBBBBCCBBBBCCBBBBCCBBBBCBBBBIIDAANEANAACEDHAABOLCAAODGKAABFBBKBB
IIDAANEAJAAJJJJAAJJJJAAJJABPKFBCABAPFBCKBBBCDBBAEAPAAILPCHBBPABAKFBCEBAC
LPCHBBPABAKFBBIBAIHDAAAEIKMAADICKAADBCABAAACCBBBPIBNAAOKEAHBOKJAADAKCOBB
BCCBBBBCCBBBBCCBBBBCCBBBBCCBBBBCCBBBBCCBBBBCCBBBBCCBBBBCCBBBBCCSBBBCCBBB
BCCBBBAAAAABBEDHBAPCEAHBBCCBBBBCCBBBBCCBBBBCCBBBBCABAAJCAAJAPOBBBDBCJBAA
POABBBDGAABBPJCDFEKNCIBAAAKAHHAPDBBAEEAFAABHPOBAADOBANAGABAAMPPHBAADNBCE
ADHBADPOABBBJCHALPAAPAMLECDFBAMAJABAAAJAAEAAPABAADDBCGADPBAEPOABBBACJABA
AAGAONECDFBAFGHALPAABAAGPOABBBHDJABAAAKAAGAAPABAADCBDDANABAAAPDBBAAPDEBA
HKAAAAAPNBBAAGABAAOKCPFEADCBAKPHKLLPPOABBBAEAABFAAHAAJPOABBBKKAABFAAJAFP
ECDFBAAOLAAAADDBFPECDFBAJALAAAADLBALPOABBBECHAAAADFBAMPOABBBJENAAAADEBLL
ECDFBAACIABDAANAANPOABBBJEIABDECOJBPBAOBAPDIABAAPDOABPBAOBALDIAOAAPNOABP
BACBAEKFEGBAABCAFEKNFIGKAADAABABCAFEADEBABBBDABAFBCEFEADABAIBBDABACIBAAA
ECDFBANDBAABADOBACABCAFEADCBAPBBDABADGBAAAECDFBAAMJADPAAOABHECDFBACKJADP
AAGAAEABCAFEADMBAFPJADAAEPBAAAECDFBAHGJADPBPBCAAECDFBALMJADPAACAAGABCAFE
ADOBAMPJADAAGLBAAAECNFBABDDABAHDBAAAECDFBAIMDAABADKBAHABCAFEADABAKBDIAOB
ABCAFEADMBAKBDDABAIKBAAAECDFBAMHEAABADBBAJABCAFEADGBAOBEDABAJIBAAAECAFBB
BFDABAKBBAAAECDFBABKFAABADKBAKABCAFEADKBABBFDABALDBAAAECDFBAJLFAABADMBAL
ABCAFEADABAKCDDABAMEBAAAECDFBANBEAACADKBAHABCAFEADCBAPCLDABANFBAAAECDFBA
PCEAACADJBANABCAFEADMBACCIDABANPBAAAECDFBAELHAOBAANABIECDFBAKEIAACADNBAO
ABCAFEADKBAAOLAJAAPGBAAAECDFBANKNAPHAAOAAPABCAFEADOBAOHNAPAADACBFEADOBAO
MNAPAAAOCAAAECDFBABKPAHMAACAOOECDFBADEPAHMAAPAABACPABAADGBAEBEIHACACPABA
ADABAEBEAHADACPABAADMBADBEIHADACPABAAHEBHBEACAAAAPDBBAEEEAHBEICAAAECDFBA
PHHAKHAAOAAEACCAFEHFEBJHAAFAJPECGFCPHEAJAAGACAAAECDFBAJCEAJHAAOAIDECDFBA
KOEAJHAAAAAHACCAFEADEBAHHEDJGFACCAFEADABAOHECJBJACCAFEADKBAPHEAJAAIICAAA
DAKBGHPKEAJHAAOAAIACHABAHOCABBICHBBANAAAAADGAABBJKCAAAAJAAAAHCAAAACHDBBA
KDCAAAAFBAAAHBGHAOBEDABAKJCAAAAHHBAHCGCEBAAACAALACHABAHGKOACPJADAALKCAAA
AHJBAHABOAANPJADAAHCCAAAAHDBBCHOBAABAHCJAAAHHBAAABHAAAPJHDJOACAABDBKEFAH
HEAJAAHDCAAAAHLBAHAADAAJECAFAAHHCAAAAHLBAFAAHAABHHACAAOFCAAAAHPBAHAAAAAK
BDBAEOACAABDHPBAAAHKHAPHAACAAPACHABAGAJIAHDBABAAPLCAAAAFPAAPHKBAAAKHDAAB
ADDBAAADHABAFBBAAAJEIABDAAHAAAADJAAAGHBHAAEHEAHBBFDAAAAHDBAJABEAABBBDABA
BODAAAAHHBEDKKAABFAAHAACADHABADEAAAAECHAAAADABADADJAAAAAJAAKABEACFADJBAD
ADHABAPJIAHPDIABAAECDAAADALBAHAAHAADHHAKAAEIDAAAAHOBACABHAAFPJCDBDADJABA
AHEDCLADJBAFADJAAAAAHAAIAAIAAGBECHAGADJAAAAAFAALABGAAHBELHAGADHABAFCGGAH
PJIDIKAJAAAADGEIAIBENHAHADAABDAJFACJHEAJAAIFDAAAAHCBHKLHJADPKJDCAAAHFBGA
JEHAAAAADGBAJADHABACIOABPFAABAAJPDAAAAHBBAKABOAAAALDABAKIDAAAAHEBABAKFDGK
AABAALADFAAAABHAHJBFDABALJDAAAAHHBABAAAAAJALDABAAGAKBDHHAAAAADEPAHHAAKAAH
ADHABACDAAAAECFAGKAADAAHADHABAHLBAAAKCHALPAAHAAHADHABAGKAAAALOIAODAAFAAO
ADAABDEOAAAABKPAHHAAHAAOADJAAAFKBDAAICDGBAPFDAAAAHPBABAAOAAPDIABAAPODAAA
AJAAAAFKAAAAJDFHAAKLEFBAAAHAGHADOBAAAEHABAPLCHAPBBDABABFEAAAAFBAAABEBAAA
HHEAABADLBABAEHABABLAAAAIABAABADEBACAEJAAAAAGAAHABEAJLADHBACAFFAAAABCAAE
ABFAAANHACAADFLAFKACKAPOHAIAADADLBADAENABAPFCCAHBDHABAAENABAIGBAAAINDAAB
ADJBAEAEIAIBPNOAPNBEBHAFAEAABDNAAAAABPHAOBAAHAAFAEAABDPDCABDNEAJAAFPEAAA
DANBAHABEAAKCIDABAGHEAAADANBBPPCEAACADNBAGAEAABDCHBAAAKBNAPHAADAKEAHCAAA
NOAAAABJDNBAHPEAAAAFPAAPOFDFAKCDDABAIELAFKACHAAIABCAALDGDABAINEAAAAFPAAP
JCAAAACNEAACADBBAJAEFAAAPPHAAPAAKAACCEDABAJHEAAADANBABABEAAONKAPAAKAEAAA
DACBAAABOAAKNEAJAAKIEAAAAFPAAPONIFAHCEDABAKNEAAAAFGAGLAAGAAKCEDABALDEAAA
AFPAAPGABAAAKADAACADKBALAEFAAAPPDAELLODAACADBBAHAEFAAAPPNAEIKADAACAHEJAA
AFPAAPFFBAAAKDEAACADOBANAEFAAAPPFADNKDDAACADEBANAEFAAAPPKAKINBDAACADKBAN
AEFAAAHKPOGHCEDABAOAEAAADABBBJJCEAJHAACAHLDAPBALABEAAGCHDABAOFEAAADAHBAF
ABAAAONEAJAAPGEAAADAHBAFAAKAAAOLKJCEAEAABDCKBAAANGLAJOAEFBAAAHGAAAEFHBAG
DIDABABBFAAAAJCAAAMKKHANBEJHABAFAABDGOJACKOLAJAACBFAAADAHBHAGGHAACADKBAC
AFHAAAACLAAGABAAABBEDHADAFAABDFGBAAAOONAPHAALAADAFAABDCEAAAACGIAJOAADAAE
AFJAAAACHAACAACAAIDKDABAELFAAAAJCAAANOBAAAIKDABCAADAAFAFAABDDHBAAAFNHAKH
AAHAAFAFAABDNENJAPHHAKAAGBFAAADADBABABLAABNEAJAAGHFAAAAJCAAACGAAAAJCOAAD
ADHBAGAFBAAGGIPKAFFAAAAFGHJAAGHDEAAHFPAAAAFPAAAFFABAAGGEEAAGFPLAPNFPEAAH
GBJAAGGHAAAAFPAAAFFAFAAHHAEAAGFPLAPNFPAAAFFAEAAGGFHAAGFPLAPNFPAAAFFAHAAG
GPDAAGFPLAPNFPCAAHGDGAAHFPJAAGGEAAAAFPDAAHGOEAAGFPJAAGGEAAAAFPIAAGGFBAAG
GEAAAAGFCAAHHCPAAFHCAAAHHEOAACNKDOAGFPHAAHGPCAAHGFGAAHGFOAAGHEOAACNKDOAG
GHPAAFGDBAAGGODAAGGFHAAGCOKAONGDHAAGFPDAAGGILAAGGJPAAGCOKAONGDHAAGFPCAAH
GFDAAGGFJAAGHGFAAGCOKAONGDHAAGFPDAAHGFOAAGGEOAACNKDOAGHDPAAFGBDAAGHEJAAG
HGBAAGHEOAACNKDOAGHDPAAFHCFAAGGHPAAFGFOAACNKDOAGHDDAAFHFOAAGHCIAAGGHOAAC
NKJOAGHADAAGFPPAAGHAFAAGGOOAACNKFOAGHCCAAHFPCAAHHAIAAHCOKAONGPCAAGGKDAAG
HCFAAGGBEAAHCOKAONGFCAAGGKEAAGGFHAAGGFEAAHCOKAONGIHAAGGPCAAGGBHAAGFPLAAG
COKAONGPAAAHGFOAAGFPPAAGGNOAACNKEOAGHFAAAHCOKAONGGDAAGGOEAAHGNOAACNKAOAH
GJAAAHGFOAACNKAOAHHCJAAGGDEAAHGGOAACNKNOAGGFHAAGHDFAAGHEOAACNKIOAHHACAAH
GJOAAGHEGAAGCOKAONHDEAAHHCDAAGGHAAAHCOKAONHDJAAHHDEAAHGFHAAGCOKAONGFIAAH
GFDAAGGNOAACNKFOAGHIJAAGHEOAACNKGOAGGPCAAHGLOAACNKDOAHGJHAAGGOKAAGGNOAAC
NKPOAGHAFAAGGODAACNKCOAHGFBAAGGEOAACNKDOAHHECAAHGDAAAHHJOAACNKEOAGGPAAAH
HCOAAGHEOAACNKPOAFFPHAAGGPHAAHGEJAAGGHAAAAFPPAAFGEPAAGHHCAAHGJEAAHAABAAG
HCJAAGHEIAAGCOKAONGBPAAFGDPAAGGIDKAGHEJAAHHAFAAGCOKAONGFDAAGHGEAAHCOKAON
FPJAAGHEPAAGGBAAAAFPDAAGHGEAAHAAGAAGHHCAAHGJEAAHGFOAACNKGOAGGNDAAHGCFAAH
GGOAACNKDOAGGHPAAGHDFAAGCOKAONGEBAAGHEBAAGCOKAONGJDAAHGBEAAHHEJAAHCOKAON
GJPAAGGDEAAHGNOAACNKNOAGGBHAAGGHPAAGGDOAACNKPOAFGBHAAGGHPAAGGDFAAGGOAAAA
FPBAAGGHHAAGGPDAAGHAAAAAFPBAAGGHHAAGGPDAAGHDAAAAFPBAAGGHHAAGGPDAAGHEAAAA
FPBAAGGHHAAGGPDAAGHOCOAGHCLAAGCOKAONGNFAAGGNDAAGGICAAHCOKAONGNFAAGGNDAAG
HAJAAHCOKAONGNPAAGGEGAAGCOKAONHDEAAHHCHAAGGFOAAGCOKAONHHBAAGGJEAAHCOKAON
HHCAAHGJEAAHGFOAACNKDOAGHFFAAGHIJAAGHEOAACNKPOAFGFIAAHGJEAAHEAENAHGBCAAH

HEAAAAFPNAAGGBJAAGGOAAAAFPFAAGGOGAAHGJCAAHGPOAAGAAPAAFHCFAAGGBEAAGAAPAAF
FAAAAFGJOAAGGJPAAFGJAAAAFPAAAHHCJAAGGOEAAHGGAAAAFPDAAHHJDAAHHEFAAGGIPKAF
GEFAAHHAAAAAFPAAAHGJAAAHNLPPAFHHBAAGGJEAAHAAPAAFFAAAAFHDOAAGGEPAAFGIPKAF
FAAAAFHCDAAGHGPAAFGIPKAFGGPAAGHCLAAGAAPAAFGDHAAGGPDAAHNLPPAFFAAAAFHDPAPH
FPJAAGAAPAAFHDJAAGGHOAAGGBHAAGAAPAAFGDDAAHFPFAAHGOCAAHNLPPAFGDIAAGGHPAAF
GOBAAGGIPKAFGHHAAGGPCAAGGBHAAGFPAAAAFPDAAGGHPAAFGOBAAGGODAAGAAPAAFGDHAAG
FPDAAHGFOAAGGEAAAAFPBAAGGHJAAGFPOAAGGBIAKGFPDAAGHDPAAFHCFAAGGHPAAFAAPAAF
GGCAAHGFLAPHFPHAAGGFHAAGHDFAAGHEAAAAFPFAAHHDFAAGHCPAAFHDEAAHAAPAAFGFFAAG
HDPAAFGOBAAGGIPKAFHDFAAGGHPAAFGOBAAGGIPKAFHDAAAHHCJAAGGOEAAHGGAAAAFPJAAG
HCDAAHFPOAAGGBIAKGFPHAAGGFHAAGGDAAAHHJAAAAFPDAAHHECAAHGDHAAGHAAAAAFPDAAG
HDPAAFGBDAAGHEJAAGAAPAAFGDPAAFHHPAAGHCFAAGHGAAAAFPDAAGGHPAAFGDIAAGGLJAAG
AAPAAFGPCAAGGKPAAFGEFAAGGHAAAAFPDAAHHECAAHGDAAAHHJAAAAFPDAAGGHPAAFHCFAAG
GDLAPHFPHAAGGBHAAGGHPAAGGDAAAAFPPAAGGCKAAGFPDAAGHCLAPHFPAAAFFAFAAGHCCAAH
FPCAAHAAPAAFGFCAAHHCPAAFHCAAAHHEAAAAFPJAAGGPDAAGHEHAAGAAPAAFFPJAAGHADAAG
GHGAAGGEAAAAFPJAAGHADAAGFPPAAGHALAPHFPFAAGHCCAAHGOKAONFPPAAGHAFAAGGOPAAF
GGHAAGAAPAAFGGDAAGGOEAAHGHAAAAFPPAAGHAFAAGGOAAAAFPPAAGHAFAAGGOPAAFGPIAKG
FPPAAFGPHAAGGHGAAGGEAAAAFPPAAFGEPAAGHACAAHGOEAAHAAPAAFFPJAAGGPJAELFPFAAG
HIFAAGGDHAAGAAPAAFFPFAAGHIJAAGHEAAAAEHDAAHGJHAAGHGFAAGGDAAAAFPGAAGGDGAAH
HEAAAAFPHAAGGFHAAGGDIAAGHCAAAAFPGAAGHHCAAHGJEAAHNLPPAFGFDAAGHGEAAHAAPAAF
FPCAAGHFGAAGHDJAAHGOAAAAFPPAAFGCFAAHGGFAAGGOEAAGAAHAAGGHFAAHGHAAAAFPPAAF
GDEAAHHJAAAHNLHPAGGEJAAGHGAAAAGBHAAGGEJAAGHGAAAAFPPAAFHIGAAGGHDAAHGCFAAH
AAPAAFHDEAAHHCHAAGGFOAAGAAHAAGHCFAAGGIFKAHGHCAAHGFIAKGGBFAAHGHHAAGHFHAAG
AABAAGHFHAAGGEJAAGHGAAAAGBHAAGGHFAAHGHAAAAGBFAAHGHCAAHGFIAKGHFHAAGGHFAAH
GHEABCGHEAAGGJGAAHAABAAGGHCAAHGFIAKGFPHAAGGPEAAGGGAAAAFPPAAFHHCAAHHEDAAG
GILAAGAAPAAFHHCAAHGJEAAHNLPPAFFPDAAGGHFAAGGBOAAGHFAAAAFPPAAFGGHAAGHDCAAG
HFGAAGAAPAAFFPDAAHHEEAAGGCFAAHGGAAAAFPPAAFHDHAAGGCFAAHGGAAAAFPGAAGGGHAAG
HFDAAHGIAAAAFPPAAFGGJAAGGOEAAGGCFAAHAAPAAFFPHAAGGBDAAHHECAAGHFAAAAFPJAAG
HDBAAGHEEAAHHJAAAAFPGAAGGDHAAGGPDAAHNLPPAFFPDAAHGPCAAGHFGAAGAAPAAFFPDAAH
GJCAAGHFGAAGAAPAAFHCFAAGGBHAAGGHPAAGGDAAAAFPCAAGHCLAAGAAPAAFHDCAAGHCLAAG
AAPAAFGFOAAGGEAAAA

```
/* @(#)hit3635.c        1.1     1.1 */

#include        <om_ecode.h>
#include        <om_udef.h>
#include        <pam_gen.h>
#include        <pam_err.h>

int err_cnt = 0;


main( argc, argv )

int argc;
char *argv[];

{
   int atoi();

   PPget_cfg();

   if( argc == 2 )
   {
      printf( "\n- - - PAM integration test - - -\n" );
      printf( "***** Total system integration for HIT functions. *****\n" );
      docase( atoi( argv[1] ) );
      if( err_cnt )
         printf( "***** Completed with %d error(s). *****\n", err_cnt );
      else
         printf( "***** Completed successfully. *****\n" );

   }
   else
   {
      printf( "\nUsage is: hit6 <case no> ( 0 == ALL )\n\n" );
   }
}

docase( no )

int no;

{
   int single = 1;

   switch( no )
   {

      default:
         printf( "Illegal case specified !!\n" );
         break;

      case 0:
         single = 0;

      case 1:
         /* Precondition */
```

```
   eset_str( "P7", "++++++" );

   /* Input */
   system( "/usr/pam/bin/gs_criterion -p p6.1 -n path_type -v P7" );

   /* Expected result */
   etst_str( 1, "P7", "type6.1", "gs_criterion" );

   /* Postcondition */

   if( single ) break;

case 2:
   /* Precondition */
   eset_lng( "PPERR", -99999L );
   eset_str( "AP20XXP7", "++++++" );

   /* Input */
   system( "/usr/pam/bin/gs_criterion -p p6.1 -n path_type -v P7 -x PPERR -1 AP20XX"

   /* Expected result */
   etst_lng( 2, "PPERR", (long) PAM_OK, "gs_criterion" );
   etst_str( 2, "AP20XXP7", "type6.1", "gs_criterion" );

   /* Postcondition */

   if( single ) break;

case 3:
   /* Precondition */
   eset_lng( "PPERR", -99999L );
   eset_str( "P7", "++++++" );

   /* Input */
   system( "/usr/pam/bin/gs_criterion -p p5.x -npath_type -vP7 -xPPERR" );

   /* Expected result */
   etst_lng( 3, "PPERR", (long) P_INV_PATH_NAME, "gs_criterion" );
   etst_str( 3, "P7", "++++++" );

   /* Postcondition */

case 4:
   /* Precondition */
   eset_str( "P7", "++++++" );

   /* Input */
   system( "/usr/pam/bin/gp_display -p p6.1 -d P7" );

   /* Expected result */
   etst_str( 4, "P7", "/TDS/disp6.1", "gp_display" );

   /* Postcondition */

   if( single ) break;

case 5:
   /* Precondition */
   eset_lng( "PPERR", -99999L );
   eset_str( "AP20XXP7", "++++++" );

   /* Input */
   system( "/usr/pam/bin/gp_display -p p6.1 -d P7 -x PPERR -1 AP20XX" );

   /* Expected result */
   etst_lng( 5, "PPERR", (long) PAM_OK, "gp_display" );
   etst_str( 5, "AP20XXP7", "/TDS/disp6.1", "gp_display" );

   /* Postcondition */

   if( single ) break;

case 6:
   /* Precondition */
   eset_lng( "PPERR", -99999L );
   eset_str( "P7", "++++++" );

   /* Input */
   system( "/usr/pam/bin/gp_display -p p6.x -dP7 -xPPERR" );

   /* Expected result */
   etst_lng( 6, "PPERR", (long) P_INV_PATH_NAME, "gp_display" );
   etst_str( 6, "P7", "++++++" );

   /* Postcondition */
```

```
case 7:
   /* Precondition */
   eset_int( "e6par1", -9999 );

   /* Input */
   system( "/usr/pam/bin/ce_parameter -rTDS -e eq6 -ne6par1 -v-100" );

   /* Expected result */
   etst_int( 7, "e6par1", -100, "ce_parameter" );

   /* Postcondition */

   if( single ) break;

case 8:
   /* Precondition */
   eset_int( "e6par1", -9999 );
   eset_lng( "PPERR", -99999L );

   /* Input */
   system( "/usr/pam/bin/ce_parameter -rTDS -e eq6 -ne6par1 -v-200 -x PPERR" );

   /* Expected result */
   etst_lng( 8, "PPERR", (long) PAM_OK, "ce_parameter" );
   etst_int( 8, "e6par1", -200, "ce_parameter" );
   /* Postcondition */

   if( single ) break;

case 9:
   /* Precondition */
   eset_int( "e6par1", -9999 );
   eset_lng( "PPERR", -99999L );

   /* Input */
   system( "/usr/pam/bin/ce_parameter -rTDS -e ex -ne6par1 -v-300 -x PPERR" );

   /* Expected result */
   etst_lng( 9, "PPERR", (long) P_INV_EQ_NAME, "ce_parameter" );
   etst_int( 9, "e6par1", -9999, "ce_parameter" );

   /* Postcondition */

   if( single ) break;

case 10:
   /* Precondition */
   eset_str( "P7", "++++++" );

   /* Input */
   system( "/usr/pam/bin/ce_status -r test_rq -e eq6.10 -n N" );

   /* Expected result */
   system( "/usr/pam/bin/ge_status -e eq6.10 -s P7" );
   etst_str( 10, "P7", "N", "ce_status" );

   /* Postcondition */

   if( single ) break;

case 11:
   /* Precondition */
   eset_lng( "PPERR", -99999L );
   eset_str( "P7", "++++++" );

   /* Input */
   system( "/usr/pam/bin/ce_status -r test_rq -e eq6.10 -n U -xPPERR" );

   /* Expected result */
   etst_lng( 11, "PPERR", (long) PAM_OK, "ce_status" );
   system( "/usr/pam/bin/ge_status -e eq6.10 -s P7" );
   etst_str( 11, "P7", "U", "ce_status" );

   /* Postcondition */

   if( single ) break;

case 12:
   /* Precondition */
   eset_lng( "PPERR", -99999L );
   eset_str( "P7", "++++++" );
   /* Input */
   system( "/usr/pam/bin/ce_status -r test_rq -e ex -n U -xPPERR" );

   /* Expected result */
   etst_lng( 12, "PPERR", (long) P_INV_EQ_NAME, "ce_status" );
   etst_str( 12, "P7", "++++++", "ce_status" );
```

```
      /* Postcondition */

      if( single ) break;

   case 13:
      /* Precondition */
      eset_str( "P7", "++++++" );

      /* Input */
      system( "/usr/pam/bin/ge_status -e eq6.10 -s P7" );

      /* Expected result */
      etst_str( 13, "P7", "U", "ge_status" );

      /* Postcondition */

      if( single ) break;

   case 14:
      /* Precondition */
      eset_lng( "PPERR", -99999L );
      eset_str( " AP20XXP7", "++++++" );

      /* Input */
      system( "/usr/pam/bin/ge_status -e eq6.10 -s P7 -xPPERR -1AP20XX" );

      /* Expected result */
      etst_lng( 14, "PPERR", (long) PAM_OK, "ge_status" );
      etst_str( 14, "AP20XXP7", "U", "ge_status" );

      /* Postcondition */

      if( single ) break;

   case 15:
      /* Precondition */
      eset_lng( "PPERR", -99999L );
      eset_str( "P7", "++++++" );

      /* Input */
      system( "/usr/pam/bin/ge_status -e ex -s P7 -xPPERR" );

      /* Expected result */
      etst_lng( 15, "PPERR", (long) P_INV_EQ_NAME, "ge_status" );
      etst_str( 15, "P7", "++++++", "ge_status" );

      /* Postcondition */
      if( single ) break;

   case 16:
      /* Precondition */
      eset_str( "P7", "++++++" );

      /* Input */
      system( "/usr/pam/bin/ge_usage -e eq6.10 -u P7" );

      /* Expected result */
      etst_str( 16, "P7", "N", "ge_usage" );

      /* Postcondition */

      if( single ) break;

   case 17:
      /* Precondition */
      eset_lng( "PPERR", -99999L );
      eset_str( " AP20XXP7", "++++++" );

      /* Input */
      system( "/usr/pam/bin/ge_usage -e eq6.10 -u P7 -xPPERR -1AP20XX" );

      /* Expected result */
      etst_lng( 17, "PPERR", (long) PAM_OK, "ge_usage" );
      etst_str( 17, "AP20XXP7", "N", "ge_usage" );

      /* Postcondition */

      if( single ) break;

   case 18:
      /* Precondition */
      eset_lng( "PPERR", -99999L );
      eset_str( "P7", "++++++" );

      /* Input */
      system( "/usr/pam/bin/ge_usage -e ex -u P7 -xPPERR" );
```

```
    /* Expected result */
    etst_lng( 18, "PPERR", (long) P_INV_EQ_NAME, "ge_usage" );
    etst_str( 18, "P7", "++++++", "ge_usage" );

    /* Postcondition */

    if( single ) break;

case 19:
    /* Precondition */
    eset_str( "P7", "++++++" );

    /* Input */
    system( "/usr/pam/bin/re_locked -r test_rq -e eq6.19" );

    /* Expected result */
    system( "/usr/pam/bin/ge_usage -e eq6.19 -u P7" );
    etst_str( 19, "P7", "L", "ge_usage expected" );

    /* Postcondition */
    system( "/usr/pam/bin/ue_use -r test_rq -e eq6.19" );

    if( single ) break;

case 20:
    /* Precondition */
    eset_lng( "PPERR", -99999L );
    eset_str( "P7", "++++++" );

    /* Input */
    system( "/usr/pam/bin/re_locked -r test_rq -e eq6.19 -xPPERR" );

    /* Expected result */
    etst_lng( 20, "PPERR", (long) PAM_OK, "re_locked" );
    system( "/usr/pam/bin/ge_usage -e eq6.19 -u P7" );
    etst_str( 20, "P7", "L", "ge_usage expected" );

    /* Postcondition */
    system( "/usr/pam/bin/ue_use -r test_rq -e eq6.19" );

    if( single ) break;

case 21:
    /* Precondition */
    eset_lng( "PPERR", -99999L );

    /* Input */
    system( "/usr/pam/bin/re_locked -r test_rq -e eqx -xPPERR" );

    /* Expected result */
    etst_lng( 21, "PPERR", (long) P_INV_EQ_NAME, "re_locked" );

    /* Postcondition */

    if( single ) break;

case 22:
    /* Precondition */
    eset_str( "P7", "++++++" );

    /* Input */
    system( "/usr/pam/bin/re_secured -r test_rq -e eq6.19" );

    /* Expected result */
    system( "/usr/pam/bin/ge_usage -e eq6.19 -u P7" );
    etst_str( 22, "P7", "S", "ge_usage expected" );

    /* Postcondition */
    system( "/usr/pam/bin/ue_use -r test_rq -e eq6.19" );

    if( single ) break;

case 23:
    /* Precondition */
    eset_lng( "PPERR", -99999L );
    eset_str( "P7", "++++++" );

    /* Input */
    system( "/usr/pam/bin/re_secured -r test_rq -e eq6.19 -xPPERR" );

    /* Expected result */
    etst_lng( 23, "PPERR", (long) PAM_OK, "re_secured" );
    system( "/usr/pam/bin/ge_usage -e eq6.19 -u P7" );
    etst_str( 23, "P7", "S", "ge_usage expected" );
```

```
        /* Postcondition */
        system( "/usr/pam/bin/ue_use -r test_rq -e eq6.19" );

        if( single ) break;

     case 24:
        /* Precondition */
        eset_lng( "PPERR", -99999L );

        /* Input */
        system( "/usr/pam/bin/re_secured -r test_rq -e eqx -xPPERR" );

        /* Expected result */
        etst_lng( 24, "PPERR", (long) P_INV_EQ_NAME, "re_secured" );

        /* Postcondition */

        if( single ) break;

     case 25:
        /* Precondition */
        eset_str( "P7", "++++++" );
        system( "/usr/pam/bin/re_secured -r test_rq -e eq6.19" );
        system( "/usr/pam/bin/ge_usage -e eq6.19 -u P7" );
        etst_str( 25, "P7", "S", "ge_usage expected" );
        eset_str( "P7", "++++++" );

        /* Input */
        system( "/usr/pam/bin/ue_use -r test_rq -e eq6.19" );

        /* Expected result */
        system( "/usr/pam/bin/ge_usage -e eq6.19 -u P7" );
        etst_str( 25, "P7", "N", "ge_usage expected" );

        /* Postcondition */

        if( single ) break;

     case 26:
        /* Precondition */
        eset_str( "P7", "++++++" );
        system( "/usr/pam/bin/re_locked -r test_rq -e eq6.19" );
        system( "/usr/pam/bin/ge_usage -e eq6.19 -u P7" );
        etst_str( 26, "P7", "L", "ge_usage expected" );
        eset_str( "P7", "++++++" );
        eset_lng( "PPERR", -99999L );

        /* Input */
        system( "/usr/pam/bin/ue_use -r test_rq -e eq6.19 -xPPERR" );

        /* Expected result */
        etst_lng( 26, "PPERR", (long) PAM_OK );
        system( "/usr/pam/bin/ge_usage -e eq6.19 -u P7" );
        etst_str( 26, "P7", "N", "ge_usage expected" );

        /* Postcondition */

        if( single ) break;

     case 27:
        /* Precondition */
        eset_lng( "PPERR", -99999L );

        /* Input */
        system( "/usr/pam/bin/ue_use -r test_rq -e eqx -xPPERR" );

        /* Expected result */
        etst_lng( 27, "PPERR", (long) P_INV_EQ_NAME );

        /* Postcondition */

        if( single ) break;

   }
}


int tst_str( no, res, exp, text )

int no;
char *res, *exp, *text;

{
   if( strcmp( res, exp ) != 0 )
   {
      err_cnt += 1;
      printf( "case %3d:\n   res: %s\n   exp: %s\n  info: %s\n",
              no, res, exp, text );
```

```
    }
}

int tst_int( no, res, exp, text )

int no, res, exp;
char *text;

{
   if( res != exp )
   {
      err_cnt += 1;
      printf( "case %3d:\n   res: %d\n   exp: %d\n  info: %s\n",
               no, res, exp, text );
   }
}

int tst_chr( no, res, exp, text )

int no;
char res, exp;
char *text;

{
   if( res != exp )
   {
      err_cnt += 1;
      printf( "case %3d:\n   res: %c\n   exp: %c\n  info: %s\n",
               no, res, exp, text );
   }
}


int etst_str( no, var, exp, text )

int no;
char *var, *exp, *text;

{
   char res[255];
   unsigned int status = 0;
   int data_len = 255;

   if( getval( var, VARIABLE, 0, res, &status, &data_len ) != OM_SUCCESS ||
       (status & 0x1F) != STRING )
   {
      strcpy( res, "******" );
   }

   if( strcmp( res, exp ) != 0 )
   {
      err_cnt += 1;
      printf( "case %3d:\n   res: %s\n   exp: %s\n  info: %s\n",
               no, res, exp, text );
   }
}


int etst_int( no, var, exp, text )

int no;
char *var, *text;
int exp;

{
   int res;
   unsigned int status = 0;
   int data_len = sizeof( int );

   if( getval( var, VARIABLE, 0, &res, &status, &data_len ) != OM_SUCCESS ||
       (status & 0x1F) != INTEGER )
   {
      res = -9999;
   }

   if( res != exp )
   {
      err_cnt += 1;
      printf( "case %3d:\n   res: %d\n   exp: %d\n  info: %s\n",
               no, res, exp, text );
   }
}


int etst_lng( no, var, exp, text )
```

```
int no;
char *var, *text;
long int exp;

{
   long int res;
   unsigned int status = 0;
   int data_len = sizeof( long int );

   if( getval( var, VARIABLE, 0, &res, &status, &data_len ) != ON_SUCCESS ||
       (status & 0x1F) != ON_LNG_INT )
   {
      res = -9999;
   }

   if( res != exp )
   {
      err_cnt += 1;
      printf( "case %3d:\n   res: %ld\n   exp: %ld\n  info: %s\n",
              no, res, exp, text );
   }
}

int etst_flt( no, var, exp, text )

int no;
char *var, *text;
float exp;

{
int rt;
   float res;
   unsigned int status = 0;
   int data_len = sizeof( float );

   if( getval( var, VARIABLE, 0, &res, &status, &data_len ) != ON_SUCCESS ||
       (status & 0x1F) != FLOAT )
   {
      res = -9999;
   }

   if( res + 0.01 < exp || res - 0.01 > exp )
   {
      err_cnt += 1;
      printf( "case %3d:\n   res: %f\n   exp: %f\n  info: %s\n",
              no, res, exp, text );
   }
}

int eset_str( var, val )

char *var, *val;

{
   int ret;
   unsigned int status = STRING;

   ret = setval( var, VARIABLE, 0, val, &status, strlen(val)+1 );
   if( ret != ON_SUCCESS )
   {
      printf( "eset_str error: %d\n, ret" );
   }
}

int eset_int( var, val )

char *var;
int val;

{
   int ret;
   unsigned int status = INTEGER;

   ret = setval( var, VARIABLE, 0, &val, &status, sizeof(int) );
   if( ret != ON_SUCCESS )
   {
      printf( "eset_int error: %d\n", ret );
   }
}

int eset_lng( var, val )

char *var;
long int val;

{
   int ret;
   unsigned int status = ON_LNG_INT;
```

```
   ret = setval( var, VARIABLE, 0, &val, &status, sizeof(long) );
   if( ret != ON_SUCCESS )
   {
      printf( "eset_lng error: %d\n", ret );
   }
}

int eset_flt( var, val )

char *var;
float val;

{
   int ret;
   unsigned int status = FLOAT;

   ret = setval( var, VARIABLE, 0, &val, &status, sizeof(float) );
   if( ret != ON_SUCCESS )
   {
      printf( "eset_flt error: %d\n", ret );
   }
}


/****************************************************
 *                                                  *
 *  @(#)lib.c    1.2  8/17/89                       *
 *                                                  *
 *  Function : C source file for lib ( TDS 3530 )   *
 *                                                  *
 *  Author   : Ronald Duursma                       *
 *                                                  *
 *  Date     : 88/10/31                             *
 *                                                  *
 ****************************************************/

#include <pam_err.h>
#include <stdio.h>

main()
{
        int     rc;

        char    name[14];
        char    key[14];
        char    display[128];
        char    value[14];
        char    status[1];
        char    usage[1];
        char    first[14];
        char    second[14];
        char    cur_type[1];
        char    prv_type[1];
        int     prv_code;
        char    pat_name[14];
        int     alarm;
        char    cur_mode[1];
        char    def_mode[1];
        char    auto_fs[1];
        char    step_state[1];
        int     step_no;
        char    alarmref[34];


        setbuf( stdout, 0 );

        rc = PPini_ipc( "LIB", 1, 10 );
        if ( rc != PAM_OK ) PPstp_ipc( rc );

        rc = PPget_cfg();
        if ( rc != PAM_OK ) PPstp_ipc( rc );


        rc = release_p( "req", "path", "TST" );
        test( 48, rc, PAM_OK );

        rc = release_p( "req", "path", "TST" );
        test( 49, rc, P_INV_PATH_NAME );

        rc = release_p( "req", "path", "TST" );

        test( 50, rc, P_TIME_OUT );

        rc = select_p( "req", "env", "SRC=TANK_A;DST=TANK_B;",
                        name, key );
```

```
printf ( "*** CASE 51 ***\n" );
printf ( "    Name  : %s\n", name );
printf ( "    Key   : %s\n", key );
printf ( "    Error : %d\n\n", rc );

rc = select_p( "req", "env", "SRC=TANK_A;DST=TANK_B:",
               name, key );
printf ( "*** CASE 52 ***\n" );
printf ( "    Name  : %s\n", name );
printf ( "    Key   : %s\n", key );
printf ( "    Error : %d\n\n", rc );

rc = select_p( "req", "env", "SRC=TANK_A;DST=TANK_B:",
               name, key );
test( 53, rc, P_INIT_FAILED );

rc = select_p( "req", "env", "SRC=TANK_A;DST=TANK_B:",
               name, key );
test( 54, rc, P_NO_PATH_POSSIBLE );

rc = select_p( "req", "env", "SRC=TANK_A;DST=TANK_B:",
               name, key );
test( 55, rc, P_INV_ENVIRONMENT );

rc = select_p( "req", "env", "SRC=TANK_A;DST=TANK_B:",
               name, key );
test( 56, rc, P_TIME_OUT );

rc = select_p( "req", "env", "SRC=TANK_A;DST=TANK_B:",
               name, key );
test( 57, rc, P_TIME_OUT );

rc = gp_display( "path", display );
printf ( "*** CASE 58 ***\n" );
printf ( "    Display : %s\n", display );
printf ( "    Error   : %d\n\n", rc );

rc = gp_display( "path", display );
test( 59, rc, P_INV_PATH_NAME );

rc = gp_display( "path", display );
test( 60, rc, P_TIME_OUT );

rc = gp_key( "req", "path", key );
printf ( "*** CASE 61 ***\n" );
printf ( "    Key   : %s\n", key );
printf ( "    Error : %d\n\n", rc );

rc = gp_key( "req", "path", key );
test( 62, rc, P_INV_PATH_NAME );

rc = gp_key( "req", "path", key );
test( 63, rc, P_TIME_OUT );

rc = gs_criterion( "path", "crit", value );
printf ( "*** CASE 64 ***\n" );
printf ( "    Value : %s\n", value );
printf ( "    Error : %d\n\n", rc );

rc = gs_criterion( "path", "crit", value );
test( 65, rc, P_INV_CRIT_NAME );

rc = gs_criterion( "path", "crit", value );
test( 66, rc, P_TIME_OUT );

rc = fs_path( "req", "path", "TST" );
test( 67, rc, PAN_OK );

rc = fs_path( "req", "path", "TST" );
test( 68, rc, P_FREED );

rc = fs_path( "req", "path", "TST" );
test( 69, rc, P_NO_FAILSAFE );

rc = fs_path( "req", "path", "TST" );
test( 70, rc, P_TIME_OUT );

rc = gp_state( "path", "TST", cur_type, prv_type,
               &prv_code, pat_name, &alarm, cur_mode,
               def_mode, auto_fs, step_state,
               &step_no );
printf ( "*** CASE 71 ***\n" );
printf ( "    Current Type  : %c\n", cur_type[0] );
printf ( "    Previous Type : %c\n", prv_type[0] );
printf ( "    Previous Code : %d\n", prv_code );
printf ( "    Pattern Name  : %s\n", pat_name );
printf ( "    Alarm         : %d\n", alarm );
```

```
printf ( "    Current Mode  : %c\n", cur_mode[0] );
printf ( "    Default Mode  : %c\n", def_mode[0] );
printf ( "    Auto Failsafe : %c\n", auto_fs[0] );
printf ( "    Step State    : %c\n", step_state[0] );
printf ( "    Step Number   : %d\n", step_no );
printf ( "    Error Number  : %d\n\n", rc );

rc = gp_state( "path", "TST", cur_type, prv_type,
               &prv_code, pat_name, &alarm, cur_mode,
               def_mode, auto_fs, step_state,
               &step_no );
printf ( "*** CASE 72 ***\n" );
printf ( "    Current Type  : %c\n", cur_type[0] );
printf ( "    Previous Type : %c\n", prv_type[0] );
printf ( "    Previous Code : %d\n", prv_code );
printf ( "    Pattern Name  : %s\n", pat_name );
printf ( "    Alarm         : %d\n", alarm );
printf ( "    Current Mode  : %c\n", cur_mode[0] );
printf ( "    Default Mode  : %c\n", def_mode[0] );
printf ( "    Auto Failsafe : %c\n", auto_fs[0] );
printf ( "    Step State    : %c\n", step_state[0] );
printf ( "    Step Number   : %d\n", step_no );
printf ( "    Error Number  : %d\n\n", rc );

rc = gp_state( "path", "TST", cur_type, prv_type,
               &prv_code, pat_name, &alarm, cur_mode,
               def_mode, auto_fs, step_state,
               &step_no );
test( 73, rc, P_INV_PATH_NAME );

rc = gp_state( "path", "TST", cur_type, prv_type,
          &prv_code, pat_name, &alarm, cur_mode,
          def_mode, auto_fs, step_state,
          &step_no );
test( 74, rc, P_TIME_OUT );

rc = iz_path( "req", "path", "TST" );
test( 75, rc, PAM_OK );

rc = iz_path( "req", "path", "TST" );
test( 76, rc, P_ABORTED );

rc = iz_path( "req", "path", "TST" );
test( 77, rc, P_NO_INITIALIZE );

rc = iz_path( "req", "path", "TST" );
test( 78, rc, P_TIME_OUT );

rc = path( "req", "path", "pat", "TST" );
test( 79, rc, PAM_OK );

rc = path( "req", "path", "pat", "TST" );
test( 80, rc, P_FAILSAFE );

rc = path( "req", "path", "pat", "TST" );
test( 81, rc, P_IN_OPERATION );

rc = path( "req", "path", "pat", "TST" );
test( 82, rc, P_TIME_OUT );

rc = step_p( "req", "path", "TST", 1, 2, 3 );
test( 83, rc, PAM_OK );

rc = step_p( "req", "path", "TST", 1, 2, 3 );
test( 84, rc, P_ABORTED );

rc = step_p( "req", "path", "TST", 1, 2, 3 );
test( 85, rc, P_NO_OPERATION );

rc = step_p( "req", "path", "TST", 1, 2, 3 );
test( 86, rc, P_TIME_OUT );

rc = ce_parameter( "req", "eq", "par", "val" );
test( 87, rc, PAM_OK );

rc = ce_parameter( "req", "eq", "par", "val" );
test( 88, rc, P_INV_PAR_VALUE );
rc = ce_parameter( "req", "eq", "par", "val" );
test( 89, rc, P_TIME_OUT );

rc = ce_status( "req", "eq", 'U' );
test( 90, rc, PAM_OK );

rc = ce_status( "req", "eq", 'U' );
test( 91, rc, P_INV_STATUS );
```

```
rc = ce_status( "req", "eq", 'U' );
test( 92, rc, P_TIME_OUT );

rc = cu_locked( "req", "eq" );
test( 93, rc, PAM_OK );

rc = cu_locked( "req", "eq" );
test( 94, rc, P_NOT_OWNER );

rc = cu_locked( "req", "eq" );
test( 95, rc, P_TIME_OUT );

rc = ge_alarmref( "eq", alarmref );
printf ( "*** CASE 96 ***\n" );
printf ( "    Alarm Reference : %s\n", alarmref );
printf ( "    Error Number    : %d\n\n", rc );

rc = ge_alarmref( "eq", alarmref );
test( 97, rc, P_INV_EQ_NAME );

rc = ge_alarmref( "eq", status );
test( 98, rc, P_TIME_OUT );

rc = ge_status( "eq", status );
printf ( "*** CASE 99 ***\n" );
printf ( "    Status : %c\n", status[0] );
printf ( "    Error  : %d\n\n", rc );

rc = ge_status( "eq", status );
test( 100, rc, P_INV_EQ_NAME );

rc = ge_status( "eq", status );
test( 101, rc, P_TIME_OUT );

rc = ge_usage( "eq", usage );
printf ( "*** CASE 102 ***\n" );
printf ( "    Usage : %c\n", usage[0] );
printf ( "    Error : %d\n\n", rc );

rc = ge_usage( "eq", usage );
test( 103, rc, P_INV_EQ_NAME );

rc = ge_usage( "eq", usage );
test( 104, rc, P_TIME_OUT );

rc = re_locked( "req", "eq" );
test( 105, rc, PAM_OK );

rc = re_locked( "req", "eq" );
test( 106, rc, P_EQ_LOCKED );

rc = re_locked( "req", "eq" );
test( 107, rc, P_TIME_OUT );

rc = re_secured( "req", "eq" );
test( 108, rc, PAM_OK );

rc = re_secured( "req", "eq" );
test( 109, rc, P_INV_EQ_NAME );

rc = re_secured( "req", "eq" );
test( 110, rc, P_TIME_OUT );

rc = ue_use( "req", "eq" );
test( 111, rc, PAM_OK );

rc = ue_use( "req", "eq" );
test( 112, rc, P_NOT_OWNER );

rc = ue_use( "req", "eq" );
test( 113, rc, P_TIME_OUT );

rc = PPrequest( 100, "", "NONE", 0, 0, 0, 0 );
test( 114, rc, P_COMM_ERROR );

rc = PPrequest( 100, "", "TST", 0, 0, 15, 0 );
test( 115, rc, P_TIME_OUT );

rc = PPrequest( 100, "", "TST", 0, 0, 15, 15 );
test( 116, rc, P_TIME_OUT );

rc = PPrequest( 100, "", "TST", 0, 0, 15, 0 );
test( 117, rc, P_TIME_OUT );

rc = PPrequest( 100, "", "TST", 0, 0, 15, 0 );
test( 118, rc, P_TIME_OUT );
```

```
        rc = PPrequest( 100, "", "TST", 0, 0, 15, 0 );
        test( 119, rc, P_TIME_OUT );

        rc = PPrequest( 100, "", "TST", first, 0, 15, 0 );
        printf ( "*** CASE 120 ***\n" );
        printf ( "    First : %s\n", first );
        printf ( "    Error : %d\n\n", rc );

        rc = PPrequest( 100, "", "TST", first, second, 15, 0 );
        printf ( "*** CASE 121 ***\n" );
        printf ( "    First : %s\n", second );
        printf ( "    Error : %d\n\n", rc );

        rc = PPrequest( 100, "", "TST", first, 0, 15, 0 );
        test( 122, rc, P_COMM_ERROR );
        PPstp_ipc( PAM_OK );
}

test( case_no, actual, expected )
int     case_no;
int     actual;
int     expected;
{
        if ( actual != expected )
        {
                printf ( "*** CASE %d ***\n", case_no );
                printf ( "    Expected : %d\n", expected );
                printf ( "    Actual   : %d\n\n", actual );
        }
}


# @(#)oma3635   1.1     1.1

a0 palarm I
a1 svar7_2 I
a2 svari7_2 F
a3 svarf7_2 F
a4 svara7_2 I
a5 svara7_2b I
a6 e1par1 L

a15 PPERR L
a16 P7 S
a17 AP20XXP7 S
a18 e6par1 I

*0
*1
*2
*3
*4
*5
*6

*15
*16
*17
*18

s0=0
s1=0
s2=0.0
s3=0.0
s4=0
s5=0
s6=0

s15=0
s16="******"
s17="******"
s18=0

q


# @(#)pam_ex.ini        1.2  I/A Series, Foxboro Company  8/17/89
#
# PAM example database filling script, giving an empty PAM database
# initial contents. After running this script the database will NOT
# be consistent within itself.
#
# History:
#       04 JAN 89, JvB, $PAMDIR is changed to '/usr/pam', so the db-directory
#                       becomes '$PAMDIR/db'.
#
```

```
echo "

PATH MANAGEMENT DATABASE INITIALIZATION
--------------------------------------

"
cd $PAMDIR/db

isql - - <<!

database pam;

delete from copas;
delete from pat;
delete from par_value;
delete from path_cond;
delete from elem_alarm;
delete from elem_cond;
delete from path_cond;
delete from eqe;
delete from eqr;

insert into copas
(       path_name,
        path_environment,
        operation_mode,
        description,
        path_display,
        path_excep_proc,
        init_pattern,
        alarm_ref
)
values
(       "line_1",
        "chocolate",
        "M",
        "Description of line_1",
        "/usr/disp/line_1_disp",
        "CPEX:LINE1EX",
        "open",
        "CPALM:LINE1_ALM.STATUS"
);
insert into copas
(       path_name,
        path_environment,
        operation_mode,
        description,
        path_display,
        path_excep_proc,
        init_pattern,
        alarm_ref
)
values
(       "line_2",
        "chocolate",
        "A",
        "Description of line_2",
        "/usr/disp/line_2_disp",
        "CPEX:LINE2EX",
        "hold",
        "CPALM:LINE2_ALM.STATUS"
);
insert into copas
(       path_name,
        path_environment,
        operation_mode,
        description,
        path_display,
        path_excep_proc,
        init_pattern,
        alarm_ref
)
values
(       "line_3",
        "limonade",
        "M",
        "Description of line_3",
        "/usr/disp/line_3_disp",
        "CPEX:LINE3EX",
        "init",
        "CPALM:LINE3_ALM.STATUS"
);


insert into elem_alarm
(       path_name,
        elem_name
```

```
)
values
(       "line_1",
        "valve_2"
);
insert into elem_alarm
values
(       "line_1",
        "valve_3"
);
insert into elem_alarm
values
(       "line_1",
        "turbine 2"
);
insert into elem_alarm
values
(       "line_2",
        "valve_1"
);
insert into elem_alarm
values
(       "line_2",
        "valve_2"
);
insert into elem_alarm
values
(       "line_2",
        "turbine_1"
);
insert into elem_alarm
values
(       "line_2",
        "turbine_2"
);
insert into elem_alarm
values
(       "line_3",
        "valve_1"
);
insert into elem_alarm
values
(       "line_3",
        "valve_3"
);
insert into elem_alarm
values
(       "line_3",
        "turbine_2"
);
insert into elem_alarm
values
(       "line_3",
        "filter"
);

insert into pat
(       path_name,
        pattern_name
)
values
(       "line_1",
        "open"
);
insert into pat
(       path_name,
        pattern_name
)
values
(       "line_2",
        "hold"
);
insert into pat
(       path_name,
        pattern_name
)
values
(       "line_3",
        "init"
);


insert into elem_cond
(       path_name,
        elem_name,
        cond_code,
        condition
```

```
)
values
(       "line_1",
        "valve_2",
        "U",
        "secured"
);
insert into elem_cond
(       path_name,
        elem_name,
        cond_code,
        condition
)
values
(       "line_1",
        "turbine_2",
        "R",
        "CPALM:LINE1_ALR.STATUS==F"
);
insert into elem_cond
(       path_name,
        elem_name,
        cond_code,
        condition
)
values
(       "line_2",
        "valve_2",
        "U",
        "locked"
);
insert into elem_cond
(       path_name,
        elem_name,
        cond_code,
        condition
)
values
(       "line_3",
        "valve_3",
        "A",
        "V3STATE:=1"
);
insert into elem_cond
(       path_name,
        elem_name,
        cond_code,
        condition
)
values
(       "line_3",
        "turbine_2",
        "U",
        "secured"
);
insert into elem_cond
(       path_name,
        elem_name,
        cond_code,
        condition
)
values
(       "line_3",
        "filter",
        "U",
        "secured"
);

insert into par_value
(       path_name,
        pattern_name,
        elem_name,
        step_no,
        par_type,
        par_name,
        par_value
)
values
(       "line_1",
        "open",
        "valve_2",
        "1",
        "I",
        "V2STATE",
        "0"
```

```
);
insert into par_value
(       path_name,
        pattern_name,
        elem_name,
        step_no,
        par_type,
        par_name,
        par_value
)
values
(       "line_2",
        "hold",
        "turbine_1",
        "1",
        "L",
        "T1TEMP",
        "100"
);
insert into par_value
(       path_name,
        pattern_name,
        elem_name,
        step_no,
        par_type,
        par_name,
        par_value
)
values
(       "line_2",
        "hold2",
        "turbine_1",
        "2",
        "L",
        "T1SPEED",
        "1000"
);
insert into par_value
(       path_name,
        pattern_name,
        elem_name,
        step_no,
        par_type,
        par_name,
        par_value
)
values
(       "line_3",
        "init",
        "turbine_2",
        "1",
        "L",
        "T2SPEED",
        "3000"
);

insert into eqe
(       elem_name,
        alarm_ref,
        description,
        default_owner,
        default_oper_priv
)
values
(       "valve_1",
        "CPALM:VALV1_ALM.STATUS",
        "Valve 1 description",
        "super_owner",
        "F"
);
insert into eqe
(       elem_name,
        alarm_ref,
        description,
        default_owner,
        default_oper_priv
)
values
(       "valve_2",
        "CPALM:VALV2_ALM.STATUS",
        "Valve 2 description",
        "super_owner",
        "T"
);
insert into eqe
(       elem_name,
```

```
        alarm_ref,
        description,
        default_owner,
        default_oper_priv
)
values
(       "valve_3",
        "CPALM:VALV3_ALM.STATUS",
        "Valve 3 description",
        "super_owner",
        "F"
);
insert into eqe
(       elem_name,
        alarm_ref,
        description,
        default_owner,
        default_oper_priv
)
values
(       "turbine_1",
        "CPALM:TURB1_ALM.STATUS",
        "Turbine 1 description",
        "super_owner",
        "F"
);
insert into eqe
(       elem_name,
        alarm_ref,
        description,
        default_owner,
        default_oper_priv
)
values
(       "turbine_2",
        "CPALM:TURB2_ALM.STATUS",
        "Turbine 2 description",
        "super_owner",
        "T"
);
insert into eqe
(       elem_name,
        alarm_ref,
        description,
        default_owner,
        default_oper_priv
)
values
(       "filter",
        "CPALM:FILT_ALM.STATUS",
        "Filter description",
        "super_owner",
        "F"
);

!

echo "

END OF PATH MANAGEMENT DATABASE INITIALIZATION
----------------------------------------------

"


{  @(#)pamblck.s        1.2  8/17/89  }
{  pamblck89012.s  }

DEPENDENT_SEQUENCE
 bi1: BI0001;
 bo1: BO0001;

 bi16: BI0016;
 ii2:  II0002;
STATEMENTS

  WAIT UNTIL bi16 AFTER 6000 GOTO next;
<<next>>
ENDSEQUENCE
```

```
-----------------------------------------------------------------------#
@(#)makefile 1.9  I/A Series, Foxboro Co.  8/23/89
-----------------------------------------------------------------------#

his makefile creates the complete PAM product executables, or cleans up
he obj directories, or builds the PAM package installation tree.

argets:
build        : Produce PAM product executables in ./bin.
get          : Retrieve all files from SCCS.
cleanup      : Remove all non-SCCS files.
tidyup       : Remove all files not needed for install.
install      : Build install tree.
version      : Produce version.info file.
pam          : Perform cleanup, get, build, version.
delobj       : Remove all object files.

Isage for FOXMASS:
    make foxmass (to get a build from scratch)
    make foxmass GOAL=install (to get an install tree)
#
# Usage for usage in SOEST:
#     make soest (to get a build from scratch)
#     make soest GOAL=install (to get an install tree)
#
# COMPONENT HISTORY:
#-----------------------------------------------------------------------#
# 23 AUG 89 - EP - Removed the -r switch from the foxmass install rule
# 23 AUG 89 - RD - Changed calling of low level makefiles to prevent path
#                  'explosion' on scm286
# 11 AUG 89 - RD - Changed TARGET into GOAL to prevent name conflicts with
#                  low level makefiles
# 11 AUG 89 - RD - Targets foxmass and soest to simplify usage
# 03 JUL 89 - RD - Removed links in install rule
# 03 JUL 89 - RD - CMS file n086 now build from n086.cms with fmt_cms
#                  Rule for type E_INST_FILES added
#                  Script file selc no longer in get rule
# 30 JUN 89 - RD - Changed p_selc to run only when necessary
#                  Changed p_hfl to run only when necessary
#                  Removed libhit.a from install
#                  Clean up misc, tools and pamtst directory as well
#                  Get on pamtst directory as well
#                  Make pamtst
# 23 FEB 89 - GM - Get depency removed, description modified.
#                  p_selc only depends on db/copassel.cnf.
# 22 FEB 89 - GM - Clean-up line added for hfl.
#                  Fixed get rule to perform hex conversion when necessary.
#                  Fixed install lines for ce_parameter and gs_criterion
#                  such that place will not create subdirectories.
# 21 FEB 89 - EP - Made paths relative to the PAM top level directory.
#                  Added hpp.c dependency to p_hfl description.
#                  Fixed p_selc description to also work from SCCS files.
#                  Commented out rm command from install description. (May
#                  be needed for SOEST builds.)
# 15 FEB 89 - GM - Package number set to 1278
#                  p_init.PAM is now called p_init.PTMGM
# 18 JAN 89 - GM - treat copassel.cnf as binary file (keywords !)
# 16 JAN 89 - GM - tidyup rule modified for FoxMass usage.
#                  Clean db directory in cleanup rule.
#                  Retrieve files in db directory in get rule.
# 09 JAN 89 - GM - Install standard report specifications
# 09 JAN 89 - GM - Chmod +x start_pam & stop_pam
# 09 JAN 89 - GM - Compile & install hpp
# 04 JAN 89 - GM - install CMS file
# 03 JAN 89 - GM - start_pam & stop_pam added
#                  ce_param installed as ce_parameter
#                  gs_crit installed as gs_criterion
# 02 JAN 89 - GM - Install gp_state.
# 16 DEC 88 - GM - Major modifications.
# 01 NOV 88 - GM - Creation.
#-----------------------------------------------------------------------#

# SCCS to be set to SCCS for working on sccs tree with SCCS subdirs

GET = get
GFLAGS =
SCCS = .


# PKG_ROOT must not be given a different value without modifying
# the install rule also.

PACKAGE = 1278/user
PKG_ROOT = $(PACKAGE)/usr/installpam
PLACE = place
PLACEDIR = placedir
```

```
# SPECIFY FILES RELATIVE TO PAM ROOT


#
# C_INST_FILES : list of C source files, to be installed
#                as part of the PAM Installation Procedure
#                that may require retrieval from sccs
#

C_INST_FILES =


#
# H_INST_FILES : list of C header files, to be installed
#                as part of the PAM Installation Procedure
#                that may require retrieval from sccs
#

H_INST_FILES =  header/pam_err.h \
                header/pam_gen.h \
                header/pam_msg.h


#
# V_INST_FILES : list of make, special header, database,
#                perform screen and script files to be installed
#                as part of the PAM Installation Procedure
#                that may require retrieval from sccs
#

V_INST_FILES =  db/pam_db.ini \
                db/evnt_def.ini \
                db/fmt_def.ini \
                db/dev_conf.ini \
                db/pam_conf.per \
                db/copas.ace \
                db/dev_conf.ace \
                db/e_alarm.ace \
                db/e_cond.ace \
                db/eqe.ace \
                db/eqr.ace \
                db/pac.ace \
                db/p_value.ace \
                db/pat.ace \
                db/pam_conf.rep \
                init/p_init.PTNGM \
                init/cfg.dat \
                init/start_pam \
                init/stop_pam \
                hfl/pfl.s


#
# B_INST_FILES :  List of binary files to be installed
#                 as part of the install rule.
#                 The files must be retrieved from sccs

B_INST_FILES =  db/copassel.cnf


#
# E_INST_FILES :  List of error files to be installed
#                 as part of the install rule.
#                 The files must be retrieved from sccs
#                 and compiled with fmt_cms

E_INST_FILES =  init/n086


build:  p_pam_gen \
        p_cfl \
        p_hfl \
        p_ees \
        p_els \
        p_selc \
        p_hcs \
        p_psrs \
        p_chsrv \
        p_selsrv \
        p_pac \
        p_pirs \
        p_hit \
        p_pamtst


p_pam_gen:
        $(MAKE) -f pam_gen/make/pam_gen.mk PREFIX=.
```

```
p_cfl:
	$(MAKE) -f cfl/make/cfl.mk PREFIX=.

p_hfl: bin/hpp

bin/hpp: hfl/hpp.c
	cc hfl/hpp.c -o bin/hpp

p_ees:
	$(MAKE) -f ees/make/ees.mk PREFIX=.

p_els:
	$(MAKE) -f els/make/els.mk PREFIX=.

p_selc: header/seltab.h header/seldef.h

header/seltab.h header/seldef.h: init/selc db/copassel.cnf
	init/selc .

init/selc: init/$(SCCS)/s.selc
	cd init; \
	$(GET) $(GFLAGS) -p $(SCCS)/s.selc > selc; \
	chmod +x selc

p_hcs:
	$(MAKE) -f hcs/make/hcs.mk PREFIX=.

p_psrs:
	$(MAKE) -f psrs/make/psrs.mk PREFIX=.

p_chsrv:
	$(MAKE) -f chsrv/make/chsrv.mk PREFIX=.

p_selsrv:
	$(MAKE) -f selsrv/make/selsrv.mk PREFIX=.

p_pac:
	$(MAKE) -f pac/make/pac.mk PREFIX=.

p_pirs:
	$(MAKE) -f pirs/make/pirs.mk PREFIX=.

p_hit:
	$(MAKE) -f hit/make/hit.mk PREFIX=.

p_pamtst:
	$(MAKE) -f pamtst/make/pamtst.mk PREFIX=.

install: $(C_INST_FILES) $(H_INST_FILES) $(V_INST_FILES) $(B_INST_FILES) \
	$(E_INST_FILES)
#	rm -rf $(PACKAGE)/usr
	$(PLACEDIR)	$(PACKAGE)/usr
	$(PLACEDIR)	$(PKG_ROOT)
	$(PLACEDIR)	$(PACKAGE)/usr/include
	$(PLACEDIR)	$(PACKAGE)/usr/include/fox
	$(PLACEDIR)	$(PACKAGE)/usr/lib
	$(PLACEDIR)	$(PACKAGE)/usr/fox
	$(PLACEDIR)	$(PACKAGE)/usr/fox/sp
	$(PLACEDIR)	$(PACKAGE)/usr/fox/sp/files
	$(PLACEDIR)	$(PACKAGE)/usr/fox/sp/files/pkg_inits
	$(PLACEDIR)	$(PACKAGE)/usr/fox/err_msg
	$(PLACEDIR)	$(PKG_ROOT)/pam
	$(PLACEDIR)	$(PKG_ROOT)/pam/bin
	$(PLACEDIR)	$(PKG_ROOT)/pam/config
	$(PLACEDIR)	$(PKG_ROOT)/db
	chmod +x db/*.ini \
		db/pam_conf.rep \
		init/p_init.PTNGN \
		init/start_pam \
		init/stop_pam
	cd db;$(PLACE)	pam_db.ini	$(PKG_ROOT)/db
	cd db;$(PLACE)	evnt_def.ini	$(PKG_ROOT)/db
	cd db;$(PLACE)	fmt_def.ini	$(PKG_ROOT)/db
	cd db;$(PLACE)	dev_conf.ini	$(PKG_ROOT)/db
	cd db;$(PLACE)	copassel.cnf	$(PKG_ROOT)/db
	cd db;$(PLACE)	pam_conf.per	$(PKG_ROOT)/db
	cd db;$(PLACE)	copas.ace	$(PKG_ROOT)/db
	cd db;$(PLACE)	dev_conf.ace	$(PKG_ROOT)/db
	cd db;$(PLACE)	e_alarm.ace	$(PKG_ROOT)/db
	cd db;$(PLACE)	e_cond.ace	$(PKG_ROOT)/db
	cd db;$(PLACE)	eqe.ace	$(PKG_ROOT)/db
	cd db;$(PLACE)	eqr.ace	$(PKG_ROOT)/db
	cd db;$(PLACE)	pac.ace	$(PKG_ROOT)/db
	cd db;$(PLACE)	p_value.ace	$(PKG_ROOT)/db
	cd db;$(PLACE)	pat.ace	$(PKG_ROOT)/db
	cd db;$(PLACE)	pam_conf.rep	$(PKG_ROOT)/db
```

```
        cd bin;$(PLACE) chsrv          $(PKG_ROOT)/pam/bin
        cd bin;$(PLACE) ees            $(PKG_ROOT)/pam/bin
        cd bin;$(PLACE) els            $(PKG_ROOT)/pam/bin
        cd bin;$(PLACE) hcs            $(PKG_ROOT)/pam/bin
        cd bin;$(PLACE) selsrv         $(PKG_ROOT)/pam/bin
        cd bin;$(PLACE) pirs           $(PKG_ROOT)/pam/bin
        cd bin;$(PLACE) pac            $(PKG_ROOT)/pam/bin
        cd bin;$(PLACE) ce_parameter   $(PKG_ROOT)/pam/bin
        cd bin;$(PLACE) ce_status      $(PKG_ROOT)/pam/bin
        cd bin;$(PLACE) ge_status      $(PKG_ROOT)/pam/bin
        cd bin;$(PLACE) ge_usage       $(PKG_ROOT)/pam/bin
        cd bin;$(PLACE) gp_display     $(PKG_ROOT)/pam/bin
        cd bin;$(PLACE) gp_state       $(PKG_ROOT)/pam/bin
        cd bin;$(PLACE) gs_criterion   $(PKG_ROOT)/pam/bin
        cd bin;$(PLACE) re_locked      $(PKG_ROOT)/pam/bin
        cd bin;$(PLACE) re_secured     $(PKG_ROOT)/pam/bin
        cd bin;$(PLACE) ue_use         $(PKG_ROOT)/pam/bin
        cd bin;$(PLACE) path           $(PKG_ROOT)/pam/bin
        cd bin;$(PLACE) release_p      $(PKG_ROOT)/pam/bin
        cd bin;$(PLACE) select_p       $(PKG_ROOT)/pam/bin
        cd bin;$(PLACE) hpp            $(PKG_ROOT)/pam/bin
        cd lib;$(PLACE) libpam.a       $(PACKAGE)/usr/lib
        cd hfl;$(PLACE) pfl.s          $(PACKAGE)/usr/lib
        cd header;$(PLACE)      pam_err.h      $(PACKAGE)/usr/include/fox
        cd header;$(PLACE)      pam_gen.h      $(PACKAGE)/usr/include/fox
        cd header;$(PLACE)      pam_msg.h      $(PACKAGE)/usr/include/fox
        cd init;$(PLACE) p_init.PTMGM  $(PACKAGE)/usr/fox/sp/files/pkg_inits
        cd init;$(PLACE) n086          $(PACKAGE)/usr/fox/err_msg
        cd init;$(PLACE) cfg.dat       $(PKG_ROOT)/pam/config
        cd init;$(PLACE) start_pam     $(PKG_ROOT)/pam/bin
        cd init;$(PLACE) stop_pam      $(PKG_ROOT)/pam/bin
        l -R $(PACKAGE)

$(C_INST_FILES) $(H_INST_FILES) $(V_INST_FILES): $$(@D)/$(SCCS)/s.$$(@F)
        $(GET) $(GFLAGS) $? -p >$@

$(B_INST_FILES) : $$(@D)/$(SCCS)/s.$$(@F)
        $(GET) $(GFLAGS) $? -p >$@.p; \
        sed "1d" $@.p > /tmp/_cv.tmp; \
        hc b /tmp/_cv.tmp $@.Z; \
        uncompress -fq $@; \
        rm /tmp/_cv.tmp $@.p

$(E_INST_FILES) : $$(@D)/$(SCCS)/s.$$(@F).cms
        $(GET) $(GFLAGS) $? -p >$@.cms; \
        fmt_cms $@

cleanup:        tidyup
        rm -f ./lib/*
        rm -f ./bin/*
        rm -f ./header/?[!.]*.h
        rm -f ./init/?[!.C]*
        rm -f ./db/?[!.C]*
        rm -f ./hfl/?[!.C]*
        rm -f ./misc/?[!.C]*
        rm -f ./tools/?[!.C]*

tidyup:         delobj
        rm -f ./pam_gen/source/?[!.]*.c
        rm -f ./pam_gen/make/?[!.]*.mk
        rm -f ./cfl/source/?[!.]*.c
        rm -f ./cfl/make/?[!.]*.mk
        rm -f ./ees/source/?[!.]*.c
        rm -f ./ees/make/?[!.]*.mk
        rm -f ./els/source/?[!.]*.c
        rm -f ./els/make/?[!.]*.mk
        rm -f ./hcs/source/?[!.]*.c
        rm -f ./hcs/make/?[!.]*.mk
        rm -f ./hfl/hpp.c
        rm -f ./psrs/source/?[!.]*.c
        rm -f ./psrs/make/?[!.]*.mk
        rm -f ./chsrv/source/?[!.]*.c
        rm -f ./chsrv/make/?[!.]*.mk
        rm -f ./selsrv/source/?[!.]*.c
        rm -f ./selsrv/make/?[!.]*.mk
        rm -f ./pac/source/?[!.]*.c
        rm -f ./pac/make/?[!.]*.mk
        rm -f ./pirs/source/?[!.]*.c
        rm -f ./pirs/make/?[!.]*.mk
        rm -f ./hit/source/?[!.]*.c
        rm -f ./hit/make/?[!.]*.mk
        rm -f ./pamtst/source/?[!.C]*
        rm -f ./pamtst/make/?[!.]*.mk
```

```
delobj:
	rm -f ./pam_gen/obj/*
	rm -f ./cfl/obj/*
	rm -f ./ees/obj/*
	rm -f ./els/obj/*
	rm -f ./hcs/obj/*
	rm -f ./psrs/obj/*
	rm -f ./chsrv/obj/*
	rm -f ./selsrv/obj/*
	rm -f ./pac/obj/*
	rm -f ./pirs/obj/*
	rm -f ./hit/obj/*
	rm -f ./pamtst/obj/*

get:
	cd pam_gen/source; $(GET) $(GFLAGS) $(SCCS)/s.*
	cd pam_gen/make; $(GET) $(GFLAGS) $(SCCS)/s.*
	cd cfl/source; $(GET) $(GFLAGS) $(SCCS)/s.*
	cd cfl/make; $(GET) $(GFLAGS) $(SCCS)/s.*
	cd ees/source; $(GET) $(GFLAGS) $(SCCS)/s.*
	cd ees/make; $(GET) $(GFLAGS) $(SCCS)/s.*
	cd els/source; $(GET) $(GFLAGS) $(SCCS)/s.*
	cd els/make; $(GET) $(GFLAGS) $(SCCS)/s.*
	cd hcs/source; $(GET) $(GFLAGS) $(SCCS)/s.*
	cd hcs/make; $(GET) $(GFLAGS) $(SCCS)/s.*
	cd hfl; $(GET) $(GFLAGS) $(SCCS)/s.hpp.c
	cd psrs/source; $(GET) $(GFLAGS) $(SCCS)/s.*
	cd psrs/make; $(GET) $(GFLAGS) $(SCCS)/s.*
	cd chsrv/source; $(GET) $(GFLAGS) $(SCCS)/s.*
	cd chsrv/make; $(GET) $(GFLAGS) $(SCCS)/s.*
	cd selsrv/source; $(GET) $(GFLAGS) $(SCCS)/s.*
	cd selsrv/make; $(GET) $(GFLAGS) $(SCCS)/s.*
	cd pac/source; $(GET) $(GFLAGS) $(SCCS)/s.*
	cd pac/make; $(GET) $(GFLAGS) $(SCCS)/s.*
	cd pirs/source; $(GET) $(GFLAGS) $(SCCS)/s.*
	cd pirs/make; $(GET) $(GFLAGS) $(SCCS)/s.*
	cd hit/source; $(GET) $(GFLAGS) $(SCCS)/s.*
	cd hit/make; $(GET) $(GFLAGS) $(SCCS)/s.*
	cd pamtst/source; $(GET) $(GFLAGS) $(SCCS)/s.*
	cd pamtst/make; $(GET) $(GFLAGS) $(SCCS)/s.*
	cd header; $(GET) $(GFLAGS) $(SCCS)/s.*

version:
	date "+*** PAM VERSION INFO %y/%m/%d %T ***%n" \
		> version.info
	what /usr/lib/libfox.a /usr/lib/libcom.a \
		>> version.info
	find . -type f -name '*.[ch]' ! -name 's.*' -exec what {} \; \
		>> version.info
	what init/* db/* bin/* \
		>> version.info
	sum bin/* \
		>> version.info
	l bin/* \
		>> version.info

pam: cleanup get build version

GOAL=pam

soest:
	$(MAKE) $(GOAL) SCCS=SCCS PLACE=cp PLACEDIR=-mkdir \
		PACKAGE=/usr/install

foxmass:
	$(MAKE) $(GOAL)


#*************************************************************************
#  @(#)cfl.mk   1.4  I/A Series  Foxboro Company  89/08/17
#*************************************************************************
#                                                                        *
#  Copyright by the Foxboro Company 1988                                 *
#                                                                        *
#  All rights reserved Foxboro Company 1988                              *
#                                                                        *
#*$0**********************************************************************
#                                                                        *
#  FILE NAME             : cfl.mk                                        *
#                                                                        *
#  PART NUMBER           :                                               *
#                                                                        *
#  FUNCTION              : Makefile for PAM C Function Library.          *
#                                                                        *
```

```
#  COMPONENT HISTORY   :                                                  *
#  ------------------------------------------------------------------------ *
#  24 OCT 1988 - RD - Creation                                            *
#  19 DEC 1988 - MS - gp_state() added                                    *
#  03 JAN 1989 - RD - ge_alarmref() added                                 *
#  03 JAN 1989 - RD - Filename for ge_alarmref() is ge_aref.c             *
#  20 FEB 1989 - GM - els.h added to header list                          *
#                                                                         *
#***************************************************************************

PREFIX  =       /usr/pam

HDRDIR  =       $(PREFIX)/header

BINDIR  =       $(PREFIX)/bin

LIBDIR  =       $(PREFIX)/lib

OBJDIR  =       $(PREFIX)/cfl/obj

SRCDIR  =       $(PREFIX)/cfl/source

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h\
                $(HDRDIR)/els.h

OBJECTS =       $(OBJDIR)/release_p.o\
                $(OBJDIR)/select_p.o\
                $(OBJDIR)/gp_display.o\
                $(OBJDIR)/gp_key.o\
                $(OBJDIR)/gs_crit.o\
                $(OBJDIR)/fs_path.o\
                $(OBJDIR)/iz_path.o\
                $(OBJDIR)/path.o\
                $(OBJDIR)/step_p.o\
                $(OBJDIR)/gp_state.o\
                $(OBJDIR)/ce_param.o\
                $(OBJDIR)/ce_status.o\
                $(OBJDIR)/cu_locked.o\
                $(OBJDIR)/ge_status.o\
                $(OBJDIR)/ge_usage.o\
                $(OBJDIR)/ge_aref.o\
                $(OBJDIR)/re_locked.o\
                $(OBJDIR)/re_secured.o\
                $(OBJDIR)/ue_use.o\
                $(OBJDIR)/request.o\
                $(OBJDIR)/pam_com.o\
                $(OBJDIR)/get_srm.o\
                $(OBJDIR)/get_fld.o\
                $(OBJDIR)/get_cfg.o\
                $(OBJDIR)/err_rpt.o\
                $(OBJDIR)/log_event.o

TARGET  =       $(LIBDIR)/libpam.a

CFLAGS  =       -I$(HDRDIR) -c


$(TARGET):      $(OBJECTS)
                -rm $(TARGET)
                ar rc $(TARGET) $(OBJECTS)
                ranlib $(TARGET)


$(OBJDIR)/release_p.o:  $(SRCDIR)/release_p.c $(HEADERS)
                cc $(CFLAGS) $(SRCDIR)/release_p.c
                mv release_p.o $(OBJDIR)

$(OBJDIR)/select_p.o:   $(SRCDIR)/select_p.c $(HEADERS)
                cc $(CFLAGS) $(SRCDIR)/select_p.c
                mv select_p.o $(OBJDIR)

$(OBJDIR)/gp_display.o: $(SRCDIR)/gp_display.c $(HEADERS)
                cc $(CFLAGS) $(SRCDIR)/gp_display.c
                mv gp_display.o $(OBJDIR)

$(OBJDIR)/gp_key.o:     $(SRCDIR)/gp_key.c $(HEADERS)
                cc $(CFLAGS) $(SRCDIR)/gp_key.c
                mv gp_key.o $(OBJDIR)

$(OBJDIR)/gs_crit.o:    $(SRCDIR)/gs_crit.c $(HEADERS)
                cc $(CFLAGS) $(SRCDIR)/gs_crit.c
                mv gs_crit.o $(OBJDIR)
```

```
$(OBJDIR)/fs_path.o:    $(SRCDIR)/fs_path.c $(HEADERS)
                cc $(CFLAGS) $(SRCDIR)/fs_path.c
                mv fs_path.o $(OBJDIR)

$(OBJDIR)/lz_path.o:    $(SRCDIR)/lz_path.c $(HEADERS)
                cc $(CFLAGS) $(SRCDIR)/lz_path.c
                mv lz_path.o $(OBJDIR)

$(OBJDIR)/path.o:       $(SRCDIR)/path.c $(HEADERS)
                cc $(CFLAGS) $(SRCDIR)/path.c
                mv path.o $(OBJDIR)

$(OBJDIR)/step_p.o:     $(SRCDIR)/step_p.c $(HEADERS)
                cc $(CFLAGS) $(SRCDIR)/step_p.c
                mv step_p.o $(OBJDIR)

$(OBJDIR)/gp_state.o:   $(SRCDIR)/gp_state.c $(HEADERS)
                cc $(CFLAGS) $(SRCDIR)/gp_state.c
                mv gp_state.o $(OBJDIR)

$(OBJDIR)/ce_param.o:   $(SRCDIR)/ce_param.c $(HEADERS)
                cc $(CFLAGS) $(SRCDIR)/ce_param.c
                mv ce_param.o $(OBJDIR)

$(OBJDIR)/ce_status.o:  $(SRCDIR)/ce_status.c $(HEADERS)
                cc $(CFLAGS) $(SRCDIR)/ce_status.c
                mv ce_status.o $(OBJDIR)

$(OBJDIR)/cu_locked.o:  $(SRCDIR)/cu_locked.c $(HEADERS)
                cc $(CFLAGS) $(SRCDIR)/cu_locked.c
                mv cu_locked.o $(OBJDIR)

$(OBJDIR)/ge_status.o:  $(SRCDIR)/ge_status.c $(HEADERS)
                cc $(CFLAGS) $(SRCDIR)/ge_status.c
                mv ge_status.o $(OBJDIR)

$(OBJDIR)/ge_usage.o:   $(SRCDIR)/ge_usage.c $(HEADERS)
                cc $(CFLAGS) $(SRCDIR)/ge_usage.c
                mv ge_usage.o $(OBJDIR)

$(OBJDIR)/ge_aref.o:    $(SRCDIR)/ge_aref.c $(HEADERS)
                cc $(CFLAGS) $(SRCDIR)/ge_aref.c
                mv ge_aref.o $(OBJDIR)

$(OBJDIR)/re_locked.o:  $(SRCDIR)/re_locked.c $(HEADERS)
                cc $(CFLAGS) $(SRCDIR)/re_locked.c
                mv re_locked.o $(OBJDIR)

$(OBJDIR)/re_secured.o: $(SRCDIR)/re_secured.c $(HEADERS)
                cc $(CFLAGS) $(SRCDIR)/re_secured.c
                mv re_secured.o $(OBJDIR)

$(OBJDIR)/ue_use.o:     $(SRCDIR)/ue_use.c $(HEADERS)
                cc $(CFLAGS) $(SRCDIR)/ue_use.c
                mv ue_use.o $(OBJDIR)

$(OBJDIR)/request.o:    $(SRCDIR)/request.c $(HEADERS)
                cc $(CFLAGS) $(SRCDIR)/request.c
                mv request.o $(OBJDIR)

$(OBJDIR)/pam_com.o:    $(SRCDIR)/pam_com.c $(HEADERS)
                cc $(CFLAGS) $(SRCDIR)/pam_com.c
                mv pam_com.o $(OBJDIR)

$(OBJDIR)/get_srm.o:    $(SRCDIR)/get_srm.c $(HEADERS)
                cc $(CFLAGS) $(SRCDIR)/get_srm.c
                mv get_srm.o $(OBJDIR)

$(OBJDIR)/get_fld.o:    $(SRCDIR)/get_fld.c $(HEADERS)
                cc $(CFLAGS) $(SRCDIR)/get_fld.c
                mv get_fld.o $(OBJDIR)

$(OBJDIR)/get_cfg.o:    $(SRCDIR)/get_cfg.c $(HEADERS)
                cc $(CFLAGS) $(SRCDIR)/get_cfg.c
                mv get_cfg.o $(OBJDIR)

$(OBJDIR)/err_rpt.o:    $(SRCDIR)/err_rpt.c $(HEADERS)
                cc $(CFLAGS) $(SRCDIR)/err_rpt.c
                mv err_rpt.o $(OBJDIR)

$(OBJDIR)/log_event.o:  $(SRCDIR)/log_event.c $(HEADERS)
                cc $(CFLAGS) $(SRCDIR)/log_event.c
                mv log_event.o $(OBJDIR)
```

```
/****************************************************************************
*  @(#)ce_param.c      1.2  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**80*************************************************************************
*                                                                           *
*  FILE NAME            : ce_param.c                                        *
*                                                                           *
*  PART NUMBER          :                                                   *
*                                                                           *
*  FUNCTION             : Handle ce_parameter request.                      *
*                                                                           *
*  FUNCTIONS CONTAINED  : ce_parameter()                                    *
*                                                                           *
*  DATA STRUCTURES      :                                                   *
*                                                                           *
*  COMPONENT HISTORY    :                                                   *
*  ---------------------------------------------------------------------   *
*  24 OCT 1988 - RD - Creation                                              *
*                                                                           *
****************************************************************************/

#include <pam_com.h>

int ce_parameter( requestor, eq_name, par_name, par_value )
char    *requestor;
char    *eq_name;
char    *par_name;
char    *par_value;
{
        char    fields[LINE_LENGTH];

        /*
         * Do request.
         */

        sprintf( fields, "%s;%s;%s;%s;", requestor, eq_name,
                 par_name, par_value );

        return( PPrequest( I_CE_PARAMETER, fields, ees_name, NULL, NULL,
                60, 0 ) );

} /* End of ce_parameter() */


/****************************************************************************
*  @(#)ce_status.c     1.2  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**80*************************************************************************
*                                                                           *
*  FILE NAME            : ce_status.c                                       *
*                                                                           *
*  PART NUMBER          :                                                   *
*                                                                           *
*  FUNCTION             : Handle ce_status request.                         *
*                                                                           *
*  FUNCTIONS CONTAINED  : ce_status()                                       *
*                                                                           *
*  DATA STRUCTURES      :                                                   *
*                                                                           *
*  COMPONENT HISTORY    :                                                   *
*  ---------------------------------------------------------------------   *
*  24 OCT 1988 - RD - Creation                                              *
*                                                                           *
****************************************************************************/

#include <pam_com.h>

int ce_status( requestor, eq_name, new_status )
char    *requestor;
```

```
char    *eq_name;
char    new_status;
{
        char    fields[LINE_LENGTH];


        /*
         * Do request.
         */

        sprintf( fields, "%s;%s;%c;", requestor, eq_name, new_status );

        return( PPrequest( I_CE_STATUS, fields, ees_name, NULL, NULL,
                60, 0 ) );

} /* End of ce_status() */


/***********************************************************************
 * @(#)cu_locked.c      1.2  I/A Series  Foxboro Company  89/08/17
 ***********************************************************************
 *                                                                     *
 *  Copyright by the Foxboro Company 1988                              *
 *                                                                     *
 *  All rights reserved Foxboro Company 1988                           *
 *                                                                     *
 **%0*******************************************************************
 *                                                                     *
 *  FILE NAME           : cu_locked.c                                  *
 *                                                                     *
 *  PART NUMBER         :                                              *
 *                                                                     *
 *  FUNCTION            : Handle cu_locked request.                    *
 *                                                                     *
 *  FUNCTIONS CONTAINED : cu_locked()                                  *
 *                                                                     *
 *  DATA STRUCTURES     :                                              *
 *                                                                     *
 *  COMPONENT HISTORY   :                                              *
 *  ----------------------------------------------------------------   *
 *  21 OCT 1988 - RD - Creation                                        *
 *                                                                     *
 **********************************************************************/


#include <pam_com.h>


int cu_locked( requestor, eq_name )
char    *requestor;
char    *eq_name;
{
        char    fields[LINE_LENGTH];


        /*
         * Do request.
         */

        sprintf( fields, "%s;%s;", requestor, eq_name );

        return( PPrequest( I_CU_LOCKED, fields, ees_name, NULL, NULL,
                60, 0 ) );

} /* End of cu_locked() */


/***********************************************************************
 * @(#)err_rpt.c        1.2  I/A Series  Foxboro Company  89/08/17
 ***********************************************************************
 *                                                                     *
 *  Copyright by the Foxboro Company 1988                              *
 *                                                                     *
 *  All rights reserved Foxboro Company 1988                           *
 *                                                                     *
 **%0*******************************************************************
 *                                                                     *
 *  FILE NAME           : err_rpt.c                                    *
 *                                                                     *
 *  PART NUMBER         :                                              *
 *                                                                     *
 *  FUNCTION            : Error reporting                              *
 *                                                                     *
 *  FUNCTIONS CONTAINED : PPerr_rpt()                                  *
 *
```

```
 *  DATA STRUCTURES     :                                                 *
 *                                                                        *
 *  COMPONENT HISTORY   :                                                 *
 *  ------------------------------------------------------------------    *
 *  24 OCT 1988 - RD - Creation                                           *
 *  14 DEC 1988 - GM - Added ELS error codes                              *
 *  11 AUG 1989 - RD - Use CLerr_rpt                                      *
 *                                                                        *
 **************************************************************************/

int     PPerr_rpt( subsys, xcode, process, extra_info )
short   subsys;
short   xcode;
char    *process;
char    *extra_info;
{
    return( CLerr_rpt( subsys, xcode, process, extra_info ) );

} /* End of PPerr_rpt() */


/**************************************************************************
 *  @(#)fs_path.c          1.2  I/A Series  Foxboro Company  89/08/17
 **************************************************************************
 *                                                                        *
 *  Copyright by the Foxboro Company 1988                                 *
 *                                                                        *
 *  All rights reserved Foxboro Company 1988                              *
 *                                                                        *
 **************************************************************************
 *                                                                        *
 *  FILE NAME            : fs_path.c                                      *
 *                                                                        *
 *  PART NUMBER          :                                                *
 *                                                                        *
 *  FUNCTION             : Handle fs_path request.                        *
 *                                                                        *
 *  FUNCTIONS CONTAINED  : fs_path()                                      *
 *                                                                        *
 *  DATA STRUCTURES      :                                                *
 *                                                                        *
 *  COMPONENT HISTORY    :                                                *
 *  ------------------------------------------------------------------    *
 *  24 OCT 1988 - RD - Creation                                           *
 *                                                                        *
 **************************************************************************/

#include <pam_com.h>


int fs_path( requestor, path_name, path_key )
char    *requestor;
char    *path_name;
char    *path_key;
{
        char    fields[LINE_LENGTH];


        /*
         * Do request.
         */

        sprintf( fields, "%s:%s:", requestor, path_name );

        return( PPrequest( I_FS_PATH, fields, path_key, NULL, NULL, 30, 0 ) );

} /* End of fs_path() */


/**************************************************************************
 *  @(#)ge_aref.c          1.2  I/A Series  Foxboro Company  89/08/17
 **************************************************************************
 *                                                                        *
 *  Copyright by the Foxboro Company 1988                                 *
 *                                                                        *
 *  All rights reserved Foxboro Company 1988                              *
 *                                                                        *
 **************************************************************************
 *                                                                        *
 *  FILE NAME            : ge_aref.c                                      *
 *                                                                        *
 *  PART NUMBER          :                                                *
 *                                                                        *
 *  FUNCTION             : Handle ge_alarmref request.                    *
```

```
 *
 * FUNCTIONS CONTAINED : ge_alarmref()
 *
 * DATA STRUCTURES     :
 *
 * COMPONENT HISTORY   :
 * ----------------------------------------------------------------------
 * 03 JAN 1989 - RD - Creation
 *
 ************************************************************************/

#include <pam_com.h>

int ge_alarmref( eq_name, alarmref )
char    *eq_name;
char    *alarmref;
{
        char    fields[LINE_LENGTH];

        /*
         * Do request.
         */

        strcpy( fields, eq_name );
        strcat( fields, ";" );

        return( PPrequest( I_GE_ALARMREF, fields, ees_name, alarmref, NULL,
                60, 0 ) );

} /* End of ge_alarmref() */

/************************************************************************
 * @(#)ge_status.c      1.2  I/A Series  Foxboro Company  89/08/17
 ************************************************************************
 *
 * Copyright by the Foxboro Company 1988
 *
 * All rights reserved Foxboro Company 1988
 *
 **E0*********************************************************************
 *
 * FILE NAME           : ge_status.c
 *
 * PART NUMBER         :
 *
 * FUNCTION            : Handle ge_status request.
 *
 * FUNCTIONS CONTAINED : ge_status()
 *
 * DATA STRUCTURES     :
 *
 * COMPONENT HISTORY   :
 * ----------------------------------------------------------------------
 * 24 OCT 1988 - RD - Creation
 *
 ************************************************************************/

#include <pam_com.h>

int ge_status( eq_name, eq_status )
char    *eq_name;
char    *eq_status;
{
        char    fields[LINE_LENGTH];

        /*
         * Do request.
         */

        strcpy( fields, eq_name );
        strcat( fields, ";" );

        return( PPrequest( I_GE_STATUS, fields, ees_name, eq_status, NULL,
                60, 0 ) );

} /* End of ge_status() */
```

```
/**********************************************************************
*  @(#)ge_usage.c        1.2  I/A Series  Foxboro Company  89/08/17
***********************************************************************
*                                                                     *
*  Copyright by the Foxboro Company 1988                              *
*                                                                     *
*  All rights reserved Foxboro Company 1988                           *
*                                                                     *
**80*******************************************************************
*                                                                     *
*  FILE NAME           : ge_usage.c                                   *
*                                                                     *
*  PART NUMBER         :                                              *
*                                                                     *
*  FUNCTION            : Handle ge_usage request.                     *
*                                                                     *
*  FUNCTIONS CONTAINED : ge_usage()                                   *
*                                                                     *
*  DATA STRUCTURES     :                                              *
*                                                                     *
*  COMPONENT HISTORY   :                                              *
*  -----------------------------------------------------------------  *
*  24 OCT 1988 - RD - Creation                                        *
*                                                                     *
**********************************************************************/

#include <pam_com.h>

int ge_usage( eq_name, eq_usage )
char    *eq_name;
char    *eq_usage;
{
        char    fields[LINE_LENGTH];


        /*
         * Do request.
         */

        strcpy( fields, eq_name );
        strcat( fields, ":" );

        return( PPrequest( I_GE_USAGE, fields, ees_name, eq_usage, NULL,
                60, 0 ) );

} /* End of ge_usage() */


/**********************************************************************
*  @(#)get_cfg.c         1.2  I/A Series  Foxboro Company  89/08/17
***********************************************************************
*                                                                     *
*  Copyright by the Foxboro Company 1988                              *
*                                                                     *
*  All rights reserved Foxboro Company 1988                           *
*                                                                     *
**80*******************************************************************
*                                                                     *
*  FILE NAME           : get_cfg.c                                    *
*                                                                     *
*  PART NUMBER         :                                              *
*                                                                     *
*  FUNCTION            : Get configuration from configuration file.   *
*                                                                     *
*  FUNCTIONS CONTAINED : PPget_cfg()                                  *
*                                                                     *
*  DATA STRUCTURES     :                                              *
*                                                                     *
*  COMPONENT HISTORY   :                                              *
*  -----------------------------------------------------------------  *
*  24 OCT 1988 - RD - Creation                                        *
*  11 NOV 1988 - RD - Split psrs_name into sel_name and chg_name.     *
*  21 DEC 1988 - GN - Get els_name.                                   *
*                                                                     *
**********************************************************************/

#include <pam_com.h>

int PPget_cfg()
{
        int     rc;
        FILE    *fp;
```

```
        /*
         * Read configuration file.
         */

        fp = fopen( "/usr/pam/config/cfg.dat", "r" );
        if ( fp == NULL ) return( P_INV_CFG_FILE );

        rc = fscanf( fp, "%s\n%s\n%s\n%s\n%s", ees_name, irs_name,
                     chg_name, sel_name, els_name );
        if ( rc != 5 ) return( P_INV_CFG_FILE );

        fclose( fp );

        return( PAM_OK );

} /* End of PPget_cfg() */


/*********************************************************************
*  @(#)get_fld.c       1.2  I/A Series  Foxboro Company  89/08/17
**********************************************************************
*                                                                    *
*  Copyright by the Foxboro Company 1988                             *
*                                                                    *
*  All rights reserved Foxboro Company 1988                          *
*                                                                    *
**80******************************************************************
*                                                                    *
*  FILE NAME            : get_fld.c                                  *
*                                                                    *
*  PART NUMBER          :                                            *
*                                                                    *
*  FUNCTION             : Get a field out of a message.              *
*                                                                    *
*  FUNCTIONS CONTAINED  : PPget_fld()                                *
*                                                                    *
*  DATA STRUCTURES      :                                            *
*                                                                    *
*  COMPONENT HISTORY    :                                            *
*  ---------------------------------------------------------------   *
*  24 OCT 1988 - RD - Creation                                       *
*                                                                    *
*********************************************************************/


#include <pam_com.h>


char *PPget_fld( start_ptr, value, max )
char    *start_ptr;
char    *value;
int     max;
{
        if ( start_ptr == NULL ) return( NULL );

        while ( ( *start_ptr != ':' ) &&
                ( *start_ptr != '\0' ) &&
                ( max > 0 ) )
        {
                *value++ = *start_ptr++;
                max--;
        }

        if ( *start_ptr != ':' )
        {
                return( NULL );
        }

        *value = '\0';


        /*
         * Return to caller.
         */
        return( ++start_ptr );

} /* End of PPget_fld() */


/*********************************************************************
*  @(#)get_srm.c       1.2  I/A Series  Foxboro Company  89/08/17
**********************************************************************
*                                                                    *
*  Copyright by the Foxboro Company 1988                             *
*                                                                    *
```

```
 * All rights reserved Foxboro Company 1988                               *
 **80*********************************************************************
 *                                                                        *
 * FILE NAME             : get_srm.c                                      *
 *                                                                        *
 * PART NUMBER           :                                                *
 *                                                                        *
 * FUNCTION              : Get fields out of a standard return message.   *
 *                                                                        *
 * FUNCTIONS CONTAINED   : PPget_srm()                                    *
 *                                                                        *
 * DATA STRUCTURES       :                                                *
 *                                                                        *
 * COMPONENT HISTORY     :                                                *
 * ----------------------------------------------------------------------- *
 * 24 OCT 1988 - RD - Creation                                            *
 *                                                                        *
 *************************************************************************/

#include <pam_com.h>


char *PPget_srm( start, reference, type, error )
char    *start;
char    *reference;
int     *type;
int     *error;
{
        char    *ptr;
        char    str[LINE_LENGTH];
        char    *PPget_fld();


        ptr = PPget_fld( start, reference, LINE_LENGTH );
        ptr = PPget_fld( ptr, str, LINE_LENGTH );
        *type = atoi( str );
        ptr = PPget_fld( ptr, str, LINE_LENGTH );
        *error = atoi( str );

        /*
         * Return to caller.
         */

        return( ptr );

} /* End of PPget_srm() */


/*************************************************************************
 * @(#)gp_display.c     1.2  I/A Series  Foxboro Company  89/08/17       *
 *************************************************************************
 *                                                                        *
 * Copyright by the Foxboro Company 1988                                  *
 *                                                                        *
 * All rights reserved Foxboro Company 1988                               *
 *                                                                        *
 **80*********************************************************************
 *                                                                        *
 * FILE NAME             : gp_display.c                                   *
 *                                                                        *
 * PART NUMBER           :                                                *
 *                                                                        *
 * FUNCTION              : Handle gp_display request.                     *
 *                                                                        *
 * FUNCTIONS CONTAINED   : gp_display()                                   *
 *                                                                        *
 * DATA STRUCTURES       :                                                *
 *                                                                        *
 * COMPONENT HISTORY     :                                                *
 * ----------------------------------------------------------------------- *
 * 24 OCT 1988 - RD - Creation                                            *
 * 11 NOV 1988 - RD - Changed pirs_name into irs_name                     *
 *                                                                        *
 *************************************************************************/

#include <pam_com.h>


int gp_display( path_name, path_displ )
char    *path_name;
char    *path_displ;
{
        char    fields[LINE_LENGTH];
```

```
	/*
	 * Do request.
	 */

	strcpy( fields, path_name );
	strcat( fields, ";" );

	return( PPrequest( I_GP_DISPLAY, fields, irs_name, path_displ, NULL,
		60, 0 ) );

} /* End of gp_display() */


/*****************************************************************************
 * @(#)gp_key.c 1.2  I/A Series  Foxboro Company  89/08/17
 *****************************************************************************
 *                                                                           *
 * Copyright by the Foxboro Company 1988                                     *
 *                                                                           *
 * All rights reserved Foxboro Company 1988                                  *
 *                                                                           *
 **80*************************************************************************
 *                                                                           *
 * FILE NAME            : gp_key.c                                           *
 *                                                                           *
 * PART NUMBER          :                                                    *
 *                                                                           *
 * FUNCTION             : Handle gp_key request.                             *
 *                                                                           *
 * FUNCTIONS CONTAINED  : gp_key()                                           *
 *                                                                           *
 * DATA STRUCTURES      :                                                    *
 *                                                                           *
 * COMPONENT HISTORY    :                                                    *
 * ----------------------------------------------------------------------   *
 * 24 OCT 1988 - RD - Creation                                               *
 * 11 NOV 1988 - RD - Changed pirs_name into irs_name                        *
 *                                                                           *
 *****************************************************************************/

#include <pam_com.h>


int gp_key( requestor, path_name, path_key )
char	*requestor;
char	*path_name;
char	*path_key;
{
	char	fields[LINE_LENGTH];

	/*
	 * Do request.
	 */

	sprintf( fields, "%s;%s;", requestor, path_name );

	return( PPrequest( I_GP_KEY, fields, irs_name, path_key, NULL,
		60, 0 ) );

} /* End of gp_key() */


/*****************************************************************************
 * @(#)gp_state.c       1.2  I/A Series  Foxboro Company  89/08/17
 *****************************************************************************
 *                                                                           *
 * Copyright by the Foxboro Company 1988                                     *
 *                                                                           *
 * All rights reserved Foxboro Company 1988                                  *
 *                                                                           *
 **80*************************************************************************
 *                                                                           *
 * FILE NAME            : gp_state                                           *
 *                                                                           *
 * PART NUMBER          :                                                    *
 *                                                                           *
 * FUNCTION             : Handle gp_state request.                           *
 *                                                                           *
 * FUNCTIONS CONTAINED  : gp_state()                                         *
 *                                                                           *
 * DATA STRUCTURES      :                                                    *
 *                                                                           *
 * COMPONENT HISTORY    :                                                    *
```

```
 * ------------------------------------------------------------------------ *
 * 19 DEC 1988 - MVS - Creation                                             *
 * 11 AUG 1989 - RD  - Use different reference field                        *
 * 14 AUG 1989 - RD  - Fixed reference in case of TESTING                   *
 *                                                                          *
 ***************************************************************************/


#include <pam_com.h>


int gp_state( path_name, path_key, cur_type, prv_type, prv_code,
              pat_name, alarm, cur_mode, def_mode, auto_fs,
              step_state, step_no )
char    *path_name;
char    *path_key;
char    *cur_type;
char    *prv_type;
int     *prv_code;
char    *pat_name;
int     *alarm;
char    *cur_mode;
char    *def_mode;
char    *auto_fs;
char    *step_state;
int     *step_no;
{
        char    fields[LINE_LENGTH];
        int     rc;             /* Return code          */
        int     sz;             /* Size of message      */
        int     ty;             /* Type of message      */
        int     er;             /* Error in message     */
        static int no = 1;      /* Request number       */

        char    *pt;            /* Pointer in message   */
        char msg[BUFFER_SIZE];  /* Message buffer       */
        char src[IPC_NAME_LEN]; /* Source name          */
        char ref_in[LINE_LENGTH];       /* Reference field      */
        char ref_out[IPC_NAME_LEN];     /* Reference field      */

        char value[6];

        /*
         * Build and send message.
         */

#ifdef TESTING
        strcpy( ref_out, "ref" );
#else
        sprintf( ref_out, "%u_%u", getpid(), no++ );
#endif
        sprintf( msg, "%s:%d:%s:", ref_out, I_GP_STATE, path_name );

        rc = PPsnd_msg( msg, path_key, strlen ( msg ) + 1 );
        if ( rc != PAM_OK ) return ( P_COMM_ERROR );

        /*
         * Receive and process messages until timeout or a valid
         * message has arrived
         */

        while ( TRUE )
        {
                rc = PPrcv_msg( msg, src, &sz, 5 * 60 );
                if ( rc == E_TIME_OUT )
                        return( P_TIME_OUT );
                if ( rc != PAM_OK )
                        return( P_COMM_ERROR );

                pt = PPget_srm( msg, ref_in, &ty, &er );
                if ( ( pt != NULL ) &&
                     ( strcmp( ref_in, ref_out ) == 0 ) &&
                     ( ty == I_GP_STATE + 1 ) )
                {
                        /*
                         * Valid message received
                         */

                        if ( er != PAM_OK )
                                return( er );

                        /* get 'cur_type' from message */

                        pt = PPget_fld( pt, cur_type, 25);

                        /* get 'prv_type' from message */
```

```
                pt = PPget_fld( pt, prv_type, 25);
                /* get 'prv_code' from message */
                pt = PPget_fld( pt, value, 5);
                *prv_code = atoi( value );
                /* get 'pat_name' from message */
                pt = PPget_fld( pt, pat_name, 25);
                /* get 'alarm' from message */
                pt = PPget_fld( pt, value, 5);
                *alarm = atoi( value );
                /* get 'cur_mode' from message */
                pt = PPget_fld( pt, cur_mode, 25);
                /* get 'def_mode' from message */
                pt = PPget_fld( pt, def_mode, 25);
                /* get 'auto_fs' from message */
                pt = PPget_fld( pt, auto_fs, 25);
                /* get 'step_state' from message */
                pt = PPget_fld( pt, step_state, 25);
                /* get 'step_no' from message */
                pt = PPget_fld( pt, value, 5);
                *step_no = atoi( value );
                if ( pt == NULL )
                        return( P_COMM_ERROR );
                return( er );
            } /* End of if ( valid message ) */
        } /* End oh while */
} /* End of gp_state() */

/***********************************************************************
*  @(#)gs_crit.c        1.2  I/A Series  Foxboro Company  89/08/17
************************************************************************
*                                                                      *
*  Copyright by the Foxboro Company 1988                               *
*                                                                      *
*  All rights reserved Foxboro Company 1988                            *
*                                                                      *
**80********************************************************************
*                                                                      *
*  FILE NAME           : gs_crit.c                                     *
*                                                                      *
*  PART NUMBER         :                                               *
*                                                                      *
*  FUNCTION            : Handle gs_criterion request.                  *
*                                                                      *
*  FUNCTIONS CONTAINED : gs_criterion()                                *
*                                                                      *
*  DATA STRUCTURES     :                                               *
*                                                                      *
*  COMPONENT HISTORY   :                                               *
*  ------------------------------------------------------------------- *
*  24 OCT 1988 - RD - Creation                                         *
*  11 NOV 1988 - RD - Changed pirs_name into irs_name                  *
*                                                                      *
***********************************************************************/

#include <pam_com.h>

int gs_criterion( path_name, crit_name, crit_value )
char    *path_name;
char    *crit_name;
```

```
char    *crit_value;
{
        char    fields[LINE_LENGTH];


        /*
         * Do request.
         */

        sprintf( fields, "%s;%s;", path_name, crit_name );

        return( PPrequest( I_GS_CRITERION, fields, irs_name, crit_value, NULL,
                60, 0 ) );

} /* End of gs_crit() */


/**************************************************************************
 * @(#)iz_path.c        1.2  I/A Series  Foxboro Company  89/08/17
 **************************************************************************
 *                                                                        *
 * Copyright by the Foxboro Company 1988                                  *
 *                                                                        *
 * All rights reserved Foxboro Company 1988                               *
 *                                                                        *
 **$0**********************************************************************
 *                                                                        *
 * FILE NAME            : iz_path.c                                       *
 *                                                                        *
 * PART NUMBER          :                                                 *
 *                                                                        *
 * FUNCTION             : Handle iz_path request.                         *
 *                                                                        *
 * FUNCTIONS CONTAINED : iz_path()                                        *
 *                                                                        *
 * DATA STRUCTURES      :                                                 *
 *                                                                        *
 * COMPONENT HISTORY    :                                                 *
 * ------------------------------------------------------------------------
 * 24 OCT 1988 - RD - Creation                                            *
 *                                                                        *
 *************************************************************************/


#include <pam_com.h>


int iz_path( requestor, path_name, path_key )
char    *requestor;
char    *path_name;
char    *path_key;
{
        char    fields[LINE_LENGTH];


        /*
         * Do request.
         */

        sprintf( fields, "%s;%s;", requestor, path_name );

        return( PPrequest( I_IZ_PATH, fields, path_key, NULL, NULL, 30, 0 ) );

} /* End of iz_path() */


/**************************************************************************
 * @(#)log_event.c      1.2  I/A Series  Foxboro Company  89/08/17
 **************************************************************************
 *                                                                        *
 * Copyright by the Foxboro Company 1988                                  *
 *                                                                        *
 * All rights reserved Foxboro Company 1988                               *
 *                                                                        *
 **$0**********************************************************************
 *                                                                        *
 * FILE NAME            : log_event.c                                     *
 *                                                                        *
 * PART NUMBER          :                                                 *
 *                                                                        *
 * FUNCTION             : Log events.                                     *
 *                                                                        *
 * FUNCTIONS CONTAINED : PPlog_event()                                    *
 *                                                                        *
 * DATA STRUCTURES      :                                                 *
 *                                                                        *
```

```
 *  COMPONENT HISTORY   :                                                *
 *  -------------------------------------------------------------------  *
 *  24 OCT 1988 - RD - Creation                                          *
 *  11 NOV 1988 - RD - Adapted to latest version of pam_log.h            *
 *  04 JAN 1989 - RD/GN - Added message to Event Logging Subsystem       *
 *  14 AUG 1989 - RD  - Fixed reference in case of TESTING               *
 *                                                                       *
 *************************************************************************/

#include <pam_com.h>
#include <els.h>
#include <fox/vv_err.h>
#include <sys/utsname.h>

int     PPlog_event( event_type, environmt, params )
int     event_type;
char    *environmt;
char    *params[];
{
        int             i;
        int             rc;

        char            letter_bug[LBUG_LEN + 1];
        char            time_stamp[TIME_LEN + 1];
        int             valid_flag;
        unsigned        mon_counter;

        struct utsname  name;
        struct fdtime   newtime;
        char            msg[BUFFER_SIZE];

        /*
         * Log event to screen.
         */

        printf( "*** PAM Event Logging ...\n" );
        printf( "    Event Type  :" );

        switch( event_type )
        {
        case E_AP_SELECT:
                printf( " E_AP_SELECT\n" );
                break;

        case E_CO_MODE:
                printf( " E_CO_MODE\n" );
                break;

        case E_CP_STATUS:
                printf( " E_CP_STATUS\n" );
                break;

        case E_RELEASE_P:
                printf( " E_RELEASE_P\n" );
                break;

        case E_SELECT_P:
                printf( " E_SELECT_P\n" );
                break;

        case E_ABORT_P:
                printf( " E_ABORT_P\n" );
                break;

        case E_PATH:
                printf( " E_PATH\n" );
                break;

        case E_STEP_P:
                printf( " E_STEP_P\n" );
                break;

        case E_INIT_P:
                printf( " E_INIT_P\n" );
                break;

        case E_FAIL_P:
                printf( " E_FAIL_P\n" );
                break;

        case E_CE_PARAMETER:
                printf( " E_CE_PARAMETER\n" );
                break;
```

```
case E_CE_REFERENCE:
        printf( " E_CE_REFERENCE\n" );
        break;

case E_CE_STATUS:

        printf( " E_CE_STATUS\n" );
        break;

case E_CO_PRIVILEGE:
        printf( " E_CO_PRIVILEGE\n" );
        break;

case E_CU_SECURED:
        printf( " E_CU_SECURED\n" );
        break;

case E_CU_LOCKED:
        printf( " E_CU_LOCKED\n" );
        break;

case E_RE_LOCKED:
        printf( " E_RE_LOCKED\n" );
        break;

case E_RE_SECURED:
        printf( " E_RE_SECURED\n" );
        break;

case E_UE_USE:
        printf( " E_UE_USE\n" );
        break;

case E_P_EXCEPT:
        printf( " E_P_EXCEPT\n" );
        break;

case E_RP_EXCEPT:
        printf( " E_RP_EXCEPT\n" );
        break;

case E_VALID_ERR:
        printf( " E_VALID_ERR\n" );
        break;

default:
        printf( " Unknown (%d)\n", event_type );
        break;

} /* End of switch */

printf( "    Environment : %s\n", environmt );
for ( i = 0 ; params[i] != ( char * ) 0 ; i++ )
{
        printf( "    Parameter_%d : %s\n", i, params[i] );
}

printf( "\n" );


/*
 * Now send message to ELS.
 * First get date and time information.
 */

if ( fget_dtime( &newtime, ISO ) != VVDONE )
{
        /*
         * Fill in defaults.
         */

        strcpy( time_stamp, "???????????????????" );
        valid_flag  = 0;
        mon_counter = ( unsigned ) 0;
}
else
{
        /*
         * Fill in values from structure.
         */

        strcpy( time_stamp, newtime.ftime );
        valid_flag  = newtime.valid_time;
        mon_counter = ( unsigned ) newtime.mono_count;
```

```
        }

        /*
         * Get letterbug.
         */

        if ( uname( &name ) == -1 )
        {
                /*
                 * Fill in default value.
                 */

                strcpy( letter_bug, "??????" );
        }
        else
        {
                /*
                 * Fill in letterbug.
                 */

                strcpy( letter_bug, name.nodename );
        }

        /*
         * Compose message and send it.
         */

#ifdef TESTING
        sprintf( msg, "%s:%d:%s:%s:%d:%u:%d:%s:", "ref", I_LOG_EVENT,
                 letter_bug, time_stamp, valid_flag, mon_counter, event_type,
                 environmt );
#else
        sprintf( msg, "%d:%d:%s:%s:%d:%u:%d:%s:", getpid(), I_LOG_EVENT,
                 letter_bug, time_stamp, valid_flag, mon_counter, event_type,
                 environmt );
#endif

        for ( i = 0; params[i] != ( char * ) 0; i++ )
        {
                strcat( msg, params[i] );
                strcat( msg, ":" );
        }

        rc = PPsnd_msg( msg, els_name, strlen( msg ) + 1 );
        if ( rc != PAM_OK )
        {
                return( P_COMM_ERROR );
        }
        else
        {
                return( PAM_OK );
        }

} /* End of PPlog_event() */


/*************************************************************************
 * @(#)pam_com.c        1.2  I/A Series  Foxboro Company  89/08/17
 *************************************************************************
 *                                                                       *
 * Copyright by the Foxboro Company 1988                                 *
 *                                                                       *
 * All rights reserved Foxboro Company 1988                              *
 *                                                                       *
 **%0*********************************************************************
 *                                                                       *
 * FILE NAME           : pam_com.c                                       *
 *                                                                       *
 * PART NUMBER         :                                                 *
 *                                                                       *
 * FUNCTION            : PAM Communication Library with PSAP list.       *
 *                                                                       *
 * FUNCTIONS CONTAINED : PPini_ipc()                                     *
 *                       PPstp_ipc()                                     *
 *                       PPrcv_msg()                                     *
 *                       PPsnd_msg()                                     *
 *                                                                       *
 * DATA STRUCTURES     : None.                                           *
 *                                                                       *
 * COMPONENT HISTORY   :                                                 *
 * ---------------------------------------------------------------      *
 * 24 OCT 1988 - RD - Creation                                           *
 * 11 NOV 1988 - RD - Changed pirs_name into irs_name and split psrs_name *
 *                    into chg_name and sel_name                         *
```

```
 *                     Changed error reporting slightly                  *
 *  14 DEC 1988 - GN - Added els_name definition                         *
 *  16 DEC 1988 - RD - Changed signal catching strategy                  *
 *                     Changed error reporting information               *
 *                     Added CLerr_rpt()                                 *
 *  11 AUG 1989 - RD - Use Communication Library                         *
 *  15 AUG 1989 - RD - PPstp_ipc()                                       *
 *                                                                       *
 *************************************************************************/

#include <pam_com.h>
#include <fox/cl_errors.h>

/**********************
 * Global definitions *
 **********************/

char            ees_name[IPC_NAME_LEN];
char            chg_name[IPC_NAME_LEN];
char            sel_name[IPC_NAME_LEN];
char            irs_name[IPC_NAME_LEN];
char            els_name[IPC_NAME_LEN];

/*********************
 * Local definitions *
 *********************/

static char     ipc_name[IPC_NAME_LEN];
static char     SCCS_id[] = "@(#)pam_com.c      1.2  (89/08/17)";


/*************************************************************************
 *                                                                       *
 *  Copyright by the Foxboro Company 1988                                *
 *                                                                       *
 *  All rights reserved Foxboro Company 1988                             *
 *                                                                       *
 **&1*********************************************************************
 *                                                                       *
 *  NAME              : PPini_ipc                                        *
 *                                                                       *
 *  FUNCTION          : Initialize IPC.                                  *
 *                                                                       *
 *  INPUT PARAMETERS  : name, create, size.                              *
 *                                                                       *
 *  OUTPUT PARAMETERS : None.                                            *
 *                                                                       *
 *  RETURN CODES      : Return code of CLini_ipc.                        *
 *                                                                       *
 *  SYNOPSIS          : int PPini_ipc( name, create, size )              *
 *                      char *name;                                      *
 *                      int  create;                                     *
 *                      int  size;                                       *
 *                                                                       *
 *  PRE-CONDITIONS    : None.                                            *
 *                                                                       *
 *  ERRORS/EXCEPTIONS : Error in called function.                        *
 *                                                                       *
 *  COMPONENT HISTORY :                                                  *
 *  -------------------------------------------------------------------  *
 *  24 OCT 1988 - RD - Creation                                          *
 *  16 DEC 1988 - RD - Changed signal catching strategy                  *
 *                     Return P_OBJ_CREATE after obj_create failure      *
 *  11 AUG 1989 - RD - Use CL functions                                  *
 *                                                                       *
 *************************************************************************/

int PPini_ipc( name, create, size )
char    *name;
int     create;
int     size;
{
    /*
     * Configure CL to produce error reports and catch signals.
     */

    CLcon_fig( 1, 0, 0 );
    signal( SIGINT, SIG_IGN );
    signal( SIGQUIT, SIG_IGN );
    signal( SIGUSR1, PPstp_ipc );
```

```
    /*
     * Keep name and call CLini_ipc.
     */

    strcpy( ipc_name, name );
    return( CLini_ipc( name, create, size ) );

} /* End of PPini_ipc() */


/*************************************************************************
*                                                                        *
*  Copyright by the Foxboro Company 1988                                 *
*                                                                        *
*  All rights reserved Foxboro Company 1988                              *
*                                                                        *
**81**********************************************************************
*                                                                        *
*  NAME                : PPstp_ipc                                       *
*                                                                        *
*  FUNCTION            : Stop IPC.                                       *
*                                                                        *
*  INPUT PARAMETERS    : number.                                         *
*                                                                        *
*  OUTPUT PARAMETERS   : None.                                           *
*                                                                        *
*  RETURN CODES        : None.                                           *
*                                                                        *
*  SYNOPSIS            : int PPstp_ipc( number )                         *
*                          int number;                                   *
*                                                                        *
*  PRE-CONDITIONS      : None.                                           *
*                                                                        *
*  ERRORS/EXCEPTIONS   : None.                                           *
*                                                                        *
*  COMPONENT HISTORY :                                                   *
*  ---------------------------------------------------------------------  *
*  24 OCT 1988 - RD - Creation                                           *
*  16 DEC 1988 - RD - Changed SIGINT to SIGUSR1                          *
*                     No obj_delete after failure of obj_create          *
*  11 AUG 1989 - RD - Use CL functions                                   *
*  15 AUG 1989 - RD - No error report if error == 0                      *
*                                                                        *
*************************************************************************/

int PPstp_ipc( error )
int     error;
{
        char err_str[10];


        /*
         * Call CLstp_ipc.
         */

        CLstp_ipc( error );


        /*
         * Error message for user.
         */

        if ( error != PAN_OK )
        {
                sprintf( err_str, "%d", error );
                CLerr_rpt( PAN, PE_STOP, ipc_name, err_str );
        }


        /*
         * Stop it.
         */

        exit( error );

} /* End of PPstp_ipc() */


/*************************************************************************
*                                                                        *
*  Copyright by the Foxboro Company 1988                                 *
*                                                                        *
*  All rights reserved Foxboro Company 1988                              *
*                                                                        *
**81**********************************************************************
```

```
 *
 * NAME               : PPrcv_msg
 *
 * FUNCTION           : Receive a message.
 *
 * INPUT PARAMETERS   : time_out.
 *
 * OUTPUT PARAMETERS  : msg, source, size.
 *
 * RETURN CODES       : Return code of CLrcv_msg.
 *
 * SYNOPSIS           : int PPrcv_msg( msg, source, size, time_out )
 *                       char *msg;
 *                       char *source;
 *                       int  *size;
 *                       int  time_out;
 *
 * PRE-CONDITIONS     : None.
 *
 * ERRORS/EXCEPTIONS  : Error in called function.
 *
 * COMPONENT HISTORY :
 * ----------------------------------------------------------------------
 * 24 OCT 1988 - RD - Creation
 * 11 AUG 1989 - RD - Use CL functions
 *
 ************************************************************************/

int PPrcv_msg( msg, source, size, time_out )
char    *msg;
char    *source;
int     *size;
int     time_out;
{
    int rc;


    rc = CLrcv_msg( msg, source, size, time_out / 5 );
    if ( rc == CL_TIME_OUT )
    {
        return( E_TIME_OUT );
    }
    else
    {
        return( rc );
    }

} /* End of PPrcv_msg() */


/************************************************************************
 *
 * Copyright by the Foxboro Company 1988
 *
 * All rights reserved Foxboro Company 1988
 *
 **$1*********************************************************************
 *
 * NAME               : PPsnd_msg
 *
 * FUNCTION           : Send a message.
 *
 * INPUT PARAMETERS   : msg, destination, size.
 *
 * OUTPUT PARAMETERS  : None.
 *
 * RETURN CODES       : Return code of CLsnd_msg.
 *
 * SYNOPSIS           : int PPsnd_msg( msg, destination, size )
 *                       char *msg;
 *                       char *destination;
 *                       int  size;
 *
 * PRE-CONDITIONS     : None.
 *
 * ERRORS/EXCEPTIONS  : Error in called function.
 *
 * COMPONENT HISTORY :
 * ----------------------------------------------------------------------
 * 24 OCT 1988 - RD - Creation
 * 11 AUG 1989 - RD - Use CL functions
 *
 ************************************************************************/

int PPsnd_msg( msg, destination, size )
char    *msg;
```

```
char    *destination;
int     size;
{
    return( CLsnd_msg( msg, destination, size ) );

} /* End of PPsnd_msg() */


/***********************************************************************
 * @(#)path.c   1.2  I/A Series  Foxboro Company  89/08/17
 ***********************************************************************
 *                                                                     *
 *  Copyright by the Foxboro Company 1988                              *
 *                                                                     *
 *  All rights reserved Foxboro Company 1988                           *
 *                                                                     *
 **80*******************************************************************
 *                                                                     *
 *  FILE NAME           : path.c                                       *
 *                                                                     *
 *  PART NUMBER         :                                              *
 *                                                                     *
 *  FUNCTION            : Handle path request.                         *
 *                                                                     *
 *  FUNCTIONS CONTAINED : path()                                       *
 *                                                                     *
 *  DATA STRUCTURES     :                                              *
 *                                                                     *
 *  COMPONENT HISTORY   :                                              *
 *  ------------------------------------------------------------------ *
 *  24 OCT 1988 - RD - Creation                                        *
 *                                                                     *
 ***********************************************************************/


#include <pam_com.h>


int path( requestor, path_name, pat_name, path_key )
char    *requestor;
char    *path_name;
char    *pat_name;
char    *path_key;
{
        char    fields[LINE_LENGTH];


        /*
         * Do request.
         */

        sprintf( fields, "%s;%s;%s;", requestor, path_name, pat_name );

        return( PPrequest( I_PATH, fields, path_key, NULL, NULL, 30, 0 ) );

} /* End of path() */


/***********************************************************************
 * @(#)re_locked.c      1.2  I/A Series  Foxboro Company  89/08/17
 ***********************************************************************
 *                                                                     *
 *  Copyright by the Foxboro Company 1988                              *
 *                                                                     *
 *  All rights reserved Foxboro Company 1988                           *
 *                                                                     *
 **80*******************************************************************
 *                                                                     *
 *  FILE NAME           : re_locked.c                                  *
 *                                                                     *
 *  PART NUMBER         :                                              *
 *                                                                     *
 *  FUNCTION            : Handle re_locked request.                    *
 *                                                                     *
 *  FUNCTIONS CONTAINED : re_locked()                                  *
 *                                                                     *
 *  DATA STRUCTURES     :                                              *
 *                                                                     *
 *  COMPONENT HISTORY   :                                              *
 *  ------------------------------------------------------------------ *
 *  24 OCT 1988 - RD - Creation                                        *
 *                                                                     *
 ***********************************************************************/
```

```
#include <pam_com.h>

int re_locked( requestor, eq_name )
char    *requestor;
char    *eq_name;
{
        char    fields[LINE_LENGTH];

        /*
         * Do request.
         */

        sprintf( fields, "%s;%s;", requestor, eq_name );

        return( PPrequest( I_RE_LOCKED, fields, ees_name, NULL, NULL,
                60, 0 ) );

} /* End of re_locked() */


/****************************************************************************
 * @(#)re_secured.c     1.2  I/A Series  Foxboro Company  89/08/17
 ****************************************************************************
 *                                                                          *
 *  Copyright by the Foxboro Company 1988                                   *
 *                                                                          *
 *  All rights reserved Foxboro Company 1988                                *
 *                                                                          *
 **80************************************************************************
 *                                                                          *
 *  FILE NAME           : re_secured.c                                      *
 *                                                                          *
 *  PART NUMBER         :                                                   *
 *                                                                          *
 *  FUNCTION            : Handle re_secured request.                        *
 *                                                                          *
 *  FUNCTIONS CONTAINED : re_secured()                                      *
 *                                                                          *
 *  DATA STRUCTURES     :                                                   *
 *                                                                          *
 *  COMPONENT HISTORY   :                                                   *
 *  ---------------------------------------------------------------------  *
 *  24 OCT 1988 - RD - Creation                                             *
 *                                                                          *
 ****************************************************************************/

#include <pam_com.h>

int re_secured( requestor, eq_name )
char    *requestor;
char    *eq_name;
{
        char    fields[LINE_LENGTH];

        /*
         * Do request.
         */

        sprintf( fields, "%s;%s;", requestor, eq_name );

        return( PPrequest( I_RE_SECURED, fields, ees_name, NULL, NULL,
                60, 0 ) );

} /* End of re_secured() */


/****************************************************************************
 * @(#)release_p.c      1.2  I/A Series  Foxboro Company  89/08/17
 ****************************************************************************
 *                                                                          *
 *  Copyright by the Foxboro Company 1988                                   *
 *                                                                          *
 *  All rights reserved Foxboro Company 1988                                *
 *                                                                          *
 **80************************************************************************
 *                                                                          *
 *  FILE NAME           : release_p.c                                       *
 *                                                                          *
 *  PART NUMBER         :                                                   *
 *
```

```
 *  FUNCTION            : Handle release_p request.                       *
 *                                                                        *
 *  FUNCTIONS CONTAINED : release_p()                                     *
 *                                                                        *
 *  DATA STRUCTURES     :                                                 *
 *                                                                        *
 *  COMPONENT HISTORY   :                                                 *
 *  ----------------------------------------------------------------      *
 *  24 OCT 1988 - RD - Creation                                           *
 *  03 NOV 1988 - RD - Added key to message                               *
 *  11 NOV 1988 - RD - Changed destination to chg_name                    *
 *                                                                        *
 **************************************************************************/

#include <pam_com.h>


int release_p( requestor, path_name, path_key )
char    *requestor;
char    *path_name;
char    *path_key;
{
        char    fields[LINE_LENGTH];


        /*
         * Do request.
         */

        sprintf( fields, "%s;%s;%s;", requestor, path_name, path_key );

        return( PPrequest( I_RELEASE_P, fields, chg_name, NULL, NULL,
                120, 0 ) );

} /* End of release_p() */


/**************************************************************************
 * @(#)request.c        1.2  I/A Series  Foxboro Company  89/08/17
 **************************************************************************
 *                                                                        *
 *  Copyright by the Foxboro Company 1988                                 *
 *                                                                        *
 *  All rights reserved Foxboro Company 1988                              *
 *                                                                        *
 *-80*********************************************************************
 *                                                                        *
 *  FILE NAME           : request.c                                       *
 *                                                                        *
 *  PART NUMBER         :                                                 *
 *                                                                        *
 *  FUNCTION            : Handle PAM function requests.                   *
 *                                                                        *
 *  FUNCTIONS CONTAINED : PPrequest()                                     *
 *                                                                        *
 *  DATA STRUCTURES     :                                                 *
 *                                                                        *
 *  COMPONENT HISTORY   :                                                 *
 *  ----------------------------------------------------------------      *
 *  24 OCT 1988 - RD - Creation                                           *
 *  11 AUG 1989 - RD - Do not use ali_name anymore                        *
 *  14 AUG 1989 - RD - Fixed reference in case of TESTING                 *
 *                                                                        *
 **************************************************************************/

#include <pam_com.h>


int PPrequest( type, input, destination, val1, val2, to1, to2 )
int     type;                   /* Message type          */
char    *destination;           /* Destination ap_name   */
char    *input;                 /* Input fields          */
char    *val1;                  /* Output value 1        */
char    *val2;                  /* Output value 2        */
int     to1;                    /* Time-out 1            */
int     to2;                    /* Time-out 2            */
{
        int     rc;             /* Return code           */
        int     sz;             /* Size of message       */
        int     ty;             /* Type of message       */
        int     er;             /* Error in message      */
        int     to;             /* Time-out value        */
```

```
        static int no = 1;      /* Message number        */

        char    *pt;            /* Pointer in message    */

        char msg[BUFFER_SIZE];  /* Message buffer        */
        char src[IPC_NAME_LEN]; /* Source name           */
        char ref_in[LINE_LENGTH];       /* Reference field      */
        char ref_out[IPC_NAME_LEN];     /* Reference field      */
        to = 5*to1;


        /*
         * Build and send message.
         */

#ifdef TESTING
        strcpy( ref_out, "ref" );
#else
        sprintf( ref_out, "%u_%u", getpid(), no++ );
#endif
        sprintf( msg, "%s;%d;", ref_out, type );
        strcat( msg, input );

        rc = PPsnd_msg( msg, destination, strlen( msg ) + 1 );
        if ( rc != PAN_OK ) return( P_CONN_ERROR );


        /*
         * Receive and process messages until timeout or a valid
         * message has arrived.
         */

        while ( TRUE )
        {
                rc = PPrcv_msg( msg, src, &sz, to );
                if ( rc == E_TIME_OUT ) return( P_TIME_OUT );
                if ( rc != PAN_OK ) return( P_CONN_ERROR );

                pt = PPget_srm( msg, ref_in, &ty, &er );
                if ( ( pt != NULL ) &&
                     ( strcmp( ref_in, ref_out ) == 0 ) &&
                     ( ty == type + 1 ) )
                {
                        /*
                         * Valid message received.
                         */

                        if ( er == P_IN_PROGRESS )
                        {
                                /*
                                 * In progress message received,
                                 * wait for next message with time-out.
                                 */

                                to = 5*to2;
                        }
                        else if ( er == PAN_OK )
                        {
                                if ( val1 != NULL )
                                {
                                        pt = PPget_fld( pt, val1, 256 );
                                        if ( val2 != NULL )
                                        {
                                                pt = PPget_fld( pt, val2, 256 );
                                        }

                                        if ( pt == NULL )
                                        {
                                                return( P_CONN_ERROR );
                                        }
                                }

                                return( er );
                        }
                        else
                        {
                                return( er );

                        } /* End of if ( in progress ) */

                } /* End of if ( valid message ) */

        } /* End of while */

} /* End of PPrequest() */
```

```
/****************************************************************************
*  @(#)select_p.c       1.2  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**&0*************************************************************************
*                                                                           *
*  FILE NAME            : select_p.c                                        *
*                                                                           *
*  PART NUMBER          :                                                   *
*                                                                           *
*  FUNCTION             : Handle select_p request.                          *
*                                                                           *
*  FUNCTIONS CONTAINED  : select_p()                                        *
*                                                                           *
*  DATA STRUCTURES      :                                                   *
*                                                                           *
*  COMPONENT HISTORY    :                                                   *
*  ---------------------------------------------------------------------   *
*  24 OCT 1988 - RD - Creation                                              *
*  03 NOV 1988 - RD - Added requestor as argument for iz_path()             *
*  11 NOV 1988 - RD - Changed destination to sel_name                       *
*  30 DEC 1988 -AAM - Added terminating semi-colon (;) to message.          *
*                                                                           *
****************************************************************************/

#include <pam_com.h>

int select_p( requestor, environmt, criteria, path_name, path_key )
char    *requestor;
char    *environmt;
char    *criteria;
char    *path_name;
char    *path_key;
{
        char    fields[BUFFER_SIZE];
        int     rc;


        /*
         * Do request.
         */

        sprintf( fields, "%s;%s;%s;", requestor, environmt, criteria );

        rc = PPrequest( I_SELECT_P, fields, sel_name, path_name, path_key,
                        60, 300 );

        if ( rc == PAM_OK )
        {
                rc = iz_path( requestor, path_name, path_key );
                if ( rc == P_NO_INITIALIZE )
                {
                        rc = PAM_OK;
                }
                else if ( rc != PAM_OK )
                {
                        rc = P_INIT_FAILED;
                }
        }

        return( rc );

} /* End of select_p() */

/****************************************************************************
*  @(#)step_p.c 1.2  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**&0*************************************************************************
*                                                                           *
*  FILE NAME            : step_p.c                                          *
*                                                                           *
*  PART NUMBER          :                                                   *
*                                                                           *
*  FUNCTION             : Handle step_p request.                            *
*                                                                           *
```

```
 * FUNCTIONS CONTAINED : step_p()                                        *
 *                                                                      *
 * DATA STRUCTURES     :                                                *
 *                                                                      *
 * COMPONENT HISTORY   :                                                *
 * ------------------------------------------------------------------- *
 * 24 OCT 1988 - RD - Creation                                          *
 *                                                                      *
 ***********************************************************************/

#include <pam_com.h>


int step_p( requestor, path_name, path_key, from_step, to_step, no_steps )
char    *requestor;
char    *path_name;
char    *path_key;
int     from_step;
int     to_step;
int     no_steps;
{
        char    fields[LINE_LENGTH];


        /*
         * Do request.
         */

        sprintf( fields, "%s;%s;%d;%d;%d;", requestor, path_name,
                from_step, to_step, no_steps );

        return( PPrequest( I_STEP_P, fields, path_key, NULL, NULL, 30, 0 ) );

} /* End of step_p() */


/***********************************************************************
 * @(#)ue_use.c 1.2  I/A Series  Foxboro Company  89/08/17
 ***********************************************************************
 *                                                                     *
 * Copyright by the Foxboro Company 1988                               *
 *                                                                     *
 * All rights reserved Foxboro Company 1988                            *
 *                                                                     *
 **%0*******************************************************************
 *                                                                     *
 * FILE NAME           : ue_use.c                                      *
 *                                                                     *
 * PART NUMBER         :                                               *
 *                                                                     *
 * FUNCTION            : Handle ue_use request.                        *
 *                                                                     *
 * FUNCTIONS CONTAINED : ue_use()                                      *
 *                                                                     *
 * DATA STRUCTURES     :                                               *
 *                                                                     *
 * COMPONENT HISTORY   :                                               *
 * ------------------------------------------------------------------ *
 * 24 OCT 1988 - RD - Creation                                         *
 *                                                                     *
 ***********************************************************************/

#include <pam_com.h>


int ue_use( requestor, eq_name )
char    *requestor;
char    *eq_name;
{
        char    fields[LINE_LENGTH];


        /*
         * Do request.
         */

        sprintf( fields, "%s;%s;", requestor, eq_name );

        return( PPrequest( I_UE_USE, fields, ees_name, NULL, NULL,
                60, 0 ) );

} /* End of ue_use() */
```

```
#***********************************************************************
#  @(#)chsrv.mk 1.3  I/A Series  Foxboro Company  89/08/17
#***********************************************************************
#                                                                      *
#  Copyright by the Foxboro Company 1988                               *
#                                                                      *
#  All rights reserved Foxboro Company 1988                            *
#                                                                      *
#***********************************************************************
#                                                                      *
#  FILE NAME          : chsrv.mk                                       *
#                                                                      *
#  PART NUMBER        :                                                *
#                                                                      *
#  FUNCTION           : Makefile for PAM Change Server.                *
#                                                                      *
#  COMPONENT HISTORY :                                                 *
#  ------------------------------------------------------------------  *
#  20 SEP 1988 - AM - Created.                                         *
#  09 DEC 1988 - GM - Load with -z to save space.                      *
#  04 JUL 1989 - RD - Adapted to standard layout.                      *
#  11 AUG 1989 - RD - Link CL.                                         *
#                                                                      *
#***********************************************************************

PREFIX  =       /usr/pam

HDRDIR  =       $(PREFIX)/header

BINDIR  =       $(PREFIX)/bin

LIBDIR  =       $(PREFIX)/lib

OBJDIR  =       $(PREFIX)/chsrv/obj

SRCDIR  =       $(PREFIX)/chsrv/source

LIBPAM  =       $(LIBDIR)/libpam.a

LIBCOM  =       -lcom

LIBPSRS =       $(LIBDIR)/psrs.a

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h\
                $(HDRDIR)/psrs.h\
                $(HDRDIR)/seldef.h

OBJECTS =       $(OBJDIR)/chsrv.o

TARGET  =       $(BINDIR)/chsrv

CFLAGS  =       -I$(HDRDIR) -c

LFLAGS  =       -i -z


$(TARGET):      $(OBJECTS) $(LIBPAM) $(LIBPSRS)
                cc $(LFLAGS) $(OBJECTS) $(LIBPSRS) $(LIBPAM) $(LIBCOM) -lpream \
                   -lisam -lfox -o $(TARGET)

$(OBJDIR)/chsrv.o:      $(SRCDIR)/chsrv.c $(HEADERS)
                        cc $(CFLAGS) $(SRCDIR)/chsrv.c
                        mv chsrv.o $(OBJDIR)


/***********************************************************************
*  @(#)chsrv.c  1.2  I/A Series  Foxboro Company  89/08/17
************************************************************************
*                                                                      *
*  Copyright by the Foxboro Company 1988                               *
*                                                                      *
*  All rights reserved Foxboro Company 1988                            *
*                                                                      *
************************************************************************
*                                                                      *
*  FILE NAME          : chsrv.c                                        *
*                                                                      *
*  PART NUMBER        :                                                *
*                                                                      *
*  FUNCTION           : Change Server of PAM PSRS.                     *
*                                                                      *
```

```
 *  COMPONENT HISTORY :                                                      *
 *  ----------------------------------------------------------------------  *
 *  20 SEP 1988 - AAN - created                                              *
 *  22 DEC 1988 - AAN - main()                                               *
 *                      initialize()                                         *
 *  06 JAN 1989 - AAN - g_ap_name()                                          *
 *  16 JAN 1989 - AAN - initialize()                                         *
 *  04 JUL 1989 - RRD - main()                                               *
 *  11 AUG 1989 - RRD - make use of CL functions                             *
 *  12 AUG 1989 - RRD - make use of PPini_ipc and PPstp_ipc                  *
 *  14 AUG 1989 - RRD - no object for ap_name and load_alias                 *
 *  16 AUG 1989 - RRD - free_path()                                          *
 *                                                                           *
 ****************************************************************************/

#include        <pam_com.h>
#include        <isam.h>
#include        <fox/pream.h>
#include        <psrs.h>
#include        <sys/utsname.h>
#include        <fox/cl_errors.h>

char user_alias[UE_LEN +1],
     load_alias[UE_LEN +1];

char r_msg[BUFFER_SIZE +1],
     s_msg[BUFFER_SIZE +1],
     xap_name[UE_LEN +1],
     source[UE_LEN +1],
     msg_ref[LINE_LENGTH +1];

char *event_arg[10];

unsigned int refno = 0;

/* Local functions. */
void ch_driver(), co_mode(), cp_status(), fill_sp(),
     free_path(), release_p(), send_rsp();
char *rcv_rq();
/* External functions. */

/* External data */
extern char path_env[];


/****************************************************************************
 *  @(#)chsrv.c  1.2  I/A Series  Foxboro Company  89/08/17
 ****************************************************************************
 *                                                                          *
 *  Copyright by the Foxboro Company 1988                                   *
 *                                                                          *
 *  All rights reserved Foxboro Company 1988                                *
 *                                                                          *
 **$1************************************************************************
 *
 *  NAME              : main
 *
 *  FUNCTION          : Change Server Main function.
 *
 *  INPUT  PARAMETERS : argc  - number of arguments
 *                      argv  - list of arguments:
 *                              0: chsrv progr. name.
 *                              1: PAN data base directory name.
 *
 *  OUTPUT PARAMETERS :
 *
 *  RETURN VALUES     :
 *
 *  SYNOPSIS          : main( argc, argv )
 *                      int argc, *char argv[];
 *
 *  COMPONENT HISTORY :
 *  -------------------------------------------------------------------------
 *  20 SEP 1988 - AAN - created
 *  22 DEC 1988 - AAN - removed xap_name from argument list ( use: get_cfg() )
 *  04 JUL 1989 - RRD - added setbuf() in case of testing
 *
 ****************************************************************************/
main( argc, argv )

int  argc;
char *argv[];

{
   int res;
```

```
#ifdef TESTING
   setbuf( stdout, 0 );
#endif

   dprintf(("**** main ****\n"));

   /* Initialize. */
   if( argc != 2 )
   {
      CLerr_rpt( PAM, PE_INV_ARGUMENTS, "??ch_srv??", "main - invocation" );
      return(1);
   }
   res = initialize( argv[1] );
   if( res == PAM_OK )
   {
      ch_driver();
   }

   PPstp_ipc( res );
}


/*************************************************************************
 * @(#)chsrv.c  1.2  I/A Series  Foxboro Company  89/08/17
 *************************************************************************
 *                                                                       *
 *  Copyright by the Foxboro Company 1988                                *
 *                                                                       *
 *  All rights reserved Foxboro Company 1988                             *
 *                                                                       *
 **$2*********************************************************************
 *
 *  NAME              : ch_driver
 *
 *  FUNCTION          : Change Server ch_driver function.
 *
 *  INPUT  PARAMETERS :
 *
 *  OUTPUT PARAMETERS :
 *
 *  RETURN VALUES     :
 *
 *  SYNOPSIS          : void ch_driver( )
 *
 *  COMPONENT HISTORY :
 *  ---------------------------------------------------------------------
 *  20 SEP 1988 - AAM - created
 *
 *************************************************************************/
void ch_driver()

{
   char *rq;
   int  type;

   dprintf(("**** ch_driver ****\n"));

   while( TRUE )
   {
      rq = rcv_rq( &type );
      switch( type )
      {
         case -1:
            return;

         case I_RELEASE_P:
            release_p( rq );
            break;

         case I_CO_MODE:
            co_mode( rq );
            break;

         case I_CP_STATUS:
            cp_status( rq );
            break;
           default:
              /* Invalid message type. */
              CLerr_rpt( PAM, PE_INV_MESSAGE, xap_name, "ch_driver" );
              break;

      }
   }
}
```

```
/*********************************************************************
* @(#)chsrv.c  1.2  I/A Series  Foxboro Company  89/08/17
**********************************************************************
*                                                                    *
*  Copyright by the Foxboro Company 1988                            *
*                                                                    *
*  All rights reserved Foxboro Company 1988                         *
*                                                                    *
**&2******************************************************************
*
*  NAME              : co_mode
*
*  FUNCTION          : Update the path mode of a copas record.
*
*  INPUT  PARAMETERS : rq  - request
*
*  OUTPUT PARAMETERS :
*
*  RETURN VALUES     :
*
*  SYNOPSIS          : void co_mode( rq )
*                      char *rq;
*
*  COMPONENT HISTORY :
*  -------------------------------------------------------------------
*  20 SEP 1988 - AAN - created
*
*********************************************************************/
void co_mode( rq )

char *rq;

{
   char requestor[ST_FLD_SZ +1],
        path_name[ST_FLD_SZ +1],
        mode[2];

   dprintf(("**** co_mode ****\n"));

   if( (rq = PPget_fld( rq, requestor, ST_FLD_SZ )) == (char *) NULL ||
       strlen( requestor ) == 0 )
   {
     send_rsp( O_CO_MODE, P_INV_REQUESTOR );
     return;
   }

   if( (rq = PPget_fld( rq, path_name, ST_FLD_SZ )) == (char *) NULL ||
       strlen( path_name ) == 0 )
   {
     send_rsp( O_CO_MODE, P_INV_PATH_NAME );
     return;
   }

   if( (rq = PPget_fld( rq, mode, 1 )) == (char *) NULL )
   {
      send_rsp( O_CO_MODE, P_INV_MODE );
      return;
   }

   if( mode[0] != AUTO && mode[0] != MANUAL )
   {
      send_rsp( O_CO_MODE, P_INV_MODE );
      return;
   }

   if( A030_ru_COPAS( path_name, "operation_mode", mode ) != PAM_OK )
   {
      send_rsp( O_CO_MODE, P_INV_PATH_NAME );
      return;
   }

   event_arg[0] = requestor;
   event_arg[1] = path_name;
   event_arg[2] = mode;

   PPlog_event( E_CO_MODE, path_env, event_arg );

   send_rsp( O_CO_MODE, PAM_OK );

}
```

```
/**********************************************************************
* @(#)chsrv.c  1.2  I/A Series  Foxboro Company  89/08/17
***********************************************************************
*                                                                     *
* Copyright by the Foxboro Company 1988                               *
*                                                                     *
* All rights reserved Foxboro Company 1988                            *
*                                                                     *
**&2*******************************************************************
*
* NAME              : cp_status
*
* FUNCTION          : Update the path mode of a copas record.
*
* INPUT  PARAMETERS : rq  - request
*
* OUTPUT PARAMETERS :
*
* RETURN VALUES     :
*
* SYNOPSIS          : void cp_status( rq )
*                     char *rq;
*
* COMPONENT HISTORY :
* ---------------------------------------------------------------------
* 20 SEP 1988 - AAM - created
*
**********************************************************************/
void cp_status( rq )

char *rq;

{
   char requestor[ST_FLD_SZ +1],
        path_name[ST_FLD_SZ +1],
        status[2];

   dprintf(("**** cp_status ****\n"));

   if( (rq = PPget_fld( rq, requestor, ST_FLD_SZ )) == (char *) NULL ||
       strlen( requestor ) == 0 )
   {
      send_rsp( O_CP_STATUS, P_INV_REQUESTOR );
      return;
   }

   if( (rq = PPget_fld( rq, path_name, ST_FLD_SZ )) == (char *) NULL ||
       strlen( path_name ) == 0 )
   {
      send_rsp( O_CP_STATUS, P_INV_PATH_NAME );
      return;
   }

   if( (rq = PPget_fld( rq, status, 1 )) == (char *) NULL )
   {
      send_rsp( O_CP_STATUS, P_INV_STATUS );
      return;
   }

   if( status[0] != SELECTABLE && status[0] != N_SELECTABLE )
   {
      send_rsp( O_CP_STATUS, P_INV_STATUS );
      return;
   }

   if( A030_ru_COPAS( path_name, "path_status", status ) != PAM_OK )
   {
      send_rsp( O_CP_STATUS, P_INV_PATH_NAME );
      return;
   }

   event_arg[0] = requestor;
   event_arg[1] = path_name;
   event_arg[2] = status;

   PPlog_event( E_CP_STATUS, path_env, event_arg );

   send_rsp( O_CP_STATUS, PAM_OK );

}
```

```
/*************************************************************************
*  @(#)chsrv.c  1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**s2**********************************************************************
*
*  NAME              : fill_sp
*
*  FUNCTION          : Fills a character array with the specified number of
*                      spaces.
*
*  INPUT  PARAMETERS : fld  - array to be filled
*                      cnt  - number of places to be filled.
*
*  OUTPUT PARAMETERS :
*
*  RETURN VALUES     :
*
*  SYNOPSIS          : void fill_sp( fld, cnt )
*                      char fld[];
*                      int  cnt;
*
*  COMPONENT HISTORY :
*  -----------------------------------------------------------------------
*  20 SEP 1988 - AAN - created
*
*************************************************************************/
void fill_sp( fld, cnt )

char fld[];
int  cnt;

{
   int i;

   dprintf(("**** fill_sp ****\n"));

   for( i = 0; i < cnt; i++ )
   {
      fld[i] = ' ';
   }
}


/*************************************************************************
*  @(#)chsrv.c  1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**s2**********************************************************************
*
*  NAME              : free_path
*
*  FUNCTION          : Free the path at the PAC.
*
*  INPUT  PARAMETERS : p_key      - path key ( PAC xap_name )
*                      path_name
*
*  OUTPUT PARAMETERS : op_type - type of operation
*                      oper    - current path operation name
*
*  RETURN VALUES     : PANOK
*                      NOT PANOK
*
*  SYNOPSIS          : void free_path( p_key, path_name, op_type, oper )
*                      char *p_key, *path_name, *op_type, *oper;
*
*  COMPONENT HISTORY :
*  -----------------------------------------------------------------------
*  20 SEP 1988 - AAN - created
*  16 AUG 1989 - RRD - lock/unlock PAC table to prevent clashes with selsrv
*
*************************************************************************/
void free_path( p_key, path_name, op_type, oper )

char *p_key, *path_name, *op_type, *oper;
```

```
{
  char msg[BUFFER_SIZE +1],
       *p_msg;
  char src[ST_FLD_SZ +1],
       ref[LINE_LENGTH +1],
       type[ 6 +1 ],
       err_code[ 6 +1 ],
       err_str[40];
  bool received = FALSE;
  int t_refno = refno++,
      res = 0;
  int size;

  dprintf(("**** free_path ****\n"));

  CLchg_ali( load_alias );

  A530_lt_PAC();

  sprintf( msg, "%d;%d;%s;", t_refno, I_PAC_FREE, path_name );

  if( (res = CLsnd_msg( msg, p_key, strlen(msg) + 1 )) != CL_OK )
  {
     sprintf( err_str, "free_path - PAC free error: %d", res );
     CLerr_rpt( PAN, PE_SEND, xap_name, err_str );
     strcpy( op_type, "" );
     strcpy( oper, "" );
  }
  else
  {
     while( !received )
     {
        if( (res = CLrcv_msg( msg, src, &size, 60 )) != CL_OK )
        {
           sprintf( err_str, "free_path - PAC free error: %d", res );
           CLerr_rpt(PAN, PE_RECEIVE, xap_name, err_str );
           strcpy( op_type, "" );
           strcpy( oper, "" );
           received = TRUE;
        }

        else
        {
           p_msg = PPget_fld( msg, ref, LINE_LENGTH );
           p_msg = PPget_fld( p_msg, type, 6 );
           p_msg = PPget_fld( p_msg, err_code, 6 );

           if( t_refno == atoi( ref ) && O_PAC_FREE == atoi( type )
                                 && strcmp( src, p_key ) == 0 )
           {
              if( (res = atoi( err_code )) != PAN_OK )
              {
                 sprintf( err_str, "free_path - PAC free error: %d", res );
                 CLerr_rpt( PAN, PE_FATAL_ERROR, xap_name, err_str );
                 strcpy( op_type, "" );
                 strcpy( oper, "" );
              }

              else
              {
                 p_msg = PPget_fld( p_msg, op_type, 6 );
                 p_msg = PPget_fld( p_msg, oper, ST_FLD_SZ );
              }

              received = TRUE;
           }
        }
     }
  }

  /* Decrement the load of the PAC. */
  if( A530_lt_PAC() != PAN_OK || A530_ru_PAC( p_key, -1 ) != PAN_OK )
  {
     CLerr_rpt( PAN, PE_FATAL_ERROR, xap_name,
                   "Cannot decrement pac-load" );

   }
   A530_ul_PAC();
}
```

```
/*****************************************************************************
*                                                                           *
*  Copyright by the Foxboro Company 1988                                    *
*                                                                           *
*  All rights reserved Foxboro Company 1988                                 *
*                                                                           *
**&2*************************************************************************
*                                                                           *
*  FILE NAME            : g_ap_name.c                                       *
*                                                                           *
*  PART NUMBER          :                                                   *
*                                                                           *
*  FUNCTION             : returns ap_name, which is letterbug               *
*                                                                           *
*  FUNCTIONS CONTAINED : g_ap_name()                                        *
*                                                                           *
*  DATA STRUCTURES      :                                                   *
*                                                                           *
*  COMPONENT HISTORY    :                                                   *
*  ------------------------------------------------------------------------ *
*  19 DEC 1988 - AAN - Creation                                             *
*  06 JAN 1989 - AAN - Make ap_name PID independent                         *
*                                                                           *
*****************************************************************************/
g_ap_name(ap_name,base_name)

char *ap_name;

{
   struct utsname sysnames;

   dprintf(("**** g_ap_name ****\n"));

   uname(&sysnames);
   strcpy( ap_name, base_name );
   strcat( ap_name, sysnames.nodename );

}


/*****************************************************************************
*  @(#)chsrv.c  1.2  I/A Series  Foxboro Company  89/08/17
*****************************************************************************
*                                                                           *
*  Copyright by the Foxboro Company 1988                                    *
*                                                                           *
*  All rights reserved Foxboro Company 1988                                 *
*                                                                           *
**&2*************************************************************************
*
*  NAME                 : initialize
*
*  FUNCTION             : Initialisation function for change server.
*
*  INPUT  PARAMETERS : PAN data base directory.
*
*  OUTPUT PARAMETERS :
*
*  RETURN VALUES        : PAN_OK      - Initialization successfull.
*                         NOT PAN_OK - Initialization failure.
*
*  SYNOPSIS             : int initialize( dbdir )
*                         char dbdir[];
*
*  COMPONENT HISTORY :
*  -------------------------------------------------------------------------
*  20 SEP 1988 - AAN - created
*  22 DEC 1988 - AAN - retrieve xap_name via get_cfg();
*  16 JAN 1989 - AAN - xap_name used in CLerr_rpt() before initialized,
*                      replaced by "??chsrv??".
*
****************************************************************************/
int initialize( dbdir )

char dbdir[];

{
   dprintf(("**** initialize ****\n"));

   if( PPget_cfg() != PAN_OK )
   {
      CLerr_rpt( PAN, PE_INIT, "??chsrv??", "configuration file error" );
      return( !PAN_OK );
   }
```

```
/* Set user_alias to chg_name. */
strcpy( user_alias, chg_name );

/* Generate unique ap_name from letterbug and make load_alias.*/
g_ap_name( xap_name, user_alias );
strcat( strcpy( load_alias, xap_name ), "1" );


if( PPini_ipc( xap_name, FALSE, 20 ) == PAN_OK &&
    CLadd_ali( user_alias, TRUE ) == CL_OK &&
     CLadd_ali( load_alias, FALSE ) == CL_OK )
{
   if( chdir( dbdir ) == SUCCESS )
   {
      if( A900_o_COPAS()      == PAN_OK &&
          A901_o_ELEM_COND() == PAN_OK &&
          A905_o_PAC()        == PAN_OK     )
      {
         return( PAN_OK );
      }

      else
      {
         CLerr_rpt( PAN, PE_OPEN_FAIL, xap_name, "initialize" );
      }
   }

   else
   {
      CLerr_rpt( PAN, PE_DBDIR_FAIL, xap_name, "initialize" );
   }
}

else
{
   CLerr_rpt( PAN, PE_INIT, xap_name, "initialize" );
}

return( !PAN_OK );
}


/**********************************************************************
*  @(#)chsrv.c  1.2  I/A Series  Foxboro Company  89/08/17
***********************************************************************
*                                                                     *
*  Copyright by the Foxboro Company 1988                              *
*                                                                     *
*  All rights reserved Foxboro Company 1988                           *
*                                                                     *
**&2*******************************************************************
*
*  NAME              : rcv_rq
*
*  FUNCTION          : Receive message and extract msg reference, msg type and
*                      the actual request.
*
*  INPUT  PARAMETERS :
*
*  OUTPUT PARAMETERS : type   - msg type
*
*  RETURN VALUES     : actual request
*
*  SYNOPSIS          : char *rcv_rq( type )
*                      int  *type;
*
*  COMPONENT HISTORY :
*  -------------------------------------------------------------------
*  20 SEP 1988 - AAN - created
*
**********************************************************************/
char *rcv_rq( type )

int  *type;

{
   char *rq, dummy[20];
   int size;

   dprintf(("**** rcv_rq ****\n"));

   CLchg_ali( user_alias );

   rq = r_msg;
```

```
if( CLrcv_msg( rq.source,&size, 0 ) != CL_OK )
{
   CLerr_rpt( PAN, PE_RECEIVE, xap_name, "rcv_rq" );
   *type = 0;
   return( rq );
}

if( (rq = PPget_fld( rq, msg_ref, LINE_LENGTH )) == (char *) NULL ||
    (rq = PPget_fld( rq, dummy, 6 )) == (char *) NULL )
{
    *type = 0;       /* Invalid message. */
}
   else
      *type = atoi( dummy );

   return( rq );
}

/***************************************************************************
 * @(#)chsrv.c  1.2  I/A Series  Foxboro Company  89/08/17
 ***************************************************************************
 *                                                                         *
 * Copyright by the Foxboro Company 1988                                   *
 *                                                                         *
 * All rights reserved Foxboro Company 1988                                *
 *                                                                         *
 **&2***********************************************************************
 *
 * NAME              : release_p
 *
 * FUNCTION          : Release a selected path.
 *
 * INPUT  PARAMETERS : rq  - release request
 *
 * OUTPUT PARAMETERS :
 *
 * RETURN VALUES     :
 *
 * SYNOPSIS          : void release_p( rq )
 *                     char *rq
 *
 * COMPONENT HISTORY :
 * ------------------------------------------------------------------------
 * 20 SEP 1988 - AAN - created
 *
 **************************************************************************/
void release_p( rq )

char *rq;

{
   int  res = PAN_OK;
   char requestor[ST_FLD_SZ +1],
        path_name[ST_FLD_SZ +1],
        oper_type[ST_FLD_SZ +1],
        path_oper[ST_FLD_SZ +1],
        key[UE_LEN +1];
   char c_owner[ST_FLD_SZ +1],
        c_key[UE_LEN +1],
        ec_elem_name[ST_FLD_SZ +1];
   char usage[2];
   char err_str[50];

   dprintf(("**** release_p ****\n"));

   usage[0] = USAGE;
   usage[1] = '\0';

   /* extract the fields from the release request */
   if( (rq = PPget_fld( rq, requestor, ST_FLD_SZ )) == (char *) NULL ||
                                           strlen( requestor ) == 0 )
   {
      send_rsp( O_RELEASE_P, P_INV_REQUESTOR );
      return;
   }

   if( (rq = PPget_fld( rq, path_name, ST_FLD_SZ )) == (char *) NULL ||
                                           strlen( path_name ) == 0 )
   {
      send_rsp( O_RELEASE_P, P_INV_PATH_NAME );
      return;
   }
```

```
    if( (rq = PPget_fld( rq, key, ST_FLD_SZ )) == (char *) NULL ||
                                                   strlen( key ) == 0 )
    {
       send_rsp( O_RELEASE_P, P_INV_PATH_KEY );
       return;
    }

    res = A020_rl_COPAS( path_name, "owner", "key", c_owner, c_key );
    if( res != PAN_OK )
    {
       send_rsp( O_RELEASE_P, P_INV_PATH_NAME );
       return;
    }

    if( strcmp( requestor, c_owner ) != 0 )
    {
       send_rsp( O_RELEASE_P, P_NOT_OWNER );
       A910_ul_COPAS();
       return;
    }

    if( strcmp( key, c_key ) != 0 )
    {
       send_rsp( O_RELEASE_P, P_INV_PATH_KEY );
       A910_ul_COPAS();
       return;
    }

    res =  A110_r_ELEM_COND( path_name, "" , usage,
                                 "elem_name", ec_elem_name );

    while( res == PAN_OK )
    {
       if( (res = ue_use( path_name, ec_elem_name )) != PAN_OK )
       {
          sprintf( err_str, "Element <%s>, ue_use error <%d>",
               ec_elem_name, res );
          CLerr_rpt( PAN, PE_FATAL_ERROR, xap_name, err_str );
       }
       res = A111_n_ELEM_COND( ec_elem_name );
    }

    free_path( key, path_name, oper_type, path_oper );

    A031_uu_COPAS( "owner", "key", "", "" );
    event_arg[0] = requestor;
    event_arg[1] = path_name;
    event_arg[2] = oper_type;
    event_arg[3] = path_oper;
    event_arg[4] = (char *) NULL;

    PPlog_event( E_RELEASE_P, path_env, event_arg );

    send_rsp( O_RELEASE_P, PAN_OK );
}

/**********************************************************************
* @(#)chsrv.c  1.2  I/A Series  Foxboro Company  89/08/17
***********************************************************************
*                                                                     *
* Copyright by the Foxboro Company 1988                               *
*                                                                     *
* All rights reserved Foxboro Company 1988                            *
*                                                                     *
**&2*******************************************************************
*
* NAME              : send_rsp
*
* FUNCTION          : Send a response message on the latest request.
*
* INPUT  PARAMETERS : type    - msg type
*                     result  - result code
*
* OUTPUT PARAMETERS :
*
* RETURN VALUES     :
*
* SYNOPSIS          : void send_rsp( type, result )
*                     int type, result;
*
* COMPONENT HISTORY :
* --------------------------------------------------------------------
* 20 SEP 1988 - AAM - created
*
*********************************************************************/
```

```
void send_rsp( type, result )

int type, result;

{
   dprintf(("**** send_rsp ****\n"));

   CLchg_ali( user_alias );

   sprintf( s_msg, "%s;%d;%d;", msg_ref, type, result );

   if( CLsnd_msg( s_msg, source, strlen(s_msg) + 1 ) != CL_OK )
   {
      CLerr_rpt( PAM, PE_SEND, xap_name,
                 "send_rsp - cannot send response" );
   }
}
```

```
#***************************************************************************
#  @(#)ees.mk   1.3  I/A Series  Foxboro Company  8/17/89
#***************************************************************************
#                                                                          *
#  Copyright by the Foxboro Company 1988                                   *
#                                                                          *
#  All rights reserved Foxboro Company 1988                                *
#                                                                          *
#*&0************************************************************************
#                                                                          *
#  FILE NAME          : ees.mk                                             *
#                                                                          *
#  PART NUMBER        :                                                    *
#                                                                          *
#  FUNCTION           : Makefile for PAM EES Server.                       *
#                                                                          *
#  COMPONENT HISTORY  :                                                    *
#  ---------------------------------------------------------------------   *
#  11 AUG 1989 - RD - Link CL                                              *
#  24 NOV 1988 - GM - '-z' flag added                                      *
#  31 OCT 1988 - GM - Creation                                             *
#                                                                          *
#***************************************************************************

PREFIX  =       /usr/pam

HDRDIR  =       $(PREFIX)/header

BINDIR  =       $(PREFIX)/bin

LIBDIR  =       $(PREFIX)/lib

OBJDIR  =       $(PREFIX)/ees/obj

SRCDIR  =       $(PREFIX)/ees/source

LIBPAM  =       $(LIBDIR)/libpam.a

LIBCOM  =       -lcom

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h

OBJECTS =       $(OBJDIR)/ees_srv.o\
                $(OBJDIR)/eesfuncs.o

TARGET  =       $(BINDIR)/ees

CFLAGS  =       -I$(HDRDIR) -c


$(TARGET):      $(OBJECTS) $(LIBPAM) $(LIBDIR)/pam_gen.a
                cc $(OBJECTS) $(LIBPAM) $(LIBCOM) $(LIBDIR)/pam_gen.a \
                -lpream -lisam -lfox -i -z -o $(TARGET)

$(OBJDIR)/ees_srv.o:    $(SRCDIR)/ees_srv.c $(HEADERS)
                cc $(CFLAGS) $(SRCDIR)/ees_srv.c
                mv ees_srv.o $(OBJDIR)

$(OBJDIR)/eesfuncs.o:   $(SRCDIR)/eesfuncs.c $(HEADERS)
                cc $(CFLAGS) $(SRCDIR)/eesfuncs.c
                mv eesfuncs.o $(OBJDIR)
```

```
/* ***************************************************************
 * @(#)ees_srv.c        1.2  I/A Series, Foxboro Company   8/17/89
 ****************************************************************
 *
 *  (C) Copyright by Foxboro Company 1988
 *
 *  All rights reserved: Foxboro Company 1988
 *
 **$0**************************************************************
 *
 * FILE ID              : ees_srv.c
 *
 * PART NUMBER          :
 *
 * FUNCTION             : PAM Equipment Element Subsystem server process.
 *
 * FUNCTIONS CONTAINED :
 *
 * DATA STRUCTURES      :
 *
 * COMPONENT HISTORY    :
 *        04 JUL 89, RD, Send '\0' with message.
 *        04 JUL 89, RD, Added setbuf() in case of testing.
 *        22 DEC 88, GM, Read ap_name from configuration file.
 *        15 DEC 88, GM, ge_alarmref() added.
 *        12 DEC 88, GM, sccs_id added.
 *        24 NOV 88, GM, Definition of ees_name removed.
 *                       Initialize val array before every request.
 *        23 SEP 88, GM, Created.
 *
 ************************************************************** */

#include <errno.h>
#include <string.h>
#include <isam.h>
#include <fox/pream.h>
#include <pam_com.h>
#include <pam_log.h>

static char sccs_id[] = "@(#)ees_srv.c  1.2  (89/08/17)";


/* ***************************************************************
 *
 *  (C) Copyright by Foxboro Company 1988
 *
 *  All rights reserved: Foxboro Company 1988
 *
 **$1**************************************************************
 *
 * NAME                 : main
 *
 * FUNCTION             : Receive EES addressed messages and invoke
 *                        required function by switching on the message
 *                        type. Also notify requestor of reception
 *                        and/or completion of the request.
 *
 * INPUT PARAMETERS     : argv[1]  { full pathname of PAM database }
 *
 * OUTPUT PARAMETERS :
 *
 * RETURN CODES         :
 *
 * SYNOPSIS             :
 *
 * PRECONDITIONS        :
 *
 * COMPONENT HISTORY :
 *        23 SEP 88, GM, Created.
 *
 ************************************************************** */

main( argc, argv )
int argc;
char *argv[];
{
   char msg[ BUFFER_SIZE + 1 ],
        err_str[ LINE_LENGTH + 1 ],
        *pt,
        req_id[ IPC_NAME_LEN + 1 ],
        valarr[ 4 ][ PAM_MAX_DATA + 1 ],
        *val[ 5 ],
        ret_param[ PAM_MAX_DATA + 1 ],
        field[ PAM_MAX_DATA + 1 ],
        ref[ LINE_LENGTH + 1 ];
```

```
   int i,
       in_type,
       out_type,
       event_type,
       ret_code,
       size;

#ifdef TESTING
   setbuf( stdout, 0 );
#endif

   /* read ap_name */
   if ( (ret_code = PPget_cfg()) != PAM_OK )
   {
      strcpy( ees_name, "ees" );
      PPstp_ipc( ret_code );
   }

   if ( argc != 2 )
   {
      PPerr_rpt( PAM, PE_INV_ARGUMENTS, ees_name, "" );
      exit( -1 );
   }

   /* initialize IPC communication */
   if ( (ret_code = PPini_ipc( ees_name, 1, 25 )) != PAM_OK )
      PPstp_ipc( ret_code );

   if ( chdir( argv[1] ) != 0 )
   {
      strcpy( err_str, "Venix error: " );
      itoa( errno, err_str + strlen(err_str) );
      PPerr_rpt( PAM, PE_DBDIR_FAIL, ees_name, err_str );
      PPstp_ipc( PAM_OK );
   }

   /*
    * Catch EES requests and translate and forward them to appropriate
    * functions.
    */

   for( ;; )
   {
      for ( i = 0; i < 4; i++ )
         val[i] = valarr[i];

      dprintf(("%s: Waiting for message ...\n", ees_name ));

      if ( PPrcv_msg( msg, req_id, &size, 0 ) == PAM_OK )
      {
         dprintf(("After rcv_msg: req_id=[%s], size=%d\n",req_id,size));
         dprintf(("%s: Message received: [%s]\n", ees_name, msg ));

         ret_code = ~PAM_OK;
         event_type = NULL;
         out_type = O_INVALID;

         if ( (pt = PPget_fld( msg, ref, LINE_LENGTH )) != (char*)NULL &&
              (pt = PPget_fld( pt, field, PAM_INT_LEN )) != (char*)NULL )
         {
            /* now field contains message type: use it for switch */

            dprintf(( "%s: reference = [%s], type = [%s]\n",
                                          ees_name, ref, field ));

            in_type = atoi( field );
            out_type = in_type + 1;
            ret_param[0] ='\0';
            switch( in_type )
            {
               case I_CE_PARAMETER:
                  if ( PPdecode_msg( pt, val ) == 4 )
                     ret_code = PPce_parameter(val[0], val[1], val[2], val[3]);
                  break;

               case I_CE_REFERENCE:
                  if ( PPdecode_msg( pt, val ) == 4 )
                     ret_code = PPce_reference(val[0], val[1], val[2], val[3]);
                  break;
```

```
case I_CE_STATUS:
    if ( PPdecode_msg( pt, val ) == 3 )
        ret_code = PPce_status( val[0], val[1], val[2][0] );
    event_type = E_CE_STATUS;
    break;

case I_CO_PRIVILEGE:
    if ( PPdecode_msg( pt, val ) == 3 )
        ret_code = PPco_privilege( val[0], val[1], val[2][0] );
    break;

case I_CU_SECURED:
    if ( PPdecode_msg( pt, val ) == 2 )
        ret_code = PPcu_secured( val[0], val[1] );
    break;

case I_CU_LOCKED:
    if ( PPdecode_msg( pt, val ) == 2 )
        ret_code = PPcu_locked( val[0], val[1] );
    break;

case I_GE_DESCRIPTN:
    if ( PPdecode_msg( pt, val ) == 1 )
        ret_code = PPge_descriptn( val[0], ret_param );
    break;

case I_GE_PARAMETER:
    if ( PPdecode_msg( pt, val ) == 2 )
        ret_code = PPge_parameter( val[0], val[1], ret_param );
    break;

case I_GE_REFERENCE:
    if ( PPdecode_msg( pt, val ) == 2 )
        ret_code = PPge_reference( val[0], val[1], ret_param );
    break;

case I_GE_STATUS:
    if ( PPdecode_msg( pt, val ) == 1 )
        if ((ret_code = PPge_status(val[0], ret_param)) == PAM_OK)
            ret_param[1] = '\0';
    break;

case I_GE_USAGE:
    if ( PPdecode_msg( pt, val ) == 1 )
        if ((ret_code = PPge_usage(val[0], ret_param)) == PAM_OK)
            ret_param[1] = '\0';
    break;

case I_GE_ALARMREF:
    if ( PPdecode_msg( pt, val ) == 1 )
        ret_code = PPge_alarmref(val[0],ret_param);
    break;

case I_RE_LOCKED:
    if ( PPdecode_msg( pt, val ) == 2 )
        ret_code = PPre_locked( val[0], val[1] );
    break;

case I_RE_SECURED:
    if ( PPdecode_msg( pt, val ) == 2 )
        ret_code = PPre_secured( val[0], val[1] );
    break;

case I_UE_USE:
    if ( PPdecode_msg( pt, val ) == 2 )
        ret_code = PPue_use( val[0], val[1] );
    break;

default: event_type = NULL;
         PPerr_rpt( PAM, PE_INV_MESSAGE, ees_name, "" );
         out_type = O_INVALID;
         break;

   } /* switch */

} /* type field has been read from message */

/* send response message */
if ( out_type != O_INVALID )
{
   strcpy( msg, ref );
   strcat( msg, ";" );
   itoa( out_type, msg + strlen(msg) );
   strcat( msg, ";" );
```

```
            itoa( ret_code, msg + strlen(msg) );
            strcat( msg, ":" );

            if ( ret_param[0] != '\0' )
            {
               strcat( msg, ret_param );
               strcat( msg, ":" );
            }

            if ( PPsnd_msg( msg, req_id, strlen(msg) + 1 ) != PAM_OK )
            {
               strcpy( err_str, "Function result: " );
               itoa( ret_code, err_str + strlen(err_str) );
               PPerr_rpt( PAM, PE_RESULT, ees_name, err_str );
               }
            }

            if ( ret_code == PAM_OK && event_type != NULL )
            {
               /* log event message */
               PPlog_event( event_type, (char*)NULL , val );
            }

         } /* if message received OK */

      } /* forever loop */

   }


   int PPdecode_msg( msg, val )
   char *msg,
        *val[];
   {
      int i = 0;
      char *pt;

      dprintf(( "%s: PPdecode_msg(): msg = [%s]\n", ees_name, msg ));
      pt = msg;

      while ( (pt = PPget_fld(pt; val[i], PAM_MAX_DATA)) != (char*)NULL )
      {
         dprintf(( "%s: PPdecode_msg(): val[%d] = [%s]\n", ees_name, i, val[i] ));
         i++;
      }
      val[i] = (char*)NULL;

      return i;
   }


/* ************************************************************
 *  @(#)eesfuncs.c      1.2  I/A Series, Foxboro Company   8/17/89
 **************************************************************
 *
 *  (C) Copyright by Foxboro Company 1988
 *
 *  All rights reserved: Foxboro Company 1988
 *
 **@0*********************************************************
 *
 * FILE ID             : eesfuncs.c
 *
 * PART NUMBER         :
 *
 * FUNCTION            : PAM Equipment Element Subsystem functions.
 *
 * FUNCTIONS CONTAINED : int PPce_parameter()
 *                       int PPce_reference()
 *                       int PPce_status()
 *                       int PPco_privilege()
 *                       int PPcu_secured()
 *                       int PPcu_locked()
 *                       int PPge_descriptn()
 *                       int PPge_parameter()
 *                       int PPge_reference()
 *                       int PPge_status()
 *                       int PPge_usage()
 *                       int PPge_alarmref()
 *                       int PPre_locked()
 *                       int PPre_secured()
 *                       int PPue_use()
 *
 * DATA STRUCTURES     :
 *
```

```
* COMPONENT HISTORY   :
*       03 JAN 88, GN, ue_use() corrected.
*       15 DEC 88, GN, ge_alarmref() added.
*       12 DEC 88, GN, ce_parameter() corrected for boolean type.
*                      sccs_id added.
*       13 SEP 88, GN, Created.
*
*************************************************************** */

#ifdef DEBUG
#       define dprintf(x)       printf x
#else
#       define dprintf(x)
#endif

#include <stdio.h>
#include <string.h>
#include <isam.h>
#include <fox/pream.h>
#include <pam_gen.h>
#include <pam_err.h>
#include <fox/om_udef.h>

static char sccs_id[] = "@(#)eesfuncs.c 1.2  (89/08/17)";

typedef union
{
   char charval;
   int intval;
   float floatval;
   long longval;
   char strval[ VAR_VALUE_SIZE + 1 ];
} UNITYPE;

/* **************************************************************
 *
 *  (C) Copyright by Foxboro Company 1988
 *
 *  All rights reserved: Foxboro Company 1988
 *
 **&1*************************************************************
 *
 * NAME               : PPce_parameter
 *
 * FUNCTION           : Change equipment parameter.
 *
 * INPUT PARAMETERS   : char *requestor;
 *                      char *eq_name;
 *                      char *par_name;
 *                      char *par_value;
 *
 * OUTPUT PARAMETERS :
 *
 * RETURN CODES       : PAM_OK
 *                      P_INV_EQ_NAME
 *                      P_INV_PAR_NAME
 *                      P_INV_PAR_VALUE
 *                      P_NOT_OWNER
 *                      P_NOT_SECURED
 *
 * SYNOPSIS           : int PPce_parameter( requestor, eq_name, par_name,
 *                                          par_value )
 *
 * PRECONDITIONS      :
 *
 * COMPONENT HISTORY :
 *
 *************************************************************** */

int PPce_parameter( requestor, eq_name, par_name, par_value )
char *requestor,
     *eq_name,
     *par_name,
     *par_value;
{
   P_ISAM_ENTRY p_entry[2],
                opentable();
   char sel[ 2 * PAM_COL_LEN + EQ_NAME_SIZE + VAR_NAME_SIZE + 5 ], *p_sel[3],
        proj[ 4 * PAM_COL_LEN + 4 ], *p_proj[5],
        val[ 4 ][ PAM_MAX_DATA + 1 ], *p_val[5],
        *rts();
```

```
int result = PAM_OK,
    i,
    datalen,
    par_valid;
UNITYPE om_val;
unsigned status;

strcpy( sel, "elem_name=" ); strcat( sel, eq_name );
init_ptr_arr( sel, p_sel );

strcpy( proj, "owner1@default_owner@oper_privilege@usage");
init_ptr_arr( proj, p_proj );

for ( i = 0; i < 4; i++ )
   p_val[i] = val[i];

p_val[5] = (char*)NULL;

p_entry[0] = opentable( "eqe", ISINOUT + ISMANULOCK );

if ( p_entry[0] != (P_ISAM_ENTRY)NULL
   && opencursor( p_entry[0], p_sel, p_proj, IL_TOP ) == IL_SUCCESS
   && fetchcursor( p_entry[0], p_val, IL_FOWD ) == IL_SUCCESS )
{
   /*
    * val[0] == owner1
    * val[1] == default_owner
    * val[2] == oper_privilege
    * val[3] == usage
    */
   if ( val[3][0] == 'S' )
   {
      if ( !strcmp( requestor, rts(val[0]) ) ||
           ( !strcmp( requestor, rts(val[1]) ) &&
            val[2][0] == '1' ) )
      {
         strcpy( sel, "elem_name=" ); strcat( sel, eq_name );
         strcat( sel, "@parameter_name=" ); strcat( sel, par_name );
         init_ptr_arr( sel, p_sel );

         strcpy( p_proj[0], "parameter_type");
         p_proj[1] = (char*)NULL;

         p_entry[1] = opentable( "eqr", ISINOUT + ISMANULOCK );

         if ( p_entry[1] != (P_ISAM_ENTRY)NULL
           && opencursor( p_entry[1], p_sel, p_proj, IL_TOP ) == IL_SUCCESS
           && fetchcursor( p_entry[1], p_val, IL_FOWD ) == IL_SUCCESS )
         {
            switch( val[0][0] )  /* switch on parameter type */
            {
               case 'I': par_valid = PPint_check(par_value, &om_val.intval );
                         datalen = sizeof( int );
                         status = INTEGER;
                         break;

               case 'F': par_valid = PPfloat_check(par_value,&om_val.floatval );
                         datalen = sizeof( float );
                         status = FLOAT;
                         break;

               case 'C': par_valid = PAM_OK;
                         om_val.strval[0] = *par_value;
                         om_val.strval[1] = '\0';
                         datalen = sizeof( char );
                         status = CHARACTER;
                         break;

               case 'S': par_valid = PAM_OK;
                         strcpy( om_val.strval, par_value );
                         datalen = strlen( par_value ) + 1;
                         status = STRING;
                         break;

               case 'B': par_valid = PPbool_check(par_value,&om_val.charval);
                         dprintf(("set bool value to %d\n",om_val.charval));
                         datalen = sizeof( char );
                         status = 5;
                         break;

               case 'L': par_valid = PPlong_check(par_value,&om_val.longval);
                         datalen = sizeof( long );
                         status = OM_LNG_INT;
                         break;
```

```
                  default:  par_valid = P_INV_PAR_VALUE;
                            break;
               }
               if ( par_valid == PAM_OK )
               {
                  /* set equipment parameter to new value */
                  result = set_confirm( par_name, VARIABLE, 0,
                              (char*)&om_val, &status, datalen );
               }
               else
                  result = P_INV_PAR_VALUE;
            }
            else
               result = (isliberr == ENOREC || isliberr == EENDFILE ?
                        P_INV_PAR_NAME : isliberr);
         }
         else
            result = P_NOT_OWNER;
      }
      else
         result = P_NOT_SECURED;
   }
   else
      result = (isliberr == ENOREC || isliberr == EENDFILE ?
               P_INV_EQ_NAME : isliberr);

   return result;
}


/* ******************************************************************
 *
 *  (C) Copyright by Foxboro Company 1988
 *
 *  All rights reserved: Foxboro Company 1988
 *
 **$1***********\****************************************************
 *
 * NAME              : PPce_reference
 *
 * FUNCTION          :
 *
 * INPUT PARAMETERS  :
 *
 * OUTPUT PARAMETERS :
 *
 * RETURN CODES      :
 *
 * SYNOPSIS          :
 *
 * PRECONDITIONS     :
 *
 * COMPONENT HISTORY :
 *
 ****************************************************************** */

int PPce_reference( requestor, eq_name, ref_name, ref_value )
{
   return P_NOT_SUPPORTED;
}


/* ******************************************************************
 *
 *  (C) Copyright by Foxboro Company 1988
 *
 *  All rights reserved: Foxboro Company 1988
 *
 **$1****************************************************************
 *
 * NAME              : PPce_status
 *
 * FUNCTION          : Change equipment status.
 *
 * INPUT PARAMETERS  : char *requestor;
 *                     char *eq_name;
 *                     char new_status;
 *
 * OUTPUT PARAMETERS :
 *
 * RETURN CODES      : PAM_OK
 *                     P_INV_EQ_NAME
 *                     P_INV_STATUS
 *
 * SYNOPSIS          : int PPce_status( requestor, eq_name, new_status )
 *
```

```
 * PRECONDITIONS     :
 *
 * COMPONENT HISTORY :
 *
 ****************************************************************** */

int PPce_status( requestor, eq_name, new_status )
char *requestor,
     *eq_name,
     new_status;
{
   P_ISAM_ENTRY p_entry,
                opentable();
   char sel[ PAM_COL_LEN + EQ_NAME_SIZE + 2 ], *p_sel[2],
        *p_proj[1],
        *p_val[1],
        newval[ (PAM_COL_LEN + 2) + ENUM_TYPE_SIZE ],
        *p_newval[2];
   int result = PAM_OK,
       i;

   if ( new_status == 'N' || new_status == 'U' )
   {
      strcpy( sel, "elem_name=" ); strcat( sel, eq_name );
      init_ptr_arr( sel, p_sel );

      p_proj[0] = (char*)NULL;
      p_val[0] =(char*)NULL;

      p_entry = opentable( "eqs", ISINOUT + ISMANULOCK );

      if ( p_entry != (P_ISAM_ENTRY)NULL

         && opencursor( p_entry, p_sel, p_proj, IL_TOP ) == IL_SUCCESS
         && fetchcursor( p_entry, p_val, IL_FOWD ) == IL_SUCCESS )
      {
         /* change status value */
         strcpy( newval, "eq_status=" );
         newval[ strlen(newval)+1 ] = '\0';
         newval[ strlen(newval) ] = new_status;
         init_ptr_arr( newval, p_newval );
         if ( lock_table( p_entry ) != IL_SUCCESS ||
            upd_curr( p_entry, p_newval ) != IL_SUCCESS )

            result = isliberr;

         unlock_table( p_entry );
      }
      else
         result = (isliberr == ENOREC || isliberr == EENDFILE ?
                  P_INV_EQ_NAME : isliberr);
   }
   else
      result = P_INV_STATUS;

   return result;
}


/* ******************************************************************
 *
 *  (C) Copyright by Foxboro Company 1988
 *
 *  All rights reserved: Foxboro Company 1988
 *
 **$1****************************************************************
 *
 * NAME              : PPco_privilege
 *
 * FUNCTION          : Give or deny default_owner privilege to set
 *                     (overrule) equipment parameters/references.
 *
 * INPUT PARAMETERS  : char *requestor;
 *                     char *eq_name;
 *                     char new_priv;
 *
 * OUTPUT PARAMETERS :
 *
 * RETURN CODES      : PAM_OK
 *                     P_INV_EQ_NAME
 *                     P_INV_PRIVILEGE
 *                     P_NOT_OWNER
 *                     P_NOT_SECURED
 *
 * SYNOPSIS          : int PPco_privilege( requestor, eq_name, new_priv )
```

```
 *
 * PRECONDITIONS     :
 *
 * COMPONENT HISTORY :
 *
 ************************************************************** */

int PPco_privilege( requestor, eq_name, new_priv )
{
  return P_NOT_SUPPORTED;
}

/* ****************************************************************
 *
 *  (C) Copyright by Foxboro Company 1988
 *
 *  All rights reserved: Foxboro Company 1988
 *
 **&1**************************************************************
 *
 * NAME              : PPcu_secured
 *
 * FUNCTION          : Change usage of equipment from locked into
 *                     secured.
 *
 * INPUT PARAMETERS  : char *requestor;
 *                     char *eq_name;
 *
 * OUTPUT PARAMETERS :
 *
 * RETURN CODES      : PAM_OK
 *                     P_INV_EQ_NAME
 *                     P_NOT_OWNER
 *                     P_MORE_OWNERS
 *                     P_NOT_LOCKED
 *
 * SYNOPSIS          : int PPcu_secured( requestor, eq_name )
 *
 * PRECONDITIONS     :
 *
 * COMPONENT HISTORY :
 *
 ************************************************************** */

int PPcu_secured( requestor, eq_name )
 char *requestor,
      *eq_name;
{
   P_ISAM_ENTRY p_entry,
                opentable();
   char sel[ PAM_COL_LEN + EQ_NAME_SIZE + 2 ], *p_sel[2],
        proj[ 3 * PAM_COL_LEN + 3 ], *p_proj[4],
        val[ 3 ][ PAM_MAX_DATA + 1 ], *p_val[4],
        newval[ (PAM_COL_LEN + 2) + ENUM_TYPE_SIZE ],
        *p_newval[2],
        *rts();
   int result = PAM_OK,
       i;

   strcpy( sel, "elem_name=" ); strcat( sel, eq_name );
   init_ptr_arr( sel, p_sel );

   strcpy( proj, "owner_count@owner1@usage");
   init_ptr_arr( proj, p_proj );

   for ( i = 0; i < 3; i++ )
      p_val[i] = val[i];
      p_val[3] = (char*)NULL;

      p_entry = opentable( "eqe", ISINOUT + ISMANULOCK );

      if ( p_entry != (P_ISAM_ENTRY)NULL
         && opencursor( p_entry, p_sel, p_proj, IL_TOP ) == IL_SUCCESS
         && fetchcursor( p_entry, p_val, IL_FOWD ) == IL_SUCCESS )
      {
         /*
          * val[0] == owner_count
          * val[1] == owner1
          * val[2] == usage
          */
         if ( val[2][0] == 'L' )
            if ( atoi( val[0] ) == 1 )
               if ( !strcmp( requestor, rts(val[1]) ) )
               {
```

```
               /* set usage secured */
               strcpy( newval, "usage=S" );
               init_ptr_arr( newval, p_newval );
               if ( lock_table( p_entry ) != IL_SUCCESS ||
                  upd_curr( p_entry, p_newval ) != IL_SUCCESS )

                  result = isliberr;

               unlock_table( p_entry );
            }
            else
               result = P_NOT_OWNER;
         else
            result = P_MORE_OWNERS;
      else
         result = P_NOT_LOCKED;
   }
   else
      result = (isliberr == ENOREC || isliberr == EENDFILE ?
               P_INV_EQ_NAME : isliberr);

   return result;
}
```

```
/* ***************************************************************
 *
 *  (C) Copyright by Foxboro Company 1988
 *
 *  All rights reserved: Foxboro Company 1988
 *
```

```
**@1**************************************************************
 *
 * NAME              : PPcu_locked
 *
 * FUNCTION          : Change usage of equipment from secured into
 *                     locked.
 *
 * INPUT PARAMETERS  : char *requestor;
 *                     char *eq_name;
 *
 * OUTPUT PARAMETERS :
 *
 * RETURN CODES      : PAM_OK
 *                     P_INV_EQ_NAME
 *                     P_NOT_OWNER
 *                     P_NOT_SECURED
 *
 * SYNOPSIS          : int PPcu_locked( requestor, eq_name )
 *
 * PRECONDITIONS     :
 *
 * COMPONENT HISTORY :
 *
***************************************************************** */

int PPcu_locked( requestor, eq_name )
char *requestor,
     *eq_name;
{
   P_ISAM_ENTRY p_entry,
                opentable();
   char sel[ PAM_COL_LEN + EQ_NAME_SIZE + 2 ], *p_sel[2],
        proj[ 2 * PAM_COL_LEN + 2 ], *p_proj[3],
        val[ 2 ][ PAM_MAX_DATA + 1 ], *p_val[3],
        newval[ (PAM_COL_LEN + 2) + ENUM_TYPE_SIZE ],
        *p_newval[2],
        *rts();
   int result = PAM_OK,
       i;

   strcpy( sel, "elem_name=" ); strcat( sel, eq_name );
   init_ptr_arr( sel, p_sel );

   strcpy( proj, "owner1@usage");
   init_ptr_arr( proj, p_proj );

   for ( i = 0; i < 2; i++ )
      p_val[i] = val[i];

   p_val[2] = (char*)NULL;
```

```
    p_entry = opentable( "eqe", ISINOUT + ISMANULOCK );

    if ( p_entry != (P_ISAM_ENTRY)NULL
       && opencursor( p_entry, p_sel, p_proj, IL_TOP ) == IL_SUCCESS
       && fetchcursor( p_entry, p_val, IL_FOWD ) == IL_SUCCESS )
    {
       /*
        * val[0] == owner1
        * val[1] == usage
        */
       if ( val[1][0] == 'S' )
       {
          if ( !strcmp( requestor, rts(val[0]) ) )
          {
             /* set usage locked */
             strcpy( newval, "usage=L" );
             init_ptr_arr( newval, p_newval );
             if ( lock_table( p_entry ) != IL_SUCCESS ||
                upd_curr( p_entry, p_newval ) != IL_SUCCESS )

                result = isliberr;

             unlock_table( p_entry );
          }
          else
             result = P_NOT_OWNER;
       }
       else
          result = P_NOT_SECURED;
    }
    else
       result = (isliberr == ENOREC || isliberr == EENDFILE ?
                P_INV_EQ_NAME : isliberr);

    return result;
}

/* ***************************************************************
 *
 * (C) Copyright by Foxboro Company 1988
 *
 * All rights reserved: Foxboro Company 1988
 *
**&1**************************************************************
 *
 * NAME              : PPge_descriptn
 *
 * FUNCTION          :
 *
 * INPUT PARAMETERS  :
 *
 * OUTPUT PARAMETERS :
 *
 * RETURN CODES      :
 *
 * SYNOPSIS          :
 *
 * PRECONDITIONS     :
 *
 * COMPONENT HISTORY :
 *
************************************************************** */

int PPge_descriptn( eq_name, eq_descr )
{
   return P_NOT_SUPPORTED;
}

/* ***************************************************************
 *
 * (C) Copyright by Foxboro Company 1988
 *
 * All rights reserved: Foxboro Company 1988
 *
**&1**************************************************************
 *
 * NAME              : PPge_parameter
 *
 * FUNCTION          :
 *
 * INPUT PARAMETERS  :
 *
 * OUTPUT PARAMETERS :
 *
```

```
* RETURN CODES      :
*
* SYNOPSIS          :
*
* PRECONDITIONS     :
*
* COMPONENT HISTORY :
*
***************************************************************** */

int PPge_parameter( eq_name, par_name, par_value )
{
   return P_NOT_SUPPORTED;
}


/* ****************************************************************
*
*  (C) Copyright by Foxboro Company 1988
*
*  All rights reserved: Foxboro Company 1988
*
**&1**************************************************************
*
* NAME              : PPge_reference
*
* FUNCTION          :
*
* INPUT PARAMETERS  :
*
* OUTPUT PARAMETERS :
*
* RETURN CODES      :
*
* SYNOPSIS          :
*
* PRECONDITIONS     :
*
* COMPONENT HISTORY :
*
***************************************************************** */

int PPge_reference( eq_name, ref_name, ref_value )
{
   return P_NOT_SUPPORTED;
}

/* ****************************************************************
*
*  (C) Copyright by Foxboro Company 1988
*
*  All rights reserved: Foxboro Company 1988
*
**&1**************************************************************
*
* NAME              : PPge_status
*
* FUNCTION          : Get equipment status.
*
* INPUT PARAMETERS  : char *eq_name;
*
* OUTPUT PARAMETERS : char *eq_status;
*
* RETURN CODES      : PAM_OK
                      P_INV_EQ_NAME
*
* SYNOPSIS          : int PPge_status( eq_name, eq_status )
*
* PRECONDITIONS     :
*
* COMPONENT HISTORY :
*
***************************************************************** */

int PPge_status( eq_name, eq_status )
char *eq_name,
     *eq_status;
{
   P_ISAM_ENTRY p_entry,
                opentable();
   char sel[ PAM_COL_LEN + EQ_NAME_SIZE + 2 ], *p_sel[2],
        proj[ PAM_COL_LEN + 1 ], *p_proj[2],
        val[ 1 ][ PAM_MAX_DATA + 1 ], *p_val[2];
   int result = PAM_OK,
       i;
```

```
    strcpy( sel, "elem_name=" ); strcat( sel, eq_name );
    init_ptr_arr( sel, p_sel );

    strcpy( proj, "eq_status");
    init_ptr_arr( proj, p_proj );

    p_val[0] = val[0];
    p_val[1] = (char*)NULL;

    p_entry = opentable( "eqe", ISINOUT + ISMANULOCK );

    if ( p_entry != (P_ISAM_ENTRY)NULL
       && opencursor( p_entry, p_sel, p_proj, IL_TOP ) == IL_SUCCESS
       && fetchcursor( p_entry, p_val, IL_FOWD ) == IL_SUCCESS )
    {
       /*
        * val[0] == eq_status
        */

       /* read status */
       *eq_status = val[0][0];
    }
    else
       result = (isliberr == ENOREC || isliberr == EENDFILE ?
                 P_INV_EQ_NAME : isliberr);

    return result;
}

/* ****************************************************************
 *
 *  (C) Copyright by Foxboro Company 1988
 *
 *  All rights reserved: Foxboro Company 1988
 *
 **&1*************************************************************
 *
 * NAME              : PPge_usage
 *
 * FUNCTION          : Get equipment usage.
 *
 * INPUT PARAMETERS  : char *eq_name;
 *
 * OUTPUT PARAMETERS : char *eq_usage;
 *
 * RETURN CODES      : PAM_OK
 *                     P_INV_EQ_NAME
 *
 * SYNOPSIS          : int PPge_usage( eq_name, eq_usage )
 *
 * PRECONDITIONS     :
 *
 * COMPONENT HISTORY :
 *
 *************************************************************** */

int PPge_usage( eq_name, eq_usage )
char *eq_name,
     *eq_usage;
{
   P_ISAM_ENTRY p_entry,
                opentable();
   char sel[ PAM_COL_LEN + EQ_NAME_SIZE + 2 ], *p_sel[2],
        proj[ PAM_COL_LEN + 1 ], *p_proj[2],
        val[ 1 ][ PAM_MAX_DATA + 1 ], *p_val[2];
   int result = PAM_OK,
       i;

   strcpy( sel, "elem_name=" ); strcat( sel, eq_name );
   init_ptr_arr( sel, p_sel );

   strcpy( proj, "usage");
   init_ptr_arr( proj, p_proj );

   p_val[0] = val[0];
   p_val[1] = (char*)NULL;

   p_entry = opentable( "eqe", ISINOUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOWD ) == IL_SUCCESS )
   {
      /*
       * val[0] == usage
```

```
         */

        /* read usage */
        *eq_usage = val[0][0];
     }
     else
        result = (isliberr == ENOREC || isliberr == EENDFILE ?
                  P_INV_EQ_NAME : isliberr);

     return result;
  }

/* ****************************************************************
 *
 *  (C) Copyright by Foxboro Company 1988
 *
 *  All rights reserved: Foxboro Company 1988
 **$1**************************************************************
 *
 * NAME              : PPge_alarmref
 *
 * FUNCTION          : Get equipment alarm reference.
 *
 * INPUT PARAMETERS  : char *eq_name;
 *
 * OUTPUT PARAMETERS : char *alarm_ref;
 *
 * RETURN CODES      : PAM_OK
 *                     P_INV_EQ_NAME
 *
 * SYNOPSIS          : int PPge_alarmref( eq_name, alarm_ref )
 *
 * PRECONDITIONS     :
 *
 * COMPONENT HISTORY :
 *
 **************************************************************** */

int PPge_alarmref( eq_name, alarm_ref )
char *eq_name,
     *alarm_ref;
{
   P_ISAM_ENTRY p_entry,
                opentable();
   char sel[ PAM_COL_LEN + EQ_NAME_SIZE + 2 ], *p_sel[2],
        proj[ PAM_COL_LEN + 1 ], *p_proj[2],
        val[ 1 ][ PAM_MAX_DATA + 1 ], *p_val[2],
        *rts();
   int result = PAM_OK,
       i;

   strcpy( sel, "elem_name=" ); strcat( sel, eq_name );
   init_ptr_arr( sel, p_sel );

   strcpy( proj, "alarm_ref");
   init_ptr_arr( proj, p_proj );

   p_val[0] = val[0];
   p_val[1] = (char*)NULL;

   p_entry = opentable( "eqe", ISINOUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOND ) == IL_SUCCESS )
   {
      /*
       * val[0] == alarm_ref
       */

      /* read alarm_ref */
      strcpy( alarm_ref, val[0] );
      rts( alarm_ref );
   }
   else
      result = (isliberr == ENOREC || isliberr == EENDFILE ?
                P_INV_EQ_NAME : isliberr);

   return result;
}
```

```
/* ***************************************************************
 *
 *  (C) Copyright by Foxboro Company 1988
 *
 *  All rights reserved: Foxboro Company 1988
 *
 **&1*************************************************************
 *
 * NAME              : PPre_locked
 *
 * FUNCTION          : Lock equipment for owner.
 *
 * INPUT PARAMETERS  : char *requestor;
 *                     char *eq_name;
 *
 * OUTPUT PARAMETERS :
 *
 * RETURN CODES      : PAM_OK
 *                     P_INV_EQ_NAME
 *                     P_ALR_OWNER
 *                     P_EQ_SECURED
 *                     P_EQ_NOT_USABLE
 *                     P_TOO_MANY_OWNERS
 *
 * SYNOPSIS          : int PPre_locked( requestor, eq_name )
 *
 * PRECONDITIONS     :
 *
 * COMPONENT HISTORY :
 *
 ************************************************************** */

int PPre_locked( requestor, eq_name )
char *requestor,
     *eq_name;
{
   P_ISAM_ENTRY p_entry,
                opentable();
   char sel[ PAM_COL_LEN + EQ_NAME_SIZE + 2 ], *p_sel[2],
        proj[ 8 * (PAM_COL_LEN + 1) ], *p_proj[9],
        val[ 8 ][ PAM_MAX_DATA + 1 ], *p_val[9],
        newval[ 3 * (PAM_COL_LEN + 2) + PAM_INT_LEN + OWNER_NAME_SIZE
               + ENUM_TYPE_SIZE ],
        *p_newval[4],
        *rts();
   int result = PAM_OK,
       owner_count,
       i;

   strcpy( sel, "elem_name=" ); strcat( sel, eq_name );
   init_ptr_arr( sel, p_sel );

   strcpy( proj,
        "owner_count@owner1@owner2@owner3@owner4@owner5@usage@eq_status");
   init_ptr_arr( proj, p_proj );

   for ( i = 0; i < 8; i++ )
      p_val[i] = val[i];

   p_val[8] = (char*)NULL;

   p_entry = opentable( "eqe", ISINOUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOUND ) == IL_SUCCESS )
   {
      /*
       * val[0] == owner_count
       * val[1] == owner1
       * val[2] == owner2
       * val[3] == owner3
       * val[4] == owner4
       * val[5] == owner5
       * val[6] == usage
       * val[7] == eq_status
       */
      if ( val[7][0] == 'U' && (val[6][0] == 'N' || val[6][0] == 'L') )
      {
         if ( strcmp( requestor, rts(val[1]) ) &&
              strcmp( requestor, rts(val[2]) ) &&
              strcmp( requestor, rts(val[3]) ) &&
              strcmp( requestor, rts(val[4]) ) &&
              strcmp( requestor, rts(val[5]) ) )
         {
```

```
            owner_count = atoi( val[0] );

            if ( owner_count < 5 )
            {
               /* register owner and set usage locked */
               strcpy( newval, "owner_count=" );
               itoa( ++owner_count, newval + strlen(newval) );
               strcat( newval, "@owner" );
               itoa( owner_count, newval + strlen(newval) );
               strcat( newval, "=" );
               strcat( newval, requestor );
               strcat( newval, "@usage=L" );

               init_ptr_arr( newval, p_newval );
               if ( lock_table( p_entry ) != IL_SUCCESS ||
                  upd_curr( p_entry, p_newval ) != IL_SUCCESS )

                  result = isliberr;

               unlock_table( p_entry );
            }
            else
               result = P_TOO_MANY_OWNERS;
         }
         else
            result = P_ALR_OWNER;
      }

      else
         result = val[6][0] == 'S' ? P_EQ_SECURED : P_EQ_NOT_USABLE;
   }
   else
      result = (isliberr == ENOREC || isliberr == EENDFILE ?
               P_INV_EQ_NAME : isliberr);

   return result;
}

/* ****************************************************************
 *
 * (C) Copyright by Foxboro Company 1988
 *
 * All rights reserved: Foxboro Company 1988
 *
**&1***************************************************************
 *
 * NAME              : PPre_secured
 *
 * FUNCTION          : Secure equipment for owner.
 *
 * INPUT PARAMETERS  : char *requestor;
 *                     char *eq_name;
 *
 * OUTPUT PARAMETERS :
 *
 * RETURN CODES      : PAN_OK
 *                     P_INV_EQ_NAME
 *                     P_ALR_SECURED
 *                     P_EQ_LOCKED
 *                     P_EQ_SECURED
 *                     P_EQ_NOT_USABLE
 *
 * SYNOPSIS          : int PPre_secured( requestor, eq_name )
 *
 * PRECONDITIONS     :
 *
 * COMPONENT HISTORY :
 *
*************************************************************** */

int PPre_secured( requestor, eq_name )
char *requestor,
     *eq_name;
{
   P_ISAM_ENTRY p_entry,
                opentable();
   char sel[ PAN_COL_LEN + EQ_NAME_SIZE + 2 ], *p_sel[2],
        proj[ 4 * (PAN_COL_LEN + 1) ], *p_proj[5],
        val[ 4 ][ PAN_MAX_DATA + 1 ], *p_val[5],
        newval[ 4 * (PAN_COL_LEN + 2) + OWNER_NAME_SIZE +
                PAN_INT_LEN + 3 * ENUM_TYPE_SIZE ],
        *p_newval[5],
        *rts();
   int result = PAN_OK,
       i;
```

```
   strcpy( sel, "elem_name=" ); strcat( sel, eq_name );
   init_ptr_arr( sel, p_sel );

   strcpy( proj, "owner1@default_oper_priv@usage@eq_status");
   init_ptr_arr( proj, p_proj );

   for ( i = 0; i < 4; i++ )
      p_val[i] = val[i];

   p_val[4] = (char*)NULL;

   p_entry = opentable( "eqe", ISINOUT + ISMANULOCK );

   if ( p_entry != (P_ISAM_ENTRY)NULL
      && opencursor( p_entry, p_sel, p_proj, IL_TOP ) == IL_SUCCESS
      && fetchcursor( p_entry, p_val, IL_FOWD ) == IL_SUCCESS )
   {
      /*
       * val[0] == owner1
       * val[1] == default_oper_priv
       * val[2] == usage
       * val[3] == eq_status
       */
      if ( val[3][0] == 'U' && val[2][0] == 'N' )
      {
         /* register owner and set usage secured */

         strcpy( newval, "owner_count=1@owner1=" );
         strcat( newval, requestor );
         strcat( newval, "@oper_privilege=" );
         strcat( newval, val[1] );
         strcat( newval, "@usage=S" );

         init_ptr_arr( newval, p_newval );
         if ( lock_table( p_entry ) != IL_SUCCESS ||
            upd_curr( p_entry, p_newval ) != IL_SUCCESS )

            result = isliberr;

         unlock_table( p_entry );
      }
      else
         if ( val[2][0] == 'S' )
            result = strcmp( requestor, rts(val[0]) ) ?
                     P_EQ_SECURED : P_ALR_SECURED;
         else
            result = val[2][0] == 'L' ? P_EQ_LOCKED : P_EQ_NOT_USABLE;
   }
   else
      result = (isliberr == ENOREC || isliberr == EENDFILE ?
               P_INV_EQ_NAME : isliberr);

   return result;
}

/* ****************************************************************
 *
 * (C) Copyright by Foxboro Company 1988
 *
 * All rights reserved: Foxboro Company 1988
 *
 **&1**************************************************************
 *
 * NAME               : PPue_use
 *
 * FUNCTION           : Unregister an owner that has locked or secured
 *                      the equipment.
 *
 * INPUT PARAMETERS   : char *requestor;
 *                      char *eq_name;
 *
 * OUTPUT PARAMETERS  :
 *
 * RETURN CODES       : PAM_OK
 *                      P_INV_EQ_NAME
 *                      P_NOT_OWNER
 *
 * SYNOPSIS           : int PPue_use( requestor, eq_name )
 *
 * PRECONDITIONS      :
 *
 * COMPONENT HISTORY  :
 *
 ***************************************************************** */
```

```
int PPue_use( requestor, eq_name )
char *requestor,
     *eq_name;
{
   P_ISAM_ENTRY p_entry,
                opentable();
   char sel[ PAM_COL_LEN + EQ_NAME_SIZE + 2 ], *p_sel[2],
        proj[ 7 * (PAM_COL_LEN + 1) ], *p_proj[8],
        val[ 7 ][ PAM_MAX_DATA + 1 ], *p_val[8],
        newval[ 4 * (PAM_COL_LEN + 2) + 2 * OWNER_NAME_SIZE +
                PAM_INT_LEN + ENUM_TYPE_SIZE ],
        *p_newval[5],
        *rts();
   int result = PAM_OK,
       owner_count,
       own_found = 0,
       i;

   strcpy( sel, "elem_name=" ); strcat( sel, eq_name );
   init_ptr_arr( sel, p_sel );

   strcpy( proj, "owner_count@owner1@owner2@owner3@owner4@owner5@usage");
   init_ptr_arr( proj, p_proj );

   for ( i = 0; i < 7; i++ )
      p_val[i] = val[i];

      p_val[7] = (char*)NULL;

      p_entry = opentable( "eqe", ISINOUT + ISMANULOCK );

      if ( p_entry != (P_ISAM_ENTRY)NULL
         && opencursor( p_entry, p_sel, p_proj, IL_TOP ) == IL_SUCCESS
         && fetchcursor( p_entry, p_val, IL_FOUD ) == IL_SUCCESS )
      {
         /*
          * val[0] == owner_count
          * val[1] == owner1
          * val[2] == owner2
          * val[3] == owner3
          * val[4] == owner4
          * val[5] == owner5
          * val[6] == usage
          */
         owner_count = atoi( val[0] );
         for ( i = 1; i <= owner_count; i++ )
            if ( !strcmp( requestor, rts(val[i]) ) )
            {
               own_found = i;
               break;
            }

         if ( own_found > 0 )  /* requestor is registered owner */
         {
            if ( val[6][0] == 'S' )
            {
               /* unregister owner and set usage not-in-use */
               strcpy( newval, "owner_count=0@owner1=@usage=N" );
               init_ptr_arr( newval, p_newval );
               if ( lock_table( p_entry ) != IL_SUCCESS ||
                  upd_curr( p_entry, p_newval ) != IL_SUCCESS )

                  result = isliberr;

               unlock_table( p_entry );
            }

            else   /* usage is 'locked' */
            {
               strcpy( newval, "owner_count=" );
               itoa( owner_count - 1, newval + strlen(newval) );

               strcat( newval, "@owner" );
               itoa( owner_count, newval + strlen(newval) );

               if ( owner_count == 1 )
                  strcat( newval, "=@usage=N" );
               else
               {
                  strcat( newval, "=@usage=L" );

                  if ( own_found != owner_count )
```

```
                {
                   strcat( newval, "@owner" );
                   itoa( own_found, newval + strlen(newval) );
                   strcat( newval, "=" );
                   strcat( newval, val[owner_count] );
                }
             }

             init_ptr_arr( newval, p_newval );
             if ( lock_table( p_entry ) != IL_SUCCESS ||
                upd_curr( p_entry, p_newval ) != IL_SUCCESS )

                result = isliberr;

             unlock_table( p_entry );
          }
       }
       else
          result = P_NOT_OWNER;
    }
    else
       result = (isliberr == ENOREC || isliberr == EENDFILE ?
                P_INV_EQ_NAME : isliberr);

    return result;
}
```

```
#*****************************************************************
# @(#)els.mk   1.3  I/A Series  Foxboro Company  8/17/89
#*****************************************************************
#                                                                *
#  Copyright by the Foxboro Company 1988                         *
#                                                                *
#  All rights reserved Foxboro Company 1988                      *
#                                                                *
#*$0**************************************************************
#                                                                *
#  FILE NAME           : els.mk                                  *
#                                                                *
#  PART NUMBER         :                                         *
#                                                                *
#  FUNCTION            : Makefile for PAM ELS Server.            *
#                                                                *
#  COMPONENT HISTORY   :                                         *
#  -------------------------------------------------------------- *
#  11 AUG 1988 - RD - Link CL                                    *
#  07 DEC 1988 - GN - '-z' option added                          *
#  02 NOV 1988 - GN - Creation                                   *
#                                                                *
#*****************************************************************

PREFIX  =      /usr/pam

HDRDIR  =      $(PREFIX)/header

BINDIR  =      $(PREFIX)/bin

LIBDIR  =      $(PREFIX)/lib

OBJDIR  =      $(PREFIX)/els/obj

SRCDIR  =      $(PREFIX)/els/source

LIBPAM  =      $(LIBDIR)/libpam.a

LIBCOM  =      -lcom

HEADERS =      $(HDRDIR)/pam_gen.h\
               $(HDRDIR)/pam_err.h\
               $(HDRDIR)/pam_msg.h\
               $(HDRDIR)/pam_com.h\
               $(HDRDIR)/pam_rpt.h\
               $(HDRDIR)/pam_log.h\
               $(HDRDIR)/els.h

OBJECTS =      $(OBJDIR)/els_srv.o\
               $(OBJDIR)/log_event.o

TARGET  =      $(BINDIR)/els

CFLAGS  =      -I$(HDRDIR) -c

LFLAGS  =      -i -z
```

```
$(TARGET):        $(OBJECTS) $(LIBPAM) $(LIBDIR)/pam_gen.a
                  cc $(LFLAGS) $(OBJECTS) $(LIBPAM) $(LIBCOM) \
                        $(LIBDIR)/pam_gen.a -lpream -lisam -lfox -o $(TARGET)

$(OBJDIR)/els_srv.o:    $(SRCDIR)/els_srv.c $(HEADERS)
                  cc $(CFLAGS) $(SRCDIR)/els_srv.c
                  mv els_srv.o $(OBJDIR)

$(OBJDIR)/log_event.o:  $(SRCDIR)/log_event.c $(HEADERS)
                  cc $(CFLAGS) $(SRCDIR)/log_event.c
                  mv log_event.o $(OBJDIR)

#*************************************************************************
#  @(#)elsdb.mk 1.2  I/A Series  Foxboro Company  8/17/89
#*************************************************************************
#                                                                        *
#  Copyright by the Foxboro Company 1988                                 *
#                                                                        *
#  All rights reserved Foxboro Company 1988                              *
#                                                                        *
#*************************************************************************
#                                                                        *
#  FILE NAME           : elsdb.mk                                        *
#                                                                        *
#  PART NUMBER         :                                                 *
#                                                                        *
#  FUNCTION            : Makefile for PAM ELS Server.                    *
#                                                                        *
#  COMPONENT HISTORY   :                                                 *
#  -------------------------------------------------------------------   *
#  02 NOV 1988 - GM - Creation                                           *
#                                                                        *
#*************************************************************************

PREFIX  =       /usr/pam

HDRDIR  =       $(PREFIX)/header

BINDIR  =       $(PREFIX)/bin

LIBDIR  =       $(PREFIX)/lib

OBJDIR  =       $(PREFIX)/els/obj

SRCDIR  =       $(PREFIX)/els/source

LIBPAM  =       $(LIBDIR)/libpam.a

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h\
                $(HDRDIR)/els.h

OBJECTS =       $(OBJDIR)/els_srv.o\
                $(OBJDIR)/log_event.o\
                $(OBJDIR)/tst_stubs.o

TARGET  =       $(BINDIR)/els

CFLAGS  =       -I$(HDRDIR) -c


$(TARGET):      $(OBJECTS) $(LIBPAM) $(LIBDIR)/pam_gen.a
                cc $(OBJECTS) $(LIBPAM) $(LIBDIR)/pam_gen.a \
                -lpream -lisam -lfox -i -z -o $(TARGET)

$(OBJDIR)/els_srv.o:    $(SRCDIR)/els_srv.c $(HEADERS)
                cc $(CFLAGS) $(SRCDIR)/els_srv.c
                mv els_srv.o $(OBJDIR)

$(OBJDIR)/log_event.o:  $(SRCDIR)/log_event.c $(HEADERS)
                cc $(CFLAGS) $(SRCDIR)/log_event.c
                mv log_event.o $(OBJDIR)

$(OBJDIR)/tst_stubs.o:  $(SRCDIR)/tst_stubs.c $(HEADERS)
                cc $(CFLAGS) $(SRCDIR)/tst_stubs.c
                mv tst_stubs.o $(OBJDIR)
```

```
/* ****************************************************************
 * @(#)els_srv.c        1.2  I/A Series, Foxboro Company   8/17/89
 *****************************************************************
 *
 * (C) Copyright by Foxboro Company 1988
 *
 * All rights reserved: Foxboro Company 1988
 *
 **$0**************************************************************
 *
 * FILE ID              : els_srv.c
 *
 * PART NUMBER          :
 *
 * FUNCTION             : PAN Event Logging Server process.
 *
 * FUNCTIONS CONTAINED :
 *
 * DATA STRUCTURES      :
 *
 * COMPONENT HISTORY    :
 *        04 JUL 89, RD, Added setbuf() in case of testing.
 *        22 DEC 88, GN, Read ap_name from configuration file.
 *        15 DEC 88, GN, Corrections due to TDS execution.
 *        02 NOV 88, GN, Created.
 *
 ***************************************************************** */

#include <stdio.h>
#include <errno.h>
#include <string.h>
#include <isam.h>
#include <fox/pream.h>
#include <pam_com.h>
#include <pam_log.h>
#include <els.h>

#ifdef DEBUG
#       define dprintf(x) printf x  ; fflush(stdout)
#else
#       define dprintf(x)
#endif

static char sccsid[] = "@(#)els_srv.c   1.2  (89/08/17)";

char pam_id[ IPC_NAME_LEN + 1 ];
char letter_bug[ LBUG_LEN + 1 ];
char time_stamp[ TIME_LEN + 1 ];
int valid_flag;
unsigned mon_counter;


/* ****************************************************************
 *
 * (C) Copyright by Foxboro Company 1988
 *
 * All rights reserved: Foxboro Company 1988
 *
 **$1**************************************************************
 *
 * NAME                 : main
 *
 * FUNCTION             : Receive ELS addressed messages and invoke
 *                        log_event() function if the message type is valid.
 *                        Do NOT notify requestor of reception
 *                        and/or completion of the request.
 *
 * INPUT PARAMETERS     : argv[1]  { full pathname of PAN database }
 *                        argv[2]  { PAN package identifier }
 *
 * OUTPUT PARAMETERS :
 *
 * RETURN CODES         :
 *
 * SYNOPSIS             :
 *
 * PRECONDITIONS        :
 *
 * COMPONENT HISTORY :
 *        23 SEP 88, GN, Created.
 *
 ***************************************************************** */

char req_id[ IPC_NAME_LEN + 1 ];
```

```
main( argc, argv )
int argc;
char *argv[];
{
   char msg[ BUFFER_SIZE + 1 ],
        err_str[ LINE_LENGTH + 1 ],
        *pt,
/*        req_id[ IPC_NAME_LEN + 1 ], */
        pararr[ MX_NROF_PARS ][ PAM_MAX_DATA + 1 ],
        *params[ MX_NROF_PARS + 1 ],
        ret_param[ PAM_MAX_DATA + 1 ],
        field[ PAM_MAX_DATA + 1 ],
        ref[ LINE_LENGTH + 1 ],
        s_valid[ PAM_INT_LEN + 1 ],
        s_monoc[ PAM_INT_LEN + 1 ],
        s_event[ PAM_INT_LEN + 1 ],
        environmt[ ENV_SIZE + 1];
   int i,
       in_type,
       event_type,
       ret_code,
       result,
       size;

#ifdef TESTING
   setbuf( stdout, 0 );
#endif

   /* read ap_name */
   if ( (ret_code = PPget_cfg()) != PAM_OK )
   {
      strcpy( els_name, "els" );
      PPstp_ipc( ret_code );
   }

   if ( argc != 3 || strlen( argv[2] ) > IPC_NAME_LEN )
   {
      PPerr_rpt( PAM, PE_INV_ARGUMENTS, els_name, "" );
      exit( -1 );
   }

   /* initialize IPC communication */
   if ( (ret_code = PPini_ipc( els_name, 1, 25 )) != PAM_OK )
      PPstp_ipc( ret_code );

   strcpy( pam_id, argv[2] );

   if ( chdir( argv[1] ) != 0 )
   {
      strcpy( err_str, "Venix error: " );
      itoa( errno, err_str + strlen(err_str) );
      PPerr_rpt( PAM, PE_DBDIR_FAIL, els_name, err_str );
      PPstp_ipc( PAM_OK );
   }

   /* initialize event logging */
   if ( (result = PPinit_log()) != PAM_OK )
   {
      PPerr_rpt( PAM, PE_FATAL_ERROR, els_name, "'init_log' failure" );
      PPstp_ipc( PAM_OK );
   }

   /*
    * Catch event logging requests, translate and forward them to
    * PPlog_event().
    */

   for( ;; )
   {
      dprintf(("%s: Waiting for message ...\n", els_name ));

      for ( i = 0; i < MX_NROF_PARS; i++ )
         params[i] = pararr[i];

      if ( PPrcv_msg( msg, req_id, &size, 0 ) == PAM_OK )
      {
         dprintf(("%s: Message received: [%s]\n", els_name, msg ));
         ret_code = ~PAM_OK;
         event_type = NULL;

         if ( (pt = PPget_fld( msg, ref, LINE_LENGTH )) != (char*)NULL &&
              (pt = PPget_fld( pt, field, PAM_INT_LEN )) != (char*)NULL )
         {
            /* now field contains message type */
```

```
            dprintf(( "%s: reference = [%s], type = [%s]\n",
                                                 els_name, ref, field ));

            in_type = atoi( field );

            switch ( in_type )
            {
               case I_LOG_EVENT:
                  /* type OK, get rest of parameters */
                  if ((pt = PPget_fld(pt,letter_bug,LBUG_LEN)) != (char*)NULL
                   && (pt = PPget_fld(pt,time_stamp,TIME_LEN)) != (char*)NULL
                   && (pt = PPget_fld(pt,s_valid,PAN_INT_LEN)) != (char*)NULL
                   && (pt = PPget_fld(pt,s_monoc,PAN_INT_LEN)) != (char*)NULL
                   && (pt = PPget_fld(pt,s_event,PAN_INT_LEN)) != (char*)NULL
                   && (pt = PPget_fld(pt,environmt,ENV_SIZE)) != (char*)NULL )
                  {
                     valid_flag = atoi( s_valid );
                     mon_counter = (unsigned)atoi( s_monoc );
                     event_type = atoi( s_event );

                     /* get type-dependent parameters */
                     PPdecode_msg( pt, params );
dprintf(( "%s: calling log_event() with:\n", els_name ));
dprintf(( "   event_type = %d\n", event_type ));
dprintf(( "   environmt = [%s]\n", environmt ));
#ifdef DEBUG
   i = 0;
   while( params[i] != (char*)NULL )
   {
      dprintf(( "   params[%d] = [%s]\n", i, params[i] ));
      i++;
   }
#endif


                     PPlog_event( event_type, environmt, params );
                  }
                  break;

               case 0:
                  /* stop ELS server */
                  PPstp_ipc( PAN_OK );
                  break;

               default:
                  PPerr_rpt( PAN, PE_INV_MESSAGE, els_name, "" );
                  break;
            }

         }  /* type field has been read from message */

         /* no response message is sent */

      }  /* if message received OK */

   }  /* forever loop */

}


int PPdecode_msg( msg, val )
char *msg,
     *val[];
{
   int i = 0;
   char *pt;

   dprintf(( "%s: PPdecode_msg(): msg = [%s]\n", els_name, msg ));
   pt = msg;

   while ( (pt = PPget_fld(pt, val[i], PAN_MAX_DATA)) != (char*)NULL )
   {
      dprintf(( "%s: PPdecode_msg(): val[%d] = [%s]\n", els_name, i, val[i] ));
      i++;
   }
   val[i] = (char*)NULL;

   return i;
}
```

```
/* ***************************************************************
 * @(#)log_event.c      1.3  I/A Series, Foxboro Company  9/14/89
 *****************************************************************
 *
 *  (C) Copyright by Foxboro Company 1988
 *
 *  All rights reserved: Foxboro Company 1988
 *
 **SD**************************************************************
 *
 * FILE ID              : log_event.c
 *
 * PART NUMBER          :
 *
 * FUNCTION             : Event message logging.
 *
 * FUNCTIONS CONTAINED : PPlog_event()
 *                        getdata()
 *                        fill_text()
 *                        send_log()
 *                        PPinit_log()
 *
 * DATA STRUCTURES      :
 *
 * COMPONENT HISTORY    :
 *        22 AUG 89, RD, Built in stub functions
 *        15 DEC 88, GN, Corrections due to TDS execution.
 *        03 AUG 88, GN, Created
 *
 *************************************************************** */

#include <stdio.h>
#include <string.h>
#include <pam_gen.h>
#include <pam_log.h>
#include <pam_msg.h>
#include <pam_err.h>
#include <pam_rpt.h>
#include <els.h>
#include <fox/om_user.h>
#include <fox/almtypes.h>
#include <fox/aprint.h>
#include <fox/vv_err.h>
#include <errno.h>
#include <isam.h>
#include <fox/pream.h>

#ifdef DEBUG
#       define dprintf(x) printf x  ; fflush(stdout)
#else
#       define dprintf(x)
#endif

static char sccsid[] = "@(#)log_event.c 1.3  (89/09/14)";

/* Message Definition Structure */

typedef struct {
   char format[ FORMAT_LEN + 1];
   char time_stamp[ TIME_LEN + 1 ];
   int valid_flag;
   unsigned mon_counter;
   char pam_id[ IPC_NAME_LEN + 1 ];
   char letter_bug[ LBUG_LEN + 1 ];
   int event_type;
   char description[ EVENT_DESC + 1 ];
   char control[ CONTROL_LEN + 1 ];
   char par_part[ PARAMS_LEN + 1 ];
} PAM_MSG;

/* RAM database version of 'event_def' table */
typedef struct
{
   int event_type;
   int class;
   char control[ CONTROL_LEN + 1 ];
   char description[ EVENT_DESC + 1 ];
} EVENT_REC;

/* RAM database version of 'format_def' table */
typedef struct
{
   int class;
   char format[ FORMAT_LEN + 1 ];
   int nr_params;
} FORMAT_REC;
```

```
/* RAM database version of 'dev_conf' table */
typedef struct
{
   char environmt[ ENV_SIZE + 1 ];
   char device[ DEVICE_LEN + 1 ];
} DEV_REC;

EVENT_REC **event_entry;
FORMAT_REC **format_entry;
DEV_REC **dev_entry;

extern char pam_id[];   /* identifier of this PAM package */
extern char letter_bug[];
extern char time_stamp[];
extern int valid_flag;
extern unsigned mon_counter;
extern char els_name[];

int nr_event_entries;   /* number of RAM-database records read from
                           table 'event_def' */
int nr_format_entries;  /* number of RAM-database records read from
                           table 'format_def' */
int nr_dev_entries;     /* number of RAM-database records read from
                           table 'dev_conf' */

/* ****************************************************************
 *
 *  (C) Copyright by Foxboro Company 1988
 *
 *  All rights reserved: Foxboro Company 1988
 *
 **&1**************************************************************
 *
 * NAME               : PPlog_event()
 *
 * FUNCTION           : Send logging message of specified type to
 *                      devices configured for the specified environment.
 *
 * INPUT PARAMETERS   : int event_type;
 *                      char *environmt;
 *                      char *params[];
 *
 * OUTPUT PARAMETERS :
 *
 * RETURN CODES       : PAM_OK
 *                      error-code
 *
 * SYNOPSIS           : int PPlog_event( event_type, environmt, params )
 *
 * PRECONDITIONS      : Informix tables 'event_def', 'format_def' and
 *                      'dev_conf' have been read into memory by
 *                      function init_log().
 *
 * COMPONENT HISTORY :
 *
 ***************************************************************** */

int PPlog_event( event_type, environmt, params )
int event_type;
char *environmt,
     *params[];
{
   PAM_MSG msg;  /* message definition structure */

   int result = PAM_OK;


   if ( event_type <= 0 || event_type > NR_EVENTS )
      return P_INV_EVENT;

   /* default_env if environmt is empty */
   if ( environmt == (char*)NULL || !strcmp( environmt, "" ) )
      strcpy( environmt, "default_env" );

   /* Fill in the common part of the message */
   strcpy( msg.time_stamp, time_stamp );
   msg.valid_flag = valid_flag;
   msg.mon_counter = mon_counter;
   strcpy( msg.pam_id, pam_id );
   strcpy( msg.letter_bug, letter_bug );
   msg.event_type = event_type;
```

```
   /* fill message definition structure with data from table 'event_def' */
   if (PAM_OK == (result = getdata( event_type, params, &msg )))

      /* send message to devices configured for this environment */
      result = send_log( environmt, &msg );

   return result;
}

/* ****************************************************************
*                                                                 *
*  (C) Copyright by Foxboro Company 1988                          *
*                                                                 *
*  All rights reserved: Foxboro Company 1988                      *
*                                                                 *
**&2**************************************************************
*
* NAME               : getdata
*
* FUNCTION           : Fill the supported message definition structure
*                      with related data from table 'event_def'.
*
* INPUT PARAMETERS   : int event_type;
*                      char *params[];
*                      PAM_MSG *p_msg;
*
* OUTPUT PARAMETERS  : PAM_MSG *p_msg;
*
* RETURN CODES       : PAM_OK
*                      error-code
*
* SYNOPSIS           : int getdata( event_type, params, p_msg)
*
* PRECONDITIONS      :
*
* ERRORS/EXCEPTIONS  :
*
* COMPONENT HISTORY  :
*       15 AUG 88, GN, Created
*
***************************************************************** */

int getdata( event_type, params, p_msg)
int event_type;
char *params[];
PAM_MSG *p_msg;
{
   int result,
       msg_class;


   msg_class = event_entry[event_type - 1]->class;

   strcpy( p_msg->format, format_entry[msg_class - 1]->format );
   while (strlen(p_msg->format) < FORMAT_LEN)
      strcat(p_msg->format," ");

   strcpy( p_msg->control, event_entry[event_type - 1]->control );
   strcpy( p_msg->description, event_entry[event_type - 1]->description );
   while (strlen(p_msg->description) < EVENT_DESC)
      strcat(p_msg->description," ");

   fill_text( msg_class, params, p_msg );

   return PAM_OK;

/* ****************************************************************
*                                                                 *
*  (C) Copyright by Foxboro Company 1988                          *
*                                                                 *
*  All rights reserved: Foxboro Company 1988                      *
*                                                                 *
**&2**************************************************************
*
* NAME               : fill_text
*
* FUNCTION           : Compose the logging message text part by
*                      concatenating the supported parameter values
*                      onto one, space separated, character string.
*
* INPUT PARAMETERS   : int class;
*                      char *params[];
*                      PAM_MSG *p_msg;
*
```

```
* OUTPUT PARAMETERS : char log_txt;
*                     PAM_MSG *p_msg;
*
* RETURN CODES      : PAM_OK
*
* SYNOPSIS          : int fill_text( class, params, p_msg )
*
* PRECONDITIONS     :
*
* ERRORS/EXCEPTIONS :
*
* COMPONENT HISTORY :
*       15 AUG 88, GN, Created
*
************************************************************* */

int fill_text( class, params, p_msg )
int class;
char *params[];
PAM_MSG *p_msg;
{
   char ctr[ CONTROL_LEN + 1 ];
   int parnum,
       i,
       j = 0;

   strcpy( ctr, p_msg->control );
   strcpy( p_msg->par_part, "" );

   parnum = atoi( strtok( ctr, " " ));

   for ( i = 1; i <= format_entry[class - 1]->nr_params; i++ )
   {
      if ( i == parnum && params[j] != (char*)NULL )
      {
         strcat( p_msg->par_part, params[j++] );
         if ( parnum != 0 )
            parnum = atoi( strtok( (char*)NULL, " " ));
}
      }
      else
         strcat( p_msg->par_part, NOT_USED_ID );

      strcat( p_msg->par_part, " " );
   }

   rts( p_msg->par_part );

   return PAM_OK;
}

/* ************************************************************
*                                                            *
*  (C) Copyright by Foxboro Company 1988                     *
*                                                            *
*  All rights reserved: Foxboro Company 1988                 *
*                                                            *
**&2***********************************************************
*
* NAME              : send_log
*
* FUNCTION          : 1. Convert the supported message definition
*                        structure into one ASCII string.
*                     2. Send this ASCII string to the corresponding
*                        devices.
*
* INPUT PARAMETERS  : char *environmt;
*                     PAM_MSG *p_msg;
*
* OUTPUT PARAMETERS :
*
* RETURN CODES      : PAM_OK
*                     error-code
*
* SYNOPSIS          : int send_log( environmt, p_msg )
*
* PRECONDITIONS     : char pam_id[] must be defined
*
* ERRORS/EXCEPTIONS : 1. a PREAM call failes
*                     2. opening destination device failes
*                     ACTION: the function returns without sending a
*                        message
```

```
*
* COMPONENT HISTORY :
*
************************************************************** */

int send_log( environmt, p_msg )
char *environmt;
PAM_MSG *p_msg;
{
   int i,
       result,
       logged = 0,
       error;
   OPENDEV_RET fd, opendev();
   APRINT_RET aprint();
   char dev_id[ MAX_PATH + 1 ],
        log_str[ MX_LOG_LEN + 1 ];

   struct apr
   {
      ALM_TYPE code;
      char string[MX_LOG_LEN + 1];
   } apr_msg;

   /* compose message, using the filled message definition structure */
   sprintf( log_str, "%s %s %d %u %s %s %d %s %s",
      p_msg->format,
      p_msg->time_stamp,
      p_msg->valid_flag,
      (unsigned)p_msg->mon_counter,
      p_msg->pam_id,
      p_msg->letter_bug,
      p_msg->event_type,
      p_msg->description,
      p_msg->par_part );

/*   strcpy(log_str,p_msg->format);
   strcat(log_str," "); strcat(log_str,p_msg->time_stamp);
   strcat(log_str," "); itoa(p_msg->valid_flag,log_str + strlen(log_str));
   strcat(log_str," "); itoa(p_msg->mon_counter,log_str + strlen(log_str));
   strcat(log_str," "); strcat(log_str,p_msg->pam_id);
   strcat(log_str," "); strcat(log_str,p_msg->letter_bug);
   strcat(log_str," "); itoa(p_msg->event_type,log_str + strlen(log_str));
   strcat(log_str," "); strcat(log_str,p_msg->description);
   strcat(log_str," "); strcat(log_str,p_msg->par_part);
*/

#ifdef DEBUG
   show_msg( p_msg );
#endif

   /* send message to corresponding devices */

   while ( logged < 2 )
   {
      for ( i = 0; i < nr_dev_entries; i++ )
      {
         if ( !strcmp( dev_entry[i]->environmt, environmt ) )
         {
            if ((OPENDEV_RET)0 <=
                (fd = opendev( dev_entry[i]->device, (char*)NULL, 1)) )

            /* station-name = (char *) NULL; this implies all
               device-names must be unique throughout the network */
            {
               apr_msg.code = ALM_PRINTF;
               strcpy(apr_msg.string,log_str);

               aprint(fd,&apr_msg,(long) sizeof(struct apr),1);

               logged = 2;
            }
         }
      }

      if ( logged != 2 )
      {
         /* no devices configured for this environment,
            use default environment */
            strcpy( environmt, "default_env" );
            logged++; /* if default_env doesn't exist, stop trying */
      }
   }

   return PAM_OK;
}
```

```
/* ****************************************************************
 *
 *  (C) Copyright by Foxboro Company 1988
 *
 *  All rights reserved: Foxboro Company 1988
 *
**$1**************************************************************
 *
 * NAME              : PPinit_log
 *
 * FUNCTION          : Read Informix tables 'event_def', 'format_def'
 *                     and 'dev_conf' into memory to enable event
 *                     logging via PPlog_event().
 *
 * INPUT PARAMETERS  :
 *
 * OUTPUT PARAMETERS :
 *
 * RETURN CODES      :
 *
 * SYNOPSIS          :
 *
 * PRECONDITIONS     : 'char event_db[];' must be defined.
 *
 * COMPONENT HISTORY :
 *       04 AUG, GN, Created
 *
***************************************************************** */

int PPinit_log( )
{
   P_ISAM_ENTRY p_entry,
                opentable();
   char sel[ 2 * PAN_COL_LEN + 4 ], *p_sel[ 3 ],
        proj[ 4 * PAN_COL_LEN + 4 ], *p_proj[ 5 ],
        val[ 4 ][ PAN_MAX_DATA + 1 ], *p_val[ 5 ],
        cwd[ MAX_PATH + 1 ],
        err_str[ LINE_LENGTH + 1 ],
        *getcwd();
   int i = 0;


   event_entry = (EVENT_REC**) malloc( sizeof(EVENT_REC*) );
   format_entry = (FORMAT_REC**) malloc( sizeof(FORMAT_REC*) );
   dev_entry = (DEV_REC**) malloc( sizeof(DEV_REC*) );

   /* read logging message definition tuples from table 'event_def' */
   p_val[0] = val[0];
   p_val[1] = val[1];
   p_val[2] = val[2];
   p_val[3] = val[3];
   p_val[4] = (char*)NULL;

   strcpy( sel,"event_type=" );
   init_ptr_array( sel, p_sel );
   strcpy( proj, "event_type@class@control@description" );
   init_ptr_array( proj, p_proj );

   if ( (P_ISAM_ENTRY)NULL !=
      (p_entry = opentable("event_def",ISINOUT + ISMANULOCK)) )
   {
      if ( opencursor(p_entry,p_sel,p_proj,IL_TOP) == IL_SUCCESS )
      {
         while ( fetchcursor(p_entry,p_val,IL_FOWD) == IL_SUCCESS )
         {
            event_entry = (EVENT_REC**)realloc(
                          event_entry, (i+1) * sizeof(EVENT_REC*) );
            if ( event_entry == (EVENT_REC**)NULL )
               return P_MALLOC;
            event_entry[i] = (EVENT_REC*)malloc( sizeof(EVENT_REC) );
            if ( event_entry[i] == (EVENT_REC*)NULL )
               return P_MALLOC;

            event_entry[i]->event_type = atoi( p_val[0] );
            event_entry[i]->class = atoi( p_val[1] );
            strcpy( event_entry[i]->control, rts( p_val[2] ) );
            strcpy( event_entry[i]->description, rts( p_val[3] ) );
            i++;
         }
         if ( i == 0 )
         {
            sprintf( err_str, "error %d", isliberr );
            PPerr_rpt( PAN, PE_NO_EVENTS, els_name, err_str );
            return isliberr;
```

```
      }
   }

   nr_event_entries = i;
   closetable( "event_def" );
}
else
{
   sprintf( err_str, "'event_def', error %d", isliberr );
   PPerr_rpt( PAN, PE_OPEN_FAIL, els_name, err_str );
   return isliberr;
}

/* read format definition tuples from table 'format_def' */
p_val[0] = val[0];
p_val[1] = val[1];
p_val[2] = val[2];
p_val[3] = val[3];
p_val[4] = (char*)NULL;

i = 0;

strcpy( sel,"class=" );
init_ptr_array( sel, p_sel );

strcpy( proj, "class@format@nr_params" );
init_ptr_array( proj, p_proj );
p_val[3] = (char*)NULL;

if ( (P_ISAM_ENTRY)NULL !=
   (p_entry = opentable("format_def",ISINOUT + ISMANULOCK)) )
{
   if ( opencursor(p_entry,p_sel,p_proj,IL_TOP) == IL_SUCCESS )
   {
      while ( fetchcursor(p_entry,p_val,IL_FOWD) == IL_SUCCESS )
      {
         format_entry = (FORMAT_REC**)realloc(
                  format_entry, (i+1) * sizeof(FORMAT_REC*) );
         if ( format_entry == (FORMAT_REC**)NULL )
            return P_MALLOC;
         format_entry[i] = (FORMAT_REC*)malloc( sizeof(FORMAT_REC) );
         if ( format_entry[i] == (FORMAT_REC*)NULL )
            return P_MALLOC;

         format_entry[i]->class = atoi( p_val[0] );
         strcpy( format_entry[i]->format, rts( p_val[1] ) );
         format_entry[i]->nr_params = atoi( p_val[2] );
         i++;
      }
      if ( i == 0 )
      {
         sprintf( err_str, "error %d", isliberr );
         PPerr_rpt( PAN, PE_NO_FORMATS, els_name, err_str );
         return isliberr;
      }
   }

   nr_format_entries = i;
   closetable( "format_def" );
}
else
{
   sprintf( err_str, "'format_def', error %d", isliberr );
   PPerr_rpt( PAN, PE_OPEN_FAIL, els_name, err_str );
   return isliberr;
}

/* read device configuration tuples from table 'dev_conf' */
p_val[0] = val[0];
p_val[1] = val[1];
p_val[2] = val[2];
p_val[3] = val[3];
p_val[4] = (char*)NULL;

i = 0;

strcpy( sel,"environmt=@device=" );
init_ptr_array( sel, p_sel );

strcpy( proj, "environmt@device" );
init_ptr_array( proj, p_proj );
```

```
   p_val[2] = (char*)NULL;

   if ( (P_ISAM_ENTRY)NULL !=
      (p_entry = opentable("dev_conf",ISINOUT + ISMANULOCK)) )
   {
      if ( opencursor(p_entry,p_sel,p_proj,IL_TOP) == IL_SUCCESS )
      {
         while ( fetchcursor(p_entry,p_val,IL_FOWD) == IL_SUCCESS )
         {
            dev_entry =
               (DEV_REC**)realloc( dev_entry, (i+1) * sizeof(DEV_REC*) );
            if ( dev_entry == (DEV_REC**)NULL )
               return P_MALLOC;
            dev_entry[i] = (DEV_REC*)malloc( sizeof(DEV_REC) );
            if ( dev_entry[i] == (DEV_REC*)NULL )
               return P_MALLOC;

            strcpy( dev_entry[i]->environmt, rts( p_val[0] ) );
            strcpy( dev_entry[i]->device, rts( p_val[1] ) );
            i++;
         }
         if ( i == 0 )
         {
            sprintf( err_str, "error %d", isliberr );
            PPerr_rpt( PAM, PE_NO_DEVICES, els_name, err_str );
            return isliberr;
         }
      }

      nr_dev_entries = i;
      closetable( "dev_conf" );
   }
   else
   {
      sprintf( err_str, "'dev_conf', error %d", isliberr );
      PPerr_rpt( PAM, PE_OPEN_FAIL, els_name, err_str );
      return isliberr;
   }

#ifdef DEBUG
   printf( "contents of RAM table 'event_def':\n" );
   for ( i = 0; i < nr_event_entries; i++ )
   {
      printf( "[%d] event_type = %d\n", i, event_entry[i]->event_type );
      printf( "[%d] class      = %d\n", i, event_entry[i]->class );
      printf( "[%d] control    = [%s]\n", i, event_entry[i]->control );
      printf( "[%d] description= [%s]\n\n", i, event_entry[i]->description );
   }

   printf( "contents of RAM table 'format_def':\n" );
   for ( i = 0; i < nr_format_entries; i++ )
   {
      printf( "[%d] class     = %d\n", i, format_entry[i]->class );
      printf( "[%d] format    = [%s]\n", i, format_entry[i]->format );
      printf( "[%d] nr_params = [%d]\n\n", i, format_entry[i]->nr_params );
   }

   printf( "contents of RAM table 'dev_conf':\n" );
   for ( i = 0; i < nr_dev_entries; i++ )
   {
      printf( "[%d] environmt = [%s]\n", i, dev_entry[i]->environmt );
      printf( "[%d] device    = [%s]\n\n", i, dev_entry[i]->device );
   }
#endif

   return PAM_OK;
}


#ifdef DEBUG

int show_msg ( p_msg )
PAM_MSG  *p_msg;
{
   printf( "contents of message structure:\n" );
   printf( "   format = [%s]\n", p_msg->format );
   printf( "   time_stamp = [%s]\n", p_msg->time_stamp );
   printf( "   valid_flag = %d\n", p_msg->valid_flag );
   printf( "   mon_counter = %d\n", p_msg->mon_counter );
   printf( "   pam_id = [%s]\n", p_msg->pam_id );
   printf( "   letter_bug = [%s]\n", p_msg->letter_bug );
   printf( "   event_type = %d\n", p_msg->event_type );
   printf( "   description = [%s]\n", p_msg->description );
   printf( "   control = [%s]\n", p_msg->control );
   printf( "   par_part = [%s]\n", p_msg->par_part );
```

```
}
#endif

#ifdef TESTVERSION

char snddev[20];
char aprmsg[1024];

extern char req_id[];

typedef struct apr
{
   ALM_TYPE code;
   char string[ MX_LOG_LEN + 1 ];
} APR_MSG;

OPENDEV_RET opendev( logical, station, priority )
char *logical,
     *station;
int priority;
{
   strcpy( snddev, logical );
   strcat( snddev, ":" );

   return 1;
}

APRINT_RET aprint( fd, message, msg_size, priority )
int fd;
APR_MSG *message;
long msg_size;
int priority;
{
   strcpy( aprmsg, snddev );
   strcat( aprmsg, message->string );

   dprintf(( "aprint sends:\n" ));
   dprintf(( "[%s]\n\n", aprmsg ));
   fflush( stdout );

   PPsnd_msg( aprmsg, req_id, strlen(aprmsg) );

   return 0;
}

#endif

#*************************************************************************
#  @(#)hcs.mk   1.3  I/A Series  Foxboro Company  89/08/17
#*************************************************************************
#                                                                        *
#  Copyright by the Foxboro Company 1988                                 *
#                                                                        *
#  All rights reserved Foxboro Company 1988                              *
#                                                                        *
#*#0*********************************************************************
#                                                                        *
#  FILE NAME            : hcs.mk                                         *
#                                                                        *
#  PART NUMBER          :                                                *
#                                                                        *
#  FUNCTION             : Makefile for PAN HLBL Communication Server.    *
#                                                                        *
#  COMPONENT HISTORY    :                                                *
#  ------------------------------------------------------------------   *
#  24 OCT 1988 - RD - Creation                                           *
#  08 DEC 1988 - RD - Now loaded with -i -z to save memory               *
#  11 AUG 1989 - RD - Link CL                                            *
#                                                                        *
#*************************************************************************

PREFIX  =       /usr/pan

HDRDIR  =       $(PREFIX)/header

BINDIR  =       $(PREFIX)/bin

LIBDIR  =       $(PREFIX)/lib

OBJDIR  =       $(PREFIX)/hcs/obj

SRCDIR  =       $(PREFIX)/hcs/source

LIBPAN  =       $(LIBDIR)/libpan.a
```

```
LIBCOM =        -lcom

HEADERS =       $(HDRDIR)/pam_gen.h\
                $(HDRDIR)/pam_err.h\
                $(HDRDIR)/pam_msg.h\
                $(HDRDIR)/pam_com.h\
                $(HDRDIR)/pam_rpt.h\
                $(HDRDIR)/pam_log.h

OBJECTS =       $(OBJDIR)/hcs.o

TARGET  =       $(BINDIR)/hcs

CFLAGS  =       -I$(HDRDIR) -c

LFLAGS  =       -i -z

$(TARGET):      $(OBJECTS) $(LIBPAM)
                cc $(LFLAGS) $(OBJECTS) $(LIBPAM) $(LIBCOM) -lfox -o $(TARGET)

$(OBJDIR)/hcs.o:        $(SRCDIR)/hcs.c $(HEADERS)
                cc $(CFLAGS) $(SRCDIR)/hcs.c
                mv hcs.o $(OBJDIR)


/*****************************************************************************
*  @(#)hcs.c    1.2  I/A Series  Foxboro Company  89/08/17
******************************************************************************
*                                                                            *
*  Copyright by the Foxboro Company 1988                                     *
*                                                                            *
*  All rights reserved Foxboro Company 1988                                  *
*                                                                            *
**80**************************************************************************
*                                                                            *
*  FILE NAME            : hcs.c                                              *
*                                                                            *
*  PART NUMBER          :                                                    *
*                                                                            *
*  FUNCTION             : HLBL Communication Server                          *
*                                                                            *
*  FUNCTIONS CONTAINED  : main()                                             *
*                         PPpop_msg()                                        *
*                         PPpam_msg()                                        *
*                         PPstr_get()                                        *
*                         PPstr_set()                                        *
*                         PPlng_set()                                        *
*                                                                            *
*  DATA STRUCTURES      :                                                    *
*                                                                            *
*  COMPONENT HISTORY    :                                                    *
*  ---------------------------------------------------------------------    *
*  24 OCT 1988 - RD - Creation                                               *
*  11 NOV 1988 - RD - Modified to get values from sequence blocks, because   *
*                     string parameters of sequence blocks are padded with   *
*                     spaces to have a length of 80 characters. When two     *
*                     such strings are sent in one message of 80 characters  *
*                     an incomplete message will arrive.                     *
*  02 JAN 1989 - RD - Added handling for gp_state().                         *
*  04 JUL 1989 - RD - Added setbuf() in case of testing.                     *
*                                                                            *
*****************************************************************************/

#include <pam_com.h>


/*************************
* File global definitions *
**************************/

static  char    SCCS_id[] = "@(#)hcs.c  1.2 (89/08/17)";

static  char    hcs_name[IPC_NAME_LEN];

static  char    o_name[IPC_NAME_LEN];

static  char    msg_in[BUFFER_SIZE];
static  char    msg_out[BUFFER_SIZE];

static  char    tmpstr[LINE_LENGTH];
```

```
static  PTR_CONCAT_MSG  concat_ptr;
static  PTR_ALARM_MSG   alarm_ptr;

/*****************************************************************************
*                                                                           *
*  Copyright by the Foxboro Company 1988                                    *
*                                                                           *
*  All rights reserved Foxboro Company 1988                                 *
*                                                                           *
**$2*************************************************************************
*                                                                           *
*  NAME              : main                                                 *
*                                                                           *
*  FUNCTION          : Main line of HCS.                                    *
*                                                                           *
*  RETURN CODES      : None.                                                *
*                                                                           *
*  COMPONENT HISTORY :                                                      *
*  ---------------------------------------------------------------------    *
*  24 OCT 1988 - RD - Creation                                              *
*                                                                           *
*****************************************************************************/

main( argc, argv )
int             argc;
char    *argv[];
{
        int             rc;
        int             sz;

#ifdef TESTING
        setbuf( stdout, 0 );
#endif

        /*
         * Determine hcs_name.
         */

        if ( argc > 1 )
        {
                strcpy( hcs_name, argv[1] );
        }
        else
        {
                strcpy( hcs_name, "HCS" );
        }


        /*
         * Initialize IPC.
         */

        rc = PPini_ipc( hcs_name, TRUE, 25 );
        if ( rc != PAM_OK ) PPstp_ipc( rc );


        /*
         *  Read configuration file.
         */

        rc = PPget_cfg();
        if ( rc != PAM_OK ) PPstp_ipc( rc );


        /*
         * Main loop.
         */

        while ( TRUE )
        {
                /*
                 * Receive message.
                 */

                rc = PPrcv_msg( msg_in, o_name, &sz, NULL );
                if ( rc != PAM_OK ) PPstp_ipc( rc );


                /*
                 * Call appropriate handler.
                 */
```

```
            concat_ptr = ( PTR_CONCAT_MSG ) msg_in;
            alarm_ptr  = ( PTR_ALARM_MSG ) concat_ptr -> aprint_buff;

            if ( alarm_ptr -> messg_type == SEQ_1_MESSAGE )
            {
                    PPpop_msg();
            }
            else
            {
                    PPpam_msg();
            }

        } /* End of while */

} /* End of main() */

/*************************************************************************
*                                                                        *
*  Copyright by the Foxboro Company 1988                                 *
*                                                                        *
*  All rights reserved Foxboro Company 1988                              *
*                                                                        *
**82**********************************************************************
*                                                                        *
*  NAME              : PPpop_msg                                         *
*                                                                        *
*  FUNCTION          : Handle POP message.                               *
*                                                                        *
*  RETURN CODES      : None.                                             *
*                                                                        *
*  COMPONENT HISTORY :                                                   *
*  ----------------------------------------------------------------------*
*  24 OCT 1988 - RD - Creation                                           *
*  02 JAN 1989 - RD - Added handling of I_GP_STATE                       *
*                                                                        *
*************************************************************************/

PPpop_msg()
{
        int             i, type;

        int             offset = 0;
        int             counter = 0;

        char    *msg_ptr;
        char    destination[IPC_NAME_LEN];

        /*
         * Do loop for every sequence message in IPC message.
         */

        do
        {
                /*
                 * Determine message location in structure.
                 */

                alarm_ptr  = ( PTR_ALARM_MSG ) ( concat_ptr -> aprint_buff +
                                            offset );
                msg_ptr    = alarm_ptr -> text_buffer +
                                alarm_ptr -> block_dscrp_length;


                /*
                 * Initialise message and destination.
                 */

                strcpy( msg_out, alarm_ptr -> compound_name );
                strcat( msg_out, ":" );
                strcat( msg_out, alarm_ptr -> block_name );
                strcat( msg_out, ":" );
                strcat( msg_out, msg_ptr );

                *destination = '\0';


                /*
                 * Strip off trailing spaces and insert semi-colon.
                 */

                for ( i = strlen( msg_out ) - 1 ; ( i >= 0 ) &&
                        ( msg_out[i] == ' ' ) ; --i );
```

```
msg_out[++i] = ':';
msg_out[++i] = '\0';

/*
 * Determine message type and handle it.
 */

type = atoi( msg_ptr );

switch( type )
{
case I_RELEASE_P:

        if ( PPstr_get( "SN0005", msg_out ) )
        {
                strcat( msg_out, ":" );

                if ( PPstr_get( "SN0006", msg_out ) )
                {
                        strcat( msg_out, ":" );
                        strcpy( destination, chg_name );
                }
        }
        break;

case I_SELECT_P:

        if ( PPstr_get( "SN0005", msg_out ) )
        {
                strcat( msg_out, ":" );

                if ( PPstr_get( "SN0006", msg_out ) )
                {
                        if ( PPstr_get( "SN0007", msg_out ) )
                        {
                                strcpy( destination, sel_name );
                        }
                }
        }
        break;

case I_GP_KEY:

        if ( PPstr_get( "SN0005", msg_out ) )
        {
                strcat( msg_out, ":" );
                strcpy( destination, irs_name );
        }
        break;

case I_FS_PATH:
case I_IZ_PATH:

        if ( PPstr_get( "SN0005", msg_out ) )
        {
                strcat( msg_out, ":" );
                PPstr_get( "SN0006", destination );
        }
        break;

case I_GP_STATE:

        PPstr_get( "SN0005", destination );
        break;

case I_PATH:

        if ( PPstr_get( "SN0005", msg_out ) )
        {
                strcat( msg_out, ":" );

                if ( PPstr_get( "SN0006", msg_out ) )
                {
                        strcat( msg_out, ":" );

                        PPstr_get( "SN0007", destination );
                }
        }
        break;
```

```
case I_CE_PARAMETER:

        if ( PPstr_get( "SN0005", msg_out ) )
        {
                strcat( msg_out, ";" );

                if ( PPstr_get( "SN0006", msg_out ) )
                {
                        strcat( msg_out, ";" );

                        if ( PPstr_get( "SN0007", msg_out ) )
                        {
                                strcat( msg_out, ";" );

                                strcpy( destination, sel_name );
                        }
                }
        }
        break;


case I_GE_STATUS:
case I_GE_USAGE:

        strcpy( destination, ees_name );
        break;


case I_RE_LOCKED:
case I_RE_SECURED:
case I_UE_USE:

        if ( PPstr_get( "SN0005", msg_out ) )
        {
                strcat( msg_out, ";" );
                strcpy( destination, ees_name );
        }
        break;


default:

        /*
         * Invalid message, log error.
         */

        sprintf( tmpstr, "Source <%s:%s> ; Message <",
                 alarm_ptr -> compound_name,
                 alarm_ptr -> block_name );
        strncat( tmpstr, msg_ptr,
                         sizeof( tmpstr ) - strlen( tmpstr ) - 2 );
        strcat( tmpstr, ">" );
        PPerr_rpt( PAM, PE_INV_MESSAGE, hcs_name, tmpstr );

        break;

} /* End of switch */


/*
 * Send message.
 */

if ( *destination != '\0' )
{
        PPsnd_msg( msg_out, destination, strlen( msg_out ) + 1 );
}

offset = concat_ptr -> msg_offset[counter++];

} while ( ( offset != 0 ) && ( counter <= MAX_MSGS ) );

} /* End of PPpop_msg() */
```

```
/*************************************************************************
*                                                                        *
*  Copyright by the Foxboro Company 1988                                 *
*                                                                        *
*  All rights reserved Foxboro Company 1988                              *
*                                                                        *
**82**********************************************************************
*                                                                        *
*  NAME              : PPpam_msg                                         *
*                                                                        *
*  FUNCTION          : Handle PAM message.                               *
*                                                                        *
*  RETURN CODES      : None.                                             *
*                                                                        *
*  COMPONENT HISTORY :                                                   *
*  --------------------------------------------------------------------- *
*  24 OCT 1988 - RD - Creation                                           *
*                                                                        *
*************************************************************************/

PPpam_msg()
{
        int             err = -1;
        int             type = 0;

        char    name[LINE_LENGTH];
        char    string[LINE_LENGTH];

        char    *ptr;

        long    comp;
        int             prvc;
        int             alrm;
        int             stpn;
        char    patn[PATTERN_NAME_SIZE + 2];


        /*
         * Read first three fields.
         */

        ptr = PPget_srm( msg_in, name, &type, &err );


        /*
         * Handle message.
         */

        switch( type ) {

        case O_SELECT_P:

                /*
                 * Two values to set.
                 */
                if ( err == PAM_OK )
                {
                        ptr = PPget_fld( ptr, string, sizeof( string ) );

                        if ( ptr != NULL )
                        {
                                if ( !PPstr_set( name, "SN0009", string ) )
                                {
                                        err = P_CONN_ERROR;
                                }
                        }
                }

                /*
                 * Watch it, no break statement!
                 */


        case O_GP_KEY:
        case O_GE_STATUS:
        case O_GE_USAGE:

                /*
                 * One value to set.
                 */

                if ( err == PAM_OK )
                {
                        ptr = PPget_fld( ptr, string, sizeof( string ) );
```

```
            if ( ptr != NULL )
            {
                    if ( !PPstr_set( name, "SN0010", string ) )
                    {
                            err = P_COMM_ERROR;
                    }
            }
    }

    /*
     * Watch it, no break statement!
     */

ise O_RELEASE_P:
ise O_FS_PATH:
ise O_IZ_PATH:
ise O_PATH:
ise O_CE_PARAMETER:
ise O_RE_LOCKED:
se O_RE_SECURED:
ise O_UE_USE:

    /*
     * Set error.
     */
    if ( ptr != NULL )
    {
            PPlng_set( name, "II0008", ( long ) err );
    }

    break;

se O_GP_STATE:

    if ( err == PAM_OK )
    {
            /*
             * Current type.
             */

            ptr = PPget_fld( ptr, string, sizeof( string ) );
            dprintf(( "\nCurrent type  - %s\n", string ));

            switch( *string )
            {
                    case C_NO_PAT: comp = ( long ) D_NO_PAT; break;
                    case C_NORM_PAT: comp = ( long ) D_NORM_PAT; break;
                    case C_INIT_PAT: comp = ( long ) D_INIT_PAT; break;
                    case C_FAIL_PAT: comp = ( long ) D_FAIL_PAT; break;
                    default: comp = 0L; break;
            }


            /*
             * Previous type.
             */

            ptr = PPget_fld( ptr, string, sizeof( string ) );
            dprintf(( "Previous type - %s\n", string ));

            switch( *string )
            {
                    case C_NO_PAT: comp += ( long ) D_NO_PAT << 3; break;
                    case C_NORM_PAT: comp += ( long ) D_NORM_PAT << 3; break;
                    case C_INIT_PAT: comp += ( long ) D_INIT_PAT << 3; break;
                    case C_FAIL_PAT: comp += ( long ) D_FAIL_PAT << 3; break;
                    default : break;
            }


            /*
             * Previous code.
             */

            ptr = PPget_fld( ptr, string, sizeof( string ) );
            dprintf(( "Previous code - %s\n", string ));

            prvc = atoi( string );


            /*
             * Pattern name.
             */
```

```
ptr = PPget_fld( ptr, patn, sizeof( patn ) );
dprintf(( "Pattern name  - %s\n", patn ));


/*
 * Alarm.
 */

ptr = PPget_fld( ptr, string, sizeof( string ) );
dprintf(( "Alarm         - %s\n", string ));

alrm = atoi( string );
comp += ( long ) alrm << 6;


/*
 * Current mode.
 */

ptr = PPget_fld( ptr, string, sizeof( string ) );
dprintf(( "Current mode  - %s\n", string ));

switch( *string )
{
        case C_AUTO: comp += ( long ) D_AUTO << 10; break;
        case C_MANUAL: comp += ( long ) D_MANUAL << 10; break;
        default : break;
}


/*
 * Default mode.
 */

ptr = PPget_fld( ptr, string, sizeof( string ) );
dprintf(( "Default mode  - %s\n", string ));

switch( *string )
{
        case C_AUTO: comp += ( long ) D_AUTO << 13; break;
        case C_MANUAL: comp += ( long ) D_MANUAL << 13; break;
        default : break;
}


/*
 * Auto failsafe.
 */

ptr = PPget_fld( ptr, string, sizeof( string ) );
dprintf(( "Auto failsafe - %s\n", string ));

switch( *string )
{
        case C_YES: comp += ( long ) D_YES << 16; break;
        case C_NO: comp += ( long ) D_NO << 16; break;
        default : break;
}


/*
 * Step state.
 */

ptr = PPget_fld( ptr, string, sizeof( string ) );
dprintf(( "Step state    - %s\n", string ));

switch( *string )
{
        case C_READY_FOR_STEP:
                        comp += ( long ) D_READY_FOR_STEP << 18; break;
        case C_WAITING_FOR_STEP:
                        comp += ( long ) D_WAITING_FOR_STEP << 18; break;
        case C_WAITING_FOR_SYNC:
                        comp += ( long ) D_WAITING_FOR_SYNC << 18; break;
        default : break;
}


/*
 * Step number.
 */

ptr = PPget_fld( ptr, string, sizeof( string ) );
dprintf(( "Step number   - %s\n", string ));
```

```
                        stpn = atoi( string );

                        /*
                         * Set appropriate variables.
                         */

                        dprintf(( "Compressed    - 0x%lx\n", comp ));

                        if ( ptr != NULL )
                        {
                                if ( !PPstr_set( name, "SN0010", patn ) ||
                                     !PPlng_set( name, "II0005", comp ) ||
                                         !PPlng_set( name, "II0006", ( long ) stpn ) ||
                                         !PPlng_set( name, "II0007", ( long ) prvc ) )
                                {
                                        err = P_COMM_ERROR;
                                }
                        }
                }

                /*
                 * Set error.
                 */

                if ( ptr != NULL )
                {
                        PPlng_set( name, "II0008", ( long ) err );
                }

                break;

        default:

                ptr = NULL;

                break;

        } /* End of switch */

        if ( ptr == NULL )
        {
                /*
                 * Invalid message, log error.
                 */

                sprintf( tmpstr, "Source <%s> : Message <", o_name );
                strncat( tmpstr, msg_in,
                                sizeof( tmpstr ) - strlen( tmpstr ) -2 );
                strcat( tmpstr, ">" );
                PPerr_rpt( PAM, PE_INV_MESSAGE, hcs_name, tmpstr );
        }

} /* End of PPpam_msg() */

/*********************************************************************
 *                                                                   *
 *  Copyright by the Foxboro Company 1988                            *
 *                                                                   *
 *  All rights reserved Foxboro Company 1988                         *
 *                                                                   *
 **82*****************************************************************
 *                                                                   *
 *  NAME              :  PPstr_get                                   *
 *                                                                   *
 *  FUNCTION          :  Get strings of sequence blocks.             *
 *                                                                   *
 *  RETURN CODES      :  TRUE/FALSE                                  *
 *                                                                   *
 *  COMPONENT HISTORY :                                              *
 *  --------------------------------------------------------------   *
 *  11 NOV 1988 - RD - Creation                                      *
 *                                                                   *
 *********************************************************************/

int     PPstr_get( parm, dest )
char    *parm;
char    *dest;
```

```
{
        int             i;
        int             rc;
        int             status;
        int             size;

        char    name[LINE_LENGTH];
        char    string[LINE_LENGTH];

        /*
         * Build variable name.
         */

        sprintf( name, "%s:%s.%s", alarm_ptr -> compound_name,
                          alarm_ptr -> block_name, parm );

        /*
         * Get actual value.
         */

        size = sizeof( string );

        rc = getval( name, VARIABLE, NULL, string, &status, &size );
        if ( rc != OM_SUCCESS )
        {
                sprintf( tmpstr, "Variable <%s> ; Error <%d>", name, rc );
                PPerr_rpt( PAM, PE_GETVAL, hcs_name, tmpstr );

                return( FALSE );
        }

        /*
         * Remove trailing spaces and concatenate result to 'dest'.
         */

        for ( i = strlen( string ) - 1 ; ( i >= 0 ) && ( string[i] == ' ' ) ; --i );
        string[++i] = '\0';

        strcat( dest, string );

        /*
         * Return to caller.
         */

        return( TRUE );

} /* End of PPstr_get() */

/**********************************************************************
*                                                                     *
*  Copyright by the Foxboro Company 1988                              *
*                                                                     *
*  All rights reserved Foxboro Company 1988                           *
*                                                                     *
**82*******************************************************************
*                                                                     *
*  NAME                 : PPstr_set                                   *
*                                                                     *
*  FUNCTION             : Set string of sequence block                *
*                                                                     *
*  RETURN CODES         : TRUE/FALSE                                  *
*                                                                     *
*  COMPONENT HISTORY :                                                *
*  ----------------------------------------------------------------   *
*  11 NOV 1988 - RD - Creation                                        *
*                                                                     *
**********************************************************************/

int     PPstr_set( comp_blck, parm, value )
char    *comp_blck;
char    *parm;
char    *value;
{
        int             rc;
        int             status;

        char    name[LINE_LENGTH];

        /*
         * Build name of variable and set it to 'value'.
         */
```

```
        sprintf( name, "%s.%s", comp_blck, parm );

        status = STRING;

        rc = set_confirm( name, VARIABLE, 0, value,
                                        &status, strlen( value ) + 1 );
        if ( rc != OM_SUCCESS )
        {
                sprintf( tmpstr, "Variable <%s> ; Value <%s> ; Error <%d>", name,
                                value, rc );
                PPerr_rpt( PAM, PE_SETVAL, hcs_name, tmpstr );
                return( FALSE );
        }
        else
        {
                return( TRUE );
        }

} /* End of PPstr_set() */


/***********************************************************************
 *                                                                     *
 *  Copyright by the Foxboro Company 1988                              *
 *                                                                     *
 *  All rights reserved Foxboro Company 1988                           *
 *                                                                     *
 **82*******************************************************************
 *                                                                     *
 *  NAME              :  PPlng_set                                     *
 *                                                                     *
 *  FUNCTION          :  Set long integer of sequence block            *
 *                                                                     *
 *  RETURN CODES      :  TRUE/FALSE                                    *
 *                                                                     *
 *  COMPONENT HISTORY :                                                *
 *  ---------------------------------------------------------------   *
 *  11 NOV 1988 - RD - Creation                                        *
 *  03 JAN 1989 - RD - Now return code                                 *
 *                                                                     *
 ***********************************************************************/

int PPlng_set( comp_blck, parm, value )
char    *comp_blck;
char    *parm;
long    value;
{
        int             rc;
        int             status;

        char    name[LINE_LENGTH];


        /*
         * Build name of variable and set it to 'value'.
         */

        sprintf( name, "%s.%s", comp_blck, parm );

        status = OM_LNG_INT;

        rc = set_confirm( name, VARIABLE, 0, &value,
                                        &status, sizeof( value ) );
        if ( rc != OM_SUCCESS )
        {
                sprintf( tmpstr, "Variable <%s> ; Value <0x%lx> ; Error <%d>", name,
                                value, rc );
                PPerr_rpt( PAM, PE_SETVAL, hcs_name, tmpstr );
                return( FALSE );
        }
        else
        {
                return( TRUE );
        }

} /* End of PPlng_set() */
```

```
/*************************************************************************
*  @(#)els.h    1.2  I/A Series  Foxboro Company  8/17/89
**************************************************************************
*                                                                        *
*  Copyright by the Foxboro Company 1988                                 *
*                                                                        *
*  All rights reserved Foxboro Company 1988                              *
*                                                                        *
**$3**********************************************************************
*                                                                        *
*  FILE NAME        : els.h                                              *
*                                                                        *
*  PART NUMBER      :                                                    *
*                                                                        *
*  FUNCTION         : Include file for PAM Event Logging Subsystem.      *
*                                                                        *
*  COMPONENT HISTORY :                                                   *
*  --------------------------------------------------------------------  *
*  10 NOV 1988 - GN - Creation                                           *
*                                                                        *
*************************************************************************/

#define NOT_USED_ID      "--"
#define NR_EVENTS        22


/********
* Sizes *
********/
#define FORMAT_LEN       10
#define TIME_LEN         19       /* ISO formatted time stamp */
#define LBUG_LEN         6        /* letterbug */
#define EVENT_DESC       25
#define PARAMS_LEN       200      /* event message parameter part */
#define MX_LOG_LEN       300
#define MX_NROF_PARS     9
#define CONTROL_LEN      20
#define DEVICE_LEN       12

/*******************************************************************
*  @(#)pac.h    1.2  New System, Foxboro Co.  8/17/89
********************************************************************
*
* (C)Copyright by Foxboro Company  1988
*
* All rights reserved:  Foxboro Company  1988
*
********************************************************************
*
* FILE ID             : PAC.H
*
* PART NUMBER         :
*
* FUNCTION            :  Global definitions for  P.A.M. Path Controller
*
* COMPONENT HISTORY   :
*    10 Nov 88 WC  MSG_MAX_ARG added
*    23 Nov 88 MVS Sizes changed of path_name,path_alarm,pat_name,owner,
*                  key, environment,name_init_pat and name_fail_pat
*    15 Dec 88 MVS mnem tables PPDvartype, PPDpattype added
*    04 Jan 89 RD  Defines for EXCEP_PROC.type field removed
*    13 Jul 89 RD  Removed sizes from conversion tables
*    14 Jul 89 RD  Increased size of path_ref and step_ref
*    01 Aug 89 RD  Added STEP_ALRM
*
*******************************************************************/
#include <string.h>
#include <signal.h>

#include <fox/nsstd.h>
#include <fox/ipc.h>
#include <fox/om_user.h>
#include <fox/om_ecode.h>

#include "pam_gen.h"
#include "pam_msg.h"
#include "pam_err.h"
#include "pam_rpt.h"
#include "pam_log.h"

/**************************************************
 *
 * Definitions for Object Manager and IPC
 *
 **************************************************/
```

```
#define BEING_SCANNED 0x0020     /* scanned bit in status */
#define ON_STAT 0x00e0           /* isolate status */

#define BOOLEAN 5                /* data type for CIO blocks */

typedef struct chk_clinfo RPY_DEST;
typedef struct value ON_VALUE_LIST;
typedef struct open_var ON_VAR_LIST;
typedef struct header_node ON_HEADER;

/*****************************************************
 *
 * Code macros
 *
 *****************************************************/
#define min(a, b) ((a)<(b) ? (a) : (b))
#define max(a, b) ((a)>(b) ? (a) : (b))
#define abs(a)    ((a)<0 ? -(a) : (a))

#define MSG_REF ev->data.msg.buf        /* to keep code readable */

/*****************************************************
 *
 * Definitions for maxima
 *
 *****************************************************/
#define MAX_EOE_ALRMS 255       /* max alarms is max size of ON open points list */
#define MAX_EFN 29              /* maximum for IPC event number, higher number
                                   might be used by HIutevent */
#define MSG_MAX_ARG 20          /* max number of fields in an IPC  message line
                                   (PAN path controller commandinterface only) */

/*****************************************************
 *
 * Definitions for size of data.
 *
 *****************************************************/
#define IPC_BUF_SIZE BUFFER_SIZE
#define SIZE_VAL_LIST (IPC_BUF_SIZE / sizeof(struct value)) /* use memory for two purposes */

#define MEM_BLK_SIZE 1024       /* important: in VRTX env it should be the
                                   block size of one of the valloc pools */
#define MEM_BUF_SIZE (MEM_BLK_SIZE - sizeof(int *) - sizeof(int))

/*****************************************************
 *
 * Structure definition for mnemonic tables
 *
 *****************************************************/

typedef struct
        {
        int val;
        char *mnem;
        } mnem_tbl;

/*****************************************************
 *
 * Structure definitions for event flag database
 *
 *****************************************************/

/* definition of event data block */

typedef struct
        {
        int usage;
        int msg_id;
        } EFN_DBLK;


/* defines for EFN_DBLK.usage field */

#define NOT_IN_USE 0
#define INUSE_RCV 1
#define INUSE_SND 2

/*****************************************************
 *
/* definition of the event database
 *
 *****************************************************/
```

```
typedef struct
        {
        int pid;
        int event_type;
        EFN_DBLK efn[MAX_EFN + 1];
        int next_efn;
        char *cmd_apname;
        char *log_apname;
        int rcv_efn;
        int buf_size;
        int max_val_list_size;
        union   {
                struct  EVMSG{
                        RPY_DEST reply_dest;
                        char buf[IPC_BUF_SIZE + 2];
                        } msg;
                struct  {
                        OM_VALUE_LIST val_list[SIZE_VAL_LIST];
                        int size;
                        int om_id;
                        } dqch;
                } data;

        } EVENT_DESC;

/**************************************************
 *
 * Defines for EVENT_DESC.event_type field
 *
 **************************************************/
#define EV_RCV 0
#define EV_OM 1
#define EV_NOP 2

/**************************************************
 *
 * Structure definition of Path database
 *
 **************************************************/

/* name descriptor */

typedef struct
        {
        int name_type;
        char *name_ref[3];
        } NAME;

/* data struct for startup definition of exception procedure */

typedef struct
        {
        int type;
        NAME name;
        char *arg;
        } EXCEP_PROC;

/* data structure for storage of different data types on
   same location */

typedef union
                {
                char letter;
                int word;
                long longint;
                float fpoint;
                char *strp;
                } UVAL;

/* Data structure for memory allocation */

typedef struct MEM_BLK_STRUCT
        {
        struct MEM_BLK_STRUCT *next;
        int free;
        char buf[MEM_BUF_SIZE];
        } MEM_BLK;


/* alarm descriptor, to create a linked list of alarm variables */

typedef struct alrm_desc
        {
        struct alrm_desc *next;
        NAME name;
        } ALRM_DESC;
```

```
/* sync rule descriptor for pat step */

typedef struct
        {
        NAME name;
        int type;
        int relation;
        UVAL val;
        char *pval;
        } SYNC_DESC;


/* Action descriptor for pat step node */

typedef struct
        {
        NAME name;
        int type;
        UVAL val;
        } ACT_DESC;


/* definition of a pat node */

typedef struct pat
        {
        struct pat *next;
        char pat_name[PATTERN_NAME_SIZE+2];
        struct step *step;
        } PAT;


/* definition of a step node */

typedef struct step
        {
        struct step *next;
        int step_no;
        SYNC_DESC *sync_desc;
        ACT_DESC *act_desc;
        } STEP;


/* definition of the path database */

typedef struct pathdb
        {
        struct pathdb *next;

        MEM_BLK *mem_blk;        /* start of chain of blocks for PAT & STEP */
        MEM_BLK *sort_blk;       /* start of chain of blocks for name sort  */
        MEM_BLK *alrm_blk;       /* start of chain of blocks for alarm vars */

        PAT *pat;                /* list of pattern in path */
        ALRM_DESC *alrm;         /* list of alarm vars, only during cfg */
        ALRM_DESC *cur_alrm;     /* last alarm var during cfg */

        int alrm_open;           /* 0 = list closed, 1 = list opened */
        int om_id_alrm;          /* id returned by omopen */
        OM_HEADER alrm_header;   /* header node for alarm list */
        int *alrm_map;           /* bit map for eqe alarm var values */
        int n_eqe_alrms;         /* number of eqe alarms */
        int sync_open;           /* 0 = list closed, 1 = list opened */
        int om_id_sync;          /* id returned by omopen */
        OM_HEADER sync_header;   /* header node for sync rule list */
        OM_VAR_LIST sync_list;   /* open point list for sync rule */

        int rpy_path;            /* type of reply to send at completion of pattern */
                                 /* 0 = no reply */
        RPY_DEST dest_path;      /* destination of delayed path reply */
        char path_ref[REF_SIZE+2];       /* msg ref of delayed path reply */

        int rpy_step;            /* tells whether or not to send a reply on
                                    completion of a step command */
        RPY_DEST dest_step;      /* destination of delayed step reply */
        char step_ref[REF_SIZE+2];       /* msg ref of delayed step reply */

        PAT *prev_pat;           /* history of previous pattern */
        int prev_type;
        int prev_mode;
        int prev_cc;             /* previous completion code = PPstop reason */

        PAT *cur_pat;            /* ptr to pattern currently in operation */
        STEP *cur_step;          /* ptr to step currently in operation */
```

```
        int no_of_steps;        /* step (down) counter for patts in manual */
        int pat_mode;           /* operation mode of pattern, man or aut */
        int pat_type;           /* normal, init or fail pattern */
        int excep;              /* path exception state, bit aray */
        int step_state;         /* execution state of current step */

        int cfg_state;          /* configuration state of path */
        int cfg_av_done;        /* tells that all eqe vars are in */

        char path_name[PATH_NAME_SIZE+2];
        char path_alrm[VAR_NAME_SIZE+2]; /* name of path alarm var */
        char owner[OWNER_NAME_SIZE+2];  /* owner of path */
        char key[PATH_KEY_SIZE+2];      /* specifies how to reach path controller */
        char environment[ENV_SIZE+2];   /* for logging purposes only */
        EXCEP_PROC excep_proc;          /* name and type of exception procedure */

        int auto_failsafe;
        int default_pat_mode;   /* manual or auto */

        char name_init_pat[PATTERN_NAME_SIZE+2];
        char name_fail_pat[PATTERN_NAME_SIZE+2];
        PAT *init_pat;
        PAT *fail_pat;

        } PATH_DB;

/****************************************************
 *
 * Defines for EXCEP_PROC.type field
 *
 ****************************************************/

/* Removed 04 Jan 1989 - Now in pam_gen.h */

/****************************************************
 *
 * Defines for ACT_DESC.name_type field
 *
 ****************************************************/
#define CIONAME 0
#define SNVNAME 1
#define DEVNAME 2

/****************************************************
 *
 * Defines for ACT_DESC.relation field
 *
 ****************************************************/
#define LT 0
#define GT 1
#define LE 2
#define GE 3
#define EQ 4
#define NE 5

/****************************************************
 *
 * Defines for PATH_DB.mode field
 *
 ****************************************************/
#define PAC_MANUAL 0
#define PAC_AUTO 1

/****************************************************
 *
 * Defines for PATH_DB.cfg_mode field
 *
 ****************************************************/
#define CFG_IN_PROGRESS 1
#define CFG_DONE 0

/****************************************************
 *
 * Definitions for the PATH_DB.step_state field
 *      See PAM_GEN.H
 ****************************************************/

/****************************************************
 *
 * Definitions for the PATH_DB.excep field
 *    (bit array)
 *
 ****************************************************/
#define PATH_EXCEP 1            /* path exception flag */
#define PATH_ALRM 2             /* path alarm flag */
```

```
#define EQE_ALRM  4              /* equipment alarm flag */
#define STEP_ALRM 8              /* step alarm flag */

/*************************************************
 *
 * Defines for PATH_DB.pat_type field
 *     See PAM_GEN.H
 *************************************************/

/*************************************************
 *
 * Defines for op code parameter of PPalarm
 *
 *************************************************/
#define SET_EXCEP 1
#define CLR_EXCEP 2

/*************************************************
 *
 * Conversion tables
 *
 *************************************************/
extern mnem_tbl PPDfailsafe[];
extern mnem_tbl PPDmode[];
extern mnem_tbl PPDpattype[];
extern mnem_tbl PPDrelation[];
extern mnem_tbl PPDstepstate[];
extern mnem_tbl PPDvartype[];

/*************************************************
 *
 * Declare function type for all functions of the
 * Path controller.
 *
 *************************************************/

/*  Path controller main loop */

#ifdef unix
void main();
#endif

void PPpac_main();
void PPc_wait();
void PPcr_step();
void PPom_proc();

/* Path operation functions */

void PPstrt_pat();
void PPstop_pat();
void PPalrm();
void PPc_alrm();
void PPe_step();
void PPst_act();
int  PPeval_sync();

/* Command handling functions */

void PPcfg();
void PPabort();
void PPc_excep();
void PPfree();
void PPg_cpat();
void PPpat();
void PPizpat();
void PPfailsafe();
void PPstep();
void PPr_excep();
void PPreply();

/* Database configuration functions */

int   PPpath_cfg();
int   PPeqe_cfg();
int   PPpat_cfg();
int   PPst_cfg();
int   PPend_cfg();
int   PPsync_scan();

/* Database access functions */
```

```
MEM_BLK    *PPal_mem_blk();
void        PPfm_mem_blk();
char       *PPalloc();
PATH_DB    *PPf_pth();
PAT        *PPf_pat();
STEP       *PPf_step();
PATH_DB    *PPa_pth();
int         PPa_pat();
int         PPa_step();
ALRM_DESC  *PPa_alrm();
int         PPat_name();
char       *PPa_name();
char       *PPsort();
void        PPg_name();
void        PPi_om_list();
void        PPa_om_list();
int         PPbld_alrm();
void        PPd_pth();
int         PPa_sync_list();
void        PPrm_sync_list();
void        PPsetbit();
void        PPclrbit();
int         PPzerobits();

/* string manipulation functions */

char *PPmsg_scan();
int PPstoval();
char *PPstrfind();
int PPmnemtov();
char *PPvtomnem();

/* Etc */

void PPhlbl_s();
void PPexit();
void PPlog_pac();

#ifdef unix
void PPkill();
#endif

/* Communication function types */

int PPi_wtevent();
void PPwt_event();
void PPe_wtevent();
void PPsend();
void PPc_rcv();
void PPc_send();
void PPc_om_event();
int PPget_efn();
void PPmsg_proc();

/*************************************************************************
 * @(#)pam_com.h        1.2  I/A Series  Foxboro Company  89/08/17
 *************************************************************************
 *                                                                       *
 *  Copyright by the Foxboro Company 1988                                *
 *                                                                       *
 *  All rights reserved Foxboro Company 1988                             *
 *                                                                       *
 **&3*********************************************************************
 *                                                                       *
 *  FILE NAME          : pam_com.h                                       *
 *                                                                       *
 *  PART NUMBER        :                                                 *
 *                                                                       *
 *  FUNCTION           : Include file for PAM Communication Library      *
 *                                                                       *
 *  COMPONENT HISTORY :                                                  *
 *  -------------------------------------------------------------------  *
 *  28 SEP 1988 - RD - Creation                                          *
 *  11 NOV 1988 - RD - Changed pirs_name into irs_name and split psrs_name *
 *                     into sel_name and chg_name                        *
 *  23 JUN 1989 - RD - Added include of <almtypes.h> because <alarmmsg.h> no *
 *                     longer includes this file                         *
 *  11 AUG 1988 - RD - Removed ali_name and user_stop                    *
 *                                                                       *
 *************************************************************************/


/************************
 * Debug Printing On/Off *
 ************************/
```

```
#ifdef DEBUG
#       define dprintf(x)       printf x
#else
#       define dprintf(x)
#endif

/*********************
* VENIX include files *
*********************/

#include <malloc.h>
#include <memory.h>
#include <signal.h>
#include <string.h>
#include <stdio.h>

/***********************
* Foxboro include files *
***********************/

#include <fox/om_user.h>
#include <fox/om_ecode.h>
#include <fox/almtypes.h>
#include <fox/alarmmsg.h>
#include <fox/concat.h>

/*******************
* PAN include files *
*******************/

#include <pam_err.h>
#include <pam_msg.h>
#include <pam_gen.h>
#include <pam_rpt.h>
#include <pam_log.h>

/******************************************
* PAN Communication Library Global Variables *
******************************************/

extern  char    ees_name[];
extern  char    chg_name[];
extern  char    sel_name[];
extern  char    irs_name[];
extern  char    els_name[];

/********************************************
* PAN Communication Library External Functions *
********************************************/

extern  int     PPini_ipc();
extern  int     PPstp_ipc();
extern  int     PPrcv_msg();
extern  int     PPsnd_msg();
extern  int     PPget_cfg();
extern  char    *PPget_srm();
extern  char    *PPget_fld();

/************************************************************************
* @(#)pam_err.h        1.2  I/A Series  Foxboro Company  89/08/17
*************************************************************************
*                                                                       *
* Copyright by the Foxboro Company 1988                                 *
*                                                                       *
* All rights reserved Foxboro Company 1988                              *
*                                                                       *
**s3*********************************************************************
*                                                                       *
* FILE NAME          : pam_err.h                                        *
*                                                                       *
* PART NUMBER        :                                                  *
*                                                                       *
* FUNCTION           : Definition of PAN error codes                    *
*                                                                       *
* COMPONENT HISTORY :                                                   *
* --------------------------------------------------------------------- *
* 23 AUG 1988 - RD - Creation                                           *
* 26 AUG 1988 - RD - Adapted definitions to SDS FORM                    *
* 15 SEP 1988 - RD - Added P_MALLOC, P_CONFIG and P_TOO_MANY_OWNERS     *
```

```
 *  19 SEP 1988 - RD - Added P_NO_FAILSAFE, P_NO_INITIALIZE, P_NOT_SELECTED     *
 *                     and P_NO_OWNER, removed P_INV_IPC_NAME, P_IN_ALARM,      *
 *                     P_IN_MANUAL, P_NOT_FREED and P_NOT_INITIALIZED           *
 *  20 OCT 1988 - RD - Added P_INV_LBUG, P_INV_VARIABLE and P_VAR_NO_SET,       *
 *                     removed P_NOT_SUPPORTED and merged all error codes.      *
 *  02 NOV 1988 - GN - P_NOT_SUPPORTED added again.                             *
 *  03 NOV 1988 - RD - Added P_INV_REQUESTOR, changed P_VAR_NO_SET to           *
 *                     P_VAR_NOT_SET, removed P_OUT_OF_SEQUENCE.                *
 *  07 DEC 1988 - GN - P_INV_EVENT added.                                       *
 *  19 DEC 1988 - RD - P_OBJ_CREATE added.                                      *
 *  01 AUG 1989 - RD - P_SYNC_OPEN and P_ALRM_OPEN added.                       *
 *                                                                              *
 ********************************************************************************/


/****************************
 * Offset for PAM error codes *
 ****************************/

#define PAM_OFF                   800


/******************
 * PAM error codes *
 ******************/

#define PAM_OK                    0
                /* No error                                                    */

#define P_ABORTED                 ( PAM_OFF +  1 )
                /* Pattern processing aborted via abort_path command           */

#define P_ALR_OWNER               ( PAM_OFF +  2 )
                /* Already owner of equipment                                  */
#define P_ALR_SECURED             ( PAM_OFF +  3 )
                /* Equipment already secured                                   */

#define P_COMM_ERROR              ( PAM_OFF +  4 )
                /* Communication error                                         */

#define P_EQ_LOCKED               ( PAM_OFF +  5 )
                /* Equipment locked                                            */

#define P_EQ_NOT_USABLE           ( PAM_OFF +  6 )
                /* Equipment not usable                                        */

#define P_EQ_SECURED              ( PAM_OFF +  7 )
                /* Equipment secured                                           */

#define P_FAILSAFE                ( PAM_OFF +  8 )
                /* Failsafe pattern is being processed                         */

#define P_FATAL_ERROR             ( PAM_OFF +  9 )
                /* Fatal error caused by internal problems                     */

#define P_FORMAT_ERROR            ( PAM_OFF + 10 )
                /* Message format error                                        */

#define P_FREED                   ( PAM_OFF + 11 )
                /* Pattern processing stopped because PAC is freed             */

#define P_INITIALIZE              ( PAM_OFF + 12 )
                /* Initialize pattern is being processed                       */

#define P_INIT_ABORTED            ( PAM_OFF + 13 )
                /* Initialize pattern is aborted                               */

#define P_INIT_FAILED             ( PAM_OFF + 14 )
                /* Initialize pattern has failed                               */

#define P_INV_CFG_FILE            ( PAM_OFF + 15 )
                /* Invalid configuration file                                  */

#define P_INV_CRITERIA_LIST       ( PAM_OFF + 16 )
                /* Invalid criteria list specified                             */

#define P_INV_CRIT_NAME           ( PAM_OFF + 17 )
                /* Invalid criteria name specified                             */

#define P_INV_ENVIRONMENT         ( PAM_OFF + 18 )
                /* Invalid environment specified                               */

#define P_INV_EQ_NAME             ( PAM_OFF + 19 )
                /* Invalid equipment name specified                            */
```

```
define P_INV_LBUG               ( PAM_OFF + 20 )
            /* Invalid letterbug specified                          */

define P_INV_MODE               ( PAM_OFF + 21 )
            /* Invalid mode specified                               */

#define P_INV_PAR_NAME          ( PAM_OFF + 22 )
            /* Invalid parameter name specified                     */

#define P_INV_PAR_VALUE         ( PAM_OFF + 23 )
            /* Invalid parameter value specified                    */

#define P_INV_PATH_KEY          ( PAM_OFF + 24 )
            /* Invalid path key specified                           */

define P_INV_PATH_NAME          ( PAM_OFF + 25 )
            /* Invalid path name specified                          */

define P_INV_PATTERN            ( PAM_OFF + 26 )
            /* Invalid pattern name specified                       */

define P_INV_PRIVILEGE          ( PAM_OFF + 27 )
            /* Invalid operator privilege specified                 */

define P_INV_REF_NAME           ( PAM_OFF + 28 )
            /* Invalid reference name specified                     */

define P_INV_REF_VALUE          ( PAM_OFF + 29 )
            /* Invalid reference value specified                    */

define P_INV_STATUS             ( PAM_OFF + 30 )
            /* Invalid status specified                             */

define P_INV_STEP_SPEC          ( PAM_OFF + 31 )
            /* Invalid step specification                           */

define P_INV_VARIABLE           ( PAM_OFF + 32 )
            /* Invalid variable specified                           */

define P_IN_EXCEPTION           ( PAM_OFF + 33 )
            /* Path in exception                                    */

define P_IN_OPERATION           ( PAM_OFF + 34 )
            /* Path in operation                                    */

define P_IN_PROGRESS            ( PAM_OFF + 35 )
            /* Command in progress                                  */

define P_MALLOC                 ( PAM_OFF + 36 )
            /* Memory allocation error                              */

define P_MORE_OWNERS            ( PAM_OFF + 37 )
            /* Equipment has more owners                            */

define P_NOT_IN_MANUAL          ( PAM_OFF + 38 )
            /* Path not in manual                                   */

define P_NOT_LOCKED             ( PAM_OFF + 39 )
            /* Equipment not locked                                 */

define P_NOT_OWNER              ( PAM_OFF + 40 )
            /* Not owner of path or equipment                       */

define P_NOT_SECURED            ( PAM_OFF + 41 )
            /* Equipment not secured                                */

define P_NOT_SELECTED           ( PAM_OFF + 42 )
            /* Path not selected                                    */

define P_NO_EXCEPTION           ( PAM_OFF + 43 )
            /* There is no path exception                           */

define P_NO_FAILSAFE            ( PAM_OFF + 44 )
            /* There is no failsafe pattern specified               */

define P_NO_INITIALIZE          ( PAM_OFF + 45 )
            /* There is no initialize pattern specified             */

define P_NO_OPERATION           ( PAM_OFF + 46 )
            /* There is no path operation                           */

define P_NO_OWNER               ( PAM_OFF + 47 )
            /* There is no owner                                    */
```

```
#define P_NO_PATH_AVAILABLE      ( PAM_OFF + 48 )
                /* No path available with selection criteria            */

#define P_NO_PATH_POSSIBLE       ( PAM_OFF + 49 )
                /* No path possible with selection criteria             */

#define P_NO_SELECTION           ( PAM_OFF + 50 )
                /* No selection in progress for requestor/environment   */

#define P_SELECT_ABORTED         ( PAM_OFF + 52 )
                /* Path selection aborted                               */

#define P_TIME_OUT               ( PAM_OFF + 53 )
                /* No reply within time-out                             */

#define P_TOO_MANY_OWNERS        ( PAM_OFF + 54 )
                /* Equipment is locked by maximum amount of owners      */

#define P_VAR_NOT_SET            ( PAM_OFF + 55 )
                /* Variable not set                                     */

#define P_NOT_SUPPORTED          ( PAM_OFF + 56 )
                /* Function not supported yet                           */

#define P_INV_REQUESTOR          ( PAM_OFF + 57 )
                /* Specification for requestor invalid                  */

#define P_INV_EVENT              ( PAM_OFF + 58 )
                /* Invalid event message type                           */

#define P_OBJ_CREATE             ( PAM_OFF + 59 )
                /* Object Create failed                                 */

#define P_SYNC_OPEN              ( PAM_OFF + 60 )
                /* Open sync rule list failed                           */

#define P_ALRM_OPEN              ( PAM_OFF + 61 )
                /* Open alarm list failed                               */


/*************************************************************************
*  @(#)pam_gen.h        1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&3**********************************************************************
*                                                                        *
*  FILE NAME          : pam_gen.h                                        *
*                                                                        *
*  PART NUMBER        :                                                  *
*                                                                        *
*  FUNCTION           : PAM general definitions.                         *
*                                                                        *
*  COMPONENT HISTORY :                                                   *
*  ----------------------------------------------------------------------*
*  01 AUG 1988 - WC - Creation.                                          *
*  15 SEP 1988 - RD - Added BUFFER_SIZE and LINE_LENGTH.                 *
*  22 SEP 1988 - GM - Added EQ_NAME_SIZE, ENUM_TYPE_SIZE, PAM_COL_LEN,   *
*                     PAM_MAX_DATA, PAM_INT_LEN and PAM_LONG_LEN.        *
*  26 SEP 1988 - GM - MAX_PATH and CMS literals added.                   *
*  18 OCT 1988 - WC - Added REF_SIZE and ENV_SIZE.                       *
*  20 OCT 1988 - RD - Changed LINE_LENGTH to 82, removed CMS related stuff.
*  21 OCT 1988 - RD - Added enumerated types.                            *
*  03 NOV 1988 - RD - Added NO_PAT, NORM_PAT, INIT_PAT, FAIL_PAT,        *
*                     WAITING_FOR_SYNC, WAITING_FOR_STEP, READY_FOR_STEP.*
*                     Changed values for REF_SIZE, INT_LEN, LONG_LEN.    *
*  07 NOV 1988 - WC - Added PATH_KEY_SIZE.                               *
*  03 JAN 1989 - RD - Reorganised enumerated types section.              *
*  03 JAN 1989 - RD - Changed NOT_IN_USE to NOTINUSE to get around name  *
*                     conflict with pac.h                                *
*  04 JAN 1989 - RD - Added defines for Exception Procedure Type.        *
*                                                                        *
*************************************************************************/


/******************
* Size Definitions *
******************/
```

```
#define PATTERN_NAME_SIZE       12
#define OWNER_NAME_SIZE         12
#define PATH_NAME_SIZE          12
#define VAR_NAME_SIZE           32
#define VAR_VALUE_SIZE          12
#define SYNC_RULE_SIZE          50
#define PATH_KEY_SIZE           IPC_NAME_LEN

#define REF_SIZE                40      /* Reference field in IPC msg    */
#define ENV_SIZE                20      /* Log environment spec          */

#define BUFFER_SIZE             1024
#define LINE_LENGTH             82
#define EQ_NAME_SIZE            12
#define ENUM_TYPE_SIZE          1
#define PAN_COL_LEN             17      /* Max length of column name     */
#define PAN_MAX_DATA            126     /* Max length of column value
                                           in PAN database               */
#define PAN_INT_LEN             6       /* Length of string
                                           representation of integer     */
#define PAN_LONG_LEN            12      /* Length of string
                                           representation of long        */
#define MAX_PATH                64      /* Venix full pathname           */

/*******************
* Enumerated Types *
*******************/

/*
 * Path Status
 */

#define SELECTABLE      'S'
#define N_SELECTABLE    'N'


/*
 * Equipment Status
 */

#define USABLE          'S'
#define N_USABLE        'N'


/*
 * Equipment Usage.
 */

#define NOTINUSE        'N'
#define LOCKED          'L'
#define SECURED         'S'


/*
 * Element Condition.
 */

#define USAGE           'U'
#define RELATION        'R'
#define ASSIGN          'A'


/*
 * Mode.
 */

#define D_MANUAL        1
#define D_AUTO          2

#define C_MANUAL        'M'
#define C_AUTO          'A'

#define MANUAL          'M'     /* Should be replaced by C_MANUAL      */
#define AUTO            'A'     /* Should be replaced by C_AUTO        */


/*
 * Auto failsafe
 */

#define D_YES           1
#define D_NO            2
```

```
#define C_YES           'Y'
#define C_NO            'N'

#define YES             'Y'     /* Should be replaced by C_YES          */
#define NO              'N'     /* Should be replaced by C_NO           */


/*
 * Pattern Type
 */

#define D_NO_PAT        1
#define D_NORM_PAT      2
#define D_INIT_PAT      3
#define D_FAIL_PAT      4

#define C_NO_PAT        'N'
#define C_NORM_PAT      'P'
#define C_INIT_PAT      'I'
#define C_FAIL_PAT      'F'

#define NO_PAT          1       /* Should be replaced by D_NO_PAT       */
#define NORM_PAT        2       /* Should be replaced by D_NORM_PAT     */
#define INIT_PAT        3       /* Should be replaced by D_INIT_PAT     */
#define FAIL_PAT        4       /* Should be replaced by D_FAIL_PAT     */


/*
 * Step State
 */

#define D_READY_FOR_STEP        1
#define D_WAITING_FOR_STEP      2
#define D_WAITING_FOR_SYNC      3

#define C_READY_FOR_STEP        'R'
#define C_WAITING_FOR_STEP      'S'
#define C_WAITING_FOR_SYNC      'W'

#define READY_FOR_STEP          1
                        /* Should be replaced by D_READY_FOR_STEP       */
#define WAITING_FOR_STEP        2
                        /* Should be replaced by D_WAITING_FOR_STEP     */
#define WAITING_FOR_SYNC        3
                        /* Should be replaced by D_WAITING_FOR_SYNC     */


/*
 * Exception Procedure Type
 */

#define D_NO_EXCEP      1
#define D_HLBL_EXCEP    2
#define D_C_EXCEP       3

#define C_NO_EXCEP      'N'
#define C_HLBL_EXCEP    'H'
#define C_C_EXCEP       'C'

/***************************************************************************
*  @(#)pam_log.h        1.2  I/A Series  Foxboro Company  89/08/17
****************************************************************************
*                                                                          *
*  Copyright by the Foxboro Company 1988                                   *
*                                                                          *
*  All rights reserved Foxboro Company 1988                                *
*                                                                          *
**83************************************************************************
*                                                                          *
*  FILE NAME          : pam_log.h                                          *
*                                                                          *
*  PART NUMBER        :                                                    *
*                                                                          *
*  FUNCTION           : PAM event type definitions.                        *
*                                                                          *
*  COMPONENT HISTORY :                                                     *
*  ----------------------------------------------------------------------  *
*  11 NOV 1988 - GM - E_INIT_P & E_FAIL_P & General Message Types added.   *
*  23 SEP 1988 - GM - Creation                                             *
*                                                                          *
***************************************************************************/
```

```
/**********************
* Function Declaration *
**********************/

extern  int     PPlog_event();

/**************************
* PSRS Event Message Types *
**************************/

#define E_AP_SELECT     1       /* abort_path_select            */
#define E_CO_MODE       2       /* change_operation_mode        */
#define E_CP_STATUS     3       /* change_path_status           */
#define E_RELEASE_P     4       /* release_path                 */
#define E_SELECT_P      5       /* select_path                  */

/*************************
* PAC Event Message Types *
*************************/

#define E_ABORT_F       6       /* abort_path                   */
#define E_PATH          7       /* path                         */
#define E_STEP_P        8       /* step_path                    */
#define E_INIT_P        9       /* init_path                    */
#define E_FAIL_P        10      /* fail_path                    */

/*************************
* EES Event Message Types *
*************************/

#define E_CE_PARAMETER  11      /* change_eq_parameter          */
#define E_CE_REFERENCE  12      /* change_eq_reference          */
#define E_CE_STATUS     13      /* change_eq_status             */
#define E_CO_PRIVILEGE  14      /* change_operator_privilege    */
#define E_CU_SECURED    15      /* change_usage_locked_to_sec   */
#define E_CU_LOCKED     16      /* change_usage_sec_to_locked   */
#define E_RE_LOCKED     17      /* register_eq_locked           */
#define E_RE_SECURED    18      /* register_eq_secured          */
#define E_UE_USE        19      /* unregister_eq_use            */

/*****************************
* General Event Message Types *
*****************************/

#define E_P_EXCEPT      20      /* path_exception */
#define E_RP_EXCEPT     21      /* ret_path_exception */
#define E_VALID_ERR     22      /* validation_error */

/*************************************************************************
*  @(#)pam_msg.h        1.2  I/A Series  Foxboro Company  89/08/17
**************************************************************************
*                                                                        *
*  Copyright by the Foxboro Company 1988                                 *
*                                                                        *
*  All rights reserved Foxboro Company 1988                              *
*                                                                        *
**&3**********************************************************************
*                                                                        *
*  FILE NAME        : pam_msg.h                                          *
*                                                                        *
*  PART NUMBER      :                                                    *
*                                                                        *
*  FUNCTION         : PAM message type definitions.                      *
*                                                                        *
*  COMPONENT HISTORY :                                                   *
*  -------------------------------------------------------------------   *
*  22 AUG 1988 - RD - Creation                                           *
*  07 SEP 1988 - RD - Added defines for PAC_LOAD, PAC_FREE and LOG_EVENT *
*  15 SEP 1988 - RD - Added defines for O_SRN and O_INVALID              *
*  19 SEP 1988 - RD - Added defines for FS_PATH and IZ_FREE              *
*  21 OCT 1988 - RD - Removed define for O_SRN                           *
*  03 NOV 1988 - RD - Added defines for I_GP_STATE and O_GP_STATE        *
*  11 NOV 1988 - RD - Removed define for O_INVALID                       *
*  15 NOV 1988 - GM - Added define for O_INVALID                         *
*  19 DEC 1988 - GM - Added I_GE_ALARMREF & O_GE_ALARMREF                *
*                                                                        *
*************************************************************************/
```

```
/************************
* External Message Types *
************************/

#define I_AP_SELECT             1
#define O_AP_SELECT             2

#define I_CO_MODE               3
#define O_CO_MODE               4

#define I_CP_STATUS             5
#define O_CP_STATUS             6

#define I_RELEASE_P             7
#define O_RELEASE_P             8

#define I_SELECT_P              9
#define O_SELECT_P             10

#define I_GP_DESCRIPTN         11
#define O_GP_DESCRIPTN         12

#define I_GP_DISPLAY           13
#define O_GP_DISPLAY           14

#define I_GP_KEY               15
#define O_GP_KEY               16

#define I_GP_OWNER             17
#define O_GP_OWNER             18

#define I_GP_STATUS            19
#define O_GP_STATUS            20

#define I_GS_CRITERION         21
#define O_GS_CRITERION         22

#define I_ABORT_P              23
#define O_ABORT_P              24

#define I_CP_EXCEPTION         25
#define O_CP_EXCEPTION         26

#define I_FS_PATH              27
#define O_FS_PATH              28

#define I_GP_OPERATION         29
#define O_GP_OPERATION         30

#define I_GP_STATE            129    /* Will replace I_GP_OPERATION */
#define O_GP_STATE            130    /* Will replace O_GP_OPERATION */

#define I_IZ_PATH              31
#define O_IZ_PATH              32

#define I_PATH                 33
#define O_PATH                 34

#define I_RP_EXCEPTION         35
#define O_RP_EXCEPTION         36

#define I_STEP_P               37
#define O_STEP_P               38

#define I_CE_PARAMETER         39
#define O_CE_PARAMETER         40

#define I_CE_REFERENCE         41
#define O_CE_REFERENCE         42

#define I_CE_STATUS            43
#define O_CE_STATUS            44

#define I_CO_PRIVILEGE         45
#define O_CO_PRIVILEGE         46

#define I_CU_SECURED           47
#define O_CU_SECURED           48

#define I_CU_LOCKED            49
#define O_CU_LOCKED            50
```

```
#define I_GE_DESCRIPTN          51
#define O_GE_DESCRIPTN          52

#define I_GE_PARAMETER          53
#define O_GE_PARAMETER          54

#define I_GE_REFERENCE          55
#define O_GE_REFERENCE          56

#define I_GE_STATUS             57
#define O_GE_STATUS             58

#define I_GE_USAGE              59
#define O_GE_USAGE              60

#define I_RE_LOCKED             61
#define O_RE_LOCKED             62

#define I_RE_SECURED            63
#define C_RE_SECURED            64

#define I_UE_USE                65
#define O_UE_USE                66

#define I_GE_ALARMREF           67
#define O_GE_ALARMREF           68


#define I_PAC_LOAD              101
#define O_PAC_LOAD              102

#define I_PAC_FREE              103
#define O_PAC_FREE              104


#define I_LOG_EVENT             201

#define O_INVALID             ( -1 )
# @(#)tds3635   1.3     89/09/22
# Ronald Duursma
#
echo "*** EXECUTING TDS 3635 ***\n"
#
echo "Saving database ..."
mv /usr/pam/db/pam.dbs /usr/pam/db/tmp.dbs
#
echo "Loading database ..."
cd /usr/pam/db
pam_db.ini
dev_conf.ini
evnt_def.ini
fmt_def.ini
cd /tmp
tar xvf /usr/pam/test/tds3635.db
/usr/pam/test/load_db
#
echo "Creating variables ..."
cd /usr/pam/test
/usr/fox/bin/tools/oma oma3635
#
echo "Compiling test sources ..."
if [ ! -f hit3635 ]
then
    cc -o hit3635 hit3635.c -lpam -lcom -lfox -I/usr/include/fox
fi
if [ ! -f pop3635 ]
then
    cc -o pop3635 pop3635.c -lpam -lcom -lfox -I/usr/include/fox
fi
#
echo "Starting servers ..."
start_pam all
sleep 60
#
echo "Executing tests ..."
hit3635 0
pop3635 0
#
echo "Stopping servers ..."
stop_pam all
#
echo "Restoring database ..."
rm -r /usr/pam/db/pam.dbs
mv /usr/pam/db/tmp.dbs /usr/pam/db/pam.dbs
#
echo "*** DONE ***"
```

@(#)tds3635.db.p 1.1 Foxboro I/A System 9/14/89
BPJNINGDNONAAJDDHHHFJHDAHGAACIFHHILAKBHDIHBACDEKJHEILBCCIIILDGGHNAAAAB
OACCIIBJDHDGHGLNBIIDEGANIOBOFDNKIACBEDHGEFBKDEGONILINBPCAGANBLBOGLNNLIBB
KDGDHFJPEAIDAKBNEKLEKINBKDEIJDCKFNHKLEGJFDDIDGFNHEOAFDNGINBNBLHNEAPAHBNC
CHHIFGDOEGNOHINBABOCHHJHCPGDOEKEKBFDEGONBLDHCANCLICBFDBGHOBHDCGJOGHAGBBD
CGIPALDOCPKIBAJJPCACKPHOKIFDLFCKHOHKHIPBGCDKHJOAJEEBHHJIKLACDIDHKEFCLFJK
DJDBJPCJFHLPDGEJODCGENJLDAGHEAANKEIDOGKPODHGLAFPCPLGIHFJCKIHHHHGGODAAGON
JFCLJEDAKNEBOEAFCBKHANJLDCAENLNABFFDIHAOAIDHGPJHHPDBFOGGANFLDCKOGDGLJHFN
JJHPOFHODBHCOANGKHJFPHFHCKGIIGKPEGADOCEOBKDGKJHPBPDPIDJKENBOBAGCHKIADAFD
FHHJHGOOAAPCABFOHHHPEJBFIDBIODOHBGBKFHEENENBEGBLPHKNAHACBNGPBAFHHGHENCHI
KBBPBEEBAHLBJPFICAANBIGAIACCHOFFGAAHDCCECIBIGIFHPFNGBFAINDBNGHJHHCKKABIH
AGALBDFGFIBHBNGKJFKBCBAIGLJEOBHHHGINDNLBHEBHELBEJBAFJBLDHJFHFLANDDCEKIFF
ILFPDJBBFNFHDAFCDHCDFNOLONGAGBBHHFFHOIJHBJCAAGDJOEIIENBCFIFLIKFFOFKGKAIL
ENIEIBIHGJAONGBIJHFONFKFGBEGBKGDAAJHHGFLHPLNFANHBHHCBEJGHHFOCPKHHJHHBAEP
DEABIFAOEFGADBEEBBFAPADBAHBNGBHIEBIHKFBENCHBHHEAHHHJHBAGGDHDIIJFHGBJJGJC
CBCGBPGHJIIKOKBJKKFOHKAHIFHEHHHBBKBOHHENIFIEJDJJHBCAOFGHHHEENBHHJCEJHAFH
AGHNKJAJNEJGJPGPNJPKIGKKPPKFPJNKEAGDHHHBJGBNGCKJJJFJANLPJKLHCEHKPKJBLGNG
BHKLLBCFAHFHHHLKABJHHDPJGFEJEHLEOCHGGKAGHAKIFBHFAGBHJAHHGBHGBHHCPCCBKOLF
HCGACLIHLGCOGANFCGHJHALKFIAEJIGJHANBEGFFHOKBFGFHBIGENHDHHHBIHFBEIHFHLPHH
JFBBHHBHBHGHKHBHHBLKBHPHOGFHEFBEDBIFHAFGKBJGAGFHBODPBHHGHDHBKCLJFIBJBHAC
CHDAIBDGHKFJBHJIGCHOCIAHJAECNGHHDBGHLEGFHGCGGHCHHDBFOHJHGHHECJCBJOGDOIHJ
CHLDGOAEDKGIKBIGCBKKCIKDIOECCKCJKFJHGGLKOJKFACHHIKFKKGKDGKFFKKFKKIHOBBOL
KGKHHCHHOKHHLDEGGHKLJHLJPCLBGLIBLOJKFHFOLAHDPCFBOHHHKIIBKAKHBHFIDLALONHB
HDIGFBONLFHJEOHJKLALHHAKJOHAOBOALCDHGOLJGHKBCLHHLKPIOJDHHHLLLLAHFKLCPLHGH
HIILGPBOPKPCILOGLPJEAPGHHJIBAGDDDHLIHCANDLAHHBFHGHEHFHHBJGBIGLGHLEHHFEHH
BHLCHGCEHHLLCABPCJKPEHJKBHCONDBHIHHHDEEDJOFFBJFPKHCHKKEBAIDJCFLOPIBOGFCE
JCEHCAJHEPJCEJCIKFJEFCEJCPHFDEFDENDCHEFAHOELDAPIDEPOPOPHPHOPPPPPAAANKAAA
AHKICIIPCJHHDLDHGDIHHPDHBGKGELAJINGIGHHCHOGLJCOGICKFLJGJHHKCJBBDJHHKGACH
PGFAHHGKHHKCHDJPLCAGJIKHBJEKCPGHEINEABHBPGKIEIENKKFCJHDCBLKHHCAGCKLGJBHK
FFKJFKFFHHEOHFLHFFHBGKGPLIHCHFOFACKHDLGAAJILFIHGECJGOCCEHDDIBBDGKLAHHPCK
HDPBPKEFCHJHFFHOEELFHJFHBBLHHFIHHOKJAOHEOHACEBLKEIHHKOHDHBKLDEPCGCJHOLPC
LFKPHOHBCOGAFHKEGAOOCOLIDJKOCHKHAOAHHLJIBLCCBGDHOEAHGPHJPOJBCAGDDHAGLCOK
IIIHAHHHHDJHHJOHKIDCJGFBIPAHCPADEBHHHHDADDCJEKJAHLABJJALPIBCDCHAEOECKEHH
BKGJHPEHECCCHKJCJHGECEODADHBEKGABADPJJHAEEAGDHHBAJEGGAGABDPHHJPCJGLIHHKF
COHHHJELABBGDAAOAHKHACLAKGFCCADGABLDICAIBCCGBDPIJAKCGCCGEPGJAIJCICKFKICH
IHBLHHEBAGDOIIHBGHKCOEEHADCCDDDEHDKAKGDFGFHAIDBIEHHFFHAFCKFJBHPAIACLGBIC
IGJILFDBNIDBLBOCHOLOCJGAFBINGKOBNIGAIICJENHHNAFDDFBENFAHONCGDHBNOCBAFGDO
HENLKNPKPGLHHKBAJBIOKADJKCOBJCJILIHFDFAOIKIPEDFOOECGAHEHHLGBHBFLHOPDHKLH
HABACODEJCALDIOGBCJHLKKOFEHGDCKAGODBKKJLBHKGFKFHIGHLLBFBHGGJHKODHOGOBHHP
JAKCKHHHHKOEKDPACHGGEIODAJFCCLIEAECECCHJJKJJJCGNPBHJNBHDGEPFCEHJDHEKGGEP
KDHLILIDBEAPHCHJFOHKBCJEDKBLGFFIENCJHKPHNNEEJGDAHBCFPNGGJABDJINAHAJGFOIN
KLFHOHEKNHLKAGHAGDJOJJACKGOGJCCJJIBNCHKIAPGEHLKFAKHCIHNLAEGIAOHFGAOCBHBG
AHJGHGHCEFJIAKPABIFGLEECKGKBINIBHLADGBNHHDHHHFLHBFBBAJLBEHGHKHBBIAAFFJHJ
NKIGDBJFCFHLGFLPPAICDDHACPIGHEBIFEFHOGFCBGOOANCKAHKOCNGHJKEANLBGNBHOKFLE
HBEAEHAOFACLBGLCLAOBANGDFIADIOAADJFLLKHEHBAHHFDJEDFODIGLNIHPCGLGLHKDBNON
GDLHODHHBEANABAKBHGKHCEHHAJAADBIKAEIAHOBBFACBDIGLAAEPCJKFHAGCOBAECBCGAEA
HPKJDHGHIDJCPHOLOPFAEAKBNCBBOPJACJPIELHFLJHDFLDJCHDGLEHJPHCHHHIPCJADAEGJ
OFLOFBODCAHFAACLAGBAPALHECONDKGOHCJFBDGANHBOPGLKAGGGGNICLHBLHJGDHCELCLFE
KIHAGJICDECBJCICIAAHBFHOOEBHKGALDBABOPBGHEAHHGKOGDPJAANHHHEHBGHKEAPHHHHA
JEPKJHKJPEJEHADIBGHBGDEBFDHKIBINJIHHALPOHBGFHFIINJEHFFJCLDFDPBCHJCBBLHGE
CIJHBIDBHFEHCHJFFJOLFKJAGBCKLGHDGIGOGHLPHAHLHHAOFIDLAFPGCHIJEHBLIDOBFCLG
LICAHALAHCPPFLBHDFDPDHLKDEBONIJLFPBDOHCHPHLIICILACGPBAHEHLADPHJODHLHOLGH
GPHJFBBEHPPJHGJHAPBAKONDIEPHHLHPJGBGIPHDDGPOLAGCJFKHFHCPHHHHHBJINGGAIEPD
FLHDHPFFFPINCPOHFDDKIDHGHHHFBHDLJHEIHDOHBBHFFBHAGBGLDEGDPDABGODFLGGHHKJBK
HDHKHLGHHJLBJDHHHHOIBPHPHBGDHCHIKEFHABAIFGFBKGKPJEOHEDGFCKGLHABCBAKEHFHO
LAJEIBCHEBFAADBKHEAPKONDEOLHLKHHHHOOGJODHFFGGCKCCGBPJGFJIGBIGEJGJIJCIFPH
KFLOCAOPCEFAHFAGPHPGEDICJJHHHHGFODDKHKHELFGHJFDFOLHCHOGGHJDALFHGPBGIAJPO
OFHDHOHJCHGDGOONGLHPCHFLLJHAKFHHGHCOHDLBOBAHGCDJJLDKLIFCLBDDBPHEKHOHOFBG
FFDPBOAHHBJPIPBFOIJBBDLKOEIGFOPAAKBFHHGIEHHLAALHILFGCPHLHHFOGJPKJKDHHFFA
HDLEHOPHGIOBEOJLOOOFGEOIPAKAGBFDGAGFJLPHHAAHGGEHKGCFLHHEHGDFBHHDPKJBHFHE
EDBHPBBAHPFKHBCFAGCJIKHJOHGLBHAHFLHGDEHOCDHJJBGHHGIJKDHHJLHOAGJDFHBOBJCG
GJLHHLCJHFEGOFLFFBEJFGGHKLEEAGBLPBLGPHFOHJBDLGGCAEJGDHEAPHHPCHEPPJHKFLHO
CJIKIKKBDPLLHLLHHBIGDDFDGJBICHDDGFFAIEBEGJHFJJGIPDBEOHFDOEHJGKJKEBPECHCJ
DHGDAKHEKHJIKKHBJLHHJKHKDCKJLJLKJJOGEKAGDDDAHJIPGJLPEGHILFFBCLFDDPPHHHGH
HLBADHHPPIOHHDEGHJJHBDGOFHOEOOJJLJDBJPLJHEILCHOIOHHLDHPKDLAPOPHICHPHHDEI
APJHPHEFLPPEHGFJAHFIFIHLBKHAHDCHLJKHLPHPHCGIGKFHHFEKGPDFHDFPOHPEDHFLHPHG
HJEHCKEJAGHHPFIHDJIHJBGCCALAGCPKPBGLCPBGGDHDBGHHKIBDIAGODDIAPEHHGHIHHBEH
HEOCHHJHIHBEIBIHDOKEEEHIHJJGEKBOBBADGILFHIDFDBADPGHDBBDFDAADBJCBHJBLPIIC
DABIIDJHBHAEFALABCEBOABFEHEHFPHOIBGIFDHBHKKAAHHLKEGHHKJHJDCCKJPHEHIIHGHK
HDJECJKPHHEHKDCHHLKHJHEFPOGCFCDCFFCPLIHHDHLLJHCJLHFHCPCIBCHHDFDAHHFAFIFD
KPBDDLIHBBIAAKLAHHGHHGHHCCCHIBJGICHDHHBGGFCJEHHHPOJHFHCOPHGJHOAGFHDEHHHH
DGEHHFGHHIHAGJIHGIHPCFHOIHEGHOEAHHAEECCHGJOPJFHOEHLHHOJLHGHEOOPHHEJPDGHG
HJLIBIFFEHGKHHHHGAKIKGIIFHIHBPFPBHGLPPAHIJGKDIIJAEJIGLAHHIHGALOIHGAOOIAG
HEHGBGHCBHIJACDIHPAGFHIJDOHGIBHKAHBHBKCIIDECHBIBBHDBHICDBIICCCBICCDHHAEK
OAHGBDCJEIGODEFABCCOGIILHIJIIHHKLIELJJHHEPJLACEPAHFEIEHHAEIFLGOHHLHAGIIA
GAHIFDHHOEBHEAOIIEJHFDHLFCHIHLCGGGIFHHHAHLFDHIDKFLCIHHLDPHIFDGGFHHDIEFIG
GGBIHCKHDIIBKBOIIGHDHHHBHFCHIHHHAGHDLEKFHHDFPHIJHLAIILHOHIHDOOPHFOIDFIII
EECHFPEGGHFPPIHHHFPKOHBHIHLIIPJOOIHHHFPHIKOAPHEHAPHGJAOHOHGKJLJIGBJHCIHF
BEGJHFDJHHIHLKIGIAAKHIGCHAHGIKKJGIGHAAOJIKFHKHHDAFCDILHFLAIHDEFJJDDGHJJD
DIJJJDDKLJJDDHHJJDDOPJJDEABJJEECDJJELGAI

```
:
# @(#)testenv   1.2 89/09/21
# Function : Generate PAM test environment
# History  : 17 AUG 1989 - RD - Creation
#            21 SEP 1989 - RD - Remove contents of test directory
#
if [ ! -d /usr/pam/test ]
then
        mkdir /usr/pam/test
        if [ ! -d /usr/pam/test ]
        then
                echo "Cannot make directory /usr/pam/test, exit!"
                exit
        fi
fi
#
if [ -f /usr/pam/test/* ]
then
        rm -f /usr/pam/test/*
fi
#
echo "*** Generate PAM test environment ***"
#
echo "Making pamtst ..."
cd /usr/pam
make soest GOAL=p_pamtst >/dev/null
cp bin/pamtst test
#
echo "Making els ..."
cd /usr/pam/els/obj
if [ -f *.o ]
then
        rm *.o
fi
cd ../make
make -f els.mk CFLAGS="-I/usr/pam/header -c -DTESTING -DTESTVERSION" >/dev/null
cd ../obj
rm *.o
cd /usr/pam
mv bin/els test
#
echo "Retrieving files from SCCS ..."
cd /usr/pam/test
sccs get /usr/pam/header/pam_err.h >/dev/null
sccs get /usr/pam/header/pam_log.h >/dev/null
sccs get /usr/pam/header/pam_msg.h >/dev/null
sccs get /usr/pam/header/pam_gen.h >/dev/null
sccs get /usr/pam/pamtst/source/inc >/dev/null
chmod +x inc
sccs get /usr/pam/pamtst/source/tpp >/dev/null
chmod +x tpp
sccs get /usr/pam/misc/ees_tst.ini >/dev/null
chmod +x ees_tst.ini
sccs get /usr/pam/misc/dbg.c >/dev/null
sccs get /usr/pam/misc/lib.c >/dev/null
sccs get /usr/pam/misc/tds3526.db.p >/dev/null
chmod +w tds3526.db.p
sccs-to-bin tds3526.db >/dev/null
rm tds3526.db.p
sccs get /usr/pam/misc/tds3528.db.p >/dev/null
chmod +w tds3528.db.p
sccs-to-bin tds3528.db >/dev/null
rm tds3528.db.p
sccs get /usr/pam/misc/tds3635.db.p >/dev/null
chmod +w tds3635.db.p
sccs-to-bin tds3635.db >/dev/null
rm tds3635.db.p
sccs get /usr/pam/misc/tds3635 >/dev/null
chmod +x tds3635
sccs get /usr/pam/misc/steptst.db.p >/dev/null
chmod +w steptst.db.p
sccs-to-bin steptst.db >/dev/null
rm steptst.db.p
sccs get /usr/pam/misc/steptst >/dev/null
chmod +x steptst
sccs get /usr/pam/misc/oma3635 >/dev/null
sccs get /usr/pam/misc/hit3635.c >/dev/null
sccs get /usr/pam/misc/pop3635.c >/dev/null
sccs get /usr/pam/misc/preptst >/dev/null
chmod +x preptst
sccs get /usr/pam/misc/exectst >/dev/null
chmod +x exectst
sccs get /usr/pam/tools/load_db >/dev/null
chmod +x load_db
sccs get /usr/pam/tools/save_db >/dev/null
```

```
chmod +x save_db
sccs get /usr/pam/misc/CPPAMBLCK.s >/dev/null
sccs get /usr/pam/misc/COMPBLCK.s >/dev/null
sccs get /usr/pam/misc/COMPHLBL.s >/dev/null
chmod +w *
#
echo "Do you want to save the test environment? (Y/N) \c"
read a
if [ $a = y -o $a = Y ]
then
        echo "Put empty diskette into drive 0 and hit RETURN \c"
        read a
        echo "Saving test environment ..."
        tar cf /dev/rfh0 *
fi
#
echo "*** Done ***"

/*  @(#)tst_stubs.c     1.2  8/17/89  */

#include <stdio.h>
#include <fox/almtypes.h>
#include <fox/aprint.h>
#include <pam_gen.h>
#include <els.h>

char snddev[20];
char aprmsg[1024];

#ifdef DEBUG
#       define dprintf(x) printf x  ; fflush(stdout)
#else
#       define dprintf(x)
#endif

extern char req_id[];

typedef struct apr
{
   ALM_TYPE code;
   char string[ MX_LOG_LEN + 1 ];
} APR_MSG;

OPENDEV_RET opendev( logical, station, priority )
char *logical,
     *station;
int priority;
{
   strcpy( snddev, logical );
   strcat( snddev, ":" );

   return 1;
}

APRINT_RET aprint( fd, message, msg_size, priority )
int fd;
APR_MSG *message;
long msg_size;
int priority;
{
   strcpy( aprmsg, snddev );
   strcat( aprmsg, message->string );

   dprintf(( "aprint sends:\n" ));
   dprintf(( "[%s]\n\n", aprmsg ));
   fflush( stdout );

   PPsnd_msg( aprmsg, req_id, strlen(aprmsg) );

   return 0;
}
```

We claim:

1. A path management system for regulating equipment resources and operations thereof which moves process material through a process system, said process system including a control procedure for implementing a specific process application, said path management system comprising:

path editor means for building a plurality of path specifications for a specific process application, each path specification defining a different set of equipment resources and sequences of respective equipment resource operations for the specific process application, such that there are multiple path specifications for each specific process application of the process system;

at least one database, interconnected to said path editor means, for storing said plurality of path specifications;

path selector means for selecting in real-time a single path specification for the specific process application from the plurality of path specifications stored in said database for the specific process application, and for validating in real-time the availability of equipment resources defined by the selected single path specification at a particular instance in time, send path selector means operating in real-time; and path actuator means, initiated by the control procedure, for regulating the equipment resources, based on the selected and validated path specification, to coordinate the sequence of equipment resource operations defined by the selected and validated path specification.

2. The system of claim 1 wherein said path selector means includes means for selecting an alternate path specification from the plurality of path specifications stored in said database if said single path specification is unavailable for the particular instance in time.

3. In a process system having a plurality of equipment controlled by a digital processor to perform a plurality of processes for providing various products, digital processor apparatus for path management comprising:

a database for holding indications of path of the process system, the paths defined from sets of equipment of the process system and sequences of equipment operations of the equipment, such that each path is formed of a specific equipment set and a sequence of corresponding equipment operations to perform the respective desired process of the process system, for each desired process of the process system, there being plural paths indicated in the database, each of the plural paths being defined from at least different sets of equipment than the other paths of said plural paths, such that there are plural different paths for performing the desired process;

path selector means coupled between the digital processor and the database for selecting in real-time paths from the database for processes desired to be performed in the process system, for each said desired process, the path selector means operating in real-time by (a) selecting one of the plural paths indicated in the database for that desired process, the path selector means selecting the one path as a function of at least current status of equipment of the path, and (b) providing an indication of the selected path to the digital processor; and at least one path actuator means coupled to the digital processor for receiving therefrom an indication of the path selected by the selector means for a desired process, and the path actuator means operating equipment of the process system according to the selected path to perform the desired process in the process system, such that real-time selection of paths by the path selector means enables the digital processor to control process system equipment to perform desired processes independent of selection of specific equipment for each desired process.

4. Digital processor apparatus as claimed in claim 3 where a plurality of path actuator means is coupled to the digital processor for receiving therefrom indications of paths selected by the path selector means for a multiplicity of desired processes, each path actuator means operating equipment of the process system according to a respective selected path to perform a different desired process and coordinating equipment operation with equipment operation of other path actuator means, such that the multiplicity of desired processes are performed simultaneously in the process system.

5. Digital processor apparatus as claimed in claim 3 wherein the equipment of the process system includes valves, pumps, transfer means and holding means.

6. Digital processor apparatus as claimed in claim 3 further comprising a path editor for defining paths of the process system, the path editor being connected to the database for transfer of indications of defined paths from the path editor to the database for storage therein.

7. Digital processor apparatus as claimed in claim 3 wherein the path selector means selects a path as a function of current status of equipment and indications of a source equipment and destination equipment of the desired process.

* * * * *